US009916010B2

(12) United States Patent
Harris et al.

(10) Patent No.: US 9,916,010 B2
(45) Date of Patent: Mar. 13, 2018

(54) GESTURE RECOGNITION CLOUD COMMAND PLATFORM, SYSTEM, METHOD, AND APPARATUS

(71) Applicant: VISA INTERNATIONAL SERVICE ASSOCIATION, San Francisco, CA (US)

(72) Inventors: Theodore Harris, San Francisco, CA (US); Scott Edington, Arlington, VA (US); Patrick Faith, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 43 days.

(21) Appl. No.: 14/715,105

(22) Filed: May 18, 2015

(65) Prior Publication Data

US 2016/0109954 A1 Apr. 21, 2016

Related U.S. Application Data

(60) Provisional application No. 61/994,793, filed on May 16, 2014.

(51) Int. Cl.

| | |
|---|---|
| ***G06F 3/01*** | (2006.01) |
| ***H04L 29/06*** | (2006.01) |
| ***H04W 12/06*** | (2009.01) |
| ***G06K 9/00*** | (2006.01) |
| ***G06Q 30/06*** | (2012.01) |
| ***H04L 29/08*** | (2006.01) |

(52) U.S. Cl.

CPC ......... *G06F 3/017* (2013.01); *G06K 9/00268* (2013.01); *G06K 9/00288* (2013.01); *G06K 9/00335* (2013.01); *G06Q 30/0641* (2013.01); *H04L 63/0861* (2013.01); *H04L 67/10* (2013.01); *H04L 67/12* (2013.01); *H04L 67/22* (2013.01); *H04W 12/06* (2013.01)

(58) Field of Classification Search

CPC G06F 3/017; G06K 9/00268; G06K 9/00288; G06K 9/000335; G06Q 30/0641; H04L 63/0861; H04W 12/06

See application file for complete search history.

(56) References Cited

U.S. PATENT DOCUMENTS

| | | | | |
|---|---|---|---|---|
| 2004/0193413 A1* | 9/2004 | Wilson | G06F 3/017 704/243 |
| 2014/0033134 A1* | 1/2014 | Pimmel | H04L 67/1074 715/863 |
| 2014/0337930 A1* | 11/2014 | Hoyos | H04L 63/10 726/4 |
| 2015/0085111 A1* | 3/2015 | Lavery | H04N 21/21805 348/143 |

* cited by examiner

*Primary Examiner* — Sahlu Okebato
(74) *Attorney, Agent, or Firm* — Loeb & Loeb LLP

(57) ABSTRACT

Systems and methods described herein are for transmitting a command to a remote system. A processing system determines the identity of the user based on the unique identifier and the biometric information. Thereafter, a sensor detects a gesture performed by the user. The sensor is configured to detect the gesture performed by the user when the user is located within the detectable range of the wireless antenna. The processing system determines an action associated with the detected gesture based on the identity of the user and sends a command to a remote computer system to cause it to perform the action associated with the detected gesture.

21 Claims, 162 Drawing Sheets

120

V-GLASSES Example: Glasses Social Pay

V-GLASSES Example: QR Code Projecting

V-GLASSES Example: Pay Bill

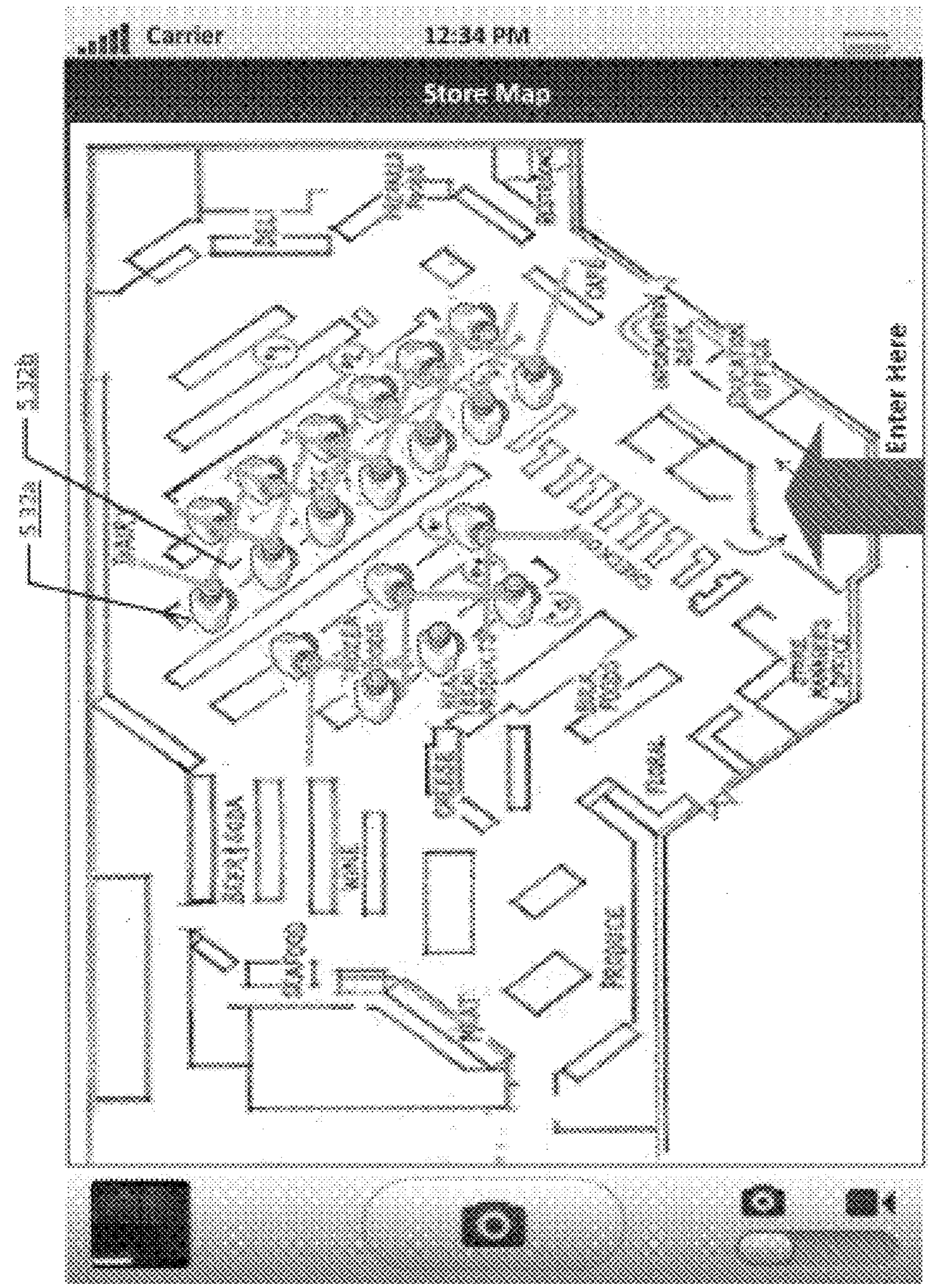
Figure 16D(1)

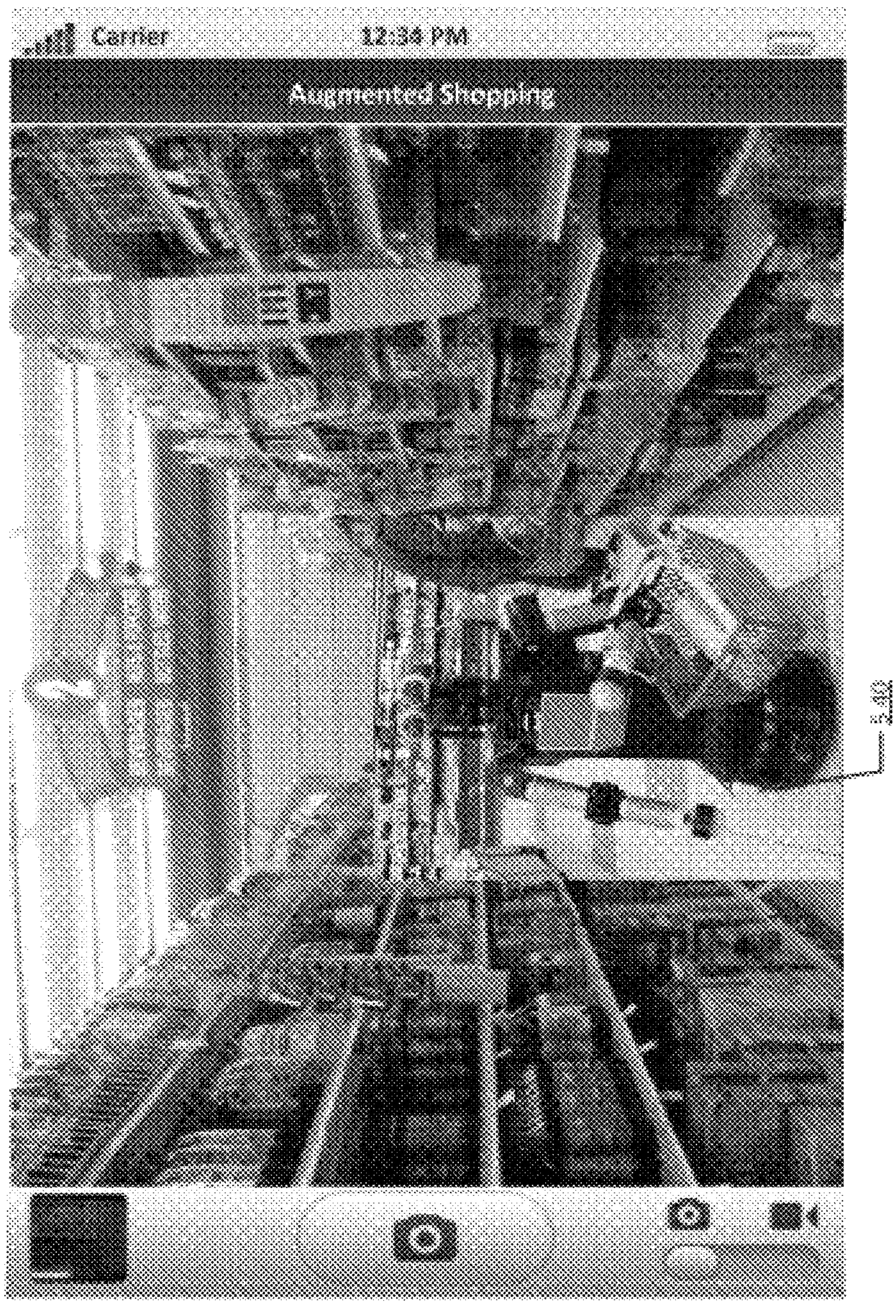
Figure 16F(1)

Figure 21
Carrier
12:34 PM
WALLET VISUAL CAPTURING
ON
Mary Smith
Call Her
Transfer $5 to Her
Is this Mary Smith?
Home: (000)-000-0000
Office: (000)-000-5499
Cel: (000)-000-1234
10.02
10.04
10.05
10.06
Contact List
Capture

Figure 46D
35.41
35.42
35.43
35.44
35.45
35.46
35.47
35.48
Snap Coupon Identified
Snap Coupon Applied
Acme Supermarket
FIND
SAVE
ADD TO CART
WALLET

Figure 47
36.11
36.12
Come Back! Extra 10% off...
Expires in 01:20 mins.
$25 @johnq #dinnermovielastnite
@john q: you owe me $15... (Pay)
Multiple: $85 off (15-day ship)
HiBuy: Holiday sale!
(interactively explore our aisles)
BigBuy: $25 off for buys > $75
Add-On: Use vWallet rewards
Expires in 15:59 mins.
Amzn: -5% + 2-day shipping
36.10
36.13
36.14
36.15
36.16
36.17
36.18
36.19
36.20
36.21

GESTURE RECOGNITION CLOUD COMMAND PLATFORM, SYSTEM, METHOD, AND APPARATUS

PRIORITY CLAIMS

This application claims priority to U.S. provisional patent application Ser. No. 61/994,793 filed May 16, 2014, entitled "Gesture Recognition Cloud Command Platform, System, Method, and Apparatus."

This application is related to PCT International Application Serial No. PCT/US13/20411, filed Jan. 5, 2013, entitled "AUGMENTED REALITY VISION DEVICE Apparatuses, Methods And Systems," which in turn claims priority under 35 U.SC § 119 to U.S. provisional patent application Ser. No. 61/583,378 filed Jan. 5, 2012, U.S. provisional patent application Ser. No. 61/594,957, filed Feb. 3, 2012, and U.S. provisional patent application Ser. No. 61/620,365, filed Apr. 4, 2012, all entitled "Augmented Retail Shopping Apparatuses, Methods and Systems."

The aforementioned applications are all hereby expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address gesture command analysis, and more particularly, include GESTURE RECOGNITION CLOUND COMMAND APPARATUSES, METHODS AND SYSTEMS (GRCCT).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Consumers visiting brick and mortar stores (i.e., point of sales) typically have limited options for communicating with the stores and requesting actions to be performed (e.g., checking inventory or making a purchase). The available options typically are to speak directly with a live agent, such as a cashier or sales person, or to interact through a kiosk, such as a price-check machine or self-checkout terminal. In both cases, the consumer must first locate the live agent or kiosk, approach him/it, and only begin to communicate if he/it is unoccupied. While consumers may also use their mobile devices to interact with the store's online presence (e.g., via its website or app), the virtual interaction is typically not integrated with the consumer's in-store shopping experience. Moreover, the user interface afforded by mobile devices is limiting. Therefore, is an increased demand to streamline communication and command execution at the point of sales.

SUMMARY

Processor-implemented systems and methods are described herein are for transmitting a command to a remote system. A processing system determines the identity of the user based on the unique identifier and the biometric information. Thereafter, a sensor detects a gesture performed by the user. The sensor is configured to detect the gesture performed by the user when the user is located within the detectable range of the wireless antenna. The processing system determines an action associated with the detected gesture based on the identity of the user and sends a command to a remote computer system to cause it to perform the action associated with the detected gesture.

As another example, processor-implemented systems and methods are disclosed for transmitting a command to a remote system wherein a first sensor detects a unique identifier for a user device that is associated with a user. When the user is within a detectable range of a wireless antenna, a second sensor detects biometric information for the user. A processing system determines the identity of the user based on the unique identifier and the biometric information. Thereafter, a third sensor detects a gesture performed by the user. The third sensor is configured to detect the gesture performed by the user when the user is located within the detectable range of the wireless antenna. The processing system determines an action associated with the detected gesture based on the identity of the user and sends a command to a remote computer system to cause it to perform the action associated with the detected gesture.

BRIEF DESCRIPTION OF THE DRAWINGS

The accompanying appendices and/or drawings illustrate various non-limiting, example, innovative aspects in accordance with the present descriptions:

FIGS. 53A-52B show data flow diagrams illustrating an example purchase transaction clearance procedure in some embodiments of the V-GLASSES;

DETAILED DESCRIPTION

FIGS. 1A-1I show schematic block diagrams illustrating several embodiments of the MDGAAT. In some implementations, a user 1A01 may wish to obtain more information about an item, compare an item to similar items, purchase an item, pay a bill, and/or the like. MDGAAT 1A02 may allow the user to provide instructions to do so using vocal commands combined with physical gestures. MDGAAT allows for composite actions composed of multiple disparate inputs, actions and gestures (e.g., real world finger detection, touch screen gestures, voice/audio commands, video object detection, etc.) as a trigger to perform a MDGAAT action (e.g., engage in a transaction, select a user desired item, engage in various consumer activities, and/or the like). In some implementations, the user may initiate an action by saying a command and making a gesture with the user's device, which may initiate a transaction, may provide information about the item, and/or the like. In some implementations, the user's device may be a mobile computing device, such as a tablet, mobile phone, portable game system, and/or the like. In other implementations, the user's device may be a payment device (e.g. a debit card, credit card, smart card, prepaid card, gift card, and/or the like), a pointer device (e.g. a stylus and/or the like), and/or a like device.

Figure 1A:
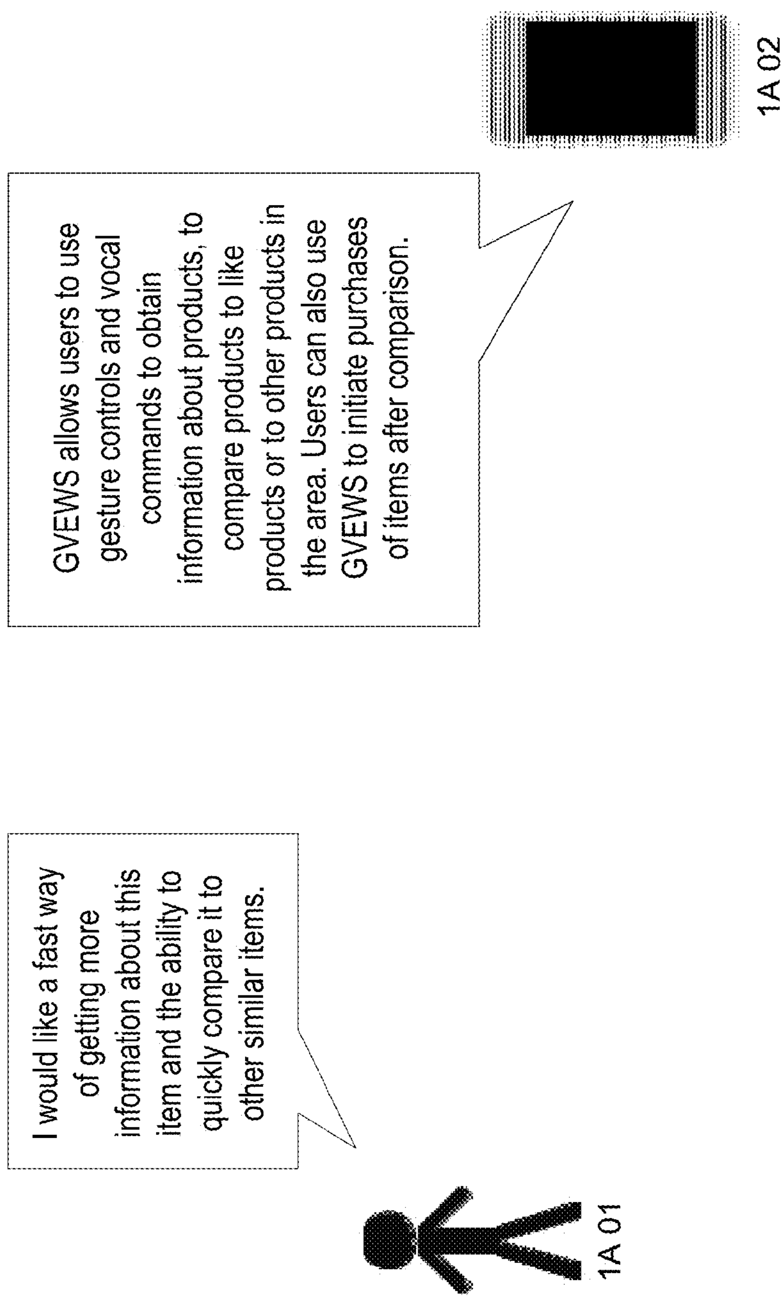
FIGS. 1A-1I show schematic block diagrams illustrating example embodiments of the multi-disparate gesture actions and transactions systems and methods (MDGAAT) which is an example embodiment of the GRCCT.
Figure 1B:
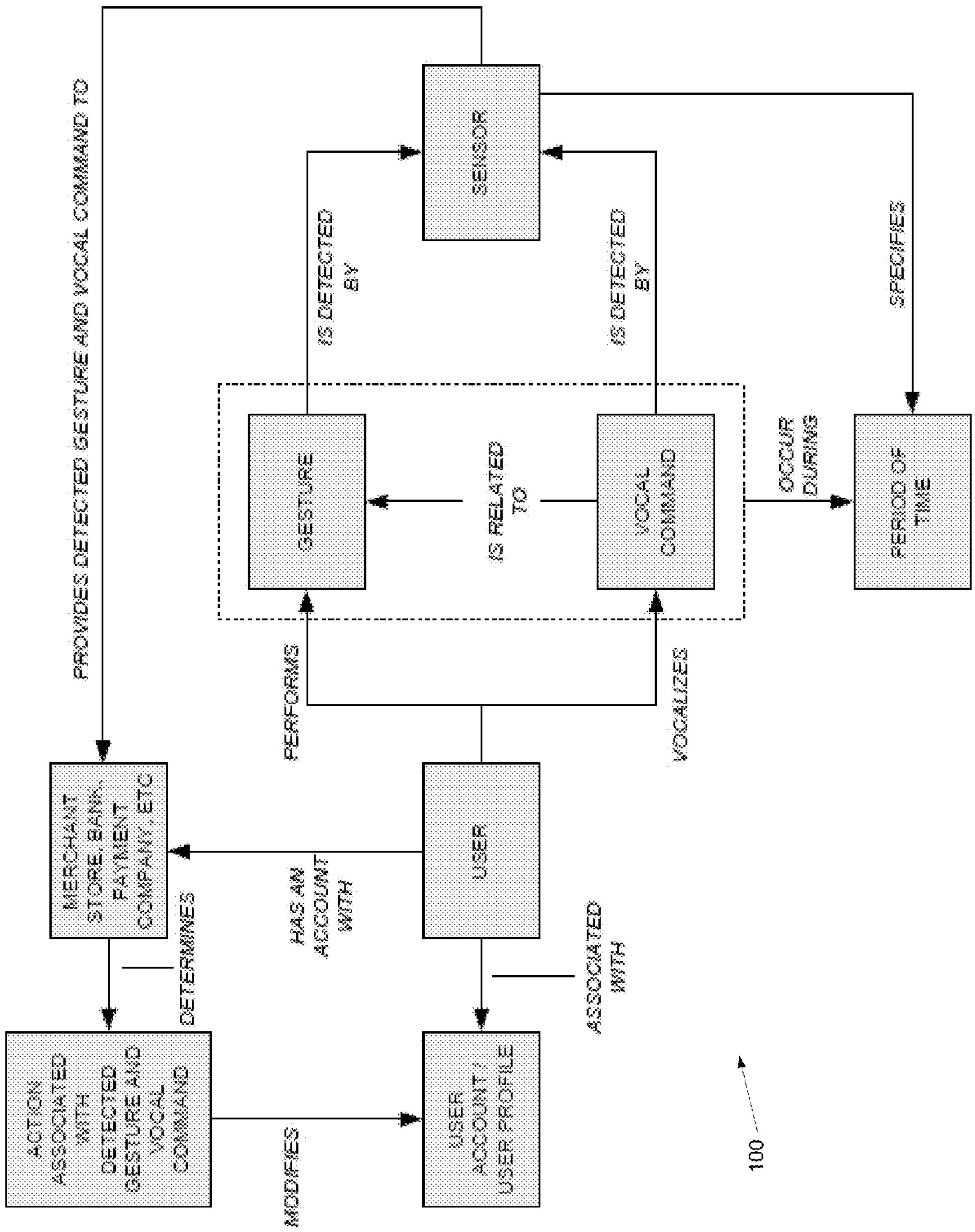

FIG. 1B illustrates at 100 aspects of an example system that utilizes a combination of gestures and voice commands for initiating a transaction. A gesture performed by a user during a predetermined period of time is detected via a sensor, where the predetermined period of time could be specified by the sensor. (FIGS. 1, 2A, 2B, 3A, and 3B and FIGS. 21, 22A, 22B, 23A, and 23B provide non-limiting examples regarding the detection of gestures performed by the user.) A voice command that is vocalized by the user during the predetermined period of time is detected via the sensor. The voice command is related to the gesture. (FIGS. 1, 2A, 2B, 3A, and 3B as well as and FIGS. 32, 33A, 33B, 34A, and 34B provide non-limiting examples on the detection of the user's voice command.)

The detected gesture and the detected voice command are provided to a second entity, where the user has an account with the second entity. An action associated with the detected gesture and the detected voice command is determined. (FIG. 3B and FIG. 34*b* provide non-limiting examples regarding determining the action associated with the gesture and the voice command.) The action associated with the detected gesture and the detected voice command is performed. The performing of the action modifies a user profile associated with the account, where the user profile includes data that is associated with the user. (FIGS. 2A, 2B, 3A, and 3B and FIGS. 33A, 33B, 34A, and 34B provide non-limiting examples regarding the modification of the user profile based on the action associated with the gesture and the voice command.)

Figure 1C:
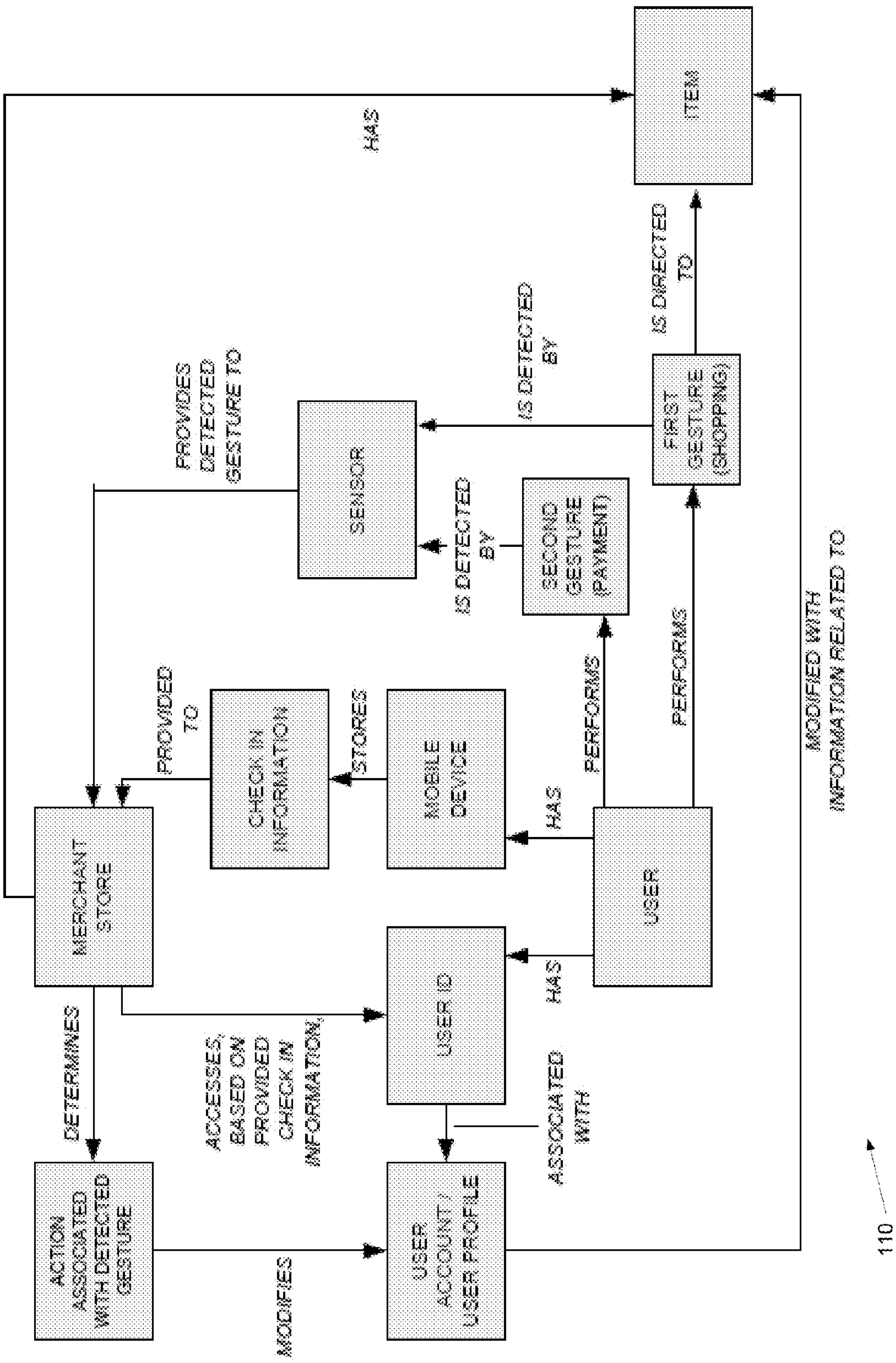

FIG. 1C illustrates at 110 aspects of an example retail shopping system. Check-in information is provided to a merchant store, where the check-in information i) is associated with a user, and ii) is stored on the user's mobile device. (FIGS. 4A and 4C and FIGS. 12I, 13A-D, 14A-14C, 15A, 35A, and 36A provide non-limiting examples on the providing of the check-in information to the merchant store.) The user has an account with the merchant store. Based on the provided check-in information, an identifier for the user is accessed, where the identifier is associated with the account. (FIGS. 4A and 4C and FIGS. 12I, 13A-D, 14A-14C, 15A, 35A, and 36A provide non-limiting examples regarding the identification of the user identifier based on the provided check-in information.)

A sensor detects a first gesture that is performed by the user, where the first gesture is directed to an item that is included in the merchant store. The first gesture is detected after the providing of the check-in information to the merchant store. (FIGS. 1, 2A, 2B, 3A, and 3B and FIGS. 32, 33A, 33B, 34A, and 34B provide non-limiting examples regarding the detection of gestures performed by the user.) The detected first gesture is provided to the merchant store. An action associated with the detected first gesture is determined, and the action associated with the detected first gesture is performed. The performing of the action modifies the account with information related to the item. (FIGS. 2A, 2B, 3A, and 3B and FIG. 34B provide non-limiting examples on determining an action associated with a gesture and performing the action.)

The sensor detects a second gesture that is performed by the user, where the second gesture is detected after the performing of the action associated with the detected first gesture. (FIGS. 1, 2A, 2B, 3A, and 3B and FIGS. 32, 33A, 33B, 34A, and 34B provide non-limiting examples regarding the detection of gestures performed by the user.) The detected gesture is provided to the merchant store. An action associated with the detected second gesture is determined, where the action associated with the detected second gesture initiates a payment transaction between the user and the merchant store. (FIGS. 6A-6C and 9 and FIGS. 37A-37C and 40 provide non-limiting examples regarding the use of gestures to initiate a payment transaction between the user and the merchant store.) The action associated with the detected second gesture is performed.

Figure 1D:
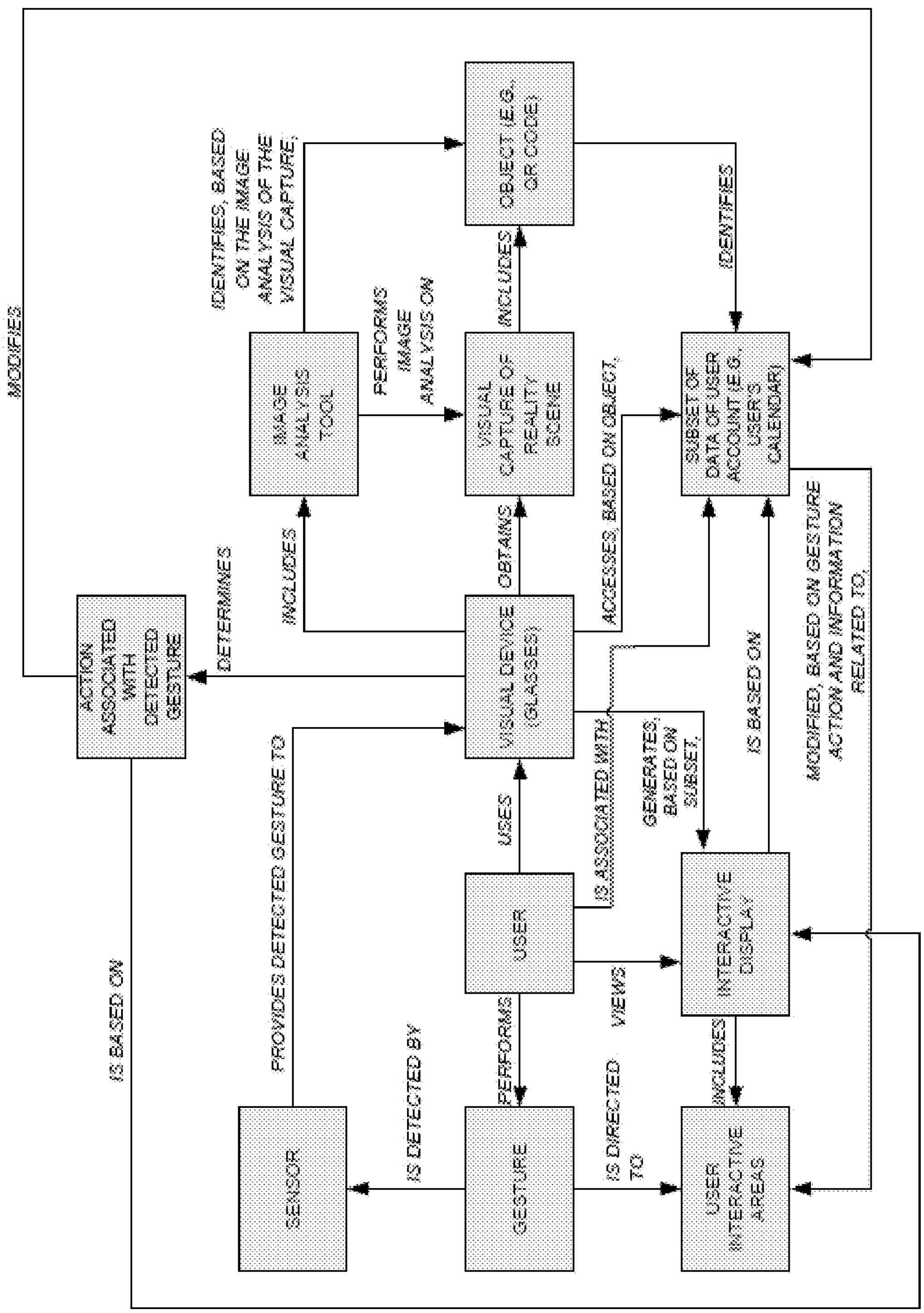

FIG. 1D illustrates at 120 aspects of an example system for generating and using an augmented reality display. A visual capture of a reality scene is obtained via a visual device, where the visual capture of the reality scene includes an object that identifies a subset of data included in a user account. (FIGS. 12B, 12D, and 46A-46E provide non-limiting examples regarding obtaining the visual capture of the reality scene.) Image analysis is performed on the visual capture via an image analysis tool of the visual device. The object is identified based on the image analysis, and the visual device accesses the subset of data based on the identified object. (FIGS. 12B, 12D, and 46A-46E provide non-limiting examples regarding the identification of the object based on the image analysis.)

Based on the subset of data, an augmented reality display is generated and viewed by a user. The user is associated with the subset of data, and the user uses the visual device to obtain the visual capture. (FIGS. 12D-12F provide non-limiting examples regarding the generation of the augmented reality display.) A gesture performed by a user is detected, where the gesture is directed to a user interactive area included in the augmented reality display. (FIGS. 1, 2A, 2B, 3A, and 3B and FIGS. 12F, 32, 33A, 33B, 34A, and 34B provide non-limiting examples regarding the detection of gestures performed by the user.) The detected gesture is provided to the visual device, and the visual device is configured to determine an action associated with the detected gesture. The determined action is based on one or more aspects of the augmented reality display. (FIG. 3B and FIG. 34B provide non-limiting examples on determining the action associated with the gesture.) The action associated with the detected gesture is performed, where the performing of the action modifies the subset of data based on information relating to the user interactive area.

Figure 1E:
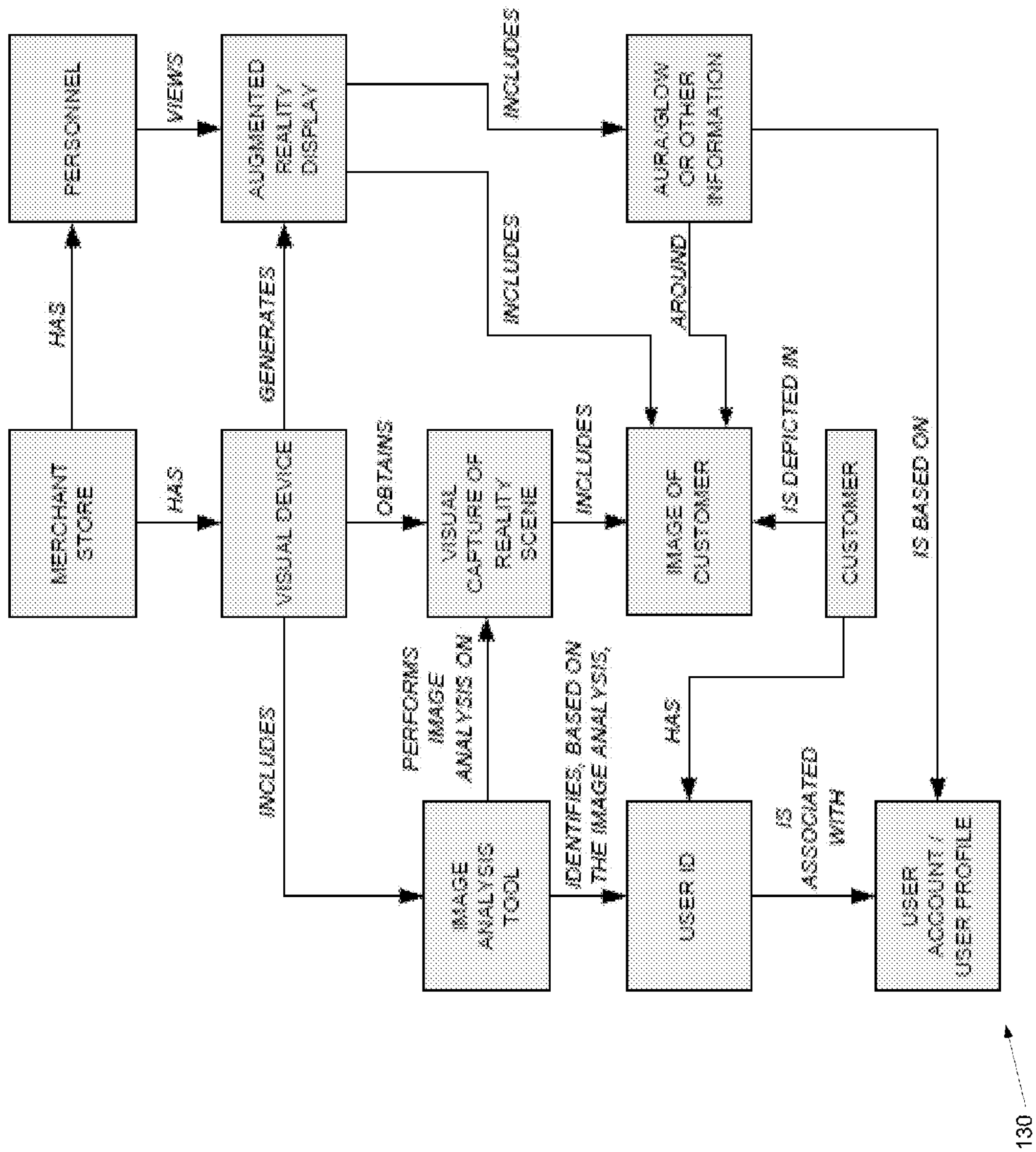

FIG. 1E illustrates at 130 aspects of an example system for generating an augmented reality display that is viewed by personnel of a merchant store. A visual capture of a reality scene is obtained via a visual device, where the visual capture includes an image of a customer. The visual device is operated by a merchant store. (FIGS. 12B, 12D, and 46A-46E provide non-limiting examples on obtaining the visual capture of the reality scene.) Image analysis is performed on the visual capture via an image analysis tool of the visual device. Based on the image analysis, an identifier for the customer that is depicted in the image is identified, where the identifier is associated with a user account of the customer. (FIGS. 12B, 12D, and 46A-46E provide non-limiting examples regarding the image analysis performed.)

The visual device generates an augmented reality display that includes i) the image of the customer, and ii) additional image data that surrounds the image of the customer. The augmented reality display is viewed by personnel of the merchant store. (FIGS. 15C, 15D, 16A-16F, 28, and 31A provide non-limiting examples regarding the augmented reality display.) The additional image data is based on the user account of the customer and is indicative of prior behavior by the customer. (FIGS. 15C, 15D, 16A-16F, 28, and 31A provide details on the additional image data.)

Figure 1F:
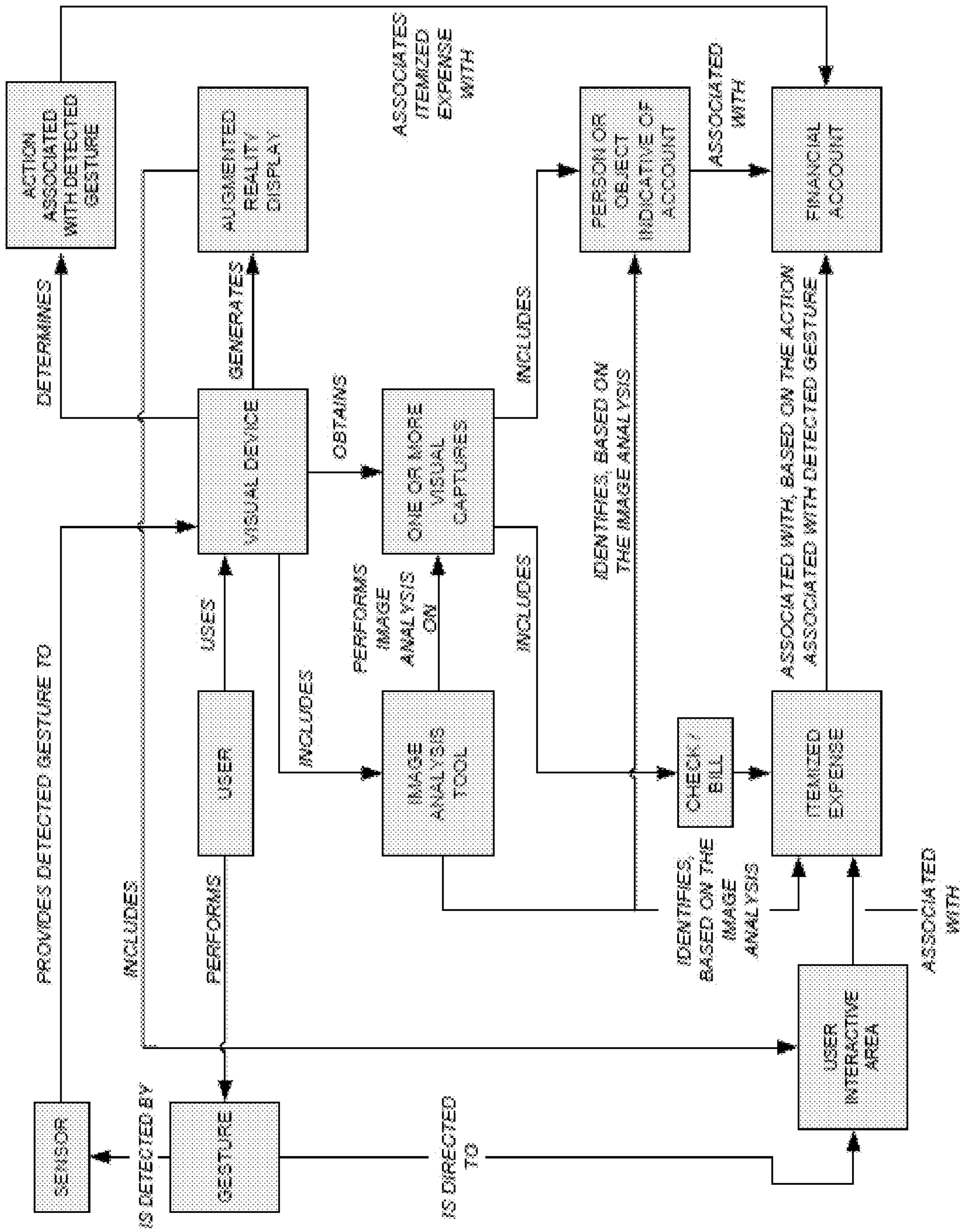

FIG. 1F illustrates at 140 aspects of an example system for generating an augmented reality display. One or more visual captures of a reality scene are obtained via a visual device. The one or more visual captures include i) a first image of a bill to be paid, and ii) a second image of a person or object that is indicative of a financial account. (FIGS. 7 and 9 and FIGS. 12B, 12D, and 46A-46E provide non-limiting examples on obtaining the visual capture of the reality scene.) Image analysis is performed on the one or more visual captures via an image analysis tool of the visual device. The financial account is identified based on the image analysis, and an itemized expense included on the bill to be paid is identified based on the image analysis. (FIGS. 7 and 9 and FIGS. 17, 29, 30, and 38 provide non-limiting examples regarding the image analysis and identification of the itemized expense.)

The visual device generates an augmented reality display that includes a user interactive area, where the user interactive area is associated with the itemized expense. (FIGS. 7 and 9 and FIGS. 17, 29, 30, and 38 provide non-limiting examples regarding the user interactive area associated with the itemized expense.) A sensor detects a gesture performed by a user of the visual device, where the gesture is directed to the user interactive area. (FIGS. 1, 2A, 2B, 3A, and 3B and FIGS. 32, 33A, 33B, 34A, and 34B provide non-limiting examples regarding the detection of gestures performed by the user.) The detected gesture is provided to the visual device, and the visual device is configured to determine an action associated with the detected gesture. (FIG. 3B and FIG. 34B provide non-limiting examples on determining the action associated with the detected gesture.) The action associated with the detected gesture is performed, where the performing of the action is configured to associate the itemized expense with the financial account. (FIGS. 6A-6C, 7, and 9 and FIGS. 12F, 17, 29, 30, 37A-37C, 38, and 40 provide non-limiting examples regarding the use of gestures to associate the itemized expense with the financial account.)

Figure 1G:
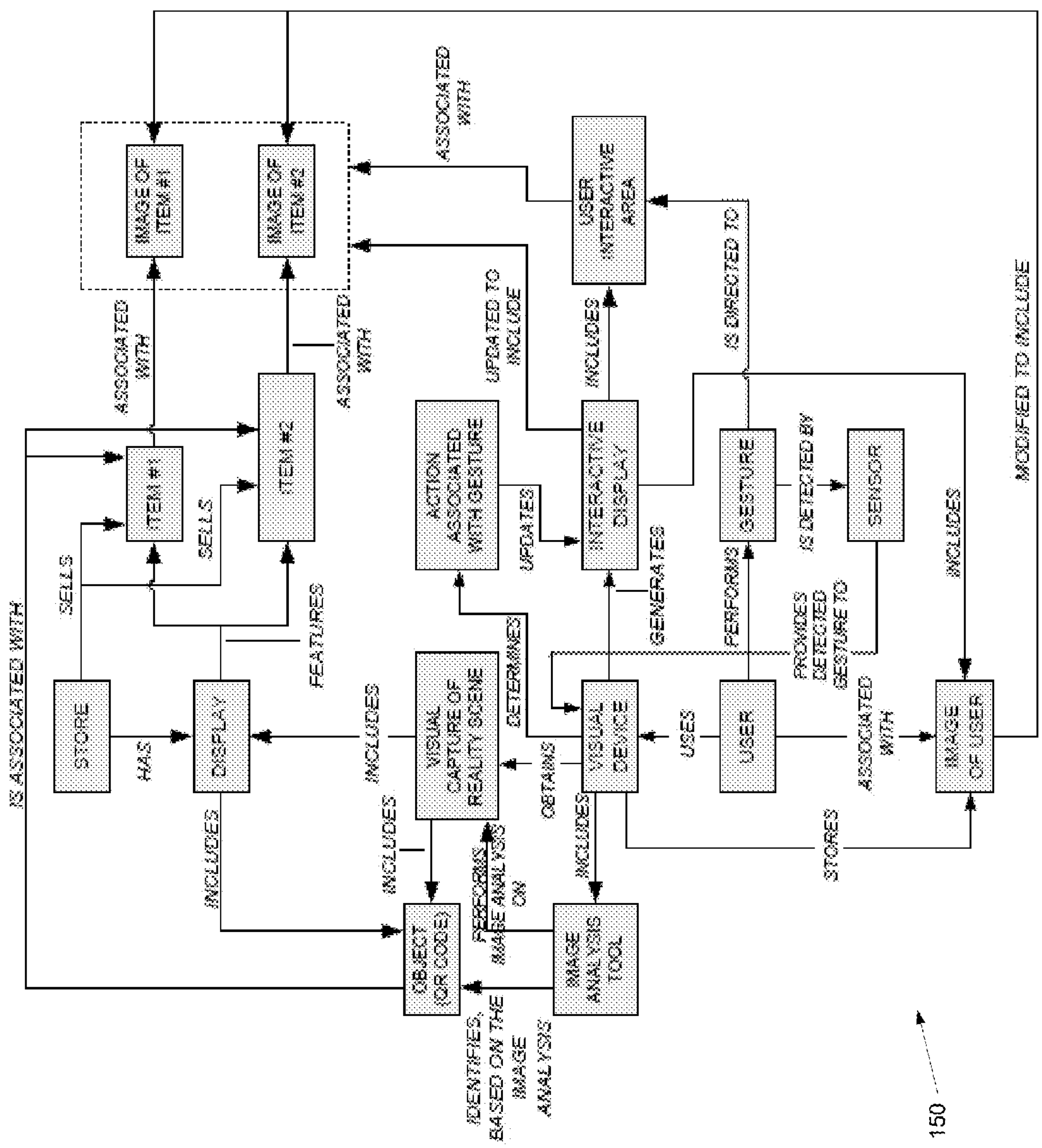

FIG. 1G illustrates at 150 aspects of an example system for generating an interactive display for shopping. A visual capture of a reality scene is obtained via a visual device. The visual capture includes i) an image of a store display of a merchant store, and ii) an object that is associated with a first item and a second item. (FIGS. 12B, 12D, and 46A-46E provide non-limiting examples on obtaining the visual capture of the reality scene.) The merchant store sells the first item and the second item, and the store display includes the first item and the second item. Image analysis is performed on the visual capture via an image analysis tool of the visual device, where the object is identified in the visual capture based on the image analysis. (FIGS. 12B, 12D, and 46A-46E provide non-limiting examples regarding the identification of the object based on the image analysis.)

An image of a user is stored at the visual device, where the visual device is operated by the user or worn by the user. (FIGS. 4B, 4C, 5B, 8, and 10 and FIGS. 35B, 35C, 36B, 39, and 41 provide non-limiting examples on the storing of the image of the user at the visual device.) An interactive display is generated at the visual device, where the interactive display includes the image of the user and one or more user interactive areas. The one or more user interactive areas are associated with an image of the first item or an image of the second item. A gesture performed by the user is detected via a sensor, where the detected gesture is directed to the one or more user interactive areas. (FIGS. 1, 2A, 2B, 3A, and 3B and FIGS. 32, 33A, 33B, 34A, and 34B provide non-limiting examples regarding the detection of the gesture performed by the user.)

The detected gesture is provided to the visual device. An action associated with the gesture is determined, and the action is performed at the visual device. The performing of the action updates the interactive display based on the image of the first item or the image of the second item. The updating of the interactive display causes the image of the user to be modified based on the image of the first item or the image of the second item. (FIGS. 4B, 4C, 5B, 8, and 10 and FIGS. 35B, 35C, 36B, 39, and 41 provide non-limiting examples on the updating of the interactive display to cause the image of the user to be modified based on the image of the first item or the image of the second item.)

Figure 1H:
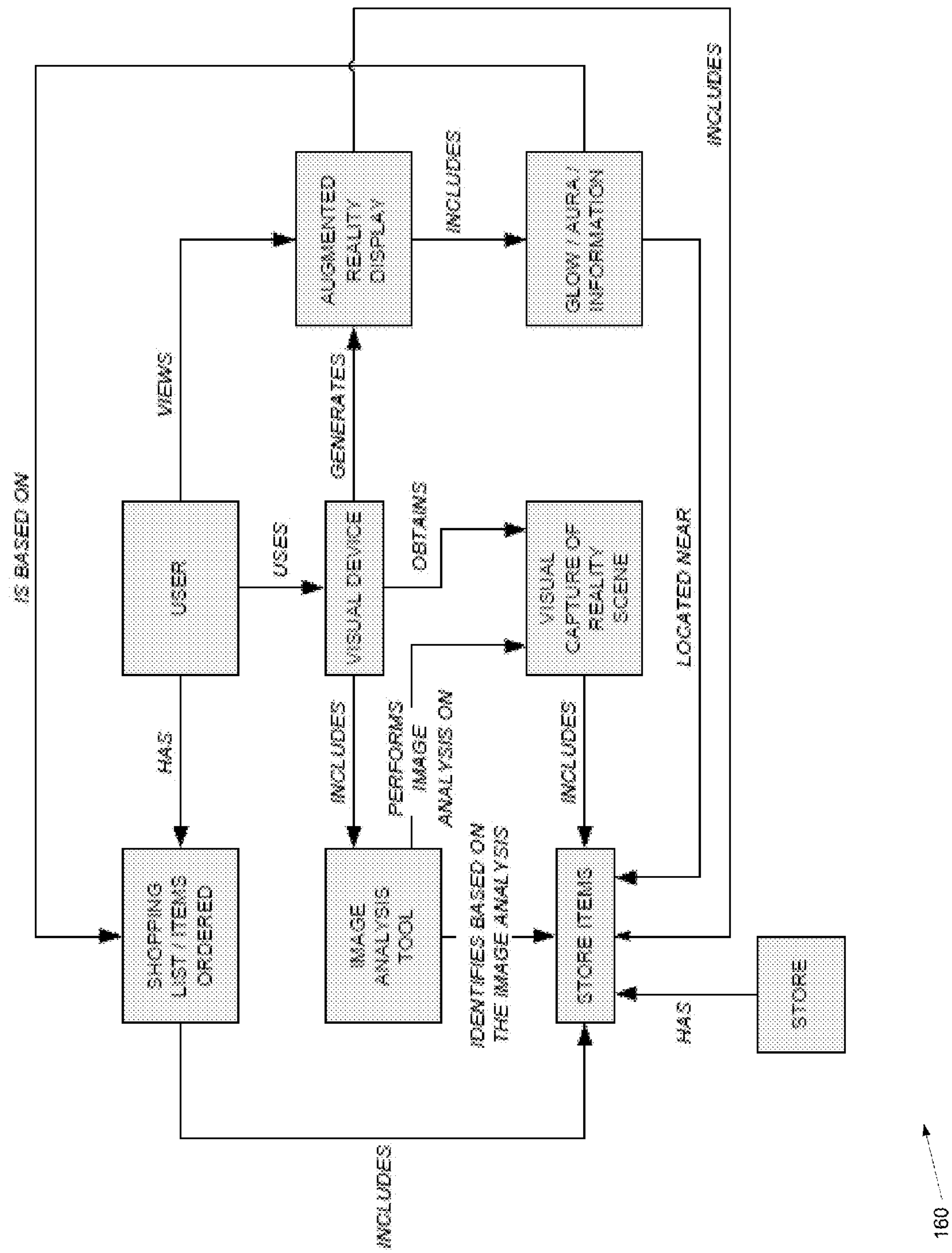

FIG. 1H illustrates at 160 aspects of an example system for generating an augmented reality display for shopping. A visual capture of a reality scene is obtained via a visual device, where the visual capture includes an image of an item sold by a merchant store. (FIGS. 12B, 12D, and 46A-46E provide non-limiting examples on obtaining the visual capture of the reality scene.) Image analysis on the visual capture is performed via an image analysis tool of the visual device. The item sold by the merchant store is identified based on the image analysis. (FIGS. 12B, 12D, and 46A-46E provide non-limiting examples regarding the identification of the item based on the image analysis.)

An augmented reality display is generated at the visual device. The augmented reality display includes i) the image of the item sold by the merchant store, and ii) additional image data that surrounds the image of the item. (FIGS.

12D-12F, 16A-16F, 28, and 31A provide non-limiting examples regarding the generation of the augmented reality display.) The additional image data that surrounds the image of the item is based on a list of one or more store items that is associated with a user. The list of the one or more store items includes the item sold by the merchant store, and the visual device is operated by the user or worn by the user. (FIGS. 16A-16F, 28, and 31A provide non-limiting examples regarding the additional image data that is based on the list.)

Figure 1I:
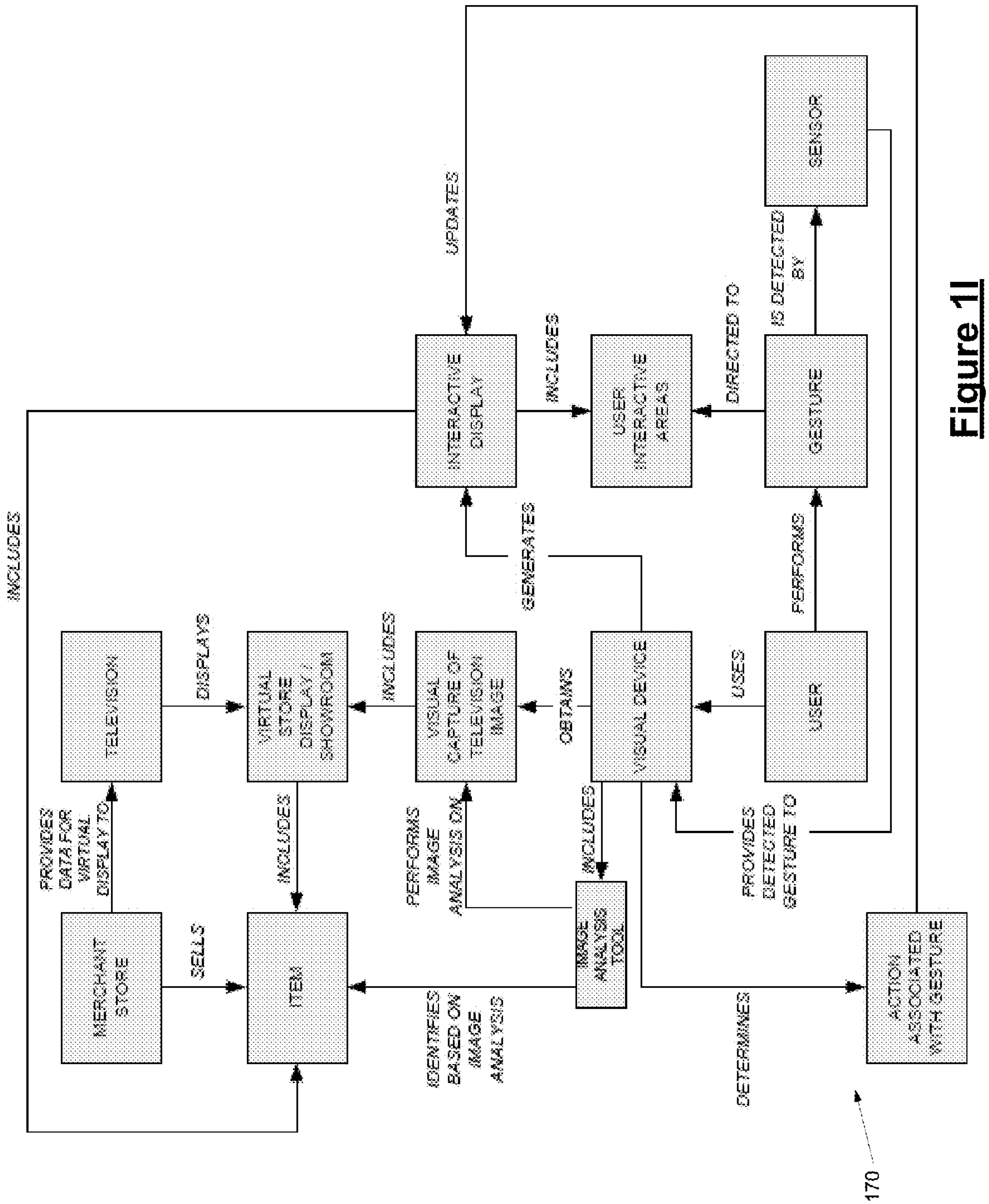
Figure 49:
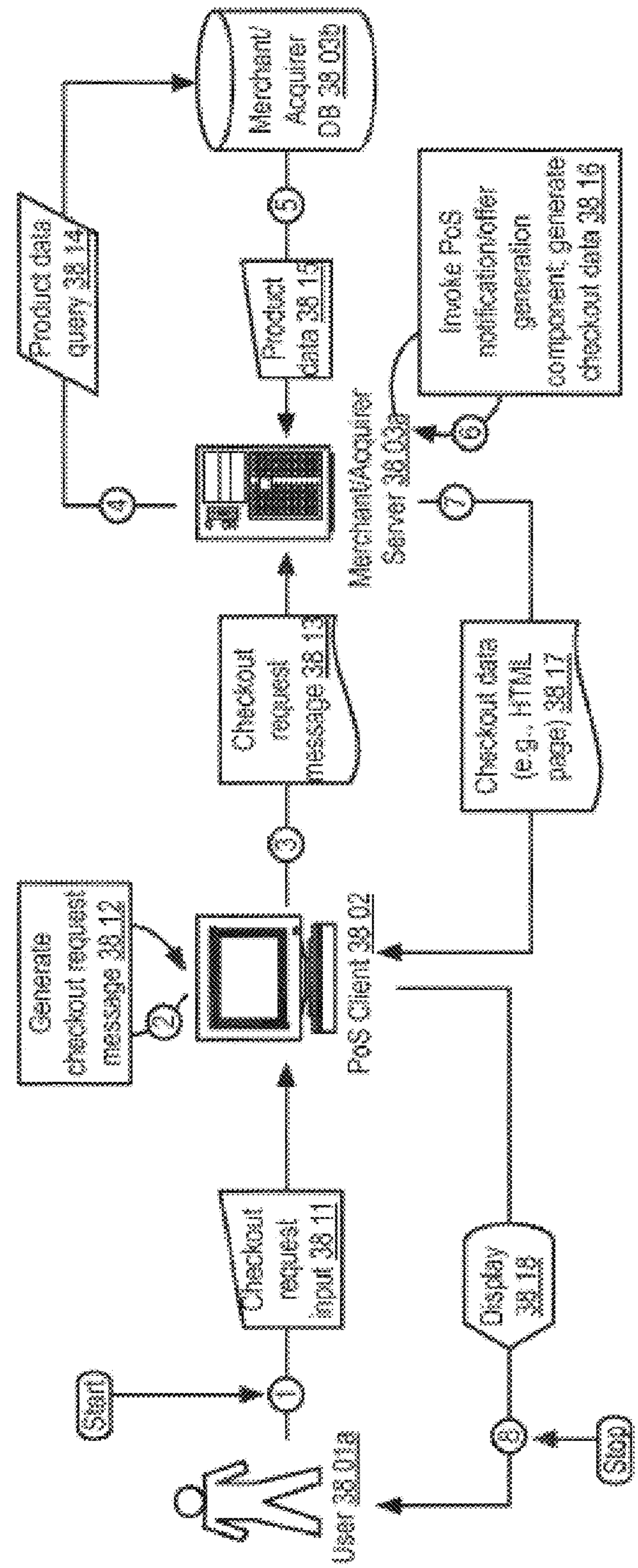
FIG. 49 shows a data flow diagram illustrating an example user purchase checkout procedure in some embodiments of the V-GLASSES.

FIG. 1I illustrates at 170 aspects of an example system for generating an interactive display for shopping. A virtual store display is displayed at a television, where the virtual store display includes an image of an item. A merchant store sells the item, and the merchant store provides data to the television to generate the virtual store display. (FIG. 49 provides non-limiting examples regarding the use of the television to display the virtual store display.) A visual capture of the television is obtained via a visual device, where the visual capture includes at least a portion of the virtual store display. (FIGS. 12B, 12D, and 46A-46E provide non-limiting examples on obtaining the visual capture.) Image analysis is performed on the visual capture via an image analysis tool of the visual device. The image of the item is identified in the visual capture based on the image analysis. (FIGS. 12B, 12D, and 46A-46E provide non-limiting examples regarding the image analysis.)

An interactive display is generated at the visual device. The interactive display includes a user interactive area and a second image of the item. A gesture performed by a user is detected via a sensor, where the gesture is directed to the user interactive area of the interactive display. (FIGS. 1, 2A, 2B, 3A, and 3B and FIGS. 12F, 32, 33A, 33B, 34A, and 34B provide non-limiting examples regarding the detection of gestures performed by the user.) The detected gesture is provided to the visual device. An action associated with the detected gesture is determined at the visual device. (FIG. 3B and FIG. 34B provide non-limiting examples regarding determining the action associated with the gesture.) The action associated with the detected gesture is performed, where the performing of the action updates the interactive display.

Figure 2A:
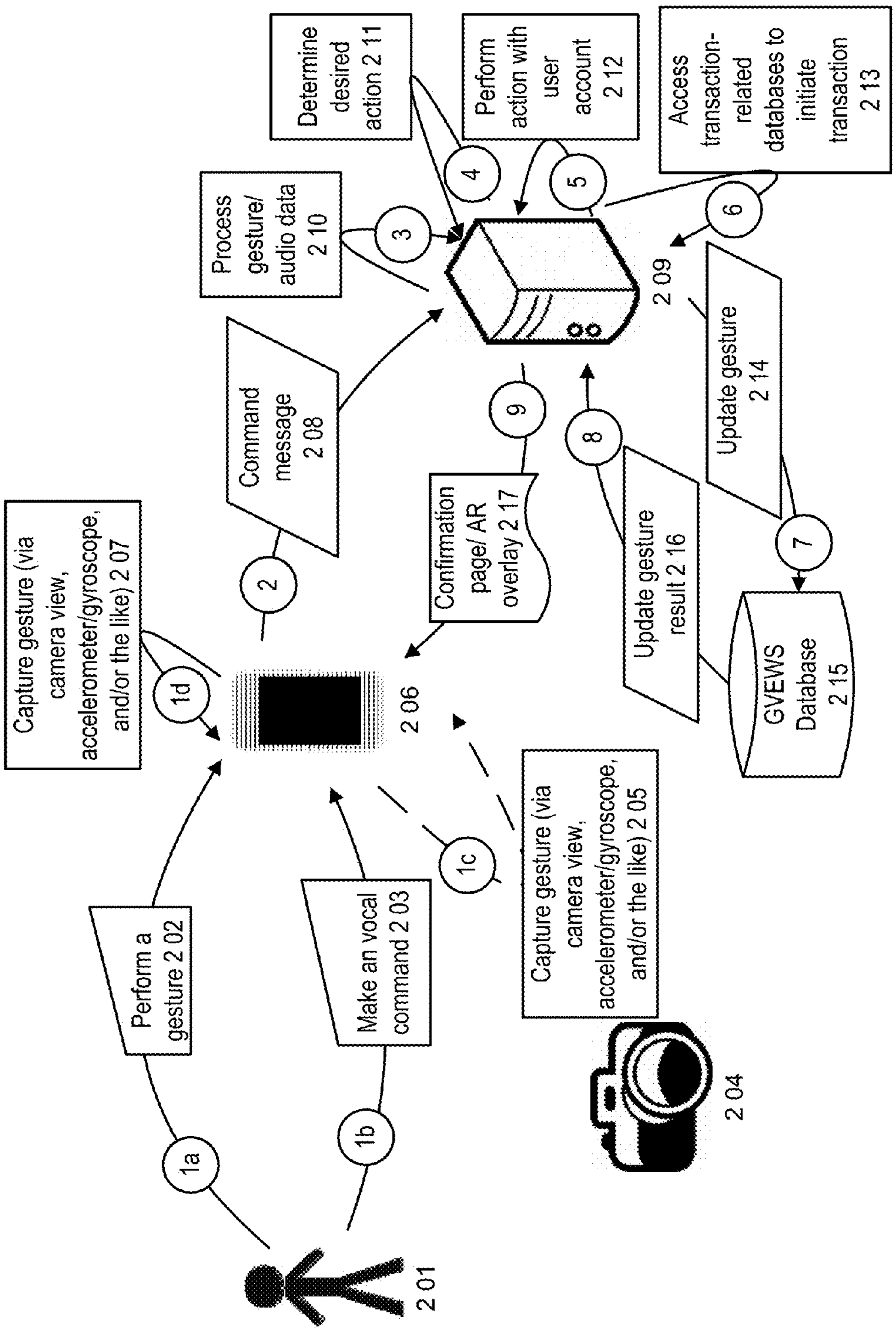
FIGS. 2*a*-2*b* show data flow diagrams illustrating processing gesture and vocal commands in some embodiments of the MDGAAT.
Figure 2B:
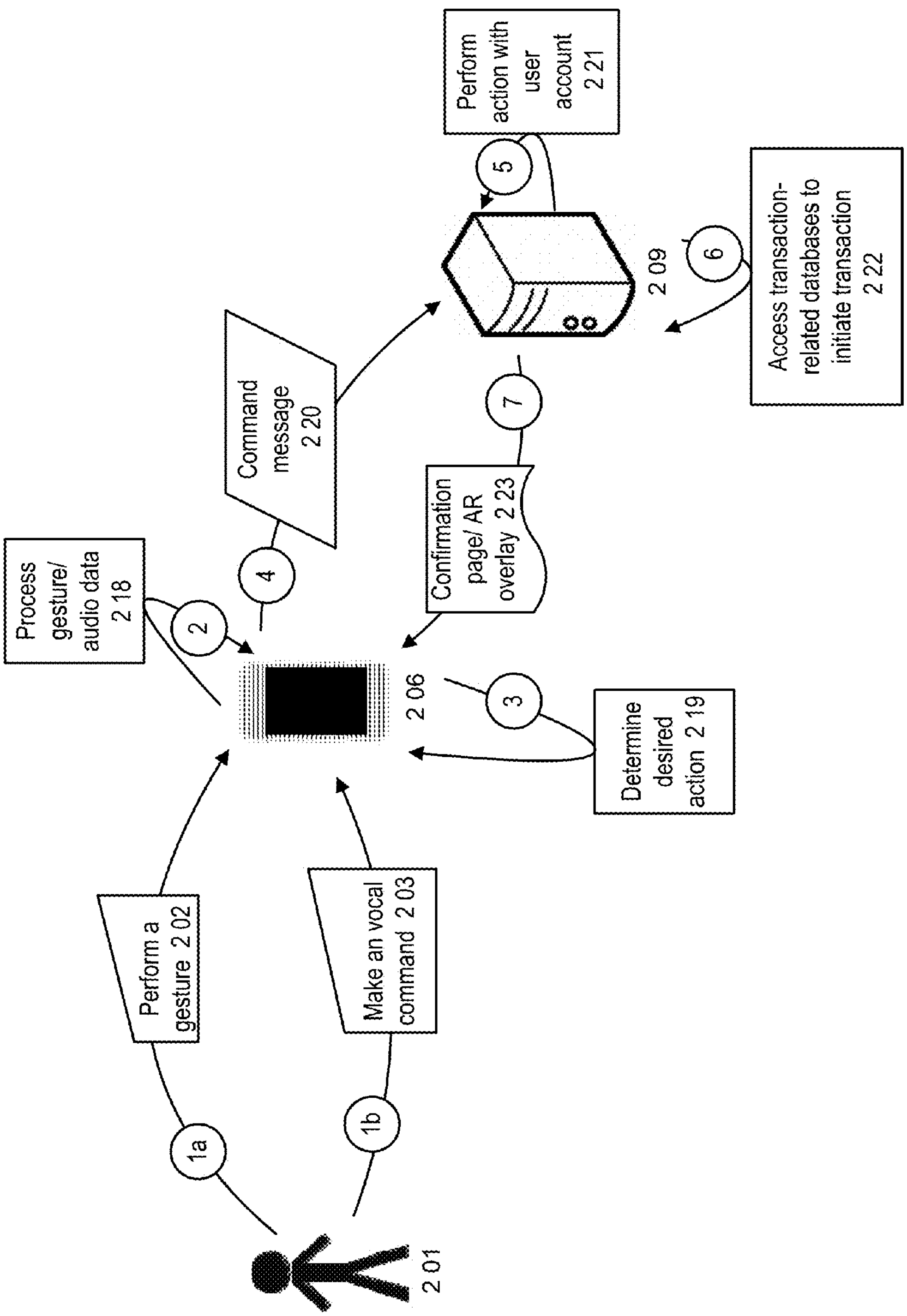

FIGS. 2A-B show data flow diagrams illustrating processing gesture and vocal commands in some embodiments of the MDGAAT. In some implementations the user 201 may initiate an action by providing both a physical gesture 202 and a vocal command 203 to an electronic device 206. In some implementations, the user may use the electronic device itself in the gesture; in other implementations, the user may use another device (such as a payment device), and may capture the gesture via a camera on the electronic device 207, or an external camera 204 separate from the electronic device 205. In some implementations, the camera may record a video of the device; in other implementations, the camera may take a burst of photos. In some implementations, the recording may begin when the user presses a button on the electronic device indicating 9 that the user would like to initiate an action; in other implementations, the recording 10 may begin as soon as the user enters a command application and begins to speak. The recording may end as soon as the user stops speaking, or as soon as the user presses a 12 button to end the collection of video or image data. The electronic device may then send 13 a command message 208 to the MDGAAT database, which may include the gesture and 14 vocal command obtained from the user.

In some implementations, an exemplary XML-encoded command message 208 may take a form similar to the following:

```
POST /command_message.php HTTP/1.1
Host: www.DCMCPproccess.com
Content-Type: Application/XML
Content-Length: 788
<?XML version = "1.0" encoding "UTF-8"?>
<command_message>
<timestamp>2016-01-01 12:30:00</timestamp>
  <command_params>
  <gesture_accel>
      <x>1.0, 2.0, 3.1, 4.0, 5.2, 6.1, 7.1, 8.2, 9.2, 10.1</x>
    <y>1.5, 2.3, 3.3, 4.1, 5.2, 6.3, 7.2, 8.4, 9.1, 10.0</y>
  </gesture accel>
  <gesture gyro>1, 1, 1, 1, 1, 0,−1,−1,−1, −1</gesture gyro >
  <gesture finger>
  <finger_image>
    <name> gesture1 </name>
    <format> JPEG </format>
    <compression> JPEG compression </compression>
    <size> 123456 bytes </size>
    <x-Resolution> 72.0 </x-Resolution>
    <y-Resolution> 72.0 </y-Resolution>
    <date time> 2014:8:11 16:45:32 </date time>
    <color>greyscale</color>
          ...
    <content> yoya JFIF H H ICC_PROFILE appl
  mntrRGB XYS o $ acspAPPL
  desc P bdscm $cprt -----------------------------------@ $wtpt
  -------------------d rXYZ ------------------------x gXYZ
----------------------------D bXYZ -------------------------------rTRC
--------------------------' aarg A vcgt ---
    </content>
  ...
  </image_info>
  <x>1.0, 2.0, 3.1, 4.0, 5.2, 6.1, 7.1, 8.2, 9.2, 10.1</x>
  <y>1.5, 2.3, 3.3, 4.1, 5.2, 6.3, 7.2, 8.4, 9.1, 10.0</y>
  </gesture finger>
  <gesture video xm1 content-type="mp4">
  <key>fi1ename</key><string>gesture1.mp4</string>
  <key>Kind</key><string>h.264/MPEG-4 video fi1e</string>
  <key>Size</key><integer>1248163264</integer>
  <key>Total Time</key><integer>20</integer>
  <key>Bit Rate</key><integer>9000</integer>
  <content>A@6A=2:\n'lia © ™O [o"itr l'uu4± (_u iuao%niy-
  "r6ceCuCE2:\y%a v i !zJ J {%ifioU) >abe" lo 1. Fee& v Aol:,
8Saa-
.iA:ievAn-
      o::<'lih 1, £JvD 8%o6"IZU >vA"bJ%oaN ™Nwg ®x$6V§1Q-
  j .aTlMCF)2:: A, xAOoOIQkCEtQOc;OO: JOAN"no72:qt-,..jA € 6"
  f 4 0 0
 6oAi Zuc I e 'Tfi7AV/G 'l[O [g ©'Fa a± o Uo
  a )1§/'J AA'
  ,vao ™/e£wc;
  </content>
  <gesture_video>
  <command_audio content-type="mp4">
  <key>filename</key><string>vocal command1.mp4</string>
  <key>Kind</key><string>MPEG-4 audio file</string>
  <key>Size</key><integer>2468101</integer>
  <key>Total Time</key><integer>20 </integer>
```

-continued

```
    <key>Bit Rate</key><integer>128</integer>
    <key>Sample Rate</key><integer>44100</integer>
    <content>A@6A=2:\n'lia © ™O [o"itr l'uu4± (_u iuao%niy-
  . Fee& v Aol:, 8Saa-.iA: ievAn-
  o:: <'lih 1, £JvD 8%o6"IZU >vA"bJ%oaN ™Nwg ®x$6V§lQ-
  j .aTlMCF)2:: A, xAOoOIQkCEtQOc;OO: JOAN"no72:qt-,..jA€ 6"
  f 4 0 0
6oAi Zuc I e 'Tfi7AV/G 'l[O [g ©'Fa a± o Uo
  a )1§/'J AA'
  ,vao ™/e£wc;
      </content>
      </command audio>
      </command_params>
    </user_params>
      <user id>123456789 </user id>
      <wallet id>9988776655</wallet id>
      <device_id>j3h25j45gh647hj</device id>
      <date of request>2015-12-31</date of request>
    </user_params>
  </command_message>
```

In some implementations, the electronic device may reduce the size of the vocal file by cropping the audio file to when the user begins and ends the vocal command. In some implementations, the MDGAAT may process the gesture and audio data 210 in order to determine the type of gesture performed, as well as the words spoken by the user. In some implementations, a composite gesture generated from the processing of the gesture and audio data may be embodied in an XML-encoded data structure similar to the following:

```
<composite gesture>
  <user params>
    <user id>123456789</user id>
    <wallet id>9988776655</wallet id>
    <device id>j3h25j45gh647hj</device id>
  </user_params>
  <object params></object params>
  <finger params>
    <finger image>
      <name>gesture1 </name>
      <format>JPEG </format>
      <compression> JPEG compression </compression>
      <size> 123456 bytes </size>
      <x-Resolution> 72.0 </x-Resolution>
      <y-Resolution> 72.0 </y-Resolution>
      <date time> 2014:8:1116:45:32 </date time>
      <color>greyscale</color>
      ...
      <content>yoya JFIF H H ya'ICC PROFILE
    $ acspAPPL ob6-appl oappl
    desc P bdscm Scprt-----------------------@ $wtpt
  ------------------------d rXYZ x
  bXYZ gXYZ rTRC
  </content>
    </finger image>
    <x>1.0, 2.0, 3.1, 4.0, 5.2, 6.1, 7.1, 8.2, 9.2, 10.1</x>
    <y>1.5, 2.3, 3.3, 4.1, 5.2, 6.3, 7.2, 8.4, 9.1, 10.0</y>
  </finger_params>
  <touch_params></touch_params>
  <qr object_params>
    <qr image>
      <name> qr1 </name>
      <format> JPEG </format>
      <compression> JPEG compression </compression>
      <size> 123456 bytes </size>
      <x-Resolution> 72.0 </x-Resolution>
      <y-Resolution> 72.0 </y-Resolution>
      <date time> 2014:8:11 16:45:32 </date time>
      ...
      <content> yoya JFIF H H ya'ICC PROFILE
    $ acspAPPL ob6-app1
    mntrRGB XYZ U
    desc P bdscm
  Scprt -------------------------@ $wtpt oapp1
    ------------------------d rXYZ--------------------------X gXYZ
    --------------------------------------- aarg
      </content>
    ...
    </qr image>
    <QR_content>"John Doe, 1234567891011121, 2014:8:11,
098"</QR_content>
    </qr_object_params>
    <voice_params></voice_params>
  </composite_gesture>
```

In some implementations, fields in the composite gesture data structure may be left blank depending on whether the particular gesture type (e.g., finger gesture, object gesture, and/or the like) has been made. The MDGAAT may then match 211 the gesture and the words to the various possible gesture types stored in the MDGAAT database. In some implementations, the MGDAAT may query the database for particular disparate gestures in a manner similar to the following:

```
  <?php
    ...
      $fingergesturex = "3.1, 4.0, 5.2, 6.1, 7.1, 8.2, 9.2";
      $fingergesturey = "3.3, 4.1, 5.2, 6.3, 7.2, 8.4, 9.1";
      $fingerresult = mysql_query("SELECT finger_gesture_type
FROM finger_gesture WHERE gesture_x= '%s 1 AND gesture_y= '%s1 ",
  mysql_real_escape_string($fingergesturex)
    >
```

In some implementations, the result of each query in the above example may be used to search for the composite gesture in the Multi-Disparate Gesture Action (MDGA) table of the database. For example, if $fingerresult is "tap check," $objectresult is "swipe," and $voiceresult is "pay total of check with this payment device," MDGAAT may search the MDGA table using these three results to narrow down the precise composite action that has been performed. If a match is found, the MDGAAT may request confirmation that the right action was found, and then may perform the action 212 using the user's account. In some implementations, the MDGAAT may access the user's financial information and account 213 in order to perform the action. In some implementations, MDGAAT may update a gesture table 214 in the MDGAAT database 215 to refine models for usable gestures based on the user's input, to add new gestures the user has invented, and/or the like. In some implementations, an update 214 for a finger gesture may be performed via a PHP/MySQL command similar to the following:

```
<?php
  ...
  $fingergesturex = "3.1, 4.0, 5.2, 6.1, 7.1, 8.2, 9.2";
  $fingergesturey = "3.3, 4.1, 5.2 , 6.3 , 7.2 , 8.4 , 9.1";
  $fingerresult = mysql_query("UPDATE gesture_x 1 gesture_y
```

-continued

```
FROM finger_gesture WHERE gesture_x= '%s' AND gesture_y= '%s'",
mysql_real_escape_string ($fingergesturex) ,
     mysql_real_escape_string($fingergesturey) );
  >
```

After successfully updating the table 216, the MDGAAT may send the user to a confirmation page 217 (or may provide an augmented reality (AR) overlay to the user) which may indicate that the action was successfully performed. In some implementations, the AR overlay may be provided to the user through use of smart glasses, contacts, and/or a like device (e.g. Google Glasses).

As shown in FIG. 2*b*, in some implementations, the electronic device 206 may process the audio and gesture data itself 218, and may also have a library of possible gestures that it may match 219 with the processed audio and gesture data to. The electronic device may then send in the command message 220 the actions to be performed, rather than the raw gesture or audio data. In some implementations, the XML-encoded command message 220 may take a form similar to the following:

```
  POST /command_message.php HTTP/1.1 Host:
www.DCMCPproccess.com
  Content-Type: Application/XML
  Content-Length: 788
  <?XML version = "1.0" encoding = "UTF-8"?>
  <command_message>
    <timestamp>2016-01-01 12:30:00</timestamp>
    <command_params>
      <gesture_video>swipe_over_receipt</gesture_video>
      <command_audio>"Pay total with active wallet.
"</command audio>
    </command_params>
    </user_params>
      <user id>123456789</user id>
      <wallet id>9988776655</wallet id>
      <device_id>j3h25j45gh647hj</device id>
      <date_of_request>2015-12-31</date of request>
    </user params>
  </command_message>
```

The MDGAAT may then perform the action specified 221, accessing any information necessary to conduct the action 222, and may send a confirmation page or AR overlay to the user 223. In some implementations, the XML-encoded data structure for the AR overlay may take a form similar to the following:

```
  <?XML version = "1.0" encoding = "UTF-8"?> <virtual label>
    <label id> 4NFU4RG94 </label id>
    <timestamp>2014-02-22 15:22:41</timestamp>
    <user-id>123456789</user -id>
    <frame>
      <x-range> 1024 </x-range>
      <y-range> 768 </y-range>
    </frame>
    <object>
      <type> confirmation </type>
      <position>
        <x start> 102 <x start>
        <x-end> 743</x-end>
        <y_start> 29 </y_start>
        <y_end> 145 </y_end>
      </position>
      </object>
```

-continued

```
      <information>
      <text> "You have successfully paid the total using your active
wallet." </text>
    </information>
    <orientation> horizontal </orientation>
    <format>
    <template_id> ConfirmOOl </template_id>
    <label_type> oval callout </label_type>
    <font> ariel </font>
    <font_size> 12 pt </font size>
    <font color> Orange </font_color>
    <overlay_type> on top </overlay_type>
    <transparency> 50% </transparency>
    <background_color> 255 255 0 </background_color>
    <label size>
    <shape> oval </shape>
    <long_axis> 60 </long axis>
    <short axis> 40 </short axis>
    <object_offset> 30 </object_offset>
    </label size>
    </format>
    <injection position>
      <X coordinate> 232 </X coordinate>
      <Y coordiante> 80 </Y coordinate>
    </injection_position>
  </virtual label>
```

Figure 3A:
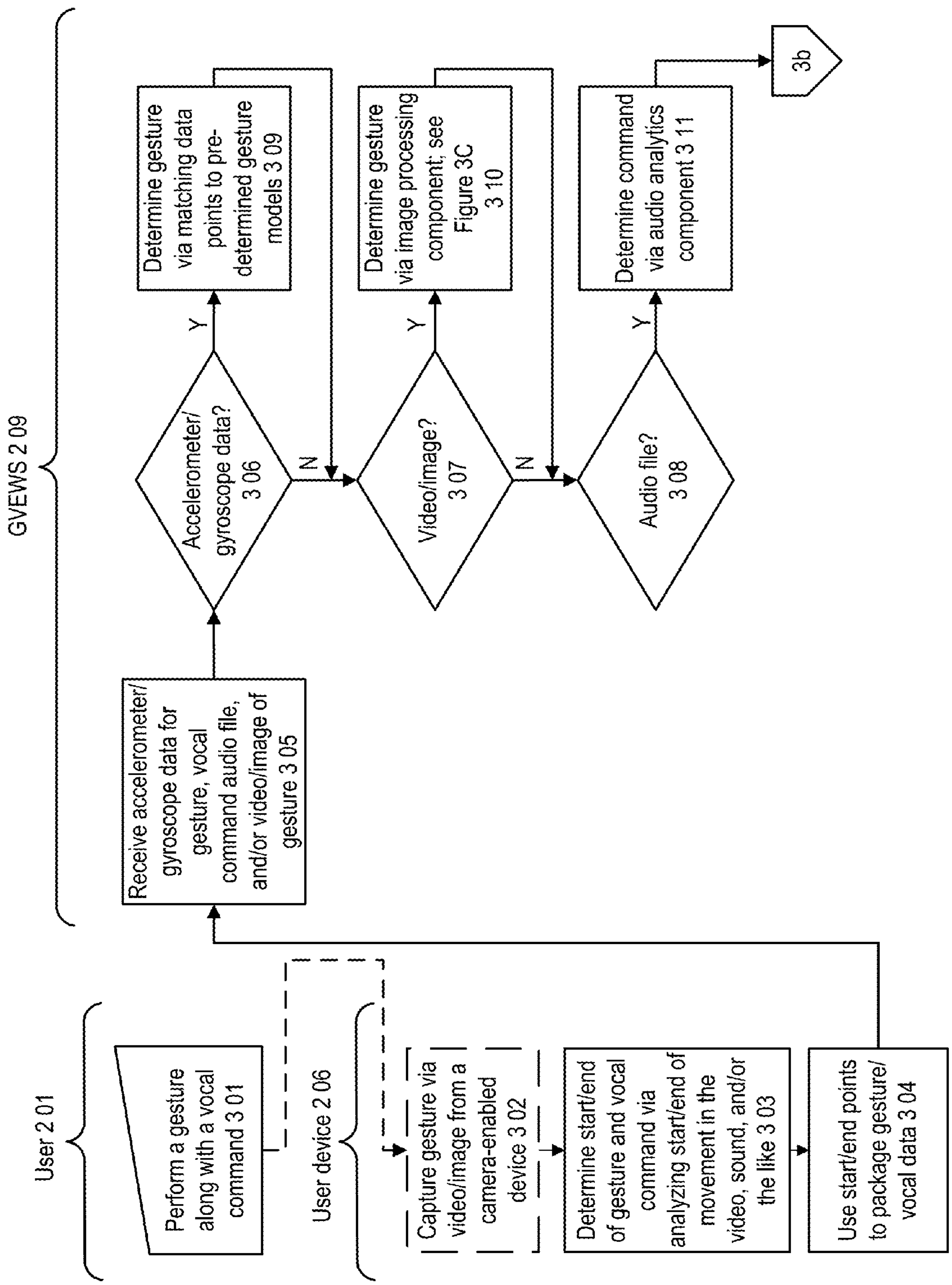
FIGS. 3*a*-3*c* show logic flow diagrams illustrating processing gesture and vocal commands in some embodiments of the MDGAAT.
Figure 3B:
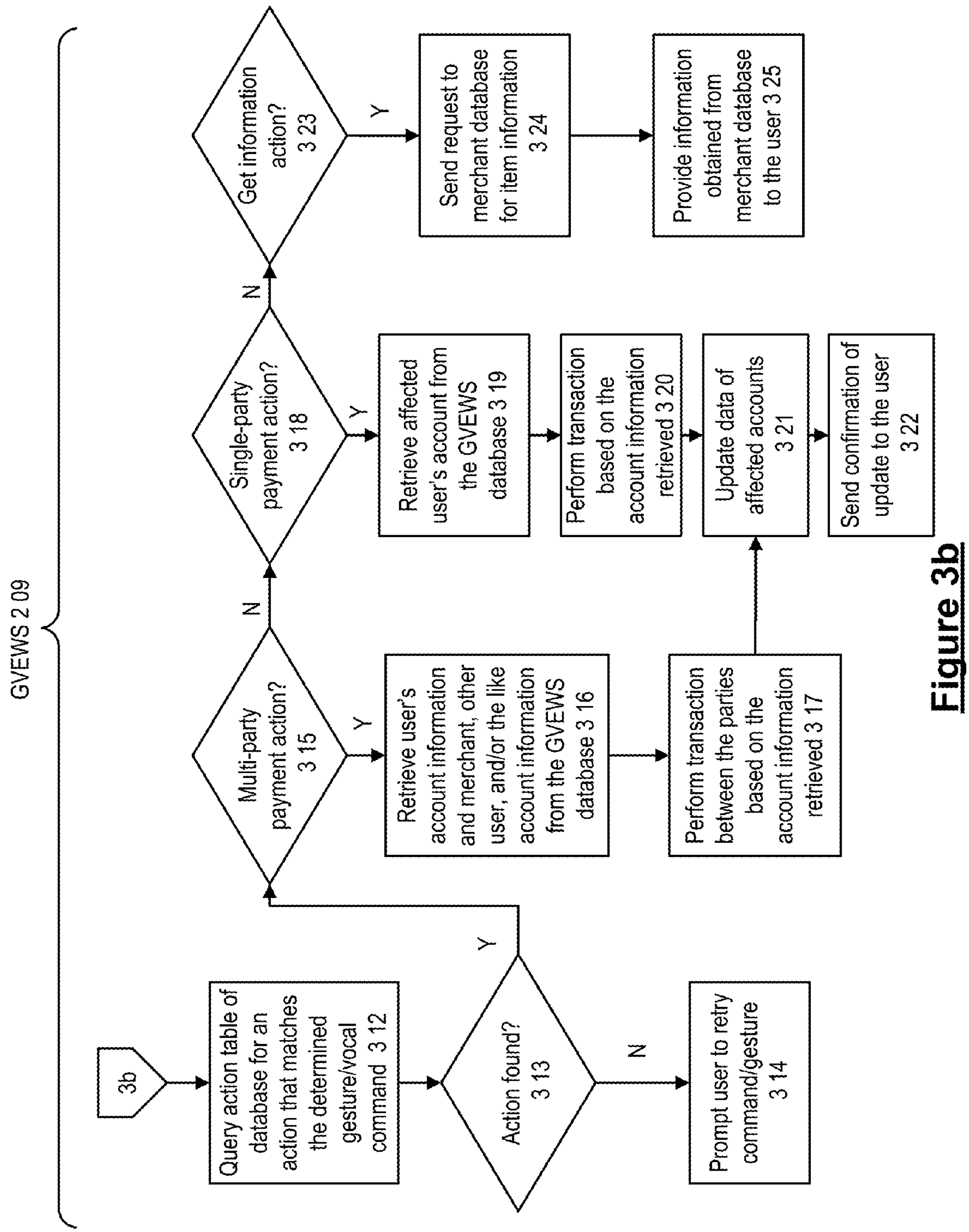
Figure 3C:
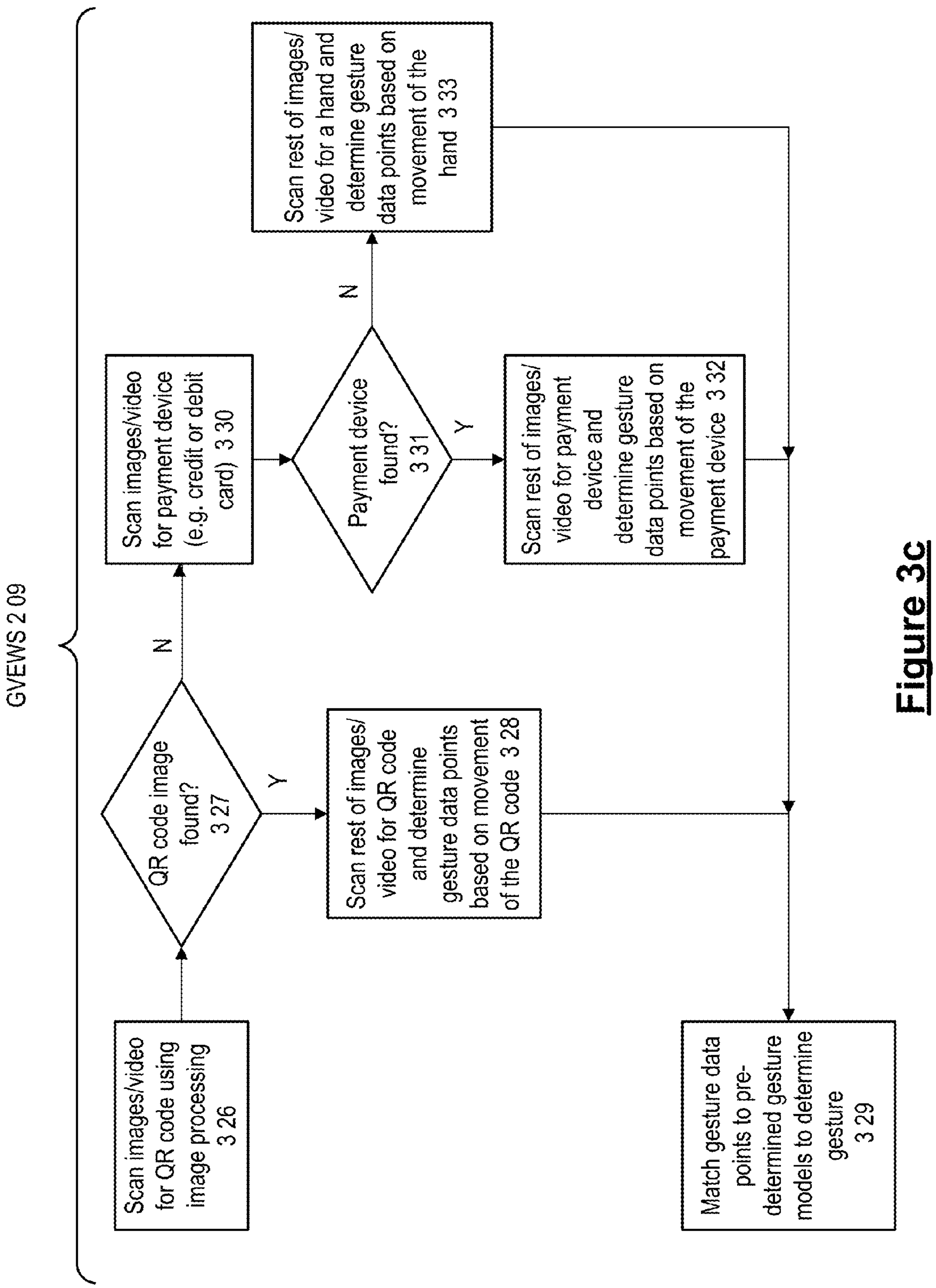

FIGS. 3*a*-3*c* show logic flow diagrams illustrating processing gesture and vocal commands in some embodiments of the MDGAAT. In some implementations, the user 201 may perform a gesture and a vocal command 301 equating to an action to be performed by MDGAAT. The user's device 206 may capture the gesture 302 via a set of images or a full video recorded by an on-board camera, or via an external camera-enabled device connected to the user's device, and may capture the vocal command via an on-board microphone, or via an external microphone connected to the user's device. The device may determine when both the gesture and the vocal command starts and ends 303 based on when movement in the video or images starts and ends, based on when the user's voice starts and ends the vocal command, when the user presses a button in an action interface on the device, and/or the like. In some implementations, the user's device may then use the start and end points determined in order to package the gesture and voice data 304, while keeping the packaged data a reasonable size. For example, in some implementations, the user's device may eliminate some accelerometer or gyroscope data, may eliminate images or crop the video of the gesture, based on the start and end points determined for the gesture. The user's device may also crop the audio file of the vocal command, based on the start and end points for the vocal command. This may be performed in order to reduce the size of the data and/or to better isolate the gesture or the vocal command. In some implementations, the user's device may package the data without reducing it based on start and end points.

In some implementations, MDGAAT may receive 305 the data from the user's device, which may include accelerometer and/or gyroscope data pertaining to the gesture, a video and/or images of the gesture, an audio file of the vocal command, and/or the like. In some implementations, MDGAAT may determine what sort of data was sent by the user's device in order to determine how to process it. For example, if the user's device provides accelerometer and/or gyroscope data 306, MDGAAT may determine the gesture performed by matching the accelerometer and/or gyroscope data points with pre-determined mathematical gesture models 309. For example, if a particular gesture would generate accelerometer and/or gyroscope data that would fit a linear gesture model, MDGAAT will determine whether the received accelerometer and/or gyroscope data matches a linear model.

If the user's device provides a video and/or images of the gesture 307, MDGAAT may use an image processing component in order to process the video and/or images 310 and determine what the gesture is. In some implementations, if a video is provided, the video may also be used to determine the vocal command provided by the user. As shown in FIG. 3*c*, in one example implementation, the image processing component may scan the images and/or the video 326 for a Quick Response (QR) code. If the QR code is found 327, then the image processing component may scan the rest of the images and/or the video for the same QR code, and may generate data points for the gesture based on the movement of the QR code 328. These gesture data points may then be compared with pre-determined gesture models 329 in order to determine which gesture was made by the item with the QR code. In some implementations, if multiple QR codes are found in the image, the image processing component may ask the user to specify which code corresponds to the user's receipt, payment device, and/or other items which may possess the QR code. In some implementations, the image processing component may, instead of prompting the user to choose which QR code to track, generate gesture data points for all QR codes found, and may choose which is the correct code to track based on how each QR code moves (e.g., which one moves at all, which one moves the most, and/or the like). In some implementations, if the image processing component does not find a QR code, the image processing component may scan the images and/or the vide for a payment device 330, such as a credit card, debit card, transportation card (e.g., a New York City Metro Card), gift card, and/or the like. If a payment device can be found 331, the image processing component may scan 332 the rest of the images and/or the rest of the video for the same payment device, and may determine gesture data points based on the movement of the payment device. If multiple payment devices are found, either the user may be prompted to choose which device is relevant to the user's gesture, or the image processing component, similar to the QR code discussed above, may determine itself which payment device should be tracked for the gesture. If no payment device can be found, then the image processing component may instead scan the images and/or the video for a hand 333, and may determine gesture data points based on its movement. If multiple hands are detected, the image processing component may handle them similarly to how it may handle QR codes or payment devices. The image processing component may match the gesture data points generated from any of these tracked objects to one of the pre-determined gesture models in the MDGAAT database in order to determine the gesture made.

If the user's device provides an audio file 308, then MDGAAT may determine the vocal command given using an audio analytics component 311. In some implementations, the audio analytics component may process the audio file and produce a text translation of the vocal command. As discussed above, in some implementations, the audio analytics component may also use a video, if provided, as input to produce a text translation of the user's vocal command.

As shown in FIG. 3*b*, MDGAAT may, after determining the gesture and vocal command made, query an action table of a MDGAAT database 312 to determine which of the actions matches the provided gesture and vocal command combination. If a matching action is not found 313, then MDGAAT may prompt the user to retry the vocal command and the gesture they originally performed 314. If a matching action is found, then MDGAAT may determine what type of action is requested from the user. If the action is a multi-party payment-related action 315 (i.e., between more than one person and/or entity), MDGAAT may retrieve the user's account information 316, as well as the account information of the merchant, other user, and/or other like entity involved in the transaction. MDGAAT may then use the account information to perform the transaction between the two parties 317, which may include using the account IDs stored in each entity's account to contact their payment issuer in order to transfer funds, and/or the like. For example, if one user is transferring funds to another person (e.g., the first user owes the second person money, and/or the like), MDGAAT may use the account information of the first user, along with information from the second person, to initiate a transfer transaction between the two entities.

If the action is a single-party payment-related action 318 (i.e., concerning one person and/or entity transferring funds to his/her/itself), MDGAAT may retrieve the account information of the one user 319, and may use it to access the relevant financial and/or other accounts associated in the transaction. For example, if one user is transferring funds from a bank account to a refillable gift card owned by the same user, then MDGAAT would access the user's account in order to obtain information about both the bank account and the gift card, and would use the information to transfer funds from the bank account to the gift card 320.

In either the multi-party or the single-party action, MDGAAT may update 321 the data of the affected accounts (including: saving a record of the transaction, which may include to whom the money was given to, the date and time of the transaction, the size of the transaction, and/or the like), and may send a confirmation of this update 322 to the user.

If the action is related to obtaining information about a product and/or service 323, MDGAAT may send a request 324 to the relevant merchant database(s) in order to get information about the product and/or service the user would like to know more about. MDGAAT may provide any information obtained from the merchant to the user 325. In some implementations, MDGAAT may provide the information via an AR overlay, or via an information page or pop-up which displays all the retrieved information.

Figure 4A:
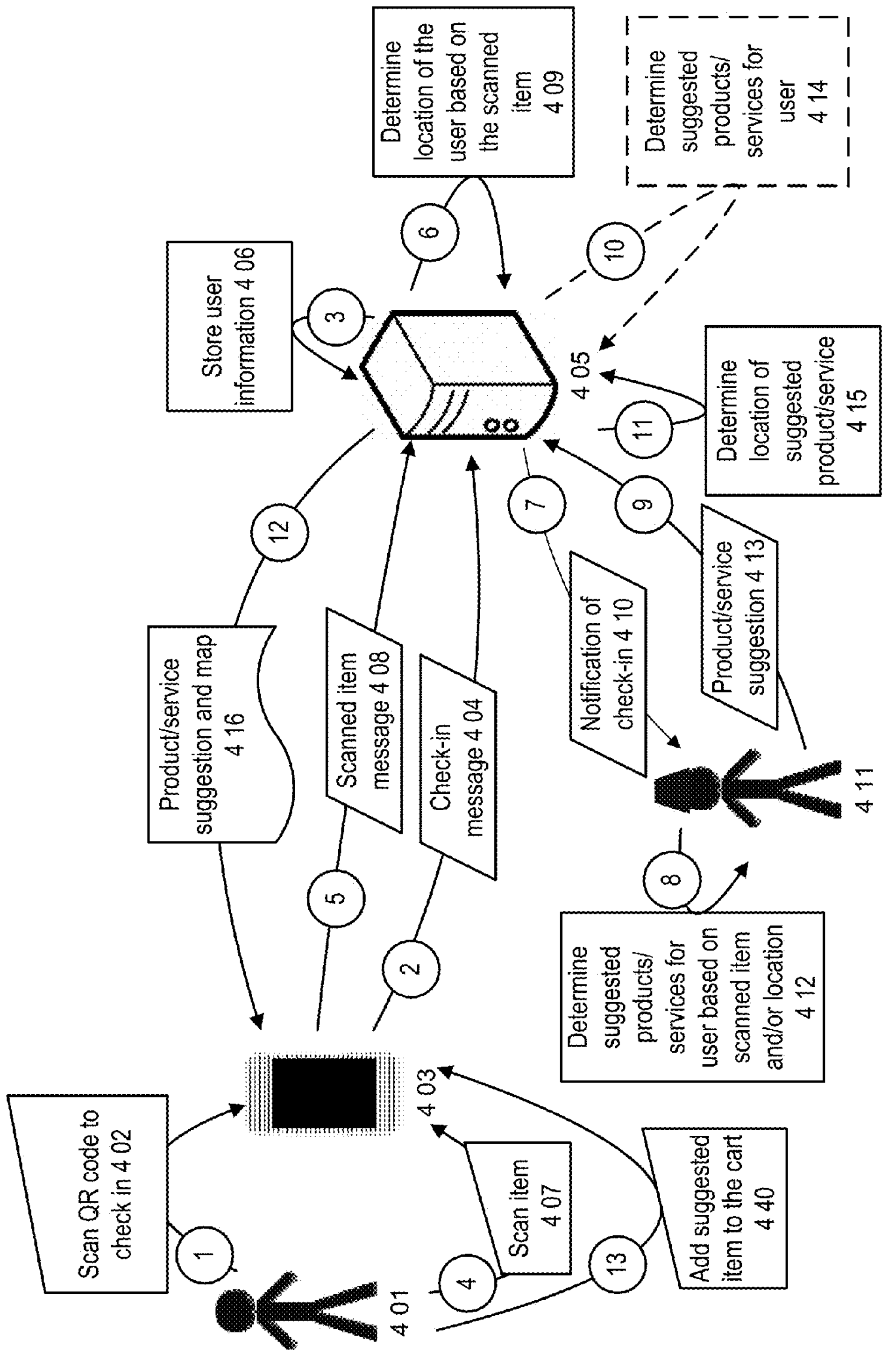
FIG. 4*a* shows a data flow diagrams illustrating checking into a store in some embodiments of the MDGAAT.

FIG. 4*a* shows a data flow diagram illustrating checking into a store or a venue in some embodiments of the MDGAAT. In some implementations, the user 401 may scan a QR code 402 using their electronic device 403 in order to check-in to a store. The electronic device may send check-in message 204 to MDGAAT server 405, which may allow MDGAAT to store information 406 about the user based on their active e-wallet profile. In some implementations, an exemplary XML-encoded check-in message 404 may take a form similar to the following:

POST /check_in message. php HTTP /1.1 Host: www.DCMCPproccess.com
Content-Type: Application/XML
Content-Length: 788

-continued

```
<?XML version = "1.0" encoding = "UTF-8"?>
<checkin_message>
  <timestamp>2016-01-01 12:30:00</timestamp>
  <checkin_params>
      <merchant_params>
      <merchant id>1122334455</merchant id>
  <merchant salesrep>1357911</merchant salesrep>
  </merchant params>
  <user_params>
    <user id>l23456789</user id>
    <wallet id>9988776655</wallet id>
    <GPS>40.71872,–73.98905, 100</GPS>
    <device id>j3h25j45gh647hj</device id>
    <date of request>2015-12-31</date of request>
  </user_params>
  <qr_object_params>
    <qr_image>
    <name> qr5 </name>
    <format> JPEG </format>
    <compression> JPEG compression </compression>
    <size> 123456 bytes </size>
    <x-Resolution> 72.0 </x-Resolution>
    <y-Resolution> 72.0 </y-Resolution>
    <date time> 2014:8:11 16:45:32 </date time>
    ...
        <content> yoya JFIF H H ya'ICC PROFILE
        mntrRGB XYZ U $ acspAPPL ob6-appl
        oappl
        desc P bdscm
        Scprt -----------------------@ $wtpt
        -------------------------d rXYZ----------------------------x
  gXYZ
        ...
      </qr image>
      </content>
    <QR_content>"URL:http://www.examplestore.com
mailto:rep@examplestore.com geo:52.45170,4.81118
mailto:salesrep@examplestore.com&subject=Check-in!body=
The%20user%20with%id%20123456789%20has%20just%20checked%20in!"
</QR_content>
        </qr_object_params>
      </checkin_params>
    </checkin_message>
```

In some implementations, the user, while shopping through the store, may also scan 407 items with the user's electronic device, in order to obtain more information about them, in order to add them to the user's cart, and/or the like. In such implementations, the user's electronic device may send a scanned item message 408 to the MDGAAT server. In some implementations, an exemplary XML-encoded scanned item message 408 may take a form similar to the following:

```
POST /scanned_item_message.php HTTP/1.1
Host: www.DCMCPproccess.com
Content-Type: Application/XML
Content-Length: 788
<?XML version = "1.0" encoding "UTF-8"?>
<scanned_item_message>
  <timestamp>2016-01-01 12:30:00</timestamp>
    <scanned_item_params>
      <item_params>
          <item-id>1122334455</item -id>
            <item-aisle>12</item -aisle>
        <item-stack>4</item-stack>
        <item-shelf>2</item-shelf>
      <item_attributes>"orange juice", "calcium",
"Tropicana"</item_attributes>
      <item_price>S</item_price>
      <item_product_code>lA2B3C4D56</item_product_code>
      <item_manufacturer>Tropicana Manufacturing Company,
      Inc</item manufacturer>
      <qr_image>
        <name> qr5 </name>
        <format> JPEG </format>
        <compression> JPEG compression </compression>
        <size> 123456 bytes </size>
        <x-Resolution> 72.0 </x-Resolution>
        <y-Resolution> 72.0 </y-Resolution>
      <date time> 2014:8:11 16:45:32 </date time>
      <content> yoya JFIF H H ya'ICC PROFILE
    mntrRGB XYZ U desc P bdscm $ acspAPPL ob6-appl
    Scprt -----------------------@ $wtpt oappl
    -------------------------drXYZ---------------------------xgXYZ
      </content>
      ...
    </qr image>
```

-continued

```
        <QR_content>"URL:http://www.examplestore.com
mailto:rep@examplestore.com ge0:52.45170,4.81118
mailto:salesrep@examplestore.com&subject=Scan!body=The%20user%20with%id%20
123456789%20 has%20just%20scanned%20product%201122334455!
"</QR_content>
        </item_params>
        <user_params>
           <user id>l23456789</user id>
           <wallet id>9988776655</wallet id>
           <GPS>40.71872,–73.98905, 100</GPS>
           <device id>j3h25j45gh647hj</device id>
           <date of request>2015-12-31</date of request>
        </user params>
        </scanned_item_params>
   </scanned_ item_message>
```

In some implementations, MDGAAT may then determine the location 409 of the user based on the location of the scanned item, and may send a notification 410 to a sale's representative 411 indicating that a user has checked into the store and is browsing items in the store. In some implementations, an exemplary XML-encoded notification message 410 may comprise of the scanned item message of scanned item message 408.

The sale's representative may use the information in the notification message to determine products and/or services to recommend 412 to the user, based on the user's profile, location in the store, items scanned, and/or the like. Once the sale's representative has chosen at least one product and/or service to suggest, it may send the suggestion 413 to the MDGAAT server. In some implementations, an exemplary XML-encoded suggestion 413 may take a form similar to the following:

```
   POST /recommendation_message.php HTTP/1.1
   Host: www. DCMCPproccess. com
   Content-Type: Application/XML
   Content-Length: 788
   <?XML version = "1.0" encoding= "UTF-8"?>
      <recommendation_message>
         <timestamp>2016-01-01 12:30:00</timestamp>
            <recommendation _params>
                  <item_params>
               <item-id>ll22334455</item -id>
            <item-aisle>l2</item -aisle>
            <item-stack>4</item-stack>
            <item-shelf>l</item-shelf>
            <item_attributes>"orange juice", "omega-3",
"Tropicana"</item_attributes>
            <item_price>S</item_price>
               <item_product code>OP9K8U7H76</item_product
code>
            <item_manufacturer>Tropicana Manufacturing
Company,
            Inc</item manufacturer>
         <qr image>
            <name> qrl2 </name>
            <format> JPEG </format>
            <compression> JPEG compression </compression>
            <size> 123456 bytes </size>
            <x-Resolution> 72.0 </x-Resolution>
            <y-Resolution> 72.0 </y-Resolution>
            <date time> 2014:8:11 16:45:32 </date time>
            ...
            <content> yoya JFIF H H ya'ICC PROFILE
         mntrRGB XYZ U desc P bdscm
         $ acspAPPL ob6-appl
         Scprt -----------------------@ $wtpt oappl
         -------------------------drXYZ-----------------------------xgXYZ
            </content>
         </qr image>
            <QR_content>"URL:http://www.examplestore.com
mailto:rep@examplestore.com geo:52.45170,4.81118mailto:
salesrep@examplestore.com&subject=Scan!body=The%20user%20with%id%20123456
789%20has%20just%20scanned%20product%1122334455! "</QR_content>
      </item_params>
      <user_params>
         <user id>l23456789</user id>
         <wallet id>9988776655</wallet id>
         <GPS>40.71872,–73.98905, 100</GPS>
         <device id>j3h25j45gh647hj</device id>
```

-continued

```
<date of request>2015-12-31</date of request>
</user_params>
</recommendation_params>
</recommendation_message>
```

Figure 4B:
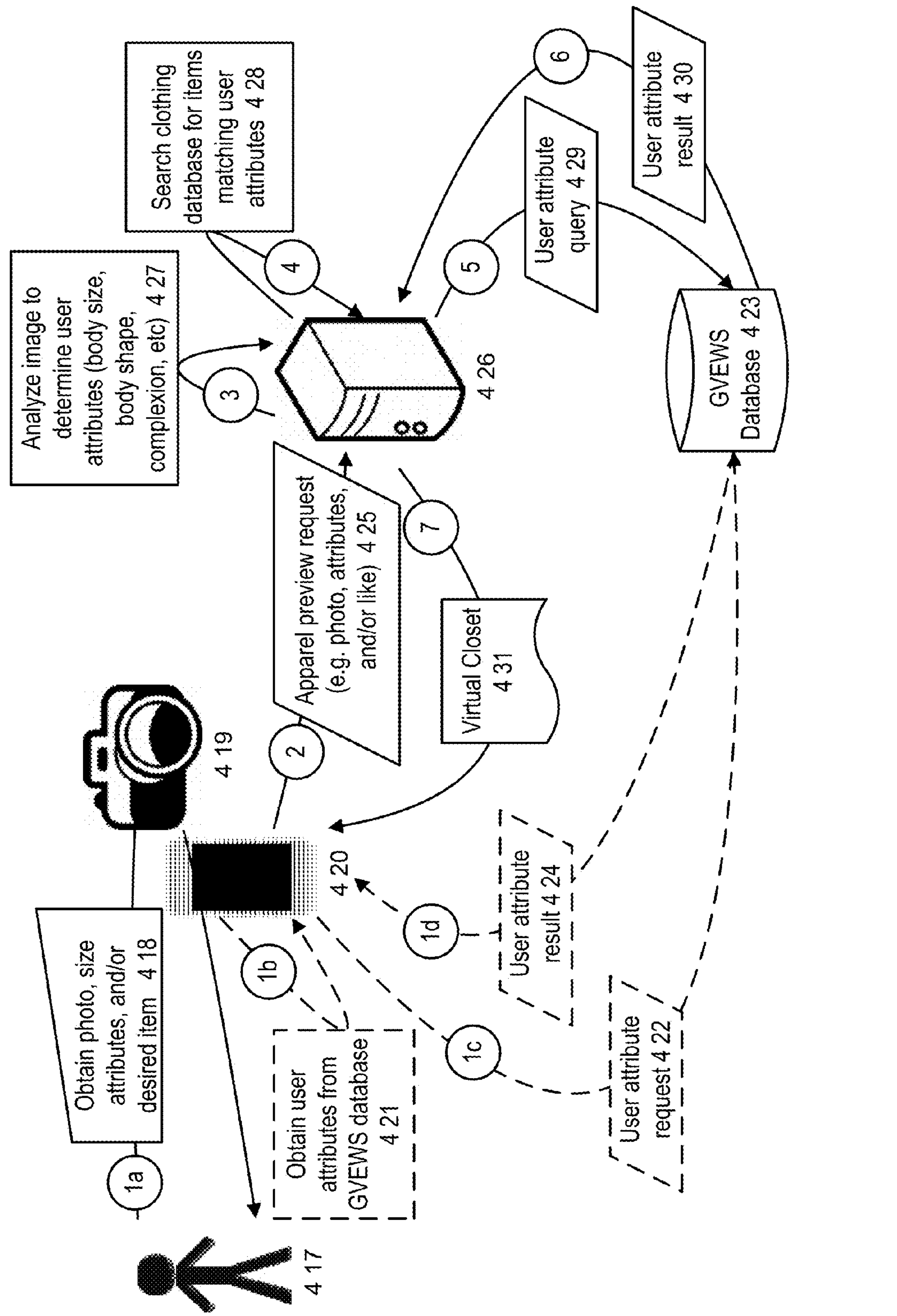
FIGS. 4*b*-4*c* show data flow diagrams illustrating accessing a virtual store in some embodiments of the MDGAAT.
Figure 4C:
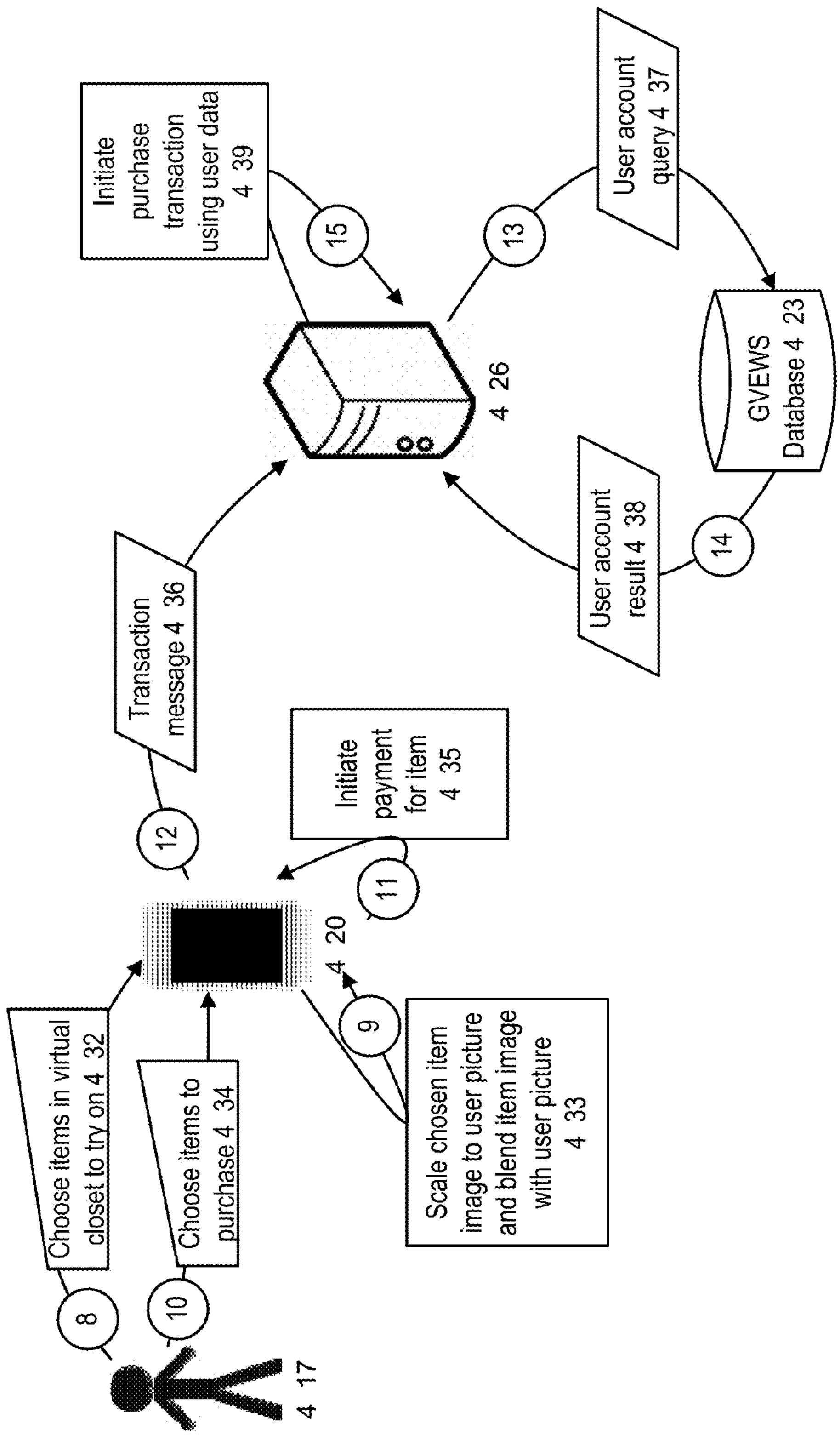

FIGS. 4b-c show data flow diagrams illustrating accessing a virtual store in some embodiments of the MDGAAT. In some implementations, a user 417 may have a camera (either within an electronic device 420 or an external camera 419, such as an Xbox Kinect device) take a picture 418 of the user. The user may also choose to provide various user attributes, such as the user's clothing size, the item(s) the user wishes to search for, and/or like information. The electronic device 420 may also obtain stored attributes (such as a previously-submitted clothing size, color preference, and/or the like) from the MDGAAT database, including whenever the user chooses not to provide attribute information. The electronic device may send a request 422 to the MDGAAT database 423, and may receive all the stored attributes 424 in the database. The electronic device may then send an apparel preview request 425 to the MDGAAT server 426, which may include the photo of the user, the attributes provided, and/or the like. In some implementations, an exemplary XML-encoded apparel preview request 425 may take a form similar to the following:

```
POST /apparel_preview_request.php HTTP/1.1 Host:
www.DCMCPproccess.com
Content-Type: Application/XML
Content-Length: 788
<?XML version = "1.0" encoding="UTF-8"?>
<apparel_preview_message>
<timestamp>2016-01-01 12:30:00</timestamp>
  <user_image>
    <name> user image </name>
    <format> JPEG </format>
    <compression> JPEG compression </compression>
    <size> 123456 bytes </size>
    <x-Resolution> 72.0 </x-Resolution>
    <y-Resolution> 72.0 </y-Resolution>
    <date time> 2014:8:11 16:45:32 </date time>
    <color>rbg</color>
    ...
    <content> yoya JFIF H H ya'ICC_PROFILE oappl
    mntrRGB
XYZ U  $acspAPPL ob6-appl desc P bdscm Scprt
      -------------@ x -------------
  $wtpt gXYZ rTRC -------------d rXYZ
  bXYZ aarg A vcgt ...
  </content>
  </user image>
  </user_params>
    <user id>123456789</user id>
    <user-wallet-id>9988776655</wallet id>
    <user_device_id>j3h25j45gh647hj</device id>
    <user-size>4</user-size>
    <user_gender>F</user_gender>
    <user_body_type></user_body_type>
      <search criteria>"dresses"</search criteria>
    <date of request>2015-12-31</date of request>
  </user_params>
</apparel_preview _message>
```

In some implementations, MDGAAT may conduct its own analysis of the user based on the photo 427, including analyzing the image to determine the user's body size, body shape, complexion, and/or the like. In some implementations, MDGAAT may use these attributes, along with any provided through the apparel preview request, to search the database 428 for clothing that matches the user's attributes and search criteria. In some implementations, MDGAAT may also update 429 the user's attributes stored in the database, based on the attributes provided in the apparel preview request or based on MDGAAT' analysis of the user's photo. After MDGAAT receives confirmation that the update is successful 430, MDGAAT may send a virtual closet 431 to the user, comprising a user interface for previewing clothing, accessories, and/or the like chosen for the user based on the user's attributes and search criteria. In some implementations, the virtual closet may be implemented via HTML and Javascript.

In some implementations, as shown in FIG. 4c, the user may then interact with the virtual closet in order to choose items 432 to preview virtually. In some implementations, the virtual closet may scale any chosen items to match the user's picture 433, and may format the item's image (e.g., blur the image, change lighting on the image, and/or the like) in order for it to blend properly with the user image. In some implementations, the user may be able to choose a number of different items to preview at once (e.g., a user may be able to preview a dress and a necklace at the same time, or a shirt and a pair of pants at the same time, and/or the like), and may be able to specify other properties of the items, such as the color or pattern to be previewed, and/or the like. The user may also be able to change the properties of the virtual closet itself, such as changing the background color of the virtual closet, the lighting in the virtual closet, and/or the like. In some implementations, once the user has found at least one article of clothing that the user likes, the user can choose the item(s) for purchase 434. The electronic device may initiate a transaction 425 by sending a transaction message 436 to the MDGAAT server, which may contain user account information that it may use to obtain the user's financial account information 437 from the MDGAAT database. Once the information has been successfully obtained 438, MDGAAT may initiate the purchase transaction using the obtained user data 439.

Figure 5A:
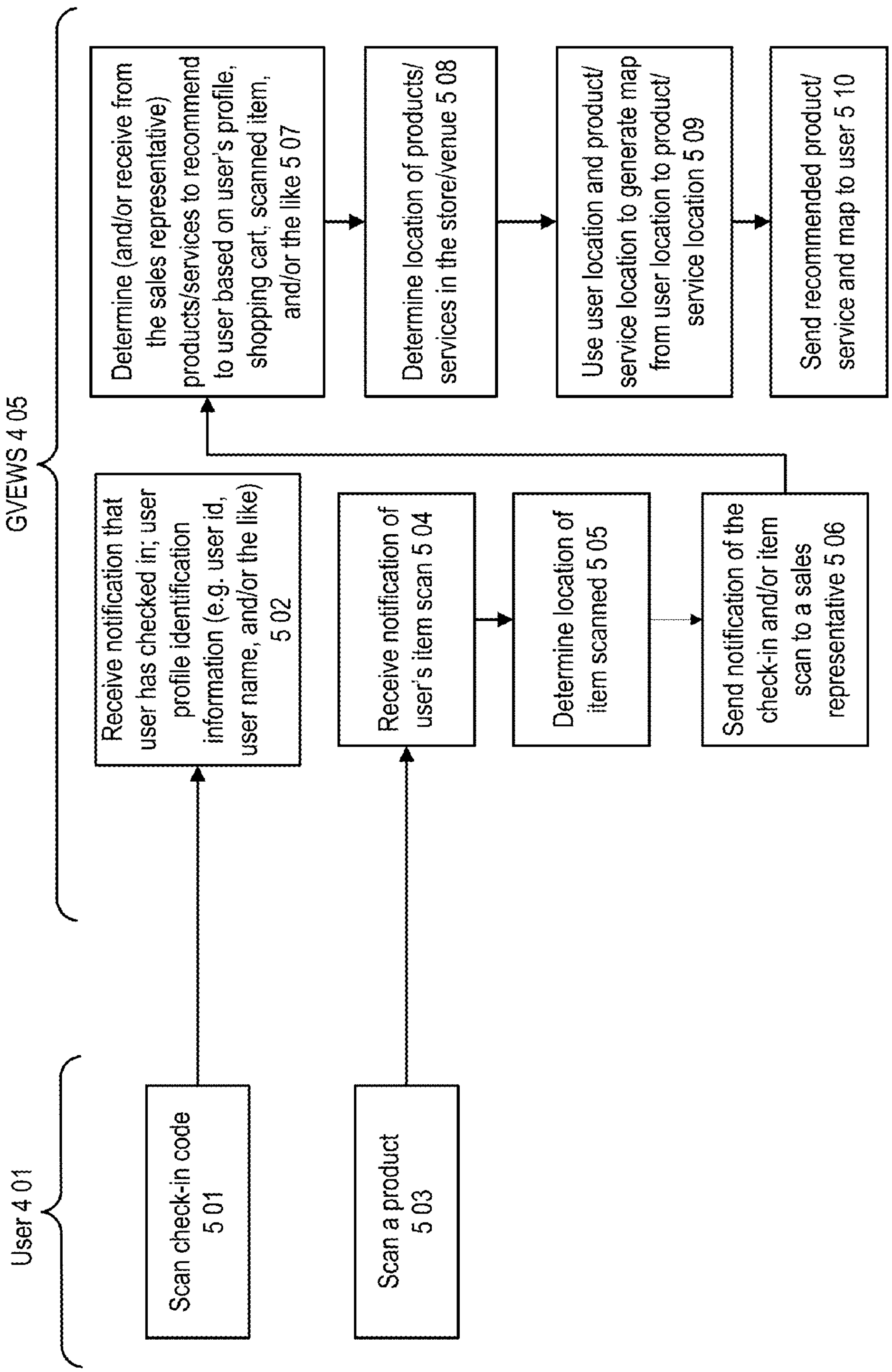
FIG. 5*a* shows a logic flow diagram illustrating checking into a store in some embodiments of the MDGAAT.

FIG. 5a shows a logic flow diagram illustrating checking into a store in some embodiments of the MDGAAT. In some implementations, the user may scan a check-in code 501, which may allow MDGAAT to receive a notification 502 that the user has checked in, and may allow MDGAAT to use the user profile identification information provided to create a store profile for the user. In some implementations, the user may scan a product 503, which may cause MDGAAT to receive notification of the user's item scan 504, and may prompt MDGAAT to determine where the user is based on the location of the scanned item 505. In some implementations, MDGAAT may then send a notification of the check-in and/or the item scan to a sale's representative 506. MDGAAT may then determine (or may receive from the sale's representative) at least one product and/or service to recommend to the user 507, based on the user's profile, shopping cart, scanned item, and/or the like. MDGAAT may then determine the location of the recommended product and/or service 508, and may use the user's location and the location of the recommended product and/or service to generate a map from the user's location to the recommended product and/or service 509. MDGAAT may then send the recommended product and/or service, along with the generated map, to the user 510, so that the user may find its way to the recommended product and add it to a shopping cart if desired.

Figure 5B:
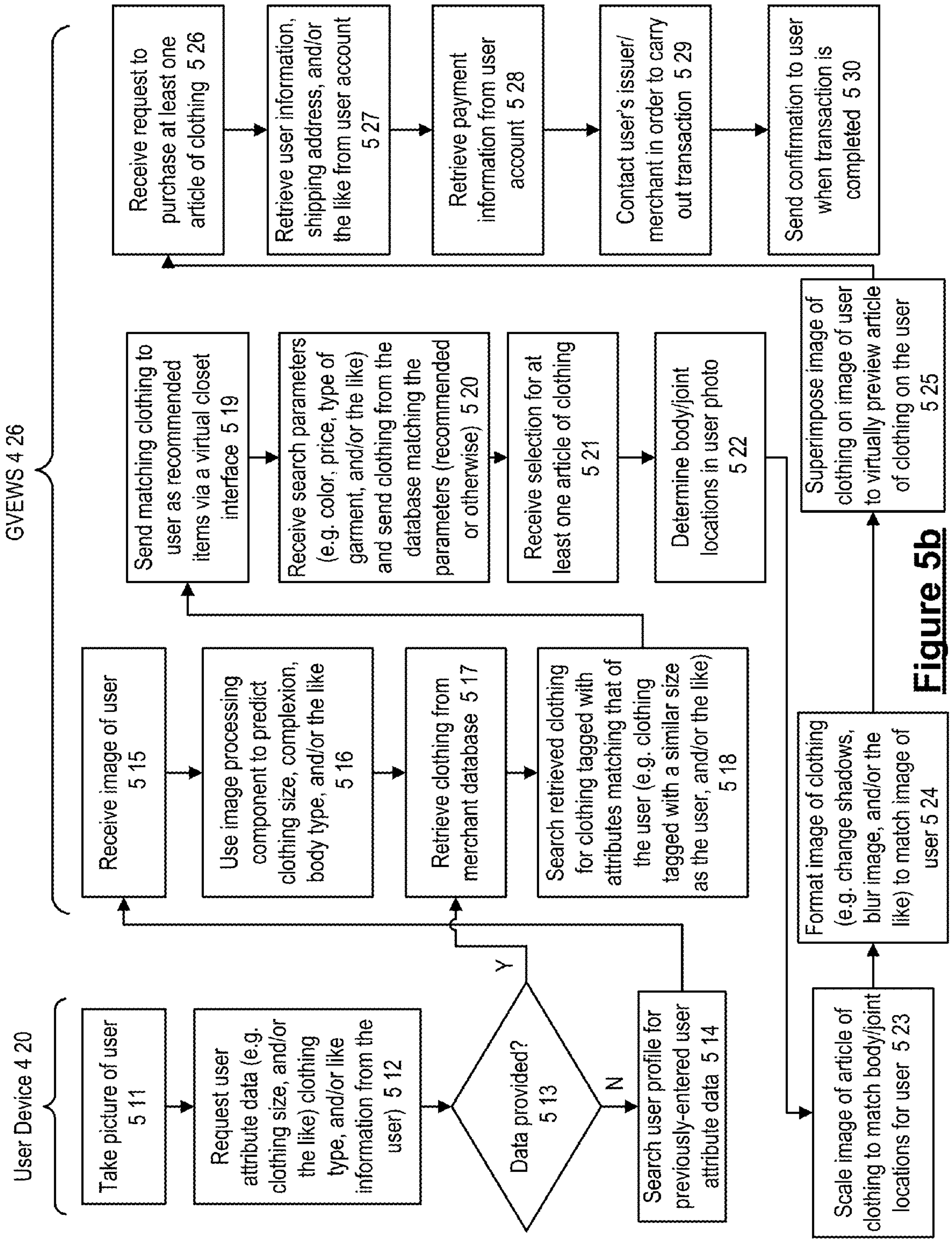
FIG. 5*b* shows a logic flow diagram illustrating accessing a virtual store in some embodiments of the MDGAAT.

FIG. 5*b* shows a logic flow diagram illustrating accessing a virtual store in some embodiments of the MDGAAT. In some implementations, the user's device may take a picture 511 of the user, and may request from the user attribute data 512, such as clothing size, clothing type, and/or like information. If the user chooses not to provide information 513, the electronic device may access the user profile in the MDGAAT database in order to see if any previously-entered user attribute data exists 514. In some implementations, anything found is sent with the user image to MDGAAT 515. If little to no user attribute information is provided, MDGAAT may use an image processing component to predict the user's clothing size, complexion, body type, and/or the like 516, and may retrieve clothing from the database 517. In some implementations, if the user chose to provide information 513, then MDGAAT automatically searches the database 517 for clothing without attempting to predict the user's clothing size and/or the like. In some implementations, MDGAAT may use the user attributes and search criteria to search the retrieved clothing 518 for any clothing tagged with attributes matching that of the user (e.g. clothing tagged with a similar size as the user, and/or the like). MDGAAT may send the matching clothing to the user 519 as recommended items to preview via a virtual closet interface. Depending upon further search parameters provided by the user (e.g., new colors, higher or lower prices, and/or the like), MDGAAT may update the clothing loaded into the virtual closet 520 based on the further search parameters (e.g., may only load red clothing if the user chooses to only see the red clothing in the virtual closet, and/or the like).

In some implementations, the user may provide a selection of at least one article of clothing to try on 521, prompting MDGAAT to determine body and/or joint locations and markers in the user photo 522, and to scale the image of the article of clothing to match the user image 523, based on those body and/or joint locations and markers. In some implementations, MDGAAT may also format the clothing image 524, including altering shadows in the image, blurring the image, and/or the like, in order to match the look of the clothing image to the look of the user image. MDGAAT may superimpose 525 the clothing image on the user image to allow the user to virtually preview the article of clothing on the user, and may allow the user to change options such as the clothing color, size, and/or the like while the article of clothing is being previewed on the user. In some implementations, MDGAAT may receive a request to purchase at least one article of clothing 526, and may retrieve user information 527, including the user's ID, shipping address, and/or the like. MDGAAT may further retrieve the user's payment information 528, including the user's preferred payment device or account, and/or the like, and may contact the user's issuer (and that of the merchant) 529 in order to process the transaction. MDGAAT may send a confirmation to the user when the transaction is completed 530.

Figure 6A:
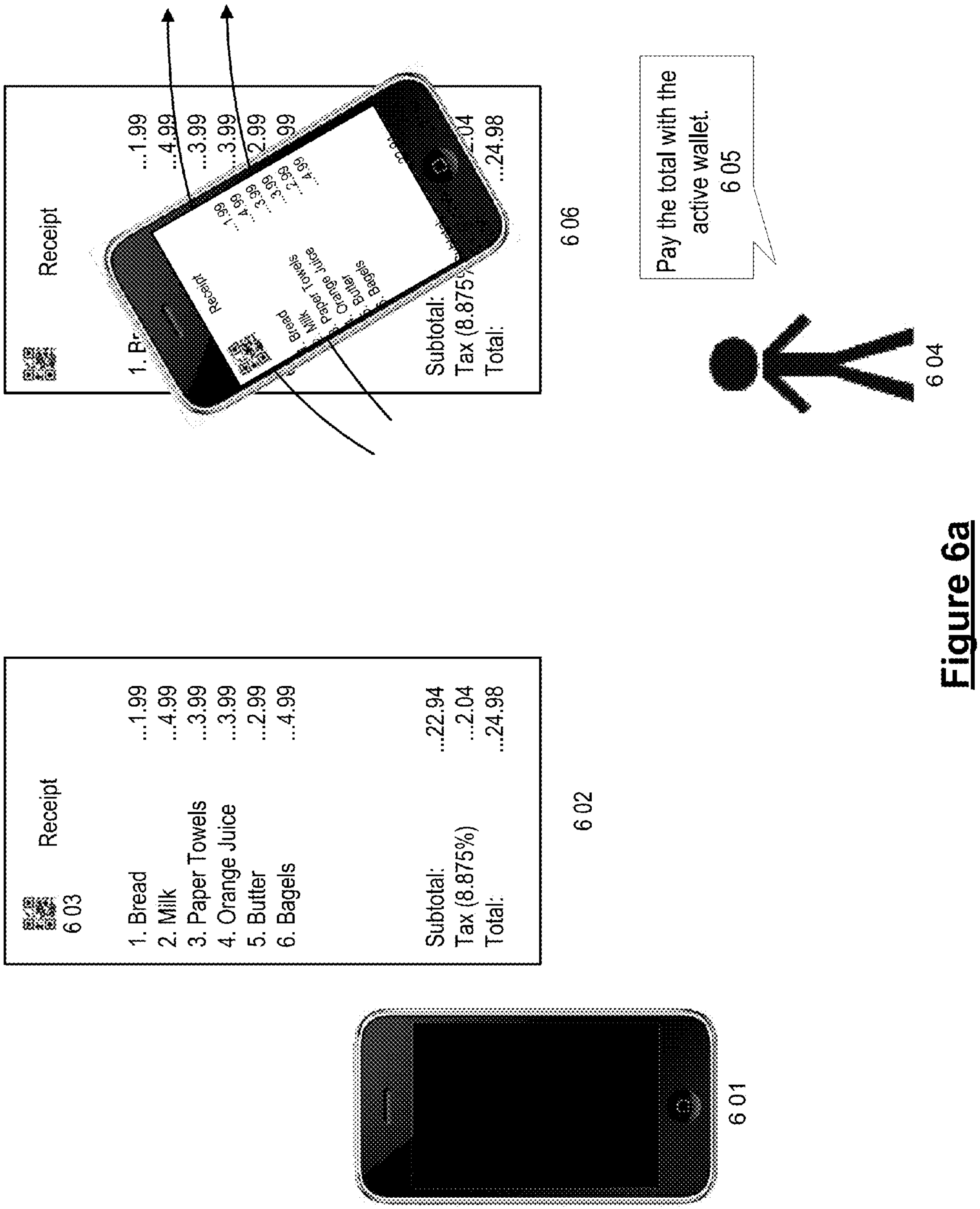
FIGS. 6*a*-6*c* show schematic diagrams illustrating initiating transactions in some embodiments of the MDGAAT.

FIGS. 6*a-d* show schematic diagrams illustrating initiating transactions in some embodiments of the MDGAAT. In some implementations, as shown in FIG. 6*a*, the user 604 may have an electronic device 601 which may be a camera-enabled device. In some implementations, the user may also have a receipt 602 for the transaction, which may include a QR code 603. The user may give the vocal command "Pay the total with the active wallet" 605, and may swipe the electronic device over the receipt 606 in order to perform a gesture. In such implementations, the electronic device may record both the audio of the vocal command and a video (or a set of images) for the gesture, and MDGAAT may track the position of the QR code in the recorded video and/or images in order to determine the attempted gesture. MDGAAT 13 may then prompt the user to confirm that the user would like to pay the total on the 14 receipt using the active wallet on the electronic device and, if the user confirms the 15 action, may carry out the transaction using the user's account information.

Figure 6B:
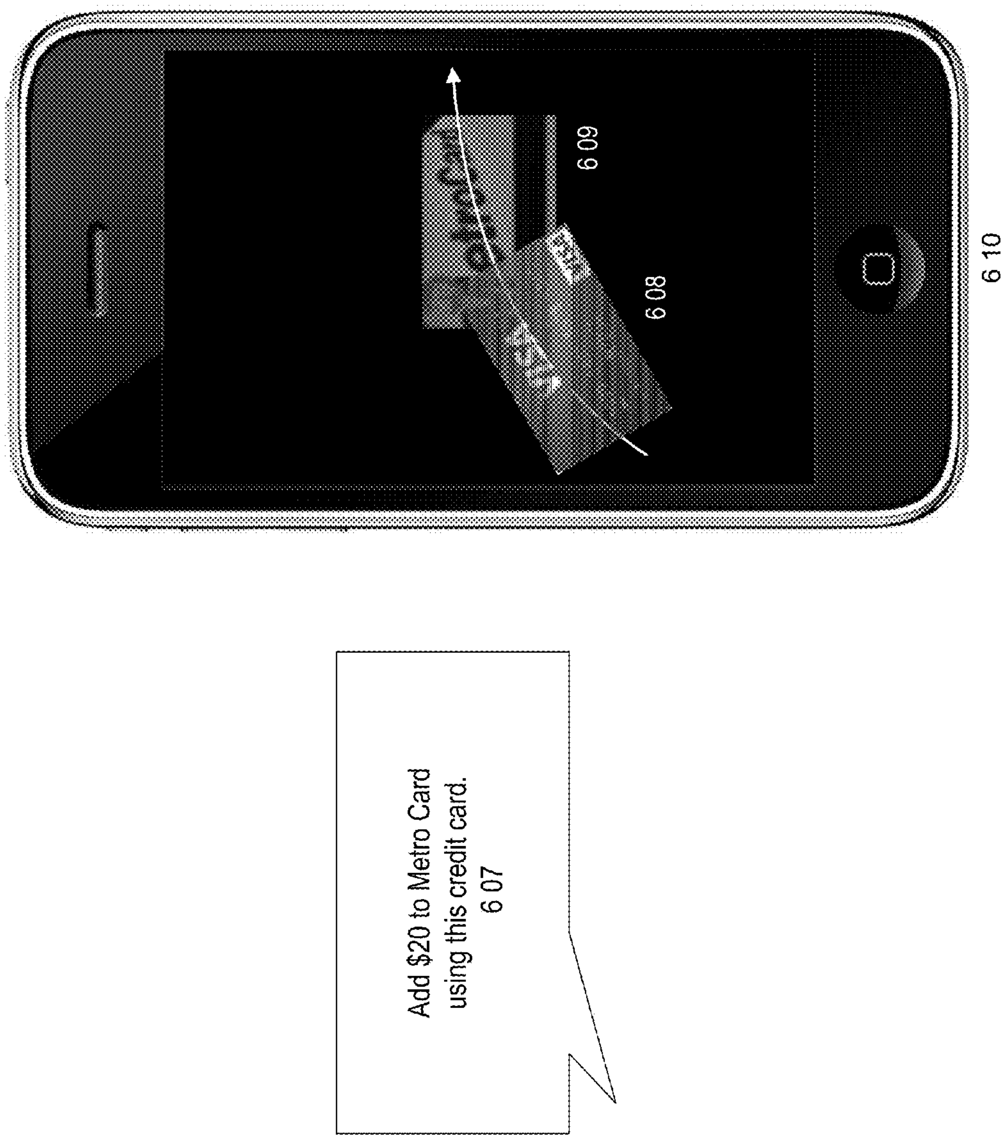

As shown in FIG. 6*b*, in some implementations, the user may have a payment device 608, which they want to use to transfer funds to another payment device 609. Instead of gesturing with the electronic device 610, the user may use the electronic device to record a gesture involving swiping the payment device 608 over payment device 609, while giving a vocal command such as "Add $20 to Metro Card using this credit card" 607. In such implementations, MDGAAT will determine which payment device is the credit card, and which is the Metro Card, and will transfer funds from the account of the former to the account of the latter using the user's account information, provided the user confirms the transaction.

Figure 6C:
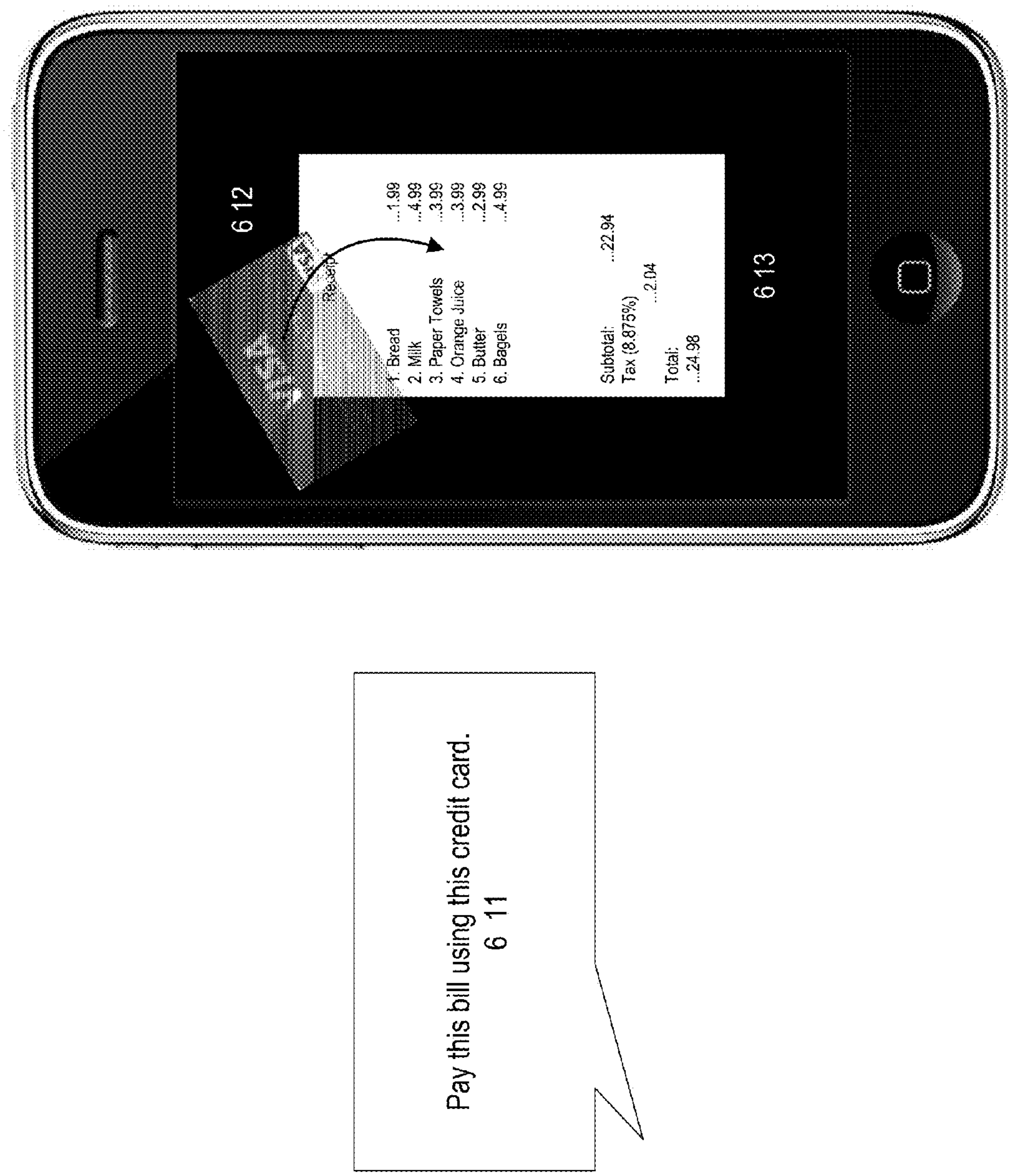

As shown in FIG. 6*c*, in some implementations, the user may wish to use a specific payment device 612 to pay the balance of a receipt 613. In such implementations, the user may use electronic device 614 to record the gesture of tapping the payment device on the receipt, along with a vocal command such as "Pay this bill using this credit card" 611. In such implementations, MDGAAT will use the payment device specified (i.e., the credit card) to pay the entirety of the bill specified in the receipt.

Figure 7:
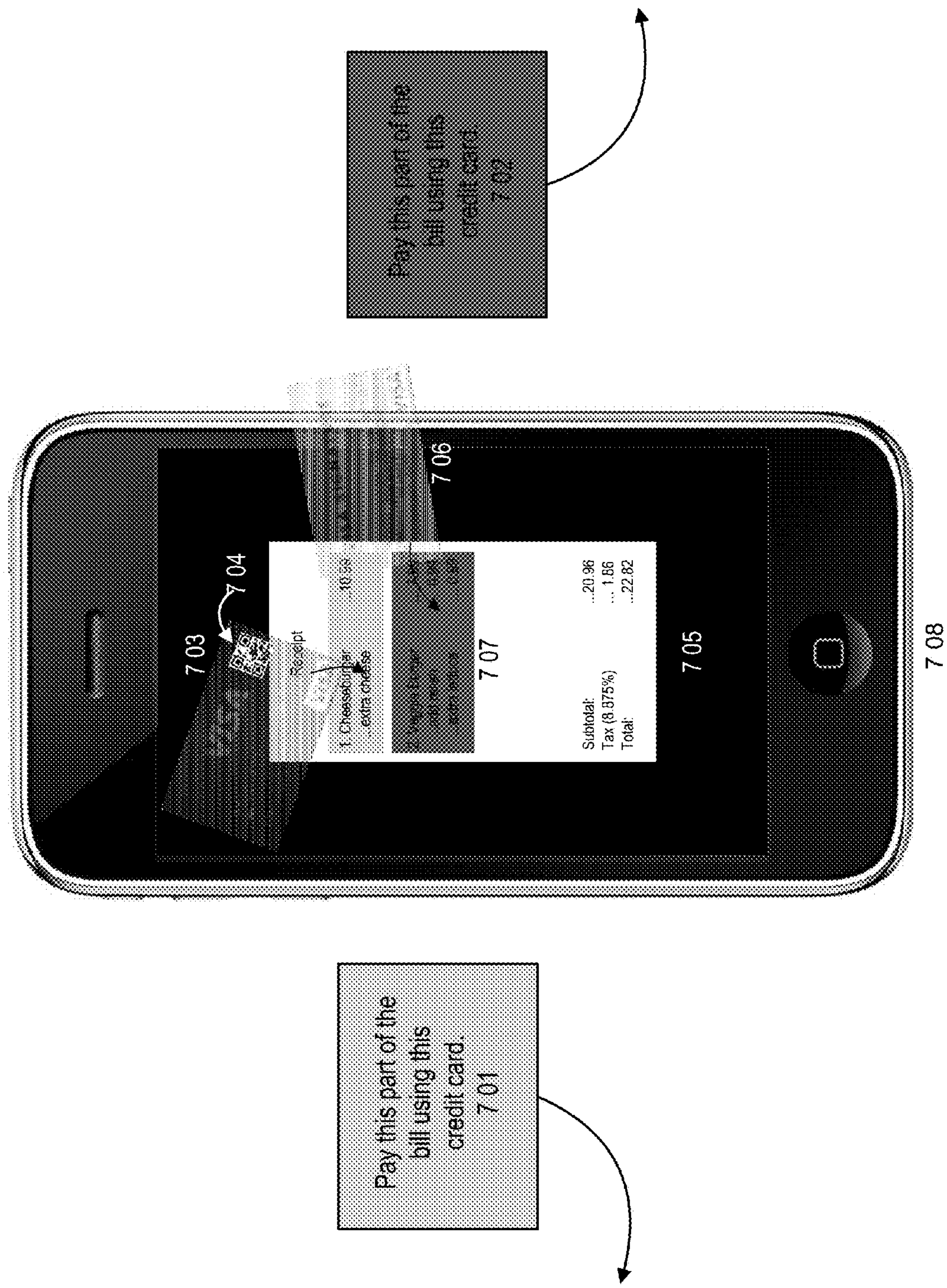
FIG. 7 shows a schematic diagram illustrating multiple parties initiating transactions in some embodiments of the MDGAAT.

FIG. 7 shows a schematic diagram illustrating multiple parties initiating transactions m some embodiments of the MDGAAT. In some implementations, one user with a payment device 703, which has its own QR code 704, may wish to only pay for part of a bill on a receipt 705. In such implementations, the user may tap only the part(s) of the bill which contains the items the user ordered or wishes to pay for, and may give a vocal command such as "Pay this part of the bill using this credit card" 701. In such implementations, a second user with a second payment device 706, may also choose to pay for a part of the bill, and may also tap the part of the bill that the second user wishes to pay for. In such implementations, the electronic device 708 may not only record the gestures, but may create an AR overlay on its display, highlighting the parts of the bill that each person is agreeing to pay for 705 in a different color representative of each user who has made a gesture and/or a vocal command. In such implementations, MDGAAT may use the gestures recorded to determine which payment device to charge which items to, may calculate the total for each payment device, and may initiate the transactions for each payment device.

Figure 8:
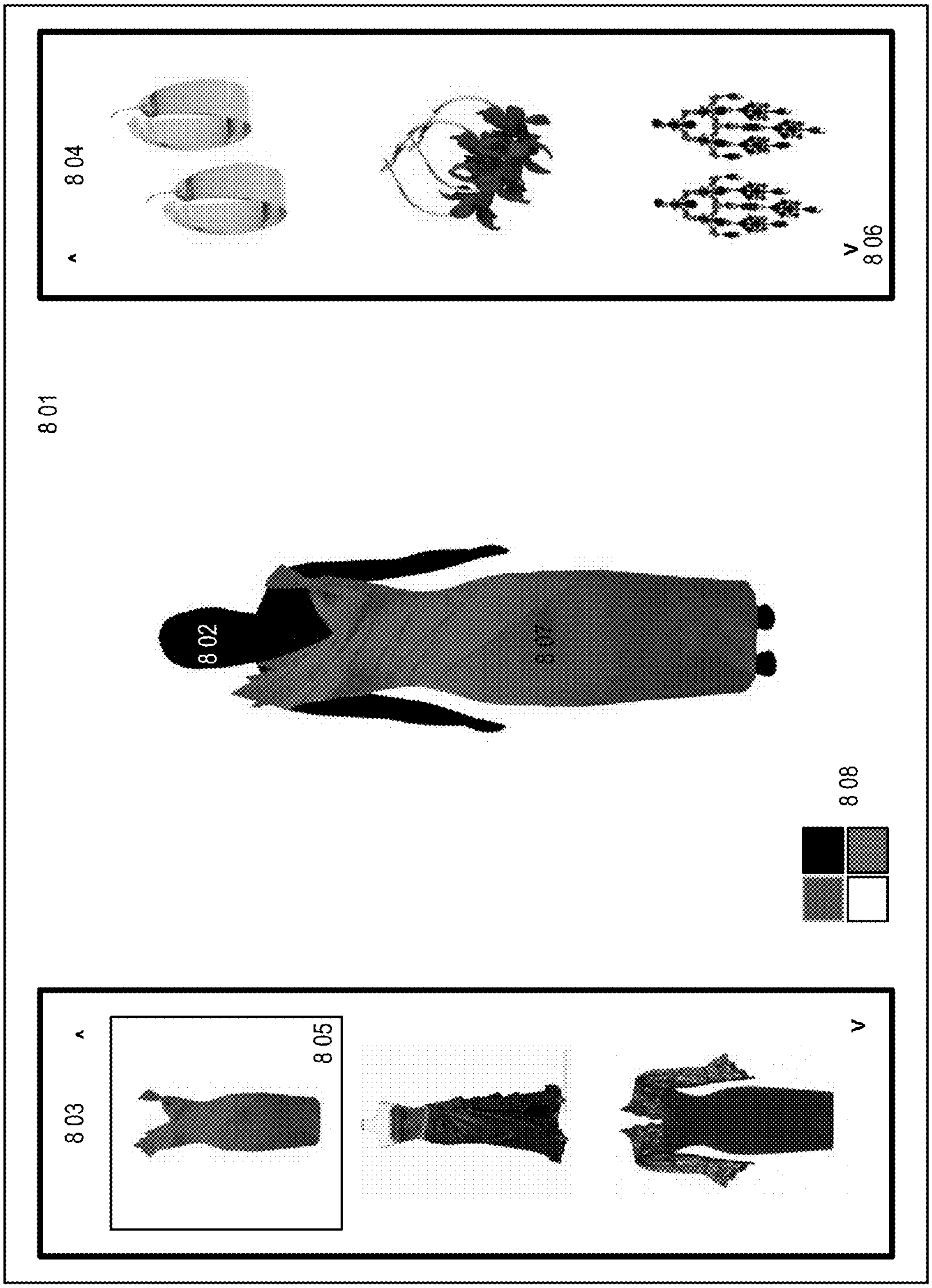
FIG. 8 shows a schematic diagram illustrating a virtual closet in some embodiments of the MDGAAT.

FIG. 8 shows a schematic diagram illustrating a virtual closet in some embodiments of the MDGAAT. In some implementations, the virtual closet 801 may display an image 802 of the user, as well as a selection of clothing 803, accessories 804, and/or the like. In some implementations, if the user selects an item 805, a box will encompass the selection to indicate that it has been selected, and an image of the selection (scaled to the size of the user and edited in order to match the appearance of the user's image) may be superimposed on the image of the user. In some implementations, the user may have a real-time video feed of his/ herself shown rather than an image, and the video feed may allow for the user to move and simulate the movement of the selected clothing on his or her body. In some implementations, MDGAAT may be able to use images of the article of clothing, taken at different angles, to create a 3-dimensional model of the piece of clothing, such that the user may be able to see it move accurately as the user moves in the camera view, based on the clothing's type of cloth, length, and/or the like. In some implementations, the user may use buttons 806 to scroll through the various options available based on the user's search criteria. The user may also be able to choose multiple options per article of clothing, such as other colors 808, other sizes, other lengths, and/or the like.

Figure 9:
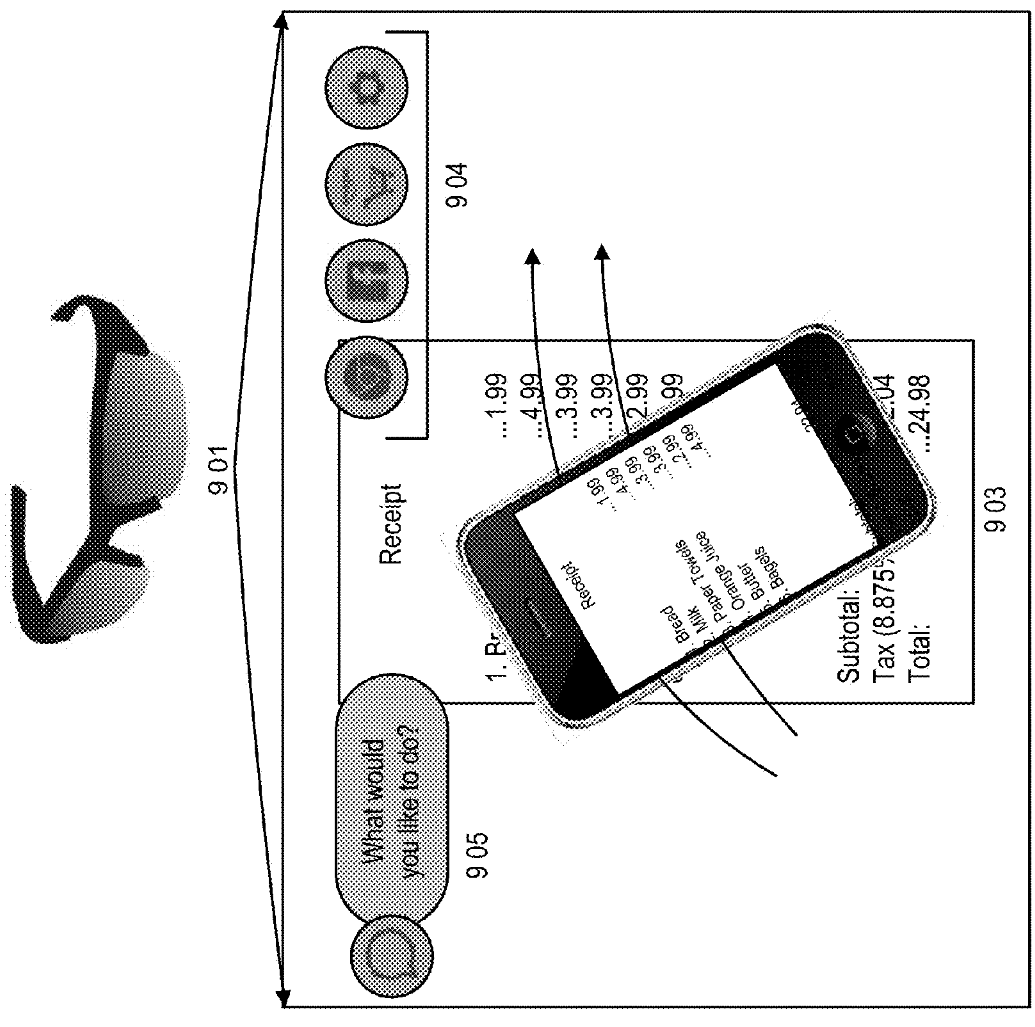
FIG. 9 shows a schematic diagram illustrating an augmented reality interface for receipts in some embodiments of the MDGAAT.

FIG. 9 shows a schematic diagram illustrating an augmented reality interface for receipts in some embodiments of the MDGAAT. In some implementations, the user may use smart glasses, contacts, and/or a like device 901 to interact with MDGAAT using an AR interface 902. The user may see in a heads-up display (HUD) overlay at the top of the user's view a set of buttons 904 that may allow the user to choose a variety of different applications to use in conjunction with the viewed item (e.g., the user may be able to use a social network button to post the receipt, or another viewed item, to their social network profile, may use a store button to purchase a viewed item, and/or the like). The user may be able to use the smart glasses to capture a gesture involving an electronic device and a receipt 903. In some implementations, the user may also see an action prompt 905, which may allow the user to capture the gesture and provide a voice command to the smart glasses, which may then inform MDGAAT so that it may carry out the transaction.

Figure 10:
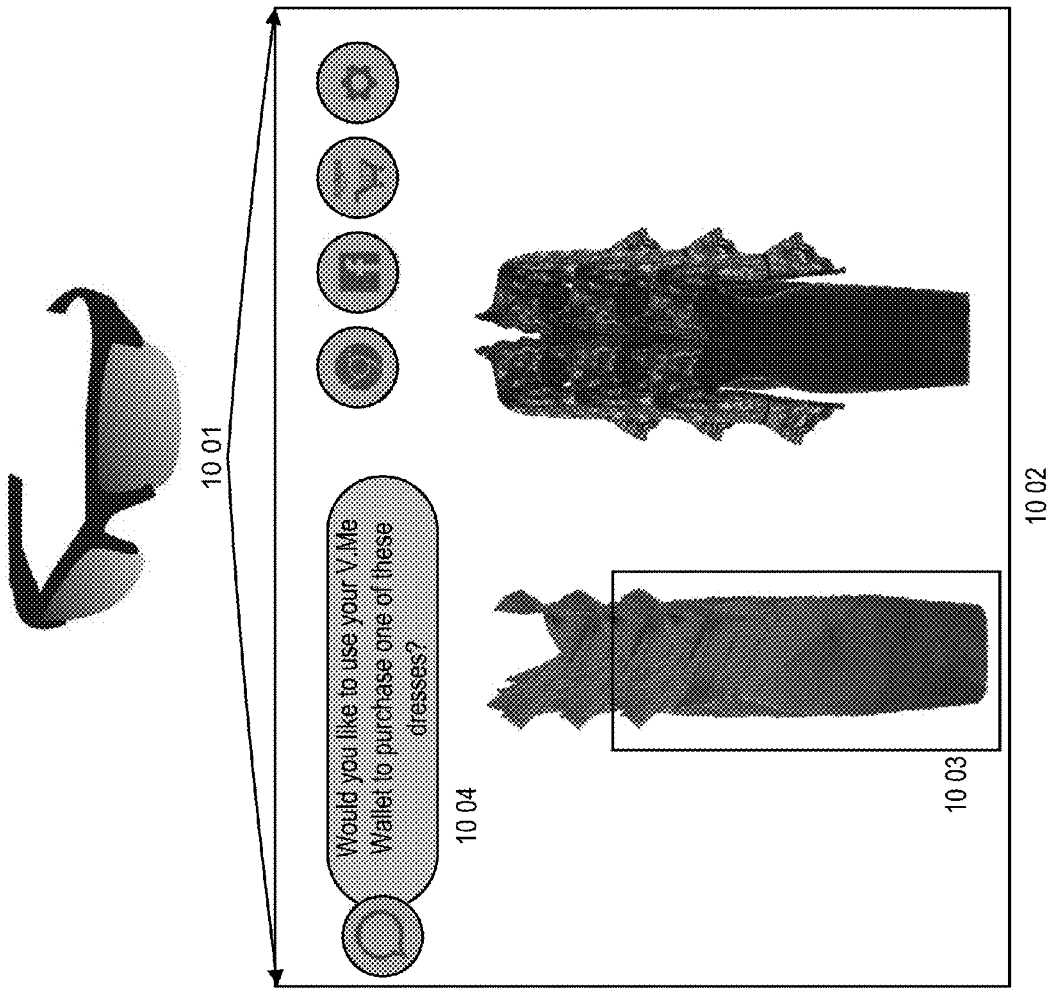
FIG. 10 shows a schematic diagram illustrating an augmented reality interface for products in some embodiments of the MDGAAT.

FIG. 10 shows a schematic diagram illustrating an augmented reality interface for products in some embodiments of the MDGAAT. In some implementations, the user may use smart glasses 1001 in order to use AR overlay view 1002. In some implementations, a user may, after making a gesture with the user's electronic device and a vocal command indicating a desire to purchase a clothing item 1003, see a prompt in their AR HUD overlay 1004 which confirms their desire to purchase the clothing item, using the payment method specified. The user may be able to give the vocal command "Yes," which may prompt MDGAAT to initiate the purchase of the specified clothing.

MDGAAT Controller

Figure 11:
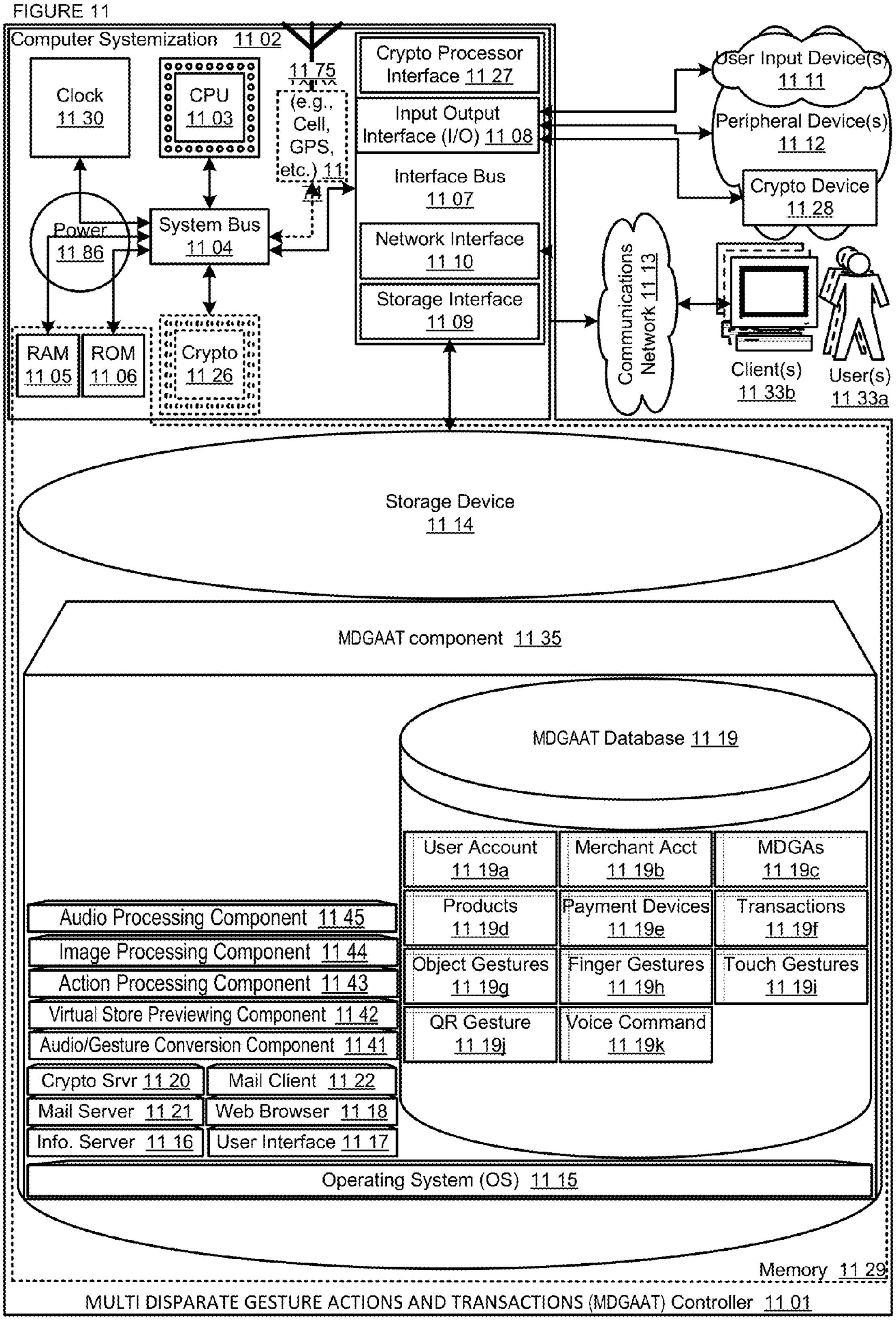
FIG. 11 shows a block diagram illustrating embodiments of a MDGAAT controller.

FIG. 11 shows a block diagram illustrating embodiments of a MDGAAT controller 1101. In this embodiment, the MDGAAT controller 1101 may serve to aggregate, process, store, search, serve, identify, instruct, generate, match, and/or facilitate interactions with a computer through various technologies, and/or other related data.

Typically, users, e.g., 1133*a*, which may be people and/or other systems, may engage information technology systems (e.g., computers) to facilitate information processing. In turn, computers employ processors to process information; such processors 1103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MDGAAT controller 1101 may be connected to and/or communicate with entities such as, but not limited to: one or more users from user input devices 1111; peripheral devices 1112; an optional cryptographic processor device 1128; and/or a communications network 1113. For example, the MDGAAT controller 1101 may be connected to and/or communicate with users, e.g., 1133*a*, operating client device(s), e.g., 1133*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The MDGAAT controller 1101 may be based on computer systems that may comprise, but are not limited to, components such as: a computer systemization 1102 connected to memory 1129.

Computer Systemization

A computer systemization 1102 may comprise a clock 1130, central processing unit ("CPU(s)" and/or "processor(s)" (these terms are used interchangeable throughout the disclosure unless noted to the contrary)) 1103, a memory 1129 (e.g., a read only memory (ROM) 1106, a random access memory (RAM) 1105, etc.), and/or an interface bus 1107, and most frequently, although not necessarily, are all interconnected and/or communicating through a system bus 1104 on one or more (mother)board(s) having conductive and/or otherwise transportive circuit pathways through which instructions (e.g., binary encoded signals) may travel to effectuate communications, operations, storage, etc. The computer systemization may be connected to a power source 1186; e.g., optionally the power source may be internal. Optionally, a cryptographic processor 1126 and/or transceivers (e.g., ICs) 1174 may be connected to the system bus. In another embodiment, the cryptographic processor and/or transceivers may be connected as either internal and/or external peripheral devices 1112 via the interface bus I/O. In turn, the transceivers may be connected to antenna(s) 1175, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing MDGAAT controller to determine its location)); Broadcom BCM4329 FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the MDGAAT controller and beyond through various interfaces. Should processing requirements dictate a greater amount speed and/or capacity, distributed processors (e.g., Distributed MDGAAT), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the MDGAAT may be achieved by implementing a microcontroller such as CAST's R8051XC2 microcontroller; Intel's MCS 51 (i.e., 8051 microcontroller); and/or the like. Also, to implement certain features of the MDGAAT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MDGAAT component collection (distributed or otherwise) and/or features may be implemented via the microprocessor and/or via embedded components; e.g., via ASIC, coprocessor, DSP, FPGA, and/or the like. Alternately, some implementations of the MDGAAT may be implemented with embedded components that are configured and used to achieve a variety of features or signal processing.

Depending on the particular implementation, the embedded components may include software solutions, hardware solutions, and/or some combination of both hardware/software solutions. For example, MDGAAT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the MDGAAT features. A hierarchy of programmable interconnects allow logic blocks to be interconnected as needed by the MDGAAT system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the MDGAAT may be developed on regular FPGAs and then migrated into a fixed version that more resembles ASIC implementations. Alternate or coordinating implementations may migrate MDGAAT controller features to a final ASIC instead of or in addition to FPGAs. Depending on the implementation all of the aforementioned embedded components and microprocessors may be considered the "CPU" and/or "processor" for the MDGAAT.

Power Source

The power source 1186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1186 is connected to at least one of the interconnected subsequent components of the MDGAAT thereby providing an electric current to all subsequent components. In one example, the power source 1186 is connected to the system bus component 1104. In an alternative embodiment, an outside power source 1186 is provided through a connection across the I/O 1108 interface. For example, a USB and/or IEEE 1394 connection carries both data and power across the connection and is therefore a suitable source of power.

Interface Adapters

Interface bus(ses) 1107 may accept, connect, and/or communicate to a number of interface adapters, conventionally although not necessarily in the form of adapter cards, such as but not limited to: input output interfaces (I/O) 1108, storage interfaces 1109, network interfaces 1110, and/or the like. Optionally, cryptographic processor interfaces 1127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1109 may accept, communicate, and/or connect to a number of storage devices such as, but not limited to: storage devices 1114, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1110 may accept, communicate, and/or connect to a communications network 1113. Through a communications network 1113, the MDGAAT controller is accessible through remote clients **1133*b* (e.g., computers with web browsers) by users 1133*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed MDGAAT), architectures may similarly be employed to pool, load balance, and/or otherwise increase the communicative bandwidth required by the MDGAAT controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1110 may be used to engage with various communications network types 1113**. For example, multiple network interfaces may be employed to allow for the communication over broadcast, multicast, and/or unicast networks.

Input Output interfaces (I/O) 1108 may accept, communicate, and/or connect to user input devices 1111, peripheral devices 1112, cryptographic processor devices 1128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1111 often are a type of peripheral device 1112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1112 may be connected and/or communicate to I/O and/or other facilities of the like such as network interfaces, storage interfaces, directly to the interface bus, system bus, the CPU, and/or the like. Peripheral devices may be external, internal and/or part of the MDGAAT controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1128), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the MDGAAT controller may be embodied as an embedded, dedicated, and/or monitor-less (i.e., headless) device, wherein access would be provided over a network interface connection.

Cryptographic units such as, but not limited to, microcontrollers, processors 1126, interfaces 1127, and/or devices 1128 may be attached, and/or communicate with the MDGAAT controller. A MC68HC16 microcontroller, manufactured by Motorola Inc., may be used for and/or within cryptographic units. The MC68HC16 microcontroller utilizes a 16-bit multiply-and-accumulate instruction in the MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1129. However, memory is a fungible technology and resource, thus, any number of memory embodiments may be employed in lieu of or in concert with one another. It is to be understood that the MDGAAT controller and/or a computer systemization may employ various forms of memory 1129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1129 will include ROM 1106, RAM 1105, and a storage device 1114. A storage device 1114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1129 may contain a collection of program and/or database components and/or data such as, but not limited to: operating system component(s) 1115 (operating system); information server component(s) 1116 (information server); user interface component(s) 1117 (user interface); Web browser component(s) 1118 (Web browser); database(s) 1119; mail server component(s) 1121; mail client component(s) 1122; cryptographic server component(s) 1120 (cryptographic server); the MDGAAT component(s) 1135; and/or the like (i.e., collectively a component collection). These components may be stored and accessed from the storage devices and/or from storage devices accessible through an interface bus. Although non-conventional program components such as those in the component collection, typically, are stored in a local storage device 1114, they may also be loaded and/or stored in memory such as: peripheral devices, RAM, remote storage facilities through a communications network, ROM, various forms of memory, and/or the like.

Operating System

The operating system component 1115 is an executable program component facilitating the operation of the MDGAAT controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the MDGAAT controller to communicate with other entities through a communications network 1113. Various communication protocols may be used by the MDGAAT controller as a subcarrier transport mechanism for interaction, such as, but not limited to: multicast, TCP/IP, UDP, unicast, and/or the like.

Information Server

An information server component 1116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MDGAAT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MDGAAT database 1119, operating systems, other program components, user interfaces, Web browsers, and/or the like.

Access to the MDGAAT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MDGAAT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the MDGAAT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MDGAAT enabled nodes. The combined application may be nugatory on systems employing standard Web browsers.

Mail Server

A mail server component 1121 is a stored program component that is executed by a CPU 1103. The mail server may be a conventional Internet mail server such as, but not limited to sendmail, Microsoft Exchange, and/or the like. The mail server may allow for the execution of program components through facilities such as MDGAAT, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the MDGAAT.

Access to the MDGAAT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1122 is a stored program component that is executed by a CPU 1103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1120 is a stored program component that is executed by a CPU 1103, cryptographic processor 1126, cryptographic processor interface 1127, cryptographic processor device 1128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the MDGAAT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the MDGAAT component to engage in secure transactions if so desired. The cryptographic component facilitates the secure accessing of resources on the MDGAAT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MDGAAT Database

The MDGAAT database component 1119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the MDGAAT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MDGAAT database is implemented as a data-structure, the use of the MDGAAT database 1119 may be integrated into another component such as the MDGAAT component 1135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1119 includes several tables 1119*a-e*. A user accounts table 1119*a* includes fields such as, but not limited to: a user_id, user_wallet_id, user_device_id, user_created, user_firstname, user_lastname, user_email, user_address, user_birthday, user_clothing_size, user_body_type, user_gender, user_payment_devices, user_eye_color, user_hair_color, user_complexion, user_personalized_gesture_models, user_recommended_items, user_image, user_image_date, user_body_joint_location, and/or the like. The user accounts table may support and/or track multiple user accounts on a MDGAAT. A merchant accounts table 1119*b* includes fields such as, but not limited to: merchant_id, merchant_created, merchant_name, merchant_email, merchant_address, merchant_products, and/or the like. The merchant accounts table may support and/or track multiple merchant accounts on a MDGAAT. An MDGA table 1119*c* includes fields such as, but not limited to: MDGA_id, MDGA_name, MDGA_touch_gestures, MDGA_finger_gestures, MDGA_QR_gestures, MDGA_object_gestures, MDGA_vocal_commands, MDGA_merchant, and/or the like. The MDGA table may support and/or track multiple possible composite actions on a MDGAAT. A products table 1119*d* includes fields such as, but not limited to: product_id, product_name, product_date_added, product_image, product_merchant, product_qr, product_manufacturer, product_model, product_ price, product_aisle, product_stack, product_shelf, product_type, product_attributes, and/or the like. The products table may support and/or track multiple merchants' products on a MDGAAT. A payment device table 1119*e* includes fields such as, but not limited to: pd_id, pd_user, pd_type, pd_issuer, pd_issuer_id, pd_qr, pd_date_added, and/or the like. The payment device table may support and/or track multiple payment devices used on a MDGAAT. A transaction table 1119*f* includes fields such as, but not limited to: transaction_id, transaction_entity1, transaction_entity2, transaction_amount, transaction_date, transaction_receipt_ copy, transaction_products, transaction_notes, and/or the like. The transaction table may support and/or track multiple transactions performed on a MDGAAT. An object gestures table 1119*g* includes fields such as, but not limited to: object_gesture_id, object_gesture_type, object_gesture_x, object_gesture_x, object_gesture_merchant, and/or the like. The object gesture table may support and/or track multiple object gestures performed on a MDGAAT. A finger gesture table 1119*h* includes fields such as, but not limited to: finger_gesture_id, finger_gesture_type, finger_gesture_x, finger_gesture_x, finger_gesture_merchant, and/or the like. The finger gestures table may support and/or track multiple finger gestures performed on MDGAAT. A touch gesture table 1119*i* includes fields such as, but not limited to touch_gesture_id, touch_gesture_type, touch_gesture_x, touch_gesture_x, touch_gesture_merchant, and/or the like. The touch gestures table may support and/or track multiple touch gestures performed on a MDGAAT. A QR gesture table 1119*j* includes fields such as, but not limited to: QR_gesture_id, QR_gesture_type, QR_gesture_x, QR_gesture_x, QR_gesture_merchant, and/or the like. The QUADRATIC RESAMPLING gestures table may support and/or track multiple QR gestures performed on a MDGAAT. A vocal command table 1119*k* includes fields such as, but not limited to: vc_id, vc_name, vc_command_list, and/or the like. The vocal command gestures table may support and/or track multiple vocal commands performed on a MDGAAT. In one embodiment, the MDGAAT database may interact with other database systems. For example, employing a distributed database system, queries and data access by search MDGAAT component may treat the combination of the MDGAAT database, an integrated data security layer database as a single database entity.

In one embodiment, the MDGAAT database may interact with other database systems. For example, employing a distributed database system, queries and data access by search MDGAAT component may treat the combination of the MDGAAT database, an integrated data security layer database as a single database entity.

In one embodiment, user programs may contain various user interface primitives, which may serve to update the MDGAAT. Also, various accounts may require custom database tables depending upon the environments and the types of clients the MDGAAT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1141-1145. The Audio/Gesture Conversion Component 1141 handles translating audio and gesture data into actions. The Virtual Store Previewing Component 1142 handles virtual previews of store products. The Action Processing Component 1143 handles carrying out actions translated from the Audio/Gesture Conversion Component. The Image Processing 1144 handles processing images and videos for the purpose of locating information and/or determining gestures. The Audio Processing 1145 handles processing audio files and videos for the purpose of locating information and/or determining vocal commands. The MDGAAT may be configured to keep track of various settings, inputs, and parameters via database controllers.

The MDGAAT database may communicate to and/or with other components in a component collection, including itself, and/or facilities of the like. Most frequently, the MDGAAT database communicates with the MDGAAT component, other program components, and/or the like. The database may contain, retain, and provide information regarding other nodes and data.

The MDGAATs

The MDGAAT component 1135 is a stored program component that is executed by a CPU. In one embodiment, the MDGAAT component incorporates any and/or all combinations of the aspects of the MDGAAT discussed in the previous figures. As such, the MDGAAT affects accessing, obtaining and the provision of information, services, transactions, and/or the like across various communications networks.

The MDGAAT component may transform reality scene visual captures (e.g., see 213 in FIG. 2A, etc.) via MDGAAT components (e.g., fingertip detection component 1142, image processing component 1143, virtual label generation 1144, auto-layer injection component 1145, user setting component 1146, wallet snap component 1147, mixed gesture detection component 1148, and/or the like) into transaction settlements, and/or the like and use of the MDGAAT. In one embodiment, the MDGAAT component 1135 takes inputs (e.g., user selection on one or more of the presented overlay labels such as fund transfer 227*d* in FIG. 2C, etc.; checkout request 3811; product data 3815; wallet access input 4011; transaction authorization input 4014; payment gateway address 4018; payment network address 4022; issuer server address(es) 4025; funds authorization request(s) 4026; user(s) account(s) data 4028; batch data 4212; payment network address 4216; issuer server address(es) 4224; individual payment request 4225; payment ledger, merchant account data 4231; and/or the like) etc., and transforms the inputs via various components (e.g., user selection on one or more of the presented overlay labels such as fund transfer 227*d* in FIG. 2C, etc.; UPC 1153; PTA 1151 PTC 1152; and/or the like), into outputs (e.g., fund transfer receipt 239 in FIG. 2E; checkout request message 3813; checkout data 3817; card authorization request 4016, 4023; funds authorization response(s) 4030; transaction authorization response 4032; batch append data 4034; purchase receipt 4035; batch clearance request 4214; batch payment request 4218; transaction data 4220; individual payment confirmation 4228, 4229; updated payment ledger, merchant account data 4233; and/or the like).

The MDGAAT component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the MDGAAT server employs a cryptographic server to encrypt and decrypt communications. The MDGAAT component may communicate to and/or with other components in a component collection, including itself, and/or facilities of the like. Most frequently, the MDGAAT component communicates with the MDGAAT database, operating systems, other program components, and/or the like. The MDGAAT may contain, communicate, generate, obtain, and/or provide program component, system, user, and/or data communications, requests, and/or responses.

Distributed MDGAATs

The structure and/or operation of any of the MDGAAT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the MDGAAT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MDGAAT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept
incoming communication
$sock = socket_create(AF_INET, SOCK_STREAM, 0);
socket_bind($sock, $address, $port) or die('Could not bind
to address');
socket_listen($sock);
$client = socket_accept($sock);
// read input data from client device in 1024 byte blocks
until end of message
do {
   $input = ""?
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
```

-continued

```
VALUES ($data)"); // add data to UserTable table in a
CLIENT database
mysql_close("CLIENT_DB.SQL"); // close connection to
database
?>
```

Also, the following resources may be used to provide example embodiments regarding SOAP parser implementation:

```
http://www.xav.com/perl/site/lib/SOAP/Parser.html
http://publib.boulder.ibm.com/infocenter/tivihelp/v2r1/index.
jsp?topic=/com.ibm.IBMDI.doc/referenceguide295.htm
```

and other parser implementations:

```
http://publib.boulder.ibm.com/infocenter/tivihelp/v2r1/index.
jsp?topic=/com.ibm.IBMDI.doc/referenceguide259.htm
```

all of which are hereby expressly incorporated by reference herein.

In order to address various issues and advance the art, the entirety of this application (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MDGAAT individual and/or enterprise user, database configuration and/or relational model, data type, data transmission and/or network framework, syntax structure, and/or the like, various embodiments of the MDGAAT may be implemented that enable a great deal of flexibility and customization. For example, aspects of the MDGAAT may be adapted for (electronic/financial) trading systems, financial planning systems, and/or the like.

Augmented Reality Vision Device (V-GLASSES)

The AUGMENTED REALITY VISION DEVICE APPARATUSES, METHODS AND SYSTEMS (hereinafter "V-GLASSES") transform mobile device location coordinate information transmissions, real-time reality visual capturing, and mixed gesture capturing, via V-GLASSES components, into real-time behavior-sensitive product purchase related information, shopping purchase transaction notifications, and electronic receipts. In one embodiment, a V-GLASSES device may take a form similar to a pair of eyeglasses, which may provide an enhanced view with virtual information labels atop the captured reality scene to a consumer who wears the V-GLASSES device.

Within embodiments, the V-GLASSES device may have a plurality of sensors and mechanisms including, but not limited to: front facing camera to capture a wearer's line of sight; rear facing camera to track the wearer's eye movement, dilation, retinal pattern; an infrared object distance sensor (e.g., such may be found in a camera allowing for auto-focus image range detection, etc.); EEG sensor array along the top inner periphery of the glasses so as to place the EEG sensors in contact with the wearers brow, temple, skin; dual microphones, one having a conical listening position pointing towards the wearer's mouth, a second external and front facing for noise cancellation and acquiring audio in the wearer's field of perception; accelerometers; gyroscopes; infrared/laser projector in the upper portion of the glasses distally placed from a screen element and usable for projecting rich media; a flip down transparent/semi-transparent/opaque LED screen element within the wearer's field of view; a speaker having an outward position towards those in the field of perception of the wearer; integrated headphones that may be connected by wire towards the armatures of the glasses such that they are proximate to the wearer's ears and may be placed into the wearer's ears; a plurality of removable and replaceable visors/filters that may be used for providing different types of enhanced views; and/or the like.

For example, in one implementation, a consumer wearing a pair of V-GLASSES device may obtain a view similar to the example augmented reality scenes illustrated in FIGS. 20A-30 via the smart glasses, e.g., bill information and merchant information related to a barcode in the scene (716*d* in FIG. 18B), account information related to a payment card in the scene (913 in FIG. 20A), product item information related to captured objects in the scene (517 in FIG. 16C), and/or the like. It is worth noting that while the augmented reality scenes with user interactive virtual information labels overlaying a captured reality scene are generated at a camera-enabled smart mobile device in FIGS. 20A-30, such augmented reality scenes may be obtained via various different devices, e.g., a pair of smart glasses equipped with V-GLASSES client components (e.g., see 3001 in FIG. 41, etc.), a wrist watch, and/or the like. Within embodiments, the V-GLASSES may provide a merchant shopping assistance platform to facilitate consumers to engage their virtual mobile wallet to obtain shopping assistance at a merchant store, e.g., via a merchant mobile device user interface (UI). For example, a consumer may operate a mobile device (e.g., an Apple® iPhone, iPad, Google® Android, Microsoft® Surface, and/or the like) to "check-in" at a merchant store, e.g., by snapping a quick response (QR) code at a point of sale (PoS) terminal of the merchant store, by submitting GPS location information via the mobile device, etc. Upon being notified that a consumer is present in-store, the merchant may provide a mobile user interface (UI) to the consumer to assist the consumer's shopping experience, e.g., shopping item catalogue browsing, consumer offer recommendations, checkout assistance, and/or the like.

In one implementation, merchants may utilize the V-GLASSES mechanisms to create new V-GLASSES shopping experiences for their customers. For example, V-GLASSES may integrate with alert mechanisms (e.g., V.me wallet push systems, vNotify, etc.) for fraud preventions, and/or the like. As another example, V-GLASSES may provide/integrate with merchant-specific loyalty programs (e.g., levels, points, notes, etc.), facilitate merchants to provide personal shopping assistance to VIP customers. In further implementations, via the V-GLASSES merchant UI platform, merchants may integrate and/or synchronize a consumer's wish list, shopping cart, referrals, loyalty, merchandise delivery options, and other shopping preference settings between online and in-store purchase.

Within implementations, V-GLASSES may employ a virtual wallet alert mechanisms (e.g., vNotify) to allow merchants to communicate with their customers without sharing customer's personal information (e.g., e-mail, mobile phone number, residential addresses, etc.). In one implementation, the consumer may engage a virtual wallet applications (e.g., Visa® V.me wallet) to complete purchases at the merchant PoS without revealing the consumer's payment information (e.g., a PAN number) to the merchant.

Integration of an electronic wallet, a desktop application, a plug-in to existing applications, a standalone mobile application, a web based application, a smart prepaid card, and/or the like in capturing payment transaction related objects such as purchase labels, payment cards, barcodes, receipts, and/or the like reduces the number of network transactions and messages that fulfill a transaction payment initiation and procurement of payment information (e.g., a user and/or a merchant does not need to generate paper bills or obtain and send digital images of paper bills, hand in a physical payment card to a cashier, etc., to initiate a payment transaction, fund transfer, and/or the like). In this way, with the reduction of network communications, the number of transactions that may be processed per day is increased, i.e., processing efficiency is improved, and bandwidth and network latency is reduced.

It should be noted that although a mobile wallet platform is depicted (e.g., see FIGS. 42-54B), a digital/electronic wallet, a smart/prepaid card linked to a user's various payment accounts, and/or other payment platforms are contemplated embodiments as well; as such, subset and superset features and data sets of each or a combination of the aforementioned shopping platforms (e.g., see FIGS. 13A-13D and 15A-15M) may be accessed, modified, provided, stored, etc. via cloud/server services and a number of varying client devices throughout the instant specification. Similarly, although mobile wallet user interface elements are depicted, alternative and/or complementary user interfaces are also contemplated including: desktop applications, plug-ins to existing applications, stand alone mobile applications, web based applications (e.g., applications with web objects/frames, HTML5 applications/wrappers, web pages, etc.), and other interfaces are contemplated. It should be further noted that the V-GLASSES payment processing component may be integrated with an digital/electronic wallet (e.g., a Visa V-Wallet, etc.), comprise a separate stand alone component instantiated on a user device, comprise a server/cloud accessed component, be loaded on a smart/prepaid card that can be substantiated at a PoS terminal, an ATM, a kiosk, etc., which may be accessed through a physical card proxy, and/or the like.

Figure 12A:
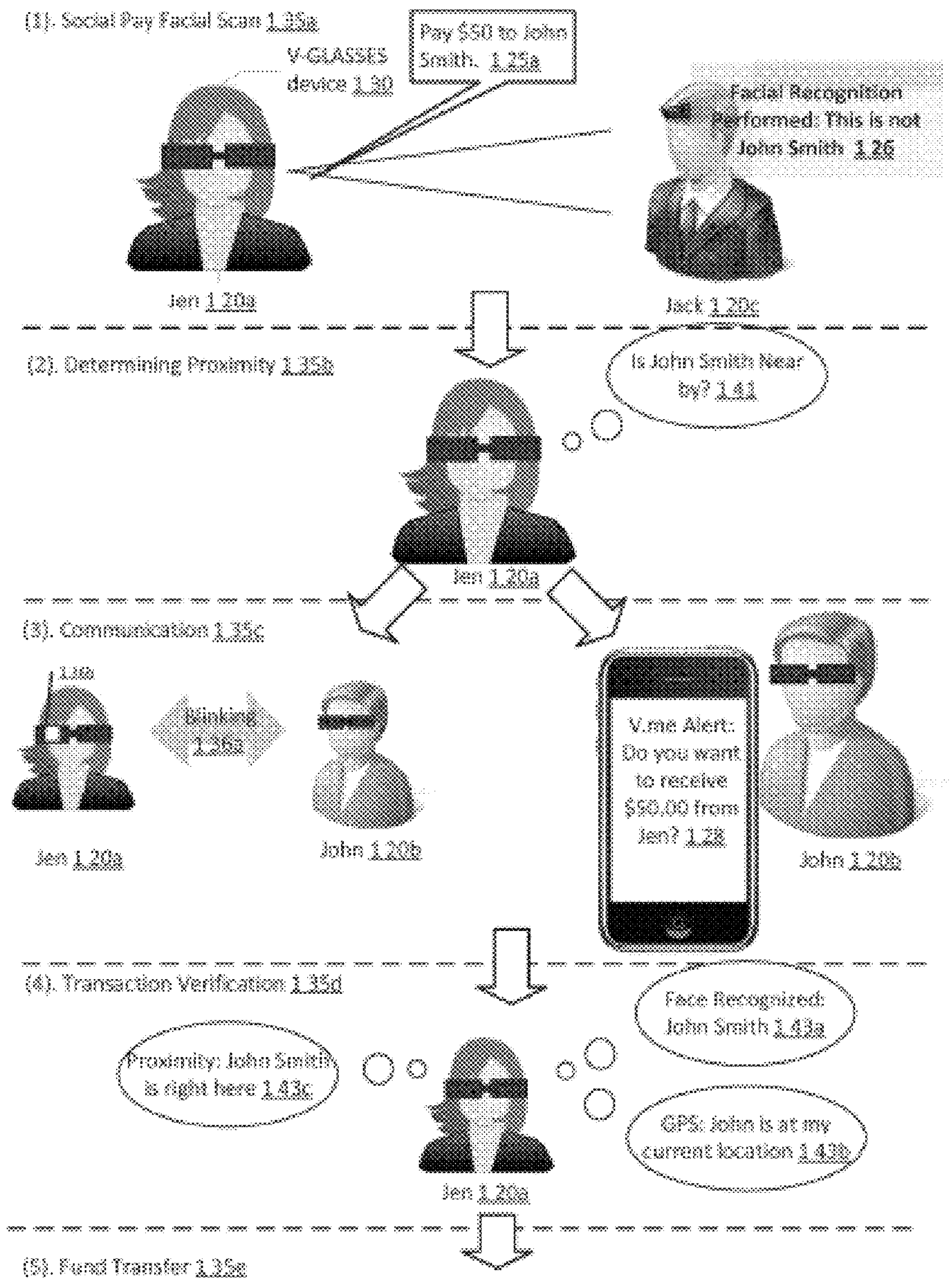
FIGS. 12A-12H provide block diagrams illustrating various example aspects of V-GLASSES augmented reality scenes within embodiments of the V-GLASSES.

FIG. 12A provides an exemplary combined logic and work flow diagram illustrating aspects of V-GLASSES device based integrated person-to-person fund transfer within embodiments of the V-GLASSES. Within embodiments, a consumer Jen 120*a* may desire to transfer funds to a transferee John 120*b*. In one implementation, Jen 120*a* may initiate a fund transfer request by verbally articulating the command "Pay $50.00 to John Smith" 125*a*, wherein the V-GLASSES device 130 may capture the verbal command line 125*a*, and imitates a social payment facial scan component 135*a*. In one implementation, the V-GLASSES device 130 may determine whether a person within the proximity (e.g., the vision range of Jen, etc.) is John Smith by facial recognition. For example, V-GLASSES device 130 may capture a snap of the face of consumer Jack 120C, and determine that he is not John Smith, and place a virtual label atop the person's face so that Jen 120*a* may see the facial recognition result 126.

In one implementation, the V-GLASSES may determine proximity 135*b* of the target payee John 141. For example, V-GLASSES may form a query to a remote server, a cloud, etc., to inquire about John's current location via V-GLASSES GPS tracking. As another example, V-GLASSES may track John's current location via John's wallet activities (e.g., scanning an item, check-in at a merchant store, as discussed in FIGS. 13A-13C, etc.). If John 120*b* is remote to Jen's location, Jen may communicate with John via various messaging systems, e.g., SMS, phone, email, wallet messages, etc. For example, John 120*b* may receive a V.me wallet message indicating the fund transfer request 128.

In another implementation, if John 120*b* is within proximity to Jen 120*a*, Jen may send a communication message 135*c* "Jen sends $50.00 to John" to John 120*b* via various means, e.g., SMS, wallet messages, Bluetooth, Wi-Fi, and/or the like. In one implementation, Jen may communicate with John in proximity via an optical message, e.g., Jen's V-GLASSES device may be equipped with a blinking light 136*a*, the glasses may produce on/off effects, etc., to generate a binary optical sequence, which may encode the fund transfer message (e.g., Morse code, etc.). For example, such blinking light may be generated by the V-GLASSES glass turning black or white 136*b*, etc. In one implementation, John's V-GLASSES device, which is in proximity to Jen's, may capture the optical message, and decode it to extract the fund transfer request. In one implementation, John's V-GLASSES device may generate an optical message in a similar manner, to acknowledge receipt of Jen's message, e.g., "John accepts $50.00 transfer from Jen." In further implementations, such optical message may be adopted to encode and/or encrypt various information, e.g., contact information, biometrics information, transaction information, and/or the like.

In one implementation, V-GLASSES may verify the transaction through integrated layers of information to prevent fraud, including verification such as facial recognition (e.g., whether the recipient is John Smith himself, etc.), geographical proximity (e.g., whether John Smith's is currently located at Jen's location, etc.), local proximity (e.g., whether John Smith successfully receives and returns an optical message "blinked" from Jen, etc.), and/or the like.

In one implementation, if the transaction verification 135*d* is positive, V-GLASSES may transfer $50.00 from Jen's account to John. Further implementations of transaction processing with regard to P2P transfer may be found in U.S. nonprovisional patent application Ser. No. 13/520,481, filed Jul. 3, 2012, entitled "Universal Electronic Payment Apparatuses, Methods and Systems,", which is herein expressly incorporated by reference.

Figure 12B:
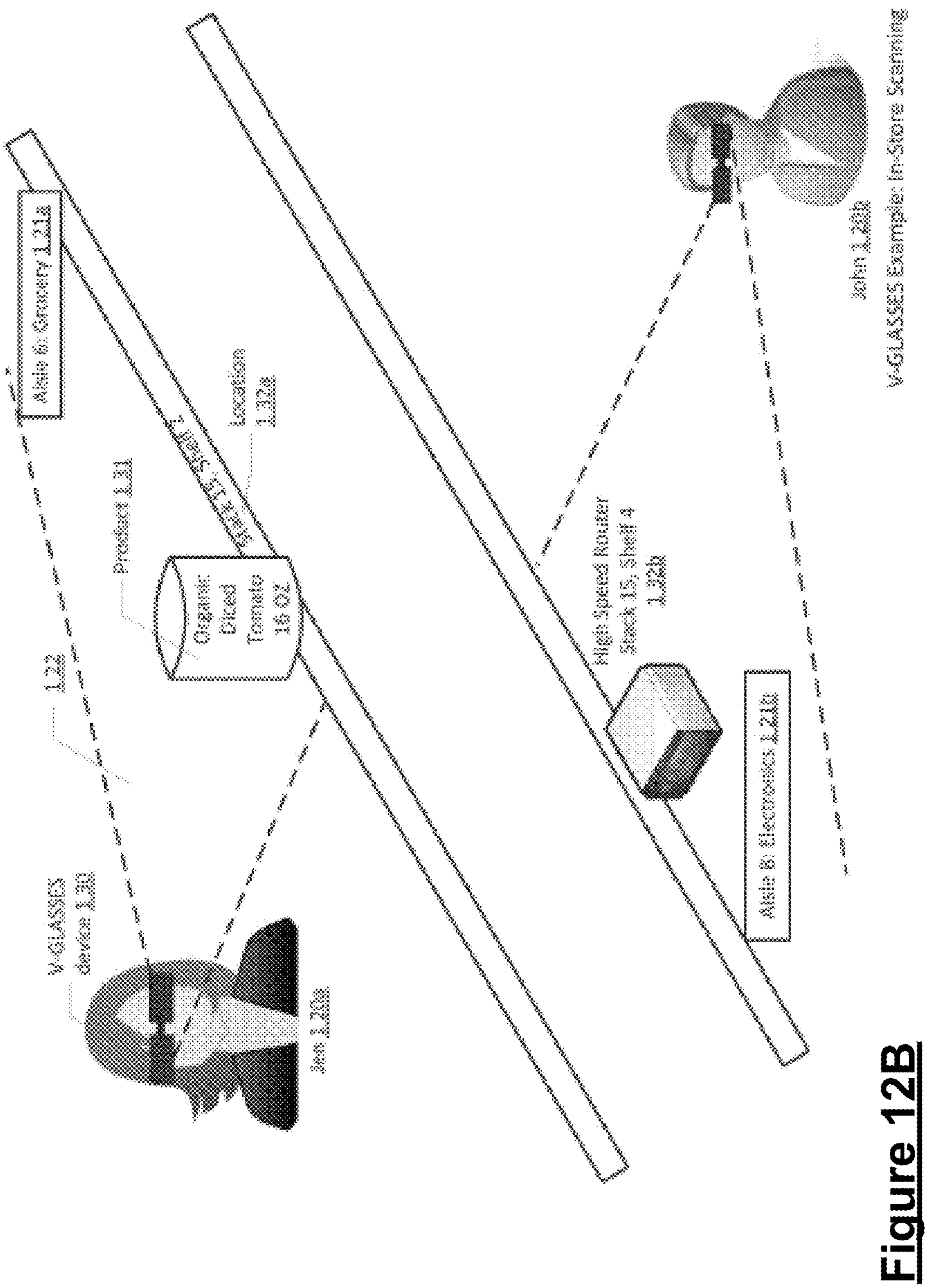

FIG. 12B provides an exemplary diagram illustrating V-GLASSES in-store scanning for store inventory map within embodiments of the V-GLASSES. In one implementation, V-GLASSES may obtain a store map including inventory information. Such store map may include information as to the in-store location (e.g., the aisle number, stack number, shelf number, SKU, etc.) of product items, and may be searchable based on a product item identifier so that a consumer may search for the location of a desired product item. In one implementation, such store map may be provided by a merchant, e.g., via a store injection in-wallet UI (e.g., see FIG. 16B), a downloadable data file, and/or the like. Further implementations of store injection map are discussed in FIGS. 16B-16F.

Figure 16A:
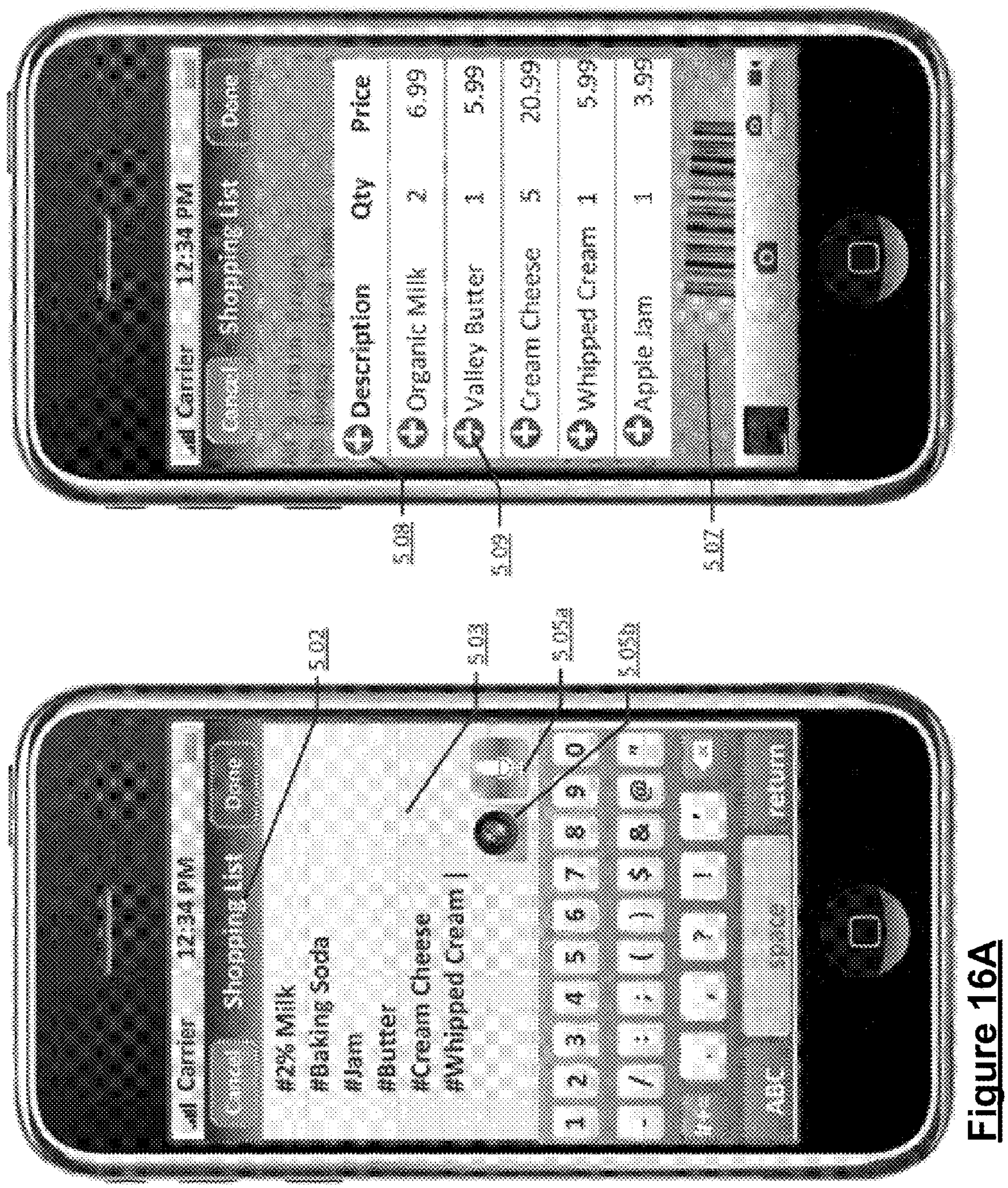
FIGS. 16A-16F including FIGS. 16(D)(1) and 16(F)(1) provide exemplary UI diagrams illustrating V-GLASSES virtual shopping within embodiments of the V-GLASSES.
Figure 16B:
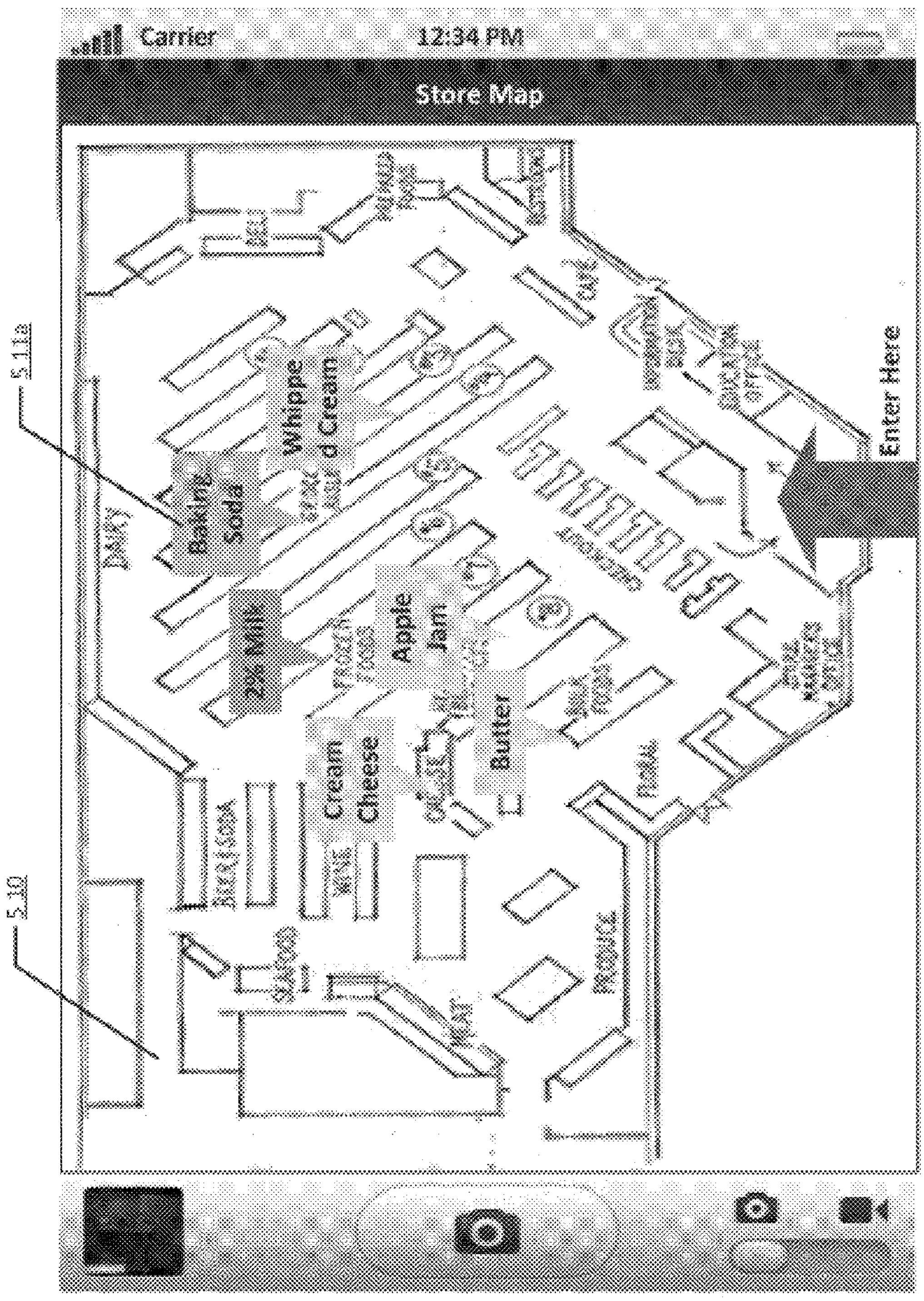

In alternative implementations, V-GLASSES may facilitate scanning an in-store scene and generate an inventory map based on visual capturing of inventory information of a merchant store and generate an inventory map based on image content detection. For example, as shown in FIGS. 16D and 16D(1), a merchant store may install cameras on top of the shelf along the aisles, wherein vision scopes of each camera may be interleaved to scan and obtain the entire view of the opposite shelf. V-GLASSES may perform pattern recognition analytics to identify items placed on the shelf and build an inventory map of the merchant store. For example, V-GLASSES may obtain an image of an object on the shelf which may have a barcode printed thereon, and determine the object is a can of "Organic Diced Tomato 16 OZ" that is placed on "aisle 6, stack 15, shelf 2." In one implementation, V-GLASSES may determine objects placed adjacent to the identified "Organic Diced Tomato 16 OZ" are the same product items if such objects have the same shape.

In one implementation, such cameras may be configured to scan the shelves periodically (e.g., every hour, etc.), and may form a camera social network to generate real-time updates of inventory information. For example, product items may be frequently taken off from a shelf by consumers, and such change in inventory may be captured by camera scanning, and reflected in the inventory updates. As another example, product items may be picked up by consumers and randomly placed at a wrong shelf, e.g., a can of "Organic Diced Tomato 16 OZ" being placed at the beauty product shelf, etc., and such inventory change may be captured and transmitted to the merchant store for correction. In further implementations, the camera scanning may facilitate security monitoring for the merchant store.

In further implementations, as shown in FIG. 12B, the in-store scanning and identifying product items for store inventory map building may be carried out by consumers who wear V-GLASSES devices 130. For example, a consumer may walk around a merchant store, whose V-GLASSES devices 130 may capture visual scenes of the store. As shown in FIG. 12B, consumer Jen's 120*a* V-GLASSES device 130 may capture a can of "Organic Diced Tomato 16 OZ" 131 on shelf, which may identify the product item and generate a product item inventory status message including the location of such product to the V-GLASSES server for store inventory map updating. For example, an example listing of a product item inventory status message, substantially in the form of eXtensible Markup Language ("XML"), is provided below:

```
<?XML version = "1.0" encoding = "UTF-8"?>
<Inventory_update>
<timestamp> 11:23:23 01-01-2014 </timestamp>
<source> V_GLASSES 001 </source>
<user>
  <user_id> Jen111 </user_id>
  <user_name> Jen Smith </user_name>
    ...
</user>
<GPS> 1231243 234235 </GPS>
<merchant>
    <MID> ABC00123 </MID>
    ...
    <merchant_name> la jolla shopping center
</merchant_name>
    <address> 550 Palm spring ave </address>
    <city> la jolla </city>
    <zipcode> 00000 </zipcode>
...
</merchant>
<product>
  <MCC> 34234 </MCC>
  <name> Organic Diced Tomato 16OZ </name>
  ...
  <location>
      <floor> 1st floor </floor>
      <Aisle> 6 </aisle>
      <stack> 15 </stack>
      <shelf> 2 </shelf>
      <shelf_height> 5'10" </shelf_height>
  </location>
    ...
</inventory_update>
```

In a further implementation, V-GLASSES may facilitate obtain an estimate of the shelf height, width, e.g., based on the angle of the vision, etc. In a similar manner, consumer John's 120*b* V-GLASSES may capture a "High Speed Internet Router" 132*b* in the electronics aisle 121*b*, and transmit such information for store inventory map updating. Multiple consumers' V-GLASSES capturing may generate various contributions for real-time store inventory updating.

Figure 12C:
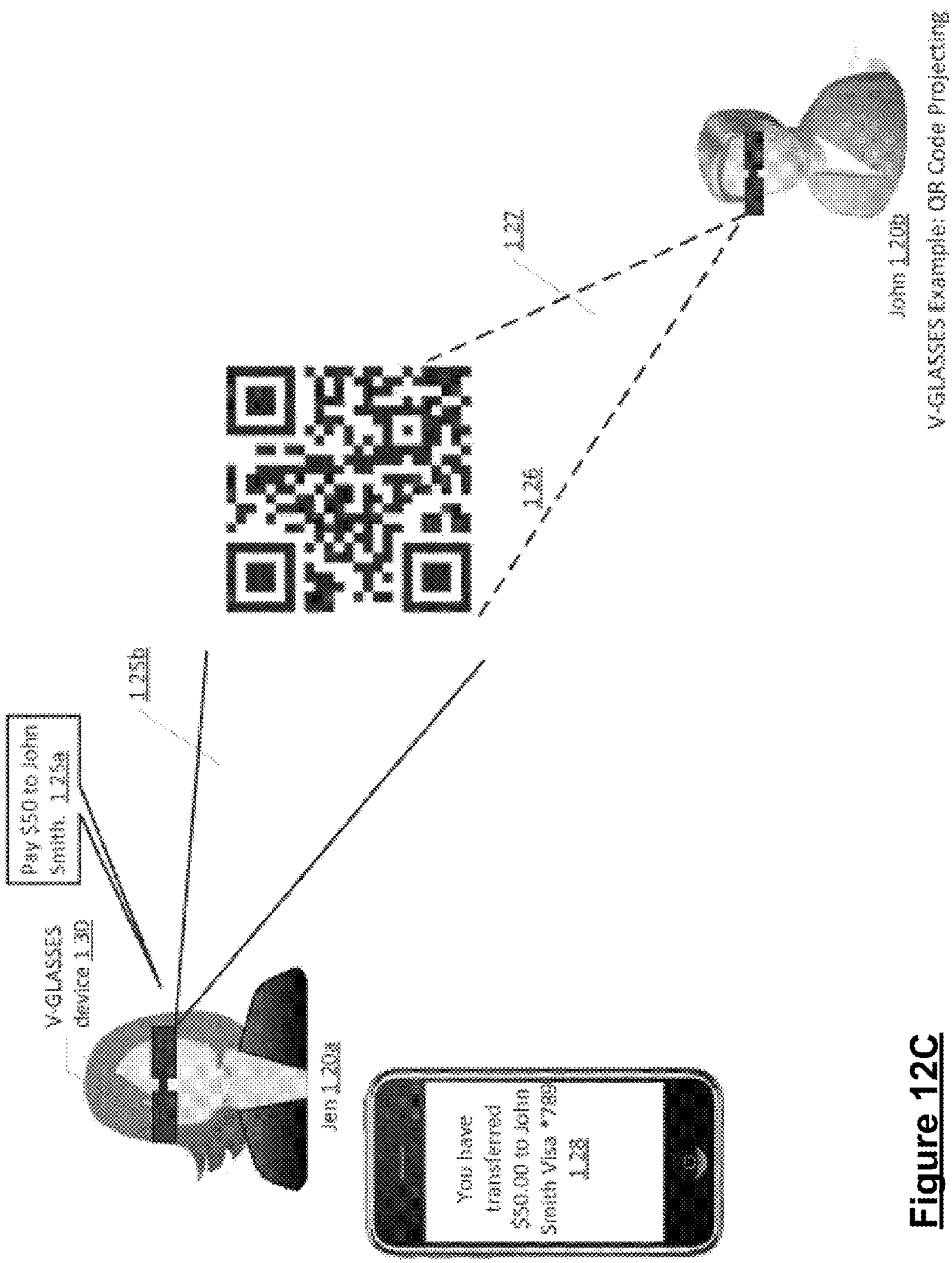
Figure 12D:
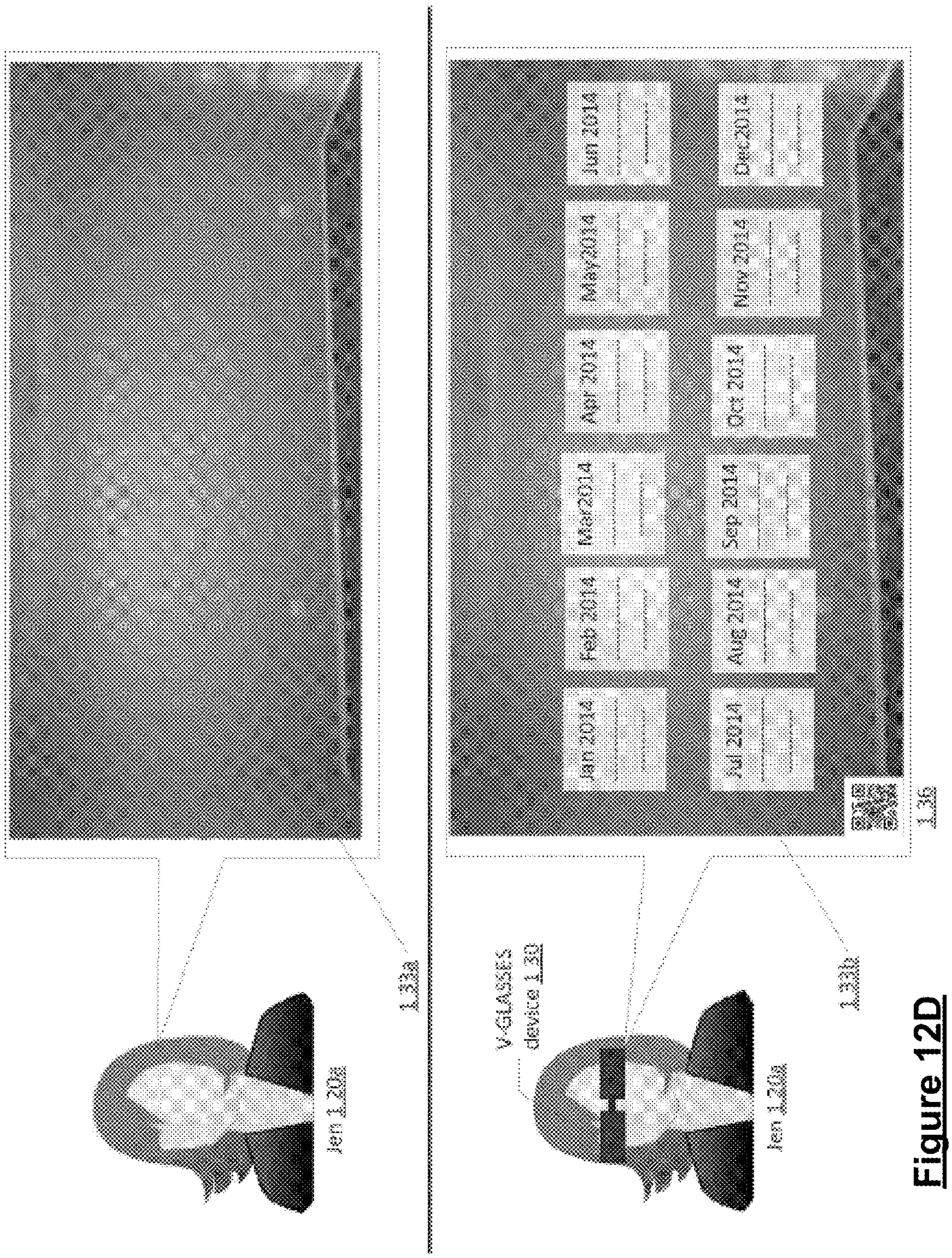
Figure 12E:
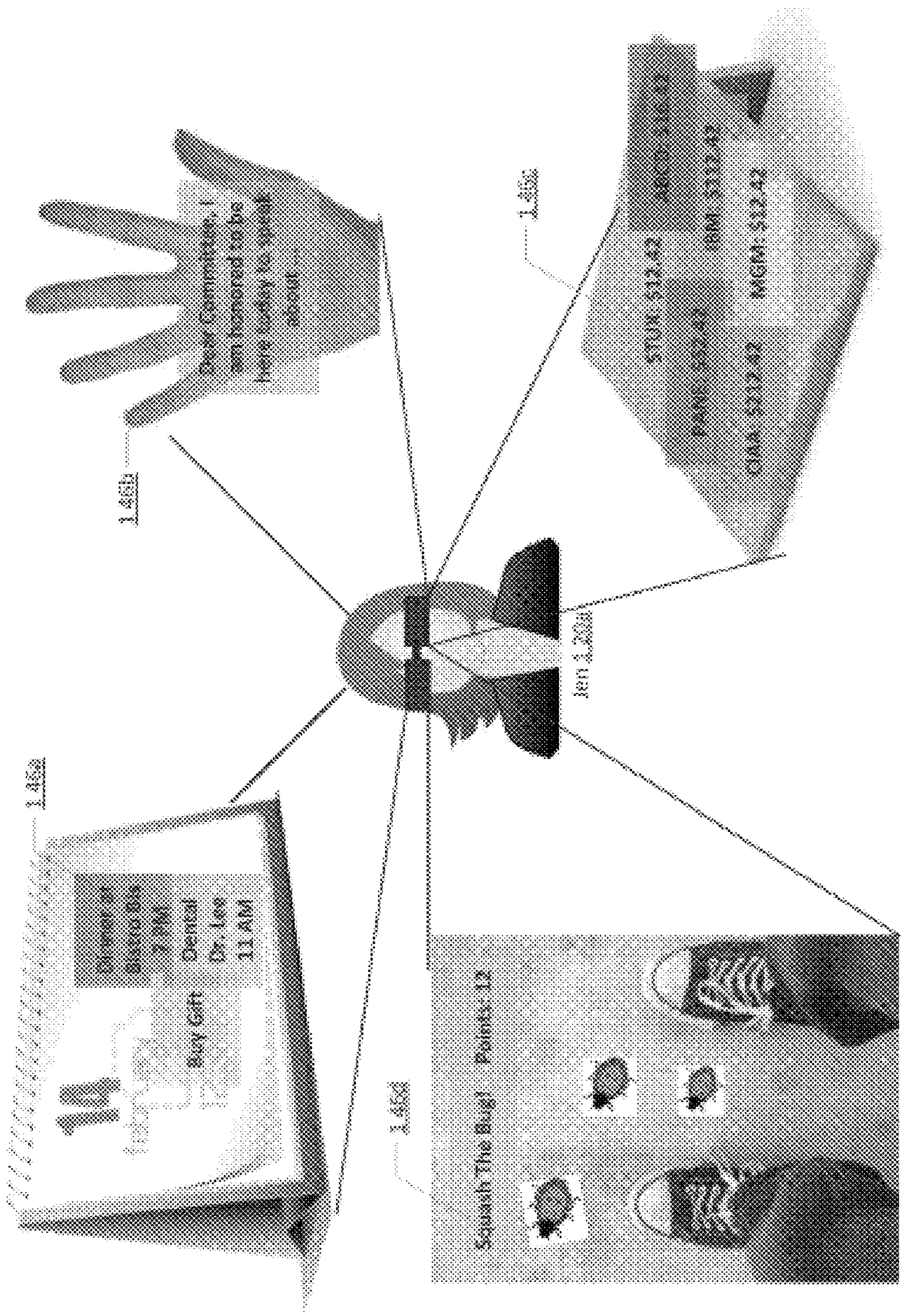
Figure 12F:
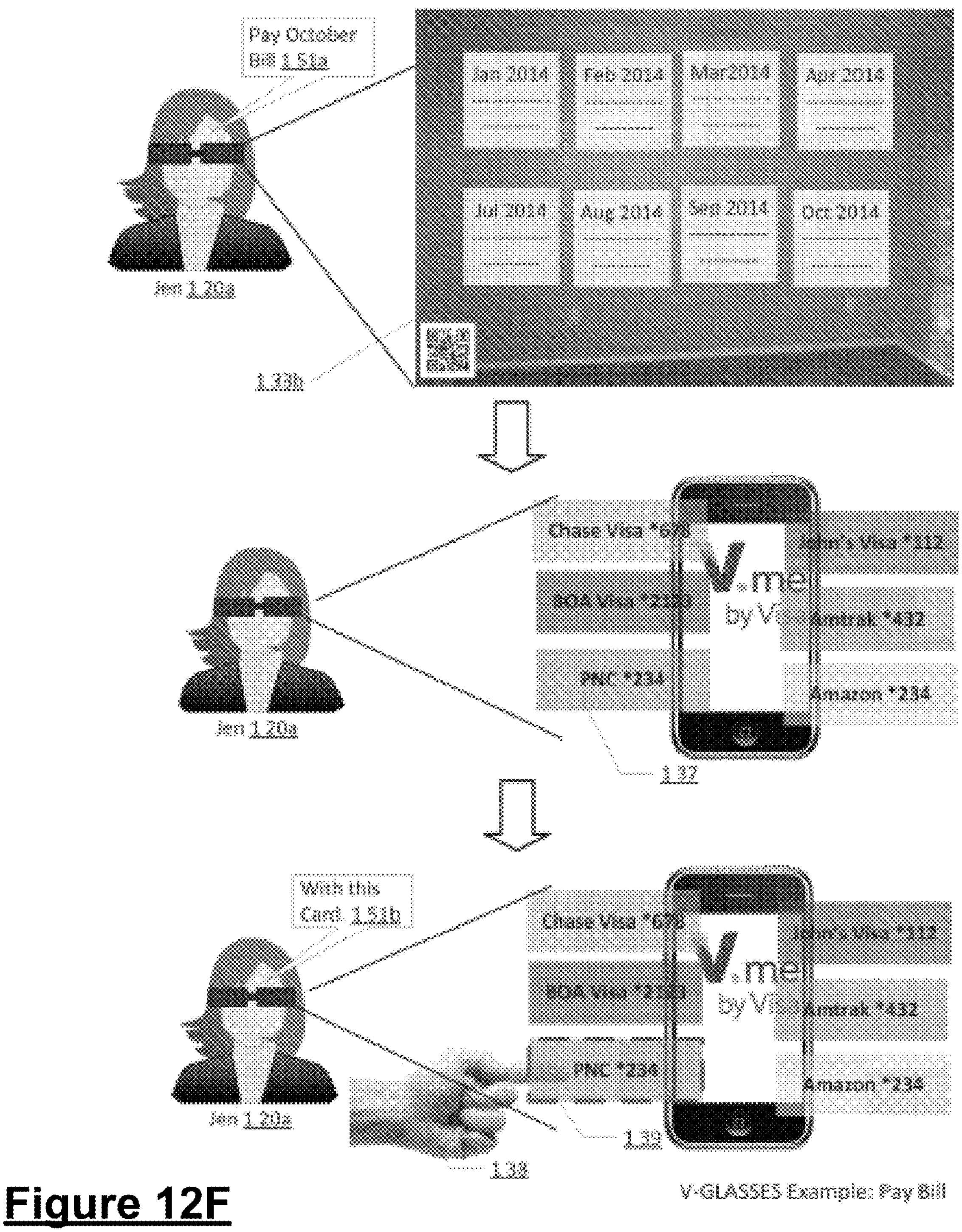

FIG. 12C provides an exemplary diagram illustrating In one implementation, V-GLASSES may be equipped with a mini-projector (e.g., a laser projector, etc.) that may project graphic contents on a surface so that a consumer may see an enlarged view of the graphic contents. For example, in one implementation, the V-GLASSES may project a keyboard on a table so that the consumer may type with the projected keyboard, e.g., to enter a PIN, to enter username, to type a search term, and/or the like. As another example, V-GLASSES may project option buttons on a surface and the consumer may tap the projected buttons to make a selection.

In further implementations, V-GLASSES may project a QR code on a surface to facilitate a transaction. For example, as shown in FIG. 12C, in one implementation, consumer Jen 120*a* may provide a social payment mixed gesture command, e.g., a vocal command "pay $50.00 to John," 125*a*, etc., and the V-GLASSES device 130 may generate a QR code 126 for the person-to-person payment. In one implementation, Jen's V-GLASSES may project 125*b* the generated QR code on a surface (e.g., see 126), so that John's V-GLASSES device may capture the QR code for fund transfer, e.g., by "seeing" the QR code 127. Alternatively, if John is not wearing a pair of V-GLASSES device, John may operate a smart phone to snap a photo of the projected QR code for fund transfer request, and Jen may receive a notification of fund transfer at a mobile device upon completion of the transaction 128 Further implementations of the QR code based P2P transfer may be found in U.S. nonprovisional patent application Ser. No. 13/520,481, filed Jul. 3, 2012, entitled "Universal Electronic Payment Apparatuses, Methods and Systems,", which is herein expressly incorporated by reference. In further implementations, V-GLASSES may perform facial recognition to identify a social pay target.

In further implementations, the V-GLASSES projection may be used for signature capture for security challenge (e.g., a consumer may sign with finger on a projected "signature area," etc.)

FIG. 12D provides an exemplary diagram illustrating aspects of an infinite facial and geographic placement of information user interface within embodiments of the V-GLASSES. In one implementation, V-GLASSES may generate augmented reality labels atop a reality scene so that a consumer wearing a pair of V-GLASSES device may obtain a combined augmented reality view with virtual information labels. Such vision of augmented reality views may provide the consumer an expanded view of an "information wall." For example, in one implementation, a consumer 120*a* may desire to view all the utility bills over the past 12 months; the V-GLASSES may retrieve the bills information, and virtually "stitch" 12 bills on a big wall when the consumer "looks" at the big wall via a V-GLASSES device 130. As shown in FIG. 12D, without wearing the V-GLASSES device 130, consumer Jen 120*a* only sees an empty wall 133*a*; while with the V-GLASSES device 130 on, Jen 120*a* obtain an augmented reality view of 12 bills displayed on the wall 133*b*. In this way, V-GLASSES may obtain an "infinite" space to provide information labels to the consumer based on the consumer's scope of vision.

In further implementations, the virtual "information wall" may be generated based on consumer interests, geo-location, and various atmospherics factors. For example, a V-GLASSES analytics component may determine a consumer may be interested in food, shoes, and electronics based on the consumer's purchasing history, browsing history, QR code scanning history, social media activities, and/or the like. V-GLASSES may generate an "information wall" including news feeds, social media feeds, ads, etc. related to the consumer's interested item categories, e.g., food, shoes and electronics, etc. V-GLASSES may further determine that when the consumer is at an office location, the consumer tends to browse "electronics" more often; as such, when V-GLASSES detects the consumer is at the office location, e.g., via GPS tracking, IP address, cell tower triangular positioning, etc., V-GLASSES may place "electronic" information to the consumer's "information wall."

As another example, when a consumer is detected to be at an office location, V-GLASSES may fill an "information wall" with business related information labels, e.g., meeting reminders, stock banners, top business contacts, missing calls, new emails, and/or the like. In a further implementation, a consumer may set up and/or customize the "information wall" with interested items. For example, a consumer may choose to "display" a favorite oil painting, family picture, wedding photo on the "information wall," so that the consumer may be able to see the personalized decoration item displayed via the V-GLASSES in an office setting, without having to physically hang or stitch the real picture/photo on a physical wall.

In one implementation, V-GLASSES may provide "layers" of "information walls." For example, a consumer may "look" at an empty real wall via a V-GLASSES device and choose an "information wall" that the consumer would like to see, e.g., by articulating the name of the "wall" (e.g., "12 months electricity bills," "my office wall," etc.), by a mixed gesture command (e.g., waving leftward or rightward to proceed with another previously saved "information wall," etc.), and/or the like. In another implementation, V-GLASSES may save and identify an "information wall" by generating a QR code 136, and display it at the corner of the "information wall." A consumer may take a snap shot of the QR code via V-GLASSES device to identify the "information wall," and/or to transmit information of the "information wall." For example, a consumer may snap the QR code and project such QR code on a surface, and use a Smartphone to capture the QR code; in this way, the virtual "information wall" that is visible via a V-GLASSES device may be reproduced within the Smartphone based on the captured QR code.

In one implementation, the V-GLASSES device 130 may store, or retrieve information of an "information wall" from the QR code 136. For example, an example listing of an information wall record, substantially in the form of XML, is provided below:

```
<?XML version = "1.0" encoding = "UTF-8"?>
<information_wall>
<wall_id> office wall </wall_id>
<wall_trigger>
  <trigger_1> location == office </trigger-1>
  <trigger-2> login "office.net" </trigger_2>
  ...
<wall_trigger>
...
<user>
  <user_id> Jen111 </user_id>
  <user_name> Jen Smith </user_name>
    ...
</user>
...
<frame>
    <x-range> 1024 </x-range>
    <y-range> 768 </y-range>
  ...
</frame>
<object_1>
    <type> calendar </type>
    <position>
      <x_start> 102 <x_start>
      <x_end> 743</x_end>
```

-continued

```
      <y_start> 29 </y_start>
      <y_end> 145 </y_end>
    </position>
    ...
    <description> calendar invite of today
</description>
  <source> wallet calendar </source>
  <orientation> horizontal </orientation>
    <format>
    <template_id> Calendar001 </template_id>
    ...
    <font> ariel </font>
    <font_size> 12 pt </font_size>
    <font_color> Orange </font_color>
    <overlay_type> on top </overlay_type>
    <transparency> 50% </transparency>
    <background_color> 255 255 0
</background_color>
    <label_size>
      <shape> oval </shape>
      <long_axis> 60 </long_axis>
      <short_axis> 40 </short_axis>
    <object_offset> 30 </object_offset>
      ...
    </label_size>
    ...
    </format>
  ...
</object_1>
<object_2> ... </object_2>
  ...
</information_wall>
```

FIG. 12E provides various alternative examples of an infinite augmented reality display within embodiments of the V-GLASSES. Within implementations, the "information wall" may be placed on various different objects. For example, the V-GLASSES may intelligently recognize an object and determine virtual overlays to place on top of the object, e.g., when V-GLASSES recognizes the consumer Jen 120*a* is looking at a desk calendar 146*a*, V-GLASSES may automatically generate calendar events, invites, reminders within the scene. In another implementation, consumer Jen 120*a* may configure V-GLASSES to associate such calendar events virtual overlays with a physical desk calendar.

As another example, V-GLASSES may place speech scripts 146*b* on Jen's hand to help Jen prepare a speech, e.g., when Jen looks down at her hand, she may see the speech script.

As another example, V-GLASSES may project stock banners on a trader's desk 146*c*, so that a trader may be able to expand the view of market data.

In a further implementation, V-GLASSES may generate a "virtual game" 146*d*. For example, when a consumer is waiting in a line, V-GLASSES may provide a virtual gaming option to entertain the consumer. When consumer Jen 120*a* looks down at her feet, V-GLASSES may generate virtual "walking bugs" in the scene, and if Jen 120*a* moves her feet to "squash the bug," she may win a gaming point. In one implementation, when Jen 120*a* shift her focus from the ground (e.g., looking up, etc.), the "snatch the bug" game may automatically pause, and may resume when Jen stands still and looks down at the ground again.

With reference to FIG. 12F, consumer Jen 120*a* may obtain an expanded view of virtual utility bills "stitched" on a wall 133*b*, and make a command by saying "Pay October Bill" 151*a*. In another implementation, instead of the verbal command 151*a*, the EEG sensors equipped with the V-GLASSES device may capture Jen's brain wave and obtain the bill payment command. In another implementation, the consumer Jen 120*a* may point to a virtual "bill" on the wall, e.g., in a similar manner as shown at 138.

In one implementation, Jen 120*a* may look at her mobile phone which may have instantiated a mobile wallet component, and obtain a view of a list of virtual cards overlaying the reality scene 137. In one implementation, Jen 120*a* may point to a virtual card overlay 138 and articulate "Pay with this card" 151*b*. In one implementation, the virtual card overlay may be highlighted 139 upon Jen's fingertip pointing, and V-GLASSES may capture the verbal command to proceed a bill payment. For example, V-GLASSES may generate a payment transaction message paying Jen's October bill with Jen's PNC account.

Figure 12G:
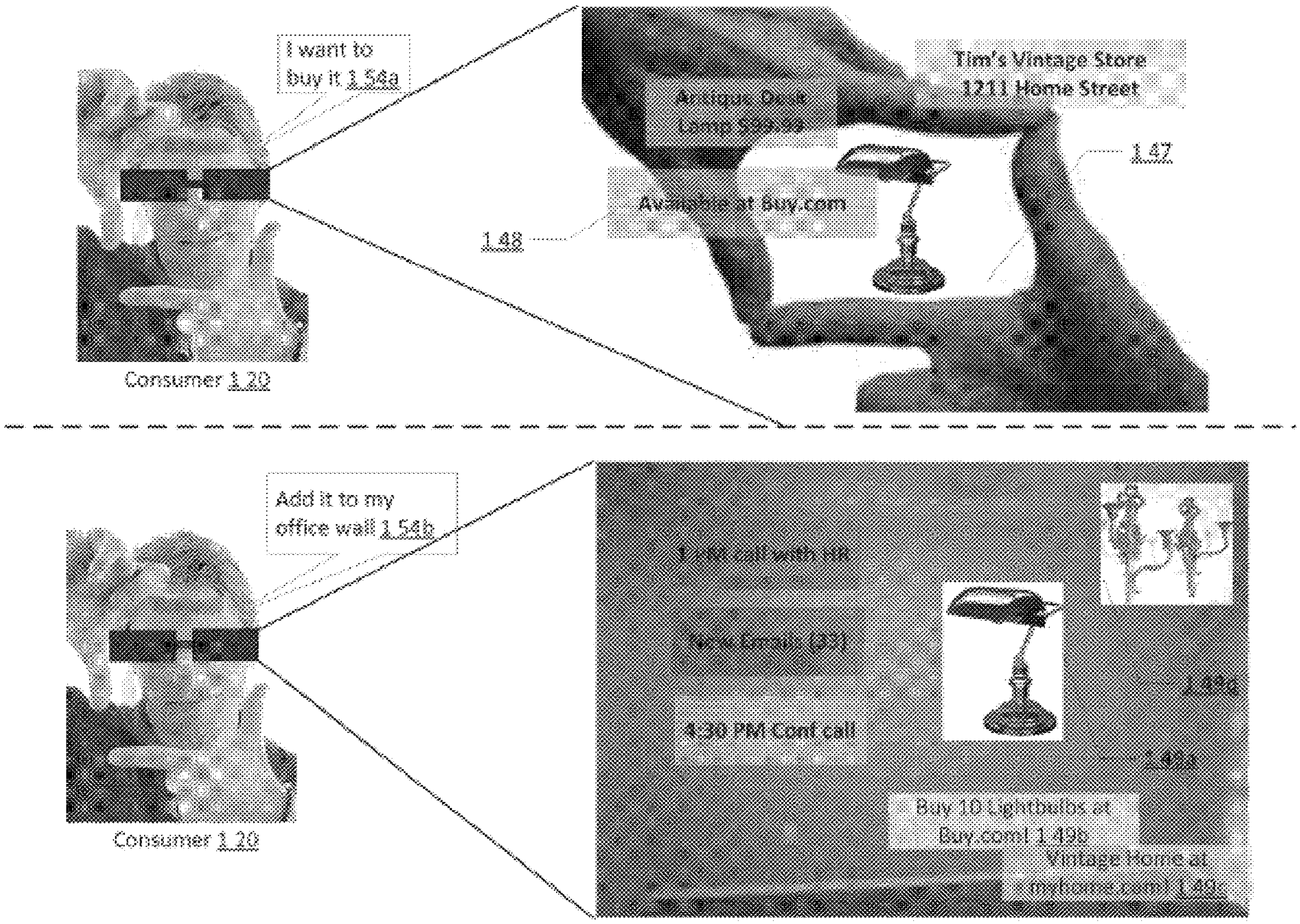

With reference to FIG. 12G, a consumer 120 may utilize a "framing" gesture to select an item in the scene. For example, a consumer 120 may "frame" an antique desk lamp 147 and make a verbal command "I want to buy" 154*a*. In one implementation, the V-GLASSES may provide information labels with regard to the item identifying information, availability at local stores, availability on online merchants 148, and/or the like (e.g., various merchants, retailers may inject advertisements related products for the consumer to view, etc.). As another example, the consumer 120 may "frame" the desk lamp and command to "add it to my office wall" 154*b*, e.g., the consumer may want to see an image of the antique desk lamp displayed at his office wall, etc. In one implementation, the V-GLASSES may snap a picture of the desk lamp, and generate a virtual overlay label containing the image, and overlay the new label 149*a* on the "information wall" in addition to other existing labels on the "information wall." In another implementations, V-GLASSES may place advertisements 149*b-c* related to the new "Antique Desk Lamp" 149*a* and existing labels on the wall. For example, when the consumer has an "Antique Desk Lamp" 149*a* and an existing image of "Antique Candle Holders" 149*d*, V-GLASSES may provide ads related to "Vintage Home Décor" 149*c* and lightbulbs ads 149*b*, and/or the like.

Figure 18A:
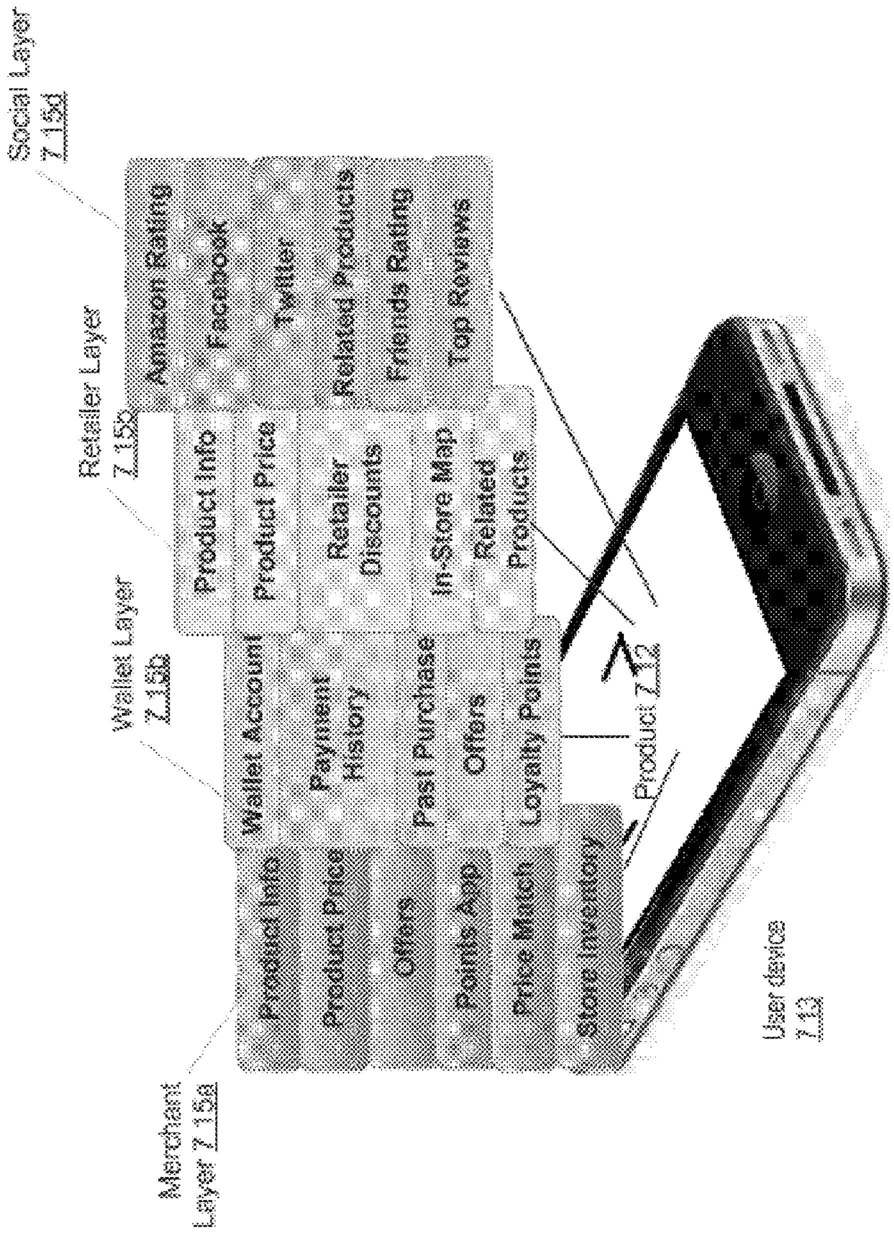
FIG. 18A-18C provides a diagram illustrating example virtual layers injections upon virtual capturing within embodiments of the V-GLASSES.

In further implementations, a V-GLASSES device may be accompanied with accessories such as various visors/filters for different layers of overlay labels. In one implementation, V-GLASSES may provide layers of information labels (e.g., similar to layers in augmented reality overlay as shown in FIG. 18A), and a layer may be switched to another via mixed gesture commands. In another implementation, a consumer may change information overlays by changing a physical visor, e.g., an offer visor that provide offers/ads overlays, a museum visor that provides historical background information of art paintings and directions, a merchant shopping assistant visor that provides item information and in-store directions, and/or the like.

Figure 12H:
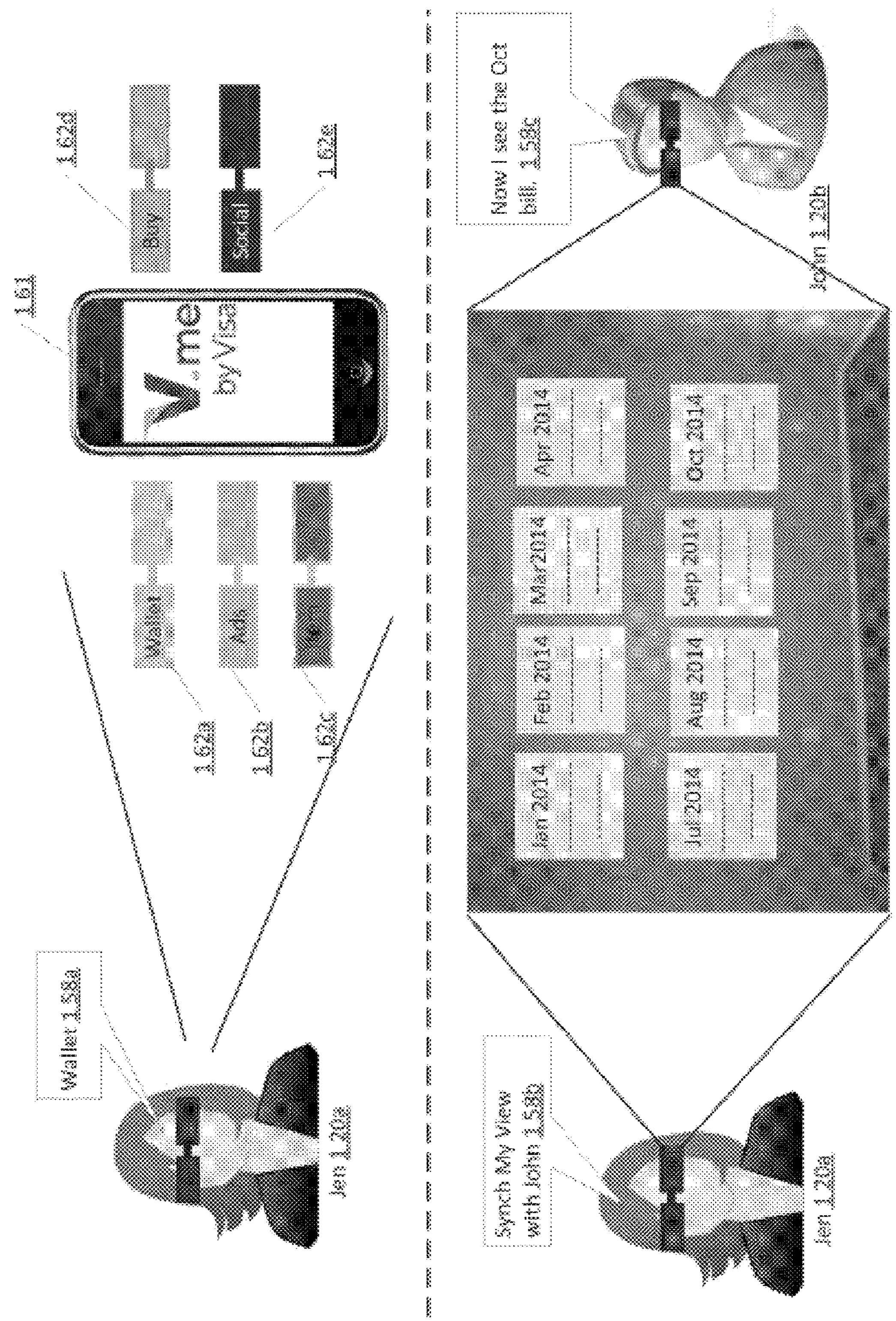

Alternatively, as shown in FIG. 12H, the visor/filter may be virtual, e.g., the consumer may view various virtual "visors" (e.g., "wallet" visor 162*a*, "Ads" visor 162*b*, item information "visor" 162*c*, buy option "visor" 162*d*, social reviews "visor" 162*e*, etc.) surrounding an object, e.g., a Smartphone, etc. The consumer may elect to choose a "visor" for information overlay by making a verbal command "wallet" 158*a*.

In further implementations, consumer Jen 120*a* and John 120*b* may synchronized their view through the V-GLASSES devices. For example, Jen 120*a* may view a wall of virtually "stitched" utility bills, and may command 158*b* to synchronize the view with John 120*b*. In one implementation, Jen's V-GLASSES device may send a synchronization view message to John's, so that John will obtain the same view of virtually "stitched" utility bills when he looks at the wall 158*c*.

In one embodiment, V-GLASSES may generate social predictive purchase item recommendations based on a consumer's social atmospherics. For example, in one implementation, V-GLASSES may track a consumer's social media connections' social activities (e.g., Facebook status, posts, photos, comments, Tweets, Google+status, Google+ messages, etc.) and generate heuristics of a possible gift recommendation. For example, if a consumer's Facebook friend has posted a "baby shower" event invitation, or a Facebook status updating indicating she is expecting a baby, V-GLASSES may generate a purchase recommendation for a baby gift to the consumer. As another example, if a consumer's Facebook friend's birthday is coming up, V-GLASSES may analyze the Facebook connection's social activities, purchasing history, etc. to determine the connection's interests (e.g., Facebook comments with regard to a brand, a product item, etc.; "likes"; posted photos related to a product category; hash tags of Tweets; published purchase history on social media; followed pages; followed social media celebrities; etc.). For example, if the consumer's connection follows a celebrity makeup artist on YouTube, and "likes" the page "Sephora," V-GLASSES may recommend beauty products to the consumer as a gift for the consumer's connection when the connection's birthday is coming up.

In one implementation, such social "gifting" recommendations may be provided to the consumer via a Facebook ads, banner ads, cookie ads within a browser, messages, email, SMS, instant messages, wallet push messages, and/or the like. In further implementations, V-GLASSES may generate a recommendation via augmented reality information overlays. In the above social "birthday gifting" example, in one implementation, a consumer may view an augmented reality label "Gift idea for Jen!" overlaying a cosmetics product via the consumer's V-GLASSES.

In one implementation, the V-GLASSES social predictive gift component may obtain social history information via a virtual wallet component, e.g., the social publications related to purchase transactions of the consumer and/or the consumer's social connections. Further implementations of social publications may be found in U.S. nonprovisional patent application Ser. No. 13/520,481, filed Jul. 3, 2012, entitled "Universal Electronic Payment Apparatuses, Methods and Systems,", which is herein expressly incorporated by reference. In another implementation, the V-GLASSES may obtain such social information and purchasing transaction information via an information aggregation platform, which aggregates, stores, and categories various consumer information across different platforms (e.g., transaction records at a transaction processing network, social media data, browsing history, purchasing history stored at a merchant, and/or the like). Further implementations of the information aggregation platform are discussed in U.S. provisional Ser. No. 61/594,063, entitled "Centralized Personal Information Platform Apparatuses, Methods And Systems," filed Feb. 2, 2012, which is herein expressly incorporated by reference.

In further implementations, V-GLASSES may generate social predictive ads to the consumer, e.g., based on the consumer's purchasing patterns, seasonal purchases, and/or the like. For example, V-GLASSES may capture a consumer's habitual grocery purchases, e.g., one gallon of organic non-fat milk every two weeks, etc., and may generate a seasonal ads related to products, offers/rewards for organic milk every two weeks. Further implementations of the social predictive advertising component are discussed in U.S. non-provisional application Ser. No. 13/543,825, entitled "Bidirectional Bandwidth Reducing Notifications And Targeted Incentive Platform Apparatuses, Methods And Systems," filed Jul. 7, 2012, which is herein expressly incorporated by reference.

In further implementations, V-GLASSES may submit information to a server for processing power saving. For example, V-GLASSES may pass on pattern recognition (e.g., store inventory map aggregation, facial recognition, etc.) requests to a server, a cloud, and/or the like. In one implementation, V-GLASSES may determine a distributed server to route such requests based on server availability, server geo-location, server specialty (e.g., a processor component dedicated for facial recognition, etc.).

In further implementations, the V-GLASSES device 130 may be adopted for security detection (e.g., retina scanning, etc.). A consumer may interact with V-GLASSES device via voice, gesture, brain waves, and/or the like.

In further implementations, the V-GLASSES may establish an image databases for pattern recognition. Such image database may include graphic content for image capture, maps, purchase, etc. For example, in one implementation, when a consumer sees an "iPad" via the V-GLASSES device, such image may be processed and compared to images previously stored in the image database to identify that the rectangular object is an "iPad."

In further implementations, the consumer may operate a Smartphone as a remote control for the V-GLASSES device.

Figure 12I:
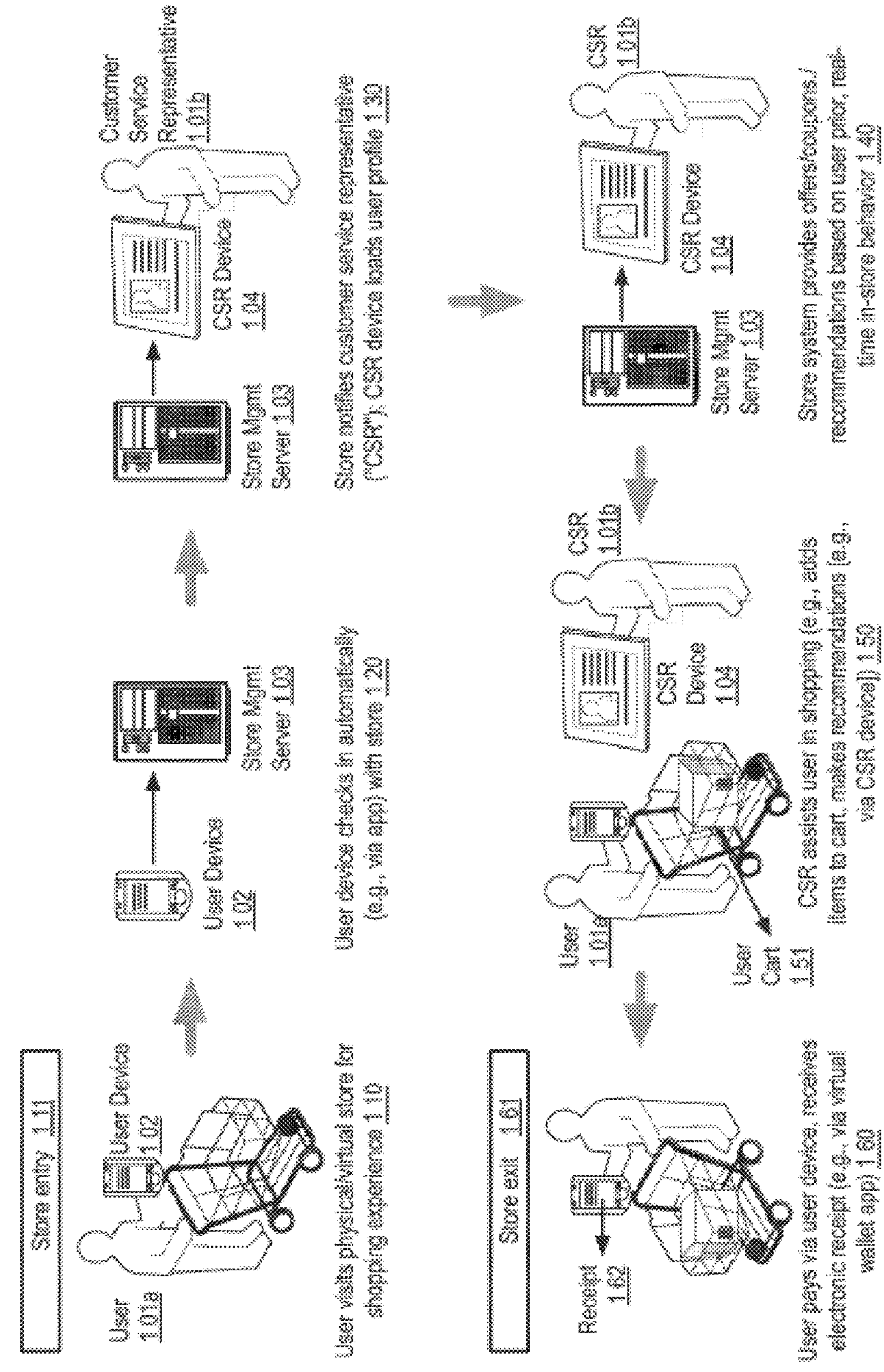
FIG. 12I shows a block diagram illustrating example aspects of augmented retail shopping in some embodiments of the V-GLASSES.

FIG. 12I shows a block diagram illustrating example aspects of augmented retail shopping in some embodiments of the V-GLASSES. In some embodiments, a user 101*a* may enter 111 into a store (e.g., a physical brick-and-mortar store, virtual online store [via a computing device], etc.) to engage in a shopping experience, 110. The user may have a user device 102. The user device 102 may have executing thereon a virtual wallet mobile app, including features such as those as described below with in the discussion with reference to FIGS. 42-54B. Upon entering the store, the user device 102 may communicate with a store management server 103. For example, the user device may communicate geographical location coordinates, user login information and/or like check-in information to check in automatically into the store, 120. In some embodiments, the V-GLASSES may inject the user into a virtual wallet store upon check in. For example, the virtual wallet app executing on the user device may provide features as described below to augment the user's in-store shopping experience. In some embodiments, the store management server 103 may inform a customer service representative 101*b* ("CSR") of the user's arrival into the store. In one implementation, the CSR may include a merchant store employee operating a CSR device 104, which may comprise a smart mobile device (e.g., an Apple® iPhone, iPad, Google® Android, Microsoft® Surface, and/or the like). The CSR may interact with the consumer in-person with the CSR device 104, or alternatively communicate with the consumer via video chat on the CSR device 104. In further implementations, the CSR may comprise an shopping assistant avatar instantiated on the CSR device, with which the consumer may interact with, or the consumer may access the CSR shopping avatar within the consumer mobile wallet by checking in the wallet with the merchant store.

For example, the CSR app may include features such as described below in the discussion with reference to FIGS. 15A-15M. The CSR app may inform the CSR of the user's entry, including providing information about the user's profile, such as the user's identity, user's prior and recent purchases, the user's spending patterns at the current and/or other merchants, and/or the like, 130. In some embodiments, the store management server may have access to the user's prior purchasing behavior, the user's real-time in-store behavior (e.g., which items' barcode did the user scan using the user device, how many times did the user scan the barcodes, did the user engage in comparison shopping by scanning barcodes of similar types of items, and/or the like), the user's spending patterns (e.g., resolved across time, merchants, stores, geographical locations, etc.), and/or like user profile information. The store management system may utilize this information to provide offers/coupons, recommendations and/or the like to the CSR and/or the user, via the CSR device and/or user device, respectively, 140. In some embodiments, the CSR may assist the user in the shopping experience, 150. For example, the CSR may convey offers, coupons, recommendations, price comparisons, and/or the like, and may perform actions on behalf of the user, such as adding/removing items to the user's physical/virtual cart 151, applying/removing coupons to the user's purchases, searching for offers, recommendations, providing store maps, or store 3D immersion views (see, e.g., FIG. 16C), and/or the like. In some embodiments, when the user is ready to checkout, the V-GLASSES may provide a checkout notification to the user's device and/or CSR device. The user may checkout using the user's virtual wallet app executing on the user device, or may utilize a communication mechanism (e.g., near field communication, card swipe, QR code scan, etc.) to provide payment information to the CSR device. Using the payment information, the V-GLASSES may initiate the purchase transaction(s) for the user, and provide an electronic receipt 162 to the user device and/or CSR device, 160. Using the electronic receipt, the user may exit the store 161 with proof of purchase payment.

Some embodiments of the V-GLASSES may feature a more streamlined login option for the consumer. For example, using a mobile device such as iPhone, the consumer may initially enter a device ID such as an Apple ID to get into the device. In one implementation, the device ID may be the ID used to gain access to the V-GLASSES application. As such, the V-GLASSES may use the device ID to identify the consumer and the consumer need not enter another set of credentials. In another implementation, the V-GLASSES application may identify the consumer using the device ID via federation. Again, the consumer may not need to enter his credentials to launch the V-GLASSES application. In some implementations, the consumer may also use their wallet credentials (e.g., V.me credentials) to access the V-GLASSES application. In such situations, the wallet credentials may be synchronized with the device credentials.

Figure 15A:
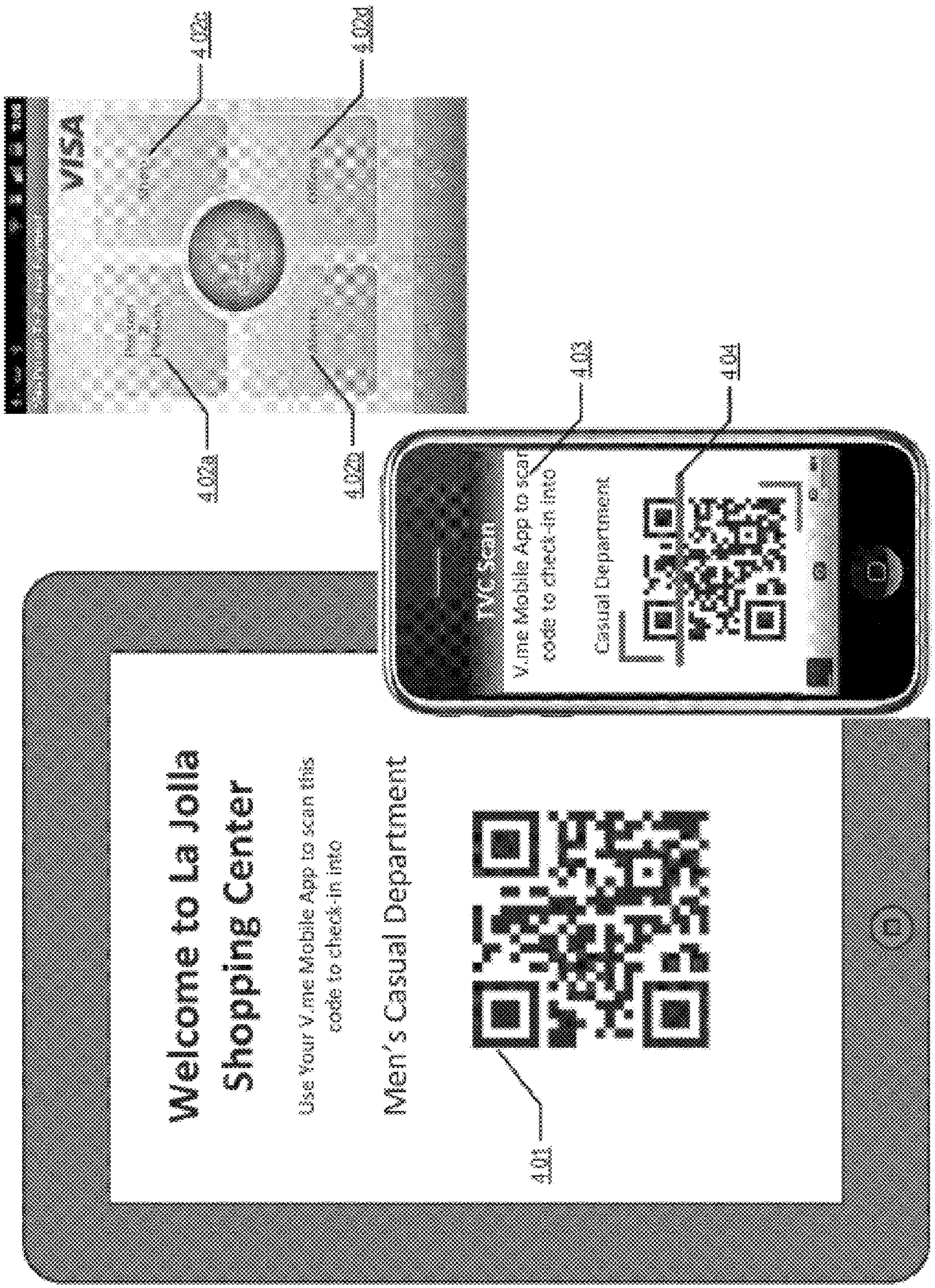
FIGS. 15A-15M provide exemplary user interface diagrams illustrating V-GLASSES augmented shopping within embodiments of the V-GLASSES.
Figure 15B:

Once in the V-GLASSES application, the consumer may see some graphics that provide the consumer various options such as checking in and for carrying items in the store. In one implementation, as shown in FIGS. 15A-15B, a consumer may check in with a merchant. Once checked in, the consumer may be provided with the merchant information (e.g., merchant name, address, etc.), as well as options within the shopping process (e.g., services, need help, ready to pay, store map, and/or the like). When the consumer is ready to checkout, the consumer may capture the payment code (e.g., QR code). Once, the payment code is captured, the V-GLASSES application may generate and display a safe locker (e.g., see 455 in FIG. 15I). The consumer may move his fingers around the dial of the safe locker to enter the payment PIN to execute the purchase transaction. Because the consumer credentials are managed in such a way that the device and/or the consumer are pre-authenticated or identified, the payment PIN is requested only when needed to conduct a payment transaction, making the consumer experience simpler and more secure. The consumer credentials, in some implementations, may be transmitted to the merchant and/or V-GLASSES as a clear or hashed package. Upon verification of the entered payment PIN, the V-GLASSES application may display a transaction approval or denial message to the consumer. If the transaction is approved, a corresponding transaction receipt may be generated (e.g., see FIG. 15K). In one implementation, the receipt on the consumer device may include information such as items total, item description, merchant information, tax, discounts, promotions or coupons, total, price, and/or the like. In a further implementation, the receipt may also include social media integration link via which the consumer may post or tweet their purchase (e.g., the entire purchase or selected items). Example social media integrated with the V-GLASSES application may include FACEBOOK, TWITTER, Google+, Four Squares, and/or the like. Details of the social media integration are discussed in detail in U.S. patent application Ser. No. 13/327,740 filed on Dec. 15, 2011 and titled "Social Media Payment Platform Apparatuses, Methods and Systems" which is herein expressly incorporated by reference. As a part of the receipt, a QR code generated from the list of items purchased may be included. The purchased items QR code may be used by the sales associates in the store to verify that the items being carried out of the store have actually been purchased.

Some embodiments of the V-GLASSES application may include a dynamic key lock configuration. For example, the V-GLASSES application may include a dynamic keyboard that displays numbers or other characters in different configuration every time. Such a dynamic keypad would generate a different key entry pattern every time such that the consumer would need to enter their PIN every time. Such dynamic keypad may be used, for example, for entry of device ID, wallet PIN, and/or the like, and may provide an extra layer of security. In some embodiments, the dial and scrambled keypad may be provided based on user preference and settings. In other embodiments, the more cumbersome and intricate authentication mechanisms can be supplied based on increased seasoning and security requirements discussed in greater detail in U.S. patent application Ser. No. 13/434,818 filed Mar. 29, 2012 and titled "Graduated Security Seasoning Apparatuses, Methods and Systems," and PCT international application serial no. PCT/US12/66898, filed Nov. 28, 2012, entitled "Transaction Security Graduated Seasoning And Risk Shifting Apparatuses, Methods And Systems," which are all herein expressly incorporated by reference. These dynamic seasoned PIN authentication mechanisms may be used to authorize a purchase, and also to gain access to a purchasing application (e.g., wallet), to gain access to the device, and/or the like. In one embodiment, the GPS location of the device and/or discerned merchant may be used to determine a risk assessment of any purchasing made at such location and/or merchant, and as such may ratchet up or down the type of mechanism to be used for authentication/authorization.

In some embodiments, the V-GLASSES may also facilitate an outsourced customer service model wherein the customer service provider (e.g., sales associate) is remote, and the consumer may request help from the remote customer service provider by opening a communication channel from their mobile device application. The remote customer service provider may then guide the requesting user through the store and/or purchase.

Figure 13A:
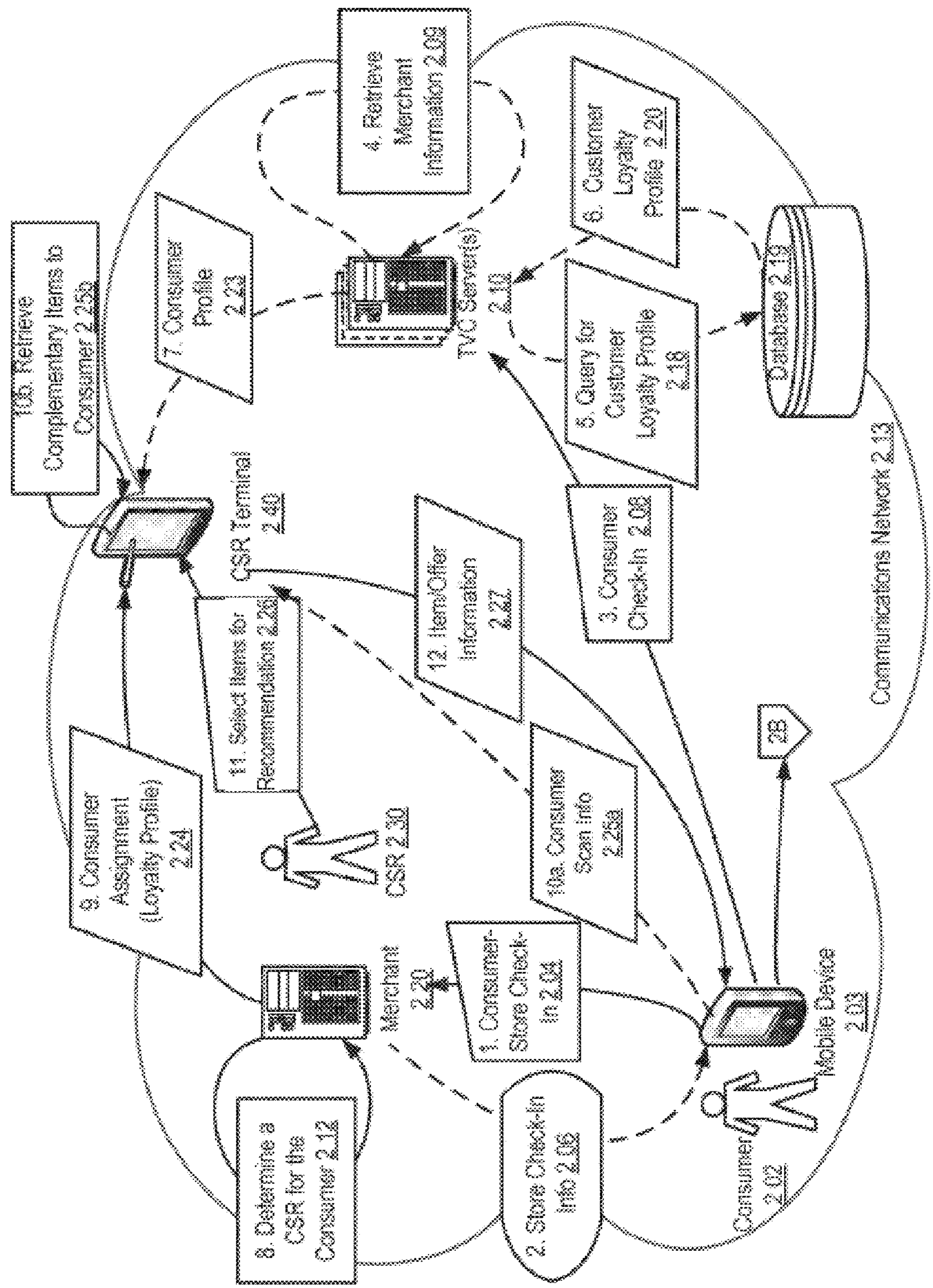
FIGS. 13A-13D provide exemplary datagraphs illustrating data flows between the V-GLASSES server and its affiliated entities within embodiments of the V-GLASSES.
Figure 13B:
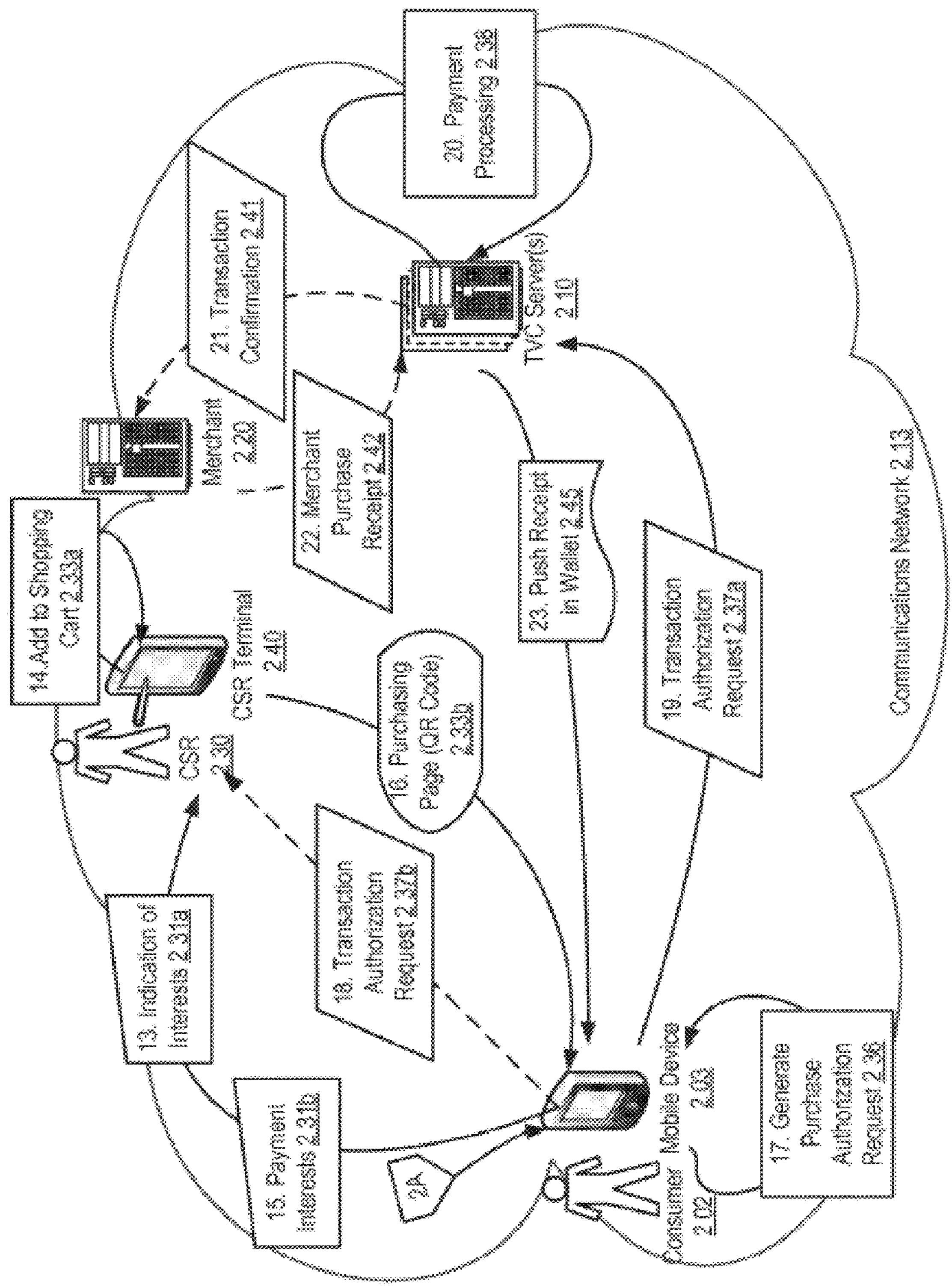

FIGS. 13A-13B provide exemplary data flow diagrams illustrating data flows between V-GLASSES and its affiliated entities for in-store augmented retail shopping within embodiments of the V-GLASSES. Within embodiments, various V-GLASSES entities, including a consumer 202 operating a consumer mobile device 203, a merchant 220, a CSR 230 operating a CSR terminal 240, an V-GLASSES server 210, an V-GLASSES database 219, and/or the like may interact via a communication network 213.

With reference to FIG. 13A, a user 202 may operate a mobile device 203, and check-in at a merchant store 220. In one implementation, various consumer check-in mechanisms may be employed. In one implementation, the consumer mobile device 203 may automatically handshake with a contactless plate installed at the merchant store when the consumer 202 walks into the merchant store 220 via Near Field Communication (NFC), 2.4 GHz contactless, and/or the like, to submit consumer in-store check-in request 204 to the merchant 220, which may include consumer's wallet information. For example, an example listing of a consumer check-in message 204 to the merchant store, substantially in the form of eXtensible Markup Language ("XML"), is provided below:

```
<?XML version = "1.0" encoding = "UTF-8"?>
<checkin_data>
  <timestamp>2014-02-22 15:22:43</timestamp>
  <client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
  </client_details>
  <wallet_details>
    <wallet_type> V.me </wallet_type>
    <wallet_status> on </wallet_status>
    <wallet_name> JS_wallet </wallet_name>
    ...
  </wallet_details>
<!--optional parameters-->
  <GPS>
    <latitude> 74° 11.92 </latitude>
    <longtitude> 42° 32.72 </longtitude>
  </GPS>
  <merchant>
    <MID> MACY00123 </MID>
    <MCC> MEN0123 </MCC>
    <merchant_name> la jolla shopping center
</merchant_name>
    <address> 550 Palm spring ave </address>
    <city> la jolla </city>
    <zipcode> 00000 </zipcode>
    <division> 1st floor men's wear </division>
    <location>
        <GPS> 3423234 23423 </GPS>
        <floor> 1st floor </floor>
        <Aisle> 6 </aisle>
        <stack> 56 </stack>
        <shelf> 56 </shelf>
      </location>
    ...
  </merchant>
  <QR_code>
    <type> 2D </type>
    <error_correction> L-7% </error_correction>
    <margin> 4 block </margin>
```

-continued

```
        <scale> 3X </scale>
        <color> 000000 </color>
        <content> &^NDELJDA%(##Q%DIHAF TDS23243^&
    </content>
        ...
    </checkin_data>
```

In an alternative implementation, a merchant 220 may optionally provide a store check-in information 206 so that the consumer may snap a picture of the provided store check-in information. The store check-in information 206 may include barcodes (e.g., UPC, 2D, QR code, etc.), a trademark logo, a street address plaque, and/or the like, displayed at the merchant store 220. The consumer mobile device may then generate a check-in request 208 including the snapped picture of store check-in information 206 to the V-GLASSES server 210. In further implementations, the store check-in information 206 may include a store floor plan transmitted to the consumer via MMS, wallet push messages, email, and/or the like.

For example, the store information 206 to the V-GLASSES consumer, substantially in the form of XML-formatted data, is provided below:

```
Content-Length: 867
<?XML version = "1.0" encoding = "UTF-8"?>
<store_information>
  <timestamp>2014-02-22 15:22:43</timestamp>
  <GPS>
    <latitude> 74° 11.92 </latitude>
    <longtitude> 42° 32.72 </longtitude>
  </GPS>
  <merchant>
    <MID> MACY00123 </MID>
    <MCC> MEN0123 </MCC>
    <merchant_name> la jolla shopping center
</merchant name>
      <address> 550 Palm spring ave </address>
      <city> la jolla </city>
      <zipcode> 00000 </zipcode>
      <division> 1st floor men's wear </division>
      ...
    </merchant>
    <store_map> "MACYS_1st_floor_map.PDF" </store_map>
    ...
</store_information>
```

As another example, the consumer mobile device 203 may generate a (Secure) Hypertext Transfer Protocol ("HTTP(S)") POST message including the consumer check-in information for the V-GLASSES server 210 in the form of data formatted according to the XML. An example listing of a checkout request 208 to the V-GLASSES server, substantially in the form of a HTTP(S) POST message including XML-formatted data, is provided below:

```
POST /checkinrequest.php HTTP/1.1
Host: 192.168.23.126
Content-Type: Application/XML
Content-Length: 867
<?XML version = "1.0" encoding = "UTF-8"?>
<checkin_request>
  <checkin_session_id> 4SDASDCHUF ^GD&
</checkin_session_id>
  <timestamp>2014-02-22 15:22:43</timestamp>
  <client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
  </client_details>
  <wallet_details>
    <wallet_type> V.me </wallet_type>
    <wallet_account_number> 1234 12343
</wallet_account_number>
    <wallet_id> JS001 </wallet_id>
    <wallet_status> on </wallet_status>
    <wallet_name> JS_wallet </wallet_name>
    ...
  </wallet_details>
  <merchant>
    <MID> MACY00123 </MID>
    <MCC> MEN0123 </MCC>
    <merchant_name> la jolla shopping center
</merchant_name>
    <address> 550 Palm spring ave </address>
    <city> la jolla </city>
    <zipcode> 00000 </zipcode>
    <division> 1st floor men's wear </division>
    <location>
        <GPS> 3423234 23423 </GPS>
        <floor> 1st floor </floor>
        <Aisle> 12 </aisle>
        <stack> 4 </stack>
        <shelf> 2 </shelf>
      </location>
      ...
  </merchant>
  <image_info>
      <name> mycheckin </name>
      <format> JPEG </format>
      <compression> JPEG compression
</compression>
      <size> 123456 bytes </size>
      <x-Resolution> 72.0 </x-Resolution>
      <y-Resolution> 72.0 </y-Resolution>
      <date_time> 2014:8:11 16:45:32
</date_time>
      ...
      <content> ÿØÿà JFIF H H ÿâ´ICC_PROFILE
¤appl mntrRGB XYZ Ü $ acspAPPL öÖÓ-appl
desc P bdscm ´ Šcprt ——————@ $wtpt
  ——————d       rXYZ   ——————x     gXYZ
  ——————CE      bXYZ   ——————      rTRC
  ——————´       aarg À vcgt ...
      </content>
    ...
  </image_info>
...
</checkout_request>
```

The above exemplary check-in request message includes a snapped image (e.g., QR code, trademark logo, storefront, etc.) for the V-GLASSES server 210 to process and extract merchant information 209. In another implementation, the mobile device 203 may snap and extract merchant information from the snapped QR code, and include such merchant information into the consumer check-in information 208.

In another implementation, the check-in message 208 may further include the consumer's GPS coordinates for the V-GLASSES server 210 to associate a merchant store with the consumer's location. In further implementations, the check-in message 208 may include additional information, such as, but not limited to biometrics (e.g., voice, fingerprint, facial, etc.), e.g., a consumer provides biometric information to a merchant PoS terminal, etc., mobile device identity (e.g., IMEI, ESN, SIMid, etc.), mobile component security identifying information, trusted execution environment (e.g., Intel TXT, TrustZone, etc.), and/or the like.

In one implementation, upon V-GLASSES server obtaining merchant information 209 from the consumer check-in request message 208, V-GLASSES server 210 may query for related consumer loyalty profile 218 from a database 219. In one implementation, the consumer profile query 218 may be performed at the V-GLASSES server 210, and/or at the merchant 220 based on merchant previously stored consumer loyalty profile database. For example, the V-GLASSES database 219 may be a relational database responsive to Structured Query Language ("SQL") commands. The V-GLASSES server may execute a hypertext preprocessor ("PHP") script including SQL commands to query a database table (such as FIG. 55, Offer **4419*m*) for loyalty, offer data associated with the consumer and the merchant. An example offer data query 218**, substantially in the form of PHP/SQL commands, is provided below:

```
<?PHP
header('Content-Type: text/plain');
mysql_connect("254.93.179.112",$DBserver,$password); //
access database server
mysql_select_db("V-GLASSES_DB.SQL"); // select database
table to search
//create query
$query = "SELECT offer_ID, offer_title,
offer_attributes_list, offer_price, offer_expiry,
related_products_ list, discounts_list, rewards_list, FROM
OffersTable WHERE merchant_ID LIKE '%' "MACYS" AND
consumer ID LIKE '%' "JS001";
$result = mysql_query($query); // perform the search query
mysql_close("V-GLASSES_DB.SQL"); // close database access
?>
```

In one implementation, the V-GLASSES may obtain the query result including the consumer loyalty offers profile (e.g., loyalty points with the merchant, with related merchants, product items the consumer previously purchased, product items the consumer previously scanned, locations of such items, etc.) 220, and may optionally provide the consumer profile information 223 to the merchant. For example, in one implementation, the queried consumer loyalty profile 220 and/or the profile information provided to the merchant CSR 223, substantially in the form of XML-formatted data, is provided below:

```
<?XML version = "1.0" encoding = "UTF-8"?>
<consumer_loyalty>
  <user>
    <user_id> JS001 </user_id>
    <user_name> John Public </user_name>
    ...
  </user>
  <merchant>
    <MID> MACY00123 </MID>
    <merchant_name> la jolla shopping center
</merchant_name>
    <location> 550 Palm spring ave </location>
    <city> la jolla </city>
    <zipcode> 00000 </zipcode>
    <division> 1st floor men's wear </division>
    ...
  </merchant>
  <loyalty>
    <level> 10 </level>
    <points> 5,000 </points>
    <in-store_cash> 4,00 </in-store_cash>
    ...
  </loyalty>
```

-continued

```
  <offer>
    <offer_type> loyalty points </offer_type>
    <sponsor> merchant </sponsor>
    <trigger> 100 lolyalty points </trigger>
    <reward> 10% OFF next purchase </reward>
    ...
  </offer>
  <checkin>
    <timestamp>2014-02-22 15:22:43</timestamp>
    <checkin_status> checked in </checkin_status>
    <location>
      <GPS>
      <latitude> 74° 11.92 </latitude>
      <longtitude> 42° 32.72 </longtitude>
      </GPS>
    <floor> 1st </floor>
    <department> men's wear </department>
    ...
  </checkin>
<!--optional parameters-->
  <interested_items>
    <item_1>
      <item_id> Jean20132 </item_id>
      <SKU> 0093424 </SKU>
      <item_description> Michael Kors Flat Pants
</item_description>
      <history> scanned on 2014-01-22 15:22:43
</history>
      <item_status> in stock </item_status>
      <location> 1st floor Lane 6 Shelf 56
</location>
      ...
    </item_1>
    </item_2> ... </item_2>
    ...
</consumer_loyalty>
```

In the above example, V-GLASSES may optionally provide information on the consumer's previously viewed or purchased items to the merchant. For example, the consumer has previously scanned the QR code of a product "Michael Kors Flat Pants" and such information including the inventory availability, SKU location, etc. may be provided to the merchant CSR, so that the merchant CSR may provide a recommendation to the consumer. In one implementation, the consumer loyalty message 223 may not include sensitive information such as consumer's wallet account information, contact information, purchasing history, and/or the like, so that the consumer's private financial information is not exposed to the merchant.

Alternatively, the merchant 220 may query its local database for consumer loyalty profile associated with the merchant, and retrieve consumer loyalty profile information similar to message 223. For example, in one implementation, at the merchant 220, upon receiving consumer check-in information, the merchant may determine a CSR for the consumer 212. For example, the merchant may query a local consumer loyalty profile database to determine the consumer's status, e.g., whether the consumer is a returning customer, or a new customer, whether the consumer has been treated with a particular CSR, etc., to assign a CSR to the consumer. In one implementation, the CSR 230 may receive a consumer assignment 224 notification at a CSR terminal 240 (e.g., a PoS terminal, a mobile device, etc.). In one implementation, the consumer assignment notification message 224 may include consumer loyalty profile with the merchant, consumer's previous viewed or purchased item information, and/or the like (e.g., similar to that in message 223), and may be sent via email, SMS, instant messenger, PoS transmission, and/or the like. For example, in one implementation, the consumer assignment notification 224, substantially in the form of XML-formatted data, is provided below:

```
<?XML version= "1.0" encoding= "UTF-8"?>
<consumer_assignment>
  <consumer>
    <user_id> JS001 </user_id>
    <user_name> John Public </user_name>
    <level> 10 </level>
    <points> 5,000 </points>
    ...
  </consumer>
  <CSR>
    <CSR_id> JD34234 </CSR_id>
    <CSR_name> John Doe </CSR_name>
    <type> local </type>
    <current_location> 1st floor </current_location>
    <location>
      <floor> 1st floor </floor>
      <Aisle> 6 </aisle>
      <stack> 56 </stack>
      <shelf> 56 </shelf>
    </location>
    <in-person_availability> yes </in-
person_availability>
    <specialty> men's wear, accessories
</specialty>
    <language> English, German </language>
    <status> available </status>
    ...
  </CSR>
  <consumer_loyalty> ...</consumer_loyalty>
  ...
</consumer_assignment>
```

In the above example, the consumer assignment notification 224 includes basic consumer information, and CSR profile information (e.g., CSR specialty, availability, language support skills, etc.). Additionally, the consumer assignment notification 224 may include consumer loyalty profile that may take a form similar to that in 223.

In one implementation, the consumer may optionally submit in-store scanning information 225*a* to the CSR (e.g., the consumer may interact with the CSR so that the CSR may assist the scanning of an item, etc.), which may provide consumer interest indications to the CSR, and update the consumer's in-store location with the CSR. For example, in one implementation, the consumer scanning item message 225*a*, substantially in the form of XML-formatted data, is provided below:

```
<?XML version = "1.0" encoding = "UTF-8"?>
<consumer_scanning>
  <consumer>
    <user_id> JS001 </user_id>
    <user_name> John Public </user_name>
    <level> 10 </level>
    <points> 5,000 </points>
    ...
  </consumer>
  <event> QR scanning </event>
  <product>
    <product_id> sda110 </Product_id>
    <sku> 874432 </sku>
    <product_name> CK flat jeans </product_name>
    <product_size> M </product_size>
    <price> 145.00 </price>
    ...
  </product>
  <location>
      <floor> 1st floor </floor>
      <Aisle> 6 </aisle>
      <stack> 56 </stack>
      <shelf> 56 </shelf>
  </location>
...<consumer_scanning>
```

Additionally, the consumer scanning information 225*a* may be provided to the V-GLASSES server to update consumer interests and location information.

Upon receiving consumer loyalty information and updated location information, the CSR terminal 240 may retrieve a list of complementary items for recommendations 225*b*, e.g., items close to the consumer's in-store location, items related to the consumer's previous viewed items, etc. In one implementation, the CSR may submit a selection of the retrieved items to recommend to the consumer 226, wherein such selection may be based on the real-time communication between the consumer and the CSR, e.g., in-person communication, SMS, video chat, V-GLASSES push messages (e.g., see 416*a-b* in FIG. 15D), and/or the like.

In one implementation, upon receiving the consumer assignment notification, CSR may interact with the consumer 202 to assist shopping. For example, the CSR 230 may present recommended item/offer information 227 (e.g., see 434*d*-3 in FIG. 15F) via the CSR terminal 240 to the consumer 202. For example, in one implementation, the consumer item/offer recommendation message 227, substantially in the form of XML-formatted data, is provided below:

```
<?XML version = "1.0" encoding = "UTF-8"?>
<consumer_item>
  <consumer>
    <user_id> JS001 </user_id>
    <user_name> John Public </user_name>
    <level> 10 </level>
    <points> 5,000 </points>
    ...
  </consumer>
  <CSR>
    <CSR_id> JD34234 </CSR_id>
    <CSR_name> John Doe </CSR_name>
    ...
  </CSR>
  <recommendation>
    <item_1>
      <item_id> Jean20132 </item_id>
      <SKU> 0093424 </SKU>
      <item_description> Michael Kors Flat Pants
</item_description>
      <item_status> in stock </item_status>
      <offer> 10% OFF in store </offer>
      <location>
        <GPS> 3423234 23423 </GPS>
        <floor> 1st floor </floor>
        <Aisle> 12 </aisle>
        <stack> 4 </stack>
        <shelf> 2 </shelf>
      </location>
      ...
    </item_1>
    </item_2> ... </item_2>
</recommendation>
  ...
</consumer_recommendation>
```

Figure 16C:
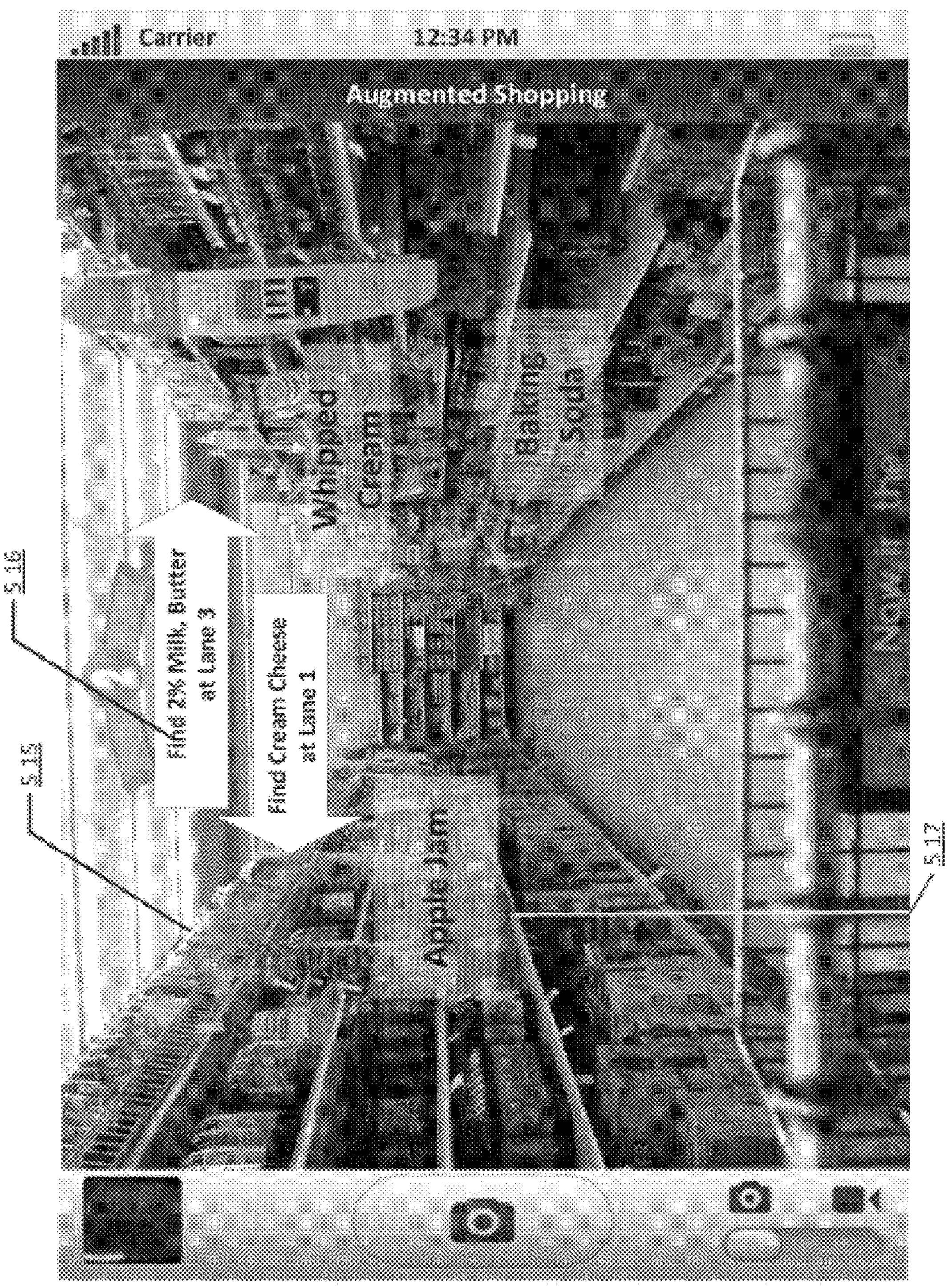
Figure 16D:
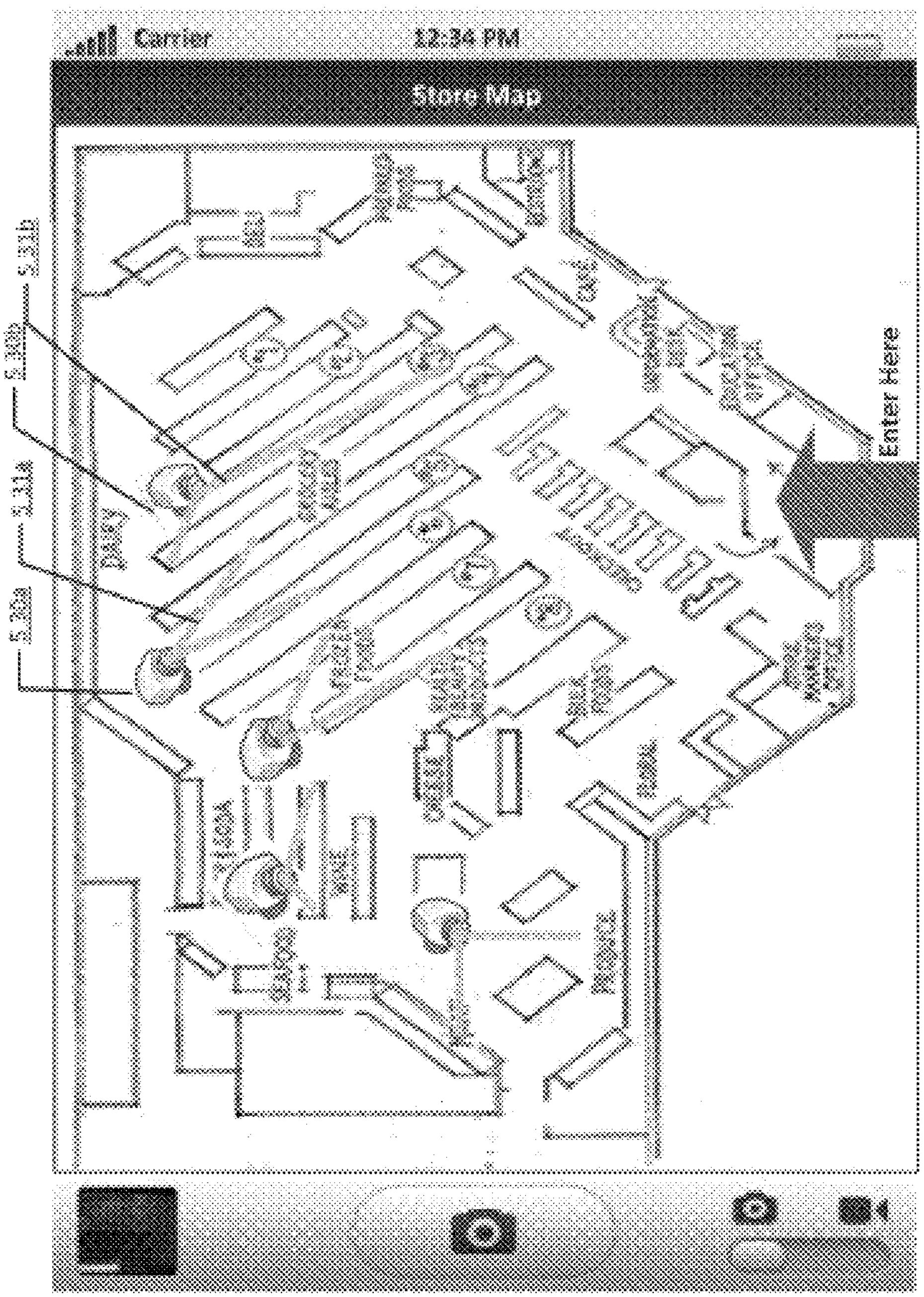

In the above example, the location information included in the message 227 may be used to provide a store map, and directions to find the product item in the store floor plan (e.g., see FIG. 16B), or via augmented reality highlighting while the consumer is performing in-store scanning (e.g., see FIG. 16C).

Continuing on with FIG. 13B, the consumer may provide an indication of interests 231*a* (e.g., see 427*a-b* in FIG. 15E; tapping an "add to cart" button, etc.) in the CSR provided items/offers, e.g., via in-person communication, SMS, video chat, etc., and the CSR may in turn provide detailed information and/or add the item to shopping cart 233*a* (e.g., see 439 in FIG. 4G) to the consumer per consumer request. In one implementation, the consumer may submit a payment interest indication 231*b* (e.g., by tapping on a "pay" button), and the CSR may present a purchasing page 233*b* (e.g., an item information checkout page with a QR code, see 442 in FIG. 15H) to the consumer 202, who may indicate interests of a product item 231 with a CSR, e.g., by tapping on a mobile CSR terminal 240, by communicating with the CSR 230, etc. In one implementation, the consumer may snap the QR code of the interested product item and generate a purchase authorization request 236. For example, the purchase authorization request 236 may take a form similar to 3811 in FIG. 49.

Figure 15C:
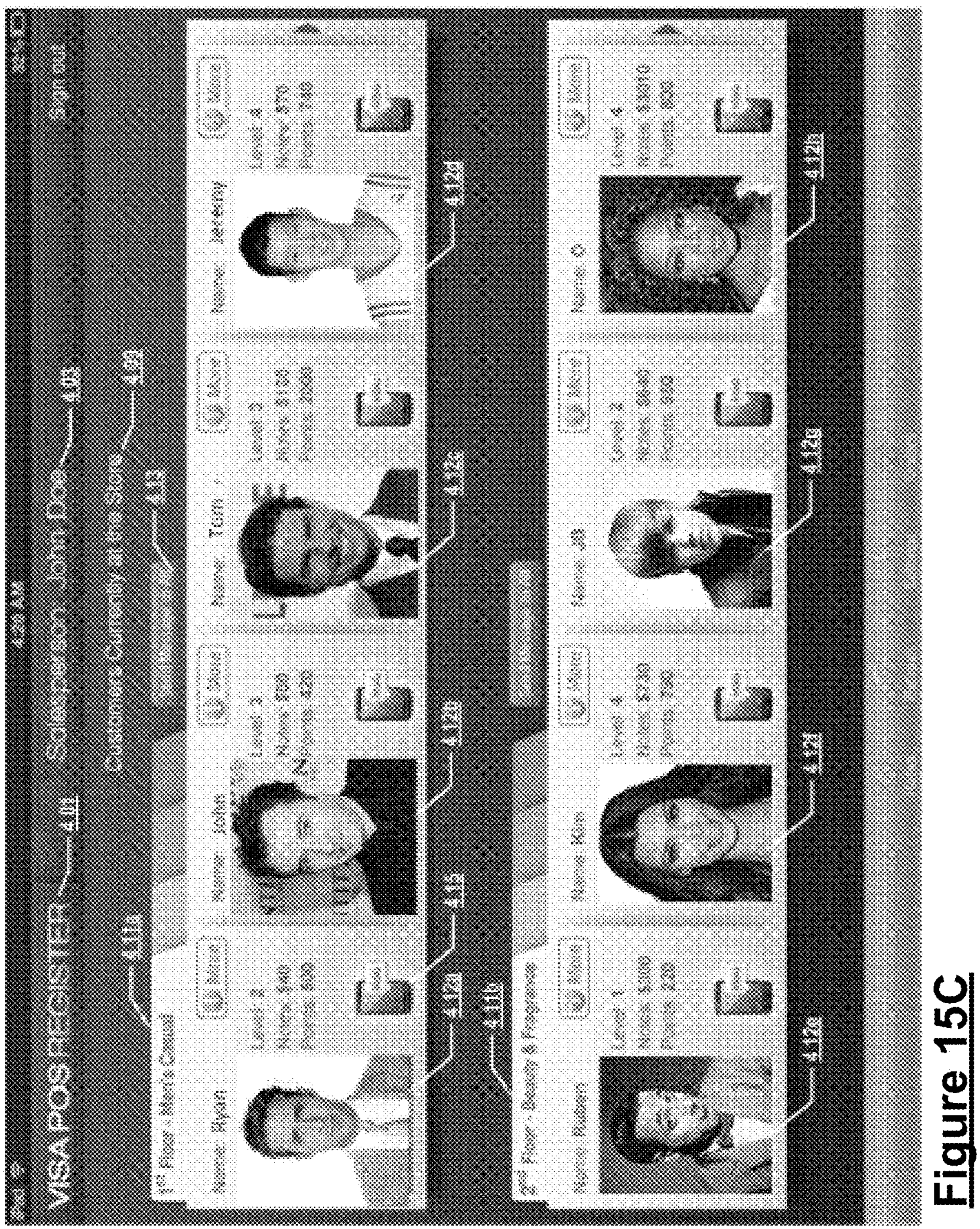
Figure 15D:
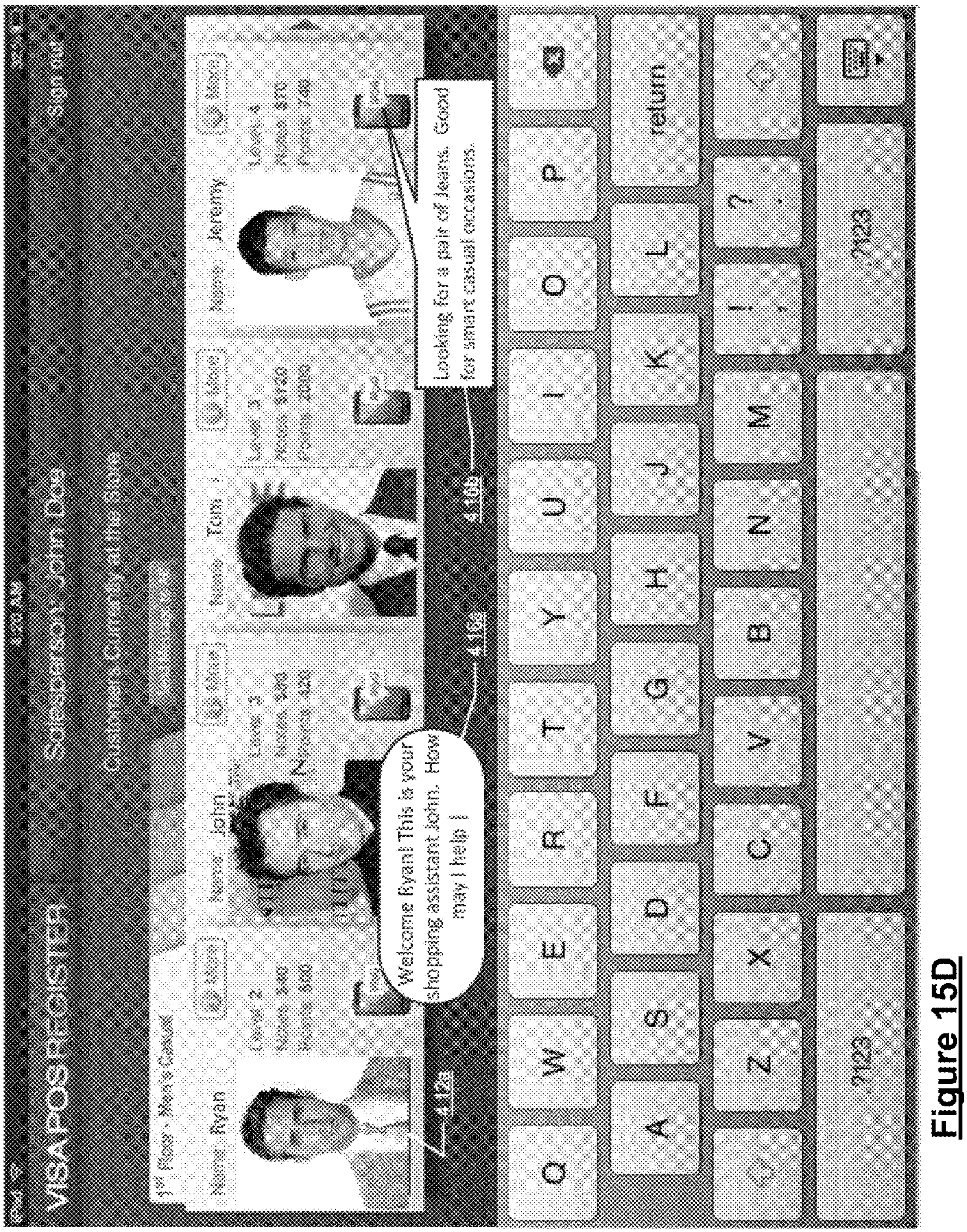
Figure 15E:
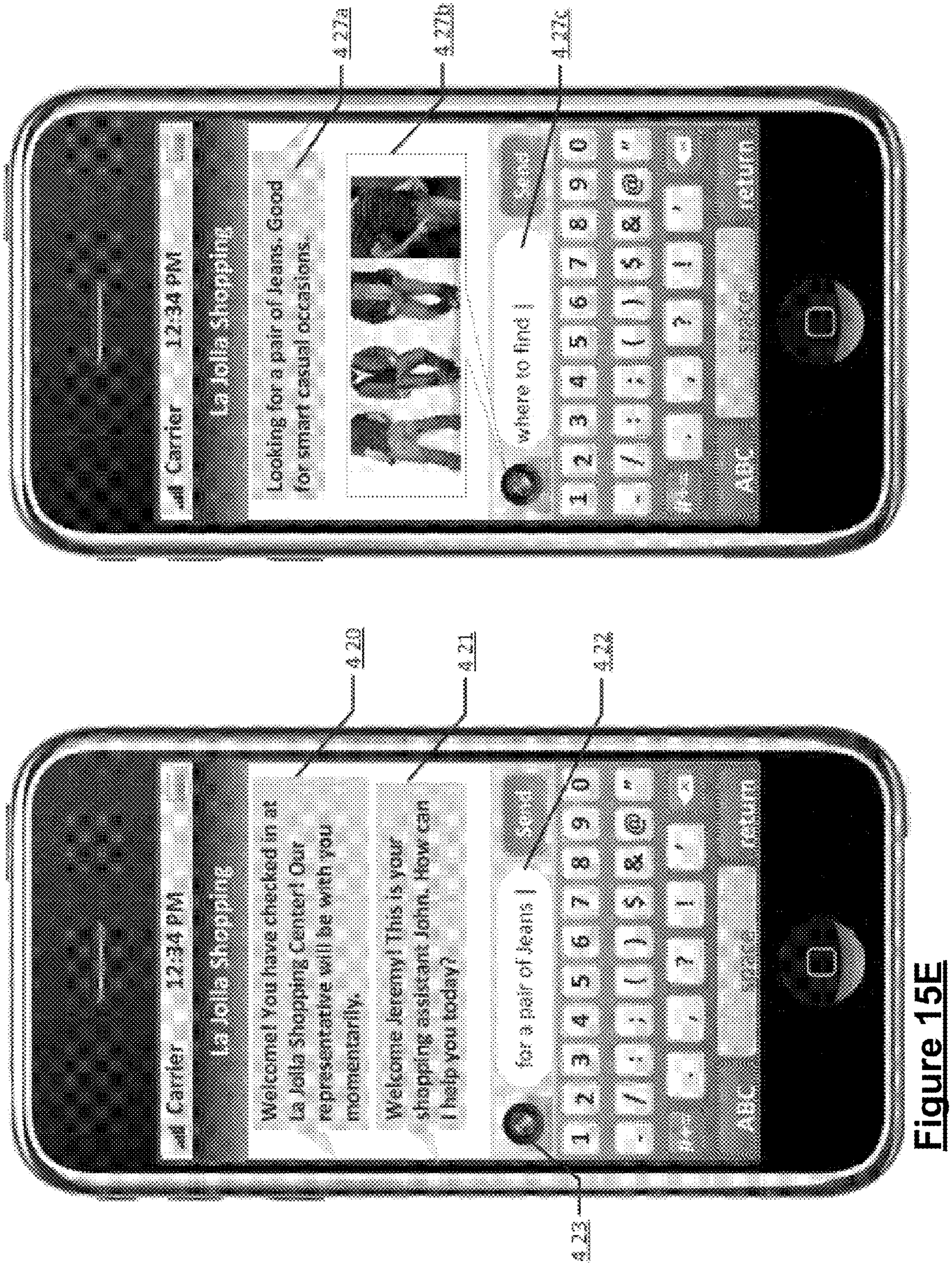
Figure 15F:
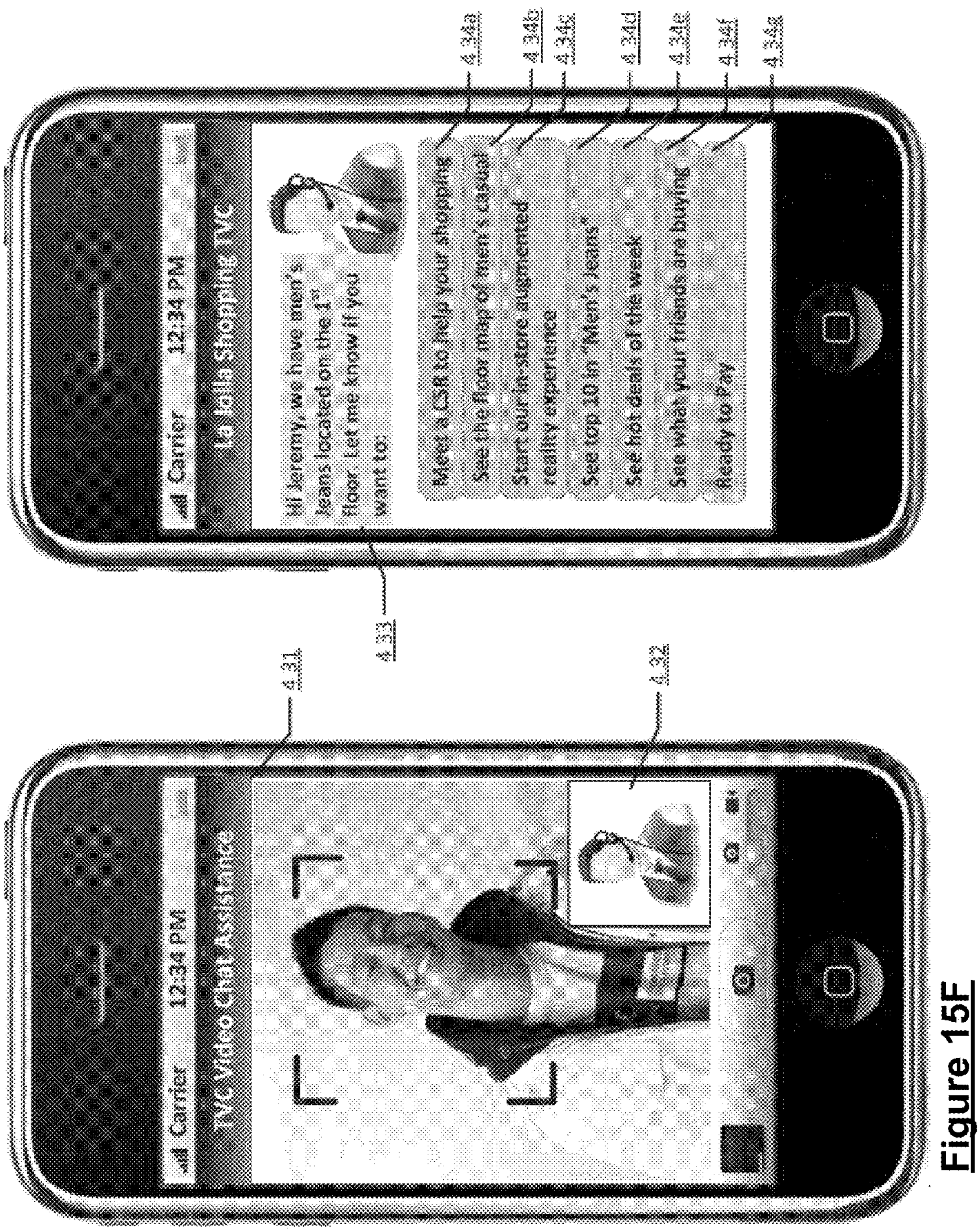
Figure 15G:
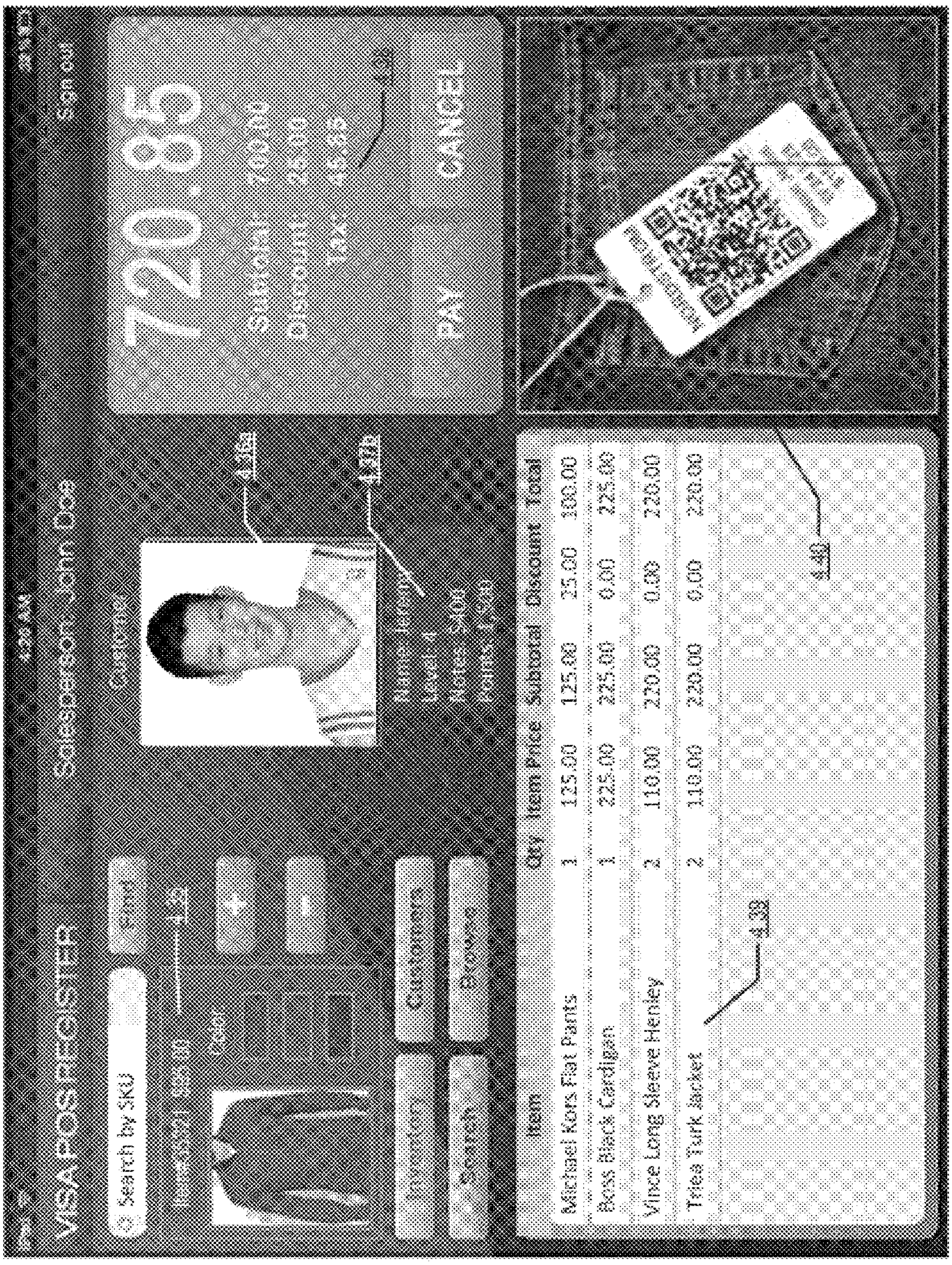
Figure 15H:
Figure 15I:
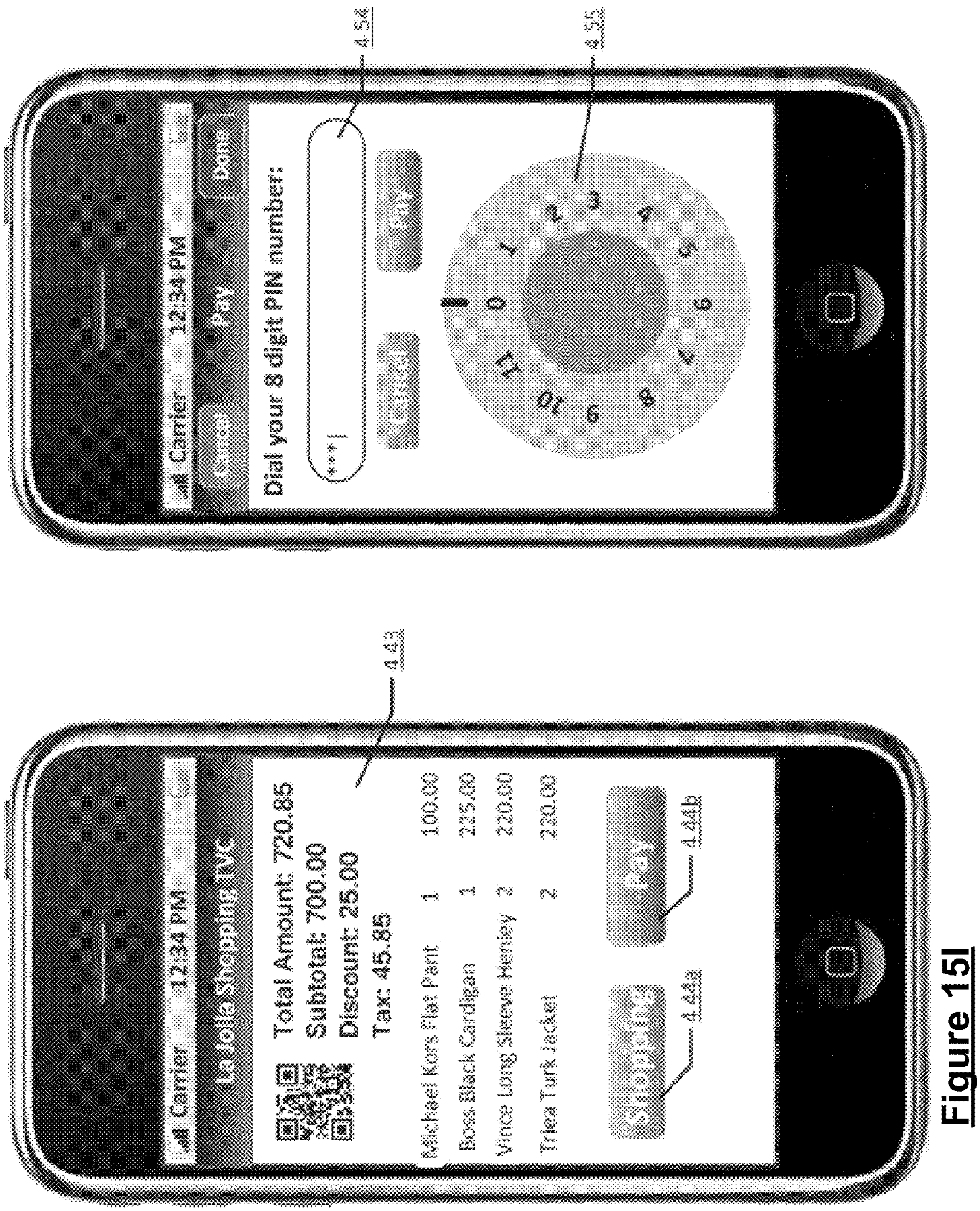

In one implementation, the consumer may continue to checkout with a virtual wallet instantiated on the mobile device 203, e.g., see 444*b* FIG. 15I. For example, a transaction authorization request 231 may be sent to the V-GLASSES server 210, which may in turn process the payment 238 with a payment processing network and issuer networks (e.g., see FIGS. 52A-53B). Alternatively, the consumer may send the transaction request 237*b* to the merchant, e.g., the consumer may proceed to checkout with the merchant CSR. Upon completion of the payment transaction, the consumer may receive a push message of purchase receipt 245 (e.g., see 448 in FIG. 15L) via the mobile wallet.

In one implementation, the V-GLASSES server 210 may optionally send a transaction confirmation message 241 to the merchant 220, wherein the transaction confirmation message 241 may have a data structure similar to the purchase receipt 245. The merchant 220 may confirm the completion of the purchase 242. In another implementation, as shown in FIG. 13C, the V-GLASSES server 210 may provide the purchase completion receipt to a third party notification system 260, e.g., Apple® Push Notification Service, etc., which may in turn provide the transaction notification to the merchant, e.g., buy sending an instant message to the CSR terminal, etc.

Figure 13C:
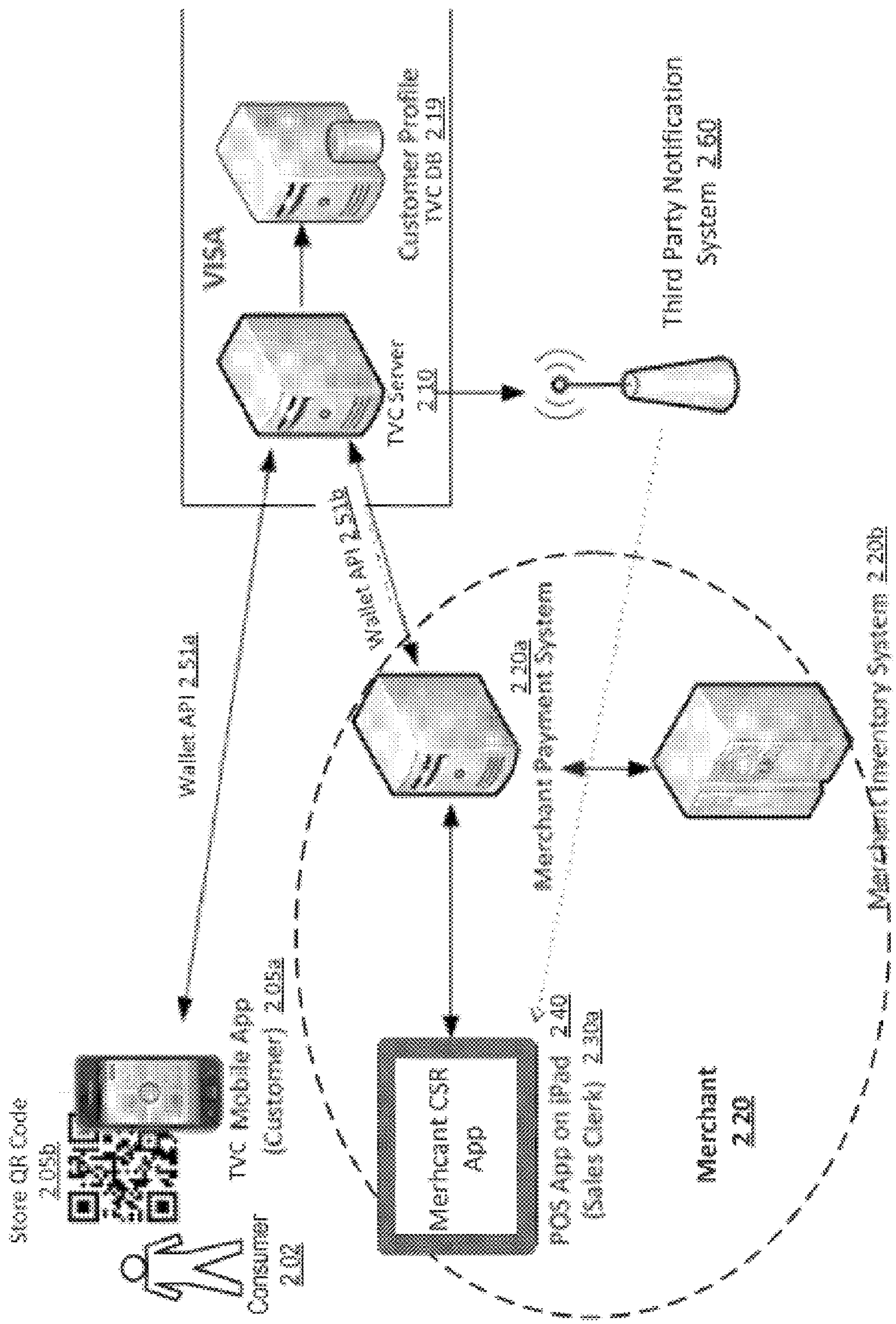
Figure 13D:
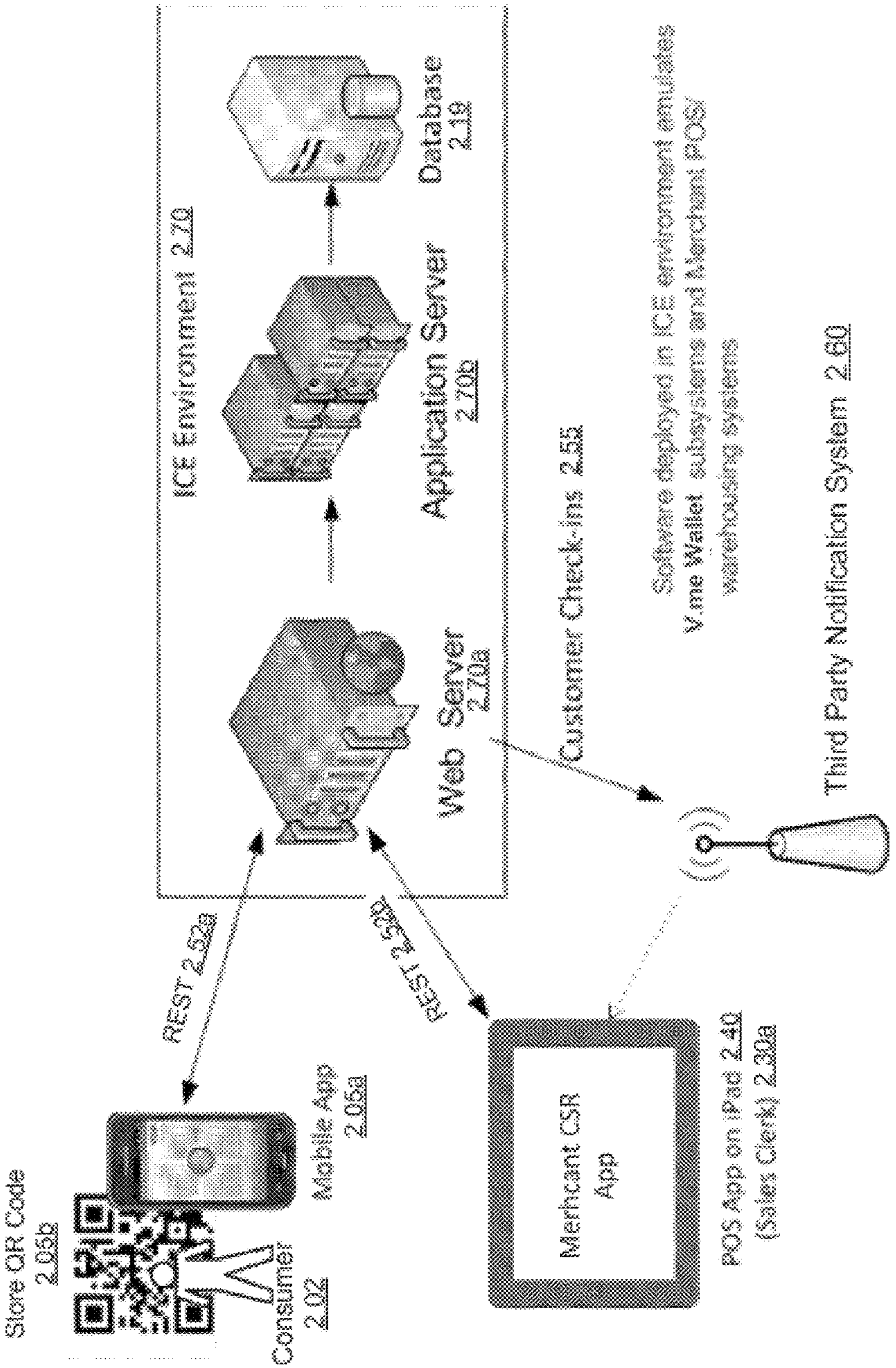

FIGS. 13C-13D provide exemplary infrastructure diagrams of the V-GLASSES system and its affiliated entities within embodiments of the V-GLASSES. Within embodiments, the consumer 202, who operates an V-GLASSES mobile application 205*a*, may snap a picture of a store QR code 205*b* for consumer wallet check-in, as discussed at 204/208 in FIG. 13A. In one implementation, the mobile component 205*a* may communicate with an V-GLASSES server 210 (e.g., being located with the Visa processing network) via wallet API calls 251*a* (e.g., PHP, JavaScript, etc.) to check-in with the V-GLASSES server. In one implementation, the V-GLASSES server 210 may retrieve consumer profile at an V-GLASSES database 219 (e.g., see 218/220 in FIG. 13A).

In one implementation, merchant store clerks 230*a* may be notified to their iPad 240 with the customer's loyalty profile. For example, in one implementation, the V-GLASSES server 210 may communicate with the merchant payment system 220*a* (e.g., PoS terminal) via a wallet API 251*b* to load consumer profile. In one implementation, the V-GLASSES server 210 may keep private consumer information anonymous from the merchant, e.g., consumer payment account information, address, telephone number, email addresses, and/or the like. In one implementation, the merchant payment system 220*a* may retrieve product inventory information from the merchant inventory system 220*b*, and provide such information to the PoS application of the sales clerk 230*a*. For example, the sales clerk may assist customer in shopping and adding items to iPad shopping cart (e.g., see 439 in FIG. 15G), and the consumer may check out with their mobile wallet. Purchase receipts may be pushed electronically to the consumer, e.g., via a third party notification system 260.

With reference to FIG. 13D, in an alternative implementation, V-GLASSES may employ an Integrated collaboration environment (ICE) system 270 for platform deployment which may emulate a wallet subsystem and merchant PoS warehousing systems. For example, the ICE system 270 may comprise a web server 270*a*, an application server 270*b*, which interacts with the V-GLASSES database 219 to retrieve consumer profile and loyalty data. In one implementation, the consumer check-in messages may be transmitted from a mobile application 205*a*, to the web server 270*a* via representational state transfer protocols (REST) 252*a*, and the web server 270*a* may transmit consumer loyalty profile via REST 252*b* to the PoS application 240. In further implementations, the ICE environment 270 may generate virtual avatars based on a social media platform and deliver the avatars to the merchant PoS app 240 via REST 252*b*.

Figure 14A:
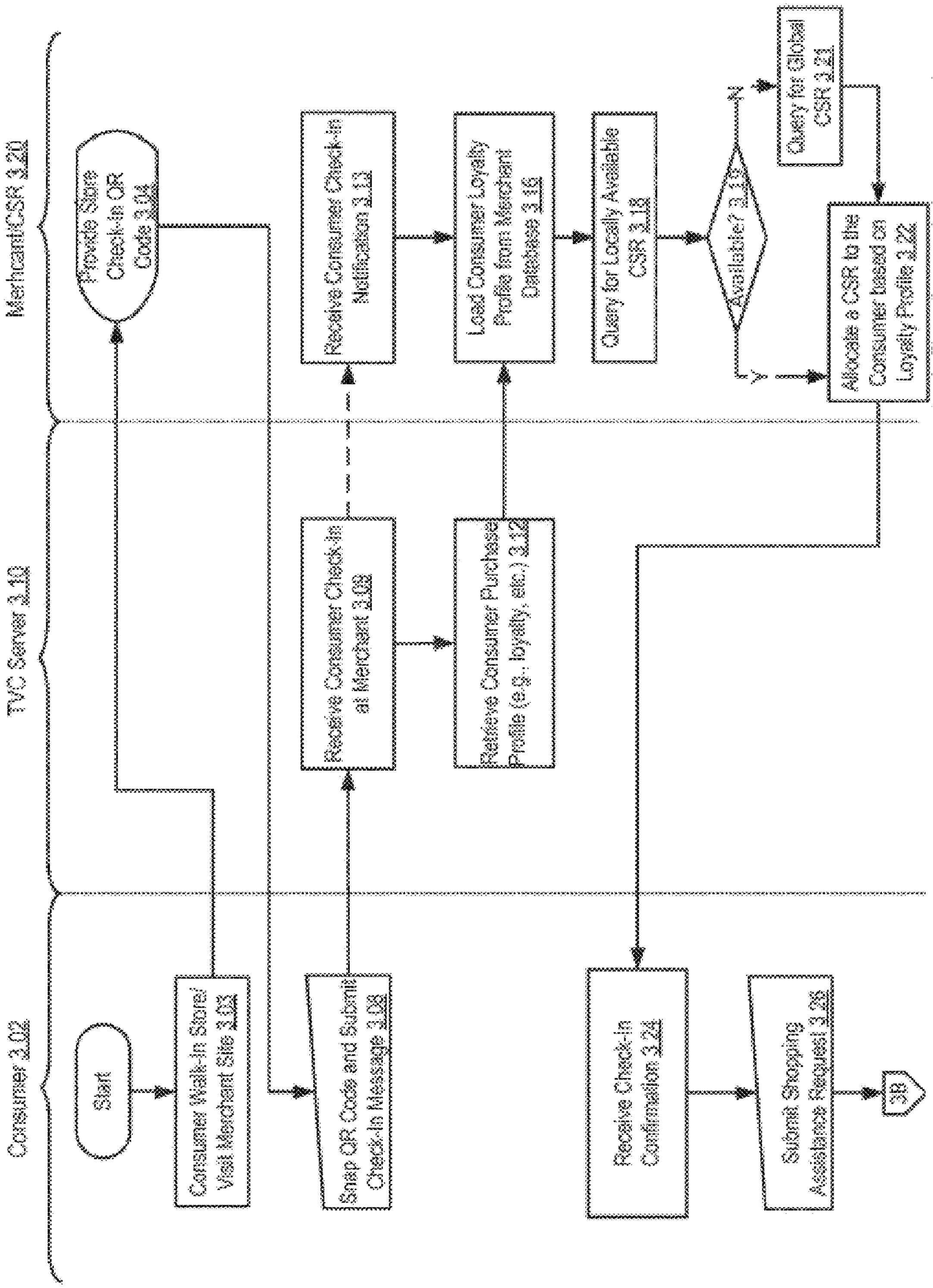
FIGS. 14A-14C provide exemplary logic flow diagrams illustrating V-GLASSES augmented shopping within embodiments of the V-GLASSES.
Figure 14B:
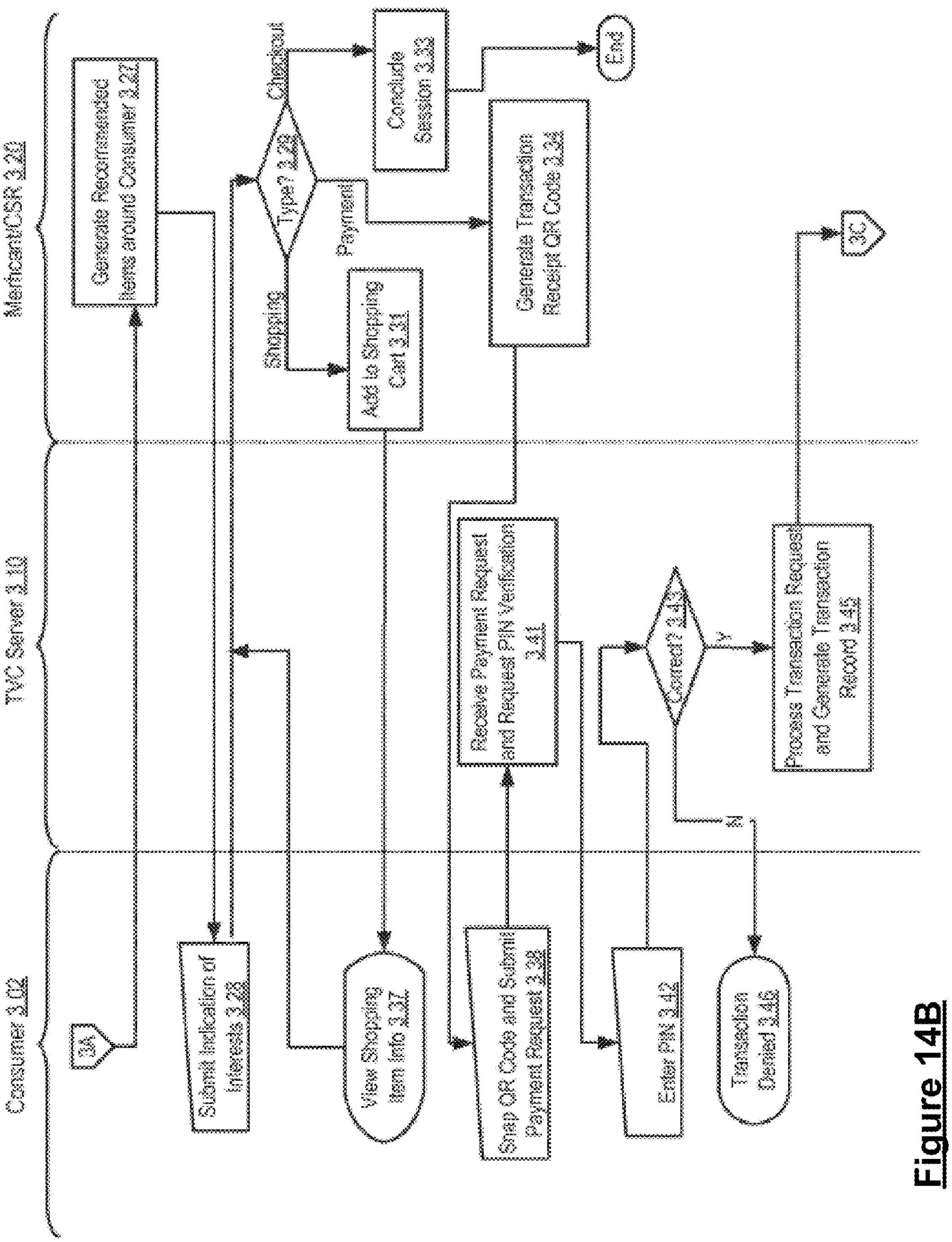
Figure 14C:
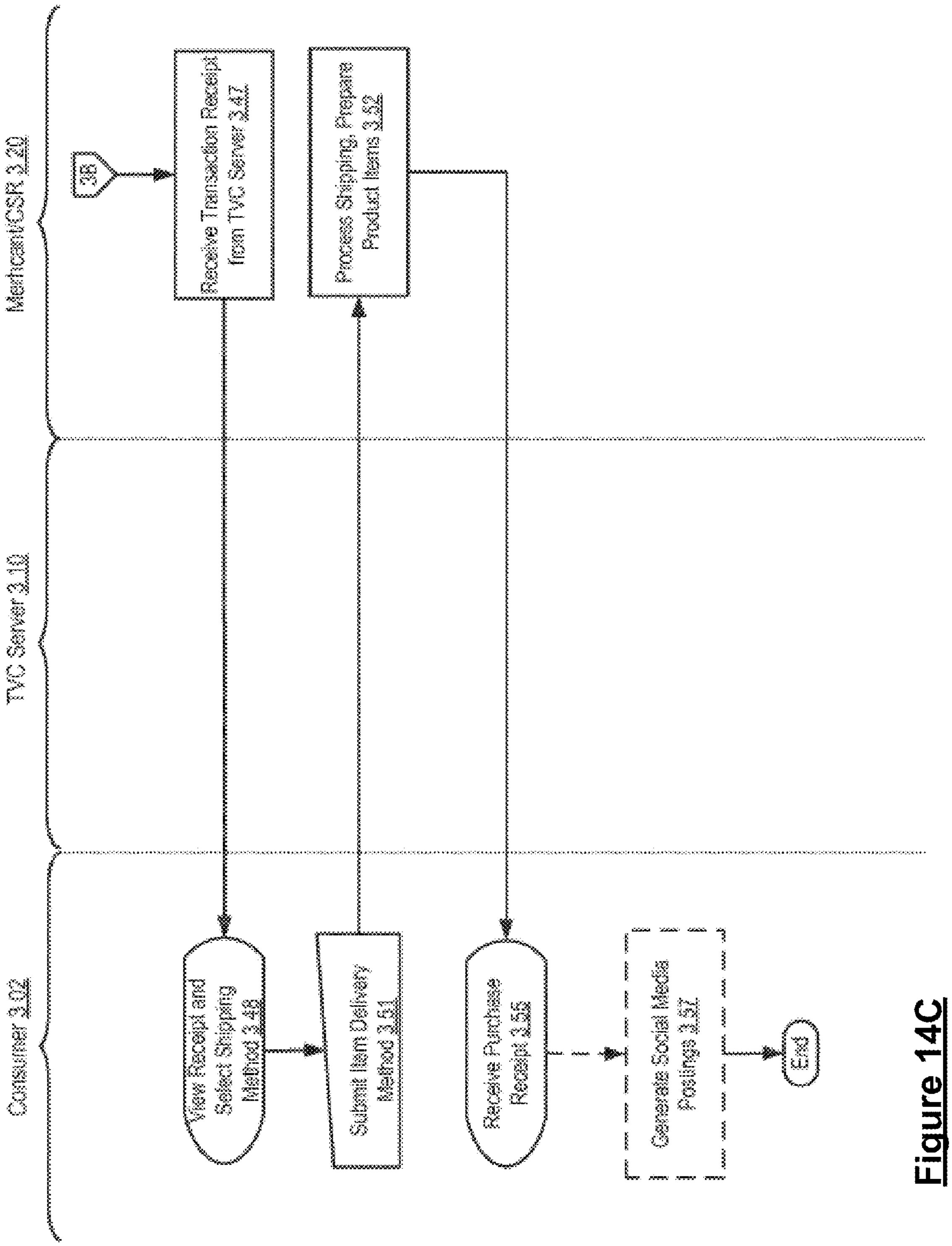

FIGS. 14A-14C provide exemplary logic flow diagrams illustrating consumer-merchant interactions for augmented shopping experiences within embodiments of the V-GLASSES. In one embodiment, as shown in FIG. 14A, the consumer 302 may start the shopping experience by walking into a merchant store, and/or visit a merchant shopping site 303. The merchant 320 may provide a store check-in QR code via a user interface 304, e.g., an in-store display, a mobile device operated by the store clerks (see 401 in FIG. 15A).

In one implementation, the consumer may snap the QR code and generate a check-in message to the V-GLASSES server 310, which may receive the consumer check-in message 309 (e.g., see 208 in FIG. 13A; 251*a* in FIG. 13C), retrieve consumer purchase profile (e.g., loyalty, etc.) 312. In one implementation, the consumer device may extract information from the captured QR code and incorporate such merchant store information into the check-in message. Alternatively, the consumer may include the scanned QR code image in the check-in message to the V-GLASSES server, which may process the scanned QR code to obtain merchant information. Within implementations, the consumer device, and/or the V-GLASSES server may adopt QR code decoding tools such as, but not limited to Apple® Scan for iPhone, Optiscan, QRafter, ScanLife, I-Nigma, Quickmark, Kaywa Reader, Nokia® Barcode Reader, Google® Zxing, Blackberry® Messenger, Esponce® QR Reader, and/or the like. In another implementation, the merchant 320 may receive consumer check-in notification 313, e.g., from the V-GLASSES server 310, and/or from the consumer directly, and then load the consumer loyalty profile from a merchant database 316.

In one implementation, if the consumer visit a merchant shopping site at 303, the consumer may similarly check-in with the merchant by snapping a QR code presented at the merchant site in a similar manner in 308-312. Alternatively, the consumer may log into a consumer account, e.g., a consumer account with the merchant, a consumer wallet account (e.g., V.me wallet payment account, etc.), to check-in with the merchant.

In one implementation, the merchant may receive consumer information from the V-GLASSES server (e.g., see 223 in FIG. 13A; 251*b* in FIG. 13C, etc.), and may query locally available CSRs 318. For example, the CSR allocation may be determined based on the consumer level. If the consumer is a returning consumer, a CSR who has previously worked with the consumer may be assigned; otherwise, a CSR who is experienced in first-time consumers may be assigned. As another example, one CSR may handle multiple consumers simultaneously via a CSR platform (e.g., see FIG. 15C); the higher loyalty level the consumer has with the merchant store, more attention the consumer may obtain from the CSR. For example, a consumer with a level 10 with the merchant store may be assigned to one CSR exclusively, while a consumer with a level 2 with the store may share a CSR with other consumers having a relatively low loyalty level. In further implementations, the CSR allocation may be determined on the consumer check-in department labeled by product category (e.g., men's wear, women's wear, beauty and cosmetics, electronics, etc.), consumer past interactions with the merchant CSR (e.g., demanding shopper that needs significant amount of assistance, independent shopper, etc.), special needs (e.g., foreign language supports, child care, etc.), and/or the like.

In one implementation, if a desired CSR match is not locally available 319 (e.g., not available at the merchant store, etc.), the V-GLASSES may expand the query to look for a remote CSR 321 which may communicate with the consumer via SMS, video chat, V-GLASSES push messages, etc., and allocate the CSR to the consumer based 322.

Alternatively, a pool of remote CSRs may be used to serve consumers and reduce overhead costs. In an alternative embodiment, online consumers may experience a store virtually by receiving a store floor plan for a designated location; and moving a consumer shopper avatar through the store floor plan to experience product offerings virtually, and the remote CSR may assist the virtual consumer, e.g., see FIGS. 16D-16F.

In one implementation, the consumer 302 may receive a check-in confirmation 324 (e.g., see 407 in FIG. 15B), and start interacting with a CSR by submitting shopping assistance request 326. Continuing on with FIG. 14B, the CSR may retrieve and recommend a list of complementary items to the consumer (e.g., items that are close to the consumer's location in-store, items that are related to consumer's previously viewed/purchased items, items that are related to the consumer's indicated shopping assistance request at 326, etc.). Upon consumer submitting an indication of interests 328 in response to the CSR recommended items, the CSR may determine a type of the shopping assistance request 329. For example, if the consumer requests to checkout (e.g., see 451 in FIG. 15M), the CSR may conclude the session 333. In anther implementation, if the request indicates a shopping request (e.g., consumer inquiry on shopping items, see 427*a-c* in FIG. 15E, etc.), the CSR may retrieve shopping item information and add the item to a shopping cart 331, and provide such to the consumer 337 (e.g., see 434*d-e* in FIG. 15F). The consumer may keep shopping or checkout with the shopping chart (e.g., see 444*a-b* in FIG. 15I).

In another implementation, if the consumer has a transaction payment request (e.g., see 434*g* in FIG. 15F), the CSR may generate a transaction receipt including a QR code summarizing the transaction payment 334, and present it to the consumer via a CSR UI (e.g., see 442 in FIG. 15H). In one implementation, the consumer may snap the QR code and submit a payment request 338 (e.g., see 443 in FIG. 15I).

In one implementation, V-GLASSES server may receive the payment request from the consumer and may request PIN verification 341. For example, the V-GLASSES server may provide a PIN security challenge UI for the consumer to enter a PIN number 342, e.g., see 464 in FIG. 15J; 465*a* in FIG. 15K. If the entered PIN number is correct, the V-GLASSES server may proceed to process the transaction request, and generate a transaction record 345 (further implementations of payment transaction authorization are discussed in FIGS. 52A-53B). If the entered PIN number is incorrect, the consumer may obtain a transaction denial notice 346 (e.g., see 465*b* in FIG. 15K).

Figure 15J:
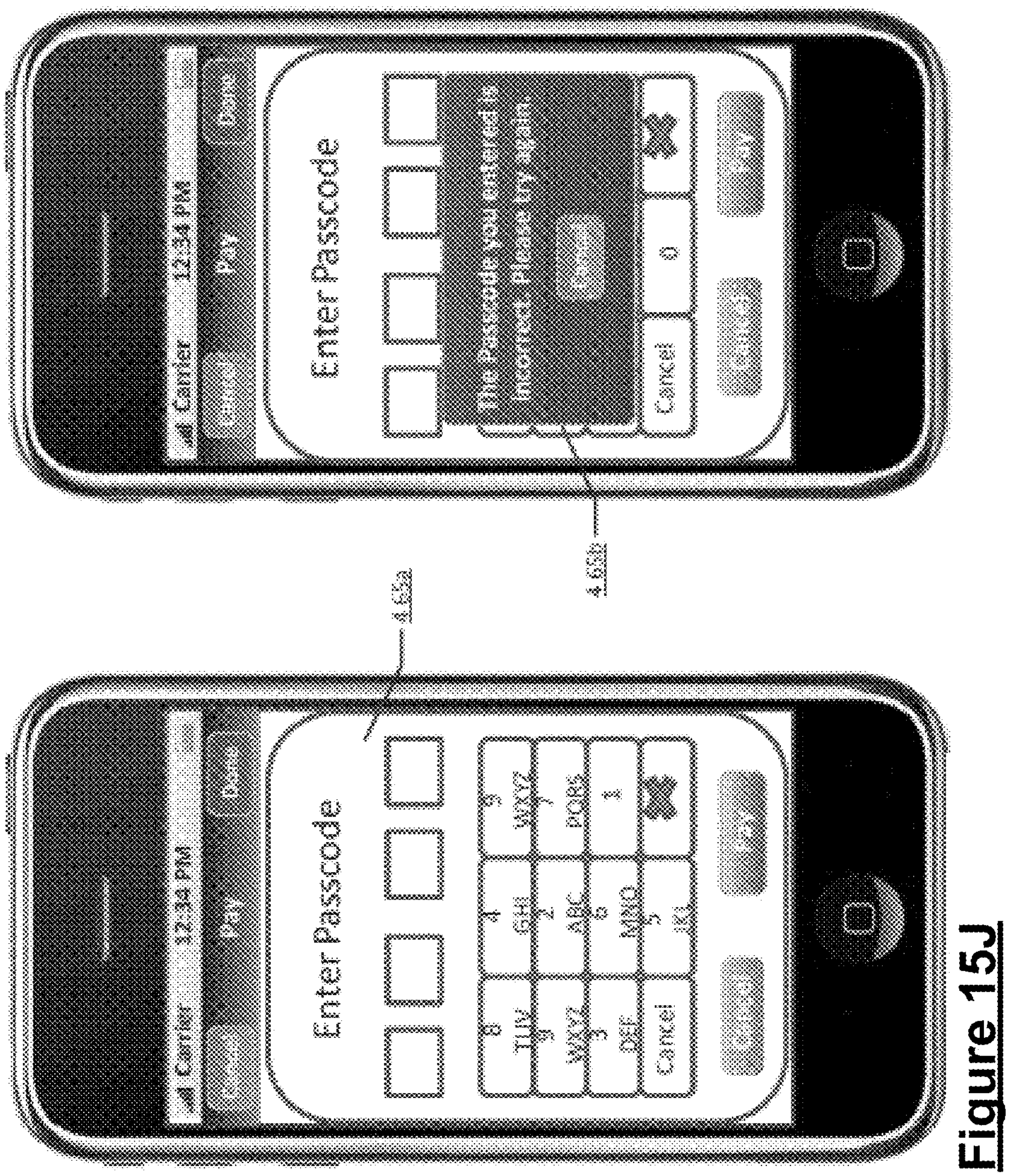
Figure 15K:
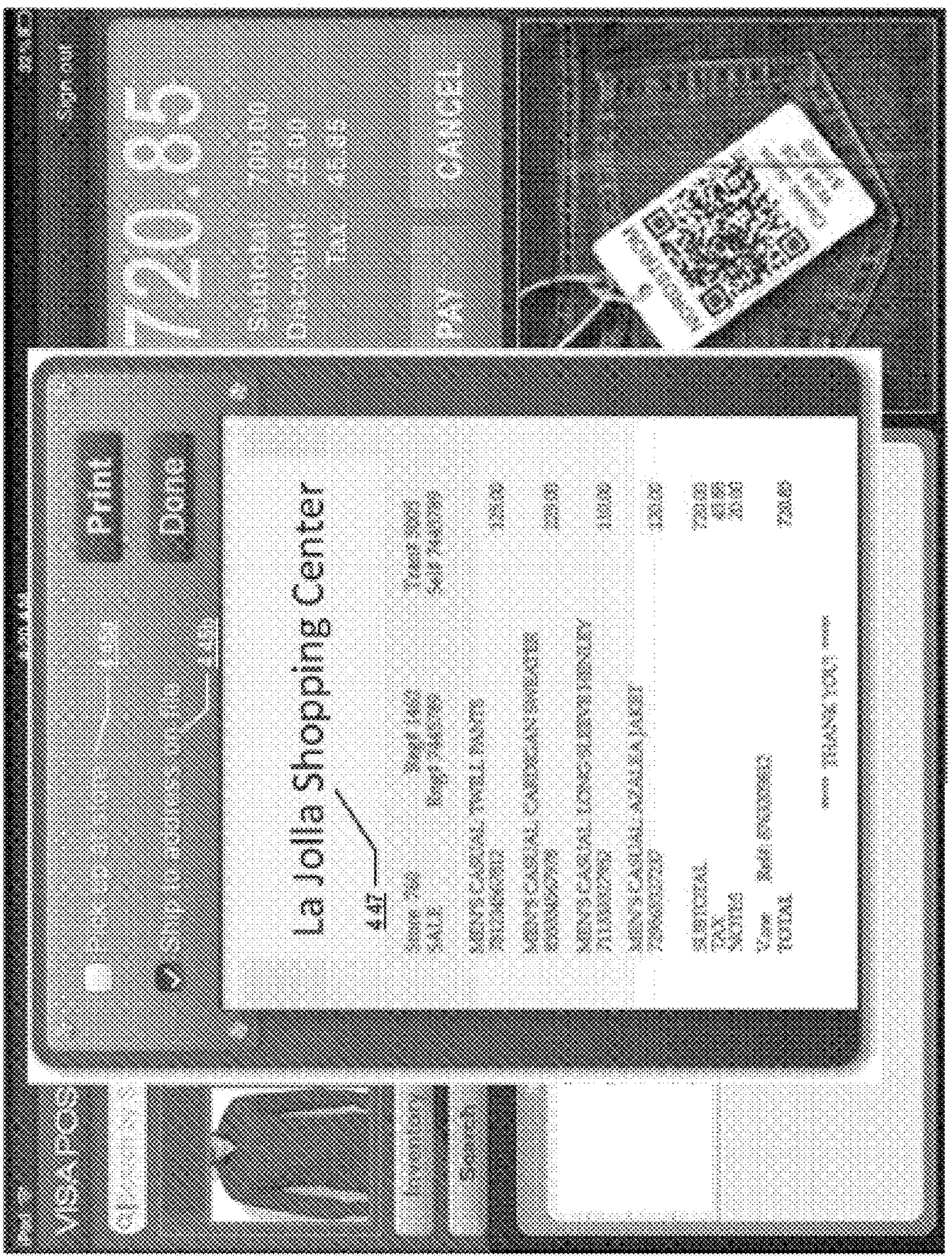
Figure 15L:
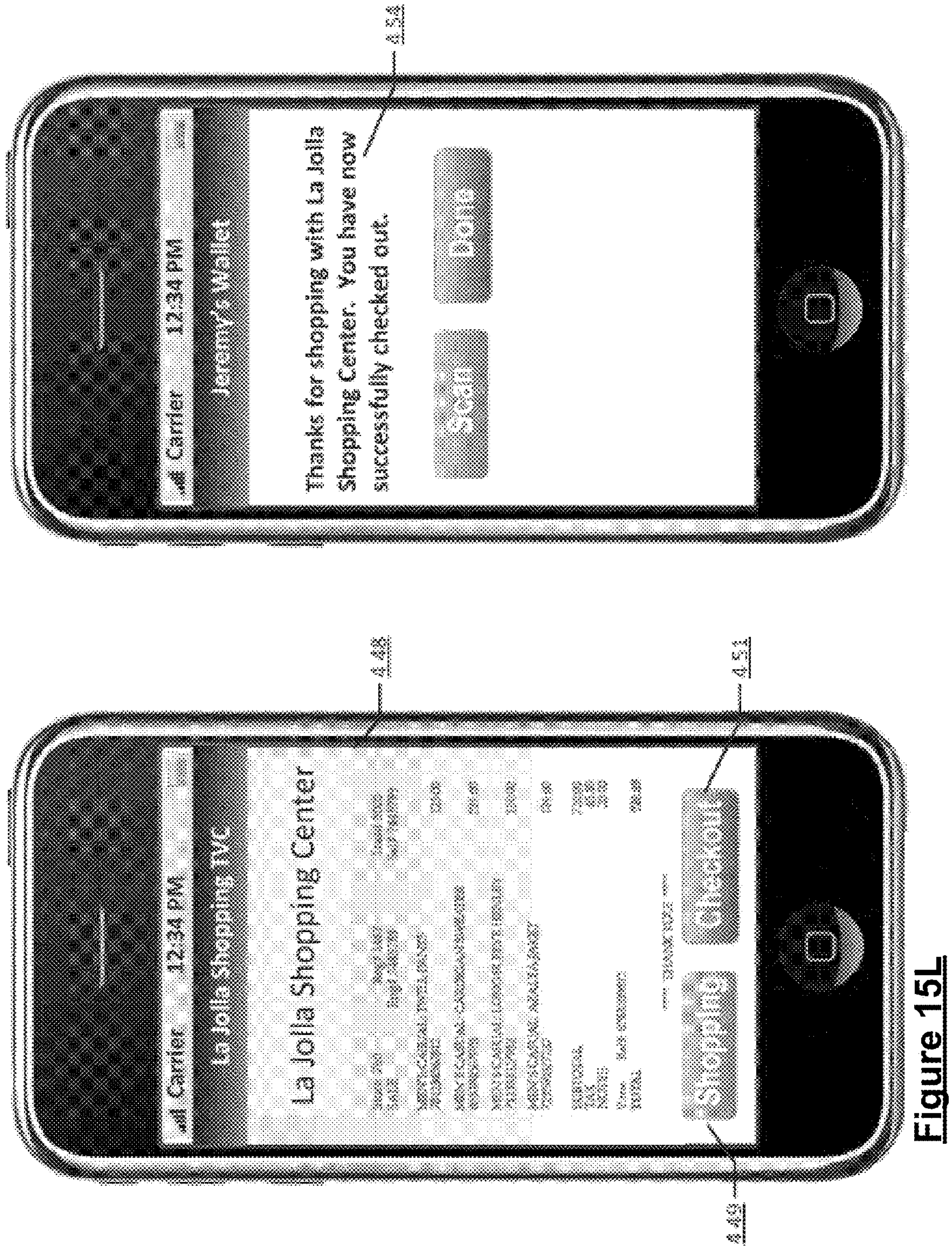

Continuing on with FIG. 14C, upon completing the payment transaction, the merchant may receive a transaction receipt from the V-GLASSES 347, and present it to the consumer 348 (e.g., see 447 in FIG. 15L). In one implementation, the consumer may view the receipt and select shipping method 351, for the merchant to process order delivery and complete the order 352. In one implementation, the consumer may receive a purchase receipt 355 via wallet push messages, and may optionally generate a social media posting 357 to publish the purchase, e.g., see 465 in FIG. 15N.

FIGS. 15A-15M provide exemplary UI diagrams illustrating embodiments of in-store augmented shopping experience within embodiments of the V-GLASSES. With reference to FIG. 15A, the merchant may provide a check-in page including a QR code via a user interface. For example, a merchant sales representative may operate a mobile device such as an Apple iPad, a PoS terminal computer, and/or the like, and present a welcome check-in screen having a QR code 401 for the consumer to scan. In one implementation, the consumer may instantiate a mobile wallet on a personal mobile device, and see a list of options for person-to-person transactions 4021, wallet transaction alerts 402*b*, shopping experience 402*c*, offers 402*d*, and/or the like (further exemplary consumer wallet UIs are provided in FIGS. 42-48B).

In one implementation, the consumer may instantiate the shop 402*c* option, and check-in with a merchant store. For example, the consumer may operate the wallet application 403 to scan the merchant check-in QR code 404. Continuing on with FIG. 15B, upon scanning the merchant QR code, the consumer wallet application may provide merchant information obtained from the QR code 405, and the consumer may elect to check-in 406. In one implementation, the wallet may submit a check-in message to the V-GLASSES server, and/or the merchant PoS terminal (e.g., see 204/208 in FIG. 13A). Upon successful check-in, the consumer may receive a check-in confirmation screen 407, and proceed to shop with V-GLASSES 408.

FIGS. 15C-15D provide exemplary merchant UIs for augmented shopping assistance upon consumer check-in within embodiments of the V-GLASSES. For example, in one implementation, a merchant CSR may log into a CSR account 403 to view a UI at a mobile PoS (e.g., a iPad, etc.) 401. For example, the CSR may view a distribution of consumers who have logged into the merchant store 409, e.g., consumers who have logged into the 1$^{st}$ floor 411*a*, the 2$^{nd}$ floor 411*b*, and so on. In one implementation, for each checked in consumer, the CSR may view the consumer's profile 412*a-h*, including the consumer's shopping level (loyalty level) with the merchant store, in-store notes/points, and/or the like. In one implementation, the CSR may send messages to a particular consumer 415, or to send greeting messages, shopping information, etc., to all consumers 413.

For example, with reference to FIG. 15D, in one implementation, a CSR may tap a "MSG" icon 413 with the profile photo of a customer 412*a*, and enter a dialogue line 416*a*. In another implementation, the CSR may communicate with multiple consumers, e.g., the CSR may receive dialogue responses from consumers 416*b*.

With reference to FIG. 15E, a consumer may receive messages from a merchant CSR, e.g., greeting messages upon successful check-in at a merchant store 420, messages from a CSR to assist the shopping 421, and/or the like. In one implementation, the consumer may interact with the CSR by entering text messages 422 (e.g., SMS, wallet push messages, instant messages, etc.).

In a further implementation, the consumer wallet may allow a consumer to include an image in the message with CSRs. In one implementation, the consumer may tap a camera icon 423 to snap a picture of an in-store advertisement, a front window display, a poster, etc., and submit the picture to the CSR to indicate the consumer's shopping interests. For example, the consumer may express interests in "Jeans" 427*a*, and may snap a picture of an in-store commercial poster of "men's jeans" 427*b*, and ask the CSR about "where to find" the jeans in display 427*c*.

With reference to FIG. 4F, a consumer may video chat with a CSR to obtain real-time shopping assistance 431. In one implementation, the CSR 432 may comprise a merchant sales clerk, or a virtual shopping assistant avatar. In further implementation, V-GLASSES may confirm the consumer's identity to prevent fraud via the video chat, as further discussed in FIG. 48B. In one implementation, an V-GLASSES shopping CSR may communicate with the consumer 433 to provide a list of options for the consumer's V-GLASSES shopping assistance. For example, a consumer may elect to meet a CSR in person at the merchant store for shopping assistance 434*a*. As another example, V-GLASSES may provide a floor map of brands, products locations 434*b* to the consumer wallet (e.g., see 510 in FIG. 16B). As another example, V-GLASSES may start an augmented reality in-store scanning experience to assist the consumer's shopping 434*c*, e.g., the consumer may capture a visual reality scene inside of the merchant store and view virtual labels overlay showing product information atop of the captured reality scene (e.g., see FIG. 16C). As another example, V-GLASSES may provide a list of popular products 434*d*, popular offers 434*e*, popular products over social media 434*f*, comments/ratings, and/or the like. As another example, the consumer may elect to pay for an item when the consumer has already selected the product item 434*g* (e.g., further payment transaction details with a wallet application are discussed in FIGS. 52A-54B).

With reference to FIG. 15G, a CSR may operate CSR mobile device to help a consumer to add an item to the shopping cart. For example, in one implementation, the CSR may search a product by the stock keeping unit (SKU) number 435 for the consumer 436*a* (with the loyalty profile 437*b*). In one implementation, the CSR may maintain a list of consumer interested products 439. The CSR may tap on a consumer interested product to obtain a QR code, and/or scan the QR code of a product 440 to add the product into the shopping list of the consumer. In one implementation, V-GLASSES may provide a payment amount summary for the items in the shopping cart 439.

With reference to FIG. 15H, upon CSR tapping on a consumer interested product item and obtaining/scanning a QR code, the V-GLASSES may generate a QR code for the product item, e.g., as a floating window 442, etc. In one implementation, the consumer may operate the consumer wallet to snap a picture of the QR code 442 to proceed to purchase payment, e.g., see FIGS. 35A-35E.

With reference to FIG. 4I, upon the consumer snapping a QR code 442, the consumer may obtain payment bill details obtained from the QR code 443. In one implementation, the consumer may elect to continue shopping 444*a*, and be directed back to the conversation with the CSR. In another implementation, the consumer may elect to pay for the transaction amount 444*b*.

In one implementation, upon submitting a "Pay" request 444*b*, the V-GLASSES may provide a PIN security challenge prior to payment processing to verify the consumer's identity. For example, the V-GLASSES may request a user to enter a PIN number 454 via a dial lock panel 455. In alternative implementations, as shown in FIG. 15J, V-GLASSES may provide a dynamic keypad UI for the consumer to enter pass code 465*a*, e.g., the configuration of numbers and letters on the keypad are randomly distributed so that the consumer's pass code entry may not be captured by malicious spyware, instead of the traditional dialing keypad. In one implementation, if the pass code entered is incorrect, the consumer may receive a transaction denial message 465*b*. Further implementation of security challenges may be found in PCT international application serial no. PCT/US12/66898, filed Nov. 28, 2012, entitled "Transaction Security Graduated Seasoning And Risk Shifting Apparatuses, Methods And Systems," which is hereby expressly incorporated by reference.

With reference to FIG. 15K, upon the consumer completing the payment transaction, the CSR may generate a sales receipt 447, showing the purchase item and transaction amount paid. In one implementation, the CSR may send the sales receipt to the consumer wallet (e.g., via wallet push message system, etc.), and the consumer may elect to either pick up the purchased item in store 445*a*, or ship the purchased item to a previously stored address 445*b*.

With reference to FIG. 15L, upon completing the transaction, the consumer may receive a purchase receipt 448 via wallet push message service, and may elect to continue shopping 449 with the CSR, and/or checkout 451. If the consumer elects to checkout, the consumer may receive a checkout confirmation message 454.

Figure 15M:
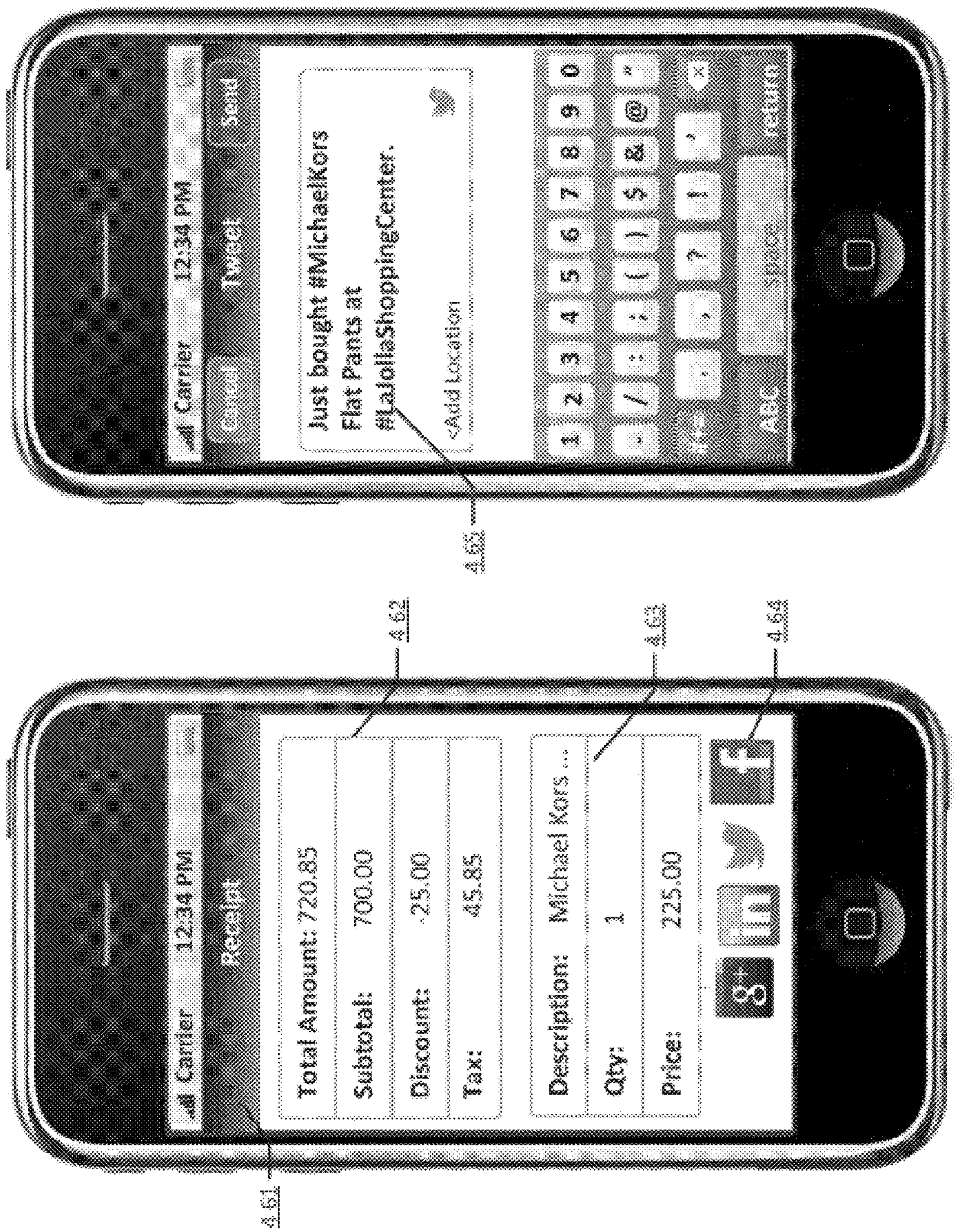

With reference to FIG. 15M, a consumer may view the receipt of past purchases at any time after the transaction, wherein the receipt may comprise payment amount information 462, and purchase item information 463. In one implementation, the consumer may connect to social media 464 to publish the purchase. For example, if the consumer taps on a "tweet" icon, the consumer may edit a tweet about the purchase, wherein the tweet may be pre-populated with hash tags of the item and the merchant store 465.

FIGS. 16A-16C provide exemplary UI diagrams illustrating aspects of augmented reality shopping within embodiments of the V-GLASSES. In one implementation, a consumer may edit a shopping list 502 within the wallet. For example, the consumer may type in desired shopping items into a notepad application 503, engage a voice memo application 505*a*, engage a camera 505*b* to scan in shopping items from a previous sales receipt 507 (e.g., a consumer may periodically purchase similar product items, such as grocery, etc.), and/or the like. In one implementation, the consumer may scan a previous sales receipt 507, and V-GLASSES may recognize sales items 508, and the consumer may add desired product items to the shopping list by tapping on an "add" button 509. For example, the V-GLASSES may determine a product category and a product identifier for each product item on the shopping list, and obtain product inventory and stock keeping data of the merchant store (e.g., a datatable indicating the storing location of each item). The V-GLASSES may query the obtained product inventory and stock keeping data based on the product identifier and the product category for each product item, and determine an in-store stock keeping location for each product item based on the query.

With reference to FIG. 16B, the V-GLASSES may automatically load a store map and label product items from the shopping list on the store map. For example, a consumer may engage the V-GLASSES to check-in at a grocery store (e.g., in a similar manner as discussed in FIG. 15A), and then select an option of "see store map" (e.g., see 434*b* in FIG. 15F). The V-GLASSES may provide a store map 510 of the grocery store, and may provide tags 511*a* indicating locations of product items from the consumer's shopping list on the store map.

In another implementation, with reference to FIG. 16C, when the consumer select the option of "start augmented reality shopping experience" (e.g., see 434*c* in FIG. 15F), the consumer may engage the mobile device to scan an in-store reality scene 515, and V-GLASSES may provide virtual labels overlay on top of the reality scene to provide locations of product items on the shopping list. For example, virtual overlay labels may provide locations of "Apple Jam" 517 on the shelf, or provide directions for the consumer to locate other product items that are not located within the captured reality scene 516. In one implementation, the virtual overlay label 517 may comprise a transparent or semi-transparent block showing product name, covering the scanned products on the shelf. In one implementation, the V-GLASSES may receive the shopping list (e.g., at a remote server, at the merchant store, etc.), and may automatically provide the tagged store map described in FIG. 16B, and/or the store augmented reality scene with virtual overlay in FIG. 16C to the consumer device. Alternatively, such operations may be performed at the consumer mobile device locally.

Figure 16E:
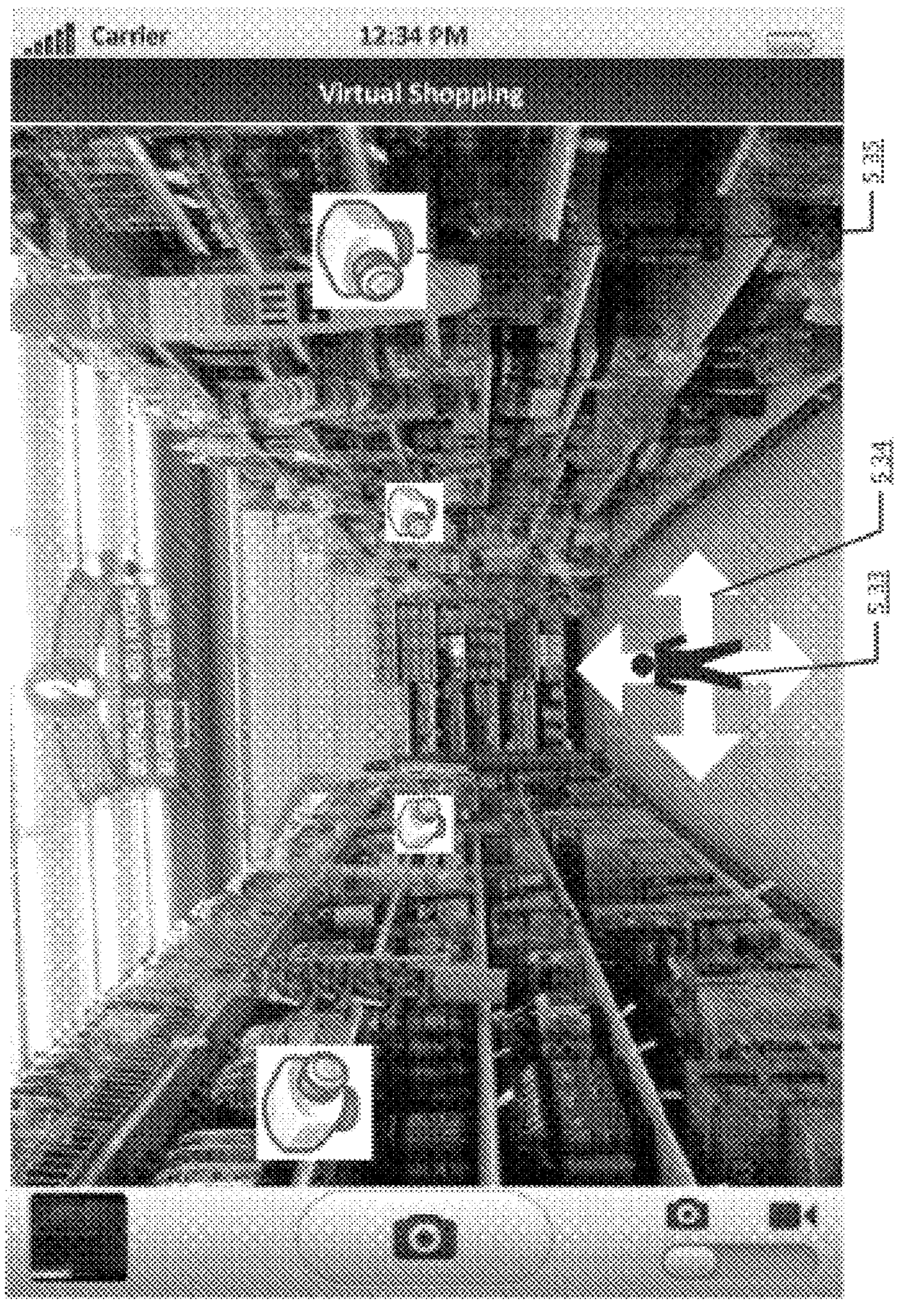
Figure 16F:
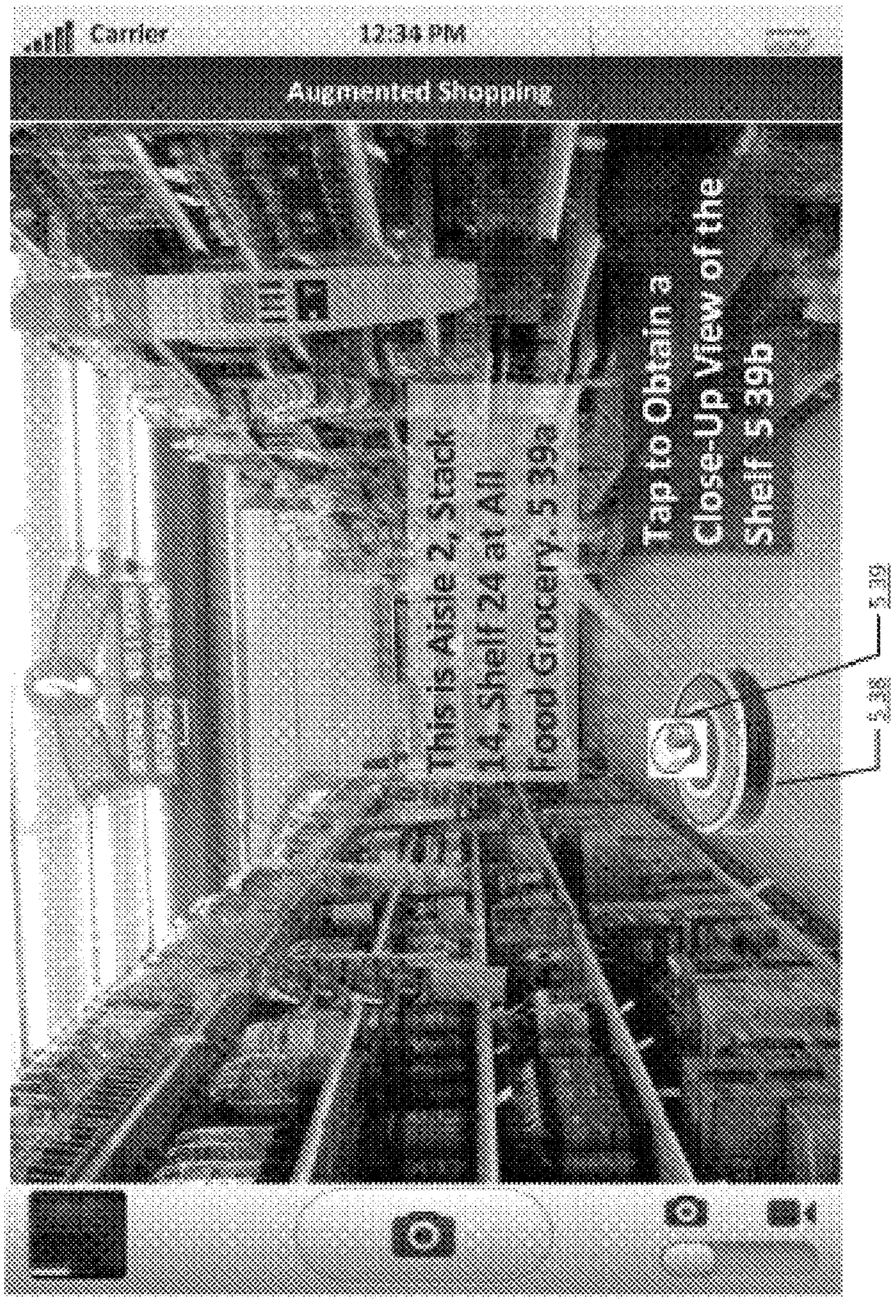

FIGS. 16D-16F provide exemplary UIs illustrating virtual shopping experiences within embodiments of the V-GLASSES. In one embodiment, online consumers may experience a store virtually by receiving a store floor plan for a designated location; and moving a consumer shopper avatar through the store floor plan to experience product offerings virtually, and the remote CSR may assist the virtual consumer. See FIG. 16D. For example, the virtual store may be comprised of stitched-together composite photographs having detailed GPS coordinates related to each individual photograph and having detailed accelerometer gyroscopic, positional/directional information, all of which may be used to allow V-GLASSES to stitch together a virtual and continuous composite view of the store (e.g., akin to Google street view composite, etc.). For example, as shown in FIG. 16E, in one implementation, a consumer may move their consumer shopper avatar 533 around the virtual composite view of the store, e.g., to move forward or backward, or turn left or right along the arrows 534 to obtain different views of the store. In some implementations, the store may position cameras 535 on the shelves in order to facilitate the virtual view of the store.

In an alternative implementation, every aisle and shelving stack may include a numerous, wide-angle cameras having a specified accelerometer gyroscopic, positional/directional orientation, periodically taking a photograph of the opposing aisle/area, which may be submitted to the V-GLASSES server, so that the virtual store map may be continually updated and be kept up to date. For example, as shown in FIG. 16D, a store map including tags indicating a distribution view of in-store cameras (e.g., 530*a-b*, etc.) and the visual scope of each camera (e.g., 531*a-b*) may be provided to a consumer so that the consumer. In one implementation, such camera may be positioned to capture the view of an aisle and the shelves on both sides (e.g., see camera 530*a* and its visual scope 531*a*, etc.). Alternatively, the camera may be positioned to capture a front view of an opposing shelf (e.g., camera 530*b* and its visual scope 531*b*, etc.). In some implementations, as shown in FIG. 16D(1), the cameras 532*a* may be positioned in a grid such that the visual scope 532*b* of the cameras overlap, allowing V-GLASSES to stitch together images to create a panoramic view of the store aisle.

In an alternative embodiment, such cameras may provide a continuous live video feed and still photos may be obtained from the live video frame grabs, which may be used to generate virtual store maps. In one implementation, a motion detection component may be used as a trigger to take still photos out of a live videos when the motion detection component detects no motion in the video and thereby provides unobstructed views for virtual map composition. In addition, when a consumer focuses on a particular shelf, aisle, stack, and/or region, e.g., a consumer turns their avatars parallel to a camera directional view, the consumer's view may then become filled with the live video feed of the camera closest to the consumer avatar's location.

In another implementation, as shown in FIG. 16F, V-GLASSES may install robots 538 (e.g., Roombas and/or the like) in store, which are distributed among aisles and stacks to obtain visual captures of the in-store scene using on-board cameras 539. For example, the robots may comprise mobile intelligent robots (e.g., iRobot® Create connected to a camera via the iRobot® Create open interface). In one implementation, when a consumer captures a robot via V-GLASSES in the reality scene, and/or see a robot during remote virtual shopping, the consumer may obtain a location of the robot 539*a* and a link to download a close-up image of the shelf 539*b* captured by the camera installed with the robot 538. In some implementations, the robots may capture the in-store scene while cleaning up aisles, arranging products, and/or the like. In some implementations, as shown in FIG. 16F(1), the robots may comprise mobile intelligent robots 540 that may be able to physically shop/select/package items for user delivery/pickup.

In further implementations, the consumer may be navigating a merchant's shopping site, having a shopping cart filled with product items, and the remote CSR may join the consumer's shopping session and provide assistance, allowing the CSR to provide the consumer with links to product items that may be of interests to the consumer; this may be achieved by having a CSR help/request button that may generate a pop-up window for audio/video chat with the CSR, and a dialogue box into which the CSR may place a link to the products. The consumer may click on the link provided by the CSR to be directed to a product page to view product details.

FIGS. 17A-30D provide example embodiments of an augmented reality platform which provides a user interface instantiated on a user device including option labels on top of a camera captured reality scene so that a user may tap on the option labels to select a service option. For example, when a user place a camera-enabled mobile device to capture a view of a payment card, the V-GLASSES may identify a card in the captured view and overlay a list of option labels related to the payment card, such as balance information, transfer funds, and/or the like.

Figure 17:
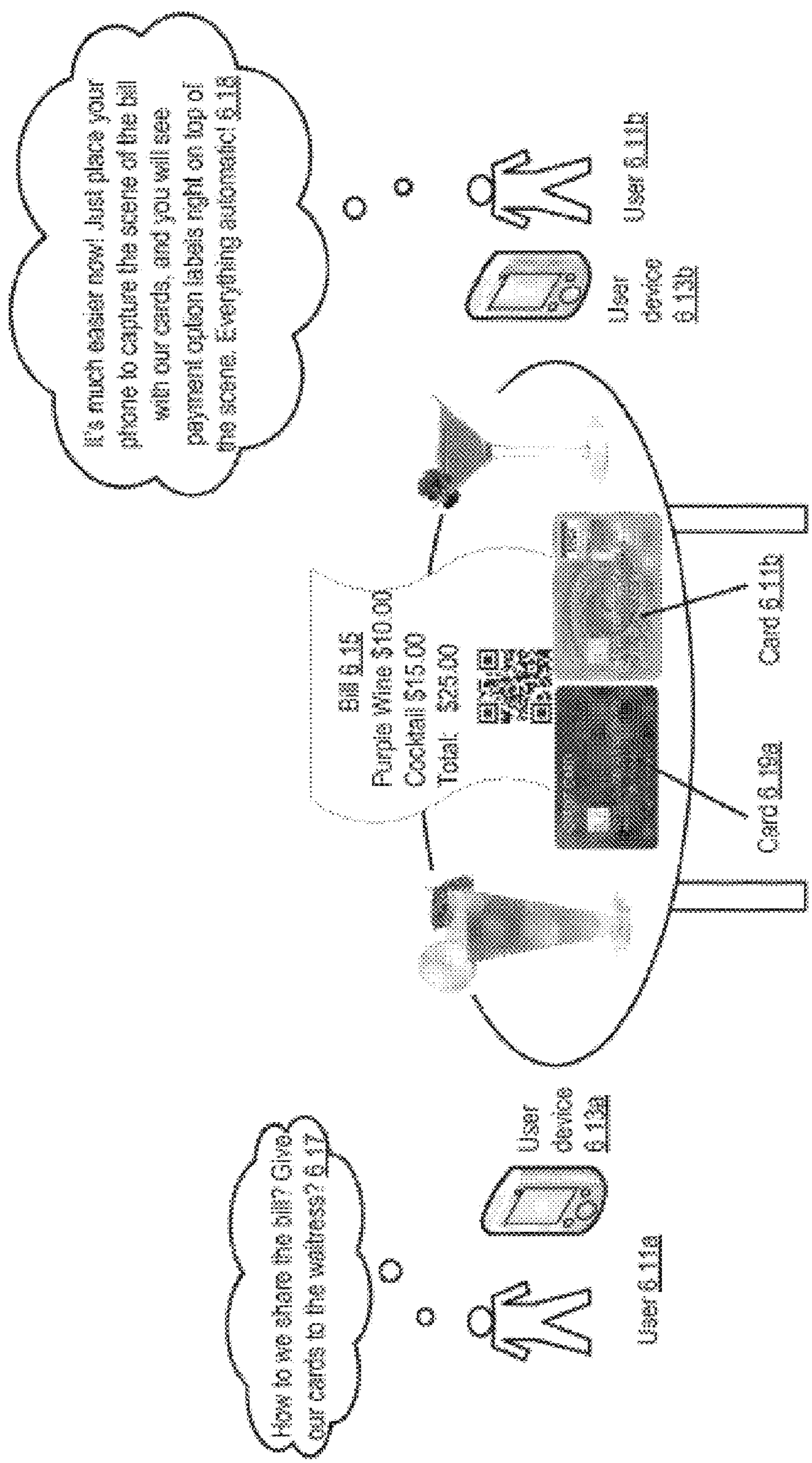
FIG. 17 provides a diagram illustrating an example scenario of V-GLASSES users splitting a bill via different payment cards via visual capturing the bill and the physical cards within embodiments of the V-GLASSES.

FIG. 17 provides a diagram illustrating an example scenario of V-GLASSES users splitting a bill via different payment cards via visual capturing the bill and the physical cards within embodiments of the V-GLASSES. As shown in FIG. 17, when two consumers, e.g., user 611*a* and user 611*b*, receive a bill or invoice 615 for their consumption at a dining place (e.g., a restaurant, a bar, a lounge, etc.), the users 611*a-b* may desire to split the bill 615 in different ways, e.g., share the bill equally per head counts, per their consumed portions, etc. One traditional way is for the users 611*a*-*b* to provide their payment cards (e.g., a credit card, a debit card, etc.) to the restaurant cashier (e.g., 617), and the cashier may split the bill 615 to generate separate bills for each card payment, wherein the amount due on each of the split bill may be allocated according to the preference of the users 611*a*-101*b*.

In a different embodiment, the users 611*a*-*b* may launch a V-GLASSES component instantiated on a camera-enabled mobile device 613*a*-103*b* to capture a view of the table, e.g., including the received invoice/bill 615 having a quick response (QR) code or barcode printed thereon, and a plurality of payment cards 619*a*-109*b* that the users 611*a*-*b* are going to pay for the bill. The users 611*a*-*b* may view virtual overlaid labels on top of the captured scene, so that they can tap on the option labels to split a bill equally, proportionally, and/or the like.

Within implementations, users 611*a*-*b* may facilitate payment from their payment cards upon V-GLASSES augmented reality capturing at the same mobile device/wallet. For example, user 611*a* may operate her mobile device 613*a* to capture a scene of the two payment cards 619*a*-*b*, while card 619*b* belongs to user 611*b*. In one implementation, the V-GLASSES component instantiated on the mobile device 613*a* may send an authorization request to a processing server, or a wallet management server to authorize split payment transaction on the payment card 613*b*. In such scenarios, users 611*a*-*b* may conduct a transaction including payments from two wallets on the same mobile device, without user 611*b* independently initiates a transaction using his mobile device 613*b*. Further implementations of restaurant bill payment scenarios are illustrated in FIGS. 26A-26F.

FIG. 18A provides a diagram illustrating example virtual layers injections upon virtual capturing within embodiments of the V-GLASSES. In one embodiment, a V-GLASSES component may be instantiated at a consumer camera-enabled mobile device 713 to capture a scene of an object, e.g., a product item 712, a merchant store, and/or the like. Within implementations, the V-GLASSES component may provide multiple layers of augmented reality labels overlaid atop the captured camera scene, e.g., the product 712. For example, a consumer may select a merchant provided layer 715*a* to obtain product information, product price, offers from the merchant, points options that apply to the product, price match, store inventory, and/or the like; a consumer wallet layer 715*b* to obtain wallet account information, payment history information, past purchases, wallet offers, loyalty points, and/or the like; a retailer layer 715*b* to obtain product information, product price, retailer discount information, in-store map, related products, store location, and/or the like; a social layer 715*d* to obtain social rating/review information, such as Amazon ratings, Facebook comments, Tweets, related products, friends ratings, top reviews, and/or the like.

Within embodiments, the different layers 715*a*-*d* may comprise interdependent information. For example, merchant layer 715*a* and/or retailer layer 715*b* may provide information of related products based on user reviews from the social payer 715*d*. A variety of commerce participants, such as, but not limited to manufacturers, merchants, retailers, distributors, transaction processing networks, issuers, acquirers, payment gateway servers, and/or the like, may bid for layer space in the augmented reality shopping experience.

Figure 18B:
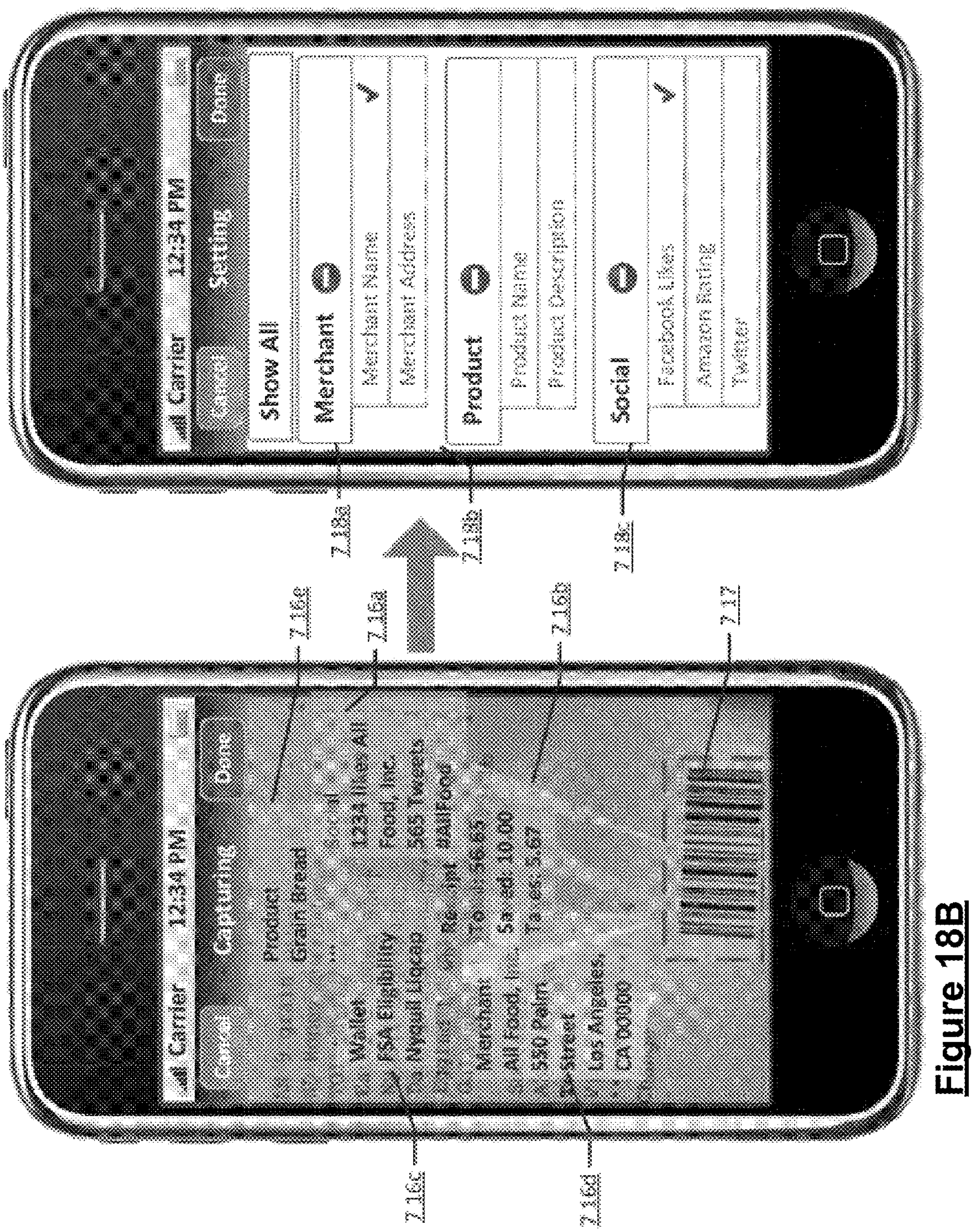
Figure 18C:
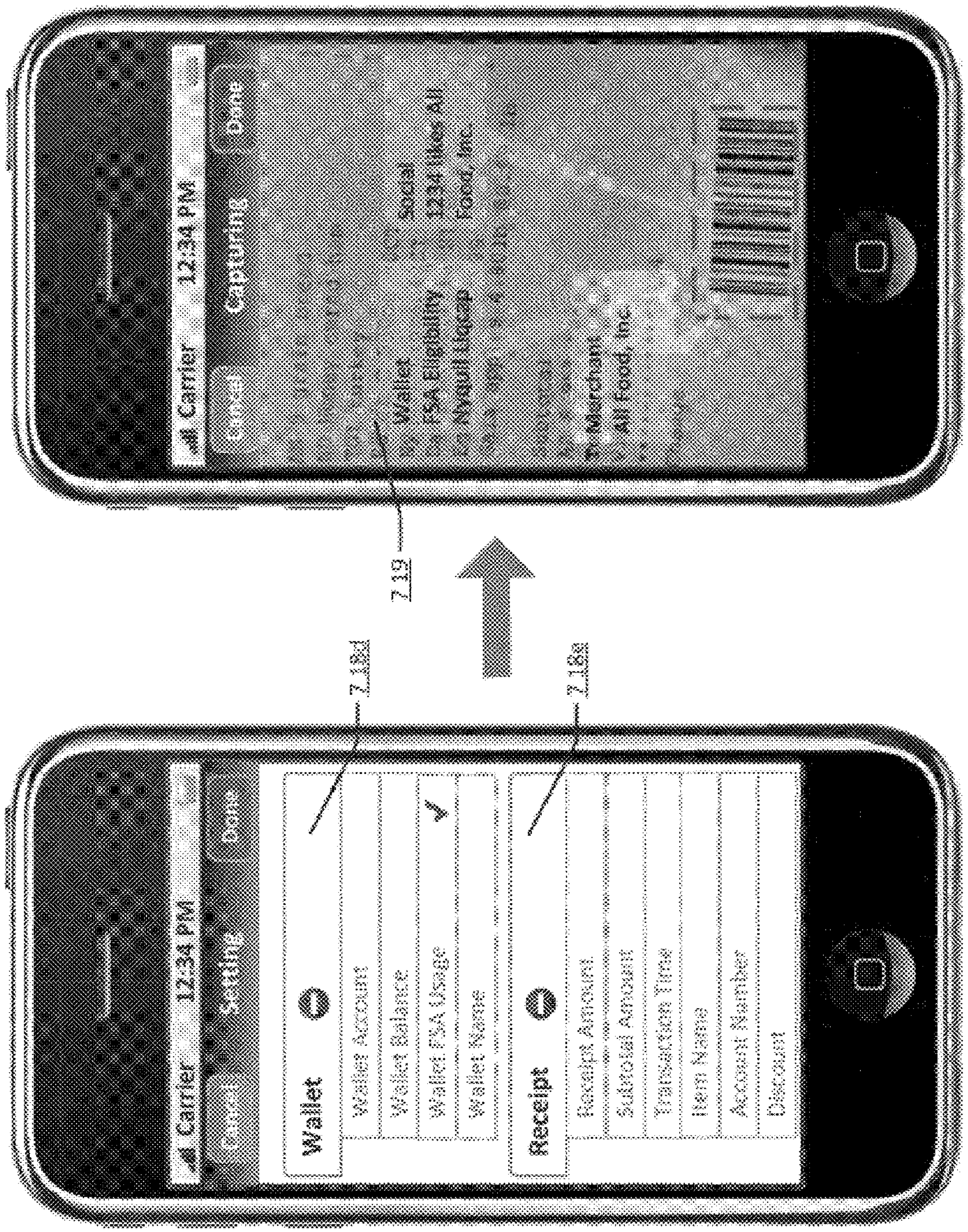

FIGS. 18B-18C provide exemplary UI diagrams illustrating consumer configured layer injection within embodiments of the V-GLASSES. As shown in FIG. 18C, when a consumer places a mobile device to capture a visual reality scene of an object, e.g., a barcode on a sales receipt 717, multiple information layers may be injected with regard to the barcode. For example, a social layer 716*a* may provide information about social ratings, comments from social media platforms about the product items, merchant reflected in the sales receipt; a receipt layer 716*b* may provides detailed information included in the sales receipt, e.g., total amount, tax amount, items, etc.; a wallet layer 716*c* may provide eligible account usage, e.g., healthcare products, etc.; a merchant layer 716*d* may provide merchant information; a product layer 716*e* may provide product item information that are listed on the sales receipt, etc. In one implementation, the multiple virtual labels overlay may be overly crowded for the consumer to view, and the consumer may configure virtual labels that are to be displayed. For example, as shown at 718*a*-*c* in FIG. 18B and 718*d*-*e* in FIG. 7C, the consumer may check on information labels that are desired.

In one implementation, as shown at 719 in FIG. 18C, upon consumer configurations, only virtual labels that have been selected by the consumer may be displayed. For example, per consumer selections, only merchant name but not merchant address is displayed in the merchant label; Facebook comments are displayed in the social layer; and wallet FSA eligibility usage is displayed.

Figure 19:
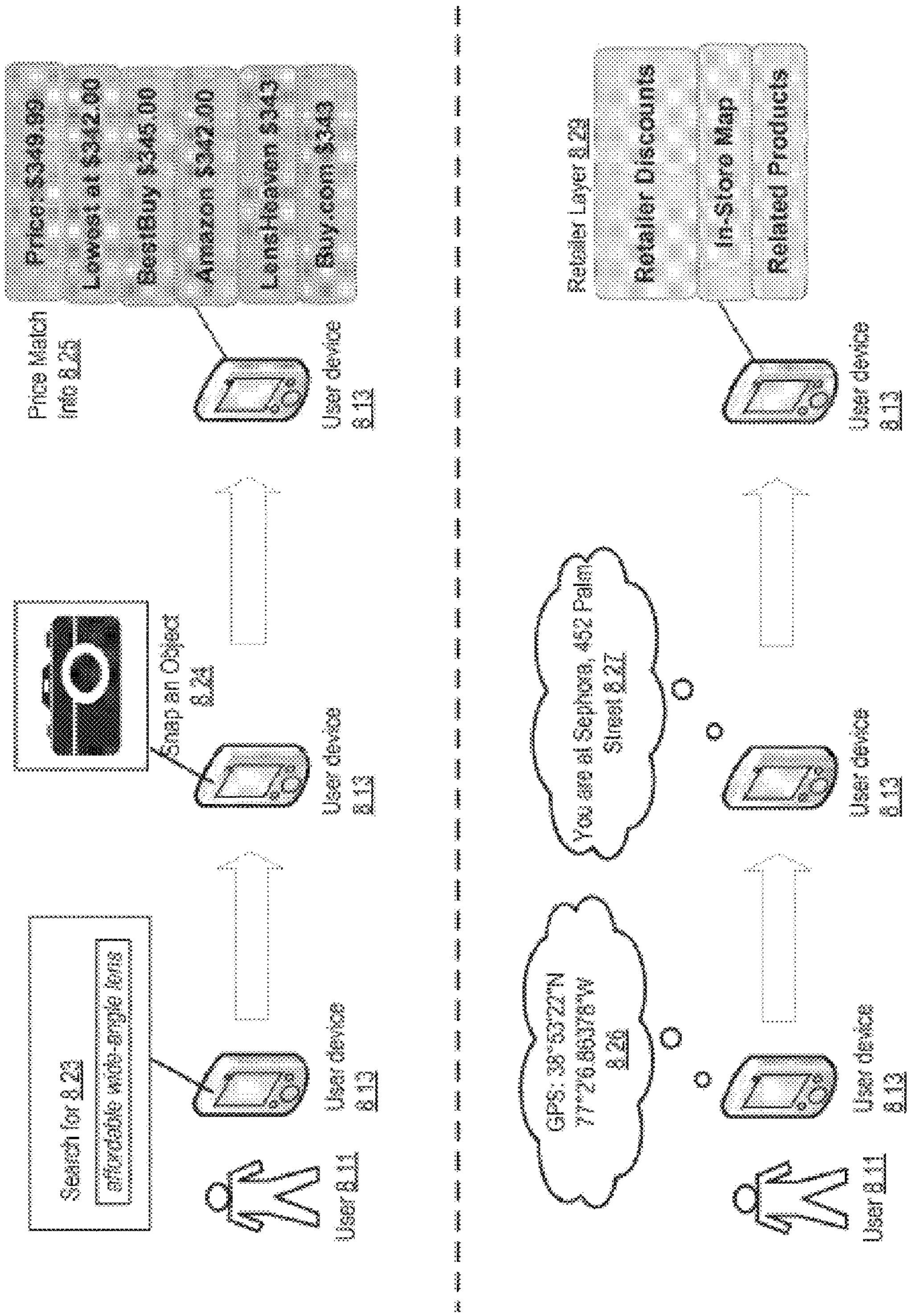
FIG. 19 provides a diagram illustrating automatic layer injection within embodiments of the V-GLASSES.

FIG. 19 provides diagrams illustrating example embodiments of automatic augmented reality layer injection within embodiments of the V-GLASSES. Within embodiments, virtual information layer overlays may be automatically injected based on consumer queries, consumer purchase context, consumer environment, object snaps, and/or the like. For example, when a consumer 811 searched for a product on the mobile device 813, e.g., "affordable wide-angle lens" 823, the digital wallet 823 may capture the query text and use it for automatic augmented layer injection; when the consumer mobile device 813 snaps a scene of a camera 824, the V-GLASSES may automatically inject a layer comprising price match information 825 of the snapped camera 824, based on consumer indicated interest on "affordable prices" during the consumer's query.

As another example, a consumer 811 may walk into a merchant store and the mobile device 813 may capture the consumer's GPS coordinates 826. The V-GLASSES may then determine the consumer is located at a retailer shop based on the GPS coordinates 827, and may provide a retailer layer of augmented reality overlay labels 829 to the mobile device captured in-store scenes, e.g., including retailer discounts, in-store map, related products inventories, and/or the like.

Figure 20A:
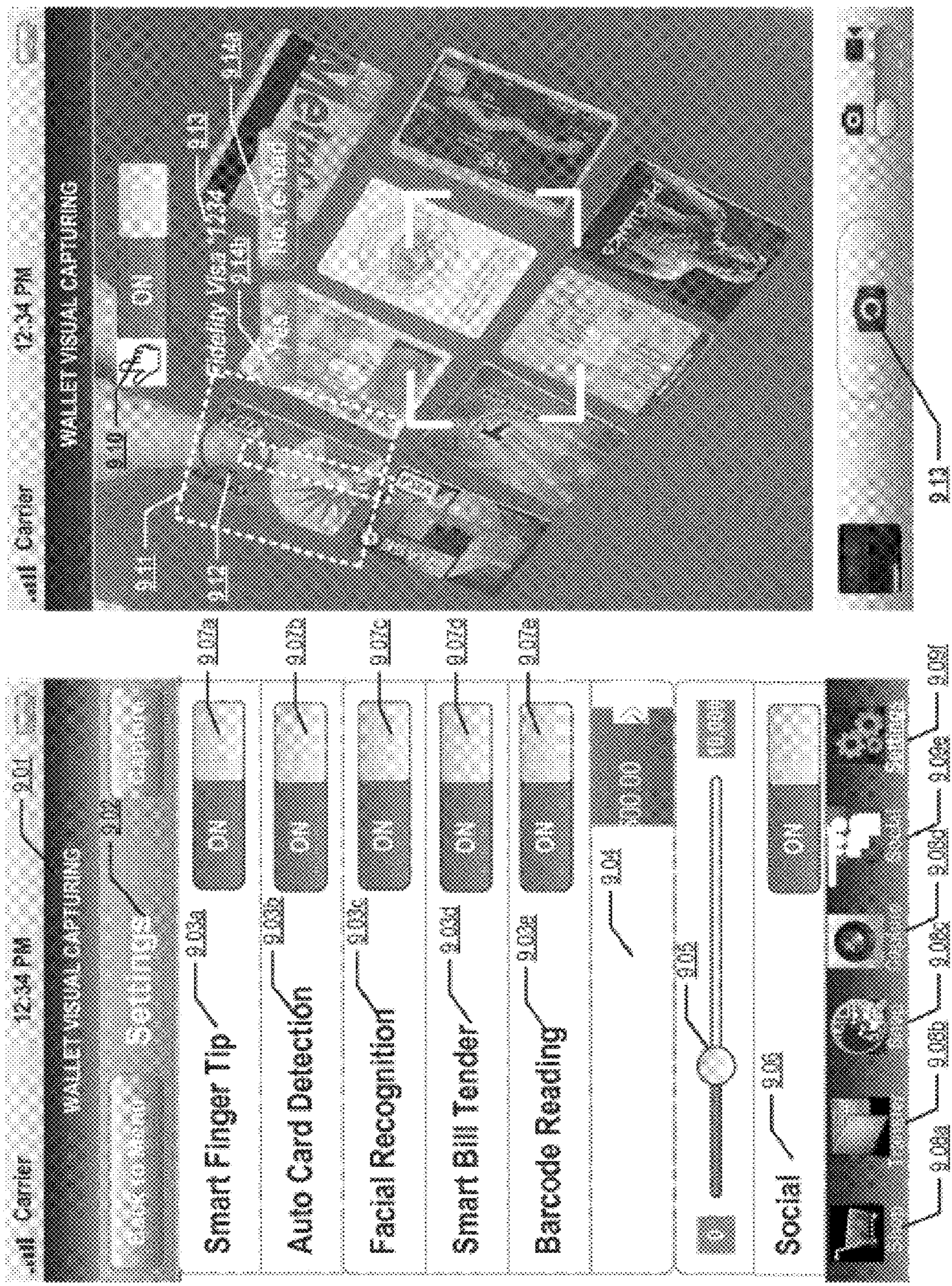
FIGS. 20A-20E provide exemplary user interface diagrams illustrating card enrollment and funds transfer via V-GLASSES within embodiments of the V-GLASSES.

FIGS. 20A-20E provide exemplary user interface diagrams illustrating card enrollment and funds transfer via V-GLASSES within embodiments of the V-GLASSES. For example, as shown in FIG. 20A, a user may instantiate a wallet visual capturing component 901 which employs an image/video capturing component coupled with the user's mobile device to capture views in reality. In one implementation, a user may configure settings 902 of the V-GLASSES visual capturing component.

For example, a user may move a sliding bar 907*a* to enable or disable a smart finger tip component 903*a*, e.g., when the smart finger tip component is enabled, the V-GLASSES may capture a human finger point within a captured reality scene (e.g., see also 912, etc.), etc. In one implementation, the smart finger tip component 903*a* may engage fingertip motion detection component (e.g., see FIG. 31C) to detect movement of the consumer's fingertips. For example, the V-GLASSES may generate visual frames from the video capturing of the reality scene, and compare a current frame with a previous frame to locate the position of a fingertip within the video frame, as further discussed in FIG. 20C.

In another example, a user may move the sliding bar 907*b* to enable or disable auto card detection 903*b*, e.g., when the auto card detection component is enabled, the V-GLASSES may automatically detect and identify whether any rectangular object in a captured reality scene comprise a payment card, etc. In another example, a user may move the sliding bar 907*c* to enable or disable facial recognition 903*c*, e.g., when the facial recognition component is enabled, the V-GLASSES may automatically recognize human faces (e.g., including a human, a printed facial image on a magazine, a friend's picture displayed on a digital screen, etc.) that are presented in the reality scene and identify whether the human face matches with any of previously stored contacts. In another example, a user may move the sliding bar 907*d* to enable or disable smart bill tender component 903*d*, e.g., when the smart bill tender component is enabled, the V-GLASSES may provide option labels based on a type of the bill. When the bill is a restaurant bill, the V-GLASSES may provide options to facilitate tip calculation, bill splitting per actual consumption, and/or the like. In another example, a user may move the sliding bar 907*e* to enable or barcode reading component 903*e*, e.g., the V-GLASSES may read a barcode, and/or a QR code printed on a purchase label, invoice or bill to provide payment information via overlaid labels on the captured reality scene.

In one implementation, the user may configure a maximum one-time payment amount 904 via the V-GLASSES initiated transaction, e.g., by sliding the bar 905 to select a maximum amount of $500.00. In another implementation, a user may select to include social connections 906 into the V-GLASSES capturing component, e.g., the V-GLASSES may obtain social data such as user reviews, ratings with regard to a capture purchase item in the reality scene (see 1435 in FIG. 25). Additional wallet features may be integrated with the V-GLASSES such as a shopping cart 908*a*, a transfer funds mode 908*b*, a snap barcode mode 908*c*, a capture mode 908*d*, a social mode 909*e*, settings mode 909*f*, and/or the like.

Within implementations, when a user places a camera-enabled mobile device (e.g., 913) to capture a reality scene, a user may view a plurality of virtual labels overlaid on top of the captured reality scene. For example, the user may view a sliding bar 910 to control whether to enable the smart finger tip component. As shown in FIG. 9A, when the smart finger tip is on, the V-GLASSES may detect a human finger tip 912 in the reality scene, and detect an object that the finger tip is pointing at, e.g., 911. In this case, the V-GLASSES may determine the finger pointed rectangular object is a payment card with a card number printed thereon. Upon performing optical character recognition (OCR) on the payment card, the V-GLASSES may determine whether the payment card matches with an account enrolled in the user's wallet, e.g., a "Fidelity Visa *1234" account 913. The user may tap on the displayed option buttons 914*a-b* to indicate whether the V-GLASSES's card recognition result is accurate. For example, in one implementation, V-GLASSES may adopt OCR components such as, but not limited to Adobe OCR, AnyDoc Software, Microsoft Office OneNote, Microsoft Office Document Imaging, ReadSoft, Java OCR, SmartScore, and/or the like.

Figure 20B:
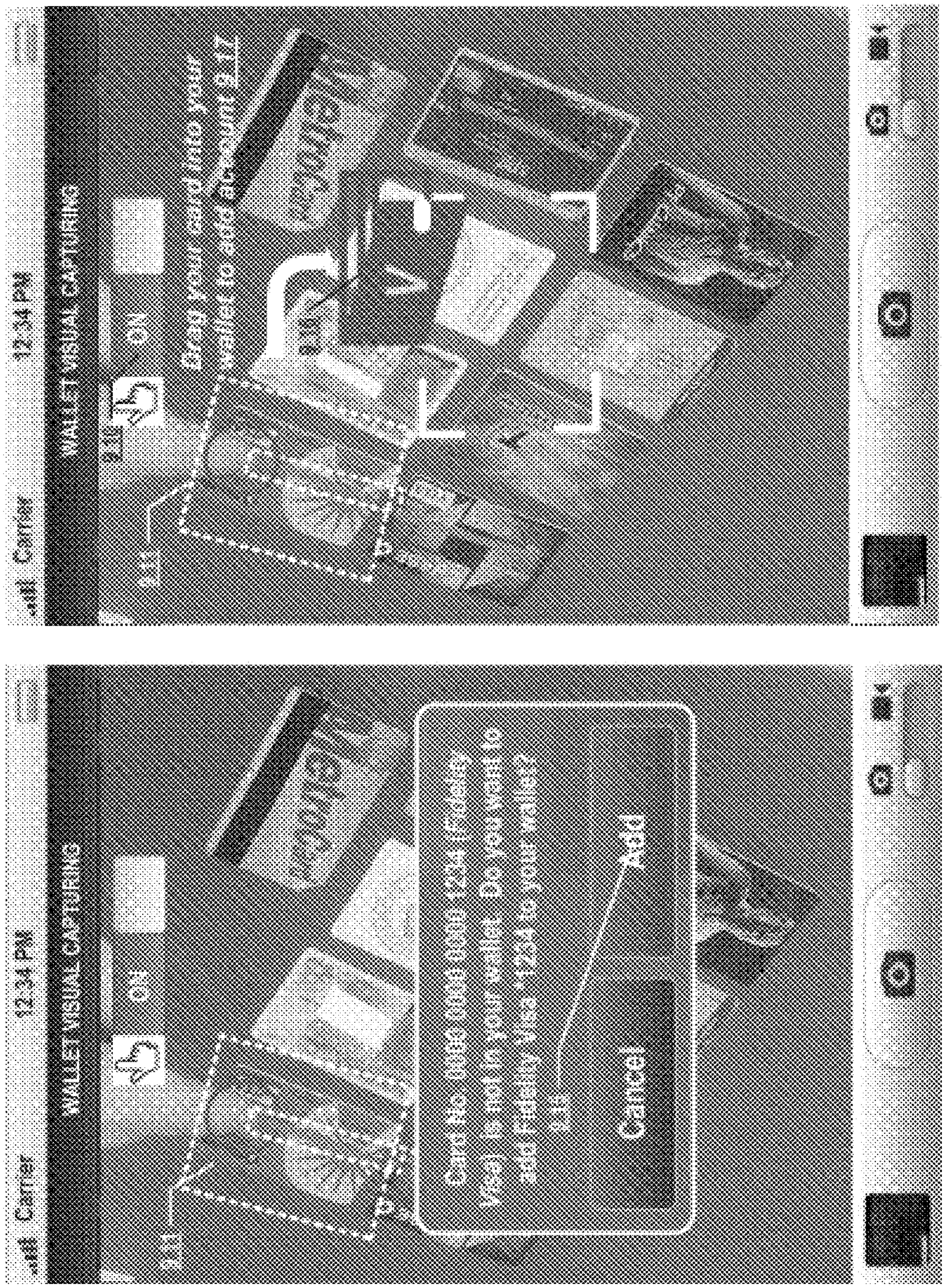

Continuing on with FIG. 20B, when the finger pointed card 911 is not identified by the V-GLASSES as any enrolled account in the wallet, the V-GLASSES may prompt a message to inquire whether a user would like to add the identified card to the wallet, e.g., 915. In one implementation, the V-GLASSES may provide a wallet icon 916 overlaid on top of the captured reality scene, and prompt the user to "drag" the card into the wallet icon 917. In one implementation, when the smart finger tip component is on (e.g., 910), the user may move his real finger tip (e.g., 911) to the location of the wallet icon 916, wherein the V-GLASSES smart finger tip component may capture the finger point movement. In another implementation, the user may tap and move his finger on the touchable screen of his mobile device to "drag" the card 911 into the wallet icon 916 to indicate a card enrollment request.

Figure 20C:
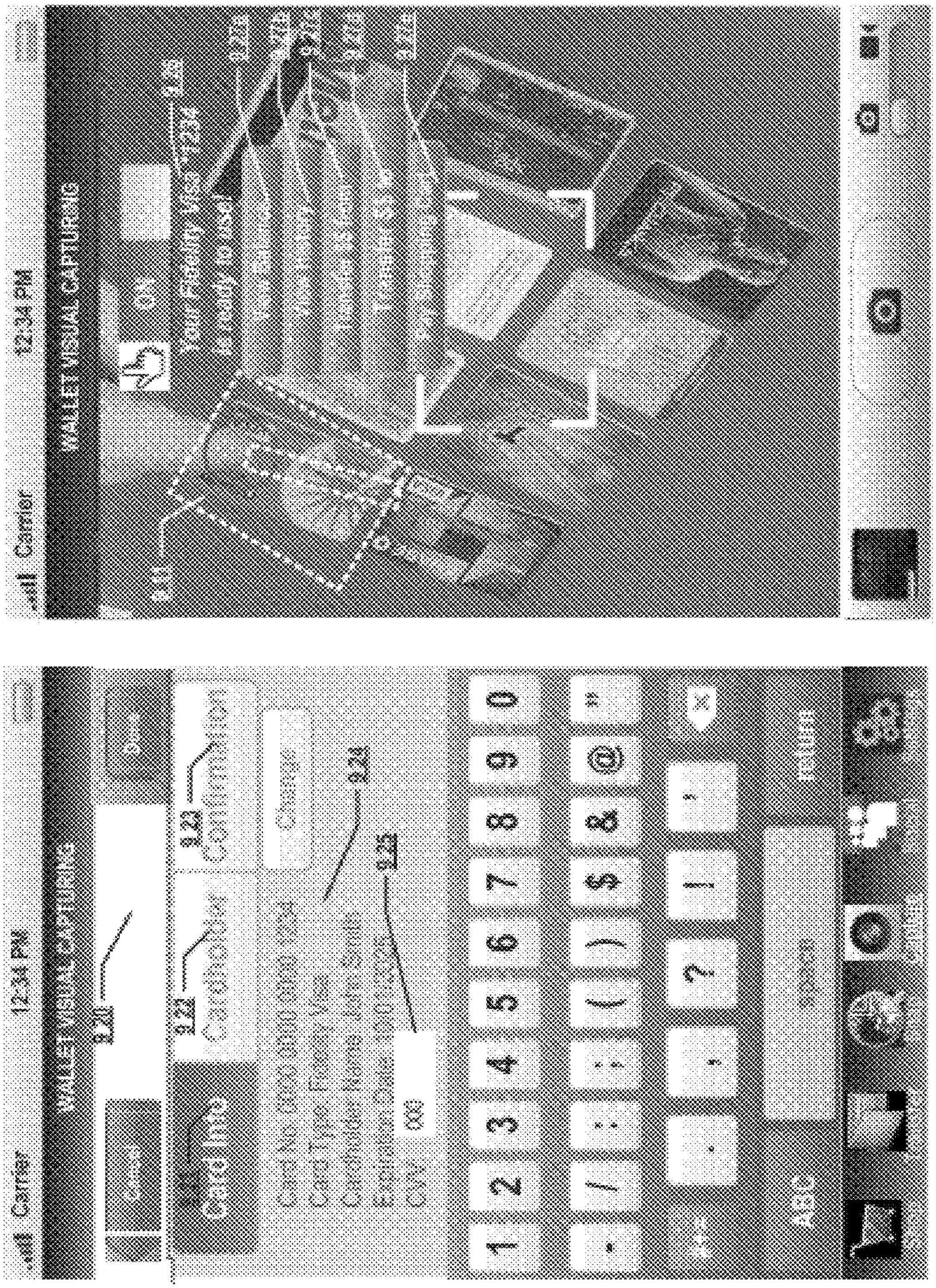

With reference to FIG. 20C, upon dragging a card to a wallet, the V-GLASSES may switch to a user interface to confirm and enter card enrollment information to add an account 920. For example, the user may need to enter and confirm card information 921, cardholder information 922 and view a confirmation page 923 to complete card enrollment. In one implementation, the V-GLASSES may automatically recognize card information 924 from OCR the captured scene, including card type, cardholder name, expiration date, card number, and/or the like. In another implementation, the V-GLASSES may request a user to enter information that is not available upon scanning the captured scene, such as the CVV code 925, etc.

In one implementation, upon enrolling the card, the V-GLASSES may switch back to the visual capturing scene, with an overlaid notification showing the card is ready to use 926, and provide a plurality of overlaid option labels beneath the card 911, such as, but not limited to view balance 927 (e.g., a user may tap and see the current balance of the card), view history 927*b* (e.g., the user may tap and view recent transaction history associated with the card), transfer money from 927 (e.g., the user may select to transfer money from the card to another account), transfer money to 927*d* (e.g., the user may transfer money to the card from another account, etc.), pay shopping cart 927 (e.g., the user may engage the card to pay the current shopping cart 908*a*), and/or the like. Various other option labels related to the card may be contemplated.

Figure 20D:
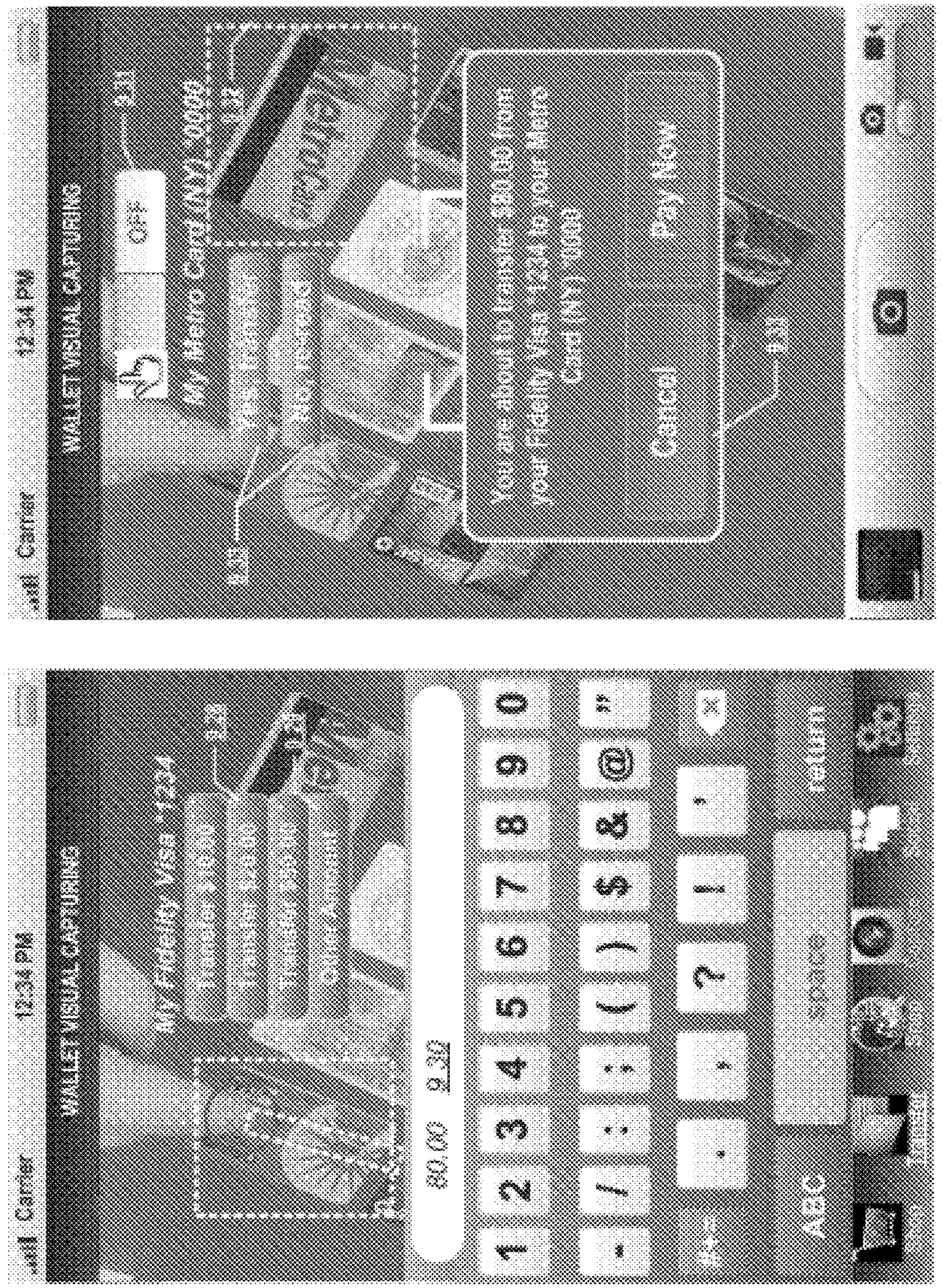
Figure 20E:
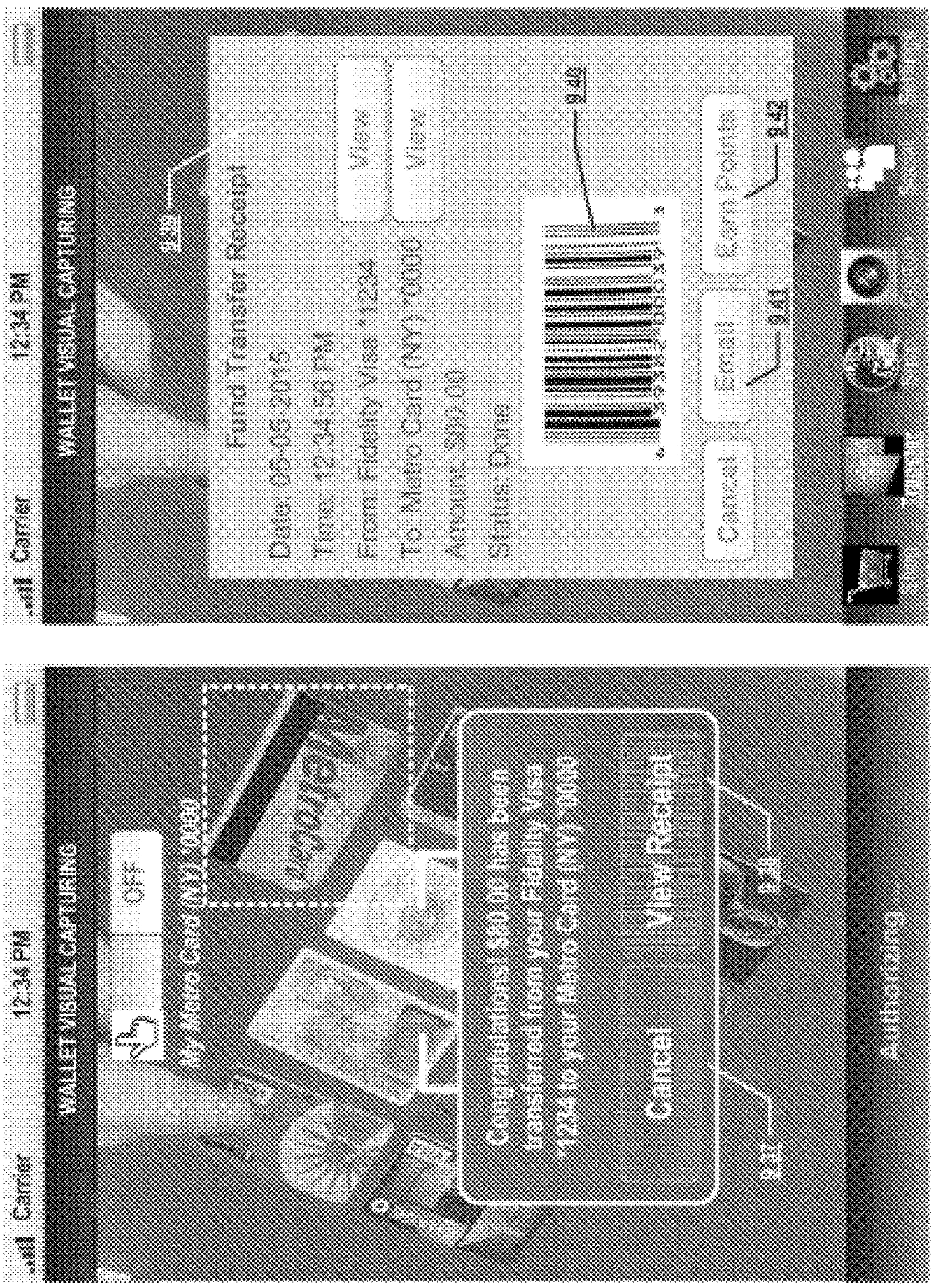
Figure 21:
FIGS. 21-25 provide exemplary user interface diagrams illustrating various card capturing scenarios within embodiments of the V-GLASSES.

In one implementation, if the user selects to tap on the "transfer $$ to" button 927*d*, with reference to FIG. 20D, the V-GLASSES may prompt overlaid labels for fund transfer options, such as a few suggested default transfer amounts (e.g., $10.00, $20.00, $30.00, etc.) 928, or the user may choose other amounts 929 to enter a transfer amount 930.

In one implementation, the user may move his finger to point to another card in the real scene so that the smart finger tip component may capture the payee card. In another implementation, as shown in FIG. 20D, when the smart finger tip component is turned off 931, the user may tap on the touchable screen to indicate a desired payee card. For example, the V-GLASSES may capture the object the user has tapped on the screen 932 and determine it is a metro card. The V-GLASSES may then retrieve a metro card account enrolled in the wallet and prompt the user to select whether to transfer or re-read the card selection 933. In one implementation, when the user selects "transfer," the V-GLASSES may provide a message to summarize the fund transfer request 933 and prompt the use to confirm payment. Fund transfer requests may be processed via the payment transaction component as discussed in FIGS. 53A-54B.

With reference to 9E, upon user confirming fund transfer, the V-GLASSES may provide a message notifying completion of the transaction 937, and the user may select to view the transaction receipt 938. In one implementation, the V-GLASSES may provide a virtual receipt 939 including a barcode 940 summarizing the transaction. In one implementation, the user may email 941 the virtual receipt (e.g., for reimbursement, etc.), or to earn points 942 from the transaction.

FIGS. 21-25 provide exemplary user interface diagrams illustrating various card capturing scenarios within embodiments of the V-GLASSES. With reference in FIG. 21, the V-GLASSES may detect the user's finger point via the smart finger tip in the real scene, and determine a human face is presented 1002 when the facial recognition component is enabled. In one implementation, the V-GLASSES may determine whether the detected face matches with any of the existing contact, and provide a message 1002 for the user to confirm the match. In one implementation, the user may confirm the match if it is correct 1004, or to view the contact list to manually locate a contact when the match is inaccurate 1005, or to add a new contact 1006.

In one implementation, upon the facial recognition, the V-GLASSES may provide a plurality of option labels overlaid on top of the reality scene, so that the user may select to call the contact 1008*a*, send a SMS 1008*b*, email the contact 1008*c*, transfer funds to the contact 1008*d*, connect to the contact on social media 1008*e*, view the contact's published purchasing history 1008*f*, and/or the like. In one implementation, if the user selects to transfer money to the contact, the V-GLASSES may retrieve a previously stored account associated with the contact, or prompt the user to enter account information to facilitate the transfer.

Figure 22:
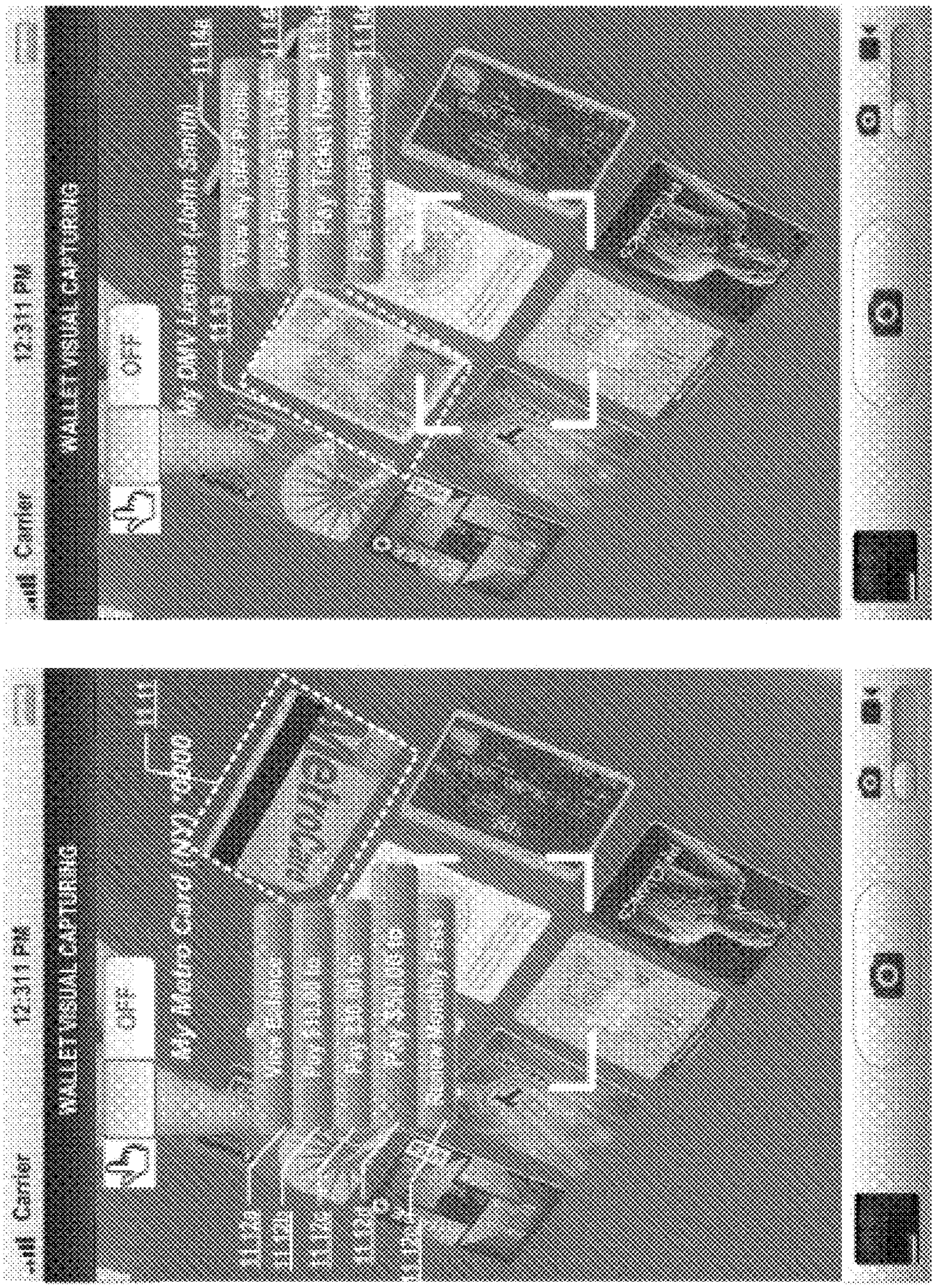

With reference to FIG. 22, a user may tap on the screen to point to a metro card 1111, and the V-GLASSES may determine the type of the selected card and provide a plurality of option labels, such as view balance 1112*a*, pay suggested amounts to the metro card 1112*b*-*d*, renew a monthly pass 1112*e*, and/or the like.

In another implementation, when the V-GLASSES determines the user tapped portion of the screen comprises a user's DMV license, 1113, the V-GLASSES may provide a plurality of option labels, such as view DMV profile 1114*a*, view pending tickets 1114*b*, pay ticket 1114*c*, file a dispute request 1114*d*, and/or the like.

Figure 23:
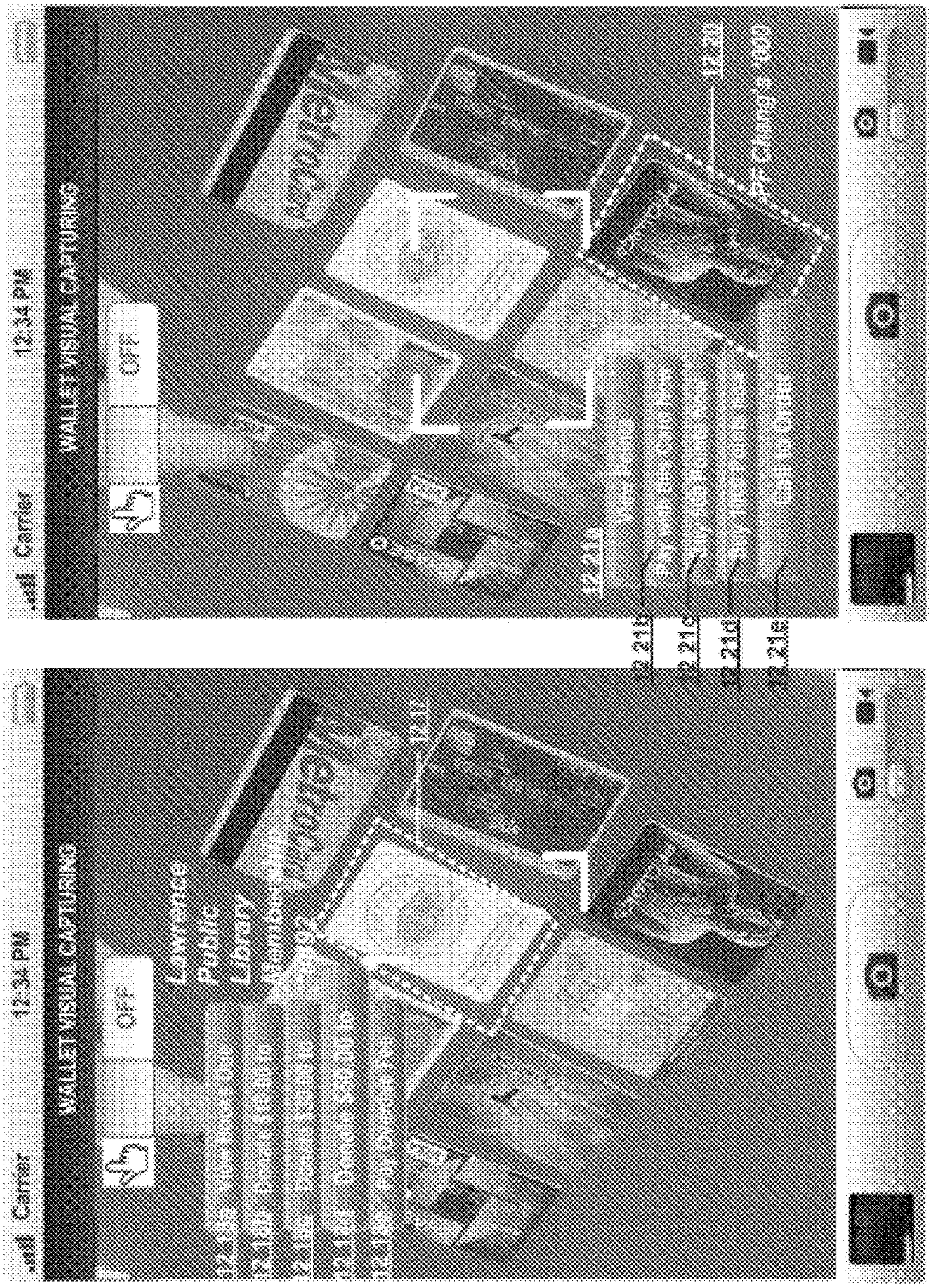

With reference to FIG. 23, when the V-GLASSES determines the user tapped portion of the screen comprises a user's library membership card 1217, the V-GLASSES may provide a plurality of option labels, such as view books due 1218*a*, make a donation of suggested amounts 1218*b*-*d*, pay overdue fees 1218*e*, and/or the like.

In another implementation, when the V-GLASSES determines the user tapped portion comprises a store membership card 1220, e.g., a PF Chang's card, the V-GLASSES may provide a plurality of labels including viewpoints 1221*a*, pay with the card 1221*b*, buy points 1221*d*-*e*, call to order 1221*e*, and/or the like.

Figure 24:
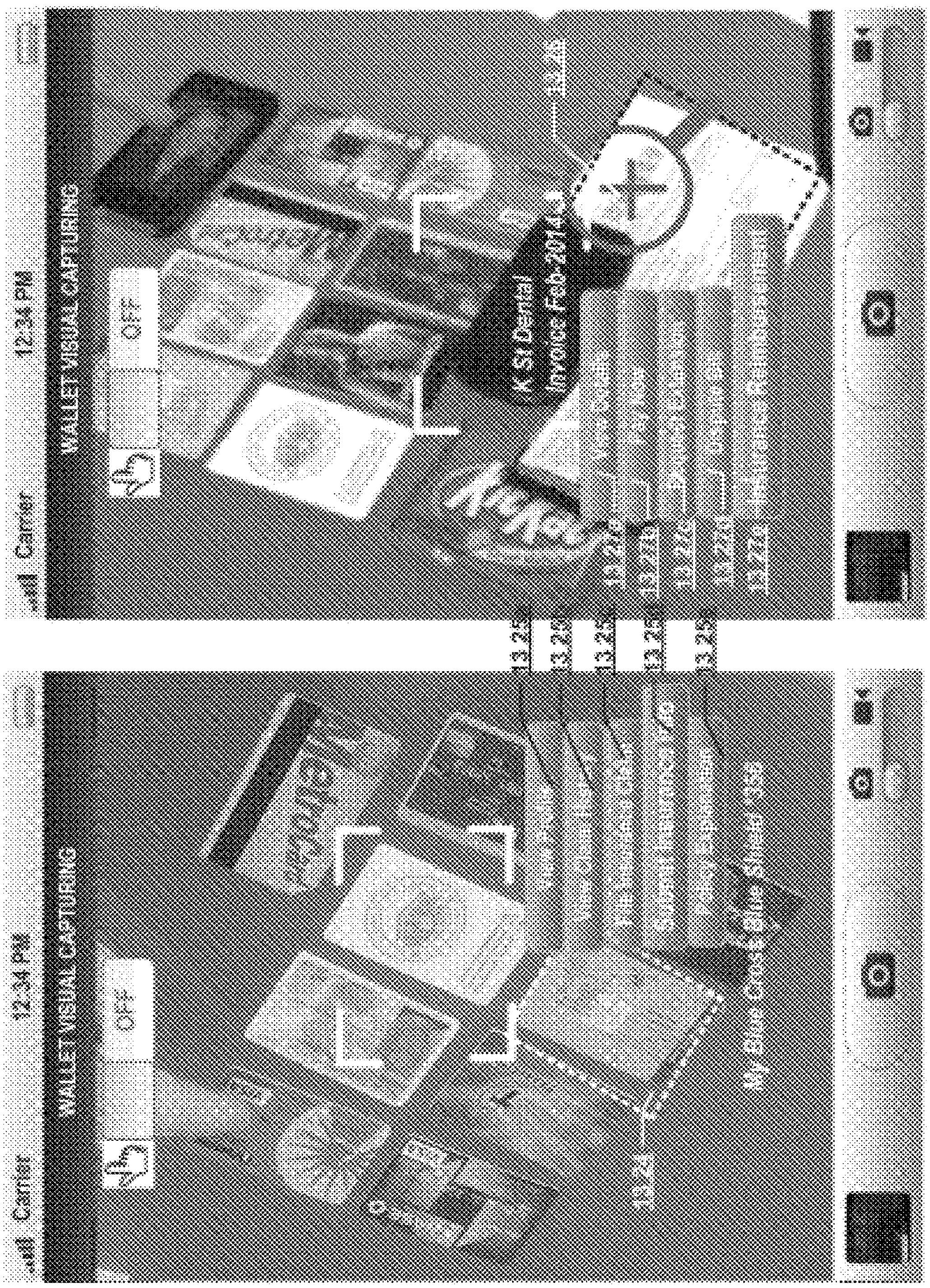

With reference to FIG. 24, when the V-GLASSES determines the user tapped portion comprises an insurance card 1324, e.g., a Blue Cross Blue Shield card, the V-GLASSES may provide a plurality of labels including view profile 1325*a*, view claim history 1325*b*, file insurance claim 1325c, submit insurance information 1325*c*, view policy explanation 1325*e*, and/or the like.

In another implementation, when the V-GLASSES determines the user tapped portion comprises a bill including a barcode 1326, e.g., a purchase invoice, a restaurant bill, a utility bill, a medical bill, etc., the V-GLASSES may provide a plurality of labels including view bill details 1327*a*, pay the bill 1327*b*, request extension 1327*c*, dispute bill 1327*d*, insurance reimbursement 1327 (e.g., for medical bills, etc.), and/or the like.

Figure 25:
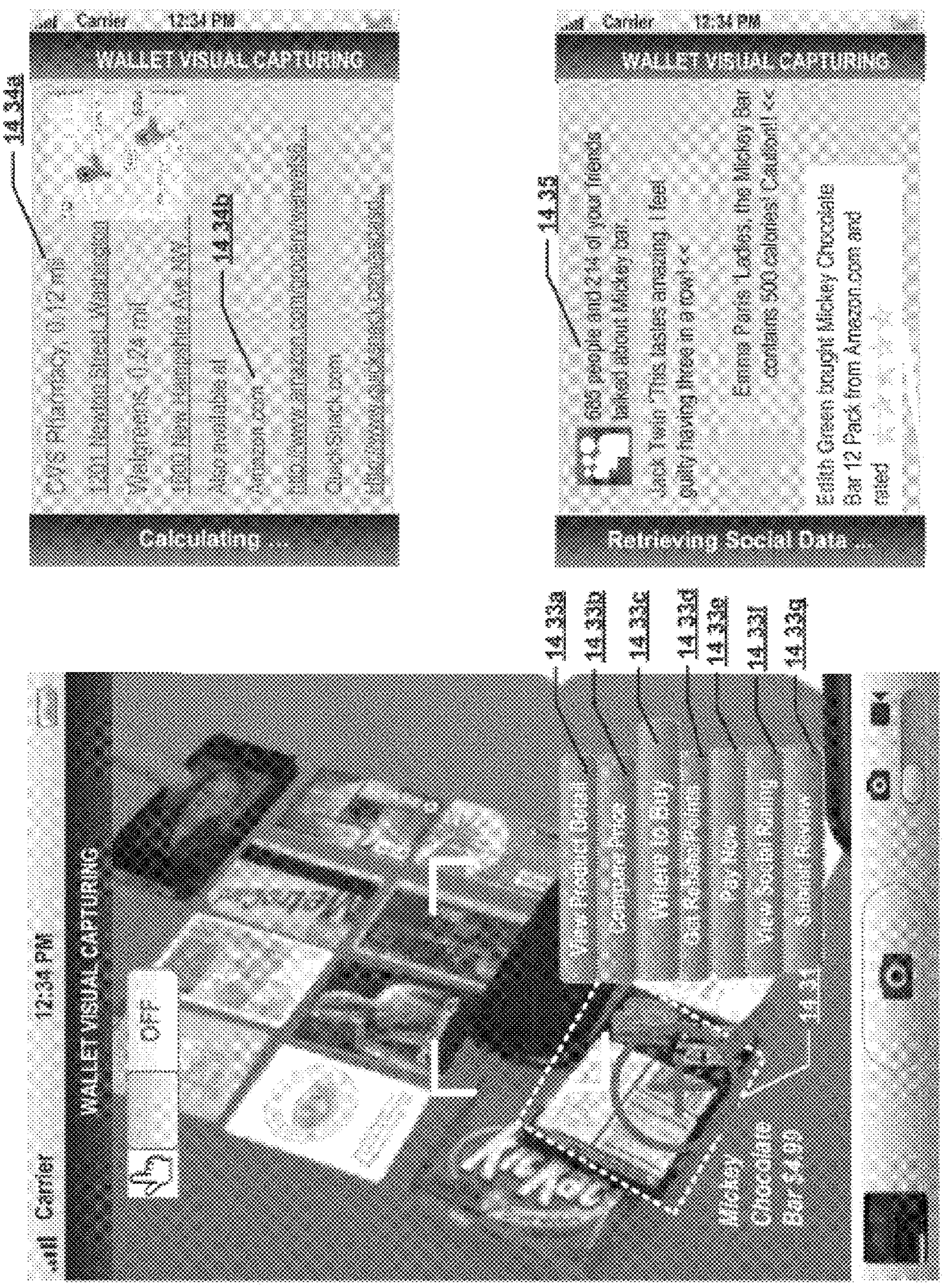

With reference to FIG. 25, when the V-GLASSES determines the user tapped portion comprises a purchase item 1431, e.g., a purchase item comprising a barcode, etc., the V-GLASSES may provide a plurality of labels including view product detail 1433*a*, compare price 143*b* (e.g., price match with online stores, etc.), where to buy 1433*c*, get rebate/points if the user has already purchased the item 1433*d*, pay for the item 1433*e*, view social rating 1433*f*, submit a social rating 1433*g*, and/or the like. In one implementation, if the user selects where to buy 1433*c*, the V-GLASSES may provide a list of nearby physical stores 1434*a* that features the product item based on the GPS information of the user mobile device. In another implementation, the V-GLASSES may provide a list of shopping sites 1434*b* that lists the purchase item.

In one implementation, if the user selects view social rating 1433*f* of the product, the V-GLASSES may retrieve social data from various social media platforms (e.g., Facebook, Twitter, Tumblr, etc.) related to the featured product, so that the user may review other users' comments related to the product.

Figure 26A:
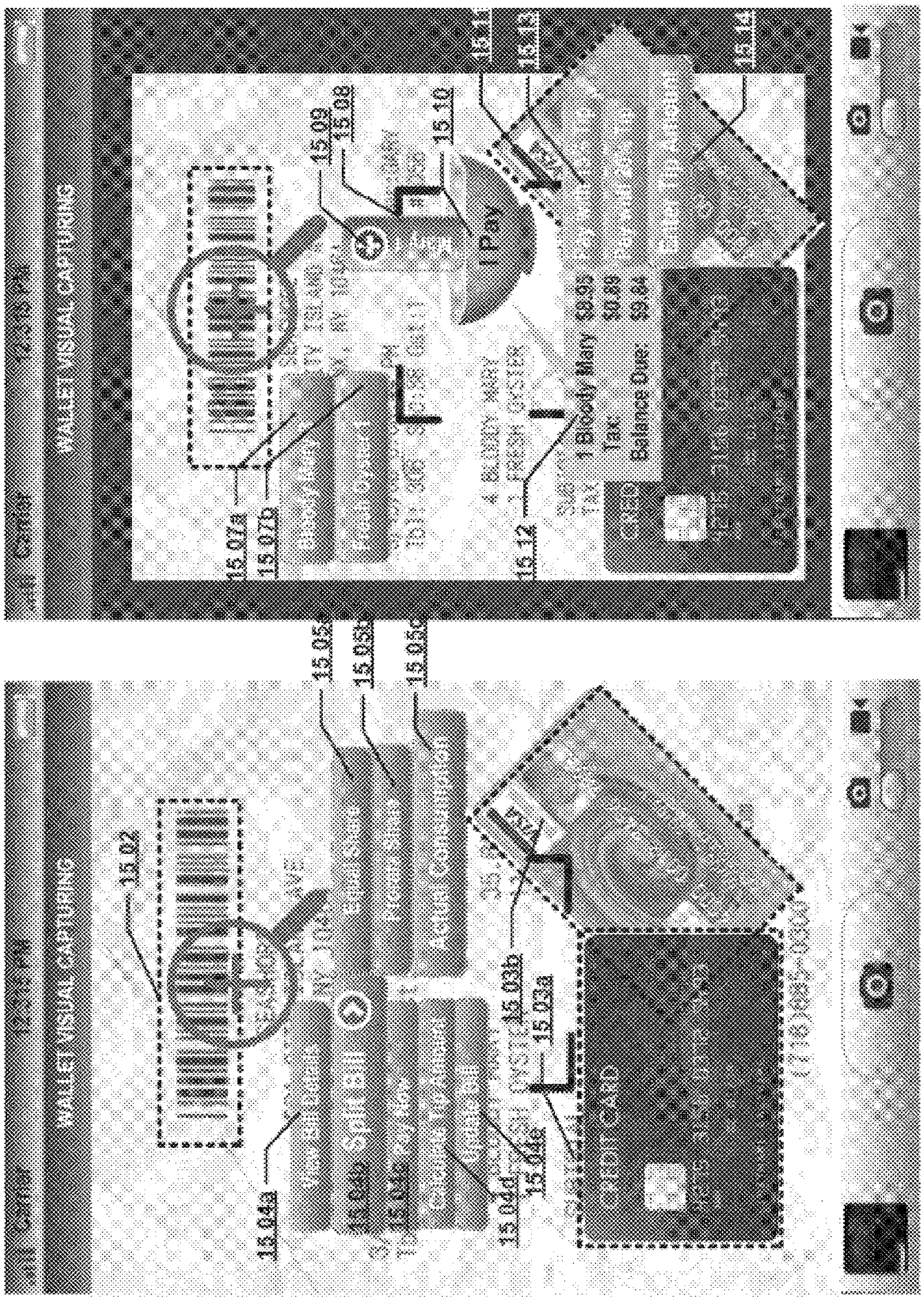
FIGS. 26A-26F provide exemplary user interface diagrams illustrating a user sharing bill scenario within embodiments of the V-GLASSES.

FIGS. 26A-26F provide exemplary user interface diagrams illustrating a user sharing bill scenario within embodiments of the V-GLASSES. With reference to FIG. 26A, a user may place two or more payment cards with a restaurant bill and capture the view with the camera-enabled mobile device. When the V-GLASSES determines there is a restaurant bill (e.g., via the barcode reading 1502, etc.) and two payment cards 1503*a* and 1503*b* in the scene, the V-GLASSES may provide plurality of labels including view bill details 1504*a*, split bill 1504*b* (e.g., as there are more than one card presented, indicating an attempt to split bill), pay bill 1504*c*, calculate tip amount 1504*d*, update bill 1504*e*, and/or the like. In one implementation, if the user selects to split bill 1504*b*, the V-GLASSES may provide option labels such as equal share 1505*a*, prorate share 205*b*, share by actual consumption 1505*c*, and/or the like.

In one implementation, when the user selects action consumption 1505*c*, the PVTC may provide tags of the consumed items 1507*a*-*b*, e.g., by reading the bill barcode 1502, or by performing OCR on the bill image, etc. In one implementation, a user may drag the item 1507*a*, e.g., a "bloody Mary" 1508 into the "I Pay" bowl 1510. The user may tap on the plus sign 1509 to increase quantity of the consumed item. In one implementation, the user may tap on a card 1511 to indicate pay with this card for the item in the "I Pay" bowl 1510 as summarized in label 1512. In one implementation, the V-GLASSES may provide option labels for tips, including suggested tip percentage (e.g., 15% or 20%) 1513 or enter tip amount 1514.

Figure 26B:
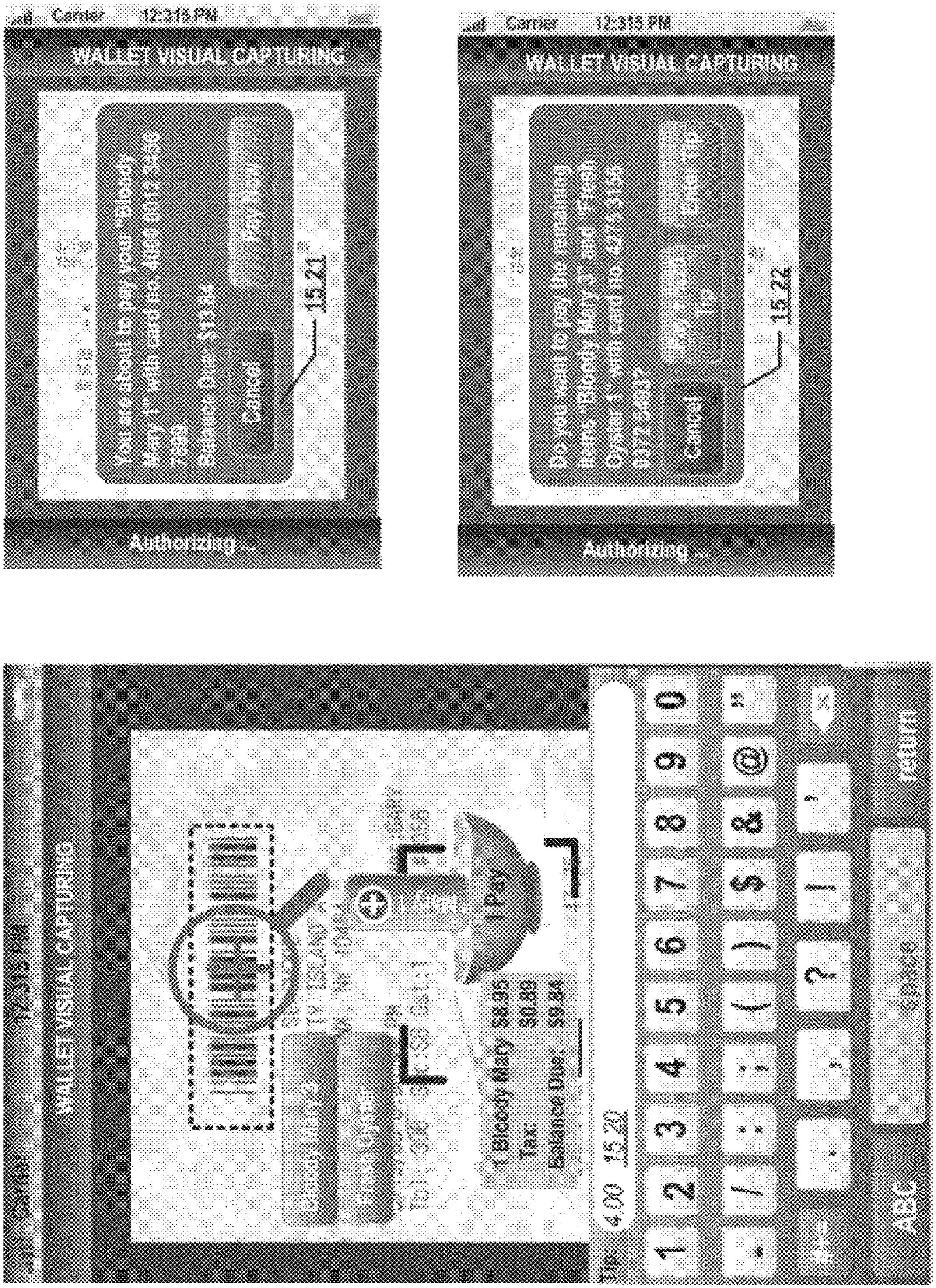

Continuing on with FIG. 26B, the user may manually enter a tip amount 1520. In one implementation, the V-GLASSES may prompt a message to the user summarizing the payment with the selected card 1521. Upon confirming payment with the first selected card, the V-GLASSES may automatically prompt the message to inquire whether the user would charge the remaining items on the bill to the second card 1522. In one implementation, the user may drag items for payment with the second card in a similar manner as described in FIG. 26A.

Figure 26C:
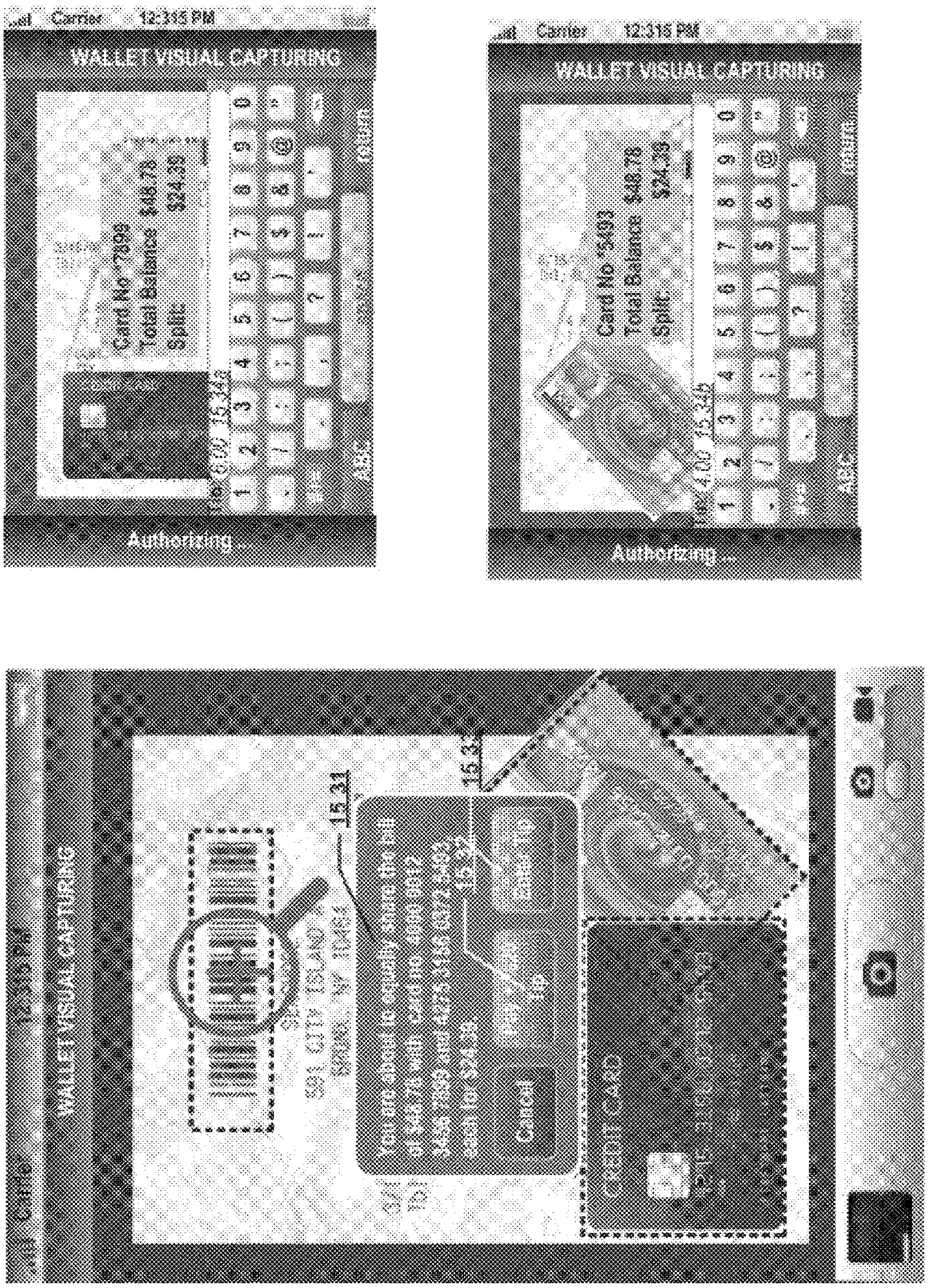

With reference to FIG. 26C, if the user selects equal share, the V-GLASSES may capture the card data and prompt a message 1531 showing payment information, and provide options of suggested tip amount 1532, or user manually enter tips 1533. In one implementation, if the user selects to manually enter tip amount, the user may enter different tip amounts for different cards, e.g., by tapping on one card and entering a tip amount 1534*a-b*.

Figure 26D:
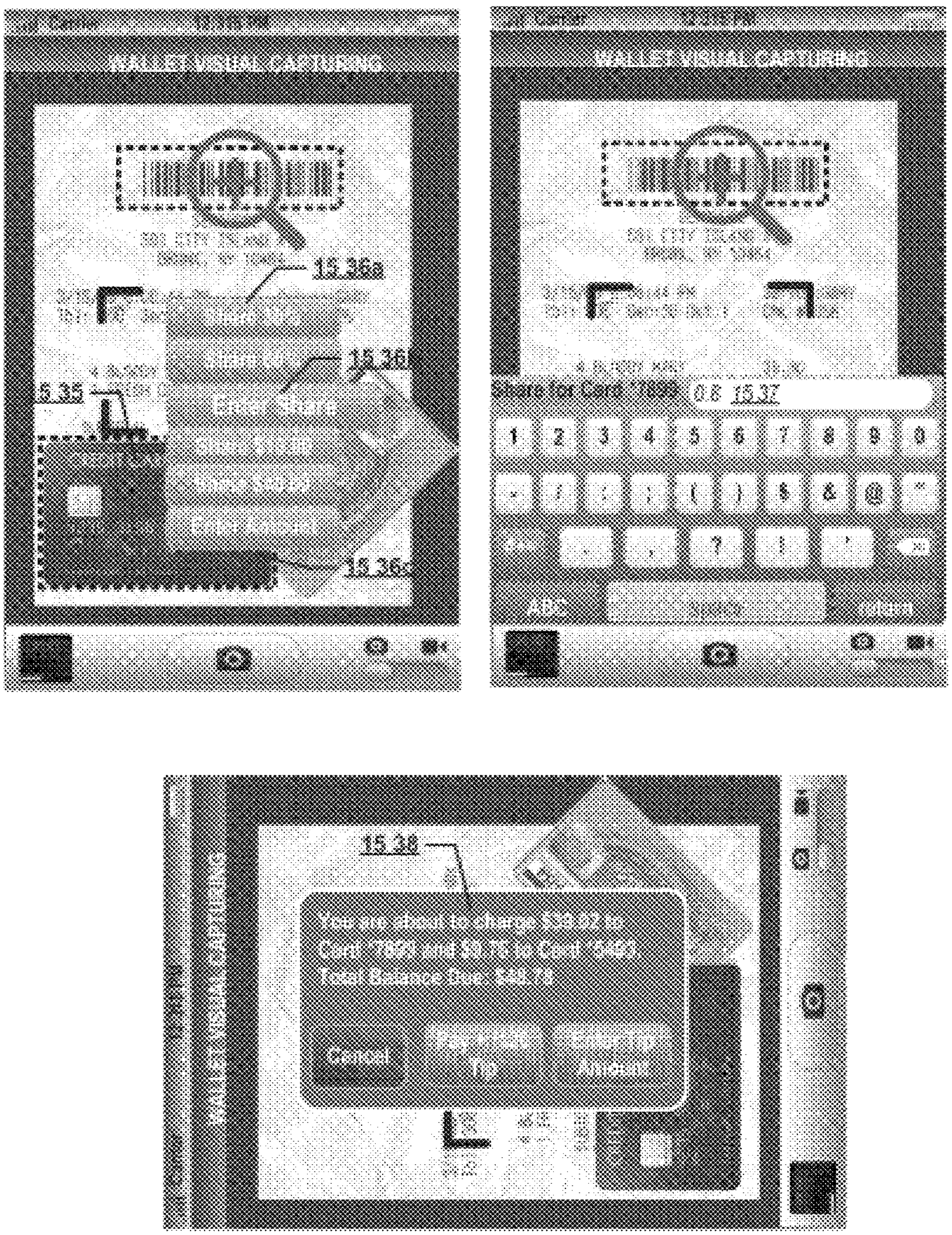

With reference to FIG. 26D, if the user selects prorate share, the user may tap on one card 1535, and the V-GLASSES may provide a plurality of labels including suggested share percentage 1536*a*, suggested share amount 1536*c*, or to enter a share 1536*b*. In one implementation, the user may enter a share for a selected card 1537, and view a message for a summary of the charge 1538. In one implementation, the user may select or enter a tip amount in a similar manner as in FIG. 26C.

Figure 26E:
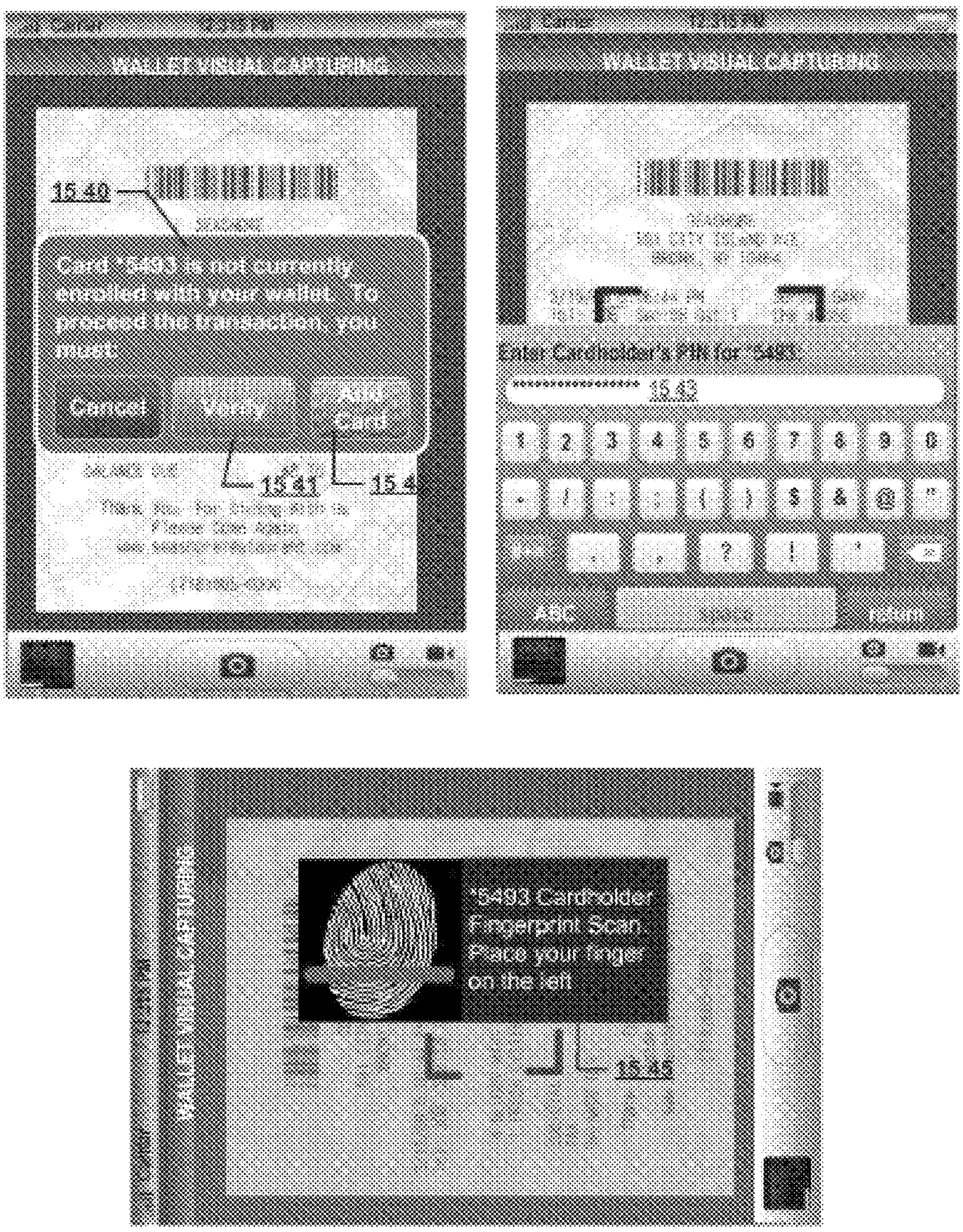

Continuing on with FIG. 26E, when a consumer attempts to engage V-GLASSES to split a bill with two cards belonging to two different cardholders, e.g., sharing a restaurant bill between two friends' credit cards, V-GLASSES may require authentication credentials to proceed with a transaction request upon a card that is not enrolled with the current wallet, and/or associated with a different cardholder. For example, continuing on with V-GLASSES capturing two cards "*7899" and "*5493" to split a bill (438 in FIG. 26D), the mobile device/wallet that is used to instantiate V-GLASSES component may belong to the cardholder of card *7899, and card *5493 belongs to a different cardholder. In one implementation, V-GLASSES may provide a message showing card *5493 is not currently enrolled with the wallet 1540, and in order to proceed with the transaction, requesting the consumer to either add card *5493 to the current wallet 1542, or to verify with authentication credentials 1541.

In one implementation, if the consumer elects "add card" 1542, the consumer may proceed with card enrollment in a similar manner as 215 in FIG. 13B. In another implementation, the consumer may elect to provide authentication credentials 1541, such as entering a cardholder's PIN for the card *5493 (e.g., 1543), submitting the cardholder's fingerprint scan 1545, and/or the like.

Figure 26F:
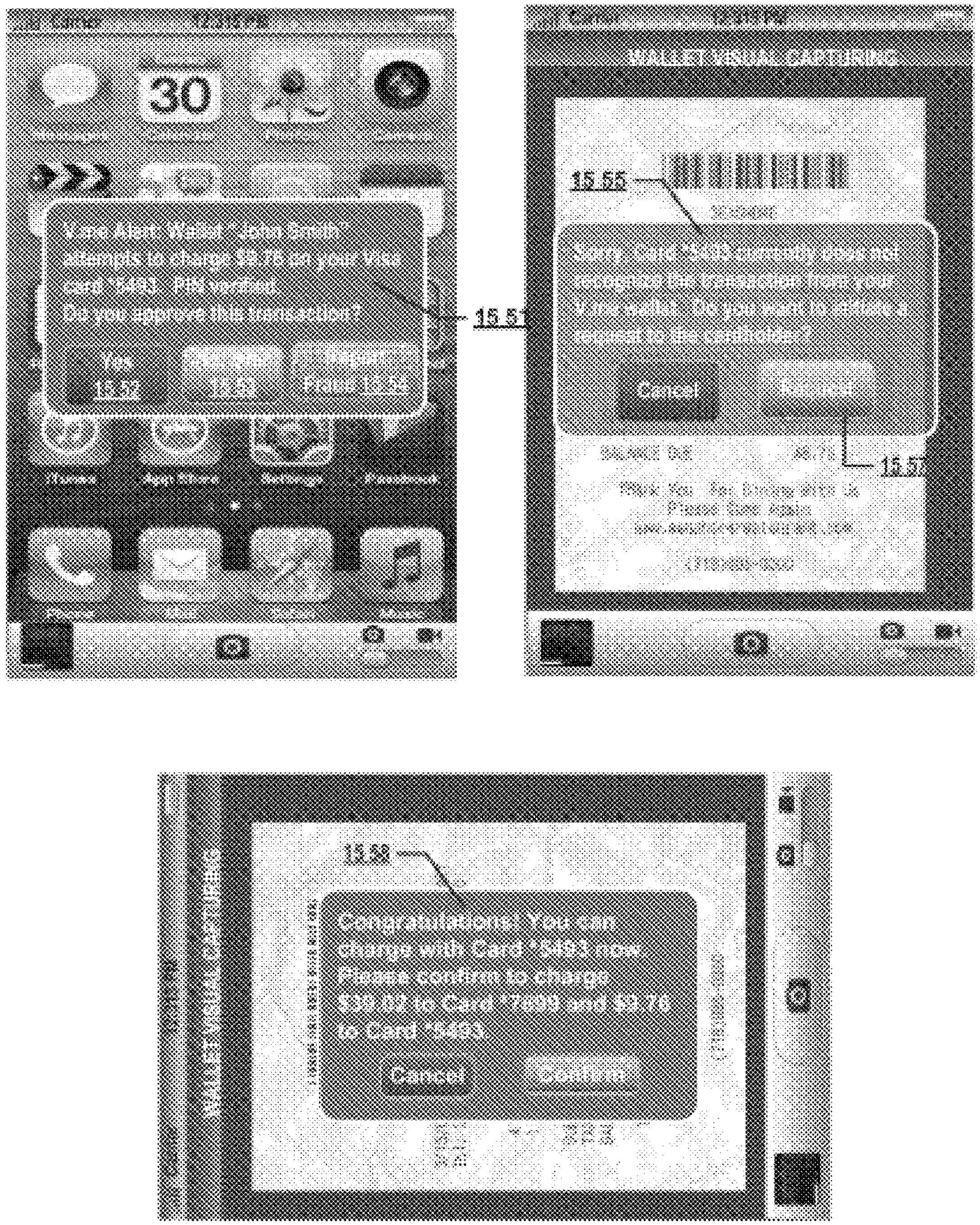

Continuing on with FIG. 26F, in one implementation, in addition to the authentication credential inputs, the cardholder of card *5493 may optionally receive an alert message informing the attempted usage of the card 1551. In one implementation, the alert message 1551 may be a V.me wallet push message, a text message, an email message, and/or the like. The cardholder of card *5493 may elect to approve the transaction 1552, reject the transaction 1553, and/or report card fraud 1554. In one implementation, if the submitted authentication credentials do not satisfy the verification, or the cardholder of card *5493 rejects the transaction, the V-GLASSES may receive an alert indicating the failure to charge card *5493 1555, and the consumer may initiate a request for further authentication or transaction processing 1557, e.g., by filling out an application form, etc. In another implementation, if the authentication is successful, the V-GLASSES may provide a confirmation message 1558 summarizing the transaction with card *5493.

Figure 27A:
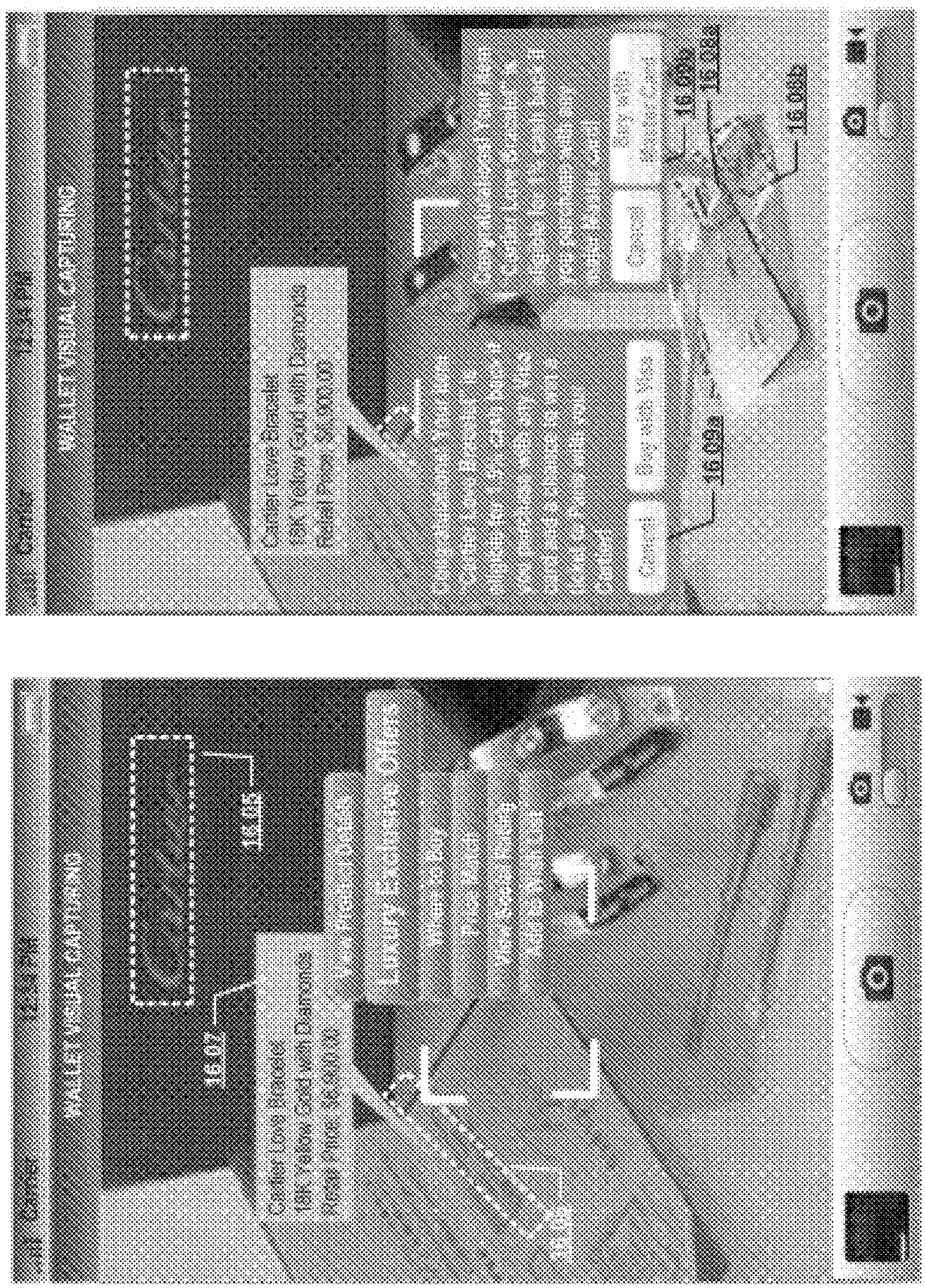
FIGS. 27A-27C provide exemplary user interface diagrams illustrating different layers of information label overlays within alternative embodiments of the V-GLASSES.

FIG. 27A provide exemplary user interface diagrams illustrating a card offer comparison scenario within embodiments of the V-GLASSES. In one implementation, various payment cards, such as Visa, MasterCard, American Express, etc., may provide cash back rewards to purchase transactions of eligible goods, e.g., luxury products, etc. In one implementation, when a user use the camera-enabled mobile device to capture a scene of a luxury brand item, the V-GLASSES may identify the item, e.g., via trademark 1605, item certificate information 1606, and/or the like. The V-GLASSES may provide a tag label overlaid on top of the item showing product information 1607, e.g., product name, brief description, market retail price, etc. In another implementation, the V-GLASSES may provide a plurality of overlay labels including view product details, luxury exclusive offers, where to buy, price match, view social rating, add to wish list, and/or the like.

In one implementation, a user may place two payment cards in the scene so that the V-GLASSES may capture the cards. For example, the V-GLASSES may capture the type of the card, e.g., Visa 1608*a* and MasterCard 1608*b*, and provide labels to show rebate/rewards policy associated with each card for such a transaction 1609*a-b*. As such, the user may select to pay with a card to gain the provided rebate/rewards.

Figure 27B:
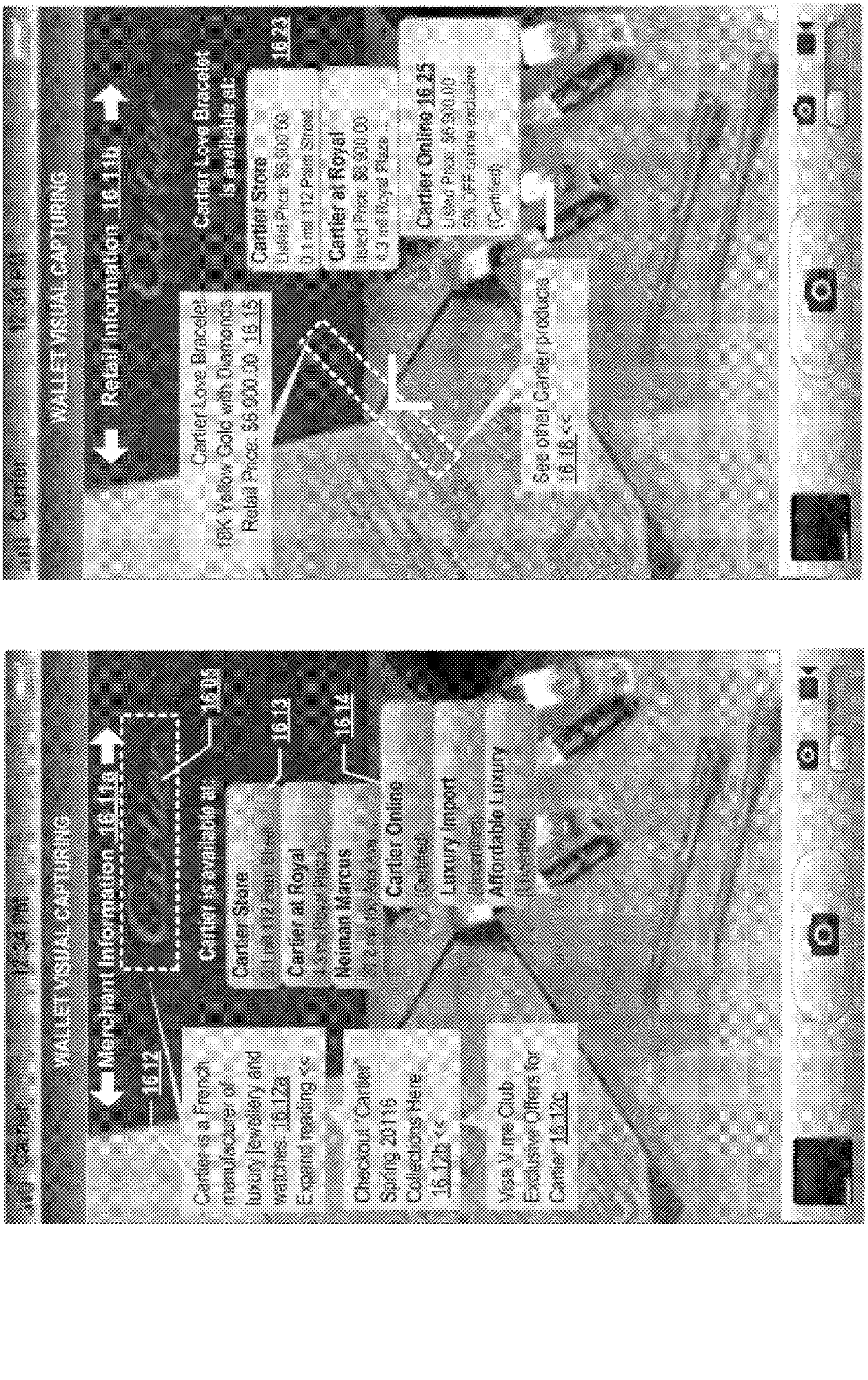
Figure 27C:
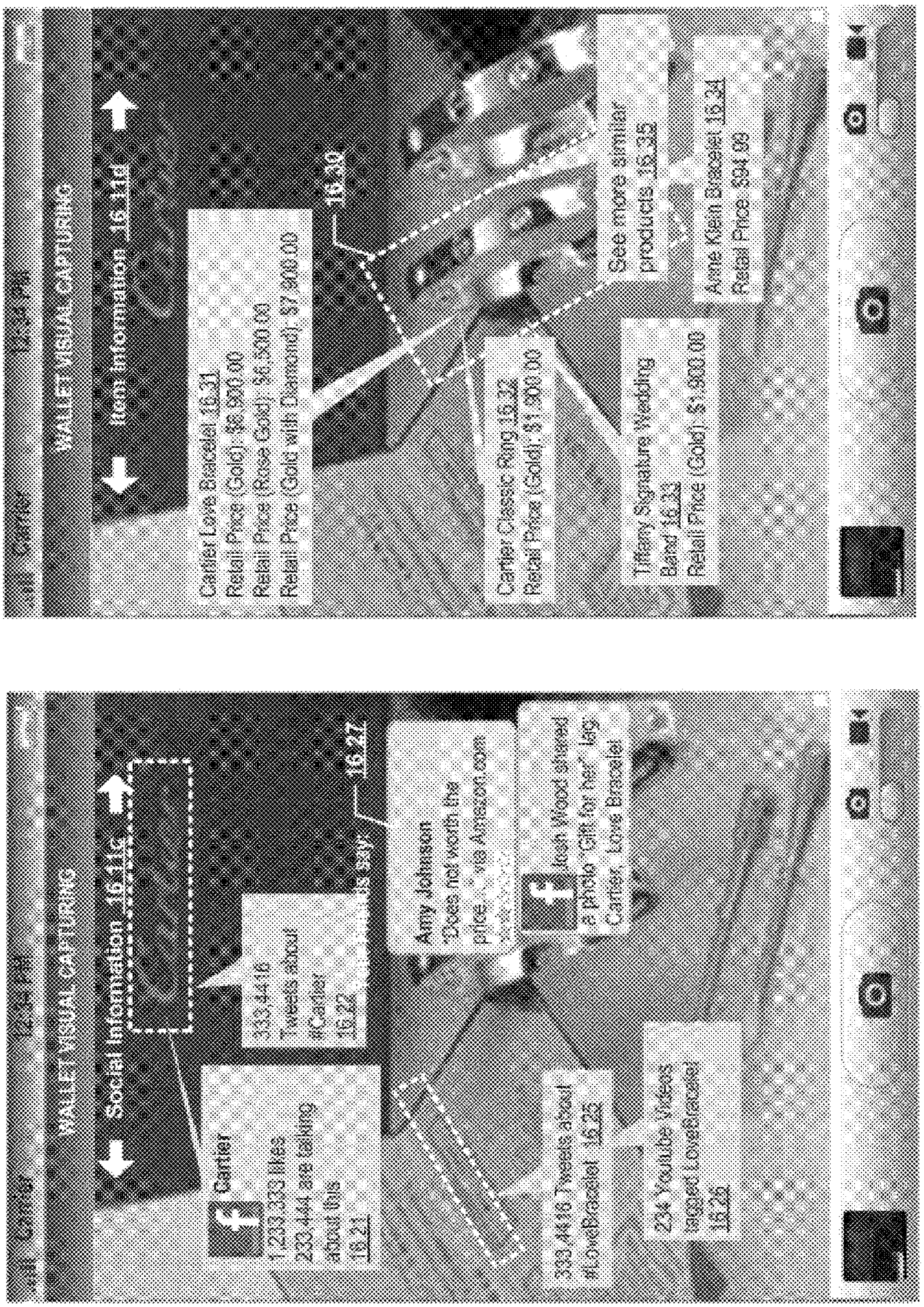
Figure 28:
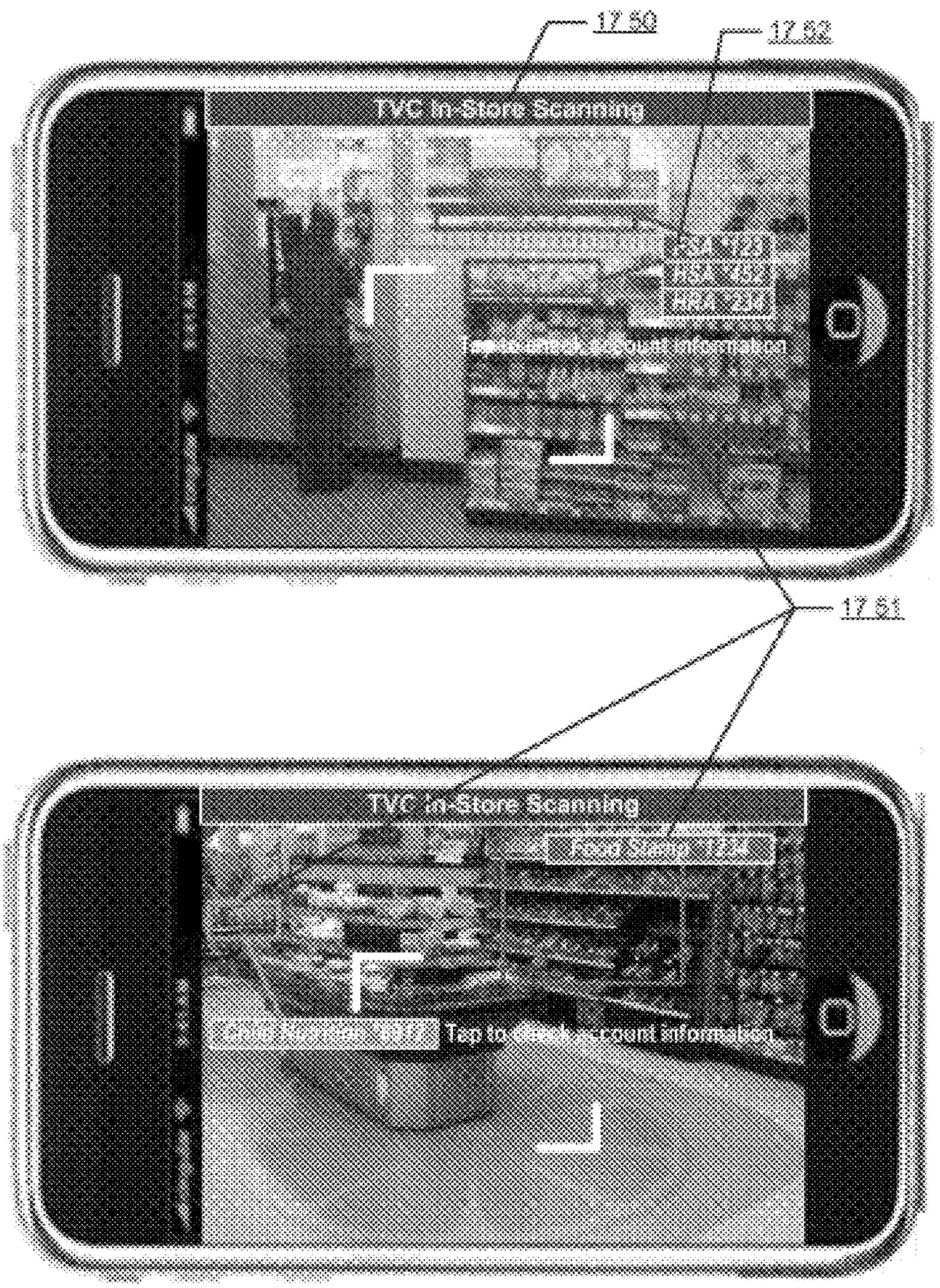
FIG. 28 provides exemplary user interface diagrams illustrating in-store scanning scenarios within embodiments of the V-GLASSES.

In an alternative embodiment, as shown in FIG. 27B-27D, V-GLASSES may categorize information overlays into different layers, e.g., a merchant information layer to provide merchant information with regard to the captured items in the scene, a retail information layer to provide retail inventory information with regard to the captured items in the scene, a social information layer to provide ratings, reviews, comments and/or other related social media feeds with regard to the captured items in the scene, and/or the like. For example, when V-GLASSES captures a scene that contains different objects, different layers of information with regard to different objects (e.g., a trademark logo, a physical object, a sales receipt, and/or the like) may be overlay on top of the captured scene.

With reference to FIG. 27B, when V-GLASSES captured a trademark label in the scene, e.g., "Cartier" 1605, V-GLASSES may provide a merchant information layer 1611*a* with regard to the trademark "Cartier." For example, virtual overlays may include a brief description of the merchant 1612*a*, product collections of the merchant 1612*b*, offers and discounts for the merchant 1612*c*, and/or the like. As another example, V-GLASSES may provide a list of retail stores featuring the captured object 1605, e.g., a list of local stores 1613, and online shopping sites 1614, and/or the like.

In another implementation, a consumer may slide the information layer 1611*a* to obtain another layer, e.g., retail information 1611*b*, social information 1611*c*, item information 1611*d*, and/or the like. For example, PVTC may capture a receipt and/or certificate in the scene, and provide information including other Cartier products 1618, purchase item description and price information 1615, retail store inventory information (e.g., stores where the purchase item is available) including physical stores 1623 and online shopping sites 1625, and/or the like.

In further embodiments, a consumer may tap on the provided virtual label of a "Cartier" store, e.g., 1613, 1623, etc., and be directed to a store map including inventory information, e.g., as shown in FIG. 16B. For example, a store map may provide distribution of product items, goods to facilitate a consumer to quickly locate their desired products in-store.

With reference to FIG. 27C, a consumer may slide the virtual label overlay layer to view another layer of information labels, e.g., social information 1611*c*, item information 1611*d*, and/or the like. In one implementation, a social layer 1611*c* may provide virtual labels indicating social reviews, ratings, comments, activities obtained from social media platforms (e.g., Facebook, twitter, etc.) related to captured object in the visual scene. For example, when V-GLASSES captures the trademark logo "Cartier" in the scene, V-GLASSES may provide virtual labels of social comments related to the trademark "Cartier," e.g., Facebook activities 1621, tweets 1622, etc. In another implementation, when V-GLASSES captures a sales receipt including product identifying information, V-GLASSES may provide virtual labels of social ratings/comments related to the product, e.g., tweets with the hash tag of the product name 1625, YouTube review videos that tag the product name 1626, and/or the like. In another implementation, the social information layer 1611*c* may further provide sample social comments, product reviews, ratings related to the related product information, e.g., Facebook comments, photo postings, etc. related to "Cartier" from the consumer's Facebook friends 1627.

In another implementation, for additional captured objects 1630 in the scene (e.g., objects without textual contents, etc.), V-GLASSES may perform a pattern recognition to provide information of the recognized object 1630. For example, the pattern recognition may be correlated with other contexts within the scene to determine what the captured object is, e.g., the ring shaped object 1630 may be a piece of "Cartier" branded jewelry as the "Cartier" logo is captured in the same scene. In one implementation, the V-GLASSES may provide identified item information 1631 in a virtual label, and alternative item recognition information 1632, 1633, 1634. For example, for the ring-shaped product 1630, the V-GLASSES may recognize it as a "Cartier" branded bracelet 1631/1632, or ring shaped jewelry products of related brands 1633, 1634, and/or provide an option to the consumer to see more similar products 1635.

FIG. 20 provides exemplary user interface diagrams illustrating in-store scanning scenarios within embodiments of the V-GLASSES. In one implementation, V-GLASSES may facilitate a user to engage a restricted-use account for the cost of eligible items. A restricted-use account may be a financial account having funds that can only be used for payment of approved products (e.g., prescription drugs, vaccine, food, etc.) and/or services (e.g., healthcare treatment, physical examination, etc.). Examples of a restricted use account may comprise Flexible Savings Accounts (FSA), one or more Health Savings Accounts (HSA), Line of Credit (LOC), one or more health reimbursement accounts (HRA), one or more government insurance programs (i.e., Medicare or Medicaid), various private insurance-rules, various other restricted use favored payment accounts such as employment benefit plans or employee pharmacy benefit plans, and income deduction rules, and/or the like. In other examples, the restricted-use account may comprise a food voucher, a food stamp, and/or the like. Within implementations, the approval process of payment with a restricted use account may be administered by a third party, such as, but not limited to FSA/HSA administrator, government unemployment program administrator, and/or the like.

In one implementation, the V-GLASSES may automatically identify goods that are eligible for restricted-use accounts in a merchant store. For example, the V-GLASSES may allow a user to place a camera enabled device at a merchant store (e.g., scanning), and view a camera scene with augmented reality labels to indicate possible items eligible for a restricted-use account.

For example, in one implementation, when the user operate the camera enabled device to obtain a view inside the merchant store 1750, the user may also obtain augmented reality labels 1751 which identifies various products/items on the shelf, and show one or more possible eligible restricted-use accounts 1752. For example, over the counter drugs may be labeled as eligible for "FSA, HSA, HRA," etc., 1752; grocery products may be eligible for food stamp usage; and infant food may be eligible for a children nutrition benefit account, and/or the like.

Figure 29:
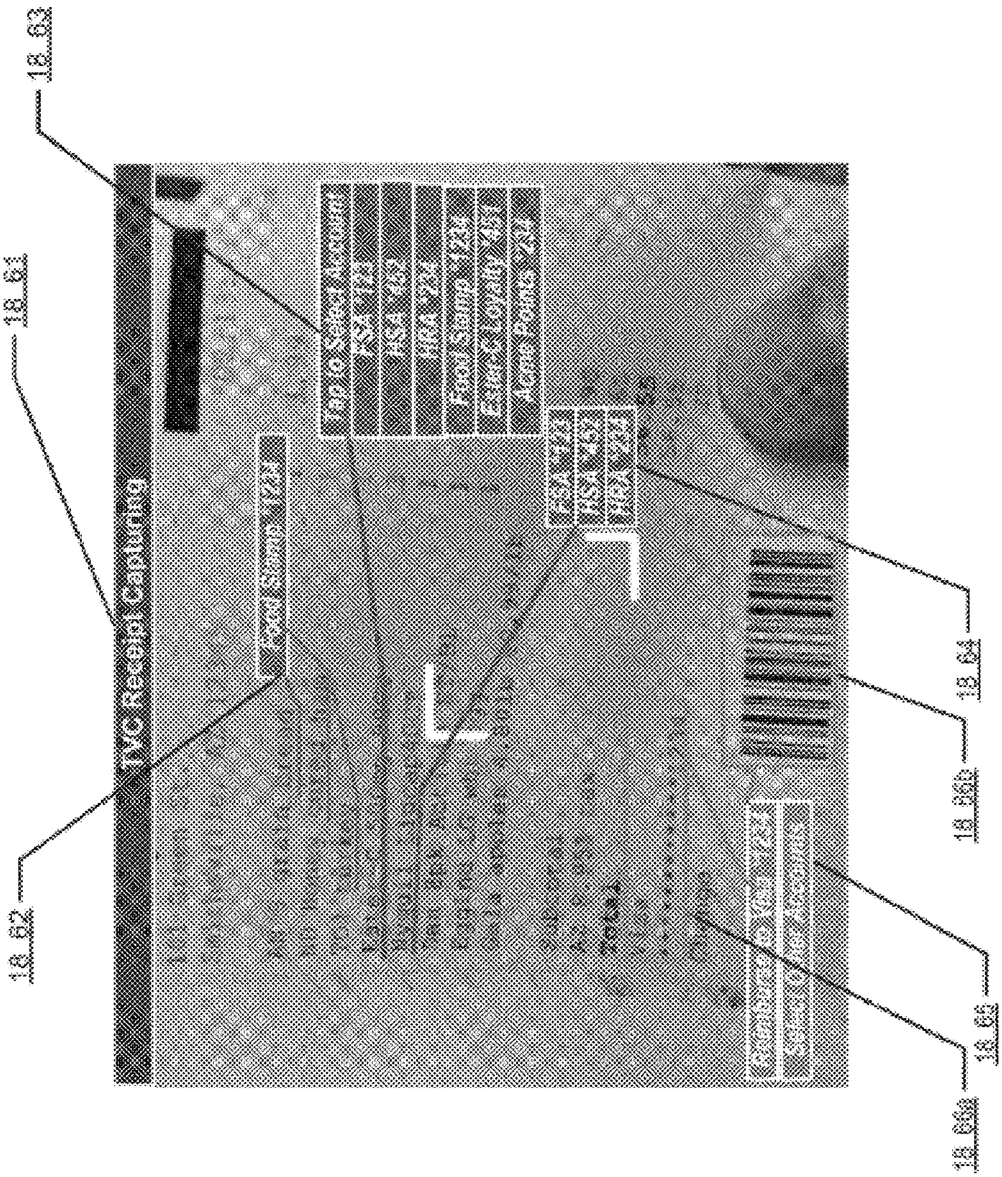
FIGS. 29-30 provide exemplary user interface diagrams illustrating post-purchase restricted-use account reimbursement scenarios within embodiments of the V-GLASSES.
Figure 30:
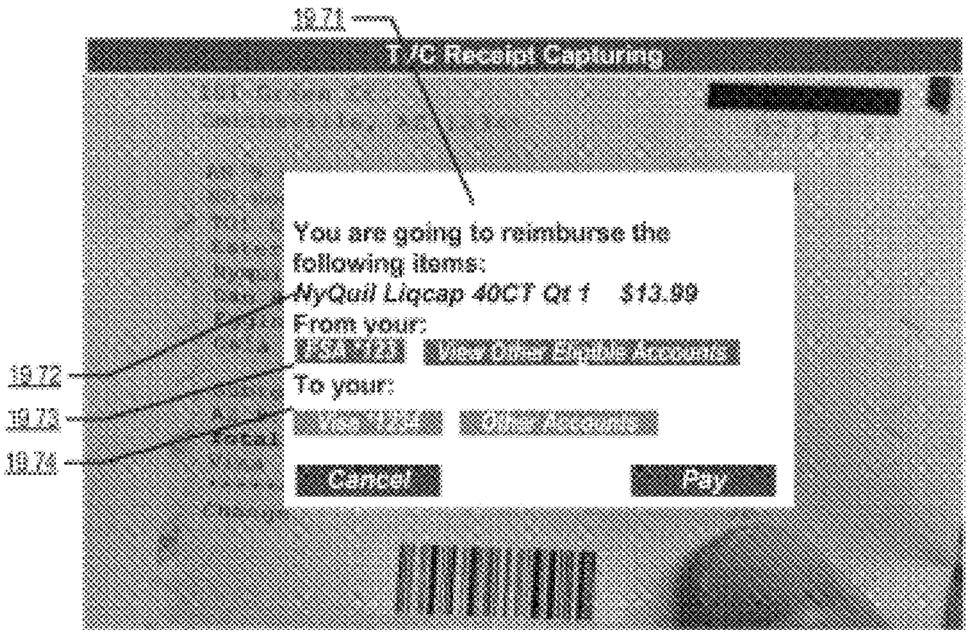
Figure 30:
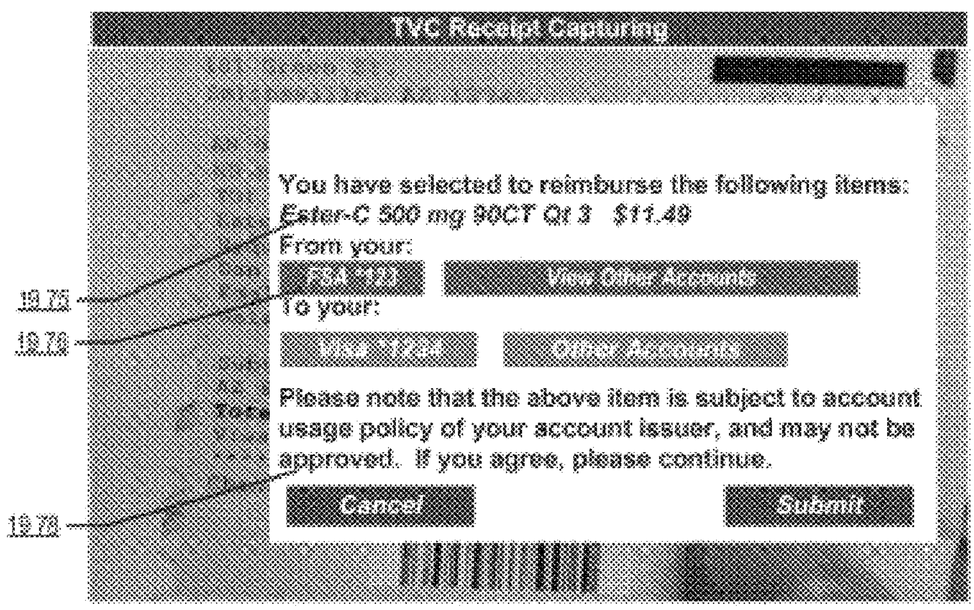

FIGS. 29-30 provide exemplary user interface diagrams illustrating post-purchase restricted-use account reimbursement scenarios within embodiments of the V-GLASSES. In one implementation, a user may operate a camera enabled device to capture a view of a receipt 1861, and obtain augmented reality labels 1862 indicating items that are eligible for restricted-use accounts. For example, the V-GLASSES wallet component may perform an instant OCR to extract item information and determine items such as "Nyquil" is eligible for FSA/HSA/HRA 1864 usage, and grocery/food items are eligible for food stamp 1862 usages. In one implementation, if the user taps on the displayed account, the V-GLASSES may generate a virtual receipt and proceed to process reimbursement request with the selected restricted-use account.

In further implementation, if the V-GLASSES does not automatically determine an item as eligible for any restricted-use accounts, e.g., an "Ester-C" supplement, a user may tap on the screen to select it, and may view a list of accounts to select a user desired reallocation account, e.g., any restricted-use account, loyalty account, and/or the like.

In further implementations, the V-GLASSES may identify a payment account that has been used to fulfill the transaction associated with the receipt, e.g., a Visa account 1866*a*, and/or obtain account information from the barcode printed on the receipt 1866*b*. In one implementation, the V-GLASSES may match the "*1234" Visa account with any of user's enrolled account in the wallet, and recommend the user to reimburse funds into an identified "Visa *1234" account if such account is identified from the wallet 1865. In another implementation, the V-GLASSES may prompt the user to select other accounts for depositing reimbursement funds 1865.

Continuing on with FIG. 30, if the user has tapped on an account, e.g., "FSA" at 1964 in FIG. 30 to reimburse an eligible item, the V-GLASSES may generate a reimbursement request 1971, e.g., showing the user is going to reimburse "Nyquil Lipcap" 1972 from the selected "FSA *123" account 1973. In one implementation, the user may indicate an account for depositing the reimbursement funds, e.g., the "Visa *1234" 1974 account auto-identified from the receipt (e.g., at 1966*a-b* in FIG. 30H), and/or select other accounts.

In another implementation, if the user selects to tap on 1963 in FIG. 30H to reimburse "Ester-C" 1975 for "FSA *123" account 1976, as the V-GLASSES does not identify "Ester-C" as an eligible FSA item, the V-GLASSES may generate a reimbursement request but with a notification to the user that such reimbursement is subject to FSA review and may not be approved 1978.

Figure 31A:
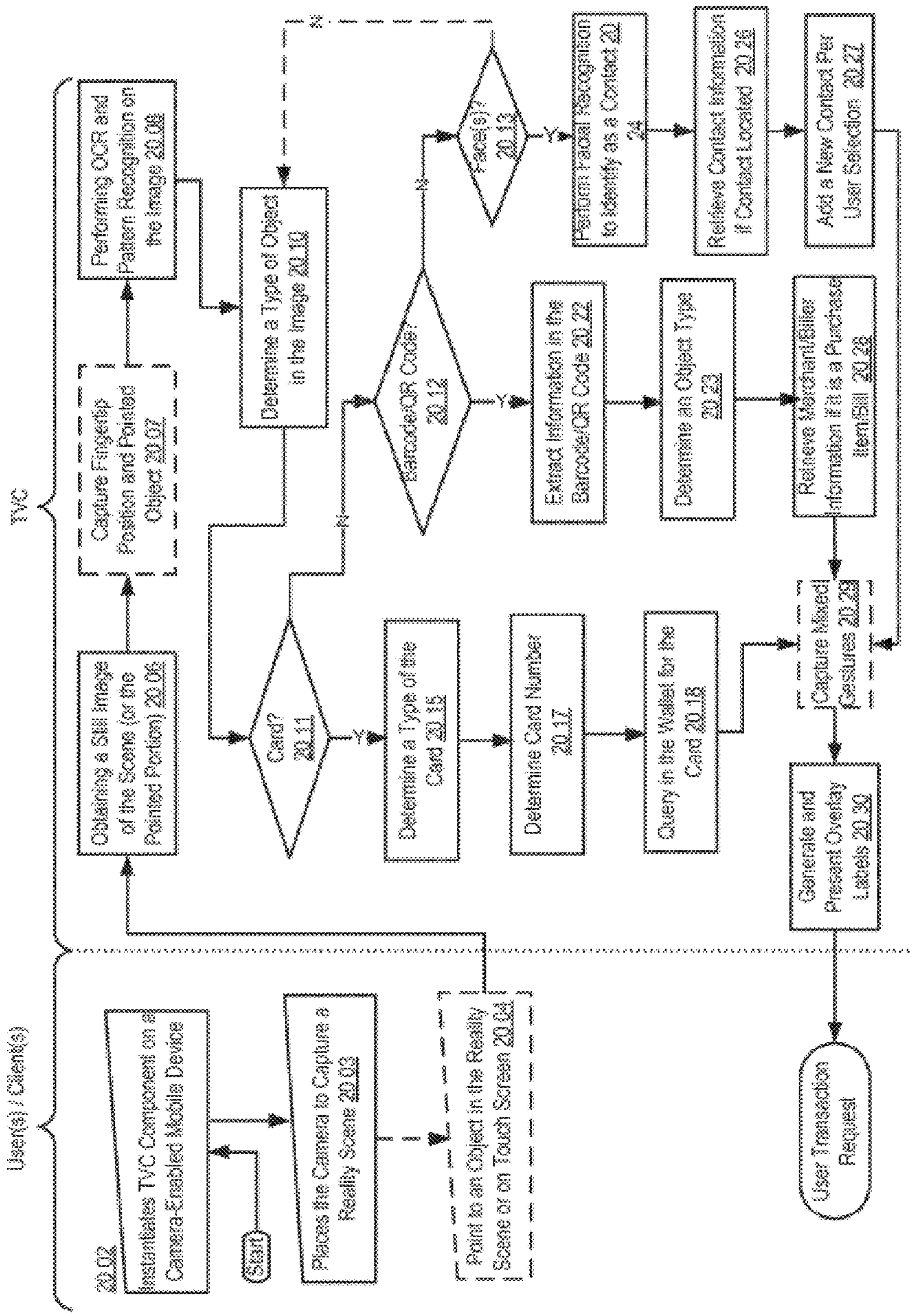
FIGS. 31A-31D provides a logic flow diagram illustrating V-GLASSES overlay label generation within embodiments of the V-GLASSES.

FIG. 31A provides an exemplary logic flow diagram illustrating aspects of V-GLASSES overlay label generation within embodiments of the V-GLASSES. Within implementations, a user may instantiate a V-GLASSES component on a camera-enabled mobile device (e.g., an Apple iPhone, an Android, a BlackBerry, and/or the like) 2002, and place the camera to capture a reality scene (e.g., see 913 in FIG. 20A). In one implementation, the user may point to an object (e.g., a card, a purchase item, etc.) in the reality scene, or touch on the object image as shown on the screen 2004 (e.g., see 912 in FIG. 20A).

In one implementation, upon receiving user finger indication, the V-GLASSES may obtain an image of the scene (or the user finger pointed portion) 2006, e.g., grabbing a video frame, etc. In one implementation, the V-GLASSES may detect fingertip position within the video frame, and determine an object around the fingertip position for recognition 2007. The V-GLASSES may then perform OCR and/or pattern recognition on the obtained image (e.g., around the fingertip position) 2008 to determine a type of the object in the image 2010. For example, in one implementation, the V-GLASSES may start from the finger point and scan outwardly to perform edge detection so as to determine a contour of the object. The V-GLASSES may then perform OCR within the determined contour to determine a type of the object, e.g., whether there is card number presented 2011, whether there is a barcode or QR code presented 2012, whether there is a human face 2013, and/or the like.

In one implementation, if there is a payment card in the reality scene 2011, the V-GLASSES may determine a type of the card 2015 and the card number 2017. For example, the V-GLASSES may determine whether the card is a payment card (e.g., a credit card, a debit card, etc.), a membership card (e.g., a metro card, a store points card, a library card, etc.), a personal ID (e.g., a driver's license, etc.), an insurance card, and/or the like, based on the obtained textual content via OCR from the card. In one implementation, the V-GLASSES may query the user wallet for the card information 2018 to determine whether the card matches with any enrolled user account, and may generate and present overlay labels 2030 based on the type of the card (e.g., see overlay labels 927*a-e* for an identified Visa credit card 911 in FIG. 20C, overlay labels 1112*a-e* for an identified metro card and overlay labels 1114*a-d* for an identified DMV license 1113 in FIG. 22, overlay labels 1218*a-e* for an identified library card 1217 and overlay labels 1221*a*-1221*e* for an identified restaurant membership card 1220 in FIG. 23, overlay labels 1325*a-e* for an identified insurance card 1324 in FIG. 24, and/or the like). In one implementation, the V-GLASSES may optionally capture mixed gestures within the captured reality scene 2029, e.g., consumer motion gestures, verbal gestures by articulating a command, etc. (see FIGS. 32-41).

In another implementation, if there is a barcode and/or QR code detected within the reality scene 2012, the V-GLASSES may extract information from the barcode/QR code 2022, and determine a type of the object 2023, e.g., the barcode information may indicate whether the object comprises a purchase item, a bill, an invoice, and/or the like. In one implementation, the V-GLASSES may retrieve merchant information when the object comprises a purchase item, and/or biller information when the object comprises a bill 2028, and generate overlay labels accordingly, e.g., see overlay labels 1327*a-e* for an identified invoice 1326 in FIG. 24, overlay labels 1433*a-g* for an identified purchase item/product 1431 in FIG. 25, and/or the like.

In another implementation, if there is a human face detected from the reality scene 2013, the V-GLASSES may perform facial recognition to identify whether the presented human face matches with an existing contact 2024. In one implementation, the V-GLASSES may retrieve contact information if the contact is located from a contact list 2026, and/or add a new contact 2027 per user selection if the human face does not match with any existing contact record. The V-GLASSES may then generate and present overlay labels for the detected human face, e.g., see overlay labels 1008*a-f* for an identified face 1002 in FIG. 22, etc.

Upon user selection of the overlay labels, the V-GLASSES may proceed to transfer funds to an identified card, identified contact, and/or the like. The V-GLASSES may send financial transaction requests to an issuer network for processing, which may be performed in a similar manner as in FIGS. 52A-54B.

Figure 31B:
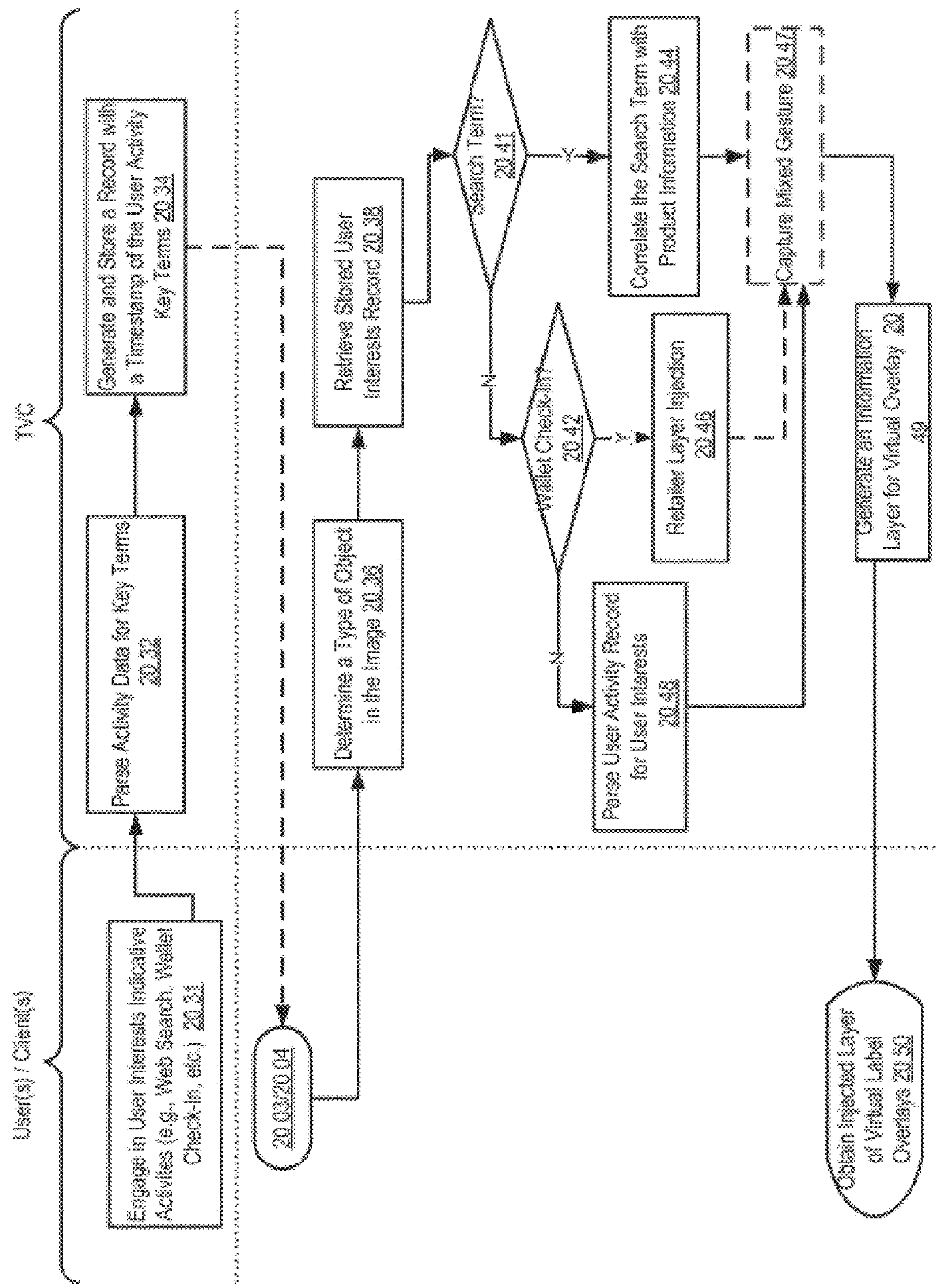

FIG. 31B provides an exemplary logic flow diagram illustrating automatic layer injection within alternative embodiments of the V-GLASSES. In one implementation, V-GLASSES may inject a layer of virtual information labels (e.g., merchant information, retail information, social information, item information, etc.) to the captured reality scene based on intelligent mining of consumer's activities, e.g., GPS location, browsing history, search terms, and/or the like.

In one implementation, a consumer may engage in user interests indicative activities (e.g., web searches, wallet check-in, etc) 2031. For example, as shown in FIG. 12C, a web search based on key terms "affordable wide-angle lens" showed user interests in price comparison; wallet check event at a local retail store indicates the user's interests of information of the retail store. Within implementations, the V-GLASSES may parse the received activity record for key terms 2032, and generate a record with a timestamp of the user activity key terms 2034. In one implementation, the V-GLASSES may store the generated record at a local storage element at the user mobile device, or alternatively store the generated user activity record at a remote V-GLASSES server.

In one implementation, when a consumer uses a mobile device to capture a reality scene (e.g., 2003/2004), V-GLASSES may determine a type of the object in the captured visual scene 2036, e.g., an item, card, barcode, receipt, etc. In one implementation, the V-GLASSES may retrieve stored user interest record 2038, and obtain information in the stored record. If the user interests record comprise a search term 2041, V-GLASSES may correlate the search term with product information 2044 (e.g., include price comparison information if the user is interested in finding the lowest price of a product, etc.), and generate an information layer for the virtual overlay 2049. In one implementation, the V-GLASSES may optionally capture mixed gestures within the captured reality scene 2029, e.g., consumer motion gestures, verbal gestures by articulating a command, etc. (see FIGS. 32-41).

In another implementation, if the user interests record comprise a real-time wallet check-in information 2042 of the consumer checking in at a retail store, the V-GLASSES may insert a retailer layer of virtual labels 2046 to the consumer device. In another implementation, the V-GLASSES may parse the user activity record for user interests indicators 2048 for other types of user activity data, e.g., browsing history, recent purchases, and/or the like, and determine an information layer of virtual overlay 2047. The consumer may obtain an automatically recommended injected layer of virtual label overlays 2050, and may switch to another layer of information labels by sliding on the layer, e.g., see 1611*a-d* in FIGS. 27B-27C.

Figure 31C:
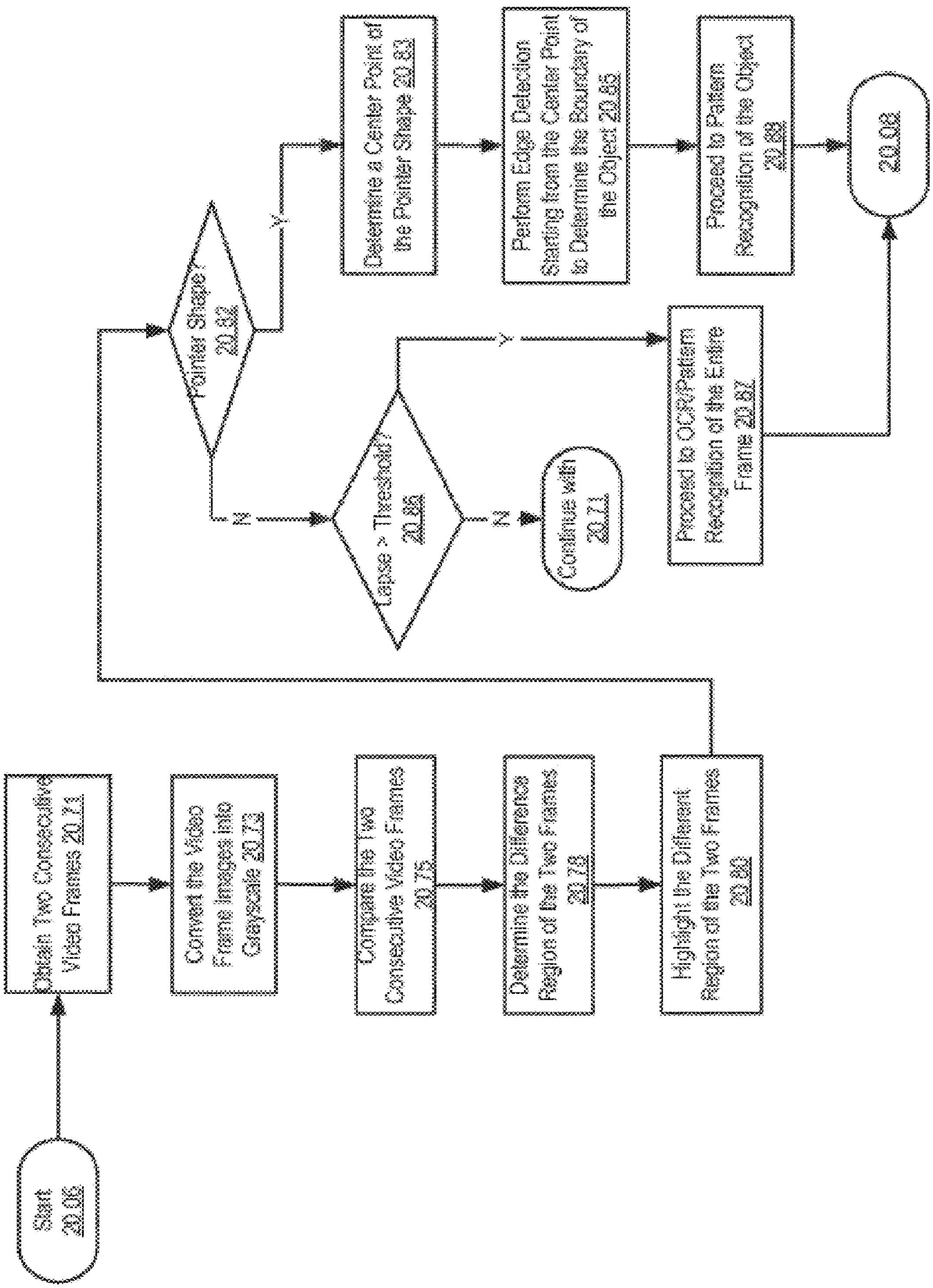

FIG. 31C provides an exemplary logic flow illustrating aspects of fingertip motion detection within embodiments of the V-GLASSES. Within embodiments, V-GLASSES may employ motion detection components to detect fingertip movement within a live video reality scene. Such motion detection component may be comprised of but not limited to FAST Corner Detection for iPhone, Lucas-Kanade (LK) Optical Flow for iPhone, and/or the like. In other implementations, classes defined under iOS developer library such as AVMutableCompisition, UIImagePickerController, etc., may be used to develop video content control components.

As shown in FIG. 31C, upon obtaining video capturing at 2006, the V-GLASSES may obtain two consecutive video frame grabs 2071 (e.g., every 100 ms, etc.). The V-GLASSES may convert the video frames into grayscale images 2073 for image analysis, e.g., via Adobe Photoshop, and/or the like. In one implementation, the V-GLASSES may compare the two consecutive video frames 2075 (e.g., via histogram comparison, etc.), and determine the difference region of the two frames 2078. In one implementation, the V-GLASSES may highlight the different region of the frames, which may indicate a "finger" or "pointer" shaped object has moved into the video scene to point to a desired object.

In one implementation, the V-GLASSES may determine whether the difference region has a "pointer" shape 2082, e.g., a fingertip, a pencil, etc. If not, e.g., the difference region may be noise caused by camera movement, etc., the V-GLASSES may determine whether the time lapse has exceeded a threshold. For example, if the V-GLASSES has been capturing the video scene for more than 10 seconds and detects no "pointer" shapes or "fingertip," V-GLASSES may proceed to OCR/pattern recognition of the entire image 2087. Otherwise, the V-GLASSES may re-generate video frames at 2071.

In one implementation, if a "fingertip" or a "pointer" is detected at 2082, the V-GLASSES may determine a center point of the fingertip, e.g., by taking a middle point of the X and Y coordinates of the "fingertip." The V-GLASSES may perform edge detection starting from the determined center point to determine the boundary of a consumer pointed object 2085. For example, the V-GLASSES may employ edge detection components such as, but not limited to Adobe Photoshop edge detection, Java edge detection package, and/or the like. Within implementations, upon V-GLASSES has defined boundaries of an object, the V-GLASSES may perform OCR and pattern recognition of the defined area 2088 to determine a type of the object.

Figure 31D:
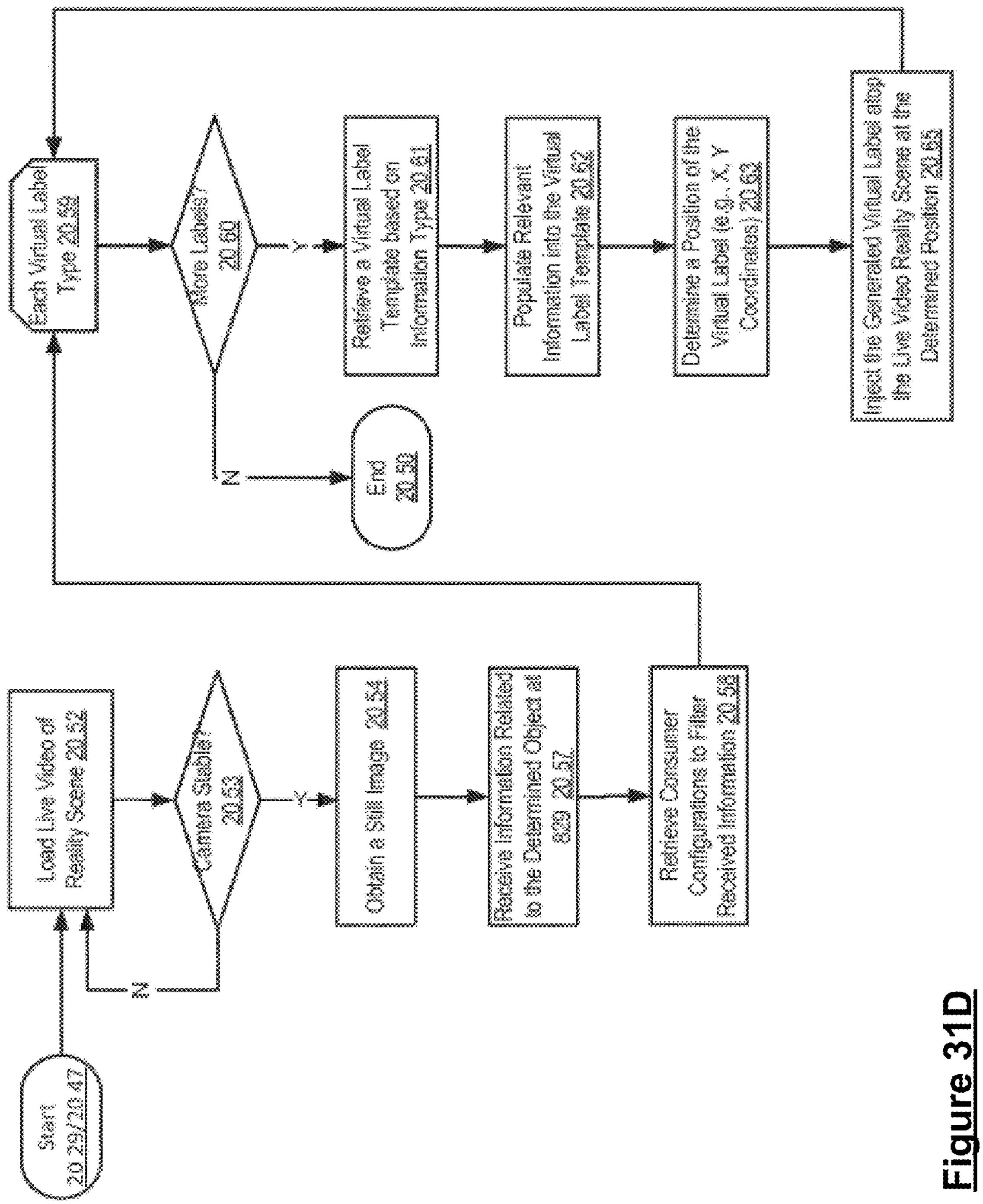

FIG. 31D provides an exemplary logic flow illustrating aspects of generation of a virtual label (e.g., 2030, 2049, etc.) within embodiments of the V-GLASSES. In one implementation, upon loading relevant information and mixed gestured within the video reality scene with regard to a detected object (e.g., a credit card, a barcode, a QR code, a product item, etc.) at 2029 in FIG. 31A, or 2047 in FIG. 31B, the V-GLASSES may load live video of the reality scene 2052. If the camera is stable 2053, the V-GLASSES may obtain a still image 2054, e.g., by capturing a video frame from the live video, etc. In one implementation, the image may be obtained at 2006 in FIG. 31A.

Within implementations, V-GLASSES may receive information related to the determined object 2057 (e.g., 2018, 2027, 2028 in FIG. 31A), and filter the received information based on consumer configurations 2058 (e.g., the consumer may have elected to display only selected information labels, see FIGS. 12C-12D). For each virtual label 2059, the V-GLASSES may determine, if there is more information or more label to generate 2060, the V-GLASSES may retrieve a virtual label template 2061 based on the information type (e.g., a social rating label may have a social feeds template; a product information label may have a different template, etc.), and populate relevant information into the label template 2062. In one implementation, the V-GLASSES may determine a position of the virtual label (e.g., the X-Y coordinate values, etc.) 2063, e.g., the virtual label may be positioned close to the object, and inject the generated virtual label overlaying the live video at the position 2065.

For example, a data structure of a generated virtual label, substantially in the form of XML-formatted data, is provided below:

```
<?XML version = "1.0" encoding = "UTF-8"?>
<virtual_label>
  <label_id> 4NFU4RG94 </label_id>
  <timestamp>2014-02-22 15:22:41</timestamp>
  <user_id>john.q.public@gmail.com </user_id>
  <frame>
    <x-range> 1024 </x-range>
    <y-range> 768 </y-range>
  ...
  </frame>
  <object>
    <type> barcode </type>
    <position>
      <x_start> 102 <x_start>
      <x_end> 743</x_end>
      <y_start> 29 </y_start>
      <y_end> 145 </y_end>
    </position>
    ...
  </object>
  <information>
    <product_name> "McKey Chocolate Bar"
</product_name>
    <product_brand> McKey </product_brand>
    <retail_price> 5.99 </retail_price>
    <engageability> enabled </engageability>
    <link>
www.amazon.com/product_item/Mckeychoco/1234 </link>
    ...
  </information>
  <orientation> horizontal </orientation>
  <format>
    <template_id> Product001 </template_id>
    <label_type> oval callout </label_type>
    <font> ariel </font>
    <font_size> 12 pt </font_size>
    <font_color> Orange </font_color>
    <overlay_type> on top </overlay_type>
    <transparency> 50% </transparency>
    <background_color> 255 255 0
</background_color>
    <label_size>
      <shape> oval </shape>
      <long_axis> 60 </long_axis>
      <short_axis> 40 </short_axis>
    <object_offset> 30 </object_offset>
      ...
    </label_size>
    ...
  </format>
  <injection_position>
    <X_coordinate> 232 </X_coordinate>
    <Y_coordiante> 80 </Y_coordinate>
  </injection_position>
  ...
</virtual_label>
```

In the above example, the generated virtual label data structure includes fields such as size of the video frame, the captured object (e.g., the object is a barcode, etc.), information to be included in the virtual label, orientation of the label, format of the virtual label (e.g., template, font, background, transparency, etc.), injection position of the label, and/or the like. In one implementation, the virtual label may contain an informational link, e.g., for the product information in the above example, an Amazon link may be provided, etc. In one implementation, the injection position may be determined based on the position of the object (e.g., X, Y coordinates of the area on the image, determined by a barcode detector, etc.).

Figure 32:
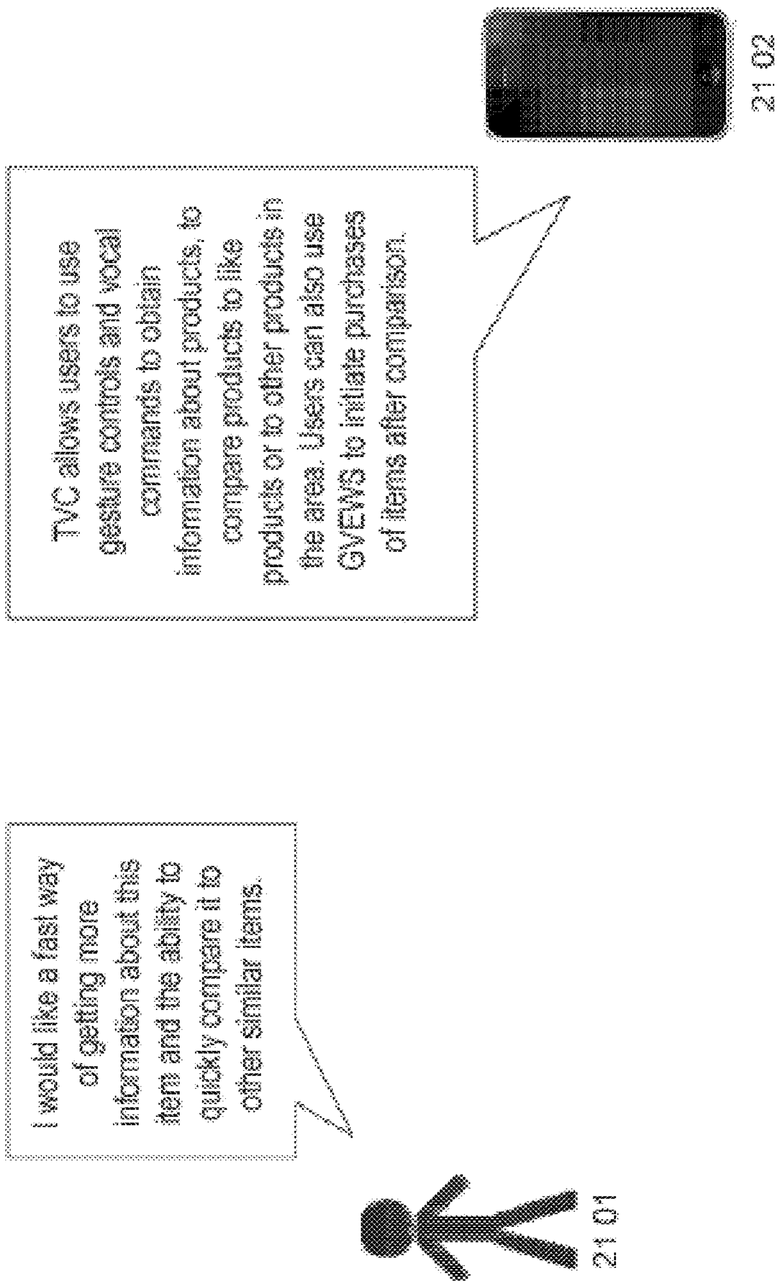
FIG. 32 shows a schematic block diagram illustrating some embodiments of the V-GLASSES.

FIG. 32 shows a schematic block diagram illustrating some embodiments of the V-GLASSES. In some implementations, a user 2101 may wish to get more information about an item, compare an item to similar items, purchase an item, pay a bill, and/or the like. V-GLASSES 2102 may allow the user to provide instructions to do so using vocal commands combined with physical gestures. V-GLASSES allows for composite actions composed of multiple disparate inputs, actions and gestures (e.g., real world finger detection, touch screen gestures, voice/audio commands, video object detection, etc.) as a trigger to perform a V-GLASSES action (e.g., engage in a transaction, select a user desired item, engage in various consumer activities, and/or the like). In some implementations, the user may initiate an action by saying a command and making a gesture with the user's device, which may initiate a transaction, may provide information about the item, and/or the like. In some implementations, the user's device may be a mobile computing device, such as a tablet, mobile phone, portable game system, and/or the like. In other implementations, the user's device may be a payment device (e.g. a debit card, credit card, smart card, prepaid card, gift card, and/or the like), a pointer device (e.g. a stylus and/or the like), and/or a like device.

Figure 33A:
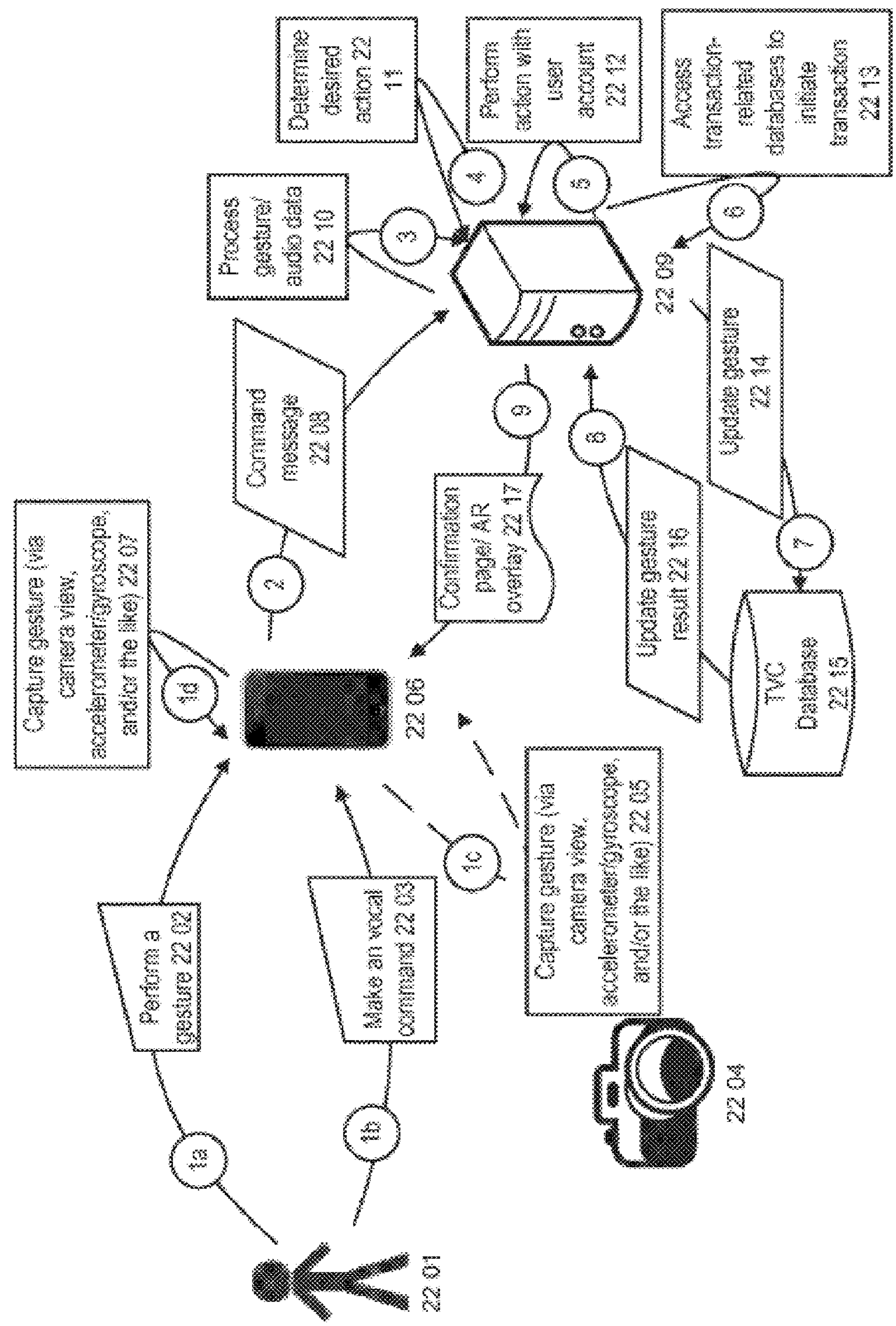
FIGS. 33A-33B show data flow diagrams illustrating processing gesture and vocal commands in some embodiments of the V-GLASSES.
Figure 33B:
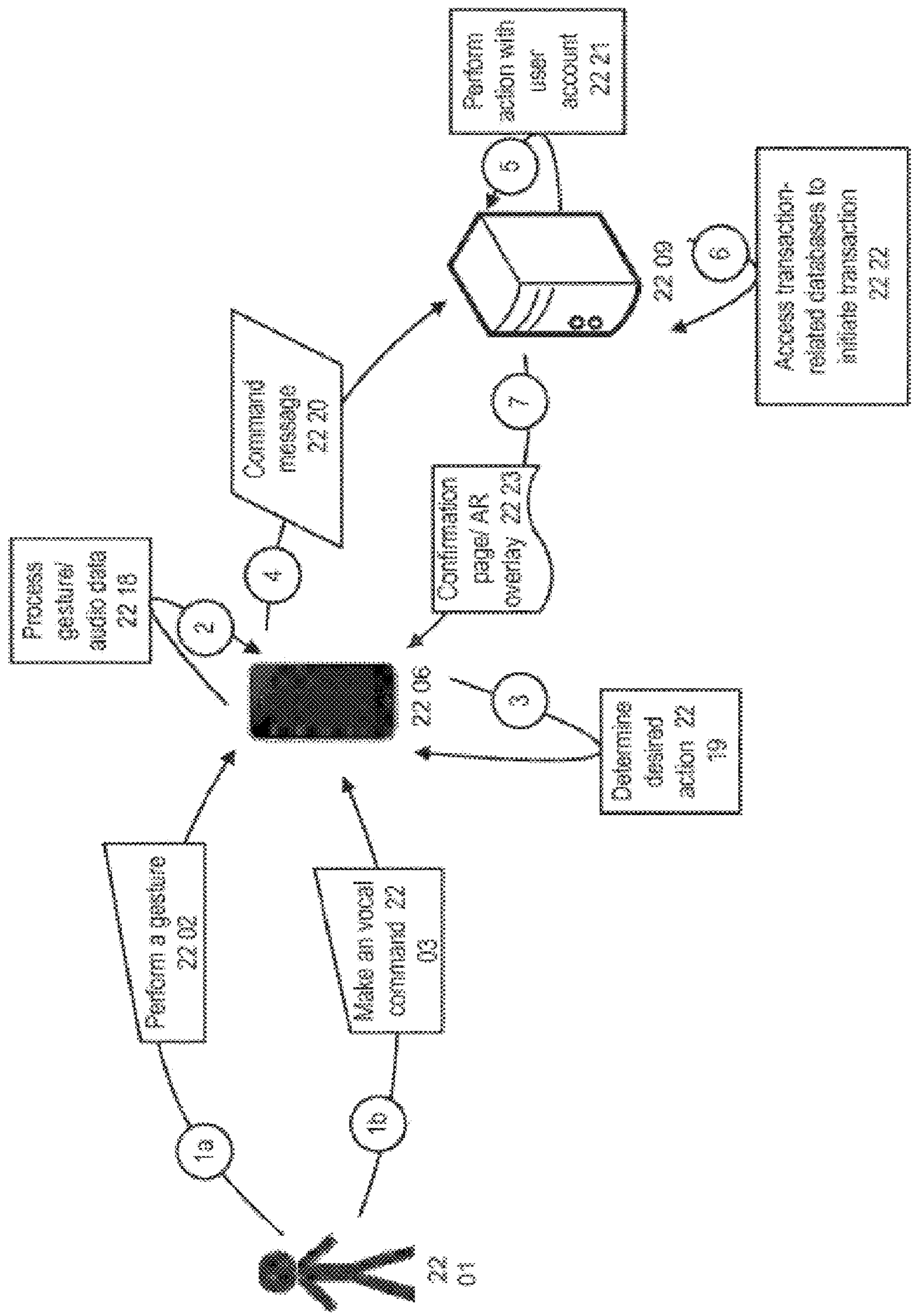

FIGS. 33*a-b* show data flow diagrams illustrating processing gesture and vocal commands in some embodiments of the V-GLASSES. In some implementations, the user 2201 may initiate an action by providing both a physical gesture 2202 and a vocal command 2203 to an electronic device 2206. In some implementations, the user may use the electronic device itself in the gesture; in other implementations, the user may use another device (such as a payment device), and may capture the gesture via a camera on the electronic device 2207, or an external camera separate from the electronic device 2205. In some implementations, the camera may record a video of the device; in other implementations, the camera may take a burst of photos. In some implementations, the recording may begin when the user presses a button on the electronic device indicating that the user would like to initiate an action; in other implementations, the recording may begin as soon as the user enters a command application and begins to speak. The recording may end as soon as the user stops speaking, or as soon as the user presses a button to end the collection of video or image data. The electronic device may then send a command message 2208 to the V-GLASSES database, which may include the gesture and vocal command obtained from the user.

In some implementations, an exemplary XML-encoded command message 2208 may take a form similar to the following:

```
POST /command message.php HTTP/1.1
Host: www.DCMCPproccess.com
Content-Type: Application/XML
Content-Length: 788
<?XML version = "1.0" encoding = "UTF-8"?>
<command_message>
<timestamp>2016-01-01 12:30:00</timestamp>
    <command_params>
        <gesture_accel>
            <x>1.0, 2.0, 3.1, 4.0, 5.2, 6.1, 7.1, 8.2, 9.2,
10.1</x>
            <y>1.5, 2.3, 3.3, 4.1, 5.2, 6.3, 7.2, 8.4, 9.1,
10.0</y>
        </gesture_accel>
          <gesture_gyro>1, 1, 1, 1, 1, 0,−1,−1,−1, −
1</gesture_gyro >
        <gesture_finger>
              <finger_image>
                  <name> gesture1 </name>
                  <format> JPEG </format>
                  <compression> JPEG compression
  </compression>
                  <size> 123456 bytes </size>
                  <x-Resolution> 72.0 </x-Resolution>
                  <y-Resolution> 72.0 </y-Resolution>
                  <date_time> 2014:8:11 16:45:32
  </date_time>
                    <color>greyscale</color>
                  ...
                  <content> ÿØÿà JFIF   H H   ÿâ ´ ICC_PROFILE
  ¤appl   mntrRGB XYZ Ü   $   acspAPPL öÖÓ-appl
  desc   P   bdscm   ´   Šcprt   ——————————@   $wtpt
  ——————————d   rXYZ   ——————————x   gXYZ
  ——————————Œ   bXYZ   ——————————   rTRC
  ——————————´   aarg   À   vcgt ...
                  </content>
                ...
            </image_info>
              <x>1.0, 2.0, 3.1, 4.0, 5.2, 6.1, 7.1, 8.2, 9.2,
10.1</x>
              <y>1.5, 2.3, 3.3, 4.1, 5.2, 6.3, 7.2, 8.4, 9.1,
10.0</y>
      </gesture_finger>
        <gesture_video xml content-type="mp4">
            <key>filename</key><string>gesture1.mp4</string>
                <key>Kind</key><string>h.264/MPEG-4 video
file</ string>
```

-continued

```
                <key>Size</key><integer>1248163264</integer>
                <key>Total Time</key><integer>20</integer>
                <key>Bit Rate</key><integer>9000</integer>
                <content>Ã@ôÃ=Σ\π¶à©™Ô[Û´ ˝ïfl ˜l'uu4Í¿û ¡ú∂Û%nIy-
□´´rõæCu ₠Σ\ÿ%ol‿ ¡!z∫∫{%ïñõ ‡#)~>∂be"l°l._Fœ& ˇÁòΣ,8Sãã ¬ íÅ:íè ˇAπ-
≤< ¶Îl',£JvD_8%o6"ÎZü>vÀ√b∫%oªN™Ñwg®x$ôV§lQ—
¡˙ãTlMCF)Σ:Á¸ xÀÛòÒÎΩk₠tΩ ◊çÔO:∫ΩÂN´ Πõ÷Σqt¯ˆjÃ€6ˆƒ4.o□ óöÀÎ Zuc't°
`Tfi7ÂV ⁄ G~¶Ô[g©´Fáª Í.Ùoªiµ§ ⁄ "∫AÅ`
,ˇªÒ™/ë£wç
                </content>
            <gesture_video>
        <command_audio content-type="mp4">
<key>filename</key><string>vocal_command1.mp4</ string>
                <key>Kind</key><string>MPEG-4 audio file</string>
                <key>Size</key><integer>2468101</integer>
                <key>Total Time</key><integer>20</integer>
                <key>Bit Rate</key><integer>128</integer>
                <key>Sample Rate</key><integer>44100</integer>
                <content>Ã@ôÃ=Σ\π¶à©™Ô[Û´ ˝ïfl ˜l'uu4Í¿u ¡ú∂Û%nIy-
□´´rõæCu ₠Σ\ÿ%o‿ ¡!z∫∫{%ïñõ ‡#)~>∂be"l°l._Fœ& ˇÁòΣ,8Sãã ¬ íÅ:íè ˇAπ-
≤<¶Î l',£JvD_8%o6"ÎZü>vÀ√b∫%oªN™Ñwg®x$ôV§lQ—
¡˙ãTlMCF)Σ:Á¸xÀÛòÒÎΩk₠tΩ ◊çÔO:∫ΩÂN´ Πõ÷Σqt¯ˆjÃ€6ˆƒ4.o□ óöÀÎ Zuc't°
`Tfi7ÂV ⁄ G~¶Ô[g©´Fáª Í.Ùoªiµ§ ⁄ "∫AÅ`
,ˇªÒ™/ë£wç
                </content>
        </command_audio>
    </command_params>
    </user_params>
        <user_id>123456789</user_id>
      <wallet_id>9988776655</wallet_id>
    <device_id>j3h25j45gh647hj</device_id>
        <date_of_request>2015-12-31</date_of_request>
    </user_params>
</command_message>
```

In some implementations, the electronic device may reduce the size of the vocal file by cropping the audio file to when the user begins and ends the vocal command. In some implementations, the V-GLASSES may process the gesture and audio data 2210 in order to determine the type of gesture performed, as well as the words spoken by the user. In some implementations, a composite gesture generated from the processing of the gesture and audio data may be embodied in an XML-encoded data structure similar to the following:

```
    <composite_gesture>
      <user_params>
        <user_id>123456789</user_id>
        <wallet_id>9988776655</wallet_id>
        <device_id>j3h25j45gh647hj</device_id>
      </user_params>
      <object_params></object_params>
      <finger_params>
        <finger_image>
        <name> gesture1 </name>
        <format> JPEG </format>
        <compression> JPEG compression
</compression>
        <size> 123456 bytes </size>
        <x-Resolution> 72.0 </x-Resolution>
        <y-Resolution> 72.0 </y-Resolution>
        <date_time> 2014:8:11 16:45:32
</date_time>
          <color>greyscale</color>
        ...
        <content> ÿØÿà JFIF   H H   ÿâ´ICC_PROFILE
¤appl   mntrRGB XYZ Ü   $   acspAPPL öÖÓ-appl
desc   P   bdscm   ´ Šcprt   ——————————@   $wtpt
——————————d   rXYZ   ——————————x   gXYZ
——————————Œ   bXYZ   ——————————   rTRC
——————————´   aarg   À   vcgt ...
        </content>
      ...
      </finger_image>
      <x>1.0, 2.0, 3.1, 4.0, 5.2, 6.1, 7.1, 8.2, 9.2,
10.1</x>
      <y>1.5, 2.3, 3.3, 4.1, 5.2, 6.3, 7.2, 8.4, 9.1,
```

-continued

```
10.0</y>
      </finger_params>
      <touch_params> </touch_params>
      <qr_object_params>
      <qr_image>
         <name> qr1 </name>
         <format> JPEG </format>
         <compression> JPEG compression
</compression>
         <size> 123456 bytes </size>
         <x-Resolution> 72.0 </x-Resolution>
         <y-Resolution> 72.0 </y-Resolution>
         <date_time> 2014:8:11 16:45:32
</date_time>
         ...
         <content> ÿØÿà JFIF    H H    ÿâ´ICC_PROFILE
¤appl    mntrRGB XYZ Ü   $    acspAPPL öÖÓ-appl
desc    P    bdscm        Šcprt        ——————————@        $wtpt
——————————d        rXYZ    ——————————x        gXYZ
——————————Œ        bXYZ    ——————————        rTRC
——————————´       aarg        À        vcgt ...
         </content>
      ...
   </qr_image>
   <QR_content>"John Doe, 1234567891011121, 2014:8:11,
098"</QR_content>
      </qr_object_params>
      <voice_params></voice_params>
   </composite_gesture>
```

In some implementations, fields in the composite gesture data structure may be left blank depending on whether the particular gesture type (e.g., finger gesture, object gesture, and/or the like) has been made. The V-GLASSES may then match 2211 the gesture and the words to the various possible gesture types stored in the V-GLASSES database. In some implementations, the V-GLASSES may query the database for particular disparate gestures in a manner similar to the following:

```
<?php
    ...
      $fingergesturex = "3.1, 4.0, 5.2, 6.1, 7.1, 8.2, 9.2";
      $fingergesturey = "3.3, 4.1, 5.2, 6.3, 7.2, 8.4, 9.1";
      $fingerresult = mysql_query("SELECT finger_gesture_type FROM finger_gesture

WHERE gesture_x='%s' AND gesture_y='%s'", mysql_real_escape_string($fingergesturex),
    mysql_real_escape_string($fingergesturey));
      $objectgesturex = "6.1, 7.0, 8.2, 9.1, 10.1, 11.2, 12.2";
      $objectgesturey = "6.3, 7.1, 8.2, 9.3, 10.2, 11.4, 12.1";
      $objectresult = mysql_query("SELECT object_gesture_type FROM object_gesture


WHERE object_gesturex='%s' AND object_gesturey='%s'",
  mysql_real_escape_string($objectgesturex),
    mysql_real_escape_string($objectgesturey));
      $voicecommand = "Pay total with this device";
      $voiceresult = mysql_query("SELECT vc_name FROM vocal_command WHERE %s


   IN
vc_command_list", mysql_real_escape_string($voicecommand));


>
```

In some implementations, the result of each query in the above example may be used to search for the composite gesture in the Multi-Disparate Gesture Action (MDGA) table of the database. For example, if $fingerresult is "tap check," $objectresult is "swipe," and $voiceresult is "pay total of check with this payment device," V-GLASSES may search the MDGA table using these three results to narrow down the precise composite action that has been performed. If a match is found, the V-GLASSES may request confirmation that the right action was found, and then may perform the action 2212 using the user's account. In some implementations, the V-GLASSES may access the user's financial information and account 2213 in order to perform the action. In some implementations, V-GLASSES may update a gesture table 2214 in the V-GLASSES database 2215 to refine models for usable gestures based on the user's input, to add new gestures the user has invented, and/or the like. In some implementations, an update 2214 for a finger gesture may be performed via a PHP/MySQL command similar to the following:

```
<?php
  ...
    $fingergesturex = "3.1, 4.0, 5.2, 6.1, 7.1, 8.2, 9.2";
    $fingergesturey = "3.3, 4.1, 5.2, 6.3, 7.2, 8.4, 9.1";
  $fingerresult = mysql_query("UPDATE gesture_x, gesture_y FROM finger_gesture WHERE
gesture_x='%s' AND gesture_y='%s'", mysql_real_escape_string($fingergesturex),
  mysql_real_escape_string($fingergesturey));
>
```

After successfully updating the table 2216, the V-GLASSES may send the user to a confirmation page 2217 (or may provide an augmented reality (AR) overlay to the user) which may indicate that the action was successfully performed. In some implementations, the AR overlay may be provided to the user through use of smart glasses, contacts, and/or a like device (e.g. Google Glasses).

As shown in FIG. 33*b*, in some implementations, the electronic device 2206 may process the audio and gesture data itself 2218, and may also have a library of possible gestures that it may match 2219 with the processed audio and gesture data to. The electronic device may then send in the command message 2220 the actions to be performed, rather than the raw gesture or audio data. In some implementations, the XML-encoded command message 2220 may take a form similar to the following:

```
POST /command message.php HTTP/1.1
Host: www.DCMCPproccess.com
Content-Type: Application/XML
Content-Length: 788
<?XML version = "1.0" encoding = "UTF-8"?>
<command_message>
  <timestamp>2016-01-01 12:30:00</timestamp>
  <command_params>
    <gesture_video>swipe_over_receipt</gesture_video>
    <command_audio>"Pay total with active
wallet."</command_audio>
  </command_params>
  </user_params>
    <user_id>123456789</user_id>
    <wallet_id>9988776655</wallet_id>
```

-continued

```
    <device_id>j3h25j45gh647hj</device_id>
    <date_of_request>2015-12-31</date_of_request>
  </user_params>
</command_message>
```

The V-GLASSES may then perform the action specified 2221, accessing any information necessary to conduct the action 2222, and may send a confirmation page or AR overlay to the user 2223. In some implementations, the XML-encoded data structure for the AR overlay may take a form similar to the following:

```
<?XML version = "1.0" encoding = "UTF-8"?>
<virtual_label>
  <label_id> 4NFU4RG94 </label_id>
  <timestamp>2014-02-22 15:22:41</timestamp>
  <user_id>123456789</user_id>
  <frame>
    <x-range> 1024 </x-range>
    <y-range> 768 </y-range>
    ...
  </frame>
  <object>
    <type> confirmation </type>
    <position>
      <x_start> 102 <x_start>
      <x_end> 743</x_end>
      <y_start> 29 </y_start>
      <y_end> 145 </y_end>
    </position>
    ...
  </object>
  <information>
    <text> "You have successfully paid the total using your active wallet." </text>
    ...
  </information>
  <orientation> horizontal </orientation>
  <format>
    <template_id> Confirm001 </template_id>
    <label_type> oval callout </label_type>
    <font> ariel </font>
    <font_size> 12 pt </font_size>
    <font_color> Orange </font_color>
    <overlay_type> on top </overlay_type>
    <transparency> 50% </transparency>
    <background_color> 255 255 0 </background_color>
    <label_size>
      <shape> oval </shape>
      <long_axis> 60 </long axis>
      <short_axis> 40 </short_axis>
      <object_offset> 30 </object_offset>
      ...
    </label_size>
      ...
  </format>
  <injection_position>
    <X_coordinate> 232 </X_coordinate>
    <Y_coordiante> 80 </Y_coordinate>
  </injection_position>
  ...
</virtual_label>
```

Figure 34A:
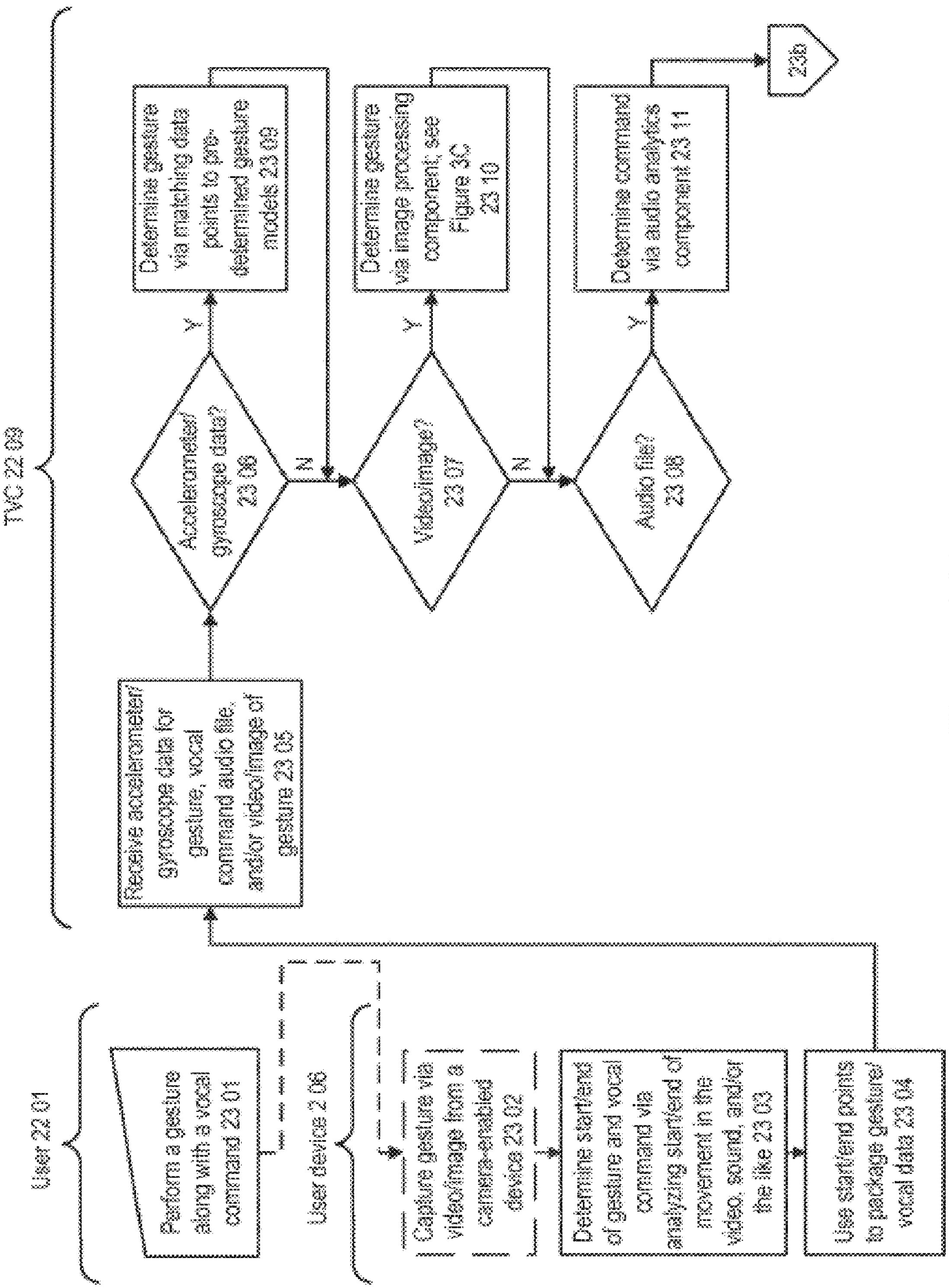
FIGS. 34A-34C show logic flow diagrams illustrating processing gesture and vocal commands in some embodiments of the V-GLASSES.
Figure 34B:
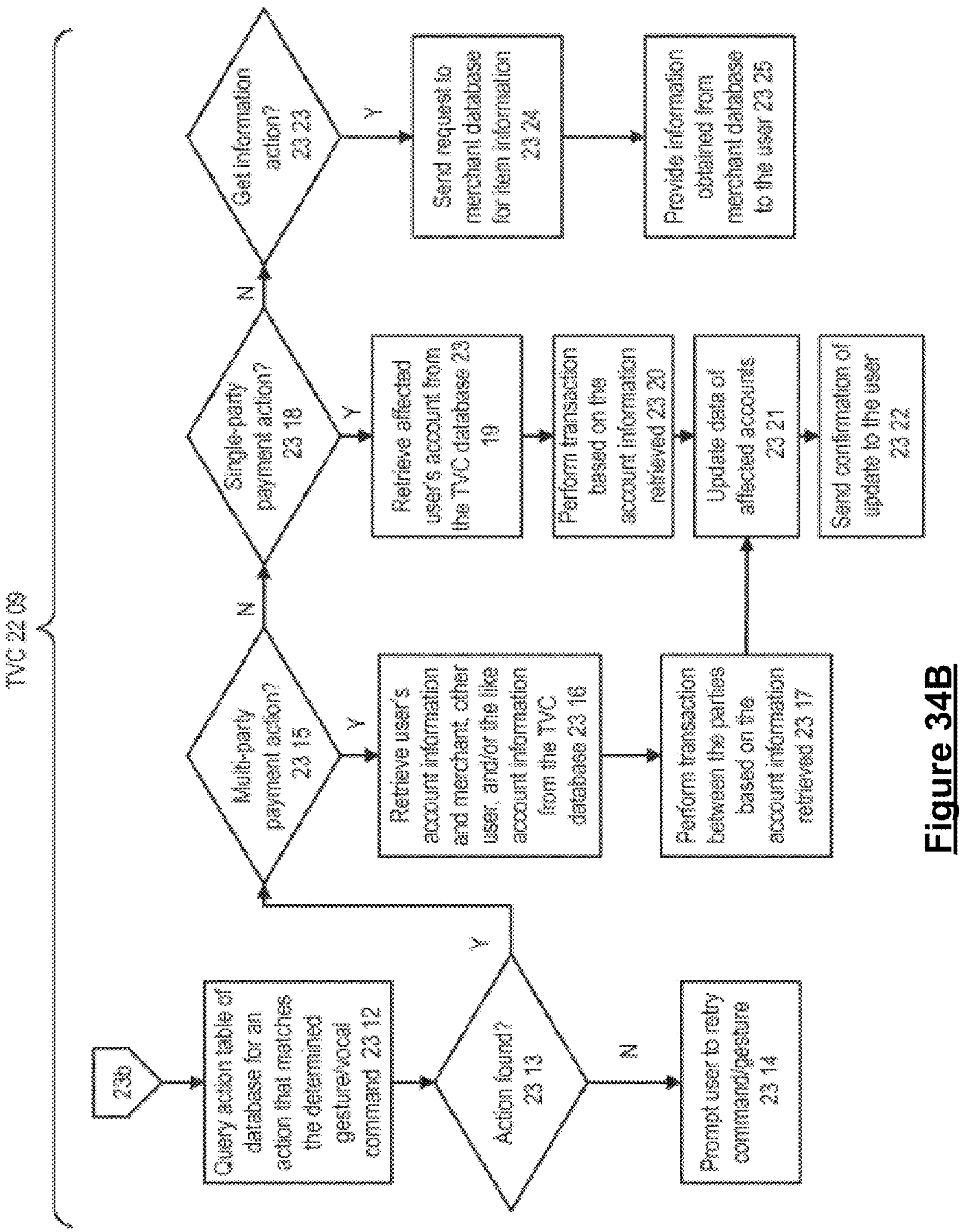
Figure 34C:
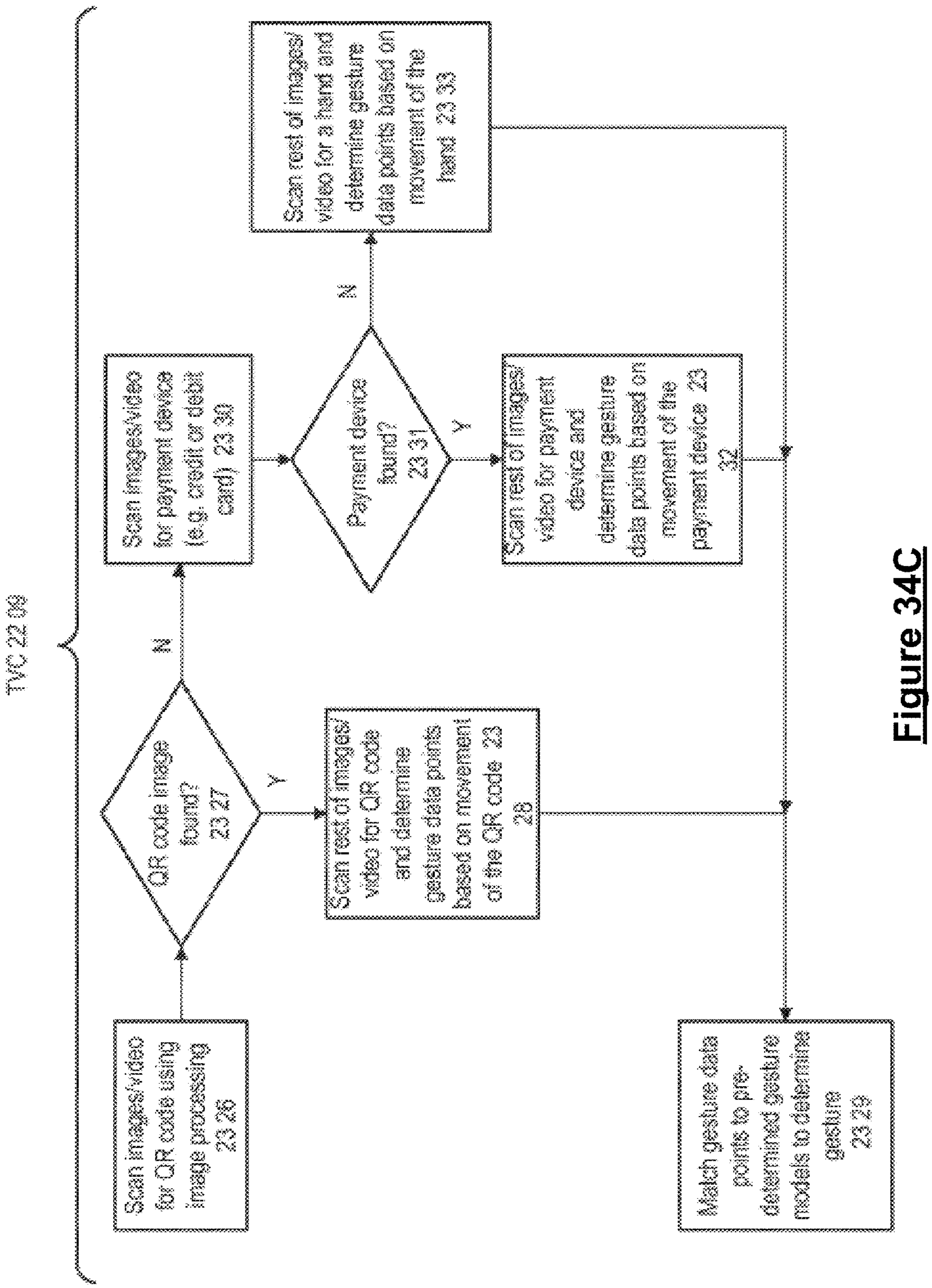

FIGS. 34*a*-34*c* show logic flow diagrams illustrating processing gesture and vocal commands in some embodiments of the V-GLASSES. In some implementations, the user 201 may perform a gesture and a vocal command 2301 equating to an action to be performed by V-GLASSES. The user's device 206 may capture the gesture 2302 via a set of images or a full video recorded by an on-board camera, or via an external camera-enabled device connected to the user's device, and may capture the vocal command via an on-board microphone, or via an external microphone connected to the user's device. The device may determine when both the gesture and the vocal command starts and ends 2303 based on when movement in the video or images starts and ends, based on when the user's voice starts and ends the vocal command, when the user presses a button in an action interface on the device, and/or the like. In some implementations, the user's device may then use the start and end points determined in order to package the gesture and voice data 2304, while keeping the packaged data a reasonable size. For example, in some implementations, the user's device may eliminate some accelerometer or gyroscope data, may eliminate images or crop the video of the gesture, based on the start and end points determined for the gesture. The user's device may also crop the audio file of the vocal command, based on the start and end points for the vocal command. This may be performed in order to reduce the size of the data and/or to better isolate the gesture or the vocal command. In some implementations, the user's device may package the data without reducing it based on start and end points.

In some implementations, V-GLASSES may receive 2305 the data from the user's device, which may include accelerometer and/or gyroscope data pertaining to the gesture, a video and/or images of the gesture, an audio file of the vocal command, and/or the like. In some implementations, V-GLASSES may determine what sort of data was sent by the user's device in order to determine how to process it. For example, if the user's device provides accelerometer and/or gyroscope data 2306, V-GLASSES may determine the gesture performed by matching the accelerometer and/or gyroscope data points with pre-determined mathematical gesture models 2309. For example, if a particular gesture would generate accelerometer and/or gyroscope data that would fit a linear gesture model, V-GLASSES will determine whether the received accelerometer and/or gyroscope data matches a linear model.

If the user's device provides a video and/or images of the gesture 2307, V-GLASSES may use an image processing component in order to process the video and/or images 2310 and determine what the gesture is. In some implementations, if a video is provided, the video may also be used to determine the vocal command provided by the user. As shown in FIG. 34*c*, in one example implementation, the image processing component may scan the images and/or the video 2326 for a Quick Response (QR) code. If the QR code is found 2327, then the image processing component may scan the rest of the images and/or the video for the same QR code, and may generate data points for the gesture based on the movement of the QR code 2328. These gesture data points may then be compared with pre-determined gesture models 2329 in order to determine which gesture was made by the item with the QR code. In some implementations, if multiple QR codes are found in the image, the image processing component may ask the user to specify which code corresponds to the user's receipt, payment device, and/or other items which may possess the QR code. In some implementations, the image processing component may, instead of prompting the user to choose which QR code to track, generate gesture data points for all QR codes found, and may choose which is the correct code to track based on how each QR code moves (e.g., which one moves at all, which one moves the most, and/or the like). In some implementations, if the image processing component does not find a QR code, the image processing component may scan the images and/or the vide for a payment device 2330, such as a credit card, debit card, transportation card (e.g., a New York City Metro Card), gift card, and/or the like. If a payment device can be found 2331, the image processing component may scan 2332 the rest of the images and/or the rest of the video for the same payment device, and may determine gesture data points based on the movement of the payment device. If multiple payment devices are found, either the user may be prompted to choose which device is relevant to the user's gesture, or the image processing component, similar to the QR code discussed above, may determine itself which payment device should be tracked for the gesture. If no payment device can be found, then the image processing component may instead scan the images and/or the video for a hand 2333, and may determine gesture data points based on its movement. If multiple hands are detected, the image processing component may handle them similarly to how it may handle QR codes or payment devices. The image processing component may match the gesture data points generated from any of these tracked objects to one of the pre-determined gesture models in the V-GLASSES database in order to determine the gesture made.

If the user's device provides an audio file 2308, then V-GLASSES may determine the vocal command given using an audio analytics component 2311. In some implementations, the audio analytics component may process the audio file and produce a text translation of the vocal command. As discussed above, in some implementations, the audio analytics component may also use a video, if provided, as input to produce a text translation of the user's vocal command.

As shown in FIG. 34*b*, V-GLASSES may, after determining the gesture and vocal command made, query an action table of a V-GLASSES database 2312 to determine which of the actions matches the provided gesture and vocal command combination. If a matching action is not found 2313, then V-GLASSES may prompt the user to retry the vocal command and the gesture they originally performed 2314. If a matching action is found, then V-GLASSES may determine what type of action is requested from the user. If the action is a multi-party payment-related action 2315 (i.e., between more than one person and/or entity), V-GLASSES may retrieve the user's account information 2316, as well as the account information of the merchant, other user, and/or other like entity involved in the transaction. V-GLASSES may then use the account information to perform the transaction between the two parties 2317, which may include using the account IDs stored in each entity's account to contact their payment issuer in order to transfer funds, and/or the like. For example, if one user is transferring funds to another person (e.g., the first user owes the second person money, and/or the like), V-GLASSES may use the account information of the first user, along with information from the second person, to initiate a transfer transaction between the two entities.

If the action is a single-party payment-related action 2318 (i.e., concerning one person and/or entity transferring funds to his/her/itself), V-GLASSES may retrieve the account information of the one user 2319, and may use it to access the relevant financial and/or other accounts associated in the transaction. For example, if one user is transferring funds from a bank account to a refillable gift card owned by the same user, then V-GLASSES would access the user's account in order to obtain information about both the bank account and the gift card, and would use the information to transfer funds from the bank account to the gift card 2320.

In either the multi-party or the single-party action, V-GLASSES may update 2321 the data of the affected accounts (including: saving a record of the transaction, which may include to whom the money was given to, the date and time of the transaction, the size of the transaction, and/or the like), and may send a confirmation of this update 2322 to the user.

If the action is related to obtaining information about a product and/or service 2323, V-GLASSES may send a request 2324 to the relevant merchant database(s) in order to get information about the product and/or service the user would like to know more about. V-GLASSES may provide any information obtained from the merchant to the user 2325. In some implementations, V-GLASSES may provide the information via an AR overlay, or via an information page or pop-up which displays all the retrieved information.

Figure 35A:
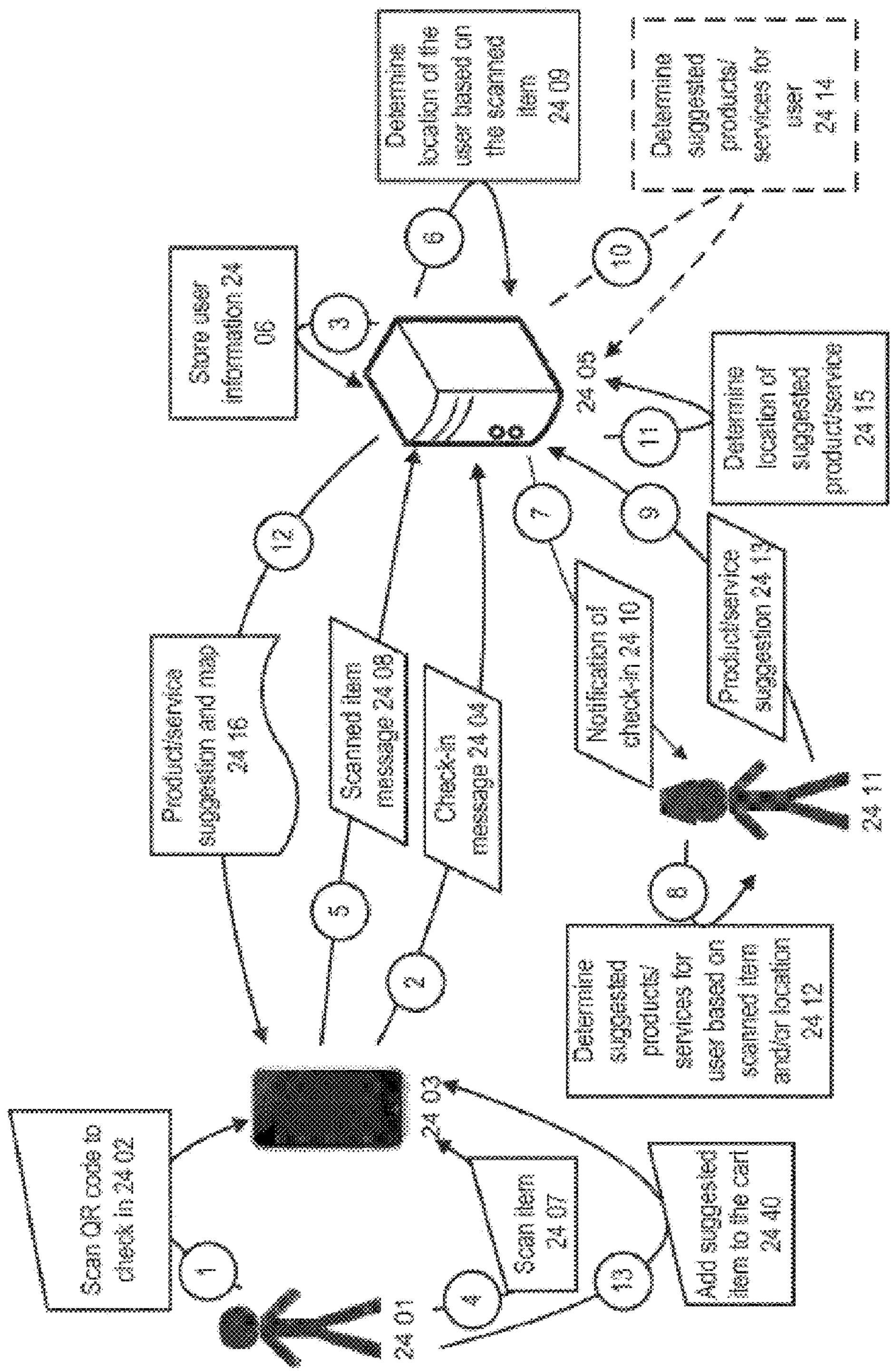
FIG. 35A shows a data flow diagrams illustrating checking into a store in some embodiments of the V-GLASSES.

FIG. 35*a* shows a data flow diagram illustrating checking into a store or a venue in some embodiments of the V-GLASSES. In some implementations, the user may scan a QR code 2402 using their electronic device 2403 in order to check-in to a store. The electronic device may send check-in message 2404 to V-GLASSES server 2405, which may allow V-GLASSES to store information 2406 about the user based on their active e-wallet profile. In some implementations, an exemplary XML-encoded check-in message 2404 may take a form similar to the following:

```
POST /checkin_message.php HTTP/1.1
Host: www.DCMCPproccess.com
Content-Type: Application/XML
Content-Length: 788
<?XML version = "1.0" encoding = "UTF-8"?>
<checkin _message>
  <timestamp>2016-01-01 12:30:00</timestamp>
    <checkin_params>
        <merchant_params>
            <merchant_id>1122334455</merchant_id>
            <merchant_salesrep>1357911</merchant_salesrep>
        </merchant_params>
        <user_params>
              <user_id>123456789</user_id>
              <wallet_id>9988776655</wallet_id>
              <GPS>40.71872,-73.98905, 100</GPS>
              <device_id>j3h25j45gh647hj</device_id>
              <date_of_request>2015-12-31</date_of_request>
        </user_params>
      <qr_object_params>
            <qr_image>
                    <name> qr5 </name>
                    <format> JPEG </format>
                    <compression> JPEG compression
  </compression>
                    <size> 123456 bytes </size>
                    <x-Resolution> 72.0 </x-Resolution>
                    <y-Resolution> 72.0 </y-Resolution>
                    <date_time> 2014:8:11 16:45:32
  </date_time>
                    ...
                    <content> ÿØÿà JFIF   H H   ÿâ ´ ICC_PROFILE
  ¤appl   mntrRGB XYZ Ü ˘  $    acspAPPL öÓÓ-appl
  desc   P   bdscm   ´      Šcprt   ———————————@   $wtpt
  ———————————d     rXYZ     ———————————x     gXYZ
  ———————————Œ     bXYZ     ———————————      rTRC
  ———————————´     aarg        À      vcgt ...
                    </content>
                  ...
            </qr_image>
          <QR_content>"URL:http://www.examplestore.com mailto:rep@examplestore.com
geo:52.45170,4.81118 mailto:salesrep@examplestore.com&subject=Check-
in!body=The%20user%20with%id%20123456789%20has%20just%20checked%20in!"</QR_content>
        </qr_object_params>
  </checkin_params>
</checkin_message>
```

In some implementations, the user, while shopping through the store, may also scan 2407 items with the user's electronic device, in order to obtain more information about them, in order to add them to the user's cart, and/or the like. In such implementations, the user's electronic device may send a scanned item message 2408 to the V-GLASSES server. In some implementations, an exemplary XML-encoded scanned item message 2408 may take a form similar to the following:

```
POST /scanned_item_message.php HTTP/1.1
Host: www.DCMCPproccess.com
Content-Type: Application/XML
Content-Length: 788
<?XML version = "1.0" encoding = "UTF-8"?>
<scanned_item_message>
  <timestamp>2016-01-01 12:30:00</timestamp>
    <scanned_item_params>
        <item_params>
            <item_id>1122334455</item_id>
            <item_aisle>12</item_aisle>
            <item_stack>4</item_stack>
            <item_shelf>2</item_shelf>
            <item_attributes>"orange juice", "calcium", "Tropicana"</item_attributes>
            <item_price>5</item_price>
            <item_product_code>1A2B3C4D56</item_product_code>
            <item_manufacturer>Tropicana Manufacturing Company,
```

-continued

```
Inc</item_manufacturer>
                    <qr_image>
                            <name> qr5 </name>
                            <format> JPEG </format>
                            <compression> JPEG compression
  </compression>
                            <size> 123456 bytes </size>
                            <x-Resolution> 72.0 </x-Resolution>
                            <y-Resolution> 72.0 </y-Resolution>
                            <date_time> 2014:8:11 16:45:32
  </date_time>
                            ...
                            <content> ÿØÿà JFIF    H H    ÿâ ´ ICC_PROFILE
  ¤appl    mntrRGB XYZ Ü    $     acspAPPL öÖÓ-appl
  desc    P    bdscm      ´     Šcprt    ——————————@    $wtpt
  ——————————d       rXYZ    ——————————x    gXYZ
  ——————————Ð       bXYZ    ——————————    rTRC
  ——————————´       aarg          À    vcgt ...
                            </content>
                    ...
                    </qr_image>
               <QR_content>"URL:http://www.examplestore.com mailto:rep@examplestore.com
geo:52.45170,4.81118
mailto:salesrep@examplestore.com&subject=Scan!body=The%20user%20with%id%20123456789%20
has%20just%20scanned%20product%201122334455!"</QR_content>
          </item_params>
            <user_params>
                    <user_id>123456789</user_id>
                    <wallet_id>9988776655</wallet_id>
                    <GPS>40.71872,-73.98905, 100</GPS>
                    <device_id>j3h25j45gh647hj</device_id>
                    <date_of_request>2015-12-31</date_of_request>
            </user_params>
  </scanned_item_params>
</scanned_item_message>
```

In some implementations, V-GLASSES may then determine the location 2409 of the user based on the location of the scanned item, and may send a notification 2410 to a sale's representative 2411 indicating that a user has checked into the store and is browsing items in the store. In some implementations, an exemplary XML-encoded notification message 2410 may comprise of the scanned item message of scanned item message 2408.

The sale's representative may use the information in the notification message to determine products and/or services to recommend 2412 to the user, based on the user's profile, location in the store, items scanned, and/or the like. Once the sale's representative has chosen at least one product and/or service to suggest, it may send the suggestion 2413 to the V-GLASSES server. In some implementations, an exemplary XML-encoded suggestion 2413 may take a form similar to the following:

```
POST /recommendation_message.php HTTP/1.1
Host: www.DCMCPproccess.com
Content-Type: Application/XML
Content-Length: 788
<?XML version = "1.0" encoding = "UTF-8"?>
<recommendation_message>
  <timestamp>2016-01-01 12:30:00</timestamp>
    <recommendation_params>
        <item_params>
            <item_id>1122334455</item_id>
            <item_aisle>12</item_aisle>
            <item_stack>4</item_stack>
            <item_shelf>1</item_shelf>
            <item_attributes>"orange juice", "omega-3", "Tropicana"</item_attributes>
            <item_price>5</item_price>
            <item_product_code>0P9K8U7H76</item_product_code>
            <item_manufacturer>Tropicana Manufacturing Company,
Inc</item_manufacturer>
                <qr_image>
                    <name> qr12 </name>
                    <format> JPEG </format>
                    <compression> JPEG compression
  </compression>
                    <size> 123456 bytes </size>
                    <x-Resolution> 72.0 </x-Resolution>
```

-continued

```
                    <y-Resolution> 72.0 </y-Resolution>
                    <date_time> 2014:8:11 16:45:32
</date_time>
                    ...
                    <content> ÿØÿà JFIF   H H   ÿâ ´ ICC_PROFILE
¤appl   mntrRGB XYZ Ü   $   acspAPPL öÖÓ-appl
desc   P   bdscm   ´   Šcprt   ——————@   $wtpt
——————d   rXYZ   ——————x   gXYZ
——————Œ   bXYZ   ——————   rTRC
——————´   aarg   À   vcgt ...
                    </content>
                    ...
                </qr_image>
            <QR_content>"URL:http://www.examplestore.com mailto:rep@examplestore.com
geo:52.45170,4.81118
mailto:salesrep@examplestore.com&subject=Scan!body=The%20user%20with%id%20123456789%20
has%20just%20scanned%20product%11223344551"</QR_content>
        </item_params>
        <user_params>
                <user_id>123456789</user_id>
                <wallet_id>9988776655</wallet_id>
                <GPS>40.71872,-73.98905, 100</GPS>
                <device_id>j3h25j45gh647hj</device_id>
                <date_of_request>2015-12-31</date_of_request>
        </user_params>
    </recommendation_params>
</recommendation_message>
```

In some implementations, V-GLASSES may also use the user's profile information, location, scanned items, and/or the like to determine its own products and/or services to recommend 2414 to the user. In some implementations, V-GLASSES may determine where in the store any suggested product and/or service is 2415, based on aisle information in the item data structure, and may generate a map from the user's location to the location of the suggested product and/or service. In some implementations, the map overlays a colored path on a store map from the user's location to the suggested product and/or service. V-GLASSES may send 2416 this map, along with the suggested product and/or item, to the user, who may use it to find the suggested item, and add the suggested item to its shopping cart 2440 if the user would like to purchase it.

Figure 35B:
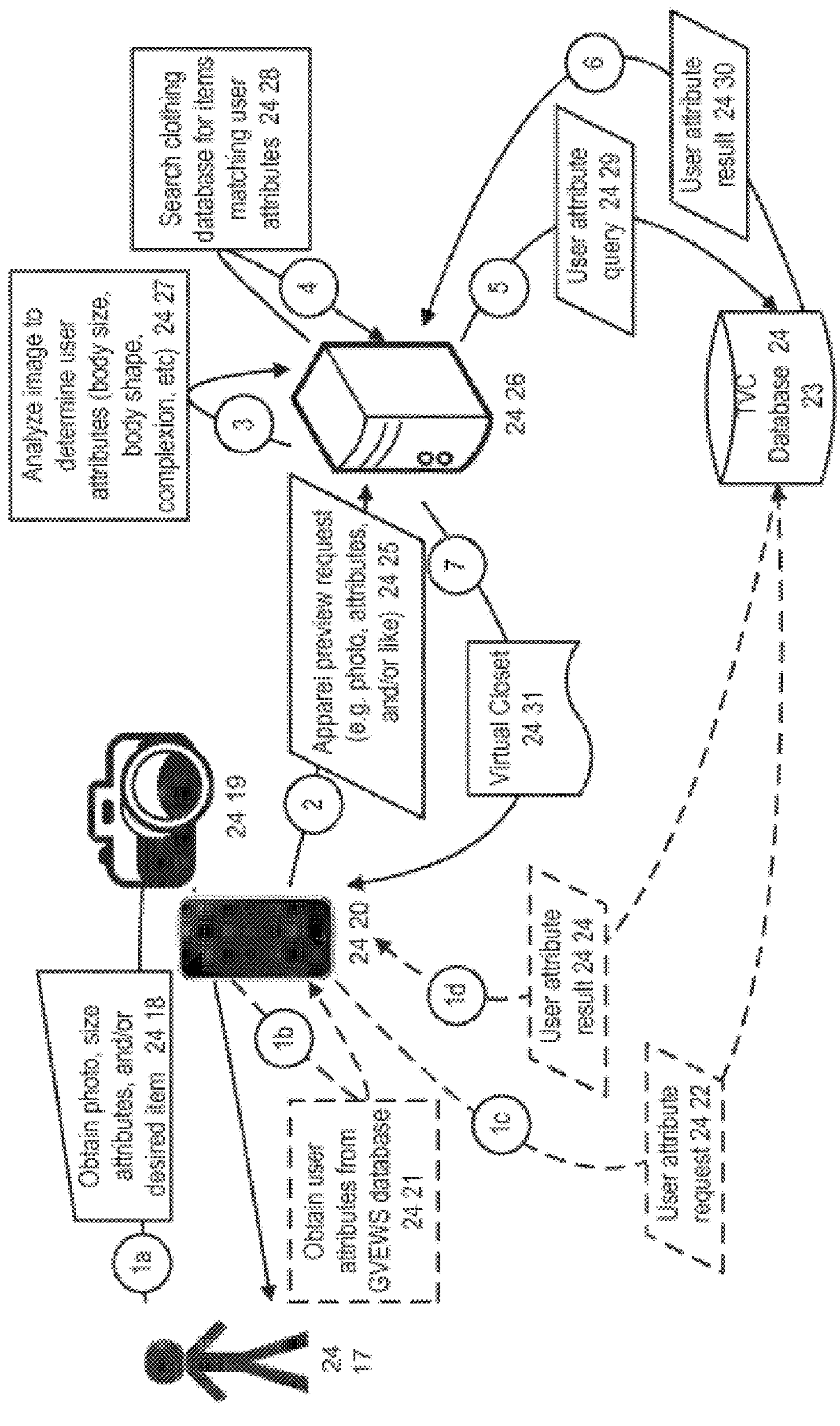
FIGS. 35B-35C show data flow diagrams illustrating accessing a virtual store in some embodiments of the V-GLASSES.
Figure 35C:
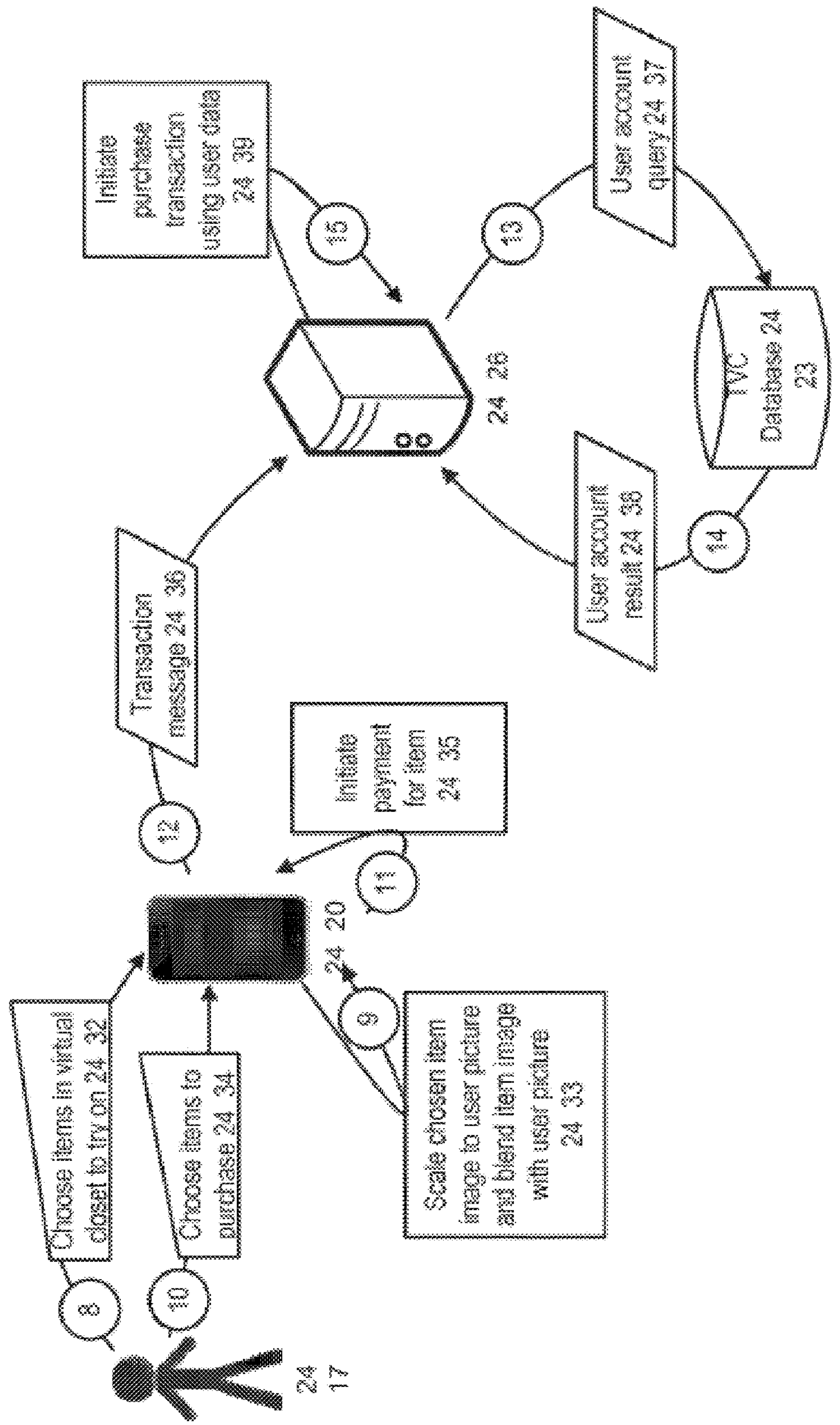

FIGS. 35*b-c* show data flow diagrams illustrating accessing a virtual store in some embodiments of the V-GLASSES. In some implementations, a user 2417 may have a camera (either within an electronic device 2420 or an external camera 2419, such as an Xbox Kinect device) take a picture 2418 of the user. The user may also choose to provide various user attributes, such as the user's clothing size, the item(s) the user wishes to search for, and/or like information. The electronic device 2420 may also obtain 2421 stored attributes (such as a previously-submitted clothing size, color preference, and/or the like) from the V-GLASSES database, including whenever the user chooses not to provide attribute information. The electronic device may send a request 2422 to the V-GLASSES database 2423, and may receive all the stored attributes 2424 in the database. The electronic device may then send an apparel preview request 2425 to the V-GLASSES server 2426, which may include the photo of the user, the attributes provided, and/or the like. In some implementations, an exemplary XML-encoded apparel preview request 2425 may take a form similar to the following:

```
POST /apparel_preview_request.php HTTP/1.1
Host: www.DCMCPproccess.com
Content-Type: Application/XML
Content-Length: 788
<?XML version = "1.0" encoding = "UTF-8"?>
<apparel_preview_message>
<timestamp>2016-01-01 12:30:00</timestamp>
            <user_image>
                <name> user_image </name>
                <format> JPEG </format>
                <compression> JPEG compression </compression>
                <size> 123456 bytes </size>
                <x-Resolution> 72.0 </x-Resolution>
```

-continued

```
                    <y-Resolution> 72.0 </y-Resolution>
                    <date_time> 2014:8:11 16:45:32 </date_time>
                    <color>rbg</color>
                    ...
                    <content> ÿØÿà JFIF    H H    ÿâ ´ ICC_PROFILE    ¤appl    mntrRGB XYZ Ü    $
acspAPPL öÖÓ-appl                                                      desc    P    bdscm        Šcprt
——————————@    $wtpt    ——————————d        rXYZ
——————————x    gXYZ    ——————————Œ        bXYZ
——————————     rTRC    ——————————´    aarg    À    vcgt ...
                    </content>
                    ...
               </user_image>
               </user_params>
                    <user_id>123456789</user_id>
                    <user_wallet_id>9988776655</wallet_id>
                    <user_device_id>j3h25j45gh647hj</device_id>
                    <user_size>4</user_size>
                    <user_gender>F</user_gender>
                    <user_body_type></user_body_type>
                    <search_criteria>"dresses"</search_criteria>
                    <date_of_request>2015-12-31</date_of_request>
               </user_params>
</apparel_preview_message>
```

In some implementations, V-GLASSES may conduct its own analysis of the user based on the photo 2427, including analyzing the image to determine the user's body size, body shape, complexion, and/or the like. In some implementations, V-GLASSES may use these attributes, along with any provided through the apparel preview request, to search the database 2428 for clothing that matches the user's attributes and search criteria. In some implementations, V-GLASSES may also update 2429 the user's attributes stored in the database, based on the attributes provided in the apparel preview request or based on V-GLASSES' analysis of the user's photo. After V-GLASSES receives confirmation that the update is successful 2430, V-GLASSES may send a virtual closet 2431 to the user, comprising a user interface for previewing clothing, accessories, and/or the like chosen for the user based on the user's attributes and search criteria. In some implementations, the virtual closet may be implemented via HTML and Javascript.

In some implementations, as shown in FIG. 35*c*, the user may then interact with the virtual closet in order to choose items 2432 to preview virtually. In some implementations, the virtual closet may scale any chosen items to match the user's picture 2433, and may format the item's image (e.g., blur the image, change lighting on the image, and/or the like) in order for it to blend properly with the user image. In some implementations, the user may be able to choose a number of different items to preview at once (e.g., a user may be able to preview a dress and a necklace at the same time, or a shirt and a pair of pants at the same time, and/or the like), and may be able to specify other properties of the items, such as the color or pattern to be previewed, and/or the like. The user may also be able to change the properties of the virtual closet itself, such as changing the background color of the virtual closet, the lighting in the virtual closet, and/or the like. In some implementations, once the user has found at least one article of clothing that the user likes, the user can choose the item(s) for purchase 2434. The electronic device may initiate a transaction 2425 by sending a transaction message 2436 to the V-GLASSES server, which may contain user account information that it may use to obtain the user's financial account information 2437 from the V-GLASSES database. Once the information has been successfully obtained 2438, V-GLASSES may initiate the purchase transaction using the obtained user data 2439.

Figure 36A:
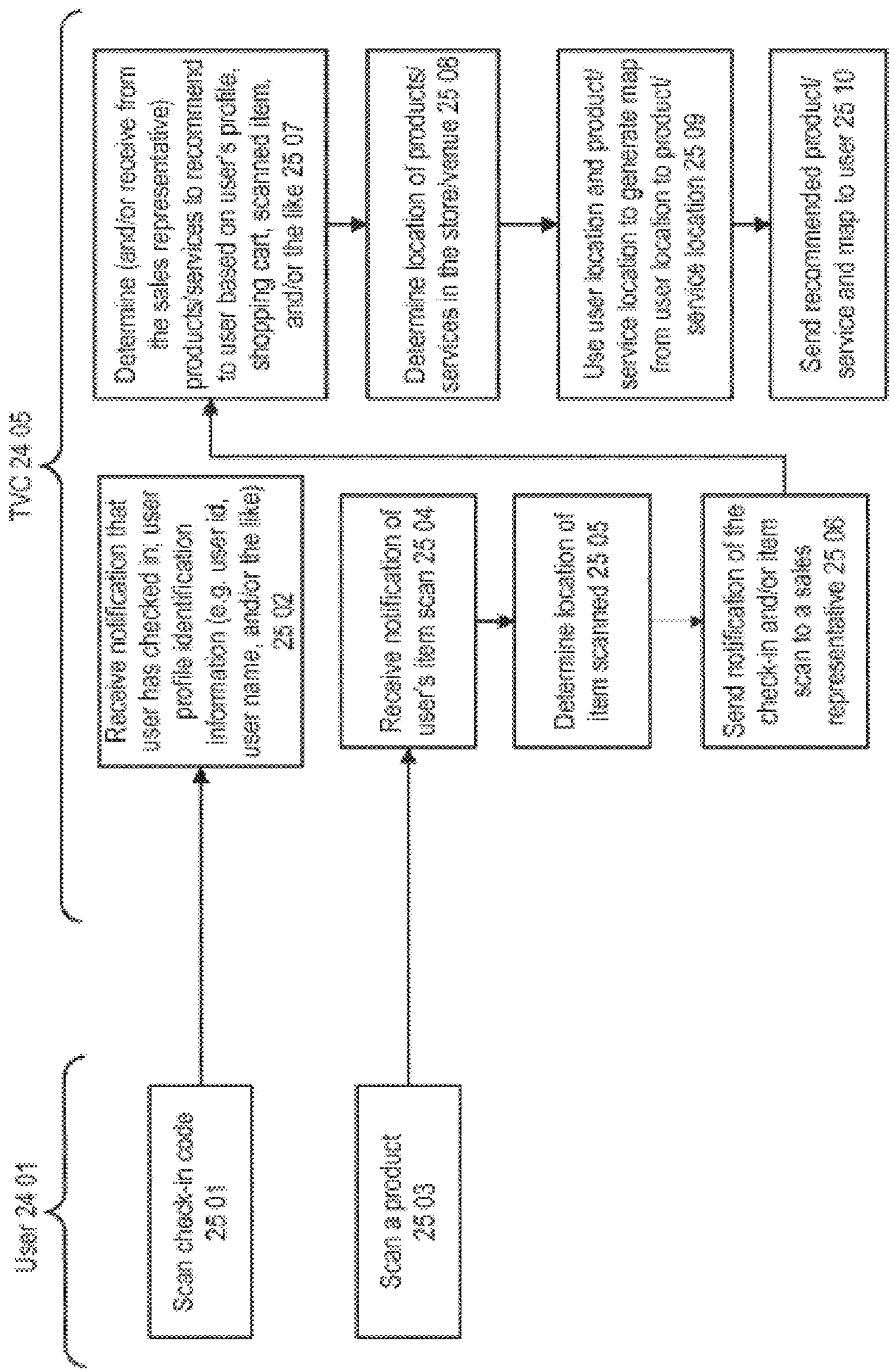
FIG. 36A shows a logic flow diagram illustrating checking into a store in some embodiments of the V-GLASSES.

FIG. 36*a* shows a logic flow diagram illustrating checking into a store in some embodiments of the V-GLASSES. In some implementations, the user may scan a check-in code 2501, which may allow V-GLASSES to receive a notification 2502 that the user has checked in, and may allow V-GLASSES to use the user profile identification information provided to create a store profile for the user. In some implementations, the user may scan a product 2503, which may cause V-GLASSES to receive notification of the user's item scan 2504, and may prompt V-GLASSES to determine where the user is based on the location of the scanned item 2505. In some implementations, V-GLASSES may then send a notification of the check-in and/or the item scan to a sale's representative 2506. V-GLASSES may then determine (or may receive from the sale's representative) at least one product and/or service to recommend to the user 2507, based on the user's profile, shopping cart, scanned item, and/or the like. V-GLASSES may then determine the location of the recommended product and/or service 2508, and may use the user's location and the location of the recommended product and/or service to generate a map from the user's location to the recommended product and/or service 2509. V-GLASSES may then send the recommended product and/or service, along with the generated map, to the user 2510, so that the user may find its way to the recommended product and add it to a shopping cart if desired.

Figure 36B:
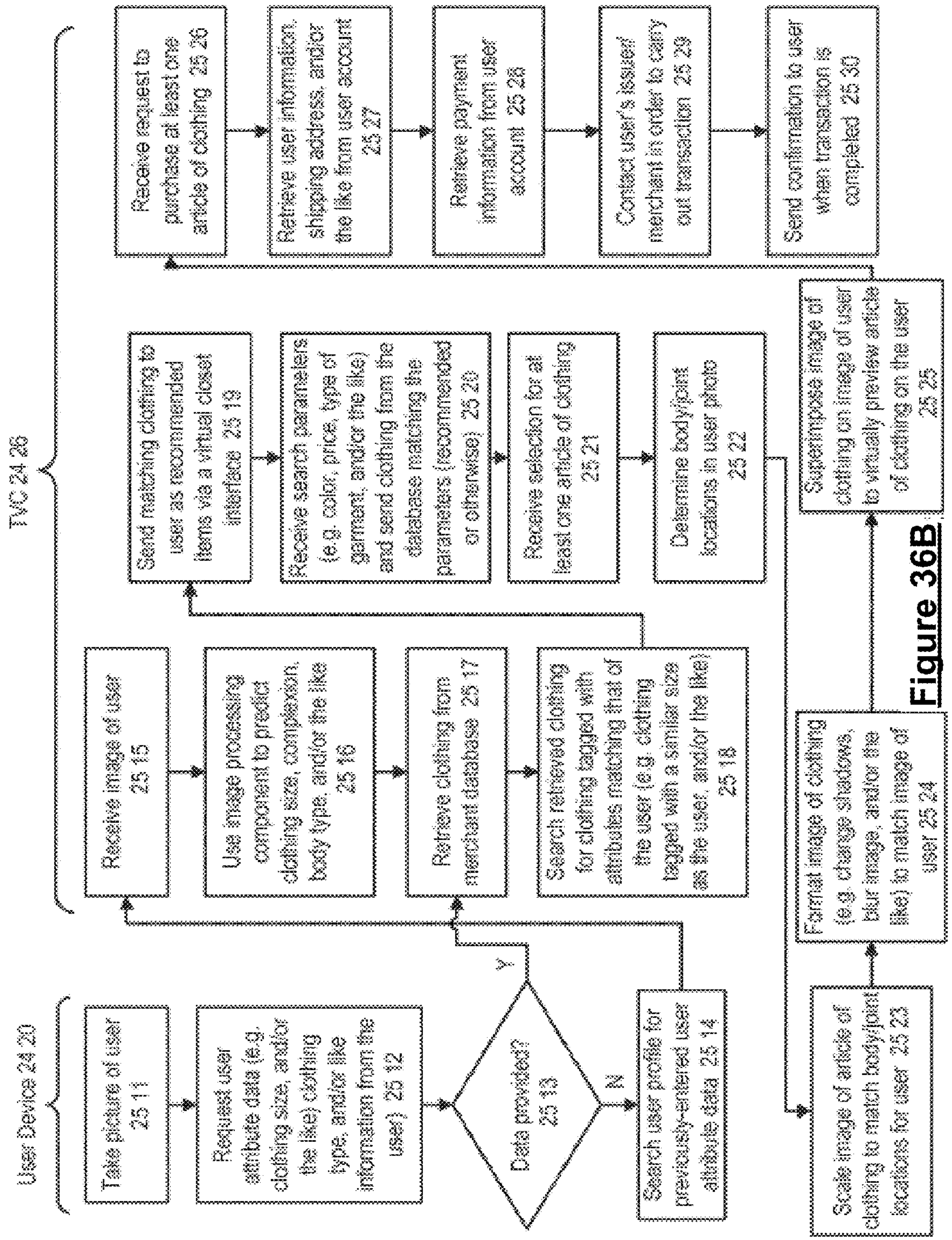
FIG. 36B shows a logic flow diagram illustrating accessing a virtual store in some embodiments of the V-GLASSES.

FIG. 36*b* shows a logic flow diagram illustrating accessing a virtual store in some embodiments of the V-GLASSES. In some implementations, the user's device may take a picture 2511 of the user, and may request from the user attribute data 2512, such as clothing size, clothing type, and/or like information. If the user chooses not to provide information 2513, the electronic device may access the user profile in the V-GLASSES database in order to see if any previously-entered user attribute data exists 2514. In some implementations, anything found is sent with the user image to V-GLASSES 2515. If little to no user attribute information is provided, V-GLASSES may use an image processing component to predict the user's clothing size, complexion, body type, and/or the like 2516, and may retrieve clothing from the database 2517. In some implementations, if the user chose to provide information 2513, then V-GLASSES automatically searches the database 2517 for clothing without attempting to predict the user's clothing size and/or the like. In some implementations, V-GLASSES may use the user attributes and search criteria to search the retrieved clothing 2518 for any clothing tagged with attributes matching that of the user (e.g. clothing tagged with a similar size as the user, and/or the like). V-GLASSES may send the matching clothing to the user 2519 as recommended items to preview via a virtual closet interface. Depending upon further search parameters provided by the user (e.g., new colors, higher or lower prices, and/or the like), V-GLASSES may update the clothing loaded into the virtual closet 2520 based on the further search parameters (e.g., may only load red clothing if the user chooses to only see the red clothing in the virtual closet, and/or the like).

In some implementations, the user may provide a selection of at least one article of clothing to try on 2521, prompting V-GLASSES to determine body and/or joint locations and markers in the user photo 2522, and to scale the image of the article of clothing to match the user image 2523, based on those body and/or joint locations and markers. In some implementations, V-GLASSES may also format the clothing image 2524, including altering shadows in the image, blurring the image, and/or the like, in order to match the look of the clothing image to the look of the user image. V-GLASSES may superimpose 2525 the clothing image on the user image to allow the user to virtually preview the article of clothing on the user, and may allow the user to change options such as the clothing color, size, and/or the like while the article of clothing is being previewed on the user. In some implementations, V-GLASSES may receive a request to purchase at least one article of clothing 2526, and may retrieve user information 2527, including the user's ID, shipping address, and/or the like. V-GLASSES may further retrieve the user's payment information 2528, including the user's preferred payment device or account, and/or the like, and may contact the user's issuer (and that of the merchant) 2529 in order to process the transaction. V-GLASSES may send a confirmation to the user when the transaction is completed 2530.

Figure 37A:
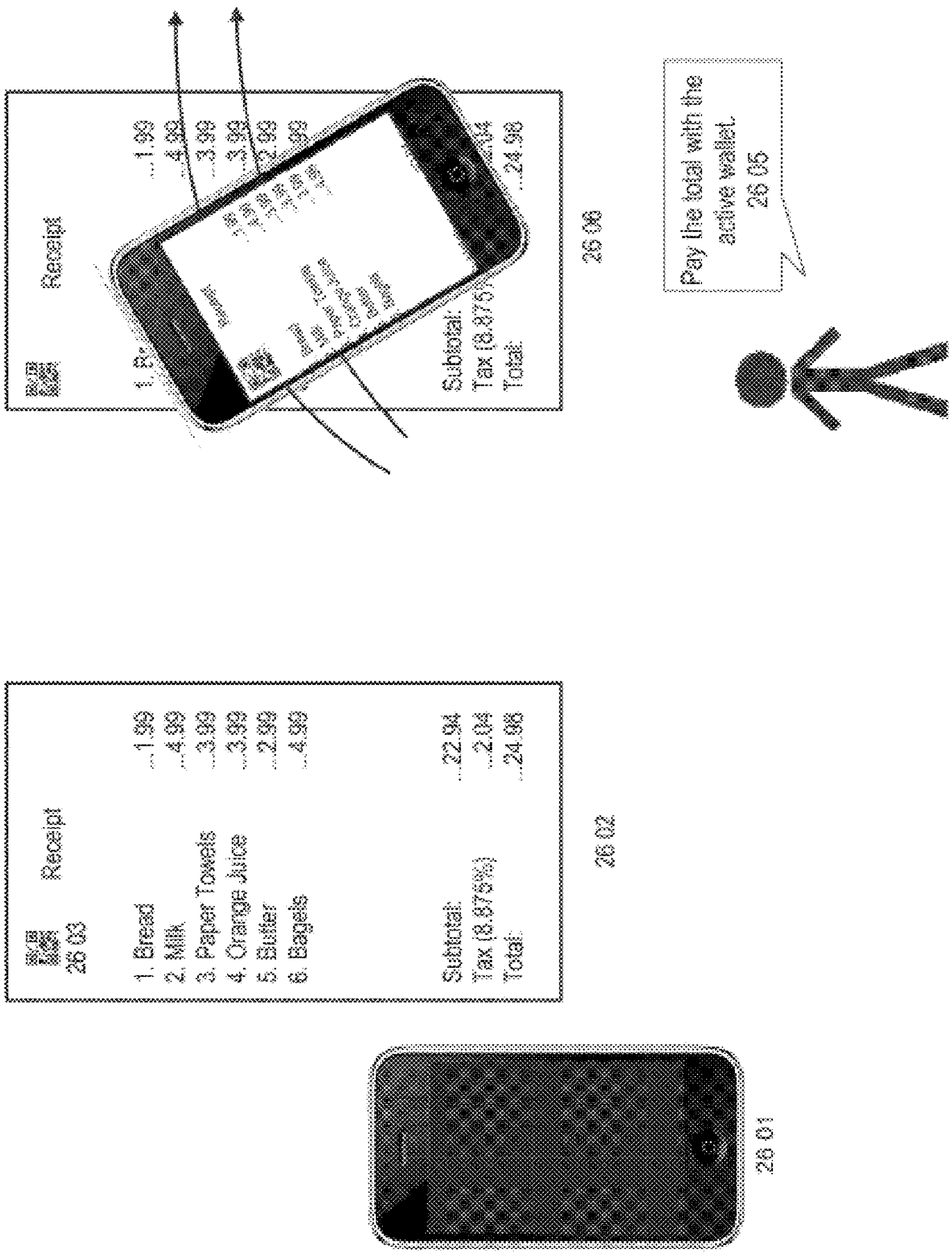
FIGS. 37A-37C show schematic diagrams illustrating initiating transactions in some embodiments of the V-GLASSES.

FIGS. 36*a-d* show schematic diagrams illustrating initiating transactions in some embodiments of the V-GLASSES. In some implementations, as shown in FIG. 37*a*, the user 2604 may have an electronic device 2601 which may be a camera-enabled device. In some implementations, the user may also have a receipt 2602 for the transaction, which may include a QR code 2603. The user may give the vocal command "Pay the total with the active wallet" 2605, and may swipe the electronic device over the receipt 2606 in order to perform a gesture. In such implementations, the electronic device may record both the audio of the vocal command and a video (or a set of images) for the gesture, and V-GLASSES may track the position of the QR code in the recorded video and/or images in order to determine the attempted gesture. V-GLASSES may then prompt the user to confirm that the user would like to pay the total on the receipt using the active wallet on the electronic device and, if the user confirms the action, may carry out the transaction using the user's account information.

Figure 37B:
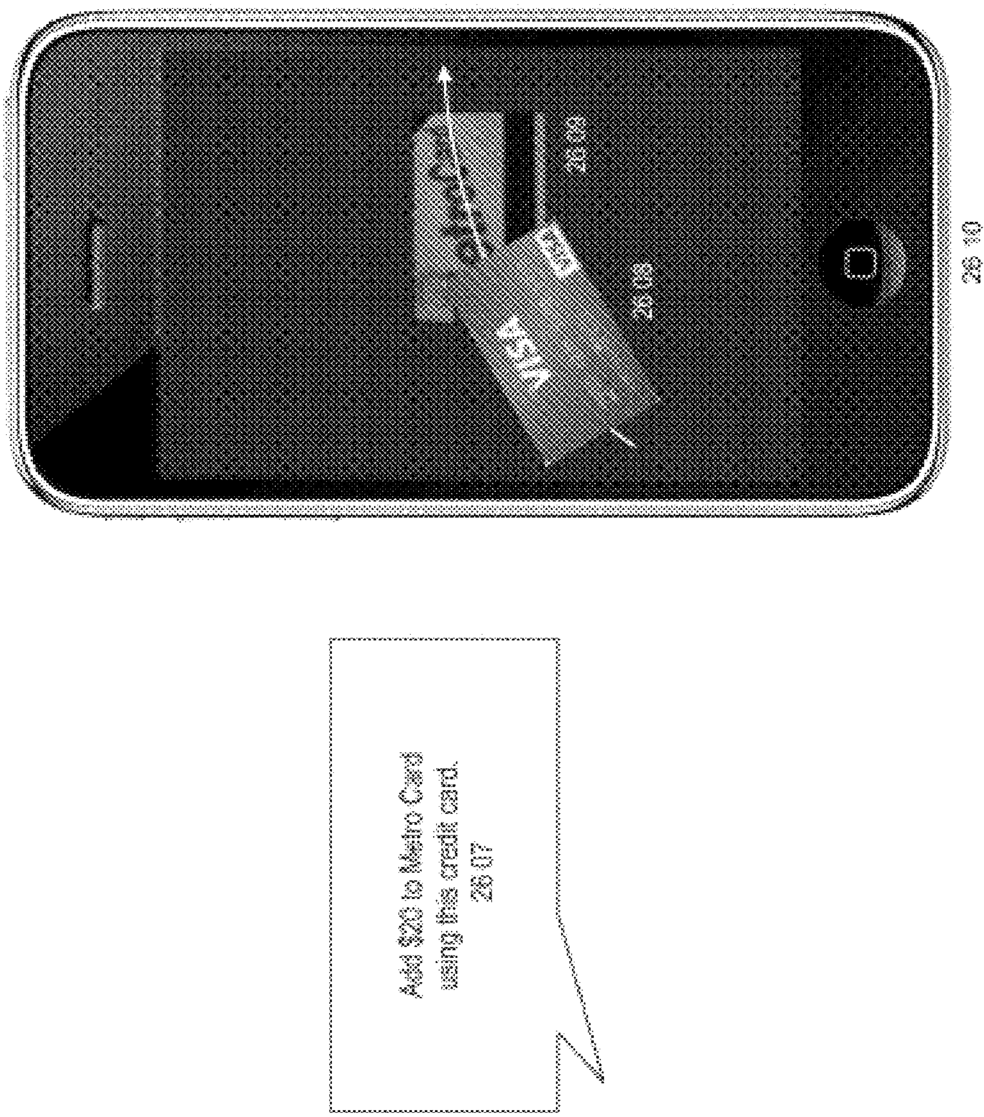

As shown in FIG. 37*b*, in some implementations, the user may have a payment device 2608, which they want to use to transfer funds to another payment device 2609. Instead of gesturing with the electronic device 2610, the user may use the electronic device to record a gesture involving swiping the payment device 2608 over payment device 2609, while giving a vocal command such as "Add $20 to Metro Card using this credit card" 2607. In such implementations, V-GLASSES will determine which payment device is the credit card, and which is the Metro Card, and will transfer funds from the account of the former to the account of the latter using the user's account information, provided the user confirms the transaction.

Figure 37C:
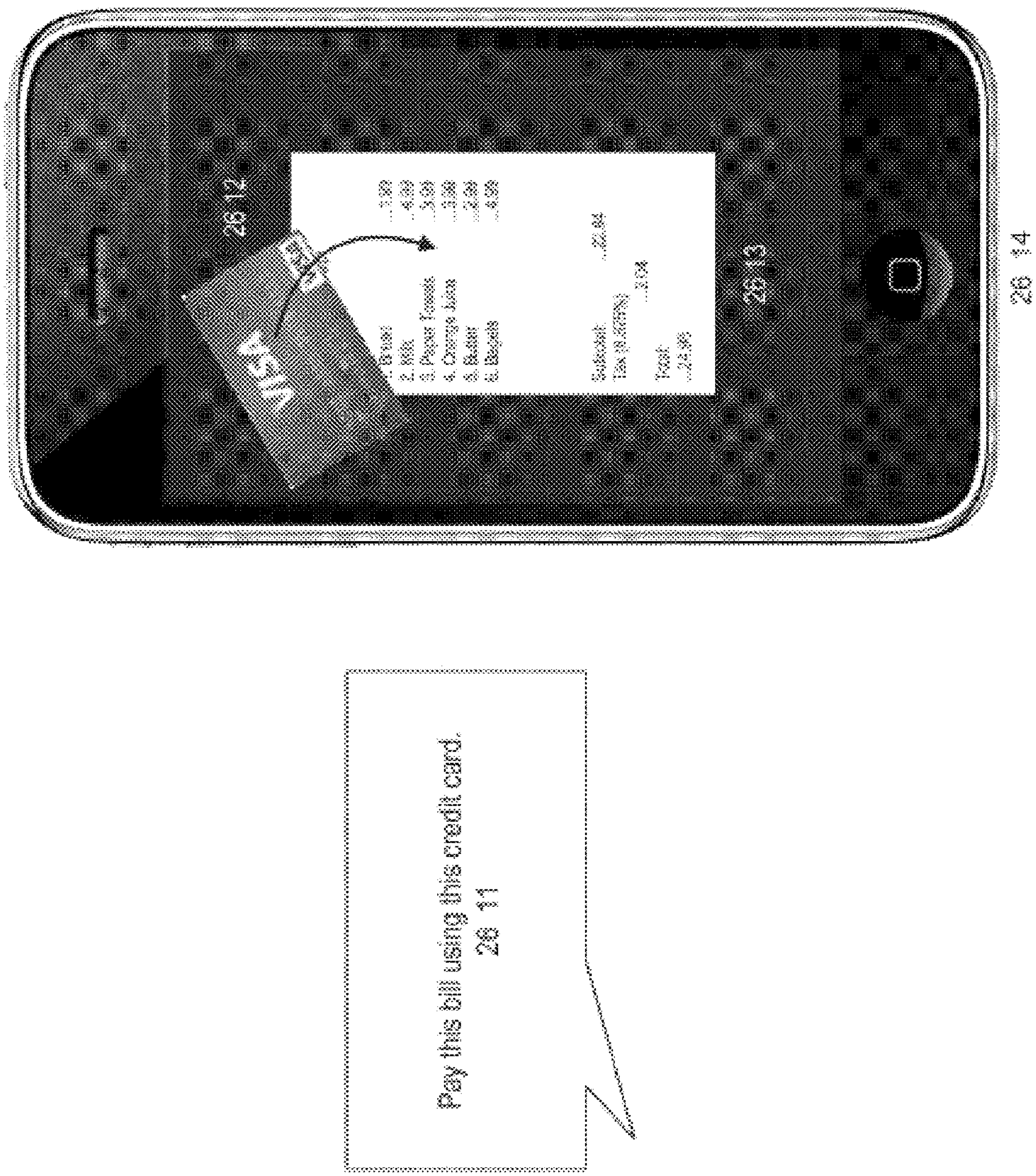

As shown in FIG. 37*c*, in some implementations, the user may wish to use a specific payment device 2612 to pay the balance of a receipt 2613. In such implementations, the user may use electronic device 2614 to record the gesture of tapping the payment device on the receipt, along with a vocal command such as "Pay this bill using this credit card" 2611. In such implementations, V-GLASSES will use the payment device specified (i.e., the credit card) to pay the entirety of the bill specified in the receipt.

Figure 38:
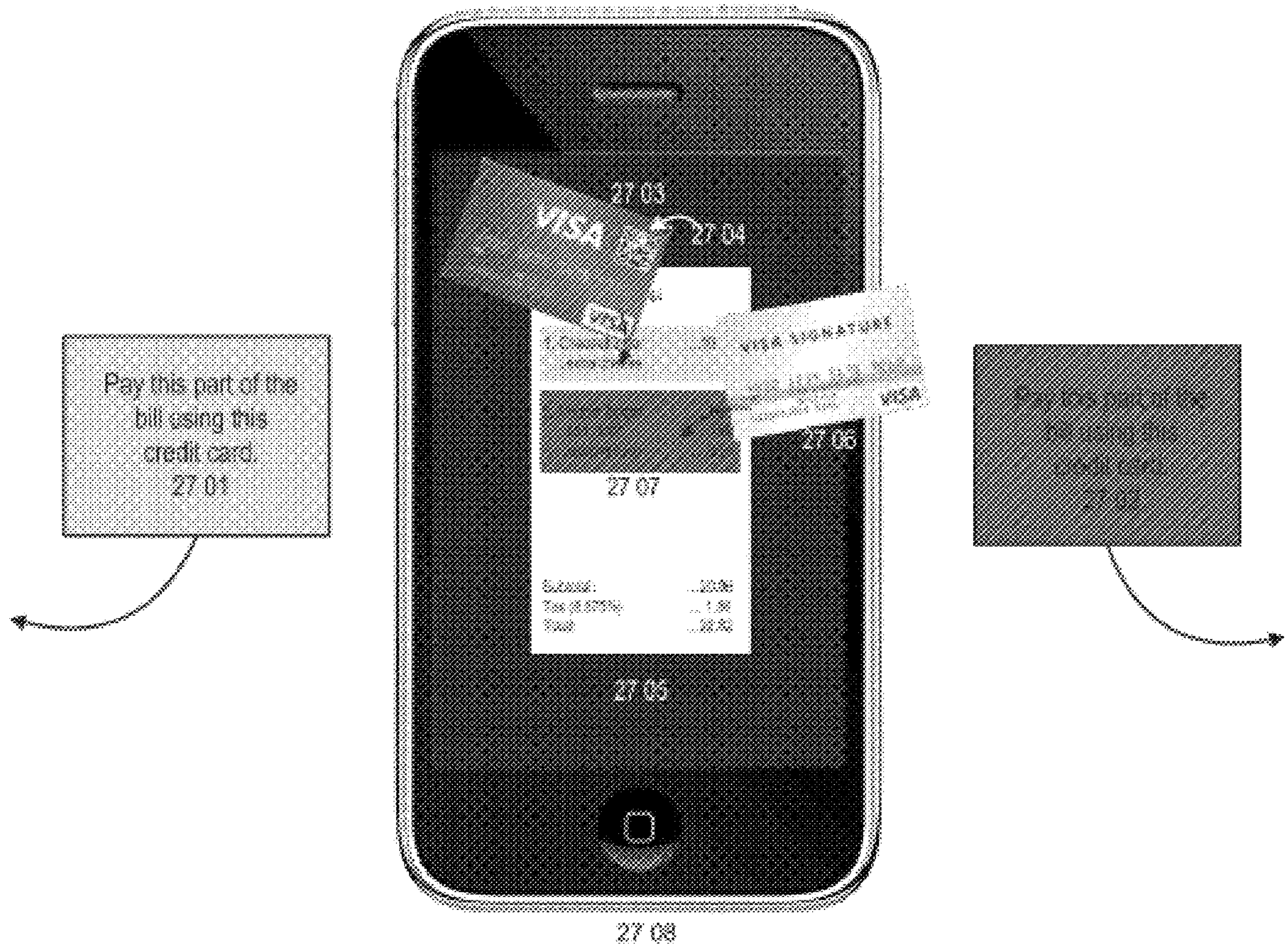
FIG. 38 shows a schematic diagram illustrating multiple parties initiating transactions in some embodiments of the V-GLASSES.

FIG. 38 shows a schematic diagram illustrating multiple parties initiating transactions in some embodiments of the V-GLASSES. In some implementations, one user with a payment device 2703, which has its own QR code 2704, may wish to only pay for part of a bill on a receipt 2705. In such implementations, the user may tap only the part(s) of the bill which contains the items the user ordered or wishes to pay for, and may give a vocal command such as "Pay this part of the bill using this credit card" 2701. In such implementations, a second user with a second payment device 2706, may also choose to pay for a part of the bill, and may also tap the part of the bill that the second user wishes to pay for. In such implementations, the electronic device 2708 may not only record the gestures, but may create an AR overlay on its display, highlighting the parts of the bill that each person is agreeing to pay for 2705 in a different color representative of each user who has made a gesture and/or a vocal command. In such implementations, V-GLASSES may use the gestures recorded to determine which payment device to charge which items to, may calculate the total for each payment device, and may initiate the transactions for each payment device.

Figure 39:
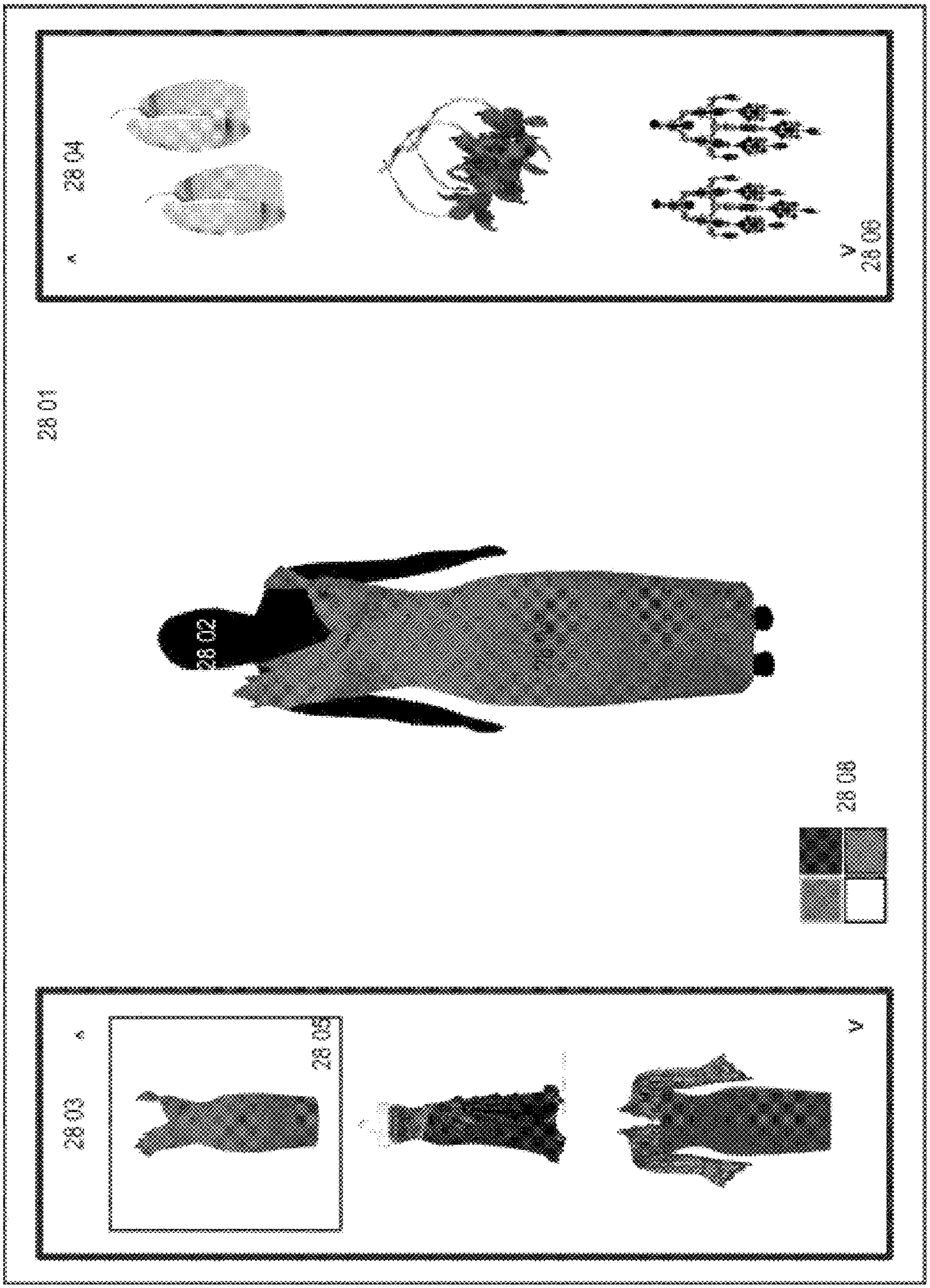
FIG. 39 shows a schematic diagram illustrating a virtual closet in some embodiments of the V-GLASSES.

FIG. 39 shows a schematic diagram illustrating a virtual closet in some embodiments of the V-GLASSES. In some implementations, the virtual closet 2801 may display an image 2802 of the user, as well as a selection of clothing 2803, accessories 2804, and/or the like. In some implementations, if the user selects an item 2805, a box will encompass the selection to indicate that it has been selected, and an image of the selection (scaled to the size of the user and edited in order to match the appearance of the user's image) may be superimposed on the image of the user. In some implementations, the user may have a real-time video feed of his/herself shown rather than an image, and the video feed may allow for the user to move and simulate the movement of the selected clothing on his or her body. In some implementations, V-GLASSES may be able to use images of the article of clothing, taken at different angles, to create a 3-dimensional model of the piece of clothing, such that the user may be able to see it move accurately as the user moves in the camera view, based on the clothing's type of cloth, length, and/or the like. In some implementations, the user may use buttons 2806 to scroll through the various options available based on the user's search criteria. The user may also be able to choose multiple options per article of clothing, such as other colors 2808, other sizes, other lengths, and/or the like.

Figure 40:
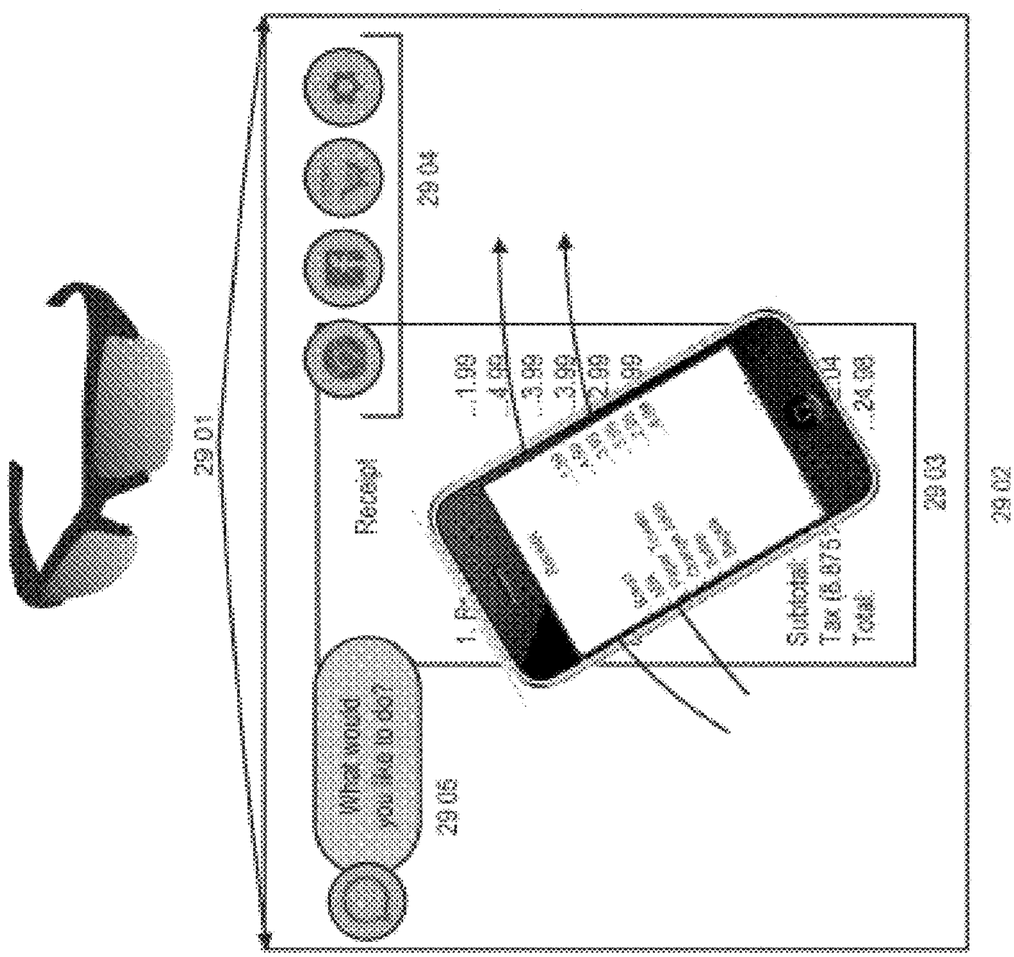
FIG. 40 shows a schematic diagram illustrating an augmented reality interface for receipts in some embodiments of the V-GLASSES.

FIG. 40 shows a schematic diagram illustrating an augmented reality interface for receipts in some embodiments of the V-GLASSES. In some implementations, the user may use smart glasses, contacts, and/or a like device 2901 to interact with V-GLASSES using an AR interface 2902. The user may see in a heads-up display (HUD) overlay at the top of the user's view a set of buttons 2904 that may allow the user to choose a variety of different applications to use in conjunction with the viewed item (e.g., the user may be able to use a social network button to post the receipt, or another viewed item, to their social network profile, may use a store button to purchase a viewed item, and/or the like). The user may be able to use the smart glasses to capture a gesture involving an electronic device and a receipt 2903. In some implementations, the user may also see an action prompt 2905, which may allow the user to capture the gesture and provide a voice command to the smart glasses, which may then inform V-GLASSES so that it may carry out the transaction.

Figure 41:
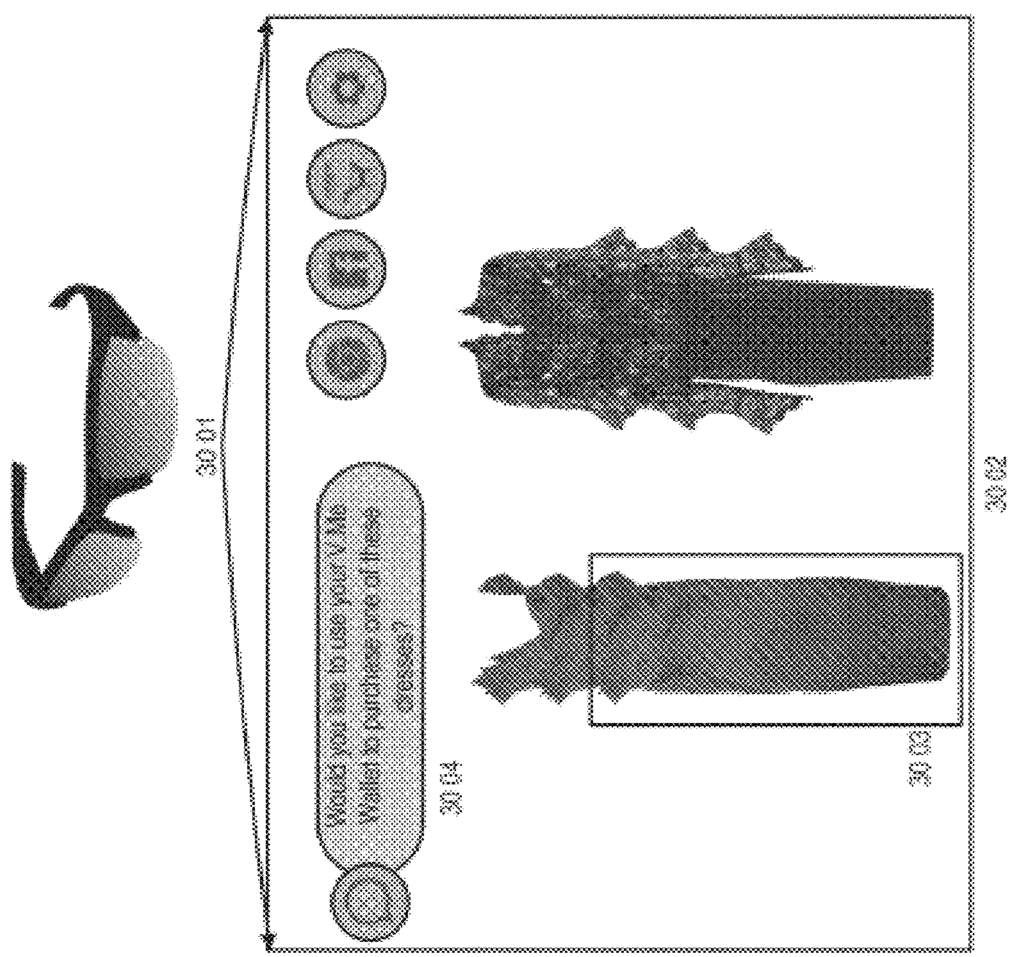
FIG. 41 shows a schematic diagram illustrating an augmented reality interface for products in some embodiments of the V-GLASSES.

FIG. 41 shows a schematic diagram illustrating an augmented reality interface for products in some embodiments of the V-GLASSES. In some implementations, the user may use smart glasses 3001 in order to use AR overlay view 3002. In some implementations, a user may, after making a gesture with the user's electronic device and a vocal command indicating a desire to purchase a clothing item 3003, see a prompt in their AR HUD overlay 3004 which confirms their desire to purchase the clothing item, using the payment method specified. The user may be able to give the vocal command "Yes," which may prompt V-GLASSES to initiate the purchase of the specified clothing.

Additional Features of a V-GLASSES Electronic Wallet

Figure 42:
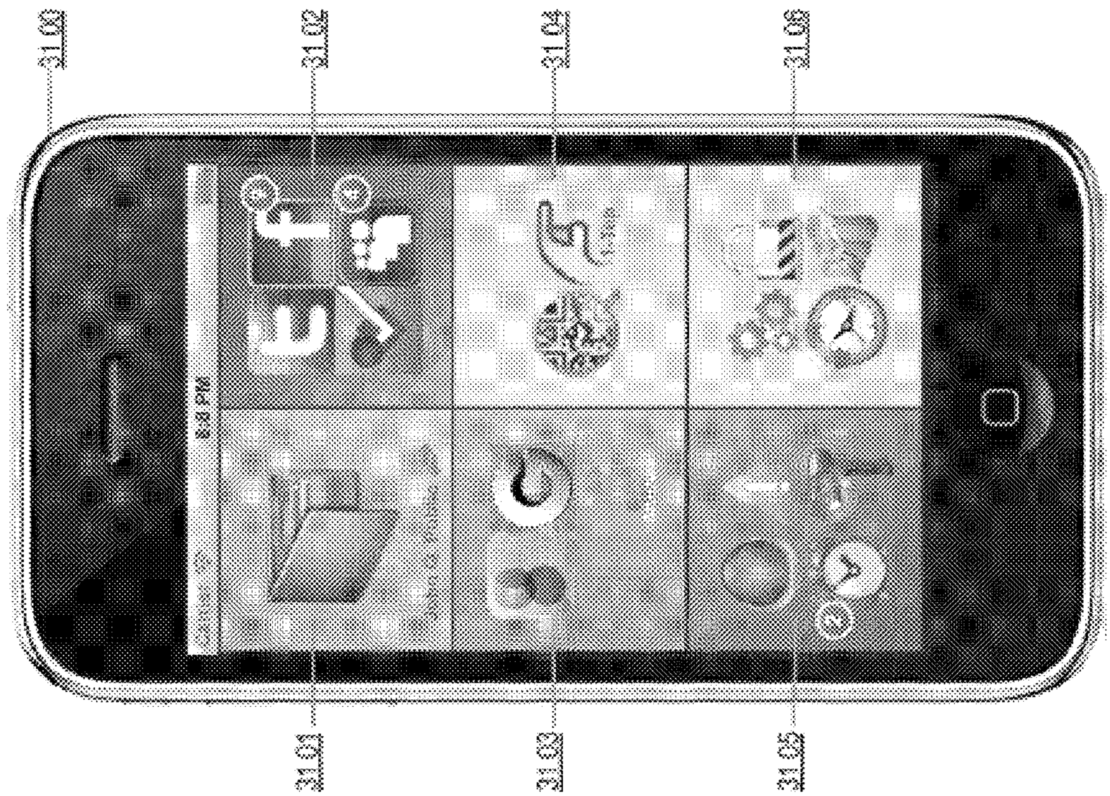
FIG. 42 shows a user interface diagram illustrating an overview of example features of virtual wallet applications in some embodiments of the V-GLASSES.

FIG. 42 shows a user interface diagram illustrating an overview of example features of virtual wallet applications in some embodiments of the V-GLASSES. FIG. 42 shows an illustration of various exemplary features of a virtual wallet mobile application 3100. Some of the features displayed include a wallet 3101, social integration via TWITTER, FACEBOOK, etc., offers and loyalty 3103, snap mobile purchase 3104, alerts 3105 and security, setting and analytics 3196. These features are explored in further detail below. It is to be understood that the various example features described herein may be implemented on a consumer device and/or on a device of a consumer service representative assisting a consumer user during the consumer's shopping experience in a physical or virtual store. Examples of consumer devices and/or customer service representative device include, without limitation: personal computer(s), and/or various mobile device(s) including, but not limited to, cellular telephone(s), Smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), and/or the like. In various embodiments, a subset of the features described herein may be implemented on a consumer device, while another subset (which may have some overlapping features with those, in some embodiments) may be implemented on a consumer service representative's device.

Figure 43A:
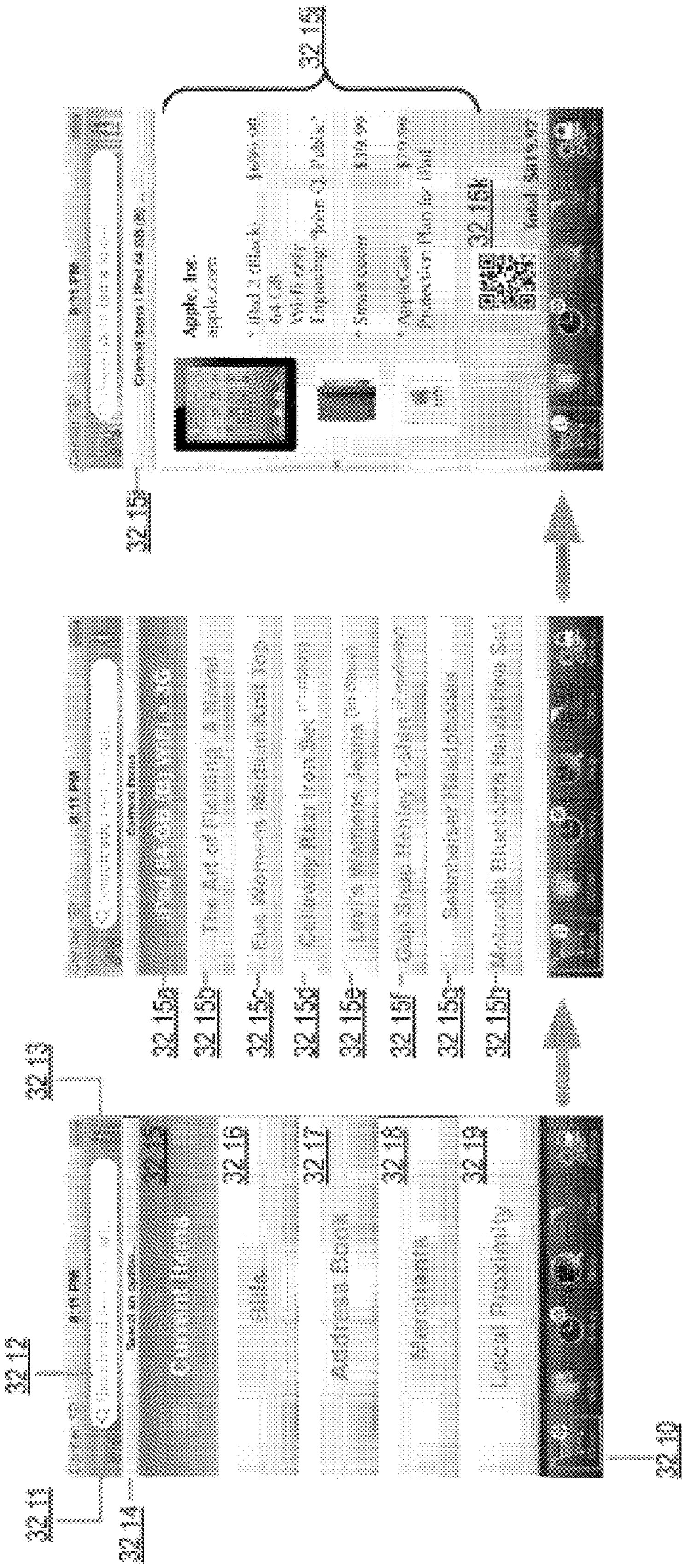
FIGS. 43A-43G show user interface diagrams illustrating example features of virtual wallet applications in a shopping mode, in some embodiments of the V-GLASSES.

FIGS. 43A-G show user interface diagrams illustrating example features of virtual wallet applications in a shopping mode, in some embodiments of the V-GLASSES. With reference to FIG. 43A, some embodiments of the virtual wallet mobile app facilitate and greatly enhance the shopping experience of consumers. A variety of shopping modes, as shown in FIG. 43A, may be available for a consumer to peruse. In one implementation, for example, a user may launch the shopping mode by selecting the shop icon 3210 at the bottom of the user interface. A user may type in an item in the search field 3212 to search and/or add an item to a cart 3211. A user may also use a voice activated shopping mode by saying the name or description of an item to be searched and/or added to the cart into a microphone 3213. In a further implementation, a user may also select other shopping options 3214 such as current items 3215, bills 3216, address book 3217, merchants 3218 and local proximity 3219.

In one embodiment, for example, a user may select the option current items 3215, as shown in the left most user interface of FIG. 43A. When the current items 3215 option is selected, the middle user interface may be displayed. As shown, the middle user interface may provide a current list of items 3215*a-h* in a user's shopping cart 3211. A user may select an item, for example item 3215*a*, to view product description 3215*j* of the selected item and/or other items from the same merchant. The price and total payable information may also be displayed, along with a QR code 3215*k* that captures the information necessary to effect a snap mobile purchase transaction.

Figure 43B:
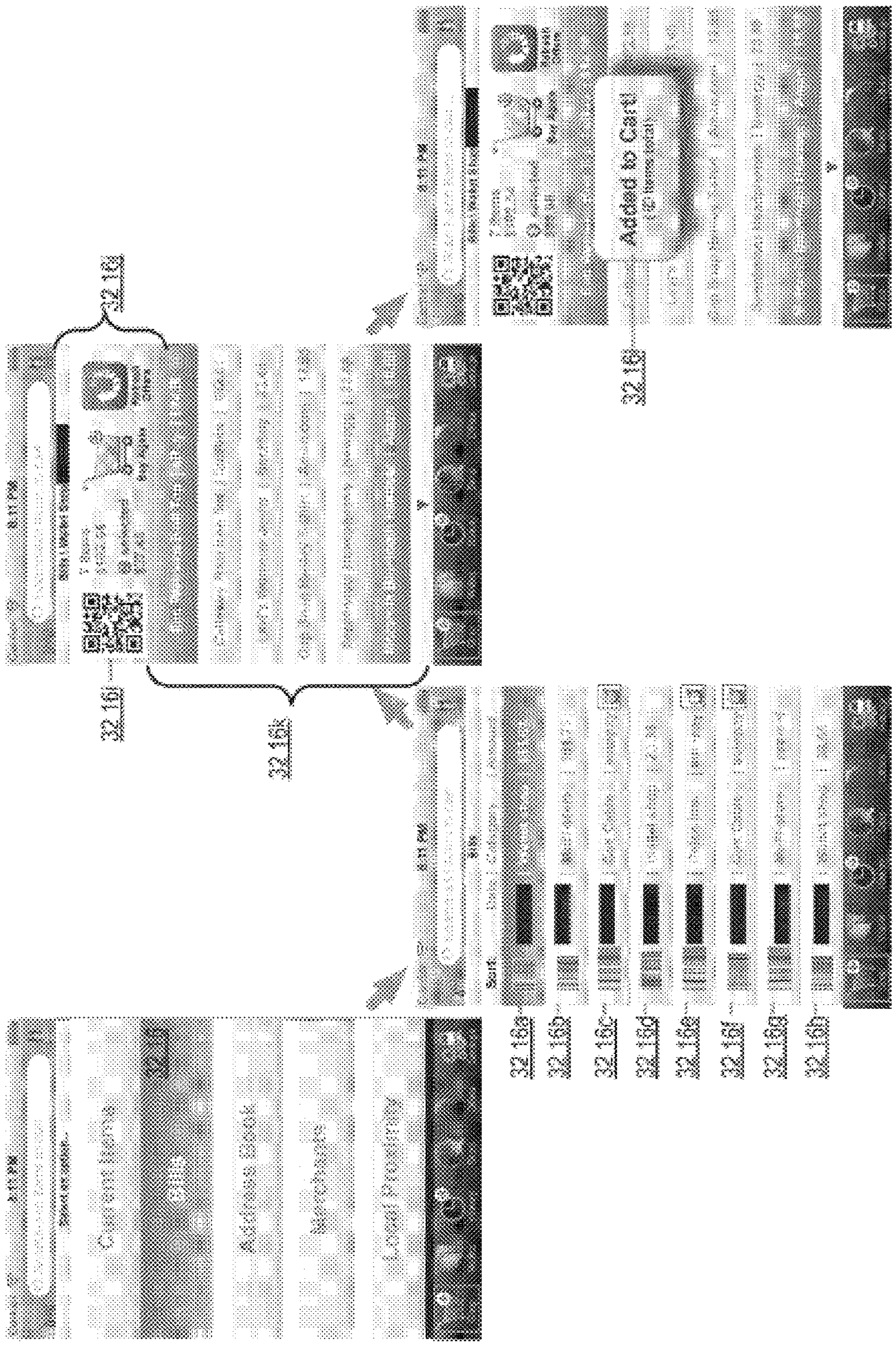

With reference to FIG. 43B, in another embodiment, a user may select the bills 3216 option. Upon selecting the bills 3216 option, the user interface may display a list of bills and/or receipts 3216*a-h* from one or more merchants. Next to each of the bills, additional information such as date of visit, whether items from multiple stores are present, last bill payment date, auto-payment, number of items, and/or the like may be displayed. In one example, the wallet shop bill 3216*a* dated Jan. 20, 2011 may be selected. The wallet shop bill selection may display a user interface that provides a variety of information regarding the selected bill. For example, the user interface may display a list of items 3216*k* purchased, <<3216*i*>>, a total number of items and the corresponding value. For example, 7 items worth $102.54 were in the selected wallet shop bill. A user may now select any of the items and select buy again to add purchase the items. The user may also refresh offers 3216*j* to clear any invalid offers from last time and/or search for new offers that may be applicable for the current purchase. As shown in FIG. 43B, a user may select two items for repeat purchase. Upon addition, a message 3216*l* may be displayed to confirm the addition of the two items, which makes the total number of items in the cart 14.

Figure 43C:
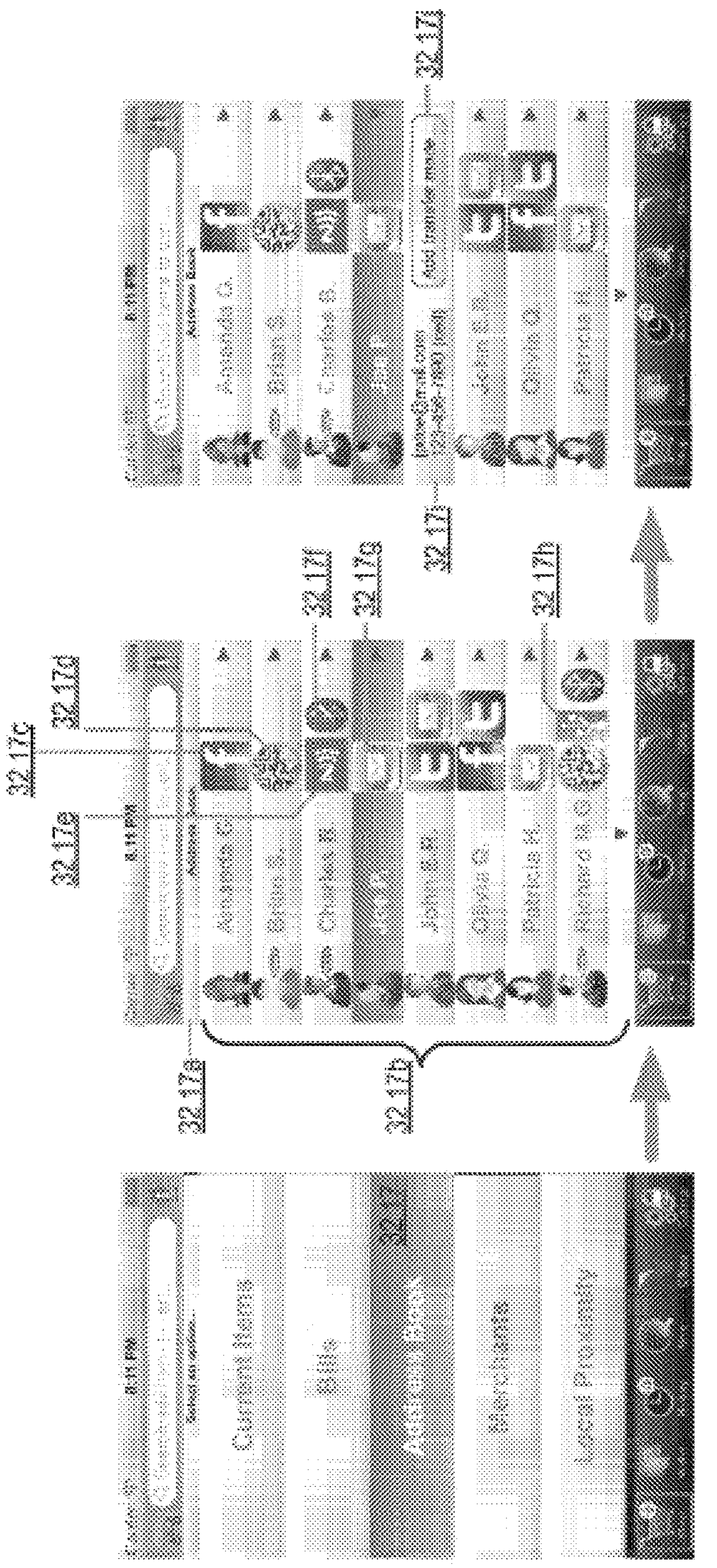

With reference to FIG. 43C, in yet another embodiment, a user may select the address book option 3217 to view the address book 3217*a* which includes a list of contacts 3217*b* and make any money transfers or payments. In one embodiment, the address book may identify each contact using their names and available and/or preferred modes of payment. For example, a contact Amanda G. may be paid via social pay (e.g., via FACEBOOK) as indicated by the icon 3217*c*. In another example, money may be transferred to Brian S. via QR code as indicated by the QR code icon 3217*d*. In yet another example, Charles B. may accept payment via near field communication 3217*e*, Bluetooth 3217*f* and email 3217*g*. Payment may also be made via USB 3217*h* (e.g., by physically connecting two mobile devices) as well as other social channels such as TWITTER.

Figure 43D:
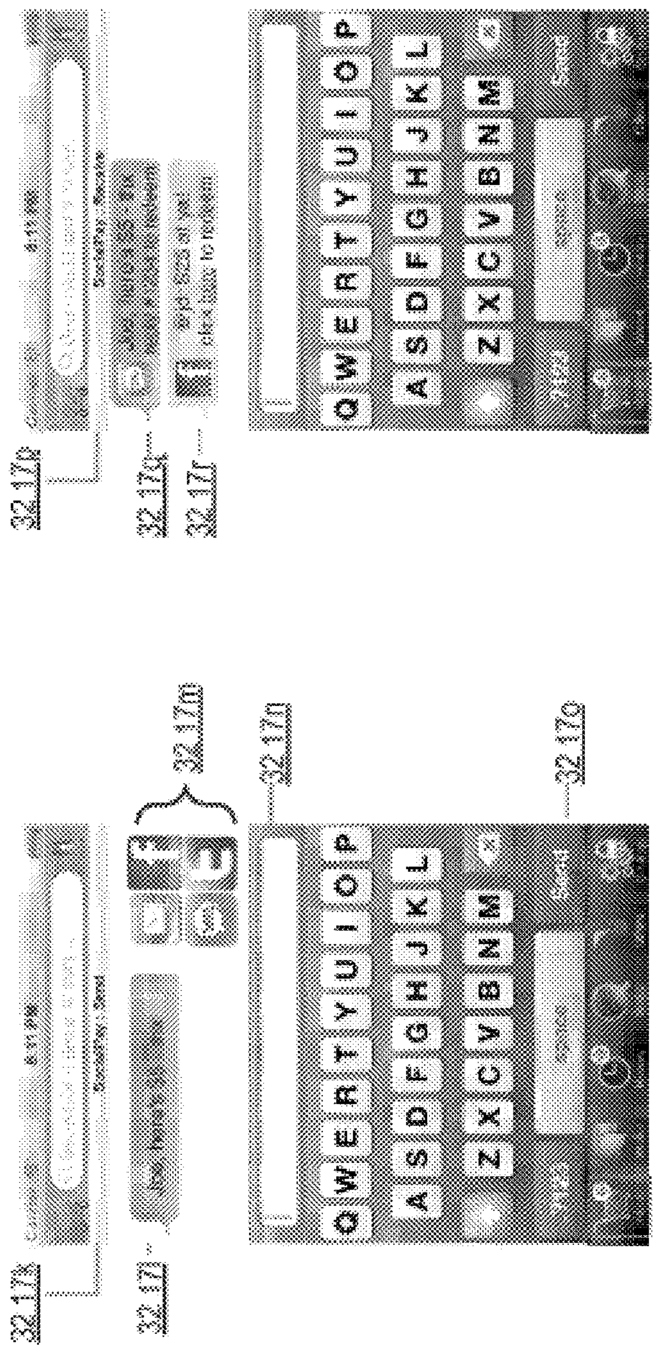

In one implementation, a user may select Joe P. for payment. Joe P., as shown in the user interface, has an email icon 3217*g* next to his name indicating that Joe P. accepts payment via email. When his name is selected, the user interface may display his contact information such as email, phone, etc. If a user wishes to make a payment to Joe P. by a method other than email, the user may add another transfer mode 3217*j* to his contact information and make a payment transfer. With reference to FIG. 43D, the user may be provided with a screen 3217*k* where the user can enter an amount to send Joe, as well as add other text to provide Joe with context for the payment transaction 3217*l*. The user can choose modes (e.g., SMS, email, social networking) via which Joe may be contacted via graphical user interface elements, 3217*m*. As the user types, the text entered may be provided for review within a GUI element 3217*n*. When the user has completed entering in the necessary information, the user can press the send button 3217*o* to send the social message to Joe. If Joe also has a virtual wallet application, Joe may be able to review 3217*p* social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 43D, the SMS 3217*q* Joe received indicates that Joe can redeem the $5 obtained via SMS by replying to the SMS and entering the hash tag value '#1234'. In the same illustration, Joe has also received a message 3217*r* via Facebook®, which includes a URL link that Joe can activate to initiate redemption of the $25 payment.

Figure 43E:
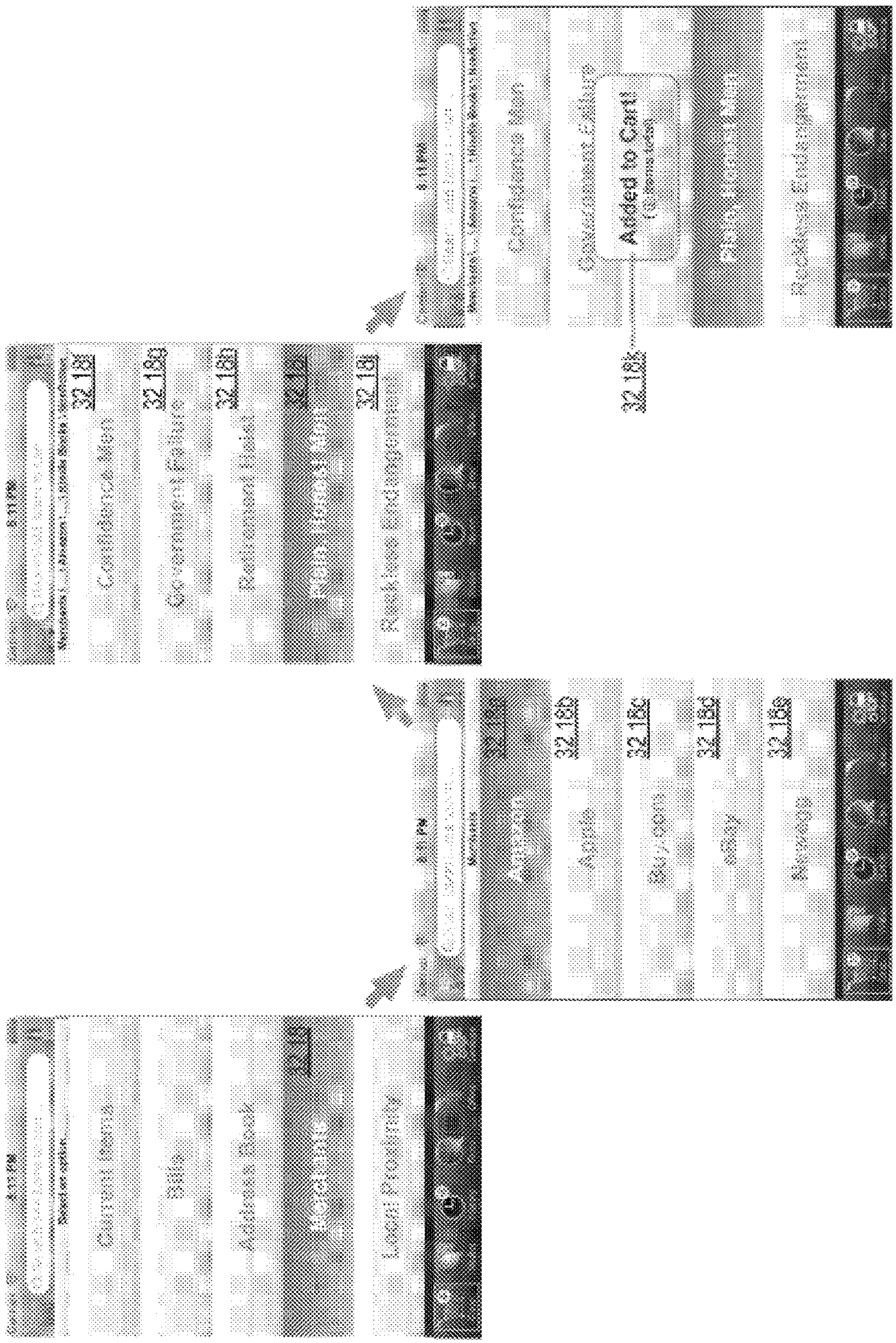

With reference to FIG. 43E, in some other embodiments, a user may select merchants 3218 from the list of options in the shopping mode to view a select list of merchants 3218*a-e*. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 3218*a* for example. The user may then navigate through the merchant's listings to find items of interest such as 3218*f-j*. Directly through the wallet and without visiting the merchant site from a separate page, the user may make a selection of an item 3218*j* from the catalog of Amazon 3218*a*. As shown in the right most user interface of FIG. 43D, the selected item may then be added to cart. The message 3218*k* indicates that the selected item has been added to the cart, and updated number of items in the cart is now 13.

Figure 43F:
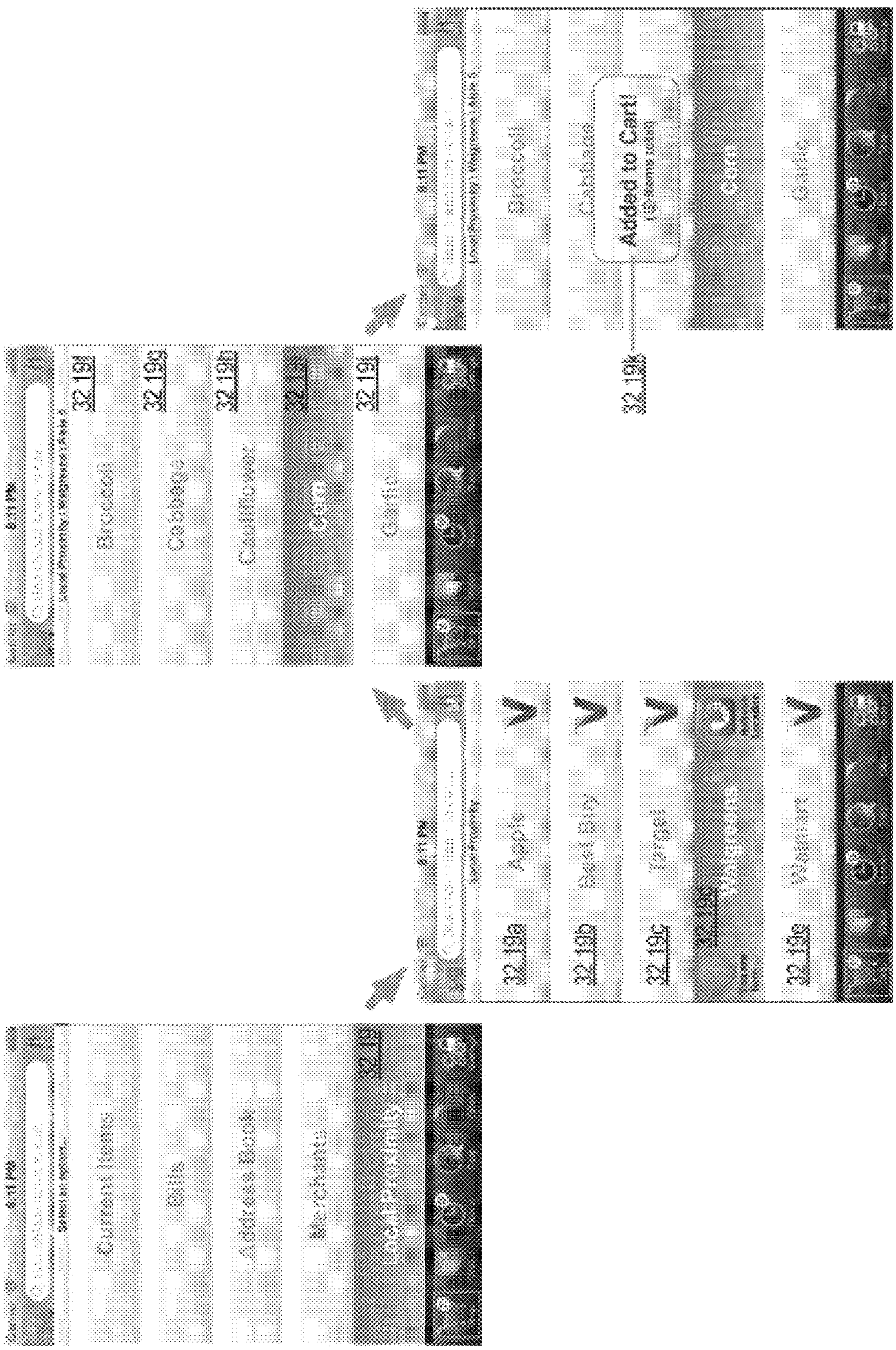

With reference to FIG. 43F, in one embodiment, there may be a local proximity option 3219 which may be selected by a user to view a list of merchants that are geographically in close proximity to the user. For example, the list of merchants 3219*a-e* may be the merchants that are located close to the user. In one implementation, the mobile application may further identify when the user in a store based on the user's location. For example, position icon 3219*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 3219*f-j* available on aisle 5 of Walgreens. In one implementation, the user may select corn 3219*i* from his or her mobile application to add to cart 3219*k*.

Figure 43G:
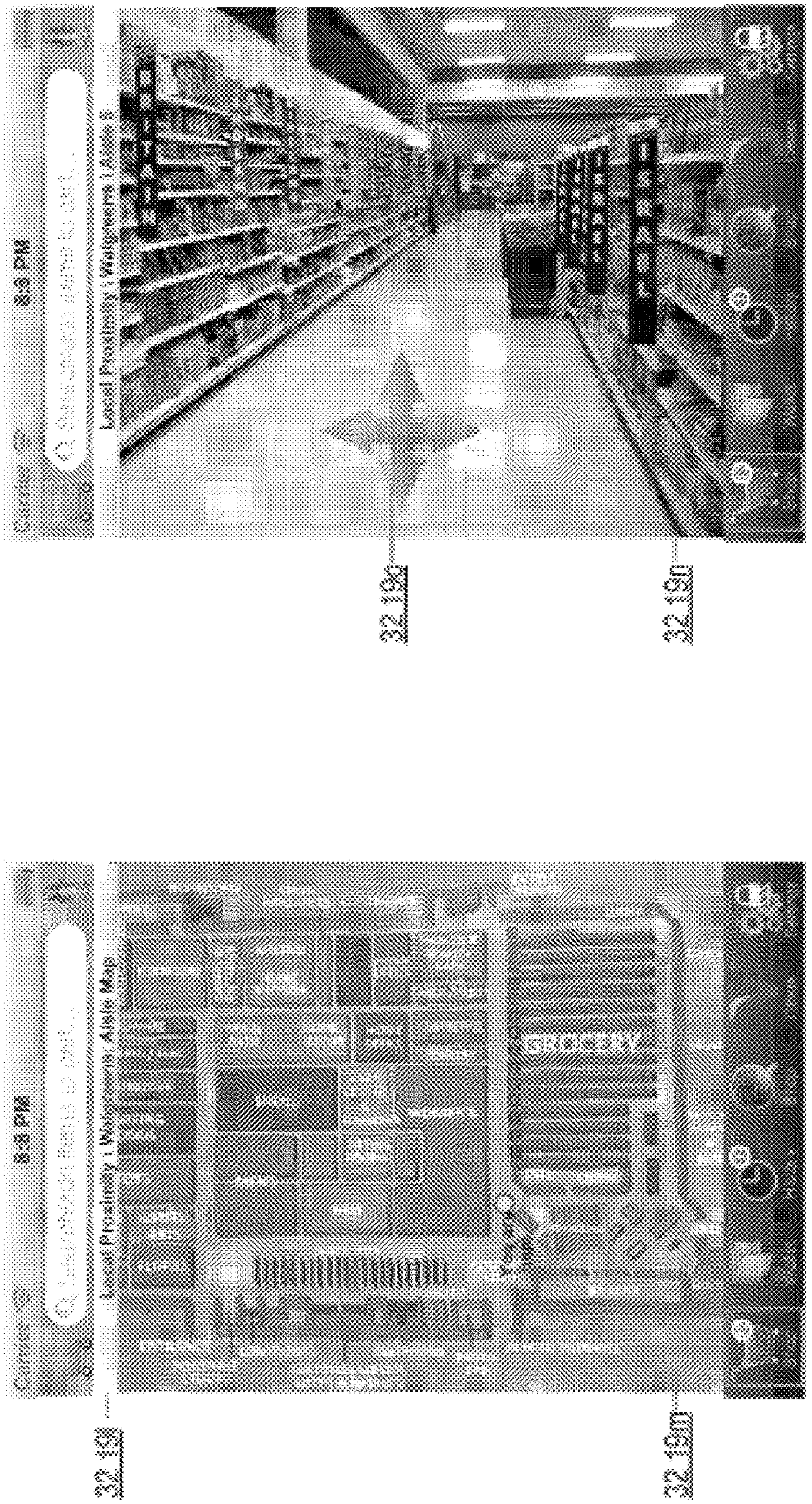
Figure 44A:
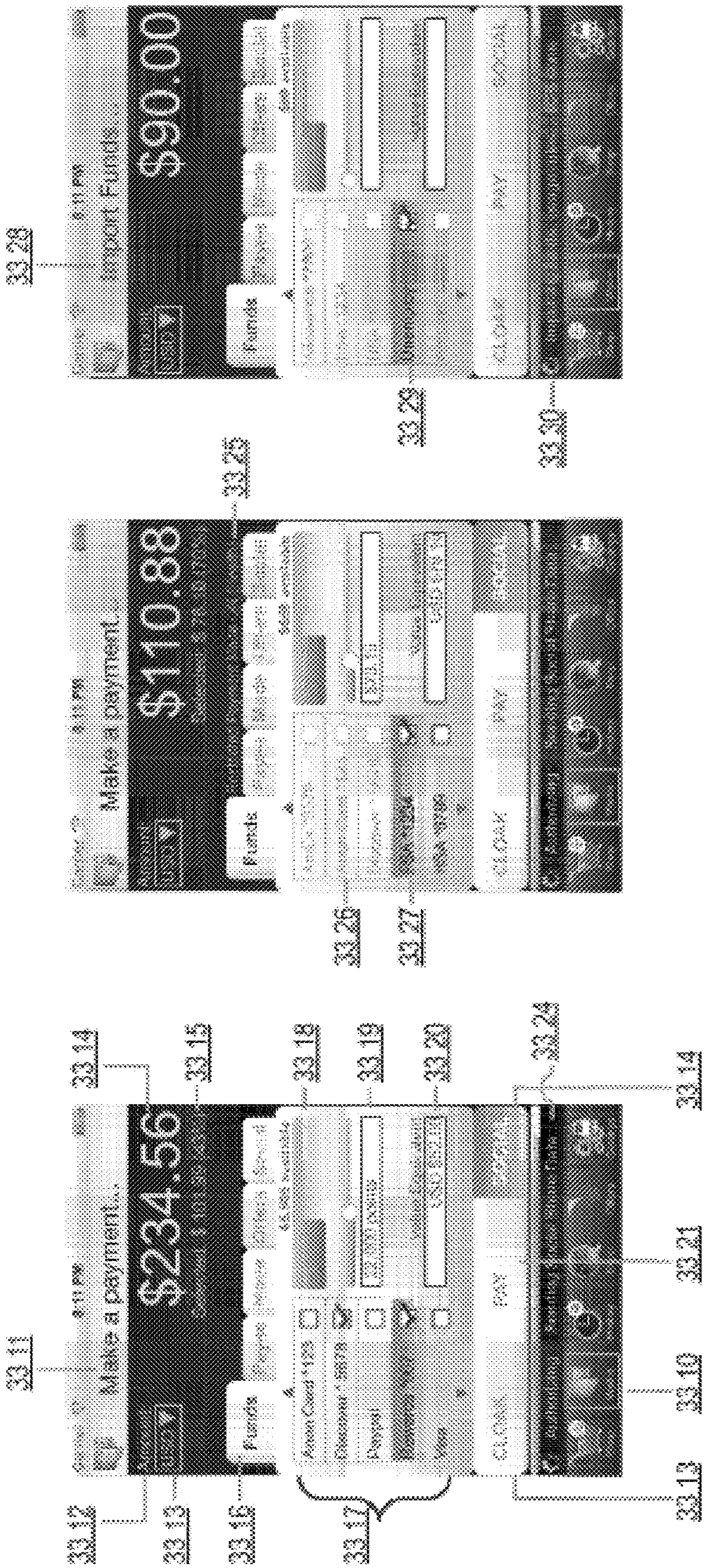
FIGS. 44A-44F show user interface diagrams illustrating example features of virtual wallet applications in a payment mode, in some embodiments of the V-GLASSES.

With reference to FIG. 43G, in another embodiment, the local proximity option 3219 may include a store map and a real time map features among others. For example, upon selecting the Walgreens store, the user may launch an aisle map 3219*l* which displays a map 3219*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 3219*n* may display images/video of the user's surrounding. For example, if the user is about to enter aisle 5, the store view map may show the view of aisle 5. Further the user may manipulate the orientation of the map using the navigation tool 3219*o* to move the store view forwards, backwards, right, left as well clockwise and counterclockwise rotation FIGS. 44A-F show user interface diagrams illustrating example features of virtual wallet applications in a payment mode, in some embodiments of the V-GLASSES. With reference to FIG. 44A, in one embodiment, the wallet mobile application may provide a user with a number of options for paying for a transaction via the wallet mode 3310. In one implementation, an example user interface 3311 for making a payment is shown. The user interface may clearly identify the amount 3312 and the currency 3313 for the transaction. The amount may be the amount payable and the currency may include real currencies such as dollars and euros, as well as virtual currencies such as reward points. The amount of the transaction 3314 may also be prominently displayed on the user interface. The user may select the funds tab 3316 to select one or more forms of payment 3317, which may include various credit, debit, gift, rewards and/or prepaid cards. The user may also have the option of paying, wholly or in part, with reward points. For example, the graphical indicator 3318 on the user interface shows the number of points available, the graphical indicator 3319 shows the number of points to be used towards the amount due 234.56 and the equivalent 3320 of the number of points in a selected currency (USD, for example).

In one implementation, the user may combine funds from multiple sources to pay for the transaction. The amount 3315 displayed on the user interface may provide an indication of the amount of total funds covered so far by the selected forms of payment (e.g., Discover card and rewards points). The user may choose another form of payment or adjust the amount to be debited from one or more forms of payment until the amount 3315 matches the amount payable 3314. Once the amounts to be debited from one or more forms of payment are finalized by the user, payment authorization may begin.

In one implementation, the user may select a secure authorization of the transaction by selecting the cloak button 3322 to effectively cloak or anonymize some (e.g., preconfigured) or all identifying information such that when the user selects pay button 3321, the transaction authorization is conducted in a secure and anonymous manner. In another implementation, the user may select the pay button 3321 which may use standard authorization techniques for transaction processing. In yet another implementation, when the user selects the social button 3323, a message regarding the transaction may be communicated to one of more social networks (set up by the user) which may post or announce the purchase transaction in a social forum such as a wall post or a tweet. In one implementation, the user may select a social payment processing option 3323. The indicator 3324 may show the authorizing and sending social share data in progress.

In another implementation, a restricted payment mode 3325 may be activated for certain purchase activities such as prescription purchases. The mode may be activated in accordance with rules defined by issuers, insurers, merchants, payment processor and/or other entities to facilitate processing of specialized goods and services. In this mode, the user may scroll down the list of forms of payments 3326 under the funds tab to select specialized accounts such as a flexible spending account (FSA) 3327, health savings account (HAS), and/or the like and amounts to be debited to the selected accounts. In one implementation, such restricted payment mode 1925 processing may disable social sharing of purchase information.

In one embodiment, the wallet mobile application may facilitate importing of funds via the import funds user interface 3328. For example, a user who is unemployed may obtain unemployment benefit fund 3329 via the wallet mobile application. In one implementation, the entity providing the funds may also configure rules for using the fund as shown by the processing indicator message 3330. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

Figure 44B:
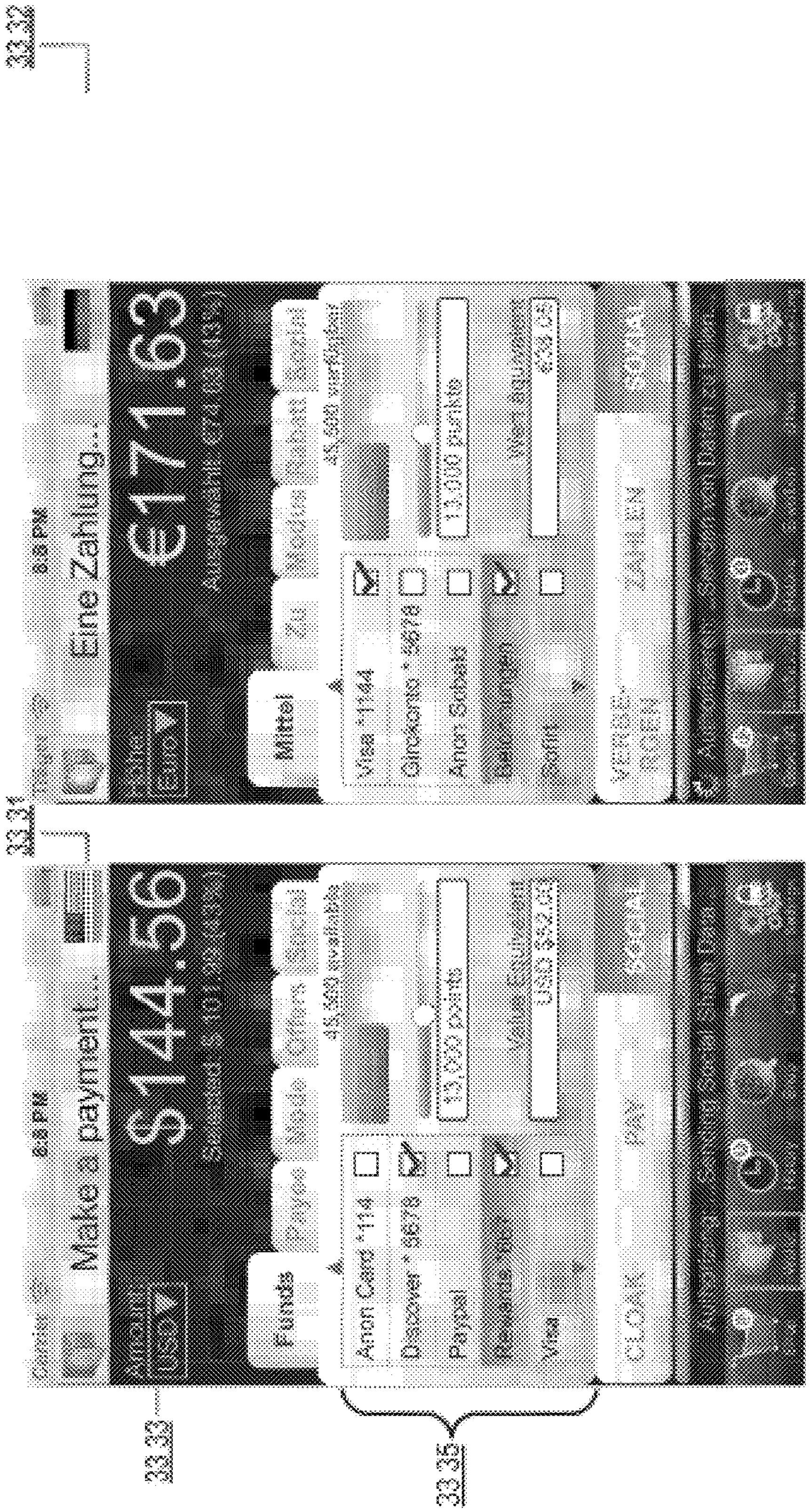

With reference to FIG. 44B, in one embodiment, the wallet mobile application may facilitate dynamic payment optimization based on factors such as user location, preferences and currency value preferences among others. For example, when a user is in the United States, the country indicator 3331 may display a flag of the United States and may set the currency 3333 to the United States. In a further implementation, the wallet mobile application may automatically rearrange the order in which the forms of payments 3335 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 3332 and the currency 3334. In a further implementation, the wallet application may rearrange the order in which different forms of payment 3336 are listed based on their acceptance level in that country. Of course, the order of these forms of payments may be modified by the user to suit his or her own preferences.

Figure 44C:
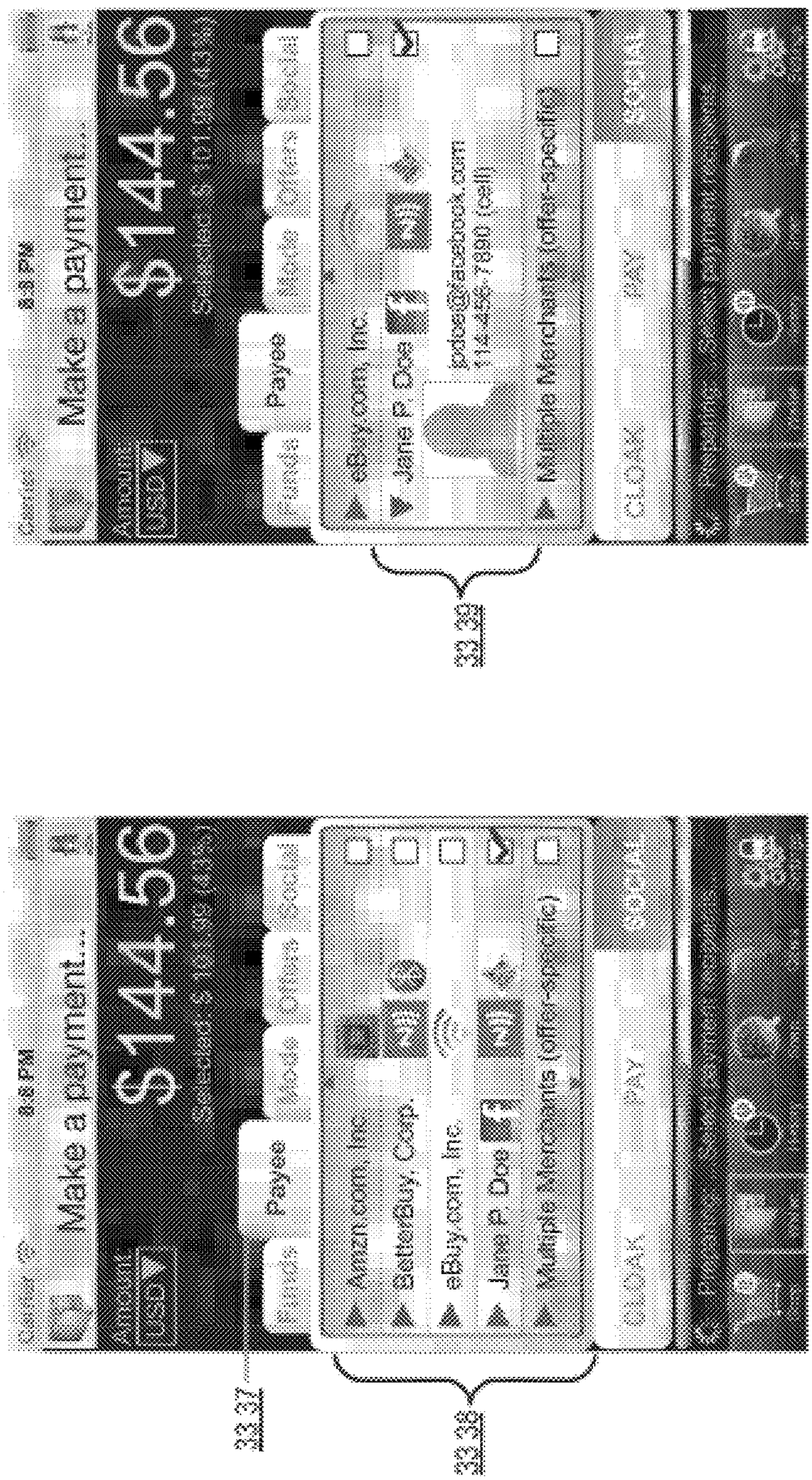

With reference to FIG. 44C, in one embodiment, the payee tab 3337 in the wallet mobile application user interface may facilitate user selection of one or more payees receiving the funds selected in the funds tab. In one implementation, the user interface may show a list of all payees 3338 with whom the user has previously transacted or available to transact. The user may then select one or more payees. The payees 3338 may include larger merchants such as Amazon.com Inc., and individuals such as Jane P. Doe. Next to each payee name, a list of accepted payment modes for the payee may be displayed. In one implementation, the user may select the payee Jane P. Doe 3339 for receiving payment. Upon selection, the user interface may display additional identifying information relating to the payee.

Figure 44D:
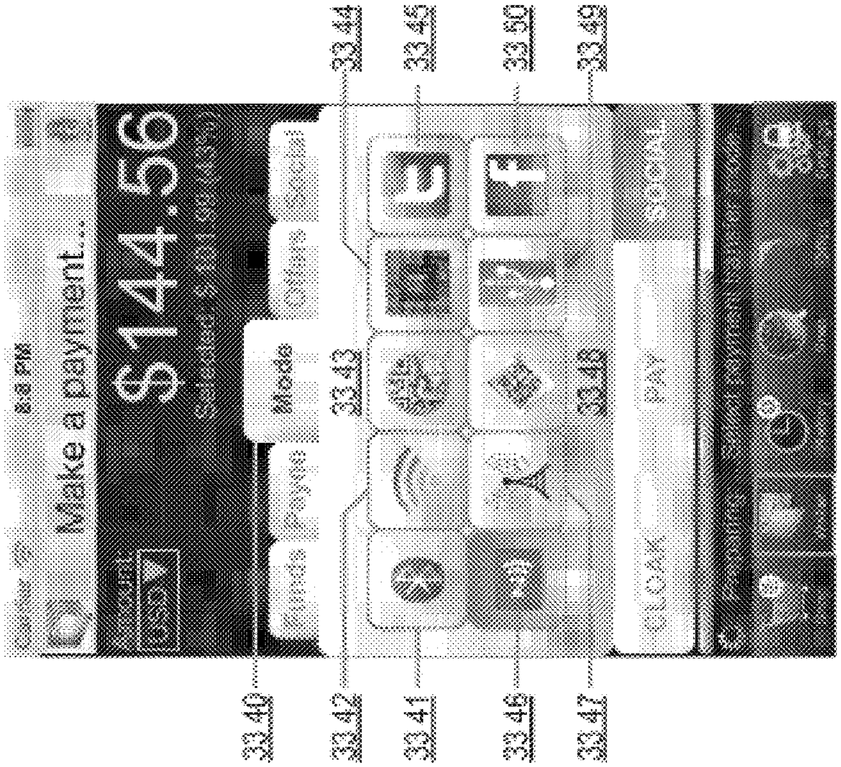

With reference to FIG. 44D, in one embodiment, the mode tab 1940 may facilitate selection of a payment mode accepted by the payee. A number of payment modes may be available for selection. Example modes include, blue tooth 3341, wireless 3342, snap mobile by user-obtained QR code 3343, secure chip 3344, TWITTER 3345, near-field communication (NFC) 3346, cellular 3347, snap mobile by user-provided QR code 3348, USB 3349 and FACEBOOK 3350, among others. In one implementation, only the payment modes that are accepted by the payee may be selectable by the user. Other non-accepted payment modes may be disabled.

Figure 44E:
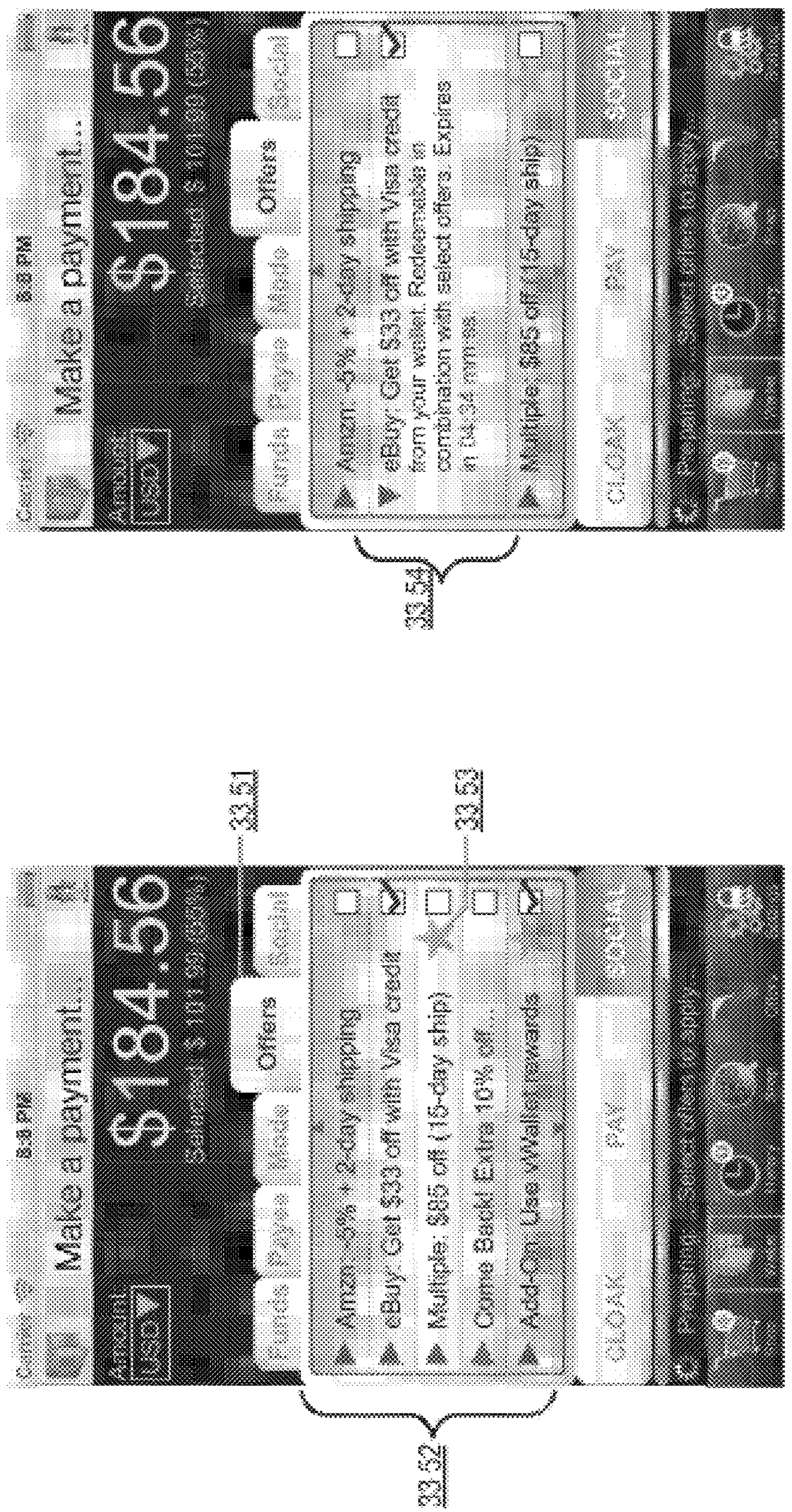

With reference to FIG. 44E, in one embodiment, the offers tab 3351 may provide real-time offers that are relevant to items in a user's cart for selection by the user. The user may select one or more offers from the list of applicable offers 3352 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 3353. In a further implementation, the user may read the details of the offer by expanding the offer row as shown by 3354 in the user interface.

Figure 44F:
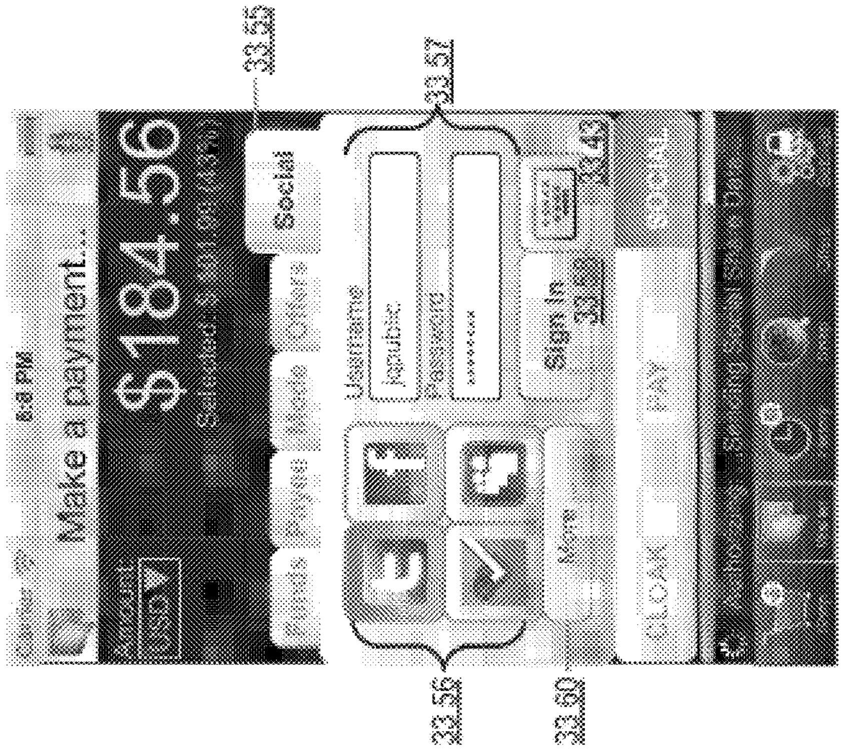

With reference to FIG. 44F, in one embodiment, the social tab 3355 may facilitate integration of the wallet application with social channels 3356. In one implementation, a user may select one or more social channels 3356 and may sign in to the selected social channel from the wallet application by providing to the wallet application the social channel user name and password 3357 and signing in 3358. The user may then use the social button 3359 to send or receive money through the integrated social channels. In a further implementation, the user may send social share data such as purchase information or links through integrated social channels. In another embodiment, the user supplied login credentials may allow V-GLASSES to engage in interception parsing.

Figure 45:
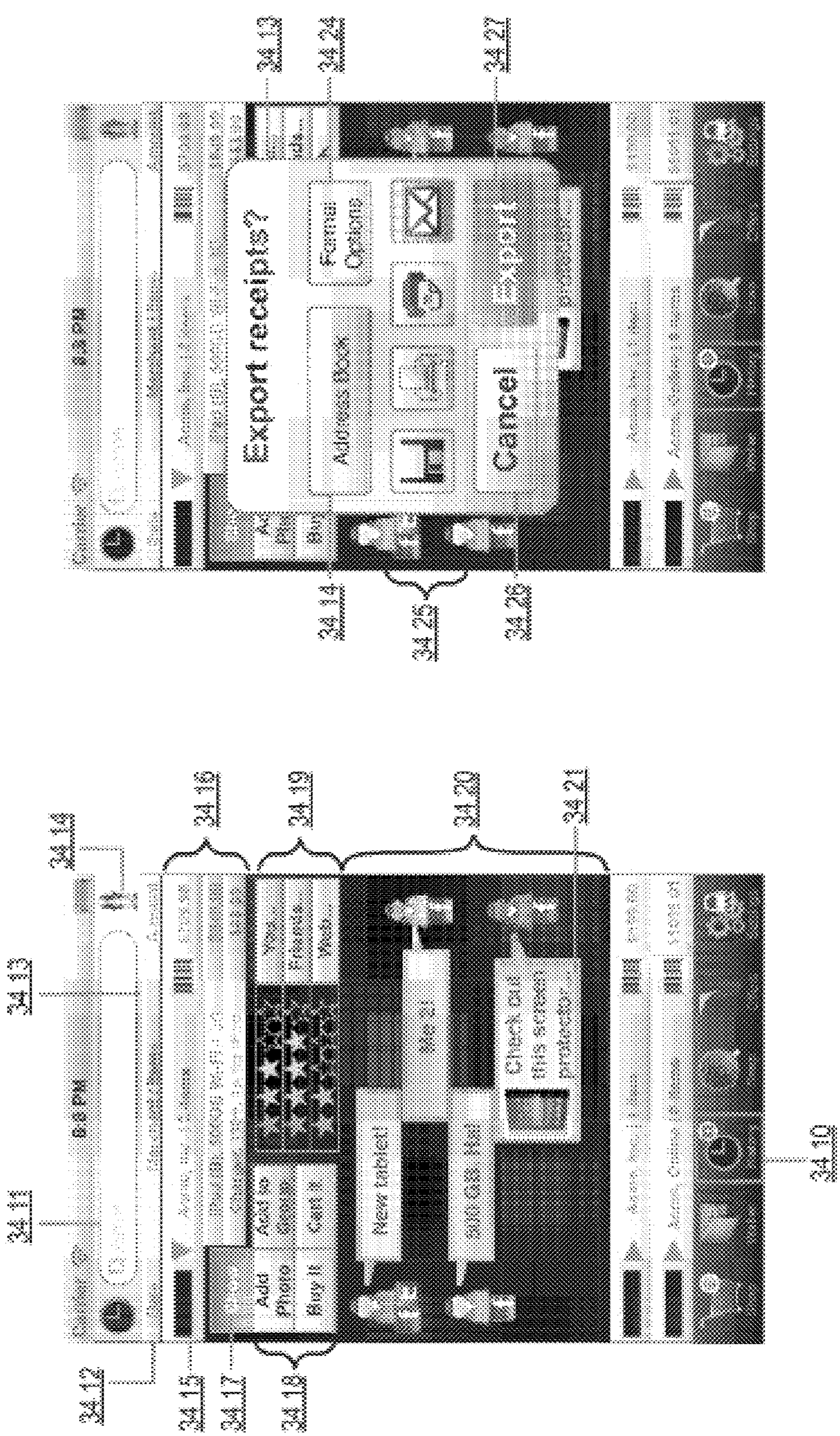
FIG. 45 shows a user interface diagram illustrating example features of virtual wallet applications, in a history mode, in some embodiments of the V-GLASSES.

FIG. 45 shows a user interface diagram illustrating example features of virtual wallet applications, in a history mode, in some embodiments of the V-GLASSES. In one embodiment, a user may select the history mode 3410 to view a history of prior purchases and perform various actions on those prior purchases. For example, a user may enter a merchant identifying information such as name, product, MCC, and/or the like in the search bar 3411. In another implementation, the user may use voice activated search feature by clicking on the microphone icon 3414. The wallet application may query the storage areas in the mobile device or elsewhere (e.g., one or more databases and/or tables remote from the mobile device) for transactions matching the search keywords. The user interface may then display the results of the query such as transaction 3415. The user interface may also identify the date 3412 of the transaction, the merchants and items 3413 relating to the transaction, a barcode of the receipt confirming that a transaction was made, the amount of the transaction and any other relevant information.

In one implementation, the user may select a transaction, for example transaction 3415, to view the details of the transaction. For example, the user may view the details of the items associated with the transaction and the amounts 3416 of each item. In a further implementation, the user may select the show option 3417 to view actions 3418 that the user may take in regards to the transaction or the items in the transaction. For example, the user may add a photo to the transaction (e.g., a picture of the user and the iPad the user bought). In a further implementation, if the user previously shared the purchase via social channels, a post including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 3419 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 3420 shows FACEBOOK message exchanges between two users. In one implementation, a user may share a link via a message 3421. Selection of such a message having embedded link to a product may allow the user to view a description of the product and/or purchase the product directly from the history mode.

In one embodiment, the history mode may also include facilities for exporting receipts. The export receipts pop up 3422 may provide a number of options for exporting the receipts of transactions in the history. For example, a user may use one or more of the options 3425, which include save (to local mobile memory, to server, to a cloud account, and/or the like), print to a printer, fax, email, and/or the like. The user may utilize his or her address book 3423 to look up email or fax number for exporting. The user may also specify format options 3424 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 3427 to initiate export of receipts.

Figure 46A:
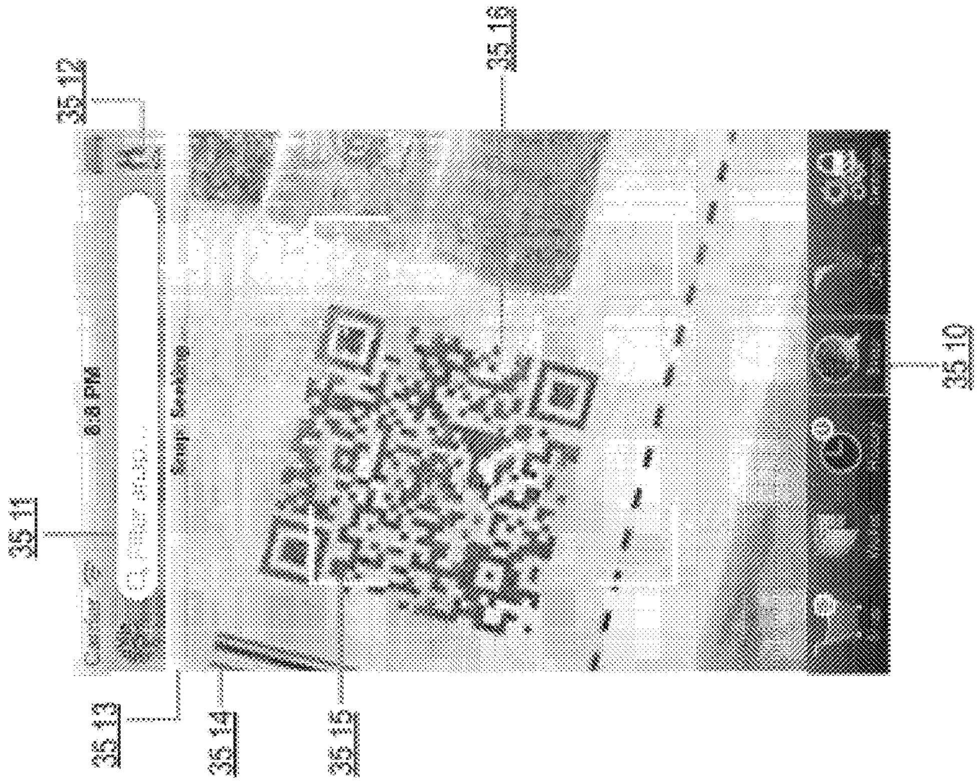
FIGS. 46A-46E show user interface diagrams illustrating example features of virtual wallet applications in a snap mode, in some embodiments of the V-GLASSES.

FIGS. 46A-E show user interface diagrams illustrating example features of virtual wallet applications in a snap mode, in some embodiments of the V-GLASSES. With reference to FIG. 46A, in one embodiment, a user may select the snap mode 2110 to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 46A. A user may use his or her mobile phone to take a picture of a QR code 3515 and/or a barcode 3514. In one implementation, the bar 3513 and snap frame 3515 may assist the user in snapping codes properly. For example, the snap frame 3515, as shown, does not capture the entirety of the code 3516. As such, the code captured in this view may not be resolvable as information in the code may be incomplete. This is indicated by the message on the bar 3513 that indicates that the snap mode is still seeking the code. When the code 3516 is completely framed by the snap frame 3515, the bar message may be updated to, for example, "snap found." Upon finding the code, in one implementation, the user may initiate code capture using the mobile device camera. In another implementation, the snap mode may automatically snap the code using the mobile device camera.

Figure 46B:

With reference to FIG. 46B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 3522 the receipt 3523 the user wants to reallocate. Alternatively, the user may directly snap a picture of a barcode on a receipt, and the snap mode may generate and display a receipt 3523 using information from the barcode. The user may now reallocate 3525. In some implementations, the user may also dispute the transaction 3524 or archive the receipt 3526.

In one implementation, when the reallocate button 3525 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 3527 may be generated after the completion of the reallocation process. As discussed, the receipt shows that some charges have been moved from the Visa account to the FSA.

Figure 46C:
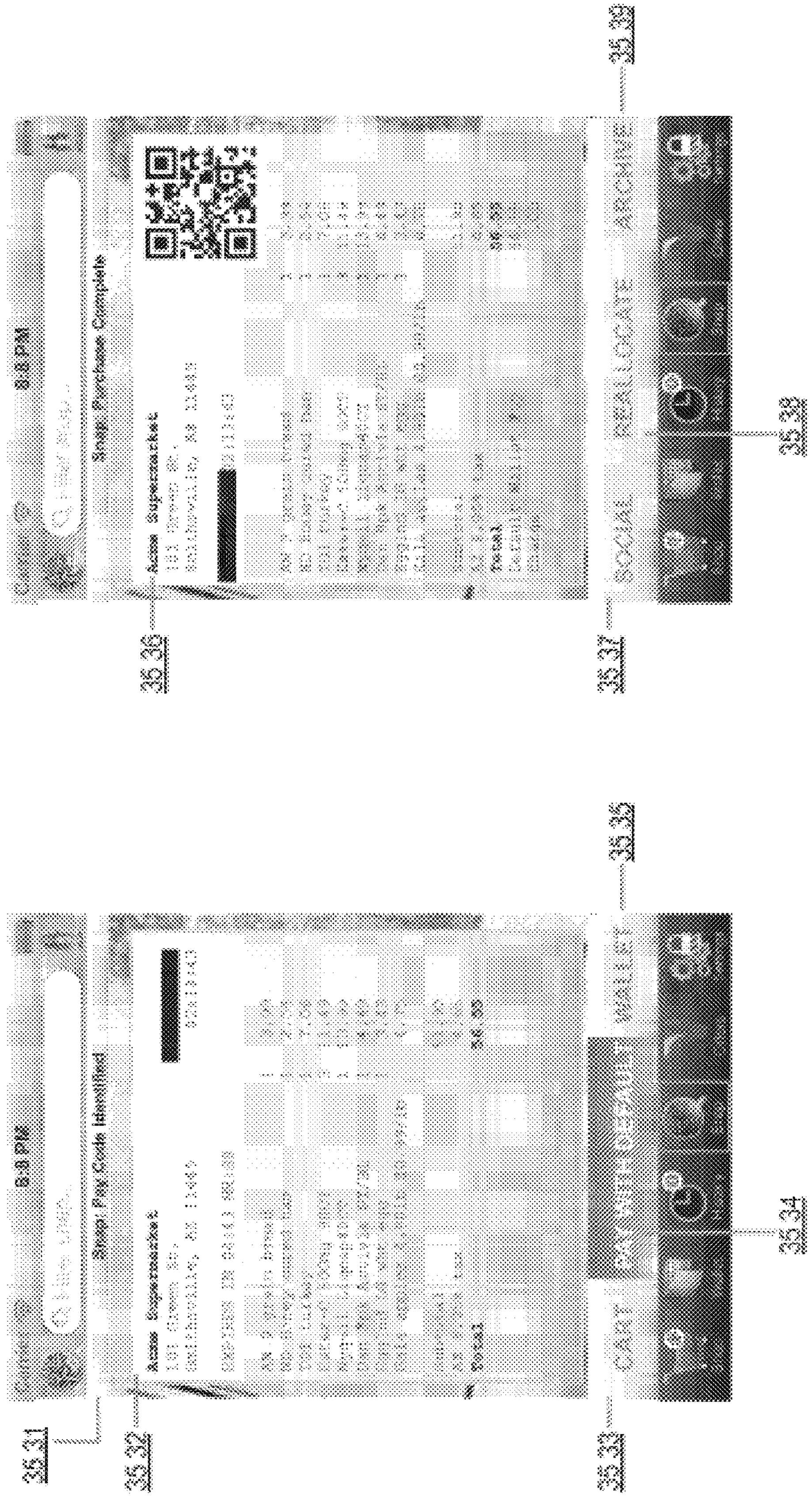

With reference to FIG. 46C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 3532. Once the QR code is identified, the navigation bar 3531 may indicate that the pay code is identified. The user may now have an option to add to cart 3533, pay with a default payment account 3534 or pay with wallet 3535.

In one implementation, the user may decide to pay with default 3534. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 3537 to share purchase information with others, reallocate 3538 as discussed with regard to FIG. 46B, and archive 3539 to store the receipt.

Figure 46D:

With reference to FIG. 46D, in one embodiment, the snap mode may also facilitate offer identification, application and storage for future use. For example, in one implementation, a user may snap an offer code 3541 (e.g., a bar code, a QR code, and/or the like). The wallet application may then generate an offer text 3542 from the information encoded in the offer code. The user may perform a number of actions on the offer code. For example, the user use the find button 3543 to find all merchants who accept the offer code, merchants in the proximity who accept the offer code, products from merchants that qualify for the offer code, and/or the like. The user may also apply the offer code to items that are currently in the cart using the add to cart button 3544. Furthermore, the user may also save the offer for future use by selecting the save button 3545.

In one implementation, after the offer or coupon 3546 is applied, the user may have the option to find qualifying merchants and/or products using find, the user may go to the wallet using 3548, and the user may also save the offer or coupon 3546 for later use.

Figure 46E:
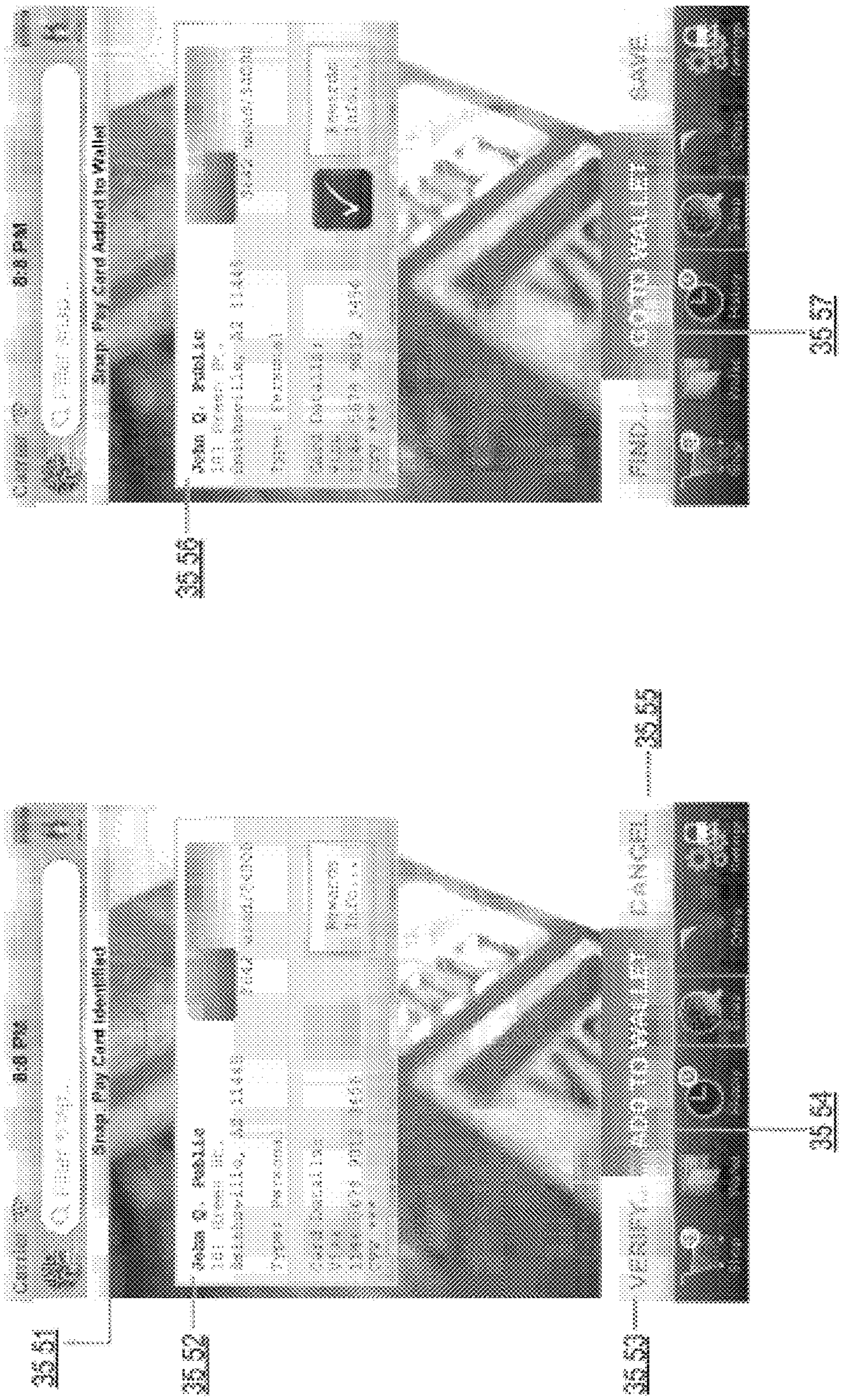

With reference to FIG. 46E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 3551 and may display the textual information 3552 encoded in the pay card. The user may then perform verification of the information 3552 by selecting the verify button 3553. In one implementation, the verification may include contacting the issuer of the pay card for confirmation of the decoded information 3552 and any other relevant information. In one implementation, the user may add the pay card to the wallet by selecting the 'add to wallet' button 3554. The instruction to add the pay card to the wallet may cause the pay card to appear as one of the forms of payment under the funds tab 3316 discussed in FIG. 44A. The user may also cancel importing of the pay card as a funding source by selecting the cancel button 3555. When the pay card has been added to the wallet, the user interface may be updated to indicate that the importing is complete via the notification display 3556. The user may then access the wallet 3557 to begin using the added pay card as a funding source.

Figure 47:
FIG. 47 shows a user interface diagram illustrating example features of virtual wallet applications, in an offers mode, in some embodiments of the V-GLASSES.

FIG. 47 shows a user interface diagram illustrating example features of virtual wallet applications, in an offers mode, in some embodiments of the V-GLASSES. In some implementations, the V-GLASSES may allow a user to search for offers for products and/or services from within the virtual wallet mobile application. For example, the user may enter text into a graphical user interface ("GUI") element 3611, or issue voice commands by activating GUI element 3612 and speaking commands into the device. In some implementations, the V-GLASSES may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 3613. For example, the offer may provide a discount, and may include an expiry time. In some implementations, other users may provide gifts (e.g., 3614) to the user, which the user may redeem. In some implementations, the offers section may include alerts as to payment of funds outstanding to other users (e.g., 3615). In some implementations, the offers section may include alerts as to requesting receipt of funds from other users (e.g., 3616). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the V-GLASSES, e.g., 3617-3619, 3620. These offers may sometimes be assembled using a combination of participating merchants, e.g., 3617. In some implementations, the V-GLASSES itself may provide offers for users contingent on the user utilizing particular payment forms from within the virtual wallet application, e.g., 3620.

Figure 48A:
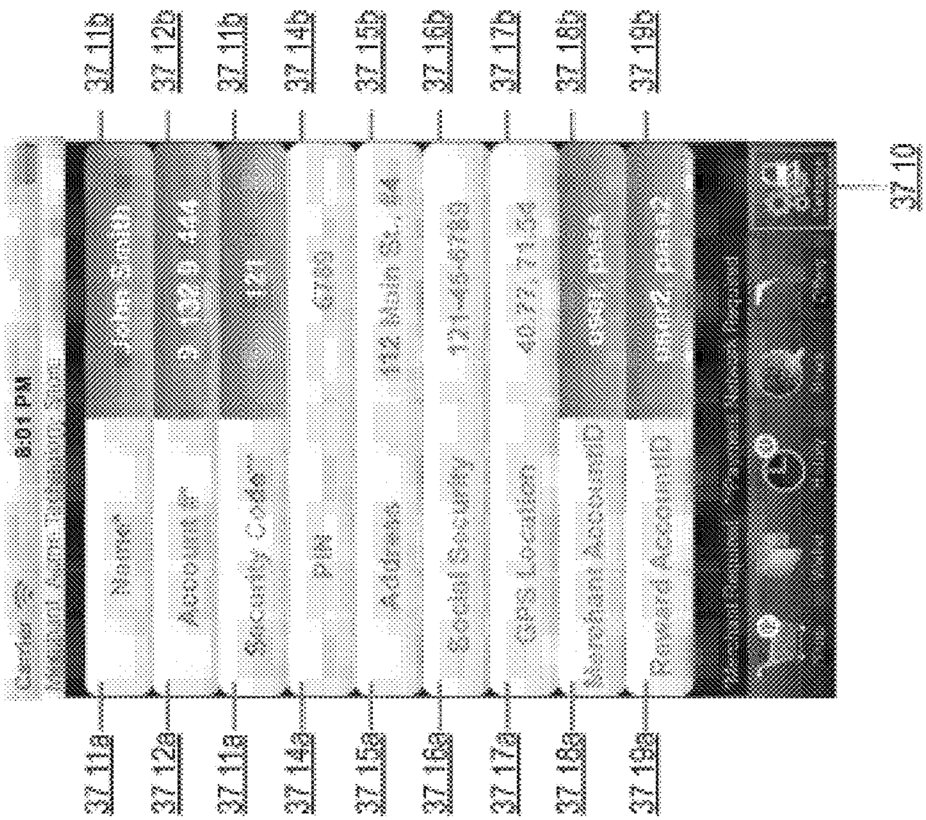
FIGS. 48A-48B show user interface diagrams illustrating example features of virtual wallet applications, in a security and privacy mode, in some embodiments of the V-GLASSES.
Figure 48B:
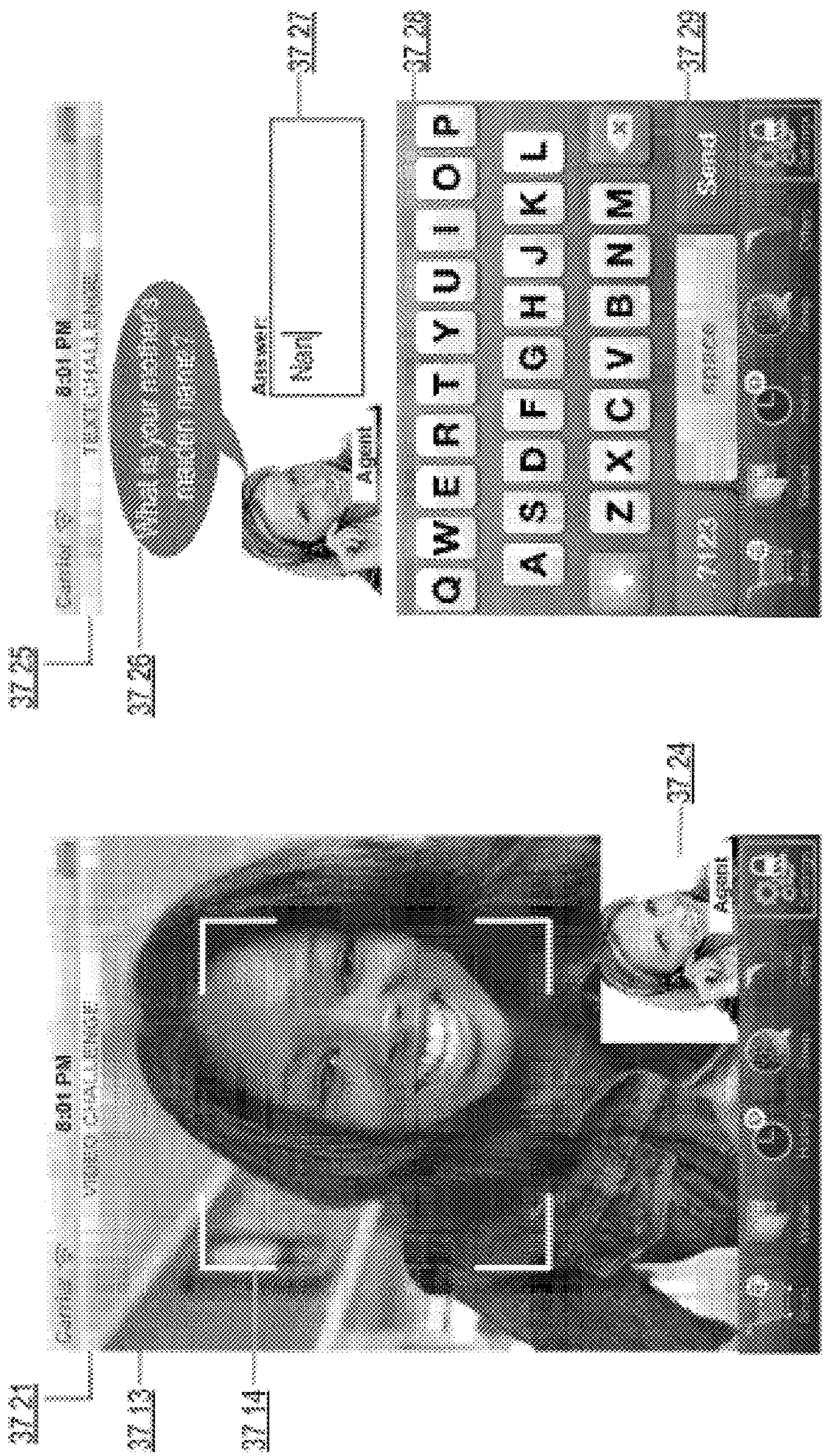

FIGS. 48A-B show user interface diagrams illustrating example features of virtual wallet applications, in a security and privacy mode, in some embodiments of the V-GLASSES. With reference to FIG. 48A, in some implementations, the user may be able to view and/or modify the user profile and/or settings of the user, e.g., by activating a user interface element. For example, the user may be able to view/modify a user name (e.g., 3711_a_-_b_), account number (e.g., 3712_a_-_b_), user security access code (e.g., 3713-_b_), user pin (e.g., 3714-_b_), user address (e.g., 3715-_b_), social security number associated with the user (e.g., 3716-_b_), current device GPS location (e.g., 3717-_b_), user account of the merchant in whose store the user currently is (e.g., 3718-_b_), the user's rewards accounts (e.g., 3719-_b_), and/or the like. In some implementations, the user may be able to select which of the data fields and their associated values should be transmitted to facilitate the purchase transaction, thus providing enhanced data security for the user. For example, in the example illustration in FIG. 48A, the user has selected the name 3711_a_, account number 3712_a_, security code 3713_a_, merchant account ID 3718_a_ and rewards account ID 3719_a_ as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the V-GLASSES with the GPS location of the user. Based on the GPS location of the user, the V-GLASSES may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 48B, in some implementations, the app executing on the user's device may provide a "VerifyChat" feature for fraud prevention. For example, the V-GLASSES may detect an unusual and/or suspicious transaction. The V-GLASSES may utilize the VerifyChat feature to communicate with the user, and verify the authenticity of the originator of the purchase transaction. In various implementations, the V-GLASSES may send electronic mail message, text (SMS) messages, Facebook® messages, Twitter™ tweets, text chat, voice chat, video chat (e.g., Apple FaceTime), and/or the like to communicate with the user. For example, the V-GLASSES may initiate a video challenge for the user, e.g., 3721. For example, the user may need to present him/her-self via a video chat, e.g., 3722. In some implementations, a customer service representative, e.g., agent 3724, may manually determine the authenticity of the user using the video of the user. In some implementations, the V-GLASSES may utilize face, biometric and/or like recognition (e.g., using pattern classification techniques) to determine the identity of the user. In some implementations, the app may provide reference marker (e.g., cross-hairs, target box, etc.), e.g., 3723, so that the user may the video to facilitate the V-GLASSES's automated recognition of the user. In some implementations, the user may not have initiated the transaction, e.g., the transaction is fraudulent. In such implementations, the user may cancel the challenge. The V-GLASSES may then cancel the transaction, and/or initiate fraud investigation procedures on behalf of the user.

In some implementations, the V-GLASSES may utilize a text challenge procedure to verify the authenticity of the user, e.g., 3725. For example, the V-GLASSES may communicate with the user via text chat, SMS messages, electronic mail, Facebook® messages, Twitter™ tweets, and/or the like. The V-GLASSES may pose a challenge question, e.g., 3726, for the user. The app may provide a user input interface element(s) (e.g., virtual keyboard 3728) to answer the challenge question posed by the V-GLASSES. In some implementations, the challenge question may be randomly selected by the V-GLASSES automatically; in some implementations, a customer service representative may manually communicate with the user. In some implementations, the user may not have initiated the transaction, e.g., the transaction is fraudulent. In such implementations, the user may cancel the text challenge. The V-GLASSES may cancel the transaction, and/or initiate fraud investigation on behalf of the user.

FIG. 49 shows a data flow diagram illustrating an example user purchase checkout procedure in some embodiments of the V-GLASSES. In some embodiments, a user, e.g., 3801*a*, may desire to purchase a product, service, offering, and/or the like ("product"), from a merchant via a merchant online site or in the merchant's store. In some embodiments, the user 3801*a* may be a customer service representative in a store, assisting a consumer in their shopping experience. The user may communicate with a merchant/acquirer ("merchant") server, e.g., 3803*a*, via a client such as, but not limited to: a personal computer, mobile device, television, point-of-sale terminal, kiosk, ATM, and/or the like (e.g., 3802). For example, the user may provide user input, e.g., checkout input 3811, into the client indicating the user's desire to purchase the product. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 3812, and provide the checkout request, e.g., 3813, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 3812, substantially in the form of a HTTP(S) POST message including XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
  <checkout_ID>4NFU4RG94</checkout_ID>
  <timestamp>2011-02-22 15:22:43</timestamp>
  <purchase_detail>
    <num_products>5</num_products>
    <product_ID>AE95049324</product_ID>
    <product_ID>MD09808755</product_ID>
    <product_ID>OC12345764</product_ID>
    <product_ID>KE76549043</product_ID>
    <product_ID>SP27674509</product_ID>
  </purchase_detail>
<!--optional parameters-->
  <user_ID>john.q.public@gmail.com</user_ID>
  <PoS_client_detail>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
  </PoS_client_detail>
</checkout_request>
```

In some embodiments, the merchant server may obtain the checkout request from the client, and extract the checkout detail (e.g., XML data) from the checkout request. For example, the merchant server may utilize a parser such as the example parsers described below in the discussion with reference to FIG. 55. Based on parsing the checkout request

3812, the merchant server may extract product data (e.g., product identifiers), as well as available PoS client data, from the checkout request. In some embodiments, using the product data, the merchant server may query, e.g., 3814, a merchant/acquirer ("merchant") database, e.g., 3803*b*, to obtain product data, e.g., 3815, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 55, Products 4419*l*) for product data. An example product data query 3814, substantially in the form of PHP/SQL commands, is provided below:

```
<?PHP
header('Content-Type: text/plain');
mysql_connect("254.93.179.112",$DBserver,$password); //
access database server
mysql-select_db("V-GLASSES_DB.SQL"); // select database
table to search
//create query
$query = "SELECT product_title product_attributes_list
product_price tax_info_list related_products_list
offers_list discounts_list rewards_list merchants_list
merchant_availability_list FROM ProductsTable WHERE
product_ID LIKE '%' $prodID";
$result = mysql_query($query); // perform the search query
mysql_close("V-GLASSES_DB.SQL"); // close database access
?>
```

In some embodiments, in response to obtaining the product data, the merchant server may generate, e.g., 3816, checkout data to provide for the PoS client. In some embodiments, such checkout data, e.g., 3817, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 51-52. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 3817, substantially in the form of XML-formatted data, is provided below:

```
<?XML version = "1.0" encoding = "UTF-8"?>
<checkout_data>
  <session_ID>4NFU4RG94</session_ID>
  <timestamp>2011-02-22 15:22:43</timestamp>
  <expiry_lapse>00:00:30</expiry_lapse>
  <transaction_cost>$34.78</transaction_cost>
  <alerts_URL>www.merchant.com/shopcarts.php?sessionID
=4NFU4RG94</alerts_URL>
  <!--optional data-->
  <user_ID>john.q.public@gmail.com</user_ID>
  <client_details>
    <client_IP>192.168.23.126</client_IP>
    <client_type>smartphone</client_type>
    <client_model>HTC Hero</client_model>
    <OS>Android 2.2</OS>
    <app_installed_flag>true</app_installed_flag>
  </client_details>
  <purchase_details>
    <num_products>1</num_products>
    <product>
      <product_type>book</product_type>
      <product_params>
        <product_title>XML for
dummies</product_title>
        <ISBN>938-2-14-168710-0</ISBN>
        <edition>2nd ed.</edition>
        <cover>hardbound</cover>
        <seller>bestbuybooks</seller>
      </product_params>
      <quantity>1</quantity>
    </product>
  </purchase_details>
  <offers_details>
    <num_offers>1</num_offers>
    <product>
      <product_type>book</product_type>
      <product_params>
        <product_title>Here's more
XML</product_title>
        <ISBN>922-7-14-165720-1</ISBN>
        <edition>1nd ed.</edition>
        <cover>hardbound</cover>
        <seller>digibooks</seller>
      </product_params>
      <quantity>1</quantity>
    </product>
  </offers_details>
  <secure_element>www.merchant.com/securedyn/0394733/1
23.png</secure_element>
  <merchant_params>
    <merchant_id>3FBCR4INC</merchant_id>
    <merchant_name>Books & Things,
Inc.</merchant_name>
  <merchant_auth_key>1NNF484MCP59CHB27365</merchant_au
th_key>
  </merchant_params>
<checkout_data>
```

Upon obtaining the checkout data, e.g., 3817, the PoS client may render and display, e.g., 3818, the checkout data for the user.

Figure 50:
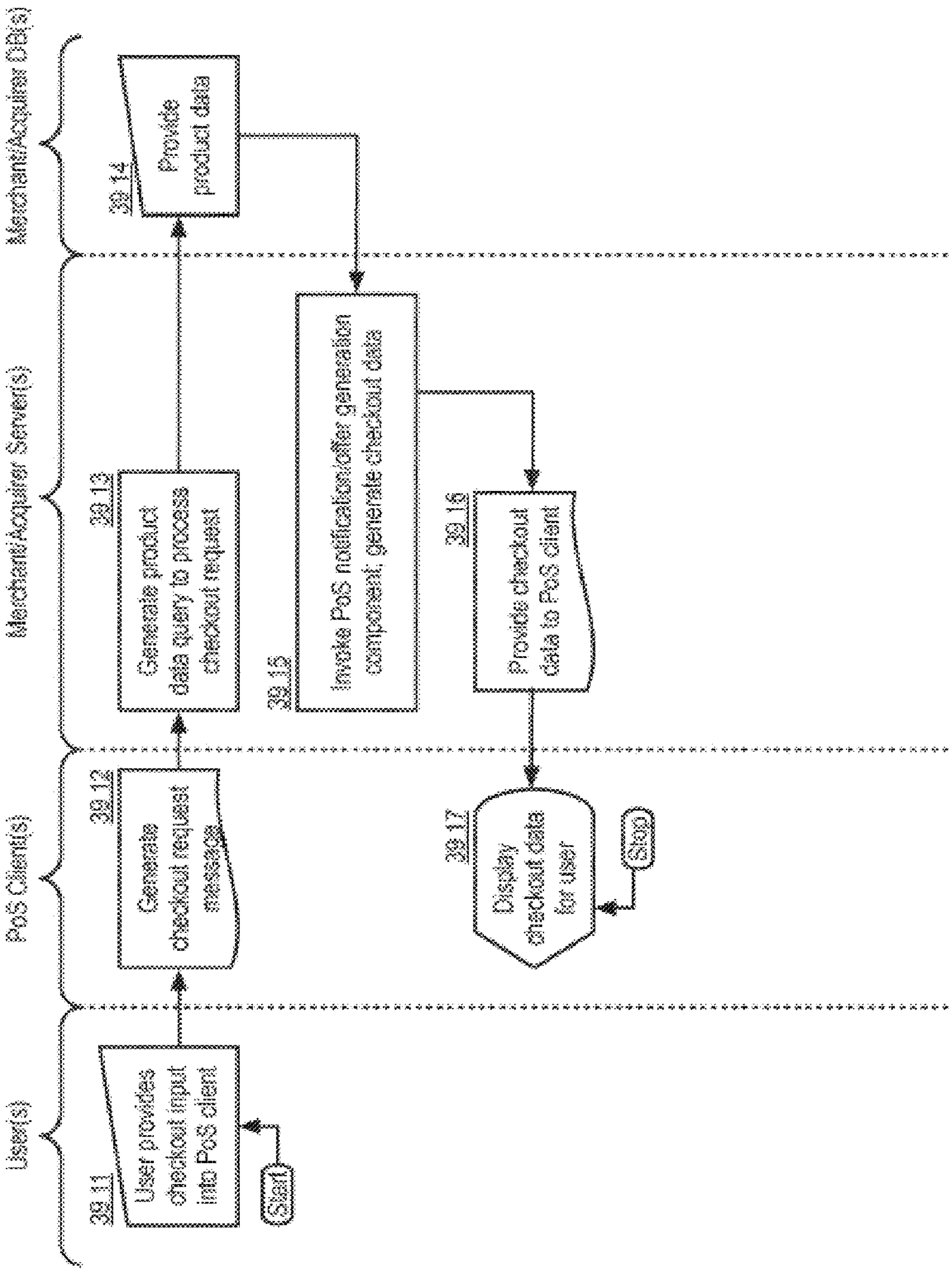
FIG. 50 shows a logic flow diagram illustrating example aspects of a user purchase checkout in some embodiments of the V-GLASSES, e.g., a User Purchase Checkout ("UPC") component 3900.

FIG. 50 shows a logic flow diagram illustrating example aspects of a user purchase checkout in some embodiments of the V-GLASSES, e.g., a User Purchase Checkout ("UPC") component 3900. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 3901, into the client indicating the user's desire to purchase the product. The client may generate a checkout request, e.g., 3902, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 55. Based on parsing the checkout request, the merchant server may extract product data (e.g., product identifiers), as well as available PoS client data, from the checkout request. In some embodiments, using the product data, the merchant server may query, e.g., 3903, a merchant/acquirer ("merchant") database to obtain product data, e.g., 3904, such as product information, product pricing, sales tax, offers, discounts, rewards, and/or other information to process the purchase transaction and/or provide value-added services for the user. In some embodiments, in response to obtaining the product data, the merchant server may generate, e.g., 3905, checkout data to provide, e.g., 3906, for the PoS client. Upon obtaining the checkout data, the PoS client may render and display, e.g., 3907, the checkout data for the user.

Figure 51A:
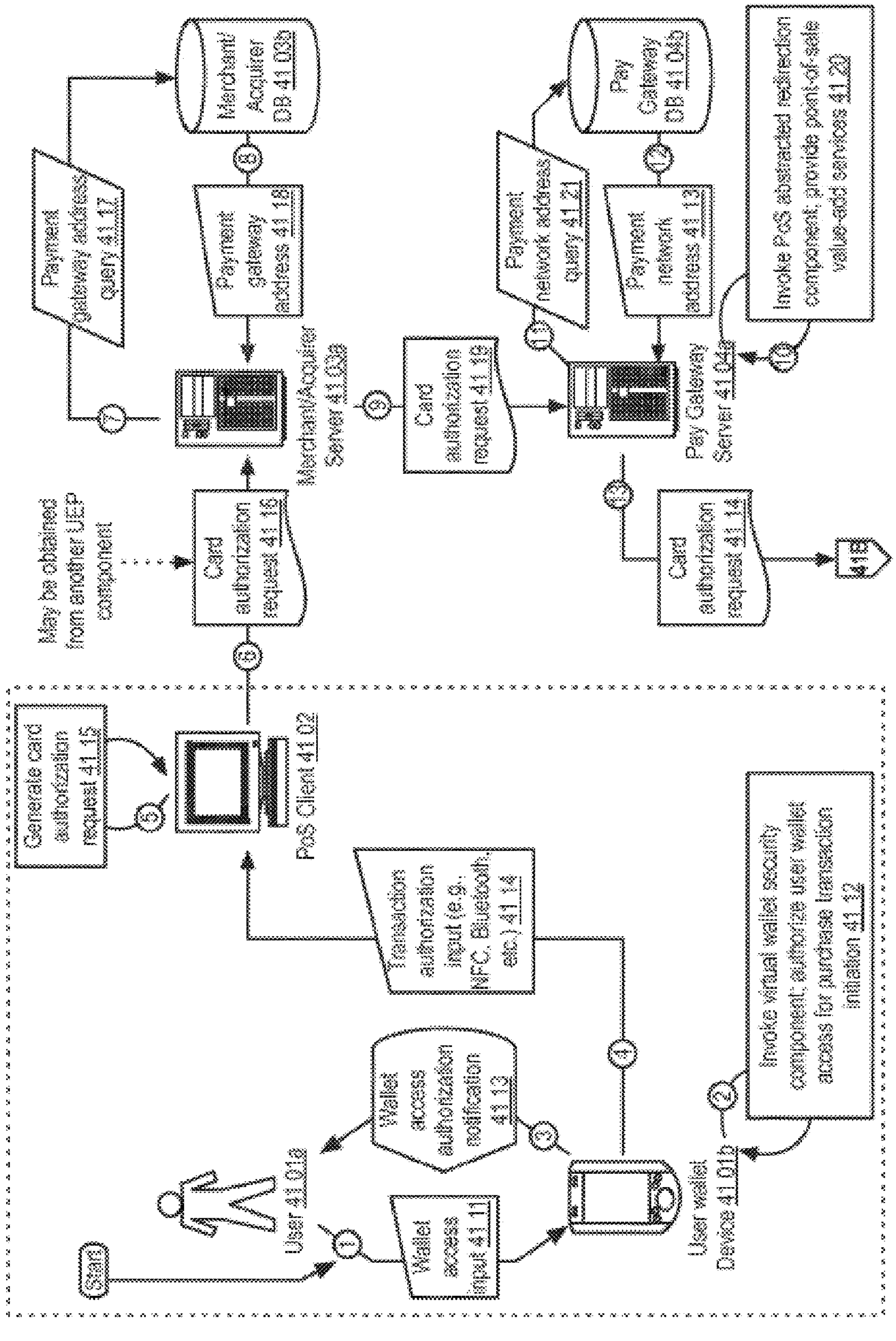
FIGS. 51A-51B show data flow diagrams illustrating an example purchase transaction authorization procedure in some embodiments of the V-GLASSES.
Figure 51B:
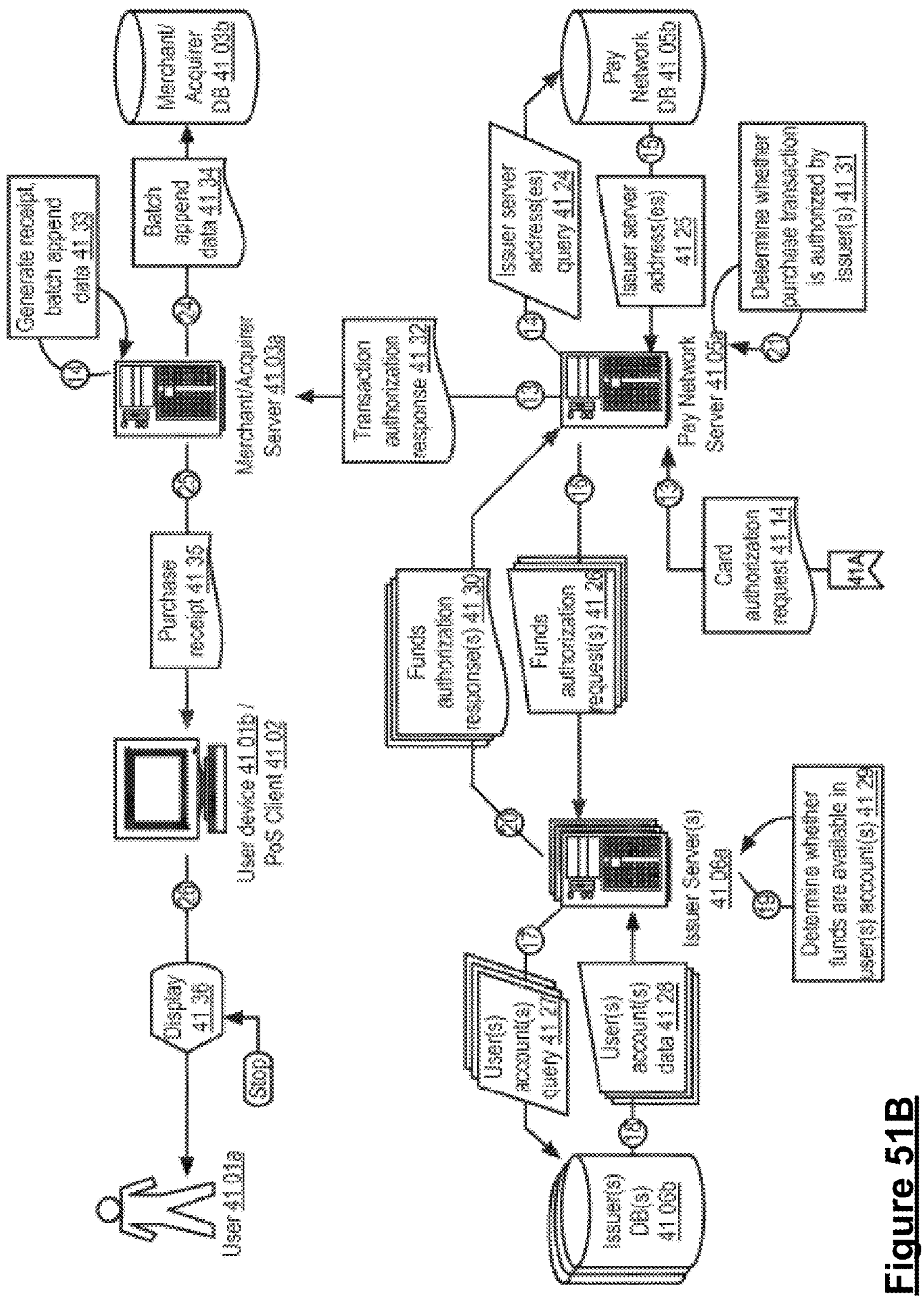

FIGS. 51A-B show data flow diagrams illustrating an example purchase transaction authorization procedure in some embodiments of the V-GLASSES. With reference to FIG. 51A, in some embodiments, a user, e.g., 4001*a*, may wish to utilize a virtual wallet account to purchase a product, service, offering, and/or the like ("product"), from a merchant via a merchant online site or in the merchant's store. The user may utilize a physical card, or a user wallet device, e.g., 4001*b*, to access the user's virtual wallet account. For example, the user wallet device may be a personal/laptop computer, cellular telephone, smartphone, tablet, eBook reader, netbook, gaming console, and/or the like. The user may provide a wallet access input, e.g., 4011 into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 4014, to a point-of-sale ("PoS") client, e.g., 4002. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 4014, track 1 data from the user's plastic card (e.g., credit card, debit card, prepaid card, charge card, etc.), such as the example track 1 data provided below:

```
%B123456789012345 PUBLIC/J.Q. 99011200000000000000**901******?*
```

(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 4014, substantially in the form of XML-formatted data, is provided below:

```
<?XML version = "1.0" encoding = "UTF-8"?>
<transaction_authorization_input>
  <payment_data>
    <account>
      <charge_priority>1</charge_priority>
      <charge_ratio>40%</charge_ratio>
  <account_number>123456789012345</account_number>
      <account_name>John Q.
Public</account_name>
      <bill_add>987 Green St #456, Chicago, IL
94652</bill_add>
      <ship_add>987 Green St #456, Chicago, IL
94652</ship_add>
      <CVV>123</CVV>
    </account>
    <account>
      <charge_priority>1</charge_priority>
      <charge_ratio>60%</charge_ratio>
  <account_number>234567890123456</account_number>
      <account_name>John Q.
Public</account_name>
      <bill_add>987 Green St #456, Chicago, IL
94652</bill_add>
      <ship_add>987 Green St #456, Chicago, IL
94652</ship_add>
      <CVV>173</CVV>
    </account>
    <account>
      <charge_priority>2</charge_priority>
      <charge_ratio>100%</charge_ratio>
  <account_number>345678901234567</account_number>
      <account_name>John Q.
Public</account_name>
      <bill_add>987 Green St #456, Chicago, IL
94652</bill_add>
      <ship_add>987 Green St #456, Chicago, IL
94652</ship_add>
      <CVV>695</CVV>
    </account>
  </payment_data>
  <!--optional data-->
  <timestamp>2011-02-22 15:22:43</timestamp>
  <expiry_lapse>00:00:30</expiry_lapse>
  <secure_key>0445329070598623487956543322</secure_key
>
  <alerts_track_flag>TRUE</alerts_track_flag>
  <wallet_device_details>
    <device_IP>192.168.23.126</client_IP>
    <device_type>smartphone</client_type>
    <device_model>HTC Hero</client_model>
    <OS>Android 2.2</OS>
  <wallet_app_installed_flag>true</wallet_app_installe
d_flag>
  </wallet_device_details>
</transaction_authorization_input>
```

In some embodiments, the PoS client may generate a card authorization request, e.g., 4015, using the obtained transaction authorization input from the user wallet device, and/or product/checkout data (see, e.g., FIG. 49, 3815-

3817). An example listing of a card authorization request 4015, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8" ?>
<card_authorization_request>
  <session_ID>4NFU4RG94</order_ID>
  <timestamp>2011-02-22 15:22:43</timestamp>
  <expiry>00:00:30</expiry>
  <alerts_URL>www.merchant.com/shopcarts.php?sessionID=
AEBB4356</alerts_URL>
  <!--optional data-->
  <user_ID>john.q.public@gmail.com</user_ID>
  <PoS__details>
    <PoS_IP>192.168.23.126</client_IP>
    <PoS_type>smartphone</client_type>
    <PoS_model>HTC Hero</client_model>
    <OS>Android 2.2</OS>
    <app_installed_flag>true</app_installed_flag>
  </PoS_details>
  <purchase_details>
    <num_products>1</num_products>
    <product>
      <product_type>book</product_type>
      <product_params>
        <product_title>XML for
dummies</product_title>
        <ISBN>938-2-14-168710-0</ISBN>
        <edition>2nd ed.</edition>
        <cover>hardbound</cover>
        <seller>bestbuybooks</seller>
      </product_params>
      <quantity>1</quantity>
    </product>
  </purchase_details>
  <merchant_params>
    <merchant_id>3FBCR4INC</merchant_id>
    <merchant_name>Books & Things,
Inc.</merchant_name>
    <merchant_auth_key>1NNF484MCP59CHB27365
</merchant_auth_key>
  </merchant_params>
  <account_params>
    <account_name>John Q. Public</account_name>
    <account_type>credit</account_type>
    <account_num>123456789012345</account_num>
    <billing_address>123 Green St., Norman, OK
98765</billing_address>
    <phone>123-456-7809</phone>
    <sign>/jqp/</sign>
    <confirm_type>email</confirm_type>
  <contact_info>john.q.public@gmail.com</contact_info>
  </account_params>
  <shipping_info>
    <shipping_adress>same as
billing</shipping_address>
    <ship_type>expedited</ship_type>
    <ship_carrier>FedEx</ship_carrier>
    <ship_account>123-45-678</ship_account>
    <tracking_flag>true</tracking_flag>
    <sign_flag>false</sign_flag>
  </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least a session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant. In some embodiments, the PoS client may provide the generated card authorization request to the merchant server, e.g., 4016. The merchant server may forward the card authorization request to a pay gateway server, e.g., 4004*a*, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 4003*b*, for a network address of the payment gateway server, for example by using a portion of a user payment card number, or a user ID (such as an email address) as a keyword for the database query. For example, the merchant server may issue PHP/SQL commands to query a database table (such as FIG. 55, Pay Gateways 4419*h*) for a URL of the pay gateway server. An example payment gateway address query 4017, substantially in the form of PHP/SQL commands, is provided below:

```
<?PHP
header('Content-Type: text/plain');
mysql_connect("254.93.179.112",$DBserver,$password); //
access database server
mysql_select_db("V-GLASSES_DB.SQL"); // select database
table to search
//create query
$query = "SELECT paygate_id paygate_address paygate_URL
paygate_name FROM PayGatewayTable WHERE card_num LIKE
'%'d
$cardnum";
$result = mysql_query($query); // perform the search query
mysql_close("V-GLASSES_DB.SQL"); // close database access
?>
```

In response, the merchant/acquirer database may provide the requested payment gateway address, e.g., 4018. The merchant server may forward the card authorization request to the pay gateway server using the provided address, e.g., 4019. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a pay network server, e.g., 4005*a*, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 4004*b*, for a network address of the payment network server, for example by using a portion of a user payment card number, or a user ID (such as an email address) as a keyword for the database query. For example, the pay gateway server may issue PHP/SQL commands to query a database table (such as FIG. 55, Pay Gateways 4419*h*) for a URL of the pay network server. An example payment network address query 4021, substantially in the form of PHP/SQL commands, is provided below:

```
<?PHP
header('Content-Type: text/plain');
mysql_connect("254.93.179.112",$DBserver,$password); //
access database server
mysql_select_db("V-GLASSES_DB.SQL"); // select database
table to search
//create query
$query = "SELECT payNET_id payNET_address payNET_URL
payNET_name FROM PayGatewayTable WHERE card_num LIKE
'%'
$cardnum";
$result = mysql_query($query); // perform the search query
mysql_close("V-GLASSES_DB.SQL"); // close database access
?>
```

In response, the payment gateway database may provide the requested payment network address, e.g., 4022. The pay gateway server may forward the card authorization request to the pay network server using the provided address, e.g., 4023.

With reference to FIG. 51B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer.

Figure 55:
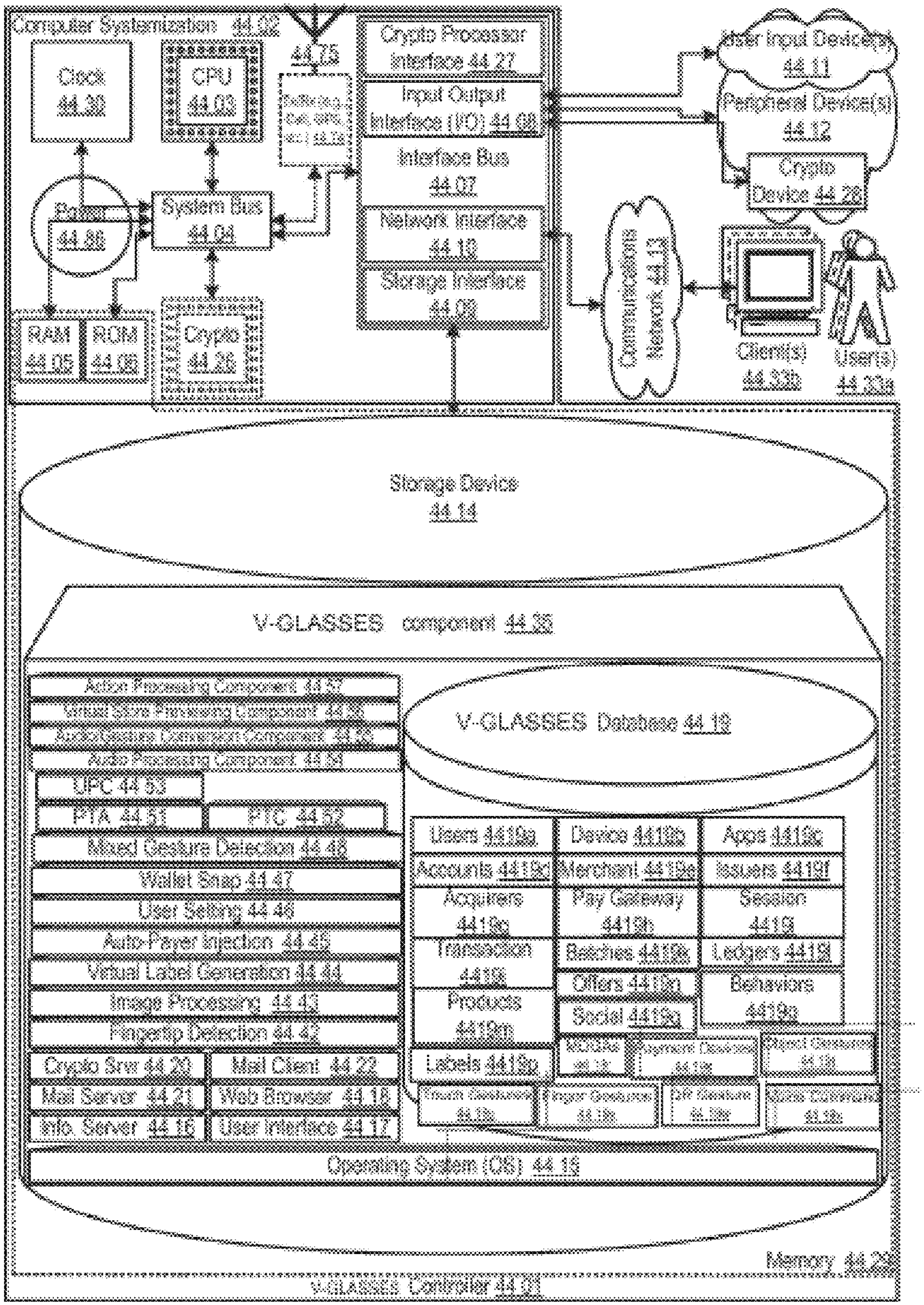
FIG. 55 shows a block diagram illustrating embodiments of a v-GLASSES controller.

In some embodiments, the pay network server may generate a query, e.g., 4024, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 4006*a*, of the issuer(s) may maintain details of the user's account(s). In some embodiments, a database, e.g., pay network database 4005*b*, may store details of the issuer server(s) associated with the issuer(s). In some embodiments, the pay network server may query a database, e.g., pay network database 4005*b*, for a network address of the issuer(s) server(s), for example by using a portion of a user payment card number, or a user ID (such as an email address) as a keyword for the database query. For example, the merchant server may issue PHP/SQL commands to query a database table (such as FIG. 55, Issuers 4419*f*) for network address(es) of the issuer(s) server(s). An example issuer server address(es) query 4024, substantially in the form of PHP/SQL commands, is provided below:

```
<?PHP
header('Content-Type: text/plain');
mysql_connect("254.93.179.112",$DBserver,$password); //
access database server
mysql_select_db("V-GLASSES_DB.SQL"); // select database
table to search
//create query
```

-continued

```
$query = "SELECT issuer_id issuer_address issuer_URL
issuer_name FROM IssuersTable WHERE card_num LIKE '%'
$cardnum";
$result = mysql_query($query); // perform the search query
mysql_close("V-GLASSES_DB.SQL"); // close database access
?>
```

In response to obtaining the issuer server query, e.g., 4024, the pay network database may provide, e.g., 4025, the requested issuer server data to the pay network server. In some embodiments, the pay network server may utilize the issuer server data to generate funds authorization request(s), e.g., 4026, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 4026, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8" ?>
<funds_authorization_request>
  <query_ID>VNEI39FK</query_ID>
  <timestamp>2011-02-22 15:22:44</timestamp>
  <transaction_cost>$22.61</transaction_cost>
  <account_params>
    <account_type>checking</account_type>
    <account_num>1234567890123456</account_num>
  </account_params>
  <!--optional parameters-->
  <purchase_summary>
    <num_products>1</num_products>
    <product>
      <product_summary>Book - XML for
dummies</product_summary>
      <product_quantity>1</product_quantity?
    </product>
  </purchase_summary>
  <merchant_params>
    <merchant_id>3FBCR4INC</merchant_id>
    <merchant_name>Books & Things,
Inc.</merchant_name>
  <merchant_auth_key>1NNF484MCP59CHB27365
dauth_key>
  </merchant_params>
</funds_authorization_request>
```

In some embodiments, an issuer server may parse the authorization request(s), and based on the request details may query a database, e.g., user profile database 4006*b*, for data associated with an account linked to the user. For example, the merchant server may issue PHP/SQL commands to query a database table (such as FIG. 55, Accounts 4419*d*) for user account(s) data. An example user account(s) query 4027, substantially in the form of PHP/SQL commands, is provided below:

```
<?PHP
header('Content-Type: text/plain');
mysql_connect("254.93.179.112",$DBserver,$password); //
access database server
```

-continued

```
mysql_select_db("V-GLASSES_DB.SQL"); // select database
table to search
//create query
$query = "SELECT issuer user_id user_name user_balance
account_type FROM AccountsTable WHERE account_num LIKE '%'
$accountnum";
$result = mysql_query($query); // perform the search query
mysql_close("V-GLASSES_DB.SQL"); // close database access
?>
```

In some embodiments, on obtaining the user account(s) data, e.g., 4028, the issuer server may determine whether the user can pay for the transaction using funds available in the account, 4029. For example, the issuer server may determine whether the user has a sufficient balance remaining in the account, sufficient credit associated with the account, and/or the like. Based on the determination, the issuer server(s) may provide a funds authorization response, e.g., 4030, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 4031, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 55, Transactions 4419*i*). An example transaction store command, substantially in the form of PHP/SQL commands, is provided below:

```
<?PHP
header('Content-Type: text/plain');
mysql_connect("254.92.185.103",$DBserver,$password); //
access database server
mysql_select("V-GLASSES_DB.SQL"); // select database to
append
mysql_query("INSERT INTO TransactionsTable (PurchasesTable
(timestamp, purchase_summary_list, num_products,
product_summary, product_quantity, transaction_cost,
account_params_list, account_name, account_type,
account_num, billing_addres, zipcode, phone, sign,
merchant_params_list, merchant_id, merchant_name,
merchant_auth_key)
VALUES (time( ), $purchase_summary_list, $num_products,
$product_summary, $product_quantity, $transaction_cost,
$account_params_list, $account_name, $account_type,
$account_num, $billing_addres, $zipcode, $phone, $sign,
```

-continued

```
$merchant_params_list, $merchant_id, $merchant_name,
$merchant_auth_key)"); // add data to table in database
mysql_close("V-GLASSES_DB.SQL"); // close connection to
database
?>
```

In some embodiments, the pay network server may forward a transaction authorization response, e.g., 4032, to the user wallet device, PoS client, and/or merchant server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 4033, and store the XML data file, e.g., 4034, in a database, e.g., merchant database 404. For example, a batch XML data file may be structured similar to the example XML data structure template provided below:

```
<?XML version = "1.0" encoding = "UTF-8" ?>
<merchant_data>
  <merchant_id>3FBCR4INC</merchant_id>
  <merchant_name>Books & Things, Inc.</merchant_name>
  <merchant_auth_key>1NNF484MCP59CHB27365
</merchant_auth_key>
  <account_number>123456789</account_number>
</merchant_data>
<transaction_data>
  <transaction 1>
    . . .
  </transaction 1>
  <transaction 2>
    . . .
  </transaction 2>
    .
    .
    .
  <transaction n>
    . . .
  </transaction n>
</transaction_data>
```

In some embodiments, the server may also generate a purchase receipt, e.g., 4033, and provide the purchase receipt to the client, e.g., 4035. The client may render and display, e.g., 4036, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 52A:
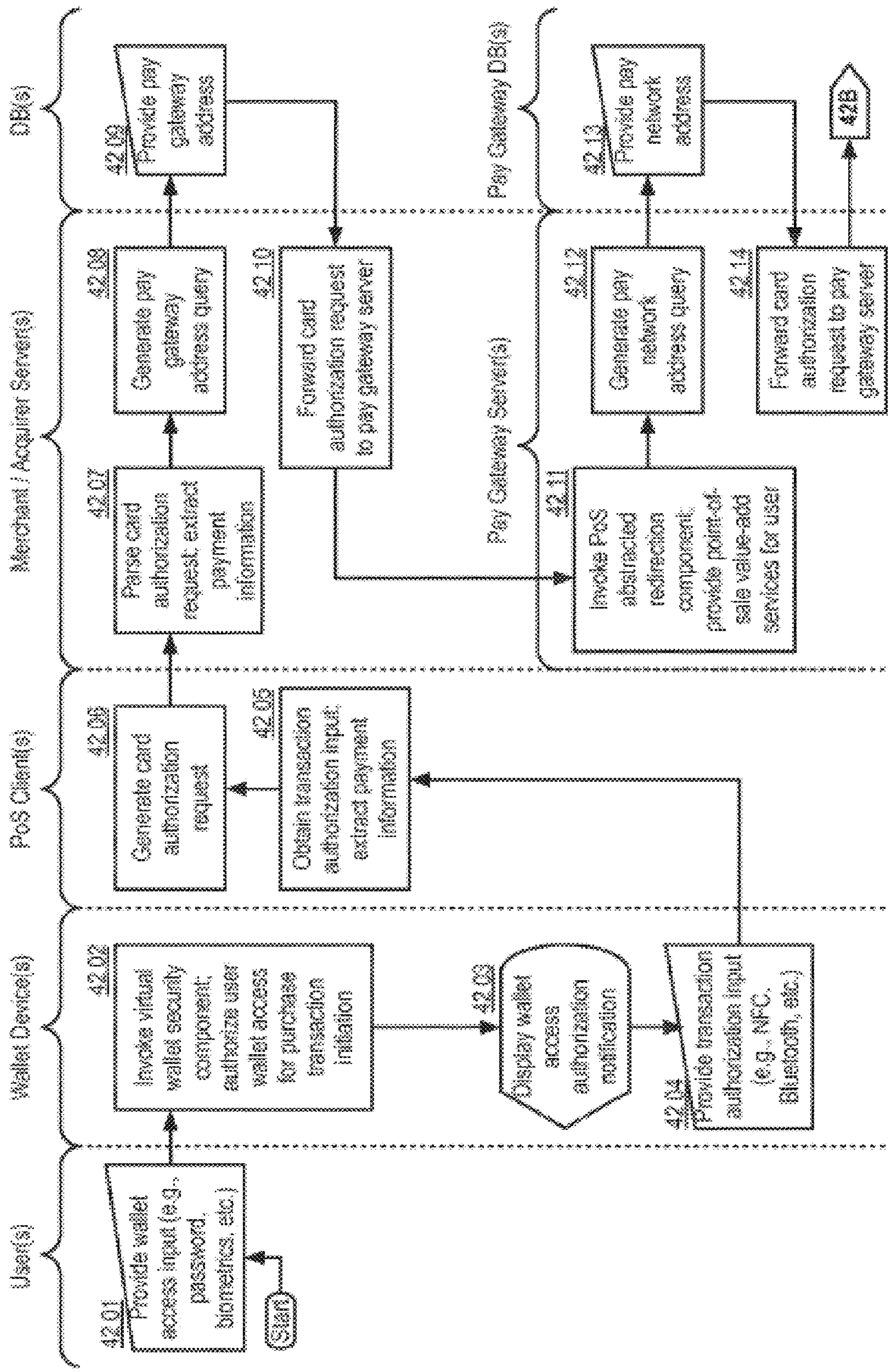
FIGS. 52A-52B show logic flow diagrams illustrating example aspects of purchase transaction authorization in some embodiments of the V-GLASSES, e.g., a Purchase Transaction Authorization ("PTA") component 4100.
Figure 52B:
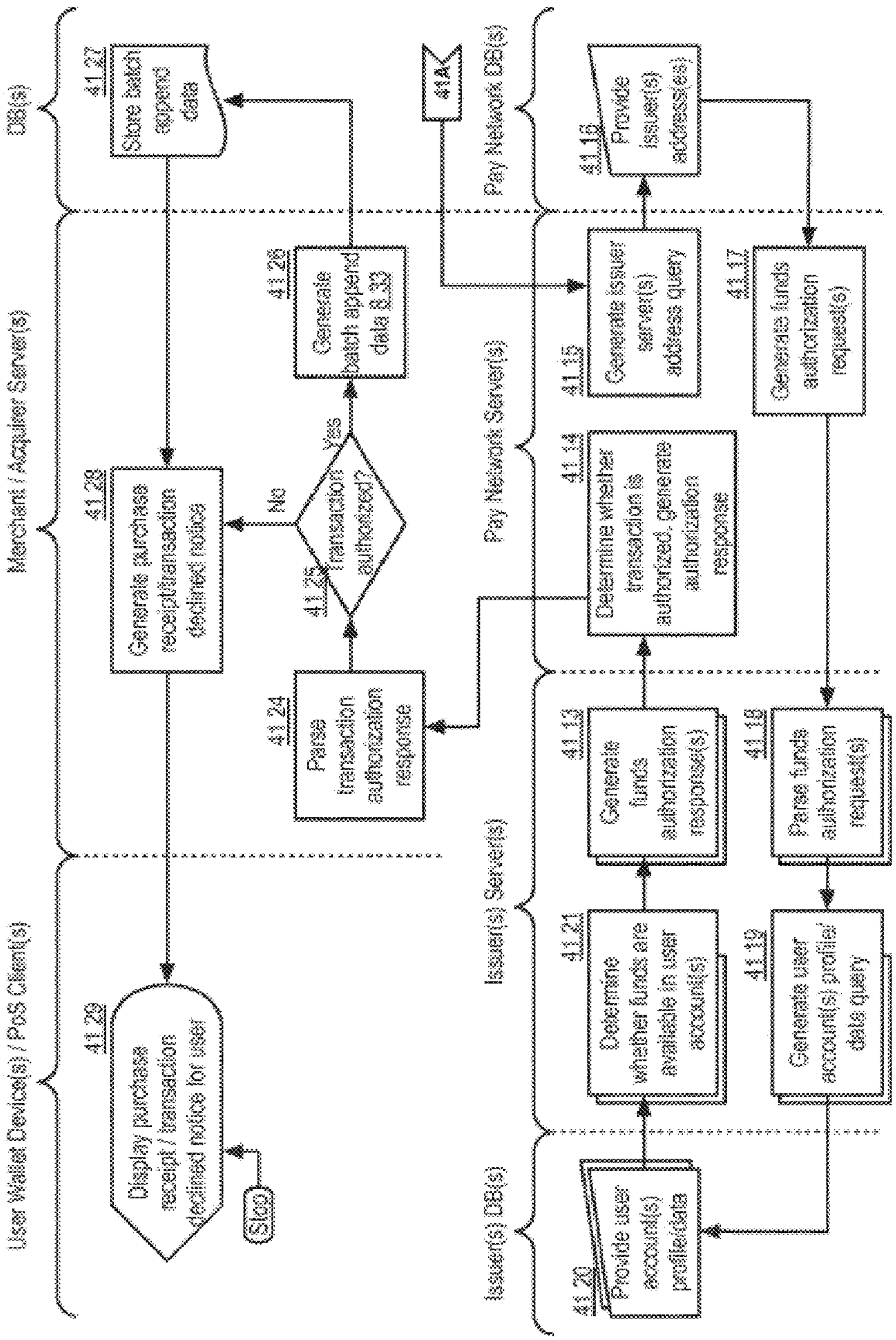

FIGS. 52A-B show logic flow diagrams illustrating example aspects of purchase transaction authorization in some embodiments of the V-GLASSES, e.g., a Purchase Transaction Authorization ("PTA") component 4100. With reference to FIG. 52A, in some embodiments, a user may wish to utilize a virtual wallet account to purchase a product, service, offering, and/or the like ("product"), from a merchant via a merchant online site or in the merchant's store.

The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 4101, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 4102-4103.

In some embodiments, upon authenticating the user for access to virtual wallet features, the user wallet device may provide a transaction authorization input, e.g., 4104, to a point-of-sale ("PoS") client. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may obtain the transaction authorization input, and parse the input to extract payment information from the transaction authorization input, e.g., 4105. For example, the PoS client may utilize a parser, such as the example parsers provided below in the discussion with reference to FIG. 55. The PoS client may generate a card authorization request, e.g., 4106, using the obtained transaction authorization input from the user wallet device, and/or product/checkout data (see, e.g., FIG. 49, 3815-3817).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 4108, for a network address of the payment gateway server, for example by using a portion of a user payment card number, or a user ID (such as an email address) as a keyword for the database query. In response, the merchant/acquirer database may provide the requested payment gateway address, e.g., 4110. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 4111. For example, the pay gateway server may invoke components for fraud prevention (see e.g., VerifyChat, FIG. 14E), loyalty and/or rewards, and/or other services for which the user-merchant combination is authorized.

The pay gateway server may forward the card authorization request to a pay network server for payment processing, e.g., 4114. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 4112, for a network address of the payment network server, for example by using a portion of a user payment card number, or a user ID (such as an email address) as a keyword for the database query. In response, the payment gateway database may provide the requested payment network address, e.g., 4113. The pay gateway server may forward the card authorization request to the pay network server using the provided address, e.g., 4114.

With reference to FIG. 52B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some embodiments, the pay network server may generate a query, e.g., 4115, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 4115, for a network address of the issuer(s) server(s), for example by using a portion of a user payment card number, or a user ID (such as an email address) as a keyword for the database query.

In response to obtaining the issuer server query, the pay network database may provide, e.g., 4116, the requested issuer server data to the pay network server. In some embodiments, the pay network server may utilize the issuer server data to generate funds authorization request(s), e.g., 4117, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 4118, and based on the request details may query a database, e.g., 4119, for data associated with an account linked to the user.

In some embodiments, on obtaining the user account(s) data, e.g., 4120, the issuer server may determine whether the user can pay for the transaction using funds available in the account, e.g., 4121. For example, the issuer server may determine whether the user has a sufficient balance remaining in the account, sufficient credit associated with the account, and/or the like. Based on the determination, the issuer server(s) may provide a funds authorization response, e.g., 4122, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 4123, the pay network server may invoke a component to provide value-add services for the user, e.g., 4123.

In some embodiments, the pay network server may forward a transaction authorization response to the user wallet device, PoS client, and/or merchant server. The merchant may parse, e.g., 4124, the transaction authorization response, and determine from it that the user possesses sufficient funds in the card account to conduct the transaction, e.g., 4125, option"Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 4126, and store the XML data file, e.g., 4127, in a database. In some embodiments, the server may also generate a purchase receipt, e.g., 4128, and provide the purchase receipt to the client. The client may render and display, e.g., 4129, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 53A:
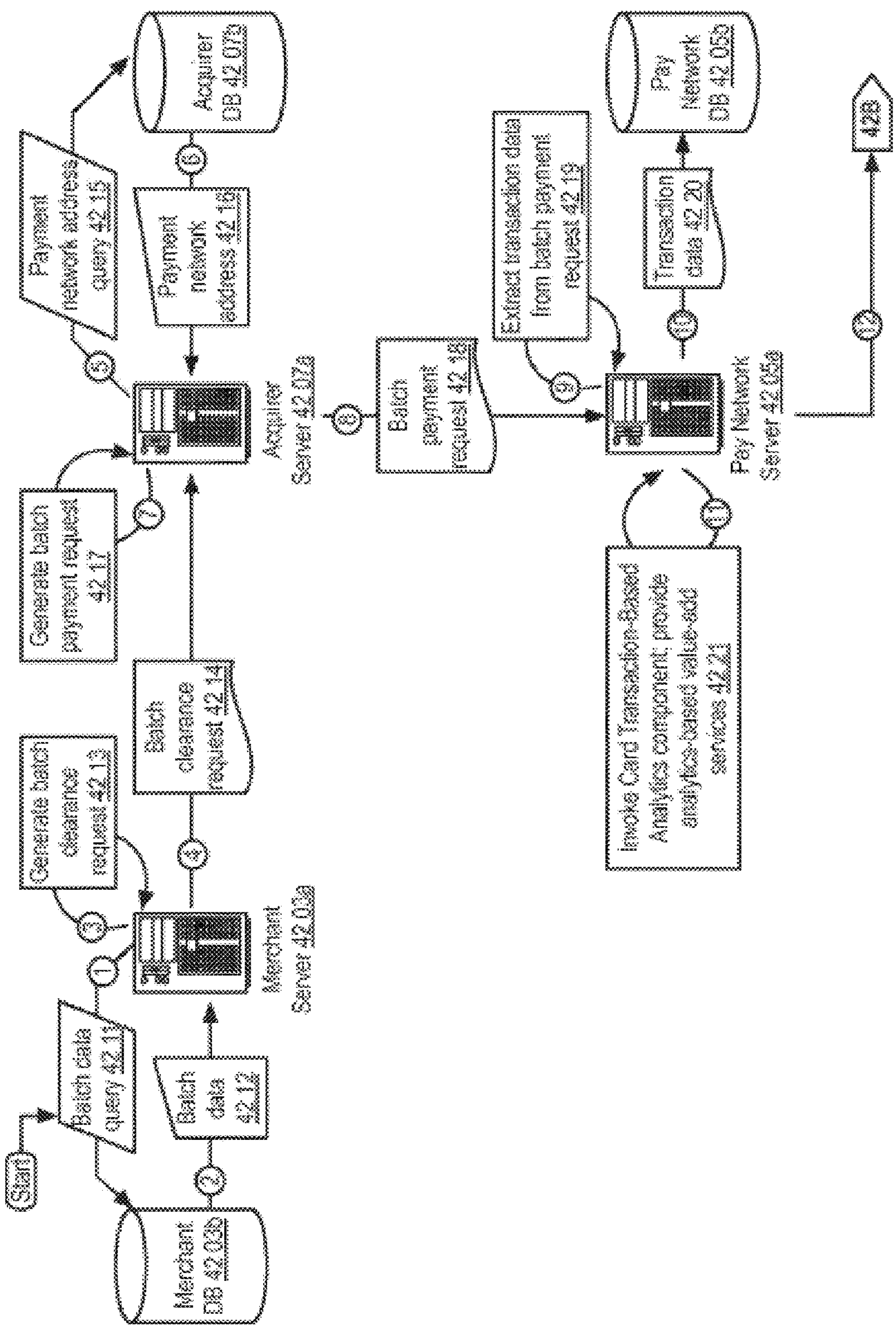
Figure 53B:
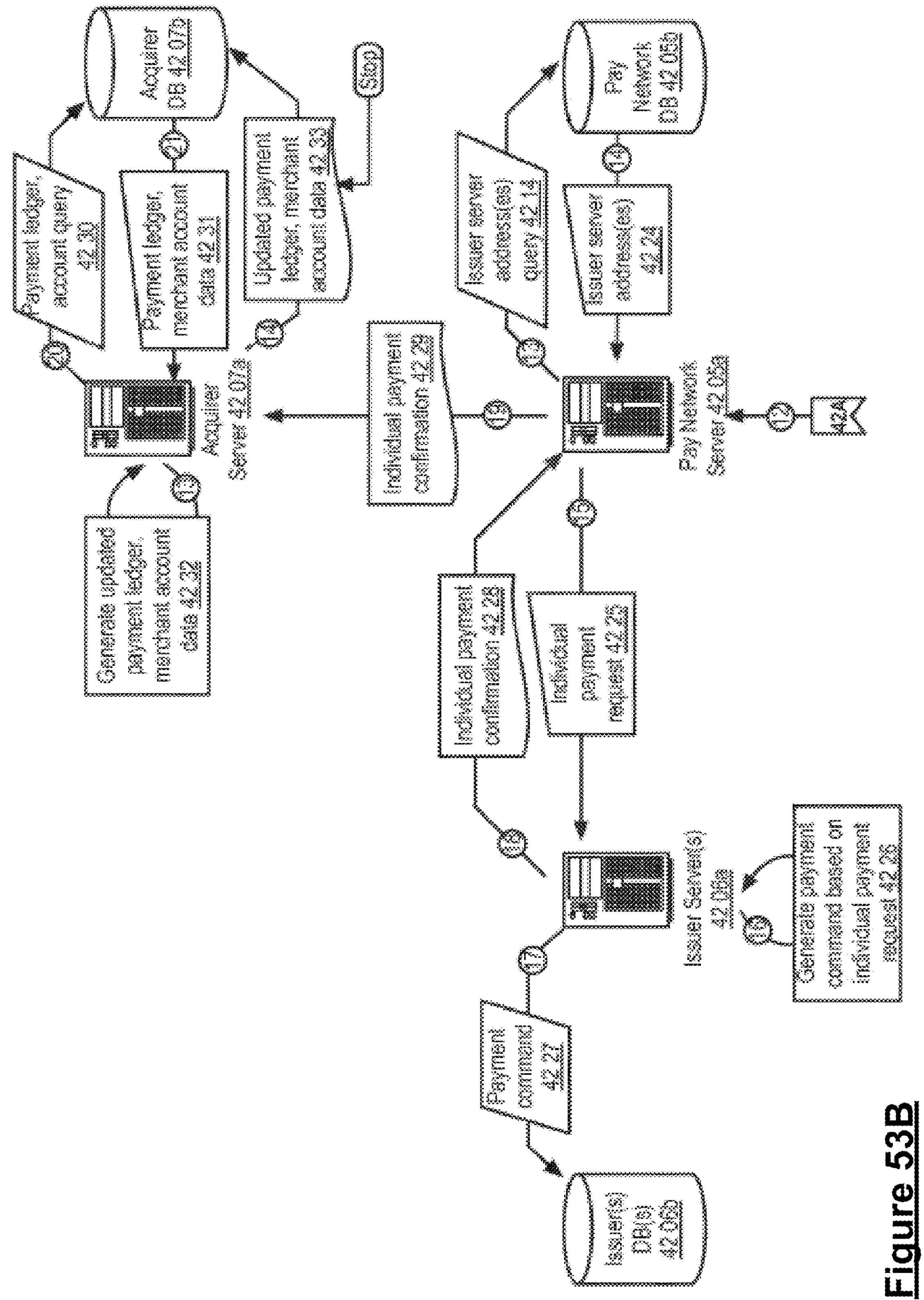

FIGS. 53A-B show data flow diagrams illustrating an example purchase transaction clearance procedure in some embodiments of the V-GLASSES. With reference to FIG. 53A, in some embodiments, a merchant server, e.g., 4203*a*, may initiate clearance of a batch of authorized transactions. For example, the merchant server may generate a batch data request, e.g., 4211, and provide the request, to a merchant database, e.g., 4203*b*. For example, the merchant server may utilize PHP/SQL commands similar to the examples provided above to query a relational database. In response to the batch data request, the database may provide the requested batch data, e.g., 4212. The server may generate a batch clearance request, e.g., 4213, using the batch data obtained from the database, and provide, e.g., 4214, the batch clearance request to an acquirer server, e.g., 4207*a*. For example, the merchant server may provide a HTTP(S) POST message including XML-formatted batch data in the message body for the acquirer server. The acquirer server may generate, e.g., 4215, a batch payment request using the obtained batch clearance request, and provide, e.g., 4218, the batch payment request to the pay network server, e.g., 4205*a*. The pay network server may parse the batch payment request, and extract the transaction data for each transaction stored in the batch payment request, e.g., 4219. The pay network server may store the transaction data, e.g., 4220, for each transaction in a database, e.g., pay network database 4205*b*. In some embodiments, the pay network server may invoke a component to provide value-add analytics services based on analysis of the transactions of the merchant for whom the V-GLASSES is clearing purchase transactions. Thus, in some embodiments, the pay network server may provide analytics-based value-added services for the merchant and/or the merchant's users.

With reference to FIG. 53B, in some embodiments, for each extracted transaction, the pay network server may query, e.g., 4223, a database, e.g., pay network database 4205*b*, for an address of an issuer server. For example, the pay network server may utilize PHP/SQL commands similar to the examples provided above. The pay network server may generate an individual payment request, e.g., 4225, for each transaction for which it has extracted transaction data, and provide the individual payment request, e.g., 4225, to the issuer server, e.g., 4206*a*. For example, the pay network server may provide an individual payment request to the issuer server(s) as a HTTP(S) POST message including XML-formatted data. An example listing of an individual payment request 4225, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8" ?>
<pay_request>
  <request_ID>CNI4ICNW2</request_ID>
  <timestamp>2011-02-22 17:00:01</timestamp>
  <pay_amount>$34.78</pay_amount>
  <account_params>
    <account_name>John Q. Public</account_name>
    <account_type>credit</account_type>
    <account_num>123456789012345</account_num>
    <billing_address> 123 Green St., Norman, OK
98765</billing_address>
    <phone>123-456-7809</phone>
    <sign>/jqp/</sign>
  </account_params>
  <merchant_params>
    <merchant_id>3FBCR4INC</merchant_id>
    <merchant_name>Books & Things,
Inc.</merchant_name>
  <merchant_auth_key>1NNF484MCP59CHB27365
</merchant_auth_key>
  </merchant_params>
  <purchase_summary>
    <num_products>1</num_products>
    <product>
      <product_summary>Book - XML for
dummies</product_summary>
      <product_quantity>1</product_quantity?
    </product>
  </purchase_summary>
</pay_request>
```

In some embodiments, the issuer server may generate a payment command, e.g., 4227. For example, the issuer server may issue a command to deduct funds from the user's account (or add a charge to the user's credit card account).

The issuer server may issue a payment command, e.g., 4227, to a database storing the user's account information, e.g., user profile database 4206*b*. The issuer server may provide an individual payment confirmation, e.g., 4228, to the pay network server, which may forward, e.g., 4229, the funds transfer message to the acquirer server. An example listing of an individual payment confirmation 4228, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8" ?>
<deposit_ack>
  <request_ID>CNI4ICNW2</request_ID>
  <clear_flag>true</clear_flag>
  <timestamp>2011-02-22 17:00:02</timestamp>
  <deposit_amount>$34.78</deposit_amount>
</deposit_ack>
```

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 4230, an acquirer database 4207*b* for payment ledger and/or merchant account data, e.g., 4231. The acquirer server may utilize payment ledger and/or merchant account data from the acquirer database, along with the individual payment confirmation, to generate updated payment ledger and/or merchant account data, e.g., 4232. The acquirer server may then store, e.g., 4233, the updated payment ledger and/or merchant account data to the acquire database.

Figure 54A:
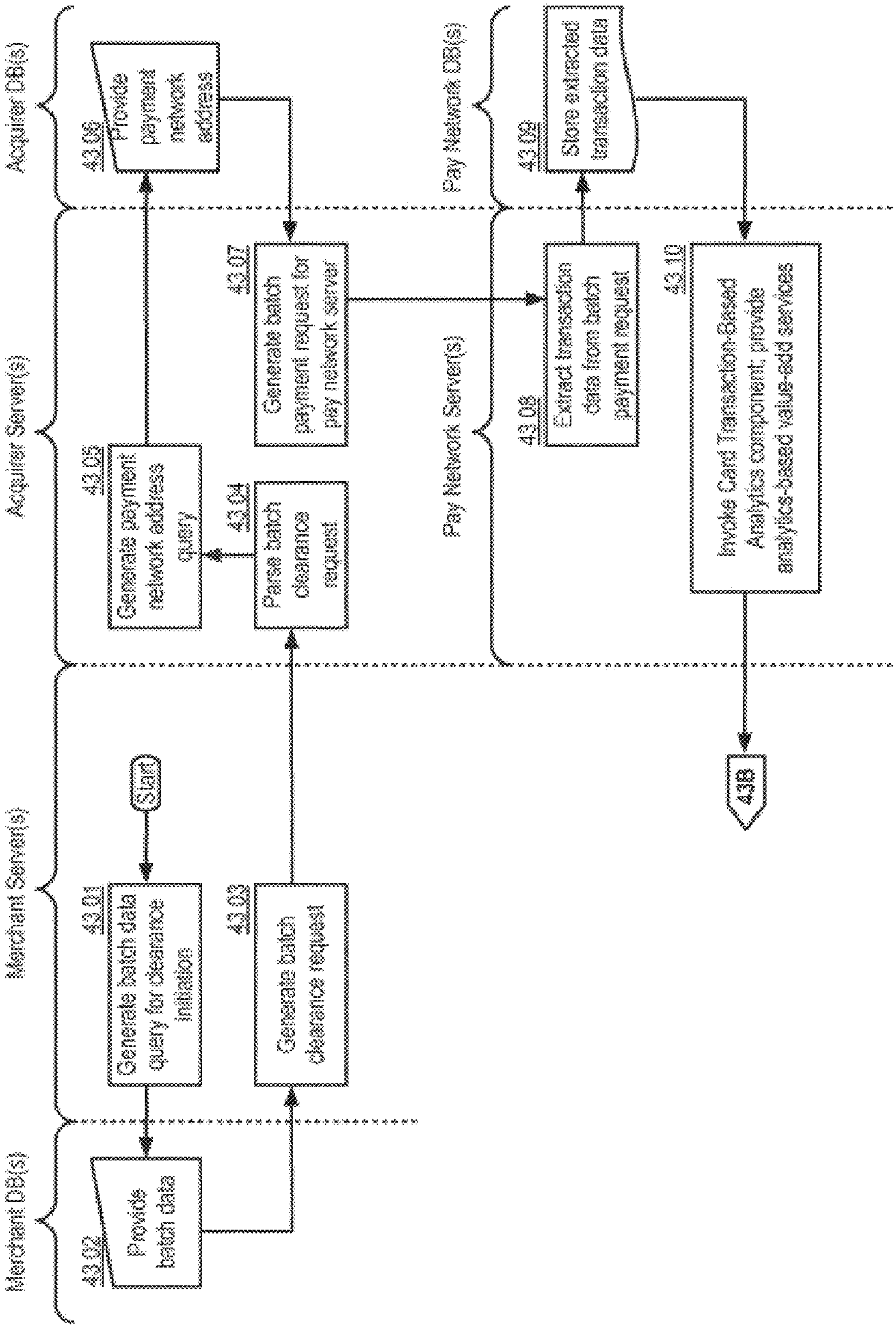
FIGS. 54A-54B show logic flow diagrams illustrating example aspects of purchase transaction clearance in some embodiments of the V-GLASSES, e.g., a Purchase Transaction Clearance ("PTC") component 4300.
Figure 54B:
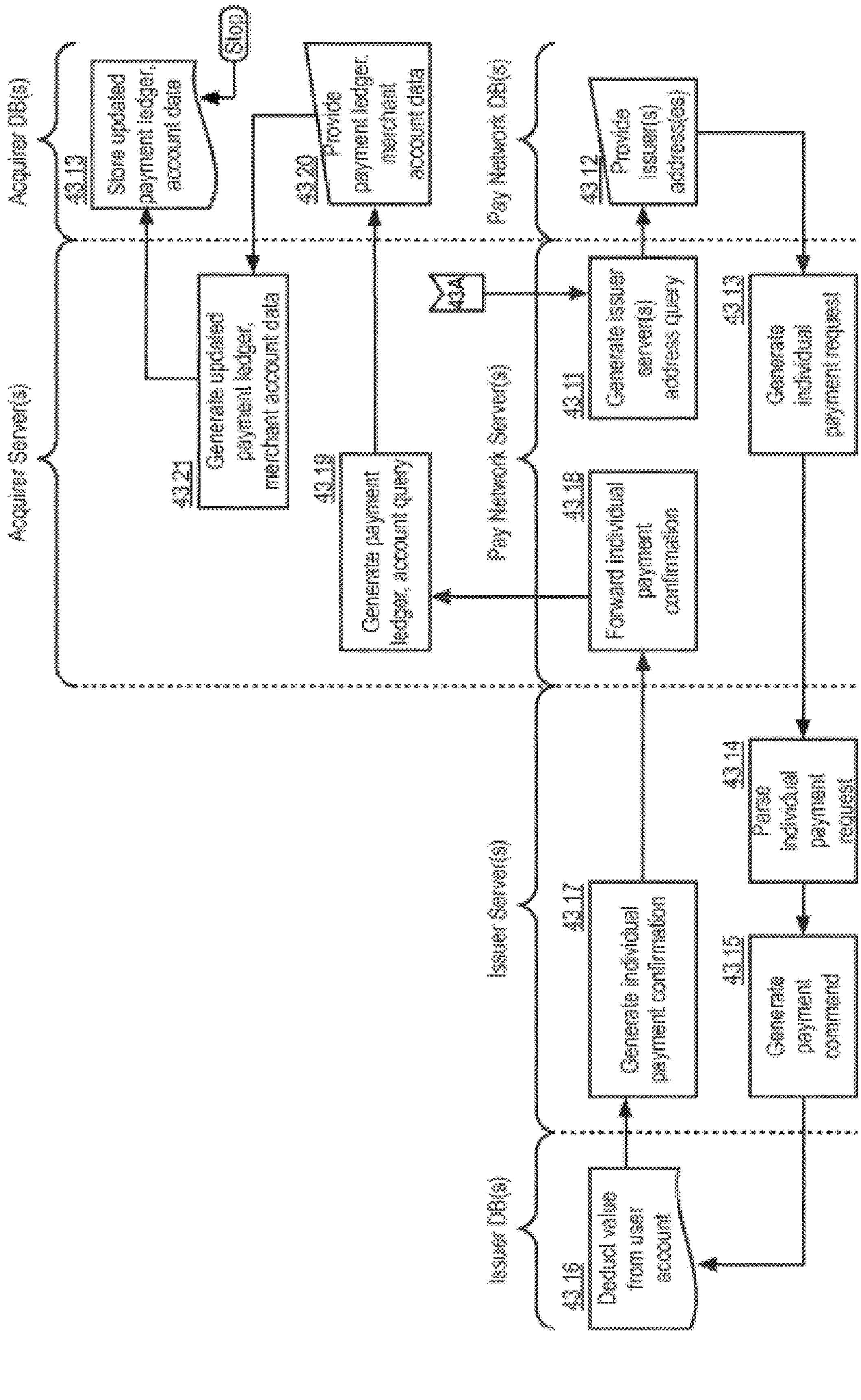

FIGS. 54A-B show logic flow diagrams illustrating example aspects of purchase transaction clearance in some embodiments of the V-GLASSES, e.g., a Purchase Transaction Clearance ("PTC") component 4300. With reference to FIG. 54A, in some embodiments, a merchant server may initiate clearance of a batch of authorized transactions. For example, the merchant server may generate a batch data request, e.g., 4301, and provide the request to a merchant database. In response to the batch data request, the database may provide the requested batch data, e.g., 4302. The server may generate a batch clearance request, e.g., 4303, using the batch data obtained from the database, and provide the batch clearance request to an acquirer server. The acquirer server may parse, e.g., 4304, the obtained batch clearance request, and generate, e.g., 4307, a batch payment request using the obtained batch clearance request to provide, the batch payment request to a pay network server. For example, the acquirer server may query, e.g., 4305, an acquirer database for an address of a payment network server, and utilize the obtained address, e.g., 4306, to forward the generated batch payment request to the pay network server.

The pay network server may parse the batch payment request obtained from the acquirer server, and extract the transaction data for each transaction stored in the batch payment request, e.g., 4308. The pay network server may store the transaction data, e.g., 4309, for each transaction in a pay network database. In some embodiments, the pay network server may invoke a component, e.g., 4310, to provide analytics based on the transactions of the merchant for whom purchase transaction are being cleared.

With reference to FIG. 54B, in some embodiments, for each extracted transaction, the pay network server may query, e.g., 4311, a pay network database for an address of an issuer server. The pay network server may generate an individual payment request, e.g., 4313, for each transaction for which it has extracted transaction data, and provide the individual payment request to the issuer server. In some embodiments, the issuer server may parse the individual payment request, e.g., 4314, and generate a payment command, e.g., 4315, based on the parsed individual payment request. For example, the issuer server may issue a command to deduct funds from the user's account (or add a charge to the user's credit card account). The issuer server may issue a payment command, e.g., 4315, to a database storing the user's account information, e.g., a user profile database. The issuer server may provide an individual payment confirmation, e.g., 4317, to the pay network server, which may forward, e.g., 4318, the individual payment confirmation to the acquirer server.

In some embodiments, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 4319, an acquirer database for payment ledger and/or merchant account data, e.g., 4320. The acquirer server may utilize payment ledger and/or merchant account data from the acquirer database, along with the individual payment confirmation, to generate updated payment ledger and/or merchant account data, e.g., 4321. The acquirer server may then store, e.g., 4322, the updated payment ledger and/or merchant account data to the acquire database.

V-GLASSES Controller

FIG. 55 shows a block diagram illustrating embodiments of a V-GLASSES controller 4401. In this embodiment, the V-GLASSES controller 4401 may serve to aggregate, process, store, search, serve, identify, instruct, generate, match, and/or facilitate interactions with a computer through various technologies, and/or other related data.

Typically, users, e.g., 4433*a*, which may be people and/or other systems, may engage information technology systems (e.g., computers) to facilitate information processing. In turn, computers employ processors to process information; such processors 4403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 4429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the V-GLASSES controller 4401 may be connected to and/or communicate with entities such as, but not limited to: one or more users from user input devices 4411; peripheral devices 4412; an optional cryptographic processor device 4428; and/or a communications network 4413. For example, the V-GLASSES controller 4401 may be connected to and/or communicate with users, e.g., 4433*a*, client device(s), e.g., 4433*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The V-GLASSES controller 4401 may be based on computer systems that may comprise, but are not limited to, components such as: a computer systemization connected to memory 4429.

Computer Systemization

A computer systemization 4402 may comprise a clock 4430, central processing unit ("CPU(s)" and/or "processor(s)" (these terms are used interchangeable throughout the disclosure unless noted to the contrary)) 4403, a memory 4429 (e.g., a read only memory (ROM) 4406, a random access memory (RAM) 4405, etc.), and/or an interface bus 4407, and most frequently, although not necessarily, are all interconnected and/or communicating through a system bus 4404 on one or more (mother)board(s) having conductive and/or otherwise transportive circuit pathways through which instructions (e.g., binary encoded signals) may travel to effectuate communications, operations, storage, etc. The computer systemization may be connected to a power source 4486; e.g., optionally the power source may be internal. Optionally, a cryptographic processor 4426 and/or transceivers (e.g., ICs) 4474 may be connected to the system bus. In another embodiment, the cryptographic processor and/or transceivers may be connected as either internal and/or external peripheral devices 4412 via the interface bus I/O. In turn, the transceivers may be connected to antenna(s) 4475, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing V-GLASSES controller to determine its location)); Broadcom BCM4329 FKUBG transceiver chip (e.g., providing 802.11n, Bluetooth 2.1+EDR, FM, etc.); a Broadcom BCM4750 IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 4429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the V-GLASSES controller and beyond through various interfaces. Should processing requirements dictate a greater amount speed and/or capacity, distributed processors (e.g., Distributed V-GLASSES), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the V-GLASSES may be achieved by implementing a microcontroller such as CAST's R8051XC2 microcontroller; Intel's MCS 51 (i.e., 8051 microcontroller); and/or the like. Also, to implement certain features of the V-GLASSES, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the V-GLASSES component collection (distributed or otherwise) and/or features may be implemented via the microprocessor and/or via embedded components; e.g., via ASIC, coprocessor, DSP, FPGA, and/or the like. Alternately, some implementations of the V-GLASSES may be implemented with embedded components that are configured and used to achieve a variety of features or signal processing.

Depending on the particular implementation, the embedded components may include software solutions, hardware solutions, and/or some combination of both hardware/software solutions. For example, V-GLASSES features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the V-GLASSES features. A hierarchy of programmable interconnects allow logic blocks to be interconnected as needed by the V-GLASSES system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the V-GLASSES may be developed on regular FPGAs and then migrated into a fixed version that more resembles ASIC implementations. Alternate or coordinating implementations may migrate V-GLASSES controller features to a final ASIC instead of or in addition to FPGAs. Depending on the implementation all of the aforementioned embedded components and microprocessors may be considered the "CPU" and/or "processor" for the V-GLASSES.

Power Source

The power source 4486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 4486 is connected to at least one of the interconnected subsequent components of the V-GLASSES thereby providing an electric current to all subsequent components. In one example, the power source 4486 is connected to the system bus component 4404. In an alternative embodiment, an outside power source 4486 is provided through a connection across the I/O 4408 interface. For example, a USB and/or IEEE 1394 connection carries both data and power across the connection and is therefore a suitable source of power.

Interface Adapters

Interface bus(ses) 4407 may accept, connect, and/or communicate to a number of interface adapters, conventionally although not necessarily in the form of adapter cards, such as but not limited to: input output interfaces (I/O) 4408, storage interfaces 4409, network interfaces 4410, and/or the like. Optionally, cryptographic processor interfaces 4427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 4409 may accept, communicate, and/or connect to a number of storage devices such as, but not limited to: storage devices 4414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 4410 may accept, communicate, and/or connect to a communications network 4413. Through a communications network 4413, the V-GLASSES controller is accessible through remote clients **4433*b* (e.g., computers with web browsers) by users 4433*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed V-GLASSES), architectures may similarly be employed to pool, load balance, and/or otherwise increase the communicative bandwidth required by the V-GLASSES controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 4410 may be used to engage with various communications network types 4413**. For example, multiple network interfaces may be employed to allow for the communication over broadcast, multicast, and/or unicast networks.

Input Output interfaces (I/O) 4408 may accept, communicate, and/or connect to user input devices 4411, peripheral devices 4412, cryptographic processor devices 4428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 4411 often are a type of peripheral device 4412 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 4412 may be connected and/or communicate to I/O and/or other facilities of the like such as network interfaces, storage interfaces, directly to the interface bus, system bus, the CPU, and/or the like. Peripheral devices may be external, internal and/or part of the V-GLASSES controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 4428), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the V-GLASSES controller may be embodied as an embedded, dedicated, and/or monitor-less (i.e., headless) device, wherein access would be provided over a network interface connection.

Cryptographic units such as, but not limited to, microcontrollers, processors 4426, interfaces 4427, and/or devices 4428 may be attached, and/or communicate with the V-GLASSES controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 4429. However, memory is a fungible technology and resource, thus, any number of memory embodiments may be employed in lieu of or in concert with one another. It is to be understood that the V-GLASSES controller and/or a computer systemization may employ various forms of memory 4429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 4429 will include ROM 4406, RAM 4405, and a storage device 4414. A storage device 4414 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 4429 may contain a collection of program and/or database components and/or data such as, but not limited to: operating system component(s) 4415 (operating system); information server component(s) 4416 (information server); user interface component(s) 4417 (user interface); Web browser component(s) 4418 (Web browser); database(s) 4419; mail server component(s) 4421; mail client component(s) 4422; cryptographic server component(s) 4420 (cryptographic server); the V-GLASSES component(s) 4435; and/or the like (i.e., collectively a component collection). These components may be stored and accessed from the storage devices and/or from storage devices accessible through an interface bus. Although non-conventional program components such as those in the component collection, typically, are stored in a local storage device 4414, they may also be loaded and/or stored in memory such as: peripheral devices, RAM, remote storage facilities through a communications network, ROM, various forms of memory, and/or the like.

Operating System

The operating system component 4415 is an executable program component facilitating the operation of the V-GLASSES controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the V-GLASSES controller to communicate with other entities through a communications network 4413. Various communication protocols may be used by the V-GLASSES controller as a subcarrier transport mechanism for interaction, such as, but not limited to: multicast, TCP/IP, UDP, unicast, and/or the like.

Information Server

An information server component 4416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the V-GLASSES controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the V-GLASSES database 4419, operating systems, other program components, user interfaces, Web browsers, and/or the like.

Access to the V-GLASSES database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the V-GLASSES. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the V-GLASSES as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 4417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 4418 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the V-GLASSES enabled nodes. The combined application may be nugatory on systems employing standard Web browsers.

Mail Server

A mail server component 4421 is a stored program component that is executed by a CPU 4403. The mail server may be a conventional Internet mail server such as, but not limited to sendmail, Microsoft Exchange, and/or the like. The mail server may allow for the execution of program components through facilities such as V-GLASSES, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the V-GLASSES.

Access to the V-GLASSES mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 4422 is a stored program component that is executed by a CPU 4403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 4420 is a stored program component that is executed by a CPU 4403, cryptographic processor 4426, cryptographic processor interface 4427, cryptographic processor device 4428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the V-GLASSES may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the V-GLASSES component to engage in secure transactions if so desired. The cryptographic component facilitates the secure accessing of resources on the V-GLASSES and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The V-GLASSES Database

The V-GLASSES database component 4419 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the V-GLASSES database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the V-GLASSES database is implemented as a data-structure, the use of the V-GLASSES database 4419 may be integrated into another component such as the V-GLASSES component 4435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 4419 includes several tables 4419*a-q*. A Users table 4419*a* may include fields such as, but not limited to: user_id, ssn, dob, first_name, last_name, age, state, address_firstline, address_secondline, zipcode, devices_list, contact_info, contact_type, alt_contact_info, alt_contact_type, user_gender, user_clothing_size, user_body_type, user_eye_color, user_hair_color, user_complexion, user_personalized_gesture_models, user_recommended_items, user_image, user_ image_date, user_body_joint location, and/or the like. The Users table may support and/or track multiple entity accounts on a V-GLASSES. A Devices table 4419*b* may include fields such as, but not limited to: device_ID, device_name, device_IP, device_GPS, device_MAC, device_serial, device_ECID, device_UDID, device_browser, device_ type, device_model, device_version, device_OS, device_ apps_list, device_securekey, wallet_app_installed_ flag, and/or the like. An Apps table 4419*c* may include fields such as, but not limited to: app_ID, app_name, app_ type, app_ dependencies, app_access_code, user_pin, and/or the like. An Accounts table 4419*d* may include fields such as, but not limited to: account_number, account_security_ code, account_name, issuer_acquirer_flag, issuer_name, acquirer_name, account_address, routing_number, access_API_call, linked_wallets_list, and/or the like. A Merchants table 4419*e* may include fields such as, but not limited to: merchant_id, merchant_name, merchant_address, store_id, ip_address, mac_address, auth_key, port_ num, security_settings_list, and/or the like. An Issuers table 4419*f* may include fields such as, but not limited to: issuer_id, issuer_name, issuer_address, ip_address, mac_address, auth_key, port_num, security_settings_list, and/or the like. An Acquirers table 4419*g* may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 4419*h* may include fields such as, but not limited to: gateway_ID, gateway_IP, gateway_MAC, gateway_secure_key, gateway_access_list, gateway_API_call_list, gateway_services_list, and/or the like. A Shop Sessions table 4419*i* may include fields such as, but not limited to: user_id, session_id, alerts_URL, timestamp, expiry_lapse, merchant_id, store_id, device_type, device_ID, device_IP, device_MAC, device_browser, device_serial, device_ECID, device_model, device_OS, wallet_app_installed, total_cost, cart_ID_list, product_params_list, social_flag, social_message, social_ networks_list, coupon_lists, accounts_list, CVV2_lists, charge_ratio_list, charge_ priority_list, value_exchange_symbols_list, bill_address, ship_address, cloak_flag, pay_mode, alerts_rules_list, and/or the like. A Transactions table 4419*j* may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_ line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 4419*k* may include fields such as, but not limited to: batch_id, transaction_id_list, timestamp_list, cleared_flag_list, clearance_ trigger_settings, and/or the like. A Ledgers table 4419*l* may include fields such as, but not limited to: request_id, timestamp, deposit_amount, batch_id, transaction_id, clear_flag, deposit_account, transaction_summary, payor_name, payor_account, and/or the like. A Products table 4419*m* may include fields such as, but not limited to: product_ID, product_title, product_attributes_list, product_price, tax_info_list, related_products_list, offers_list, discounts_list, rewards_list, merchants_list, merchant_availability_list, product_date_added, product_image, product_qr, product_ manufacturer, product_model, product_aisle, product_ stack, product_shelf, product_type, and/or the like. An Offers table 4419*n* may include fields such as, but not limited to: offer_ID, offer_title, offer_attributes_list, offer_ price, offer_expiry, related_products_list, discounts_list, rewards_list, merchants_list, merchant_availability_list, and/or the like. A Behavior Data table 4419*o* may include fields such as, but not limited to: user_id, timestamp, activity_type, activity_location, activity_attribute_list, activity_attribute_values_list, and/or the like. A Label Analytics table 4419*p* may include fields such as, but not limited to: label_id, label_name, label_format, label_account_type, label_session_id, label_session_type, label_product_id, label_product_type, Label_transaction_id, label_transaction_type, and/or the like. A Social table 4419*q* may include fields such as, but not limited to: social_id, social_name, social_server_id, social_server_ip, social_domain_id, social_source, social_feed_id, social_feed_source, social_ comment, social_comment_time, social_comment_keyterms, social_comment_product_id, and/or the like. A MDGA table 4419*r* includes fields such as, but not limited to: MDGA_id, MDGA_name, MDGA_touch_gestures, MDGA_finger_gestures, MDGA_QR_gestures, MDGA_object_gestures, MDGA_vocal_commands, MDGA_merchant, and/or the like. The MDGA table may support and/or track multiple possible composite actions on a V-GLASSES. A payment device table 4419*s* includes fields such as, but not limited to: pd_id, pd_user, pd_type, pd_issuer, pd_issuer_id, pd_qr, pd_date_added, and/or the like. The payment device table may support and/or track multiple payment devices used on a V-GLASSES. An object gestures table 4419*t* includes fields such as, but not limited to: object_gesture_id, object_gesture_type, object_gesture_x, object_gesture_x, object_gesture_merchant, and/or the like. The object gesture table may support and/or track multiple object gestures performed on a V-GLASSES. A touch gesture table 4419*u* includes fields such as, but not limited to: touch_gesture_id, touch_gesture_type, touch_gesture_x, touch_gesture_x, touch_gesture_merchant, and/or the like. The touch gestures table may support and/or track multiple touch gestures performed on a V-GLASSES. A finger gesture table 4419*v* includes fields such as, but not limited to: finger_gesture_id, finger_gesture_type, finger_gesture_x, finger_gesture_x, finger_gesture_merchant, and/or the like. The finger gestures table may support and/or track multiple finger gestures performed on a V-GLASSES. A QR gesture table 4419*w* includes fields such as, but not limited to: QR_gesture_id, QR_gesture_type, QR_gesture_x, QR_gesture_x, QR_gesture_merchant, and/or the like. The QR gestures table may support and/or track multiple QR gestures performed on a V-GLASSES. A vocal command table 4419*x* includes fields such as, but not limited to: vc_id, vc_name, vc_command_list, and/or the like. The vocal command gestures table may support and/or track multiple vocal commands performed on a V-GLASSES.

In one embodiment, the V-GLASSES database may interact with other database systems. For example, employing a distributed database system, queries and data access by search V-GLASSES component may treat the combination of the V-GLASSES database, an integrated data security layer database as a single database entity.

In one embodiment, user programs may contain various user interface primitives, which may serve to update the V-GLASSES. Also, various accounts may require custom database tables depending upon the environments and the types of clients the V-GLASSES may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 4419*a-x*. The V-GLASSES may be configured to keep track of various settings, inputs, and parameters via database controllers.

The V-GLASSES database may communicate to and/or with other components in a component collection, including itself, and/or facilities of the like. Most frequently, the V-GLASSES database communicates with the V-GLASSES component, other program components, and/or the like. The database may contain, retain, and provide information regarding other nodes and data.

The V-GLASSES

The V-GLASSES component 4435 is a stored program component that is executed by a CPU. In one embodiment, the V-GLASSES component incorporates any and/or all combinations of the aspects of the V-GLASSES discussed in the previous figures. As such, the V-GLASSES affects accessing, obtaining and the provision of information, services, transactions, and/or the like across various communications networks.

The V-GLASSES component may transform reality scene visual captures (e.g., see 213 in FIG. 13A, etc.) via V-GLASSES components (e.g., fingertip detection component 4442, image processing component 4443, virtual label generation 4444, auto-layer injection component 4445, user setting component 4446, wallet snap component 4447, mixed gesture detection component 4448, and/or the like) into transaction settlements, and/or the like and use of the V-GLASSES. In one embodiment, the V-GLASSES component 4435 takes inputs (e.g., user selection on one or more of the presented overlay labels such as fund transfer 227*d* in FIG. 13C, etc.; checkout request 3811; product data 3815; wallet access input 4011; transaction authorization input 4014; payment gateway address 4018; payment network address 4022; issuer server address(es) 4025; funds authorization request(s) 4026; user(s) account(s) data 4028; batch data 4212; payment network address 4216; issuer server address(es) 4224; individual payment request 4225; payment ledger, merchant account data 4231; and/or the like) etc., and transforms the inputs via various components (e.g., user selection on one or more of the presented overlay labels such as fund transfer 227*d* in FIG. 13C, etc.; UPC 4453; PTA 4451 PTC 4452; and/or the like), into outputs (e.g., fund transfer receipt 239 in FIG. 13E; checkout request message 3813; checkout data 3817; card authorization request 4016, 4023; funds authorization response(s) 4030; transaction authorization response 4032; batch append data 4034; purchase receipt 4035; batch clearance request 4214; batch payment request 4218; transaction data 4220; individual payment confirmation 4228, 4229; updated payment ledger, merchant account data 4233; and/or the like).

The V-GLASSES component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the V-GLASSES server employs a cryptographic server to encrypt and decrypt communications. The V-GLASSES component may communicate to and/or with other components in a component collection, including itself, and/or facilities of the like. Most frequently, the V-GLASSES component communicates with the V-GLASSES database, operating systems, other program components, and/or the like. The V-GLASSES may contain, communicate, generate, obtain, and/or provide program component, system, user, and/or data communications, requests, and/or responses.

Distributed V-GLASSES

The structure and/or operation of any of the V-GLASSES node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the V-GLASSES controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the V-GLASSES controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept
incoming communication
$sock = socket_create(AF_INET, SOCK_STREAM, 0);
socket_bind($sock, $address, $port) or die('Could not bind
to address');
socket_listen($sock);
$client = socket_accept($sock);
// read input data from client device in 1024 byte blocks
until end of message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); //
access database server
mysql_select("CLIENT_DB.SQL"); // select database to append
mysql_query("INSERT INTO UserTable (transmission)
VALUES ($data)"); // add data to UserTable table in a
CLIENT database
mysql_close("CLIENT_DB.SQL"); // close connection to
database
?>
```

Also, the following resources may be used to provide example embodiments regarding SOAP parser implementation:

```
http://www.xav.com/perl/site/lib/SOAP/Parser.html
http://publib.boulder.ibm.com/infocenter/tivihelp/v2r1/
index.jsp?topic=/com.ibm.IBMDI.doc/referenceguide295.htm
```

and other parser implementations:

```
http://publib.boulder.ibm.com/infocenter/tivihelp/v2r1/
index.jsp?topic=/com.ibm.IBMDI.doc/referenceguide259.htm
```

all of which are hereby expressly incorporated by reference herein.

In order to address various issues and advance the art, the entirety of this application for AUGMENTED REALITY VISION DEVICE APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a V-GLASSES individual and/or enterprise user, database configuration and/or relational model, data type, data transmission and/or network framework, syntax structure, and/or the like, various embodiments of the V-GLASSES may be implemented that enable a great deal of flexibility and customization. For example, aspects of the V-GLASSES may be adapted for (electronic/financial) trading systems, financial planning systems, and/or the like. While various embodiments and discussions of the V-GLASSES have been directed to enhanced interactive user interface, however, it is to be understood that the embodiments described herein may be readily configured and/or customized for a wide variety of other applications and/or implementations.

GRCCT

The Gesture Recognition Cloud Computing Terminal (hereinafter "GRCCT") allows users to send commands to remote systems (e.g., cloud systems) via gestures (e.g., hand or body movements) in open and public environments. With this system, a consumer shopping at a brick and mortar store can interact with the store and issue commands without needing to seek out sales agents or kiosks and thereby disrupt his shopping experience. Moreover, the consumer may personalize his gesture commands so that they are unique, private, and convenient for him.

Figure 56:
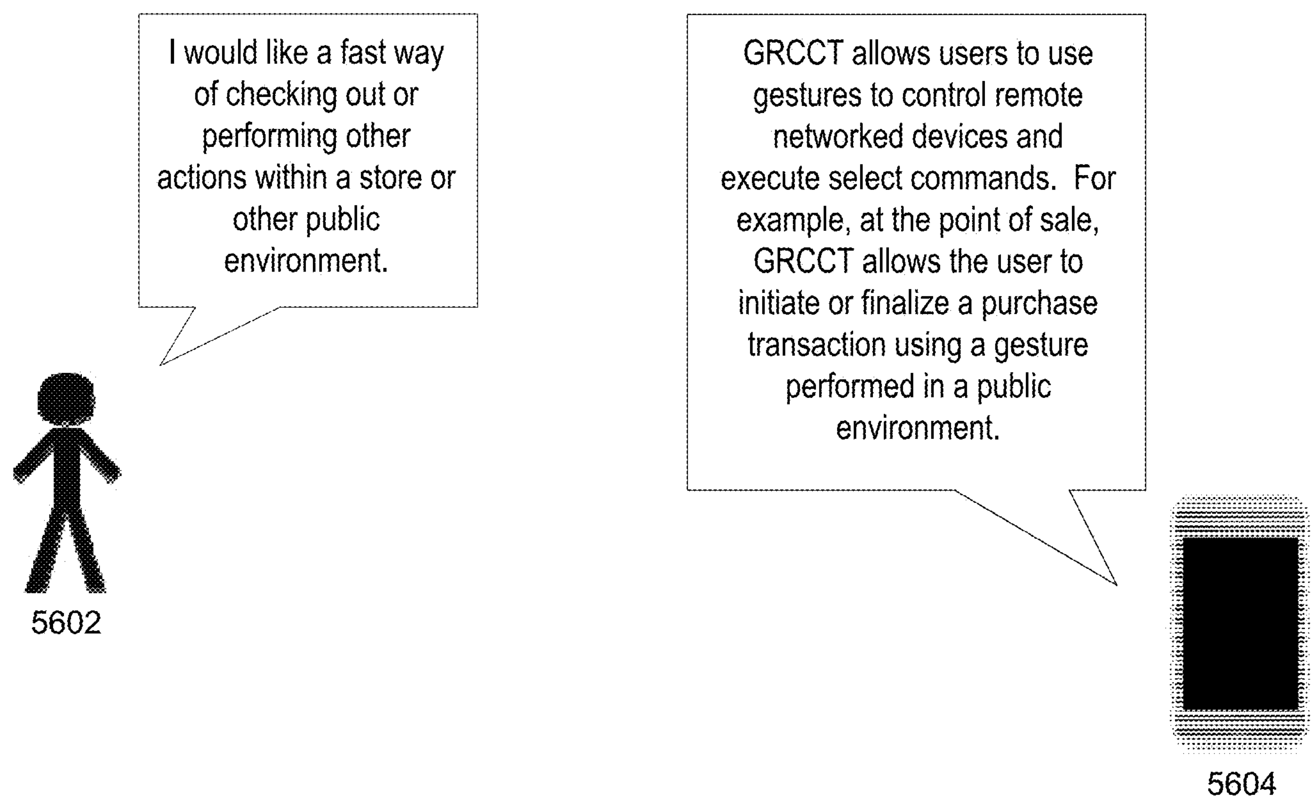
FIG. 56 is a block diagram illustrating exemplary aspects of the Gesture Recognition Cloud Computing Terminal ("GRCCT").

FIG. 56 illustrates example features of the GRCCT system. A user 5602 at a particular location (e.g., in a store or some other public environment) may desire to initiate or complete a purchase or to cause certain actions to be performed by a remote networked device. The GRCCT 5604 allows the user to do so using gestures, which may be personalized based on individual preferences.

Figure 57:
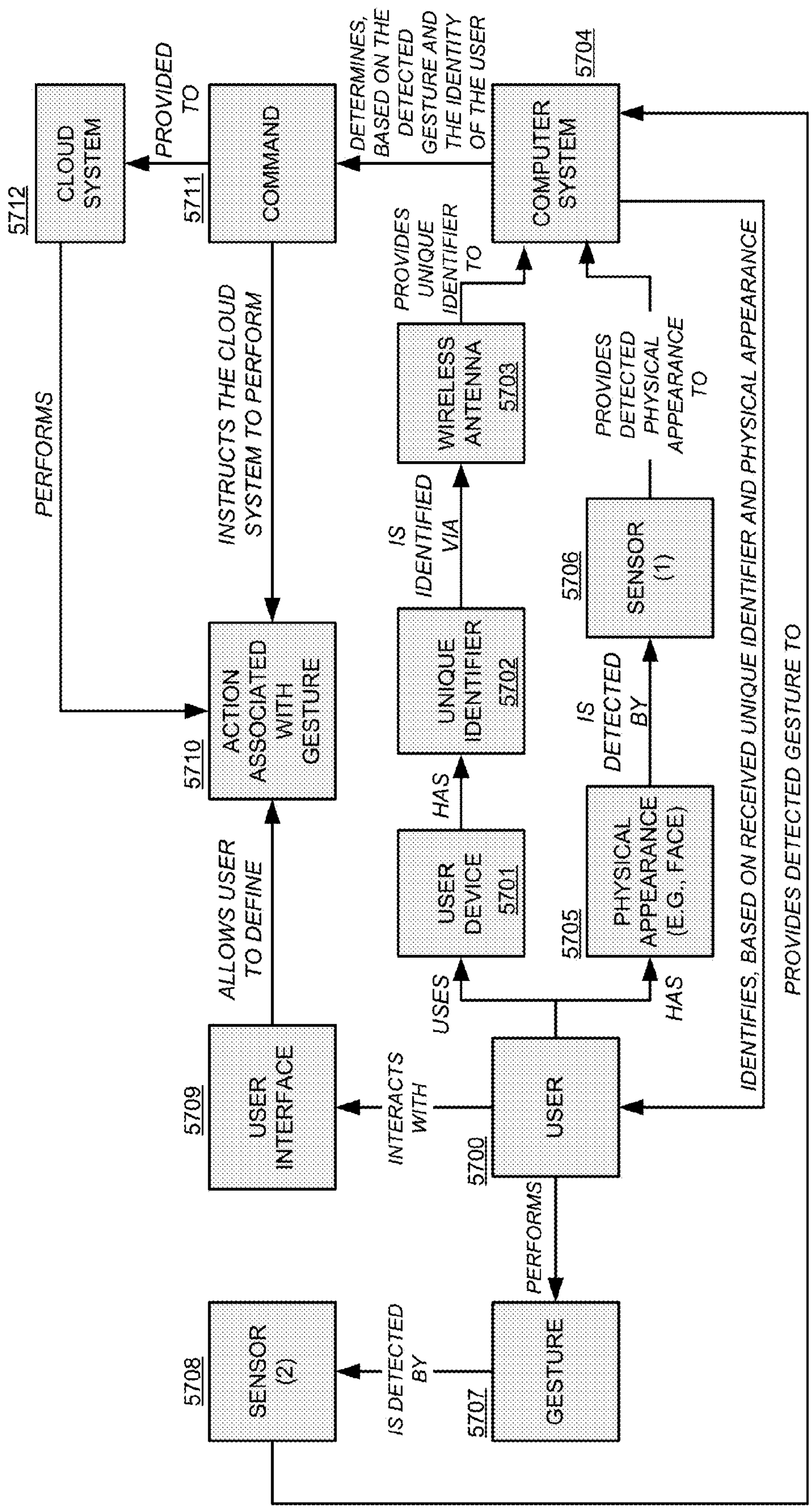
FIG. 57 is a block diagram illustrating an exemplary implementation of the GRCCT system.

FIG. 57 is a block diagram illustrating an exemplary GRCCT system. A store or public area implementing the depicted GRCCT system may have a wireless antenna 5703, a first sensor 5706, and second sensor 5708 operatively connected to a computer system 5704, which may be physically located in the store or at a remote location. When a user 5700 enters a detectable range of the wireless antenna 5703, the user's device 5701 (e.g., smartphone, NFC, RFID, etc.) emits a unique identifier 5702 (e.g., the smartphone's MAC address), which is identified by the wireless antenna 5703. The wireless antenna 5703 provides the detected unique identifier 5702 to the computer system 5704, which then attempts to identify the user 5700 based on the unique identifier 5702.

Once the identity of the user 5700 is ascertained, the GRCCT system then tries to locate the user 5700 in the store in order to monitor his gestures. In one embodiment, biometrics are used to locate the user 5700. For example, the computer system 5704 may attempt to locate the user 5700 using conventional face-recognition techniques known in the art based on his facial parameters on file (e.g., the user's 5700 profile may include a picture of himself). The computer system 5704 may use sensor 5706 (e.g., cameras) to detect facial features 5705 of detectable customers in the store, and compare the detected facial features 5705 to the user's 5700 facial parameters on file. Once a match is found, the computer system 5704 would have located the user 5700. If a match cannot be found, the computer system 5704 may cause a message (e.g., SMS) to be sent to the identified user 5700. Once sent, the computer system 5704 may monitor the movements of every person within view of its cameras to detect any movement that may resemble picking up or looking at a mobile device or phone. Those who have moved as such may have a greater likelihood of being the user 5700 whom the computer system 5704 is trying to locate. Therefore, once such motion by a person is detected, the computer system 5704 may detect his/her biofeatures and reassess whether the person matches the profile of the user 5700.

Once located, the user's 5700 gestures 5707 may be detected by sensor 5708 (e.g., cameras). The detected gestures 5707 are provided to the computer system 5704, which identifies the gesture 5707 and compares it to the user's 5700 profile to determine the command 5711 intended by the user 5700. The command 5711 then causes a cloud system 5712 to perform actions 5710 intended by the user's 5700 gesture 5707. The particular action 5710 performed may be defined by the user 5700 through a user interface 5709.

Figure 58:
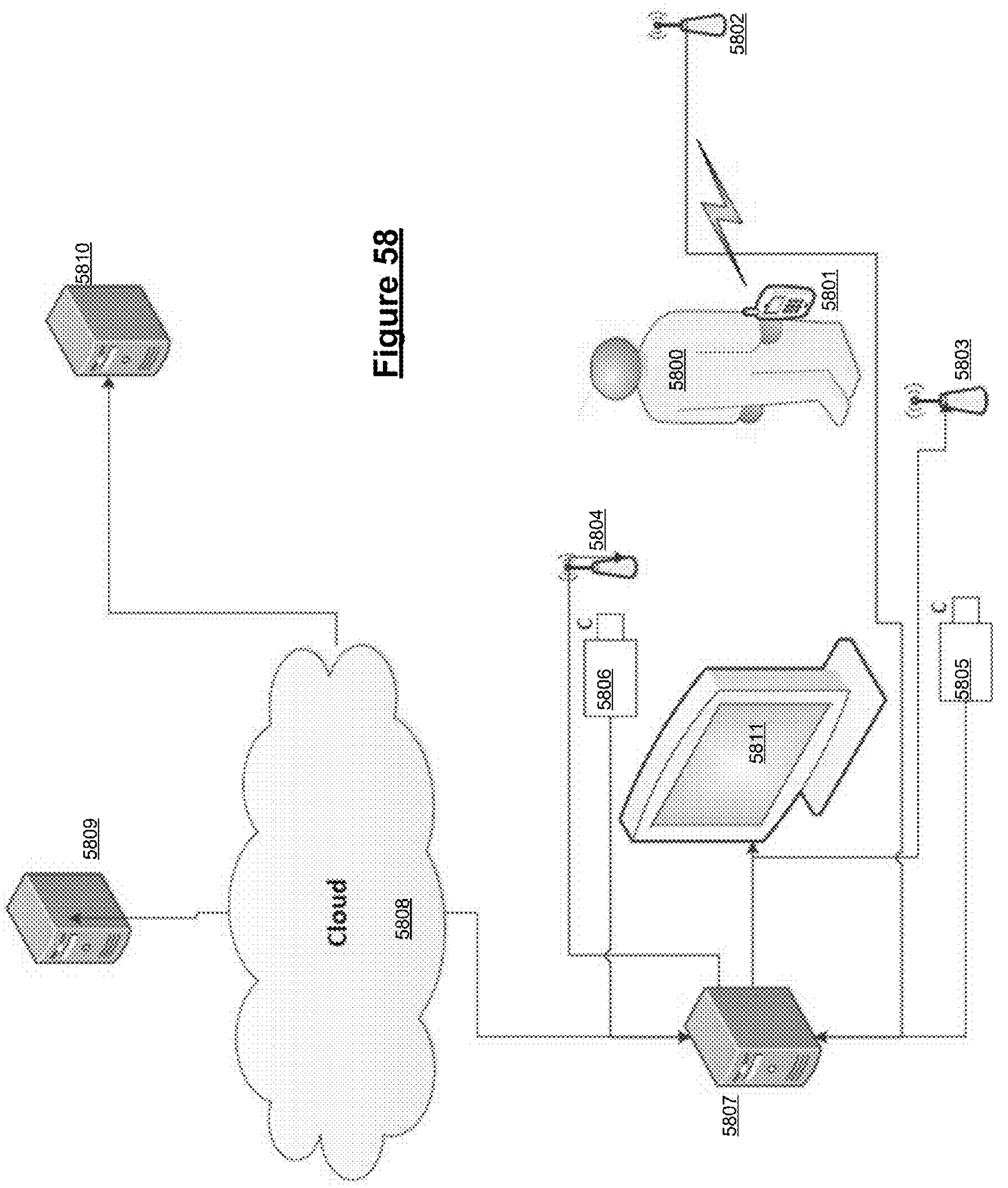
FIG. 58 is a block diagram illustrating exemplary aspects of the GRCCT.

FIG. 58 is a block diagram illustrating an exemplary configuration of the GRCCT system. A store, for example, may be configured with a computer system 5807 operatively connected to multiple wireless antennas 5802, 5803, 5804 located around the store. The wireless antennas 5802, 5803, 5804 are configured such that their combined detection range may adequately cover the store to communicate with a user's 5800 mobile device 5801. Moreover, the wireless antennas 5802, 5803, 5804 (and maybe others) are configured to track the user's 5700 location within the store. The computer system 5807 may also be operatively connected to multiple sensory devices, such as cameras 5805, 5806, in order to locate the user 5800 and detect his gestures. The computer system 5807 may output relevant displays (e.g., coupons, maps, promotions, etc.) to the user 5800 via an interactive monitor 5811. The monitor 5811 may have audio/visual output, a static image, or no image. In one example, the monitor 5811 may display interface icons that the user 5800 may activate by using gestures. For example, the direction in which the user 5800 moves his hand may trigger a virtual pointer to move in the same direction on the monitor 5811. If the user 5800 wishes to activate an icon, he may make a fist, for example. If, on the other hand, the user 5800 wishes to reset the screen, he may wave his hand. Based on the gestures detected or icons activated, the computer system 5807 may transmit an associated command to a cloud 5808, which may forward the command to one or more operatively connected computers 5809, 5810.

Figure 59:
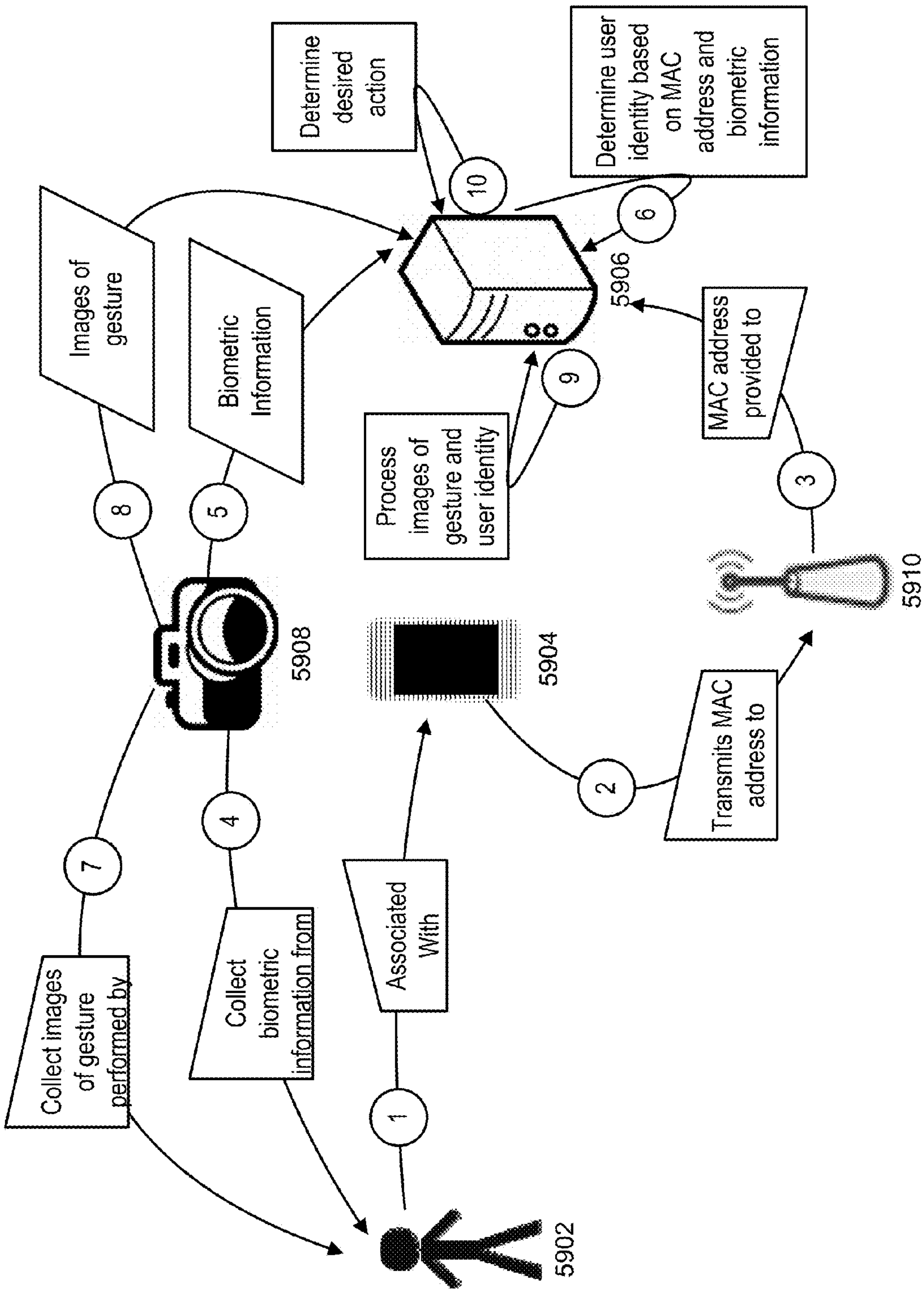
FIGS. 59-63 are block diagrams illustrating data flows between GRCCT affiliated entities within embodiments of the GRCCT system.

FIG. 59 shows a block diagram illustrating exemplary data flows between components of the GRCCT system and affiliated entities within various embodiments of the GRCCT system. Within various embodiments, a user 5902, his personal device 5904, wireless antennas 410, computer system 5906, and cameras 5908 are shown to interact.

In one embodiment, a user's 5902 associated personal device 5904 transmits its MAC address (or other personal identifiers, such as the user's email address or phone number) to the store's wireless antenna 410. The detected MAC address is then provided to the computer system 5906, which uses the MAC address to identify the user 5902. Once identified, the cameras 5908 collect biometric information, such as an image, of the user 5902. The collected biometric information is then transmitted to the computer system 5906, which checks whether the biometric information matches that of the identified user 5902 to locate the user 5902. Once located, the camera 5908 collects images of gestures performed by the user 5902 and provides the images to the computer system 5906. The computer system 5906 processes the images to identify the gesture and, based on the associated user's 5902 identity, determine the action intended by the user 5902.

Figure 60:
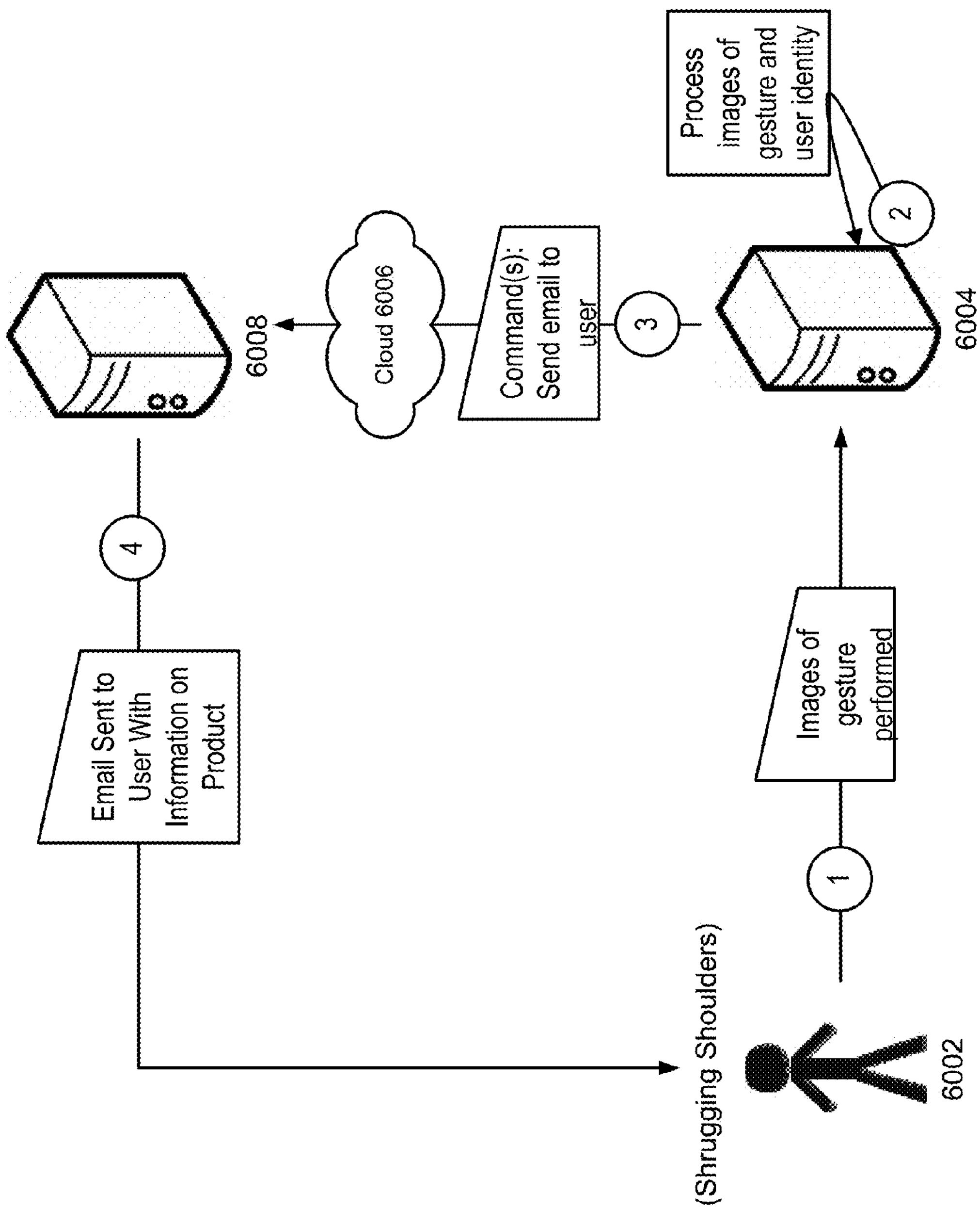

FIG. 60 shows a block diagram illustrating exemplary data flows between components of the GRCCT system and affiliated entities triggered by a user gesture command. The user 6002 may perform a gesture, such as shrugging his shoulders, and a series of images of the shoulder shrug may be captured and transmitted to a computer system 6004. The computer system 6004 may break down the images into layers and then analyze them along with an associated time series (i.e., image layers across time) to identify the type of gesture performed.

The computer system 6004 may utilize a variety of means to identify the user 6002 who performed the gesture. In one embodiment, the computer system 6004 may use facial-recognition technology to match the facial features in the images to profile images of users who have checked into the system (e.g., users whose smartphone MAC addresses have been detected). In another embodiment, the camera tracking the user 6002 may also track an associated user ID, which is transmitted along with the images to the computer system 6004. In yet another embodiment, the computer system 6004 tracks a user ID with an associated camera or video feed.

After identifying the gesture type and the user 6002 who performed the gesture, the computer system 6004 identifies the command intended by the user's 6002 gesture. In one embodiment, user 6002 has a profile containing a list of predefined gestures with associated commands. The computer system 6004 accesses the user's 6002 list and compares it to the identified gesture type to determine the intended command. For example, user 6002 may have defined a shoulder shrug to trigger a command to send a product information email to himself.

Once the command is determined, the computer system 6004 sends the command to a remote computer 6008 via a cloud 6006. The remote computer 6008 then acts according to the command, such as sending an email to the user 6002 with product information.

Figure 61:
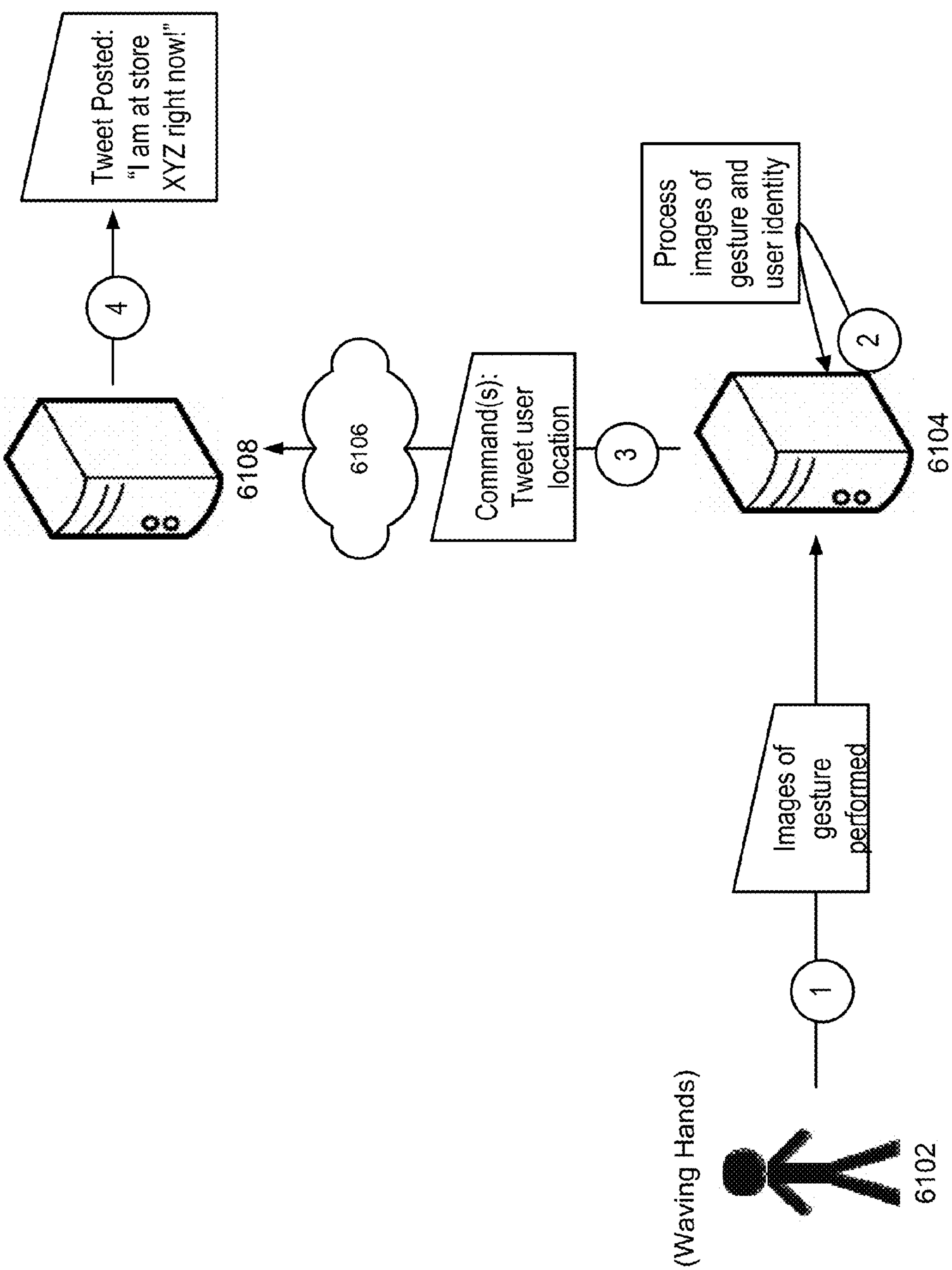

FIG. 61 shows a block diagram illustrating exemplary data flows between components of the GRCCT system and affiliated entities triggered by a user gesture command, which in this example is a command to tweet. In the example depicted, the user 6102 performs a gesture, such as waving his hands. Images of the gesture are captured and transmitted to a computer system 6104, which analyzes the images to determine the type of gesture performed (e.g., hand waving). Based on the user's 6102 identity, the computer system 6104 can determine a user-defined command associated with the determined gesture type. In one example, the command triggered by the user's 6102 gesture is to Tweet (i.e., via Twitter) the user's 6102 location. Based on the command, the computer system 6104 may determine the user's 6102 location and transmit it along with the command to a remote computer system 6108 via a cloud 6106. The remote computer system 6108 may then act according to the received command, which in this example is to tweet that the user 6102 is at the received location.

Figure 62:
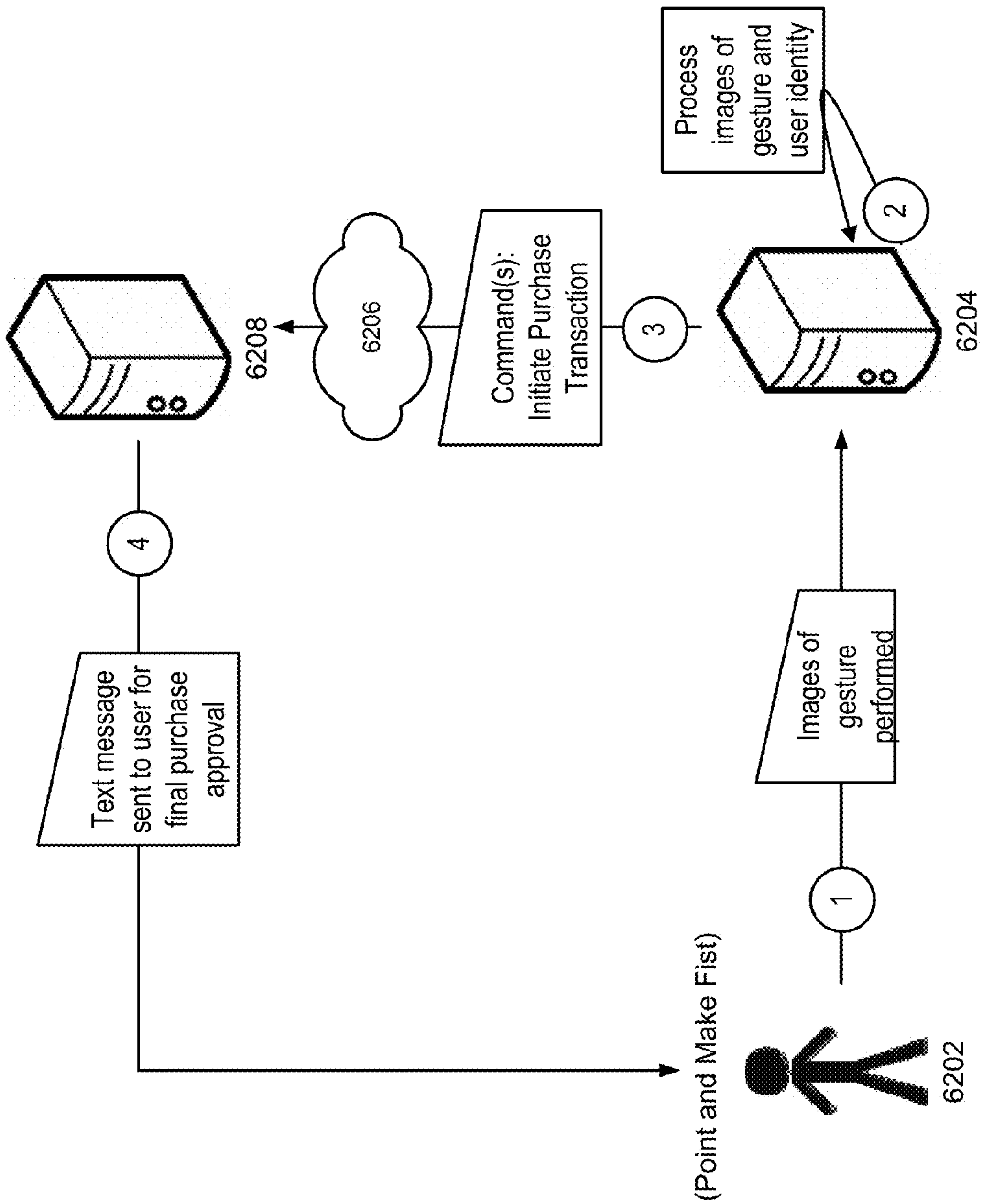

FIG. 62 shows a block diagram illustrating exemplary data flows between components of the GRCCT system and affiliated entities triggered by a user gesture command, which in this example is a command to initiate a purchase transaction. The user 6202 in this example may perform a gesture, such as pointing and making a fist, at a product in a store. Images of the gesture may be transmitted to a computer system 6204, which may processes the images to identify the type of gesture performed. The type of gesture may then be mapped to an associated command based on the user's 6202 identity. Once it is determined that the particular gesture (i.e., in this case pointing and making a first) for this particular user 6202 corresponds to a purchase command, for example, the computer system 6204 may then identify a product that the user 6202 pointed at when gesturing, based on the received images of the gesture. To do so, the computer system 6204 may isolate a portion of one of the received images that fall in the trajectory of the user 6202's pointing finger, and compare that portion to images of store products. In another example, the user 6202 may be gesturing at a screen that is displaying a product, in which case the computer system 6204 may be able to determine the product that the user wishes to purchase by determining what is displayed (e.g., the computer system 6204 may be the one controlling outputs to the display screen or it may be in communication with the display controller).

Once the product has been identified, the computer system 6204 may process the command to initiate a purchase transaction of the product. The purchase command, along with the user 6202 identity and a product ID associated with the product, may then be transmitted to a remote computer system 6208 through a cloud 6206. The remote computer system 6208 in response to the purchase command may retrieve the user's 6202 payment account (e.g., credit card information, bank account, etc.) based on the user identity. Prior to finalizing the purchase, however, the remote computer system 6208 may send a message (e.g., SMS) to the user's 6202 mobile device to confirm that the user 6202 would like to complete the purchase. Based on the user's 6202 response (e.g., by sending a response using his mobile device, his computer, a public terminal at a store, etc.), the remote computer system 6208 may proceed to finalize the purchase.

Figure 63:
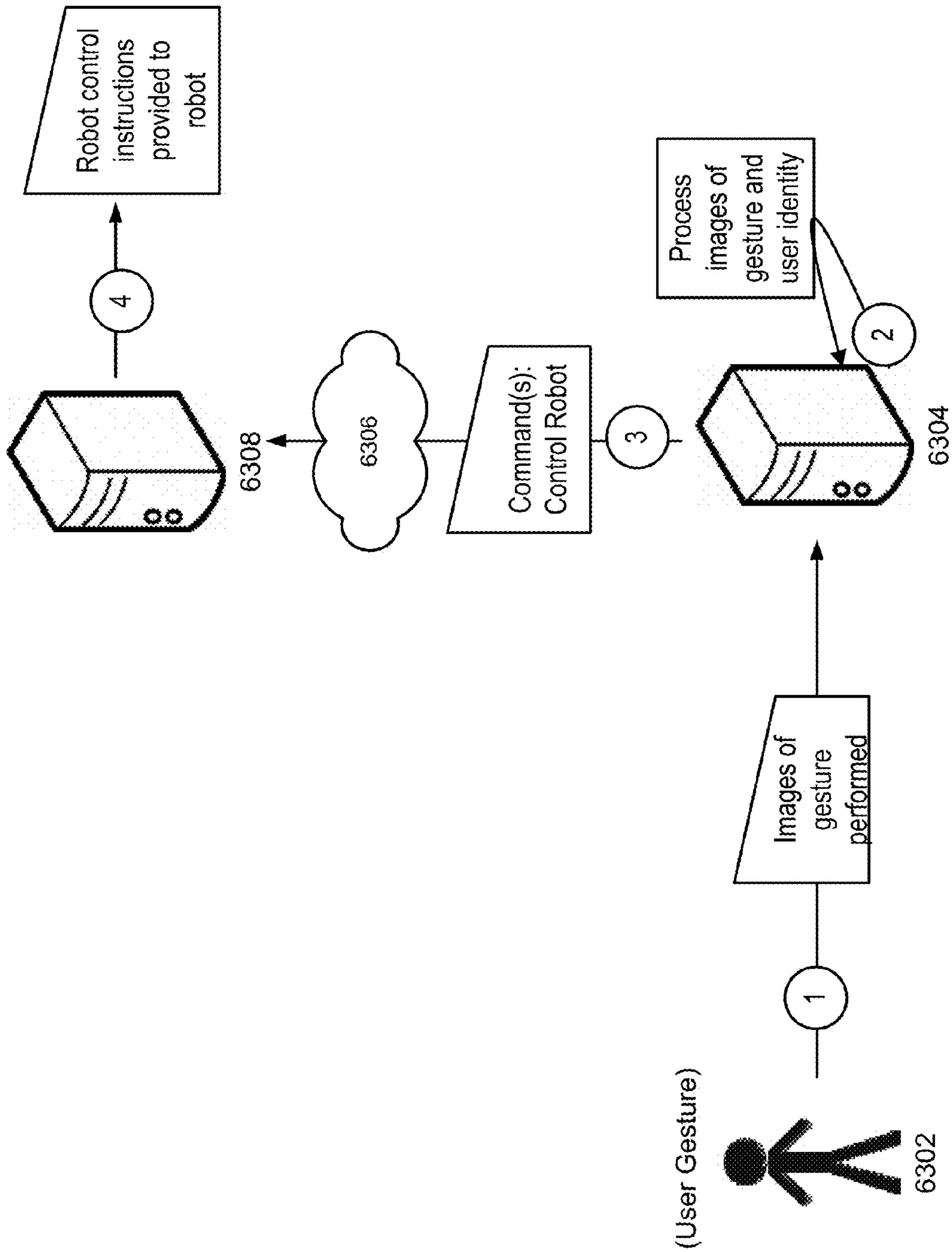

FIG. 63 shows a block diagram illustrating exemplary data flows between components of the GRCCT system and affiliated entities triggered by a user gesture command, which in this example is a command to control a robot. The user 6302 may perform a gesture, the images of which may be captured by a camera and transmitted to a computer system 6304. The images may then be processed to determine the gesture type. Based on the gesture type and the user's 6302 identity, a user-defined command corresponding to the gesture type is determined. In this example, the command is to control a robot. The computer system 6304 may transmit the robot control command via cloud 6306 to a remote computer system 6308, where the command may be processed and the associated robot control instructions may be provided to the intended robot.

Figure 64:
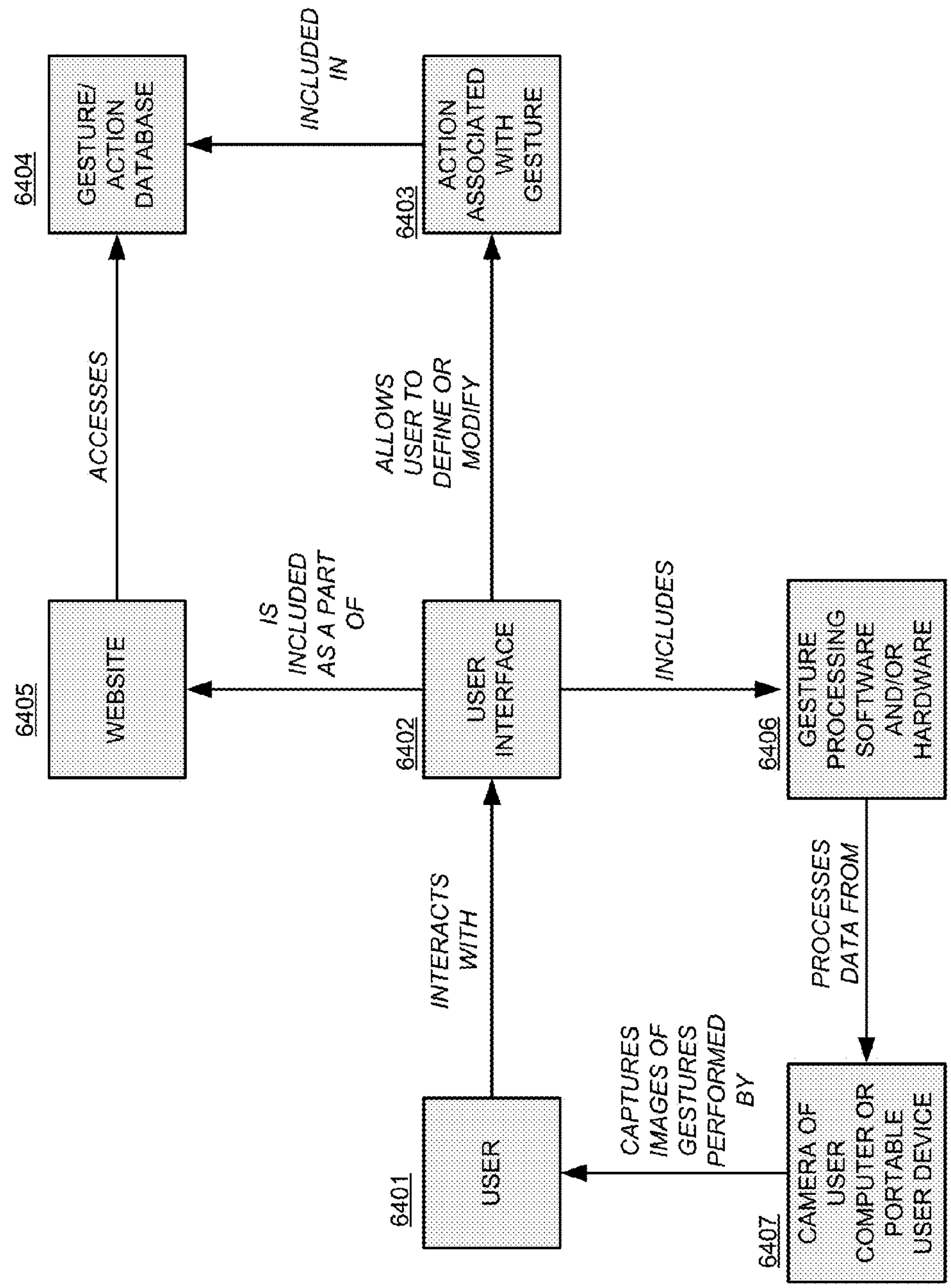
FIG. 64 is a block diagram illustrating relationships between components of the GRCCT system in an exemplary user configuration setting.

FIG. 64 is a block diagram illustrating relationships between components of the GRCCT system in an exemplary user configuration setting. A user 6401 may interact with a user interface 6402, which may be included as part of a website 6405 (e.g., the user interface 6402 may be a web page with which the user's device or computer communicates using HTTP). Through the user interface 6402, the user 6401 may define or modify actions/commands that it wishes to associate with particular gestures. For example, shoulder shrugging may be associated with a command to send email (as depicted in FIG. 59), waving hands may be associated with a command to tweet (as depicted in FIG. 60), etc. The user-defined associations between gestures and actions/commands may be stored in a database 6404. Through the user interface 6402 and the associated website 6405, the user 6401 may access the database 6404 to view or modify his, or another person's, gesture command definitions.

The user interface 6402 may allow the user 6401 to select actions/commands from a list of system-defined command or macros (i.e., sets of command), or allow the user 6401 to define his own commands/macros (e.g., the user 6401 may do so by configuring parameters of a command or write computer programs/scripts/codes/instructions. The user interface 6402 may also enable the user 6401 to select a gesture from a list of predefined gestures (e.g., may be presented by textual description, images, animations, sounds, etc.) using, for example, a drag-and-drop interface. In another example, the user 6401 may record his gesture using any conventional image capturing device 6407, such as a camera (e.g., webcam) or a portable user device (e.g., smartphone). The captured gesture images may be transmitted to a gesture processing software/hardware 6406 (e.g., it may be a client-side software installed on the user's 6401 computer or smartphone) included as part of the user interface 6402. The captured gesture images may then be used to define a gesture command and stored in the database 6404.

When the user 6401 next performs the gesture at a store, for example, images of the performance may be compared to the recorded gesture stored in the database 6404 to identify the performed gesture and determine the user-defined corresponding command.

The user 6401 may also test out the gesture commands via the user interface 6402. The user 6401 may use the image capturing devices 6307 of his mobile device or computer to capture images of his own gesture. The captured images may be transmitted to the user interface 6402, which may process the images using the gesture processing software/hardware 6406. Once the gesture has been identified, the user interface 6402 may access the gesture command database 6404 via the website 6405 and attempt to find an action/command defined by the user 6401 that is associated with the identified gesture. If one is found, the system may commence execution of the action/command. Alternatively or additionally, the system may display to the user 6401 that the corresponding action/command has been found based on the gesture.

Figure 65:
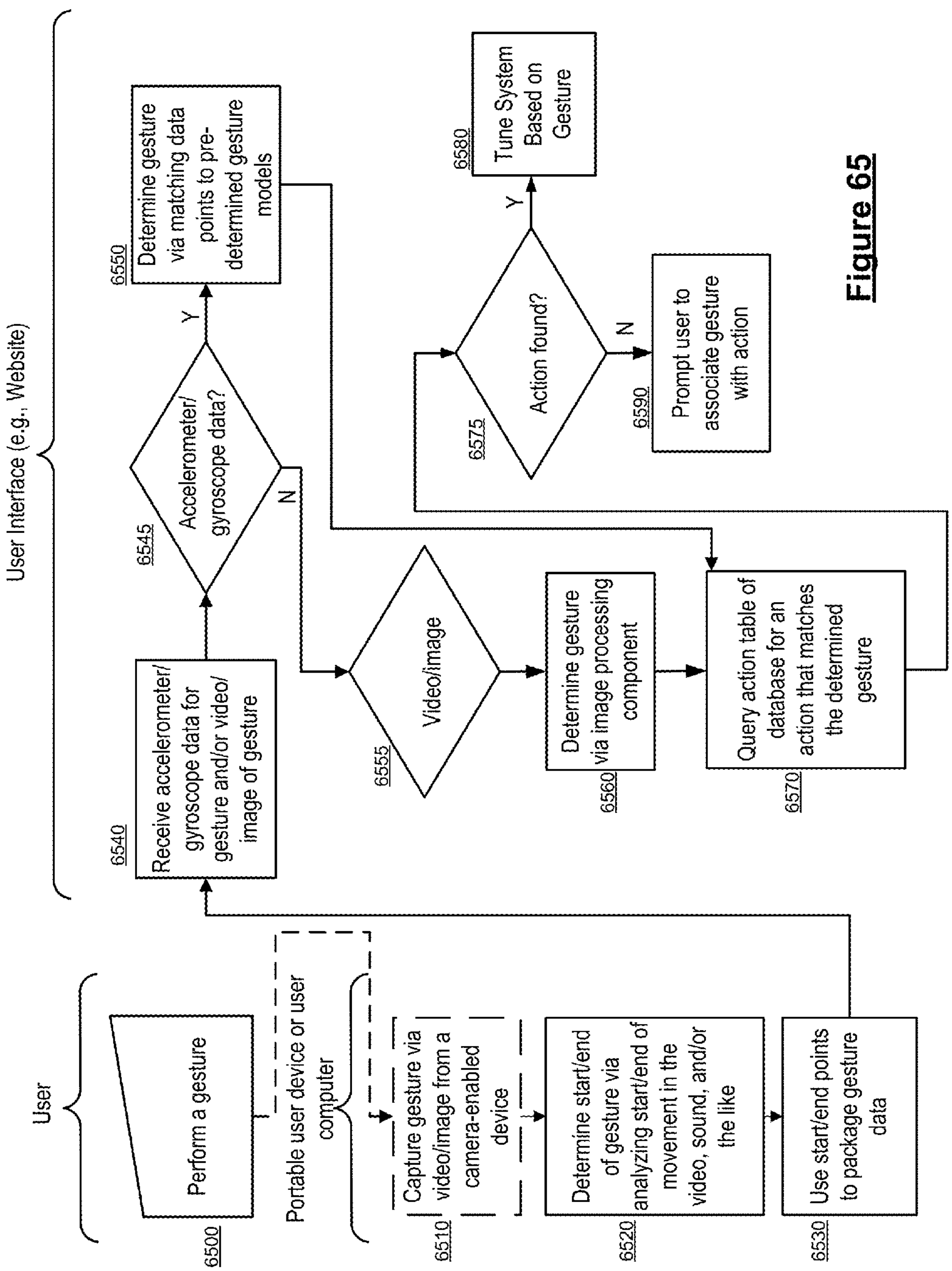
FIGS. 65-67 depict logic flow diagrams and devices illustrating user interactions with the system within embodiments of the GRCCT platform.

FIG. 65 is a logic flow diagram showing an example of how a user's gesture may be processed to trigger a corresponding command/action. The user may perform a gesture 6500 in a variety of ways. In one example, the user may perform the gesture motions with his hand while holding onto a portable device, thus allowing the device's accelerometer, gyroscope, or other motion detection sensors to capture the motion performed. In another example, the gesture may be visually captured (e.g., video or images) by a camera-enabled device, such as the user's mobile device 6510. The gesture capturing device may determine the start and end points of the gesture 6520 by, for example, analyzing the change in movement patterns (e.g., sudden changes or stops in movement or the performance of a particular movement that signifies either the start or end of a gesture), detecting audible commands (e.g., "start"), detecting input commands through the user's mobile device (e.g., by pressing an app's button), etc. The start and end points may then be used to package relevant gesture data 6530 (e.g., the segment of video or image frames that capture the full gesture).

The packaged gesture data may then be transmitted to the user interface, 6540, which may be a website. The user interface computer (e.g., the web server or an associated backend server) may first attempt to determine whether the received gesture data is accelerometer/gyroscope data 6545, in which case the computer may identify the gesture by matching the gesture data with predetermined gesture models 6550. If the gesture data is not of the accelerometer/gyroscope data variety, then it may be a video or image capture 6555, in which case the gesture type may be determine via image processing 6560. Once the gesture type is determined, a database query may then be issued to determine the action/command that corresponds to that gesture type 6570. If the gesture command is user-defined, the database query may be limited to defined gesture commands associated with the user. Based on the query results or any comparison processing, the computer may determine whether a corresponding action/command is found 6575. If it is found, the computer may perform the action/command 6580. If no match is found, then the computer may prompt the user (e.g., via the user interface, the user's mobile device, etc.) to specify an intended action/command 6590.

Figure 66:
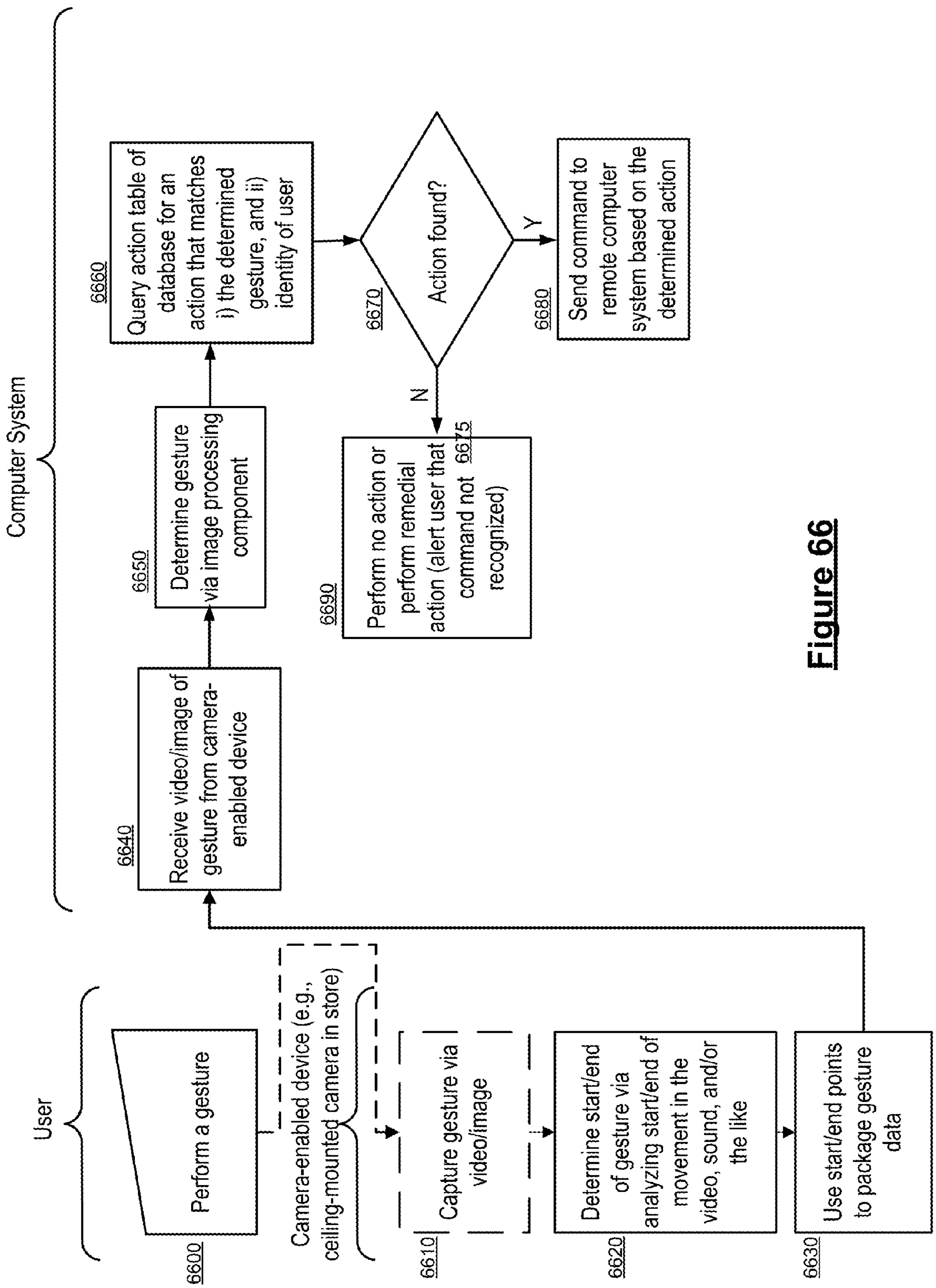

FIG. 66 is a logic flow diagram showing another example of how a user's gesture may be processed to trigger a corresponding command. When a user performs a gesture 6600 in a store, for example, images/videos of the gesture may be captured by the store's image capturing device (e.g., cameras mounted on the ceiling). The image capturing device, which may be equipped or has access to a processor, may determine a start and an end point of the gesture by analyzing the captured movements or sounds 6620. Based on the determined start and end points, the image capturing device packages the relevant gesture data 6630 and transmits it to a computer. Note that in another example, the processing performed by the aforementioned image capturing device (i.e., steps 6620 and 6630) may instead be performed by the computer. That is, the image capturing device may only perform the function of capturing gestures and passes the images/videos to the computer for processing.

Once the computer receives the video/images of the gesture 6640, it identifies the gesture via an image processing component 6650. Based on the identified gesture and the identity of the user who performed the gesture (e.g., which may be determined based on face-recognition technology), the computer queries a gesture command database to determine the user-defined command/action that is associated with the identified gesture 6660. The computer then determines whether a command/action is found based on the query results and/or comparison processing 6670. If a corresponding command/action is found, then the command/action may be sent to a remote computer if necessitated by the command/action 6680, or otherwise perform the command/action locally. If no command/action corresponding to the gesture is found, then the computer may perform no action or perform one or more remedial actions (e.g., alert the user that the command is not recognized) 6690.

Figure 67:
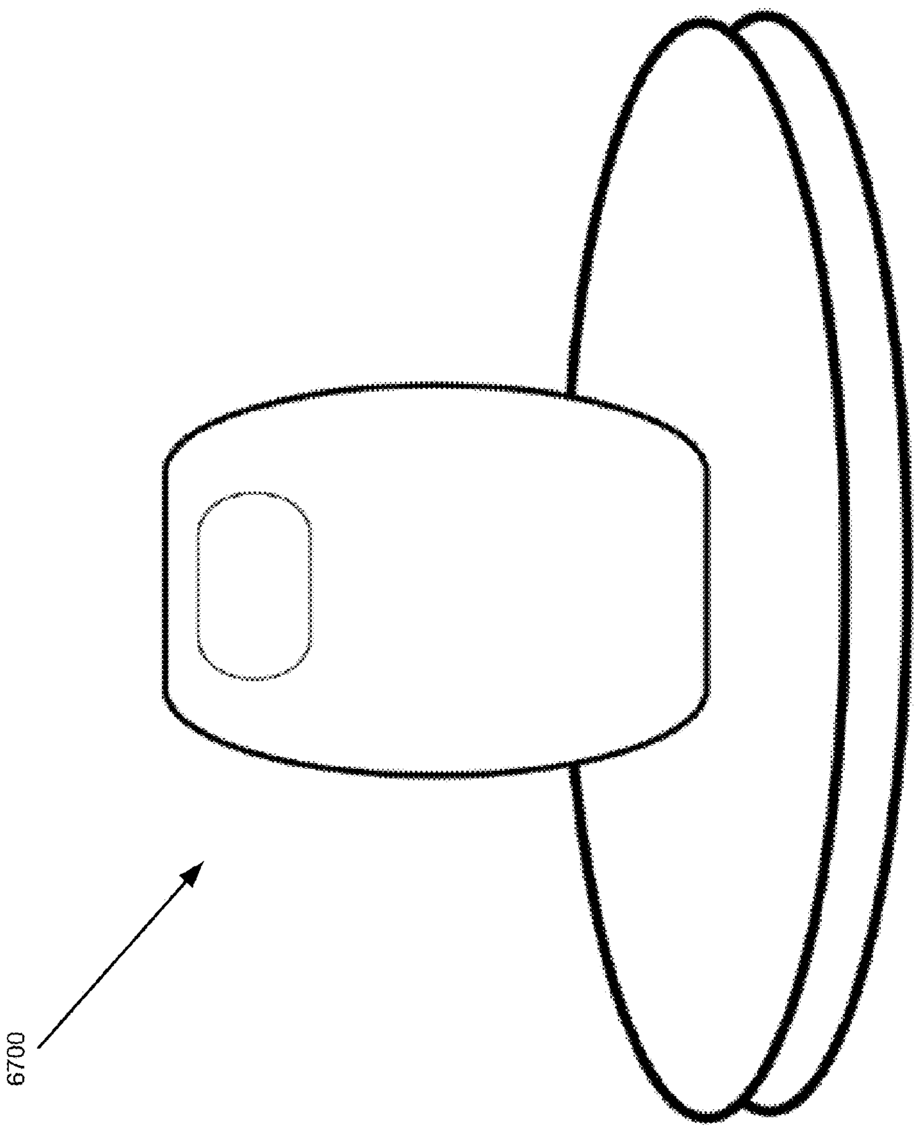

FIG. 67 provides at 6700 an example of a device that is part of a system to detect visual characteristics, such as those related to customers in the store. Images of the gesture are captured and transmitted to a computer system, which analyzes the images to determine the type of gesture performed (e.g., hand waving).

Figure 68:
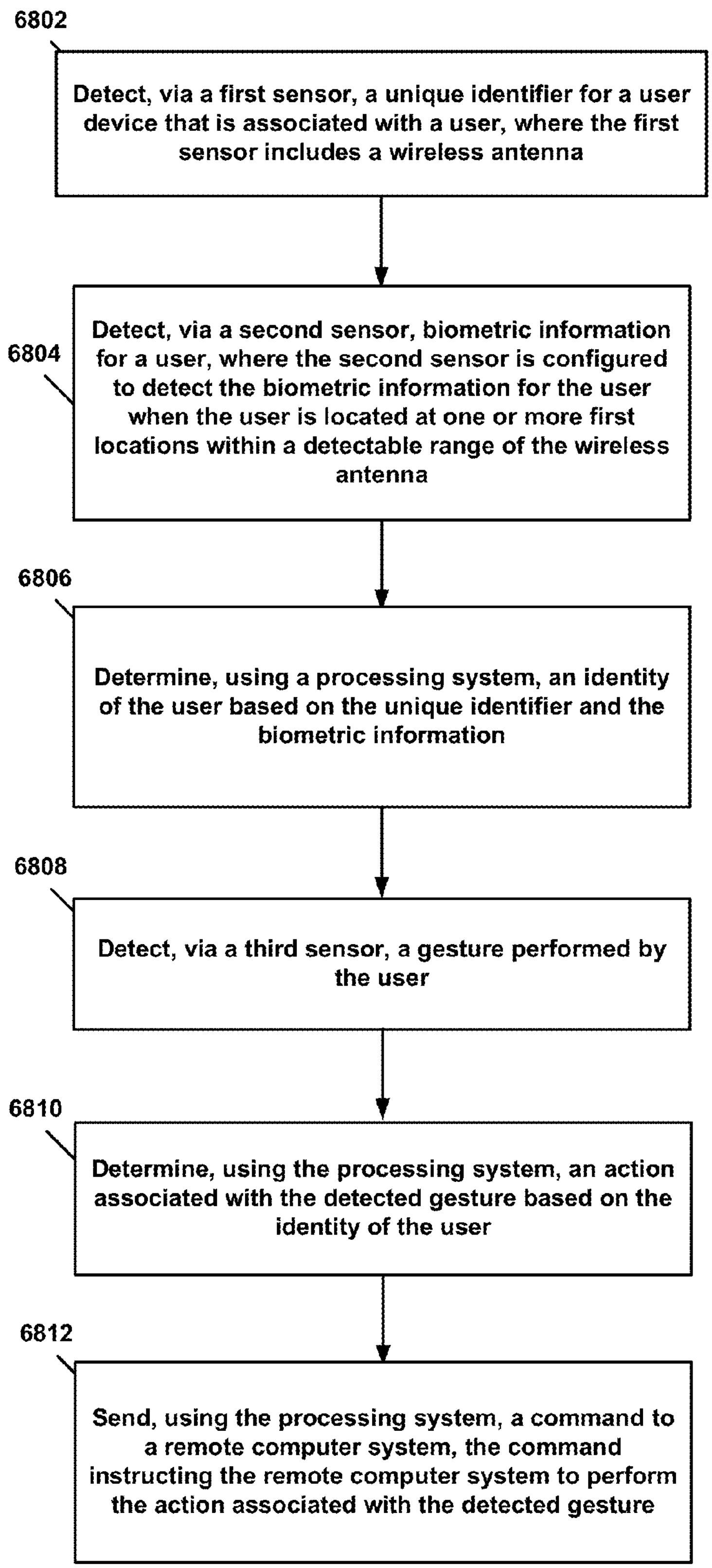
FIG. 68 is a flow diagram illustrating an embodiment of the GRCCT processing a user's gesture to cause an intended action to be performed.

FIG. 68 is a flow diagram of an exemplary embodiment of the GRCCT. At 6802, a first sensor, which may include a wireless antenna, detects a unique identifier (e.g., MAC address) for a user device (e.g., mobile device or smartphone) that is associated with a user. This may occur, for example, when the user enters a store. At 6804, a second sensor (e.g., camera) may detect biometric information for a user (e.g., facial features, retina patterns, finger prints, etc.) when the user is within range of the wireless antenna. At 6806, a processing system may determine the user's identity based on the unique identifier and the biometric information. At 6808, a third sensor, which may be the same as the second sensor, detects a gesture performed by the user. In one example, the third sensor is a camera, and detecting the gesture performed includes capturing images or videos of the gesture. At 6810, the processing system determines an action associated with the detected gesture based on the identity of the user. For example, the processing system may compare the gesture with a list of gesture commands defined and saved by the user. If a match is found, the processing system would have then identified the user-defined action that is associated with the gesture. At 6812, the processing system may send a command to a remote computer system to instruct the remote computer system to perform the action associated with the detected gesture. In another example, the processing system may perform the action itself, depending on the nature of the action.

Figure 69A:
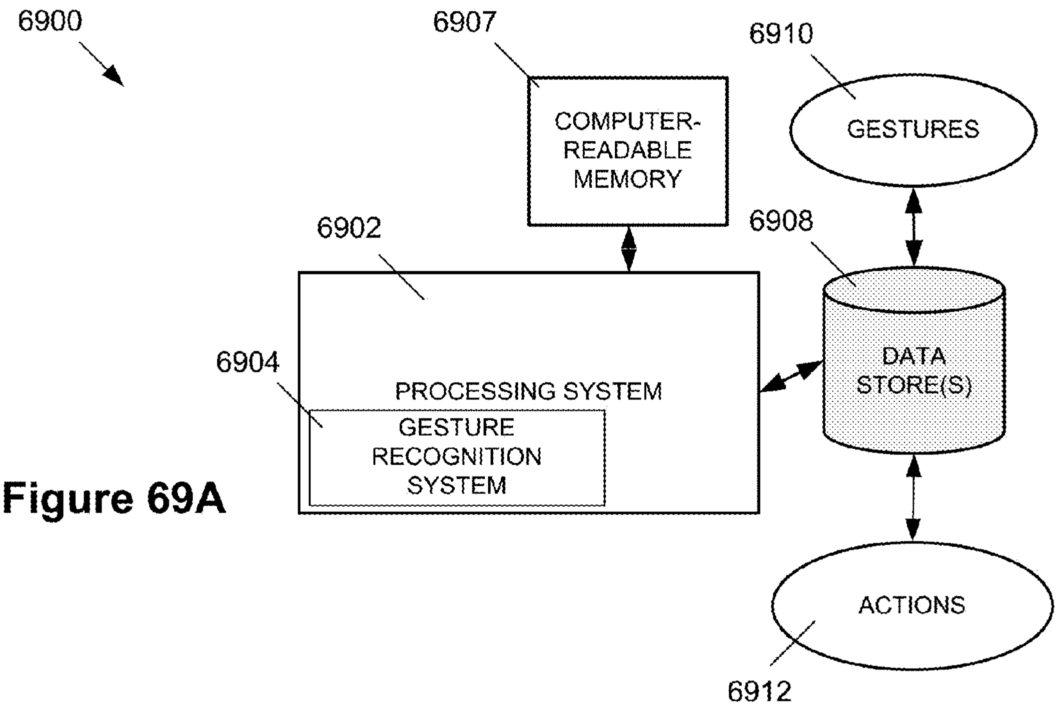
FIGS. 69A, 69B, and 69C depict example systems for use in implementing a system for gesture recognition.
Figure 69B:
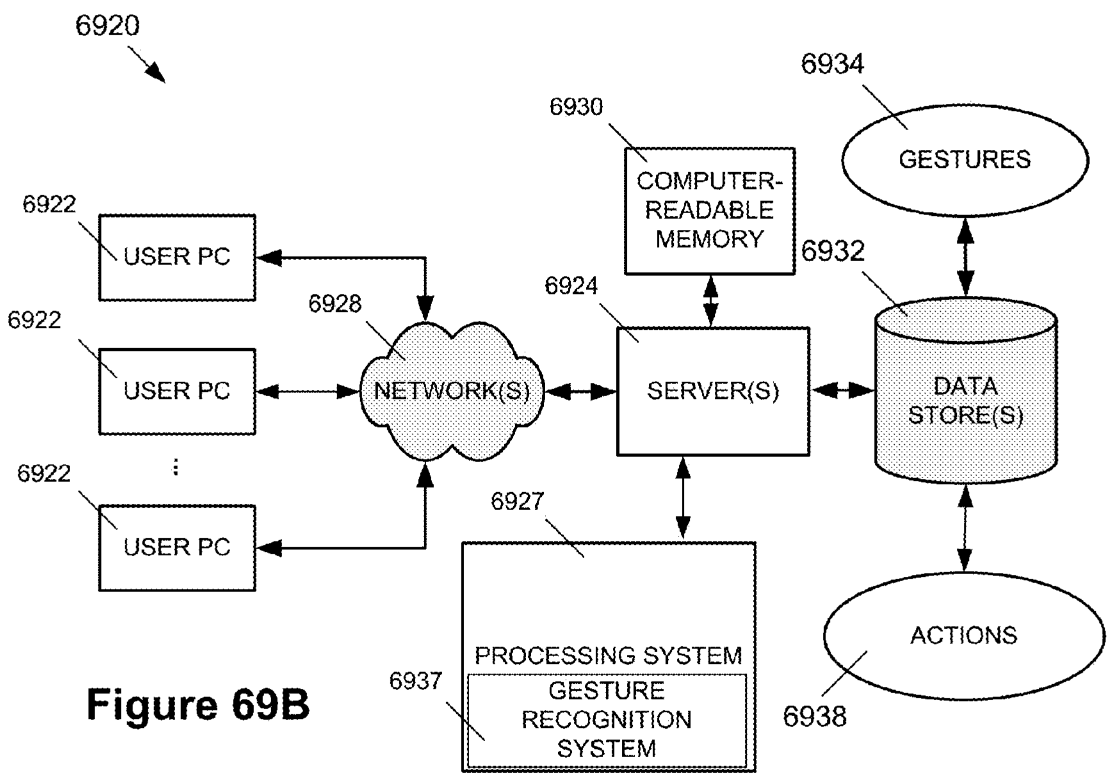
Figure 69C:
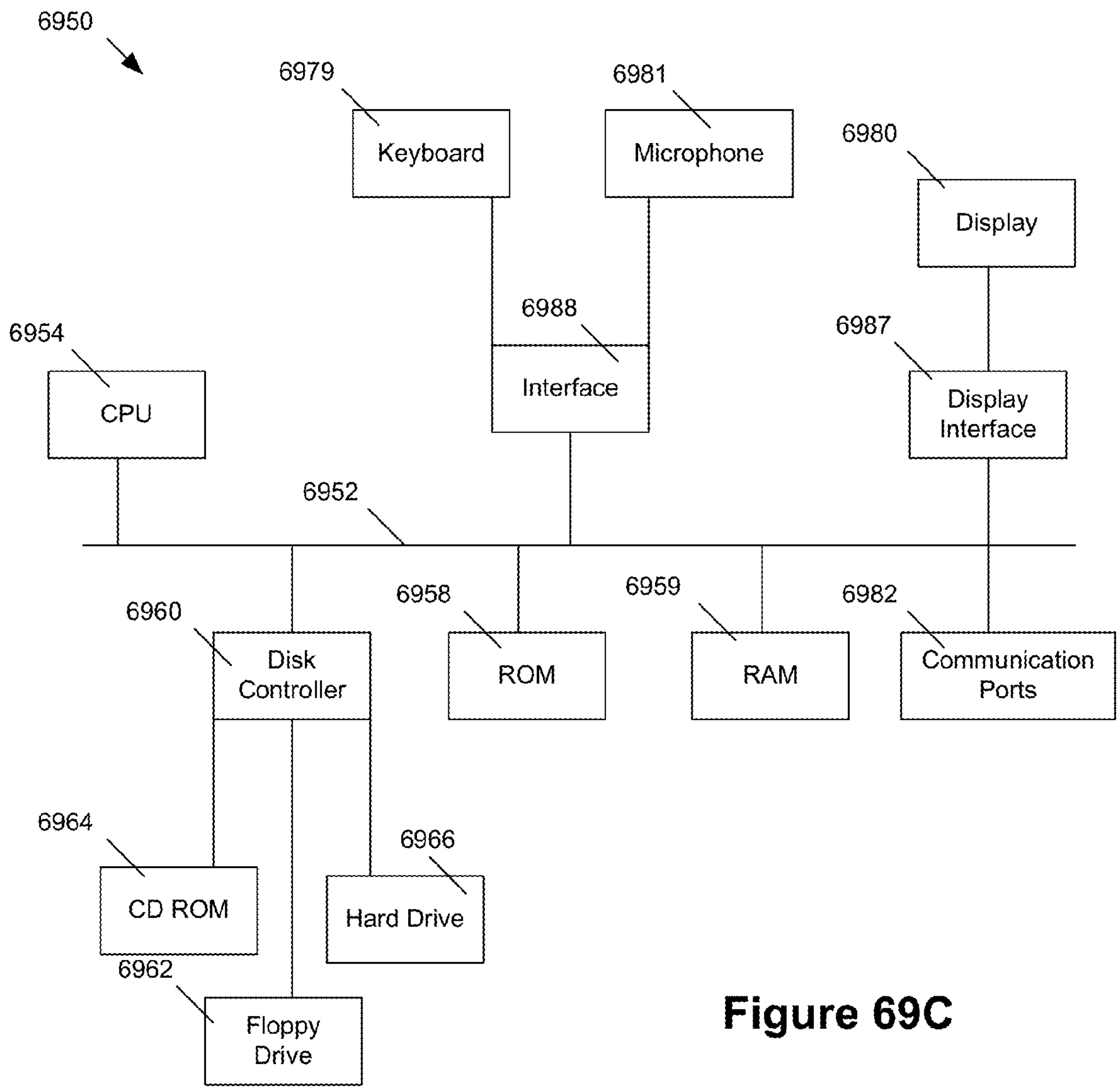

Additional examples will now be described with regard to additional exemplary aspects of implementation of the approaches described herein. FIGS. 69A, 69B, and 69C depict example systems for use in implementing a gesture recognition system. For example, FIG. 69A depicts an exemplary system 6900 that includes a standalone computer architecture where a processing system 6902 (e.g., one or more computer processors located in a given computer or in multiple computers that may be separate and distinct from one another) includes a gesture recognition system 6904 being executed on it. The processing system 6902 has access to a computer-readable memory 6907 in addition to one or more data stores 6908. The one or more data stores may include gesture data 6910 as well as associated actions 6912.

FIG. 69B depicts a system 6920 that includes a client-server architecture. One or more user PCs 6922 access one or more servers 6924 running a gesture recognition system 6937 on a processing system 6927 via one or more networks 6928. The one or more servers 6924 may access a computer readable memory 6930 as well as one or more data stores 6932. The one or more data stores 6932 may contain gestures data 6934 as well as associated actions 6938.

FIG. 69C shows a block diagram of exemplary hardware for a standalone computer architecture 6950, such as the architecture depicted in FIG. 69A that may be used to contain and/or implement the program instructions of system embodiments of the present invention. A bus 6952 may serve as the information highway interconnecting the other illustrated components of the hardware. A processing system 6954 labeled CPU (central processing unit) (e.g., one or more computer processors at a given computer or at multiple computers), may perform calculations and logic operations required to execute a program. A non-transitory processor-readable storage medium, such as read only memory (ROM) 6958 and random access memory (RAM) 6959, may be in communication with the processing system 6954 and may contain one or more programming instructions for performing the method of implementing a gesture recognition system. Optionally, program instructions may be stored on a non-transitory computer readable storage medium such as a magnetic disk, optical disk, recordable memory device, flash memory, or other physical storage medium.

A disk controller 6960 interfaces one or more optional disk drives to the system bus 6952. These disk drives may be external or internal floppy disk drives such as 6962, external or internal CD-ROM, CD-R, CD-RW or DVD drives such as 6964, or external or internal hard drives 6966. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 6960, the ROM 6958 and/or the RAM 6959. Preferably, the processor 6954 may access each component as required.

A display interface 6987 may permit information from the bus 6952 to be displayed on a display 6980 in audio, graphic, or alphanumeric format. Communication with external devices may optionally occur using various communication ports 6982.

In addition to the standard computer-type components, the hardware may also include data input devices, such as a keyboard 6979, or other input device 6981, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed:

1. A computer-implemented method for transmitting a command to a remote computer system, the computer-implemented method comprising:

detecting, via a first sensor, a unique identifier for a user device that is associated with a user, wherein the unique identifier is sent to the first sensor by the user device, the first sensor includes a wireless antenna, the detection of the unique identifier via the first sensor indicates that the user device is located within a detectable range of the wireless antenna, and both the user device and wireless antenna are located within a merchant store;

detecting, via a second sensor, biometric information for a plurality of customers located within the detectable range of the wireless antenna, wherein the second sensor includes a camera that is configured to detect the biometric information for each of the plurality of customers when the plurality of customers are located within the detectable range of the wireless antenna;

determining, using a processing system, an identity of the user based on the unique identifier and the detected biometric information, wherein at least a portion of the detected biometric information matches facial parameters of the user;

after the determining of the identity of the user, detecting, via the second sensor, a gesture performed by the user, wherein the gesture is directed to an item that is located within the merchant store, and the second sensor is configured to detect the gesture performed by the user when the user is located at one or more second locations within the detectable range of the wireless antenna;

identifying, using the processing system, an action associated with the detected gesture within a user-defined gesture table based on the identity of the user; and sending, using the processing system, the command to the remote computer system, the command instructing the remote computer system to perform the action for the item, the action corresponding to the detected gesture from the user-defined gesture table.

2. The computer-implemented method of claim 1, further comprising:

providing the biometric information, the unique identifier, and the gesture to a computer system, the computer system being connected to the first sensor and the second sensor, wherein the computer system sends the command to the remote computer system.

3. The computer-implemented method of claim 1, wherein the detected biometric information includes an image of at least a portion of a face of the user, the computer-implemented method further comprising:

analyzing the image of the at least the portion of the face of the user using the processing system, wherein the analyzing of the image generates an output indicating a facial characteristic of the user; and comparing the output with a set of previously stored reference signals, wherein the determining of the identity of the user is based on the comparison.

4. The computer-implemented method of claim 1, wherein the unique identifier includes a media access control (MAC) address of the user device.

5. The computer-implemented method of claim 1, further comprising:

detecting, via the first sensor, a second unique identifier for a second user device that is associated with a second user, the detection of the second unique identifier indicating that the second user device is located within the detectable range of the wireless antenna, wherein the second user is a person for whom biometric information is not detected via the second sensor;

transmitting a message to the second user device;

after the transmitting of the message to the second user device, determining one or more users within the detectable range of the wireless antenna that make a motion indicating a receipt of a message via a user device;

detecting second biometric information for the one or more users via the second sensor; and determining the identity of the second user based on the second unique identifier and the second biometric information.

6. The computer-implemented method of claim 1, wherein the remote computer system comprises a cloud computing system, the cloud computing system being configured to perform the action associated with the detected gesture.

7. The computer-implemented method of claim 1, wherein the action associated with the detected gesture includes:

a posting of a message on a social media website;

an initiation of a financial transaction between the user and a third party;

a transmittal of information to the user; or an action performed by a robot.

8. The computer-implemented method of claim 1, wherein the user causes the action to be associated with the gesture by interacting with a website, the website including an interface that permits the associating of the action with the gesture.

9. The computer-implemented method of claim 1, further comprising:

determining a candidate identity for the user based on the unique identifier for the user device, the candidate identity being associated with a previously-stored reference signal; and after the determining of the candidate identity for the user, comparing the detected biometric information for the user with the previously-stored reference signal, wherein the identity of the user is determined based on the comparison.

10. The computer-implemented method of claim 1, wherein the second sensor includes one or more cameras that collect a series of images depicting the gesture being performed by the user, the series of images being collected over a period of time, and wherein the computer-implemented method further comprises:

analyzing, using the processing system, the series of images to determine a trajectory of an object within one or more images of the series of images; and comparing the trajectory of the object with one or more previously stored trajectories, each of the previously stored trajectories being associated with a gesture.

11. A computer-implemented system for transmitting a command to a remote computer system, the computer-implemented system comprising:

a memory; and one or more processors disposed in communication with the memory and configured to issue processing instructions stored in the memory to:

detect, via a first sensor, a unique identifier for a user device that is associated with a user, wherein the unique identifier is sent to the first sensor by the user device, the first sensor includes a wireless antenna, the detection of the unique identifier via the first sensor indicates that the user device is located within a detectable range of the wireless antenna, and both the user device and wireless antenna are located within a merchant store;

detect, via a second sensor, biometric information for a plurality of customers located within the detectable range of the wireless antenna, wherein the second sensor includes a camera that is configured to detect the biometric information for each of the plurality of customers when the plurality of customers are located within the detectable range of the wireless antenna;

determine, using a processing system, an identity of the user based on the unique identifier and the detected biometric information, wherein at least a portion of the detected biometric information matches facial parameters of the user;

after the determining of the identity of the user, detecting, via the second sensor, a gesture performed by the user, wherein the gesture is directed to an item that is located within the merchant store, and the second sensor is configured to detect the gesture performed by the user when the user is located at one or more second locations within the detectable range of the wireless antenna;

identify, using the processing system, an action associated with the detected gesture within a user-defined gesture table based on the identity of the user; and send, using the processing system, the command to the remote computer system, the command instructing the remote computer system to perform the action for the item, the action corresponding to the detected gesture from the user-defined gesture table.

12. The computer-implemented system of claim 11, further comprising instruction to:

provide the biometric information, the unique identifier, and the gesture to a computer system, the computer system being connected to the first sensor and the second sensor, wherein the computer system sends the command to the remote computer system.

13. The computer-implemented system of claim 1, wherein the detected biometric information includes an image of at least a portion of a face of the user, the computer-implemented system further comprising instructions to:

analyze the image of the at least the portion of the face of the user using the processing system, wherein the analyzing of the image generates an output indicating a facial characteristic of the user; and compare the output with a set of previously stored reference signals, wherein the determining of the identity of the user is based on the comparison.

14. The computer-implemented system of claim 11, wherein the unique identifier includes a media access control (MAC) address of the user device.

15. The computer-implemented system of claim 11, further comprising instruction to:

detect, via the first sensor, a second unique identifier for a second user device that is associated with a second user, the detection of the second unique identifier indicating that the second user device is located within the detectable range of the wireless antenna, wherein the second user is a person for whom biometric information is not detected via the second sensor;

transmit a message to the second user device;

after the transmitting of the message to the second user device, determine one or more users within the detectable range of the wireless antenna that make a motion indicating a receipt of a message via a user device;

detect second biometric information for the one or more users via the second sensor; and determine the identity of the second user based on the second unique identifier and the second biometric information.

16. The computer-implemented system of claim 11, wherein the remote computer system comprises a cloud computing system, the cloud computing system being configured to perform the action associated with the detected gesture.

17. The computer-implemented system of claim 11, wherein the action associated with the detected gesture includes:

a posting of a message on a social media website;

an initiation of a financial transaction between the user and a third party;

a transmittal of information to the user; or an action performed by a robot.

18. The computer-implemented system of claim 11, wherein the user causes the action to be associated with the gesture by interacting with a website, the website including an interface that permits the associating of the action with the gesture.

19. The computer-implemented system of claim 11, further comprising instructions to:

determine a candidate identity for the user based on the unique identifier for the user device, the candidate identity being associated with a previously-stored reference signal; and after the determining of the candidate identity for the user, compare the detected biometric information for the user with the previously-stored reference signal, wherein the identity of the user is determined based on the comparison.

20. The computer-implemented system of claim 11, wherein the second sensor includes one or more cameras that collect a series of images depicting the gesture being performed by the user, the series of images being collected over a period of time, and wherein the computer-implemented system further comprises instructions to:

analyze, using the processing system, the series of images to determine a trajectory of an object within one or more images of the series of images; and compare the trajectory of the object with one or more previously stored trajectories, each of the previously stored trajectories being associated with a gesture.

21. A processor-readable non-transitory medium storing processor-issuable instructions for transmitting a command to a remote computer system, said instructions being configured to:

detect, via a first sensor, a unique identifier for a user device that is associated with a user, wherein the unique identifier is sent to the first sensor by the user device, the first sensor includes a wireless antenna, the detection of the unique identifier via the first sensor indicates that the user device is located within a detectable range of the wireless antenna, and both the user device and wireless antenna are located within a merchant store;

detect, via a second sensor, biometric information for a plurality of customers located within the detectable range of the wireless antenna, wherein the second sensor includes a camera that is configured to detect the biometric information for each of the plurality of customers when the plurality of customers are within the detectable range of the wireless antenna;

determine, using a processing system, an identity of the user based on the unique identifier and the detected biometric information, wherein at least a portion of the detected biometric information matches facial parameters of the user;

after the determining of the identity of the user, detecting, via the second sensor, a gesture performed by the user, wherein the gesture is directed to an item that is located within the merchant store, and the second sensor is configured to detect the gesture performed by the user when the user is located at one or more second locations within the detectable range of the wireless antenna;

identify, using the processing system, an action associated with the detected gesture within a user-defined gesture table based on the identity of the user; and send, using the processing system, the command to the remote computer system, the command instructing the remote computer system to perform the action for the item, the action corresponding to the detected gesture from the user-defined gesture table.

* * * * *